US011037565B2

(12) United States Patent
Kudurshian et al.

(10) Patent No.: US 11,037,565 B2
(45) Date of Patent: Jun. 15, 2021

(54) INTELLIGENT DIGITAL ASSISTANT IN A MULTI-TASKING ENVIRONMENT

(71) Applicant: Apple Inc., Cupertino, CA (US)

(72) Inventors: Aram D. Kudurshian, San Francisco, CA (US); Bronwyn Jones, San Francisco, CA (US); Elizabeth Caroline Furches Cranfill, San Francisco, CA (US); Harry J. Saddler, Berkeley, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/717,790

(22) Filed: Dec. 17, 2019

(65) Prior Publication Data

US 2020/0118568 A1 Apr. 16, 2020

Related U.S. Application Data

(63) Continuation of application No. 15/271,766, filed on Sep. 21, 2016, now Pat. No. 10,586,535.

(Continued)

(51) Int. Cl.
*G10L 15/22* (2006.01)
*G06F 16/683* (2019.01)

(Continued)

(52) U.S. Cl.
CPC .............. *G10L 15/22* (2013.01); *G06F 3/167* (2013.01); *G06F 16/685* (2019.01);

(Continued)

(58) Field of Classification Search
CPC ................................ G06F 3/167; G10L 15/22
See application file for complete search history.

(56) References Cited

U.S. PATENT DOCUMENTS 1,559,320 A ‡ 10/1925 Hirsh .................. A61C 15/046 132/32
2,180,522 A ‡ 11/1939 Henne ................. A61C 15/046 132/32

(Continued)

FOREIGN PATENT DOCUMENTS

AU 2014100581 B4 9/2014
AU 2015203483 A1 7/2015

(Continued)

OTHER PUBLICATIONS

Gruber, Tom, "It Is What It Does: The Pragmatics of Ontology for Knowledge Sharing", Proceedings of the International CIDOC CRM Symposium, Available online at <http://tomgruber.org/writing/cidoc-ontology.htm>, Mar. 26, 2003, 21 pages.‡

(Continued)

*Primary Examiner* — Ibrahim Siddo
(74) *Attorney, Agent, or Firm* — Dentons US LLP

(57) ABSTRACT

Systems and processes for operating a digital assistant are provided. In one example, a method includes receiving a first speech input from a user. The method further includes identifying context information and determining a user intent based on the first speech input and the context information. The method further includes determining whether the user intent is to perform a task using a searching process or an object managing process. The searching process is configured to search data, and the object managing process is configured to manage objects. The method further includes, in accordance with a determination the user intent is to perform the task using the searching process, performing the task using the searching process; and in accordance with the determination that the user intent is to perform the task using the object managing process, performing the task using the object managing process.

36 Claims, 82 Drawing Sheets

Related U.S. Application Data

(60) Provisional application No. 62/348,728, filed on Jun. 10, 2016.

(51) Int. Cl.

| | |
|---|---|
| ***G06F 16/951*** | (2019.01) |
| ***G06F 3/16*** | (2006.01) |
| ***G06F 16/9032*** | (2019.01) |
| ***G10L 13/02*** | (2013.01) |
| ***G10L 15/18*** | (2013.01) |
| ***G10L 15/30*** | (2013.01) |

(52) U.S. Cl.

CPC ........ *G06F 16/9032* (2019.01); *G06F 16/951* (2019.01); *G10L 13/02* (2013.01); *G10L 15/1815* (2013.01); *G10L 15/30* (2013.01); *G10L 2015/223* (2013.01); *G10L 2015/228* (2013.01)

(56) References Cited

U.S. PATENT DOCUMENTS

| | | | | | | |
|---|---|---|---|---|---|---|
| 2,495,222 | A | ‡ | 1/1950 | Bierig | G04C 17/0016 | 368/40 |
| 3,704,345 | A | ‡ | 11/1972 | Coker | G06F 40/253 | 704/26 |
| 3,710,321 | A | ‡ | 1/1973 | Rubenstein | G06K 9/6807 | 382/22 |
| 3,787,542 | A | ‡ | 1/1974 | Gallagher et al. | B29C 44/3442 | 264/51 |
| 3,828,132 | A | ‡ | 8/1974 | Flanagan | G10L 13/07 | 704/26 |
| 3,979,557 | A | ‡ | 9/1976 | Schulman | G10L 19/04 | 704/20 |
| 4,013,085 | A | ‡ | 3/1977 | Wright | A61C 15/046 | 132/32 |
| 4,081,631 | A | ‡ | 3/1978 | Feder | H01H 13/702 | 181/14 |
| 4,090,216 | A | ‡ | 5/1978 | Constable | H04N 5/58 | 348/60 |
| 4,107,784 | A | ‡ | 8/1978 | Van Bemmelen | G06F 3/0489 | 341/23 |
| 4,108,211 | A | ‡ | 8/1978 | Tanaka | A61B 1/0055 | 138/12 |
| 4,159,536 | A | ‡ | 6/1979 | Kehoe | G06F 40/263 | 704/2 |
| 4,181,821 | A | ‡ | 1/1980 | Pirz | G10L 15/063 | 704/24 |
| 4,204,089 | A | ‡ | 5/1980 | Key | H03M 11/02 | 178/17 |
| 4,241,286 | A | ‡ | 12/1980 | Gordon | A61F 9/067 | 2/8.8 |
| 4,253,477 | A | ‡ | 3/1981 | Eichman | A61C 15/046 | 132/32 |
| 4,278,838 | A | ‡ | 7/1981 | Antonov | G10L 13/00 | 704/26 |
| 4,282,405 | A | ‡ | 8/1981 | Taguchi | G10L 25/93 | 704/21 |
| 4,310,721 | A | ‡ | 1/1982 | Manley | H04B 1/66 | 375/22 |
| 4,332,464 | A | ‡ | 6/1982 | Bartulis | G03G 15/502 | 345/17 |
| 4,348,553 | A | ‡ | 9/1982 | Baker | G06K 9/6206 | 704/23 |
| 4,384,169 | A | ‡ | 5/1983 | Mozer | G10L 19/00 | 704/20 |
| 4,386,345 | A | ‡ | 5/1983 | Narveson | G09G 1/285 | 345/20 |
| 4,433,377 | A | ‡ | 2/1984 | Eustis | G06F 3/00 | 710/16 |
| 4,451,849 | A | ‡ | 5/1984 | Fuhrer | H04N 5/58 | 348/60 |
| 4,485,439 | A | ‡ | 11/1984 | Rothstein | G06F 19/00 | 710/63 |
| 4,495,644 | A | ‡ | 1/1985 | Parks | G06K 9/00154 | 382/12 |
| 4,513,379 | A | ‡ | 4/1985 | Wilson | G05B 19/4147 | 700/16 |
| 4,513,435 | A | ‡ | 4/1985 | Sakoe | G10L 15/00 | 704/24 |
| 4,555,775 | A | ‡ | 11/1985 | Pike | G09G 5/14 | 715/79 |
| 4,577,343 | A | ‡ | 3/1986 | Oura | G10L 13/02 | 704/25 |
| 4,586,158 | A | ‡ | 4/1986 | Brandle | G09G 1/00 | 345/66 |
| 4,587,670 | A | ‡ | 5/1986 | Levinson | G10L 15/142 | 704/25 |
| 4,589,022 | A | ‡ | 5/1986 | Prince | H04N 5/58 | 348/60 |
| 4,611,346 | A | ‡ | 9/1986 | Bednar | G06K 9/342 | 382/17 |
| 4,615,081 | A | ‡ | 10/1986 | Lindahl | A41H 37/08 | 24/90 |
| 4,618,984 | A | ‡ | 10/1986 | Das | G10L 15/07 | 704/24 |
| 4,642,790 | A | ‡ | 2/1987 | Minshull | G09G 5/346 | 345/67 |
| 4,653,021 | A | ‡ | 3/1987 | Takagi | G06F 16/9017 | |
| 4,654,875 | A | ‡ | 3/1987 | Srihari | G06K 9/72 | 382/22 |
| 4,655,233 | A | ‡ | 4/1987 | Laughlin | A61C 15/046 | 132/32 |
| 4,658,425 | A | ‡ | 4/1987 | Julstrom | H04M 3/569 | 379/20 |
| 4,670,848 | A | ‡ | 6/1987 | Schramm | G06N 5/02 | 706/62 |
| 4,677,570 | A | ‡ | 6/1987 | Taki | G09F 27/00 | 345/1 |
| 4,680,429 | A | ‡ | 7/1987 | Murdock | G06F 3/045 | 178/20 |
| 4,680,805 | A | ‡ | 7/1987 | Scott | G06K 9/48 | 382/19 |
| 4,686,522 | A | ‡ | 8/1987 | Hernandez | G06F 3/0481 | 345/16 |
| 4,688,195 | A | ‡ | 8/1987 | Thompson | G06F 3/0489 | 706/11 |
| 4,692,941 | A | ‡ | 9/1987 | Jacks | G10L 13/04 | 704/26 |
| 4,698,625 | A | ‡ | 10/1987 | McCaskill | G06F 3/04845 | 345/15 |
| 4,709,390 | A | ‡ | 11/1987 | Atal | G10L 21/04 | 704/21 |
| 4,713,775 | A | ‡ | 12/1987 | Scott | G06F 8/10 | 367/38 |
| 4,718,094 | A | ‡ | 1/1988 | Bahl | G10L 15/08 | 704/24 |
| 4,724,542 | A | ‡ | 2/1988 | Williford | G07C 9/247 | 382/11 |
| 4,726,065 | A | ‡ | 2/1988 | Froessl | G06F 8/34 | 715/70 |
| 4,727,354 | A | ‡ | 2/1988 | Lindsay | G06T 9/008 | 341/10 |
| RE32,632 | E | ‡ | 3/1988 | Atkinson | G06F 3/03543 | 345/16 |
| 4,736,296 | A | ‡ | 4/1988 | Katayama | G06F 3/018 | 704/8 |
| 4,750,122 | A | ‡ | 6/1988 | Kaji | G06F 40/284 | 704/1 |
| 4,754,489 | A | ‡ | 6/1988 | Bokser | G06K 9/726 | 382/16 |
| 4,755,811 | A | ‡ | 7/1988 | Slavin | G01R 13/20 | 324/12 |
| 4,759,070 | A | ‡ | 7/1988 | Voroba | A61B 5/12 | 381/32 |
| 4,776,016 | A | ‡ | 10/1988 | Hansen | G06F 3/16 | 381/11 |

(56) References Cited

U.S. PATENT DOCUMENTS

| | | | | | | |
|---|---|---|---|---|---|---|
| 4,783,804 | A ‡ | 11/1988 | Juang | G10L 15/14 | 704/24 |
| 4,783,807 | A ‡ | 11/1988 | Marley | G10L 15/02 | 704/23 |
| 4,785,413 | A ‡ | 11/1988 | Atsumi | G06F 40/274 | 715/20 |
| 4,790,028 | A ‡ | 12/1988 | Ramage | G06F 3/04845 | 382/29 |
| 4,797,930 | A ‡ | 1/1989 | Goudie | G10L 13/10 | 704/26 |
| 4,802,223 | A ‡ | 1/1989 | Lin | G10L 19/0018 | 704/20 |
| 4,803,729 | A ‡ | 2/1989 | Baker | G10L 15/04 | 704/24 |
| 4,807,752 | A ‡ | 2/1989 | Chodorow | A61C 15/043 | 132/32 |
| 4,811,243 | A ‡ | 3/1989 | Racine | G06F 3/033 | 702/15 |
| 4,813,074 | A ‡ | 3/1989 | Marcus | G10L 15/04 | 704/23 |
| 4,819,271 | A ‡ | 4/1989 | Bahl | G10L 15/144 | 704/24 |
| 4,827,518 | A ‡ | 5/1989 | Feustel | H04M 3/382 | 704/24 |
| 4,827,520 | A ‡ | 5/1989 | Zeinstra | B60R 16/0373 | 701/1 |
| 4,829,576 | A ‡ | 5/1989 | Porter | G10L 15/00 | 704/23 |
| 4,829,583 | A ‡ | 5/1989 | Monroe | G06F 3/018 | 382/18 |
| 4,831,551 | A ‡ | 5/1989 | Schalk | G10L 15/12 | 704/23 |
| 4,833,712 | A ‡ | 5/1989 | Bahl | G10L 15/063 | 704/24 |
| 4,833,718 | A ‡ | 5/1989 | Sprague | G10L 13/07 | 704/21 |
| 4,837,798 | A ‡ | 6/1989 | Cohen | G06Q 10/107 | 379/88 |
| 4,837,831 | A ‡ | 6/1989 | Gillick | G10L 15/063 | 704/24 |
| 4,839,853 | A ‡ | 6/1989 | Deerwester | G06F 16/33 | |
| 4,852,168 | A ‡ | 7/1989 | Sprague | G10L 13/07 | 704/21 |
| 4,862,504 | A ‡ | 8/1989 | Nomura | G10L 13/08 | 704/26 |
| 4,875,187 | A ‡ | 10/1989 | Smith | G06T 11/206 | 345/44 |
| 4,878,230 | A ‡ | 10/1989 | Murakami | G06T 9/008 | 375/24 |
| 4,887,212 | A ‡ | 12/1989 | Zamora | G06F 40/205 | 704/8 |
| 4,896,359 | A ‡ | 1/1990 | Yamamoto | G10L 13/07 | 704/26 |
| 4,903,305 | A ‡ | 2/1990 | Gillick | G10L 15/063 | 704/24 |
| 4,905,163 | A ‡ | 2/1990 | Garber | G06F 16/217 | 706/55 |
| 4,908,867 | A ‡ | 3/1990 | Silverman | G10L 13/10 | 704/26 |
| 4,914,586 | A ‡ | 4/1990 | Swinehart | G06F 16/40 | |
| 4,914,590 | A ‡ | 4/1990 | Loatman | G06F 40/35 | 704/8 |
| 4,918,723 | A ‡ | 4/1990 | Iggulden | G07C 9/35 | 379/10 |
| 4,926,491 | A ‡ | 5/1990 | Maeda | G06K 9/6255 | 382/15 |
| 4,928,307 | A ‡ | 5/1990 | Lynn | H03G 7/005 | 379/38 |
| 4,931,783 | A ‡ | 6/1990 | Atkinson | G06F 3/0482 | 345/16 |
| 4,935,954 | A ‡ | 6/1990 | Thompson | H04L 51/24 | 379/88 |
| 4,939,639 | A ‡ | 7/1990 | Lee | G06F 40/274 | |
| 4,941,488 | A ‡ | 7/1990 | Marxer | A61C 15/04 | 132/32 |
| 4,944,013 | A ‡ | 7/1990 | Gouvianakis | G10L 19/10 | 704/21 |
| 4,945,504 | A ‡ | 7/1990 | Nakama | G06F 3/033 | 708/14 |
| 4,953,106 | A ‡ | 8/1990 | Gansner | G06T 11/206 | 345/44 |
| 4,955,047 | A ‡ | 9/1990 | Morganstein | H04M 3/527 | 379/19 |
| 4,965,763 | A ‡ | 10/1990 | Zamora | G06F 16/30 | 704/1 |
| 4,972,462 | A ‡ | 11/1990 | Shibata | H04M 3/5307 | 379/88 |
| 4,974,191 | A ‡ | 11/1990 | Amirghodsi | G06F 40/30 | 704/8 |
| 4,975,975 | A ‡ | 12/1990 | Filipski | G06K 9/6217 | 382/15 |
| 4,977,598 | A ‡ | 12/1990 | Doddington | G10L 15/14 | 704/25 |
| 4,980,916 | A ‡ | 12/1990 | Zinser | G10L 19/12 | 704/20 |
| 4,985,924 | A ‡ | 1/1991 | Matsuura | G10L 15/10 | 704/25 |
| 4,992,972 | A ‡ | 2/1991 | Brooks | G06F 9/453 | 715/70 |
| 4,994,966 | A ‡ | 2/1991 | Hutchins | G06F 40/253 | 704/9 |
| 4,994,983 | A ‡ | 2/1991 | Landell | G10L 15/063 | 704/24 |
| 5,001,774 | A ‡ | 3/1991 | Lee | H04R 3/00 | 455/15 |
| 5,003,577 | A ‡ | 3/1991 | Ertz | H04M 3/5307 | 370/42 |
| 5,007,095 | A ‡ | 4/1991 | Nara | G10L 13/08 | 704/26 |
| 5,007,098 | A ‡ | 4/1991 | Kumagai | G06K 9/481 | 382/18 |
| 5,010,574 | A ‡ | 4/1991 | Wang | G06T 9/008 | 704/22 |
| 5,016,002 | A ‡ | 5/1991 | Levanto | B41J 2/50 | 345/33 |
| 5,020,112 | A ‡ | 5/1991 | Chou | G06K 9/6885 | 382/22 |
| 5,021,971 | A ‡ | 6/1991 | Lindsay | G06T 9/008 | 375/24 |
| 5,022,081 | A ‡ | 6/1991 | Hirose | G06K 9/033 | 704/23 |
| 5,027,110 | A ‡ | 6/1991 | Chang | G06F 3/1423 | 345/66 |
| 5,027,406 | A ‡ | 6/1991 | Roberts | G10L 15/063 | 704/24 |
| 5,027,408 | A ‡ | 6/1991 | Kroeker | G10L 15/10 | 704/25 |
| 5,029,211 | A ‡ | 7/1991 | Ozawa | G10L 13/033 | 704/26 |
| 5,031,217 | A ‡ | 7/1991 | Nishimura | G10L 15/14 | 704/24 |
| 5,032,989 | A ‡ | 7/1991 | Tornetta | G06Q 10/087 | 705/31 |
| 5,033,087 | A ‡ | 7/1991 | Bahl | G10L 15/14 | 704/24 |
| 5,040,218 | A ‡ | 8/1991 | Vitale | G10L 13/08 | 704/26 |
| 5,046,099 | A ‡ | 9/1991 | Nishimura | G10L 15/07 | 704/22 |
| 5,047,614 | A ‡ | 9/1991 | Bianco | G06K 17/00 | 235/38 |
| 5,047,617 | A ‡ | 9/1991 | Shepard | G06K 7/10881 | 235/46 |
| 5,050,215 | A ‡ | 9/1991 | Nishimura | G10L 15/14 | 704/24 |
| 5,053,758 | A ‡ | 10/1991 | Cornett | G06F 3/04842 | 341/33 |

(56) References Cited

U.S. PATENT DOCUMENTS 5,054,084 A ‡ 10/1991 Tanaka .................... G10L 15/10 704/25
5,057,915 A ‡ 10/1991 Von Kohorn ........... A63F 13/12 463/9
5,062,143 A ‡ 10/1991 Schmitt ................. G06F 40/263 382/23
5,067,158 A ‡ 11/1991 Arjmand ................. G10L 19/08 704/21
5,067,503 A ‡ 11/1991 Stile ..................... A61C 15/046 132/32
5,072,452 A ‡ 12/1991 Brown .................... G10L 15/14 704/25
5,075,896 A ‡ 12/1991 Wilcox ................. G10L 15/187 382/22
5,079,723 A ‡ 1/1992 Herceg ................ G03G 15/502 345/17
5,083,119 A ‡ 1/1992 Trevett ..................... G09G 5/14 345/53
5,083,268 A ‡ 1/1992 Hemphill .............. G06F 40/253 706/11
5,086,792 A ‡ 2/1992 Chodorow ........... A61C 15/043 132/32
5,090,012 A ‡ 2/1992 Kajiyama ........... H04L 12/4135 370/44
5,091,790 A ‡ 2/1992 Silverberg ......... H04N 1/00204 358/40
5,091,945 A ‡ 2/1992 Kleijn ..................... G10L 19/12 704/21
5,103,498 A ‡ 4/1992 Lanier ...................... G06N 5/04 706/58
5,109,509 A ‡ 4/1992 Katayama ............... G06F 40/47 704/9
5,111,423 A ‡ 5/1992 Kopec, Jr. ........... G06F 12/0661 710/9
5,119,079 A ‡ 6/1992 Hube ................. G03G 15/5016 345/17
5,122,951 A ‡ 6/1992 Kamiya ................ G06F 40/253 704/9
5,123,103 A ‡ 6/1992 Ohtaki ...................... G06F 8/36
5,125,022 A ‡ 6/1992 Hunt ..................... H04M 3/382 379/88
5,125,030 A ‡ 6/1992 Nomura .................. G10L 19/06 704/22
5,127,043 A ‡ 6/1992 Hunt ....................... G06F 21/40 379/88
5,127,053 A ‡ 6/1992 Koch ...................... G10L 25/90 704/20
5,127,055 A ‡ 6/1992 Larkey .................. G10L 15/063 704/24
5,128,672 A ‡ 7/1992 Kaehler ................ G06F 3/0237 341/23
5,133,011 A ‡ 7/1992 McKiel, Jr. ......... G06F 3/04892 704/27
5,133,023 A ‡ 7/1992 Bokser ................... G06K 9/726 382/16
5,142,584 A ‡ 8/1992 Ozawa .................... G10L 19/10 704/21
5,144,875 A ‡ 9/1992 Nakada .................... G10G 1/00 84/471
5,148,541 A ‡ 9/1992 Lee ..................... G06F 16/9017
5,153,913 A ‡ 10/1992 Kandefer ................ G10L 13/07 704/26
5,157,610 A ‡ 10/1992 Asano ................... G07C 5/008 701/29
5,157,779 A ‡ 10/1992 Washburn ........... G06F 11/3414 714/37
5,161,102 A ‡ 11/1992 Griffin .................. G06F 9/4411 710/10
5,163,809 A ‡ 11/1992 Akgun .................. F01D 21/045 29/523
5,164,900 A ‡ 11/1992 Bernath .................. G06F 3/018 704/20
5,164,982 A ‡ 11/1992 Davis .................. H04M 1/6505 348/14
5,165,007 A ‡ 11/1992 Bahl ..................... G10L 15/142 704/24
5,167,004 A ‡ 11/1992 Netsch .................... G10L 17/02 704/20
5,175,536 A ‡ 12/1992 Aschliman ............ G06F 13/409 370/25
5,175,803 A ‡ 12/1992 Yeh ......................... G06F 40/53 715/23
5,175,814 A ‡ 12/1992 Anick ................. G06F 16/2428 715/83
5,179,627 A ‡ 1/1993 Sweet ................... H04M 3/533 379/75
5,179,652 A ‡ 1/1993 Rozmanith ............. H04L 29/06 715/74
5,194,950 A ‡ 3/1993 Murakami .............. G06T 9/008 375/24
5,195,034 A ‡ 3/1993 Garneau ............... G06F 40/126 704/8
5,195,167 A ‡ 3/1993 Bahl ..................... G10L 15/063 704/20
5,197,005 A ‡ 3/1993 Shwartz ............ G06F 16/24522
5,199,077 A ‡ 3/1993 Wilcox ................. G10L 15/142 704/24
5,201,034 A ‡ 4/1993 Matsuura ................ G07F 19/20 715/86
5,202,952 A ‡ 4/1993 Gillick .................... G10L 15/10 704/20
5,208,862 A ‡ 5/1993 Ozawa .................... G10L 19/12 704/21
5,210,689 A ‡ 5/1993 Baker ................... G06F 3/0489 704/1
5,212,638 A ‡ 5/1993 Bernath .................. G06F 3/018 341/28
5,212,821 A ‡ 5/1993 Gorin ....................... G06N 3/08 706/20
5,216,747 A ‡ 6/1993 Hardwick ............. G10L 19/087 704/20
5,218,700 A ‡ 6/1993 Beechick .................. G06F 7/24 712/30
5,220,629 A ‡ 6/1993 Kosaka ................... G10L 13/07 704/26
5,220,639 A ‡ 6/1993 Lee ....................... G10L 15/144 704/20
5,220,657 A ‡ 6/1993 Bly ..................... G06F 16/1774 711/15
5,222,146 A ‡ 6/1993 Bahl ....................... G10L 15/02 704/23
5,230,036 A ‡ 7/1993 Akamine .............. G10L 19/083 704/20
5,231,670 A ‡ 7/1993 Goldhor .................... G06F 3/16 704/27
5,235,680 A ‡ 8/1993 Bijnagte ................ G06Q 40/04
5,237,502 A ‡ 8/1993 White ..................... G06F 40/56 704/1
5,241,619 A ‡ 8/1993 Schwartz ................ G10L 15/08 704/20
5,252,951 A ‡ 10/1993 Tannenbaum .......... G06F 3/023 345/15
5,253,325 A ‡ 10/1993 Clark .................. H03M 7/3084 704/20
5,255,386 A ‡ 10/1993 Prager ..................... G06F 9/453
5,257,387 A ‡ 10/1993 Richek .................. G06F 15/177 713/60
5,260,697 A ‡ 11/1993 Barrett .................... G06F 3/038 345/17
5,266,931 A ‡ 11/1993 Tanaka .................. G06F 3/0383 178/18
5,266,949 A ‡ 11/1993 Rossi ................... H03K 17/968 200/31
5,267,345 A ‡ 11/1993 Brown .................. G10L 15/197 704/25
5,268,990 A ‡ 12/1993 Cohen .................... G09B 19/04 704/20

(56) References Cited

U.S. PATENT DOCUMENTS 5,274,771 A ‡ 12/1993 Hamilton .............. G06F 15/177 710/9
5,274,818 A ‡ 12/1993 Vasilevsky .............. G06F 8/441 717/14
5,276,616 A ‡ 1/1994 Kuga .................... G06F 16/313 704/10
5,276,794 A ‡ 1/1994 Lamb, Jr. ............ G06F 3/04883 345/17
5,278,980 A ‡ 1/1994 Pedersen ............. G06F 16/3325
5,282,265 A ‡ 1/1994 Rohra Suda .......... G06F 40/253 706/11
5,283,818 A ‡ 2/1994 Klausner ............... H04M 1/575 379/88
5,287,448 A ‡ 2/1994 Nicol ...................... G06F 9/453 715/70
5,289,562 A ‡ 2/1994 Mizuta .................. G10L 15/144 704/20
RE34,562 E ‡ 3/1994 Murakami .............. G06T 9/008 348/41
5,291,286 A ‡ 3/1994 Murakami .............. G06T 9/008 348/46
5,293,254 A ‡ 3/1994 Eschbach .................. G06T 5/20 358/3
5,293,448 A ‡ 3/1994 Honda .................... G10L 19/08 704/20
5,293,452 A ‡ 3/1994 Picone .................. G10L 15/142 704/25
5,296,642 A ‡ 3/1994 Konishi ............... G10H 1/0041 84/609
5,297,170 A ‡ 3/1994 Eyuboglu ........... H03M 7/3082 375/24
5,297,194 A ‡ 3/1994 Hunt ........................ G07C 9/37 379/88
5,299,125 A ‡ 3/1994 Baker ................... G06F 40/253 704/9
5,299,284 A ‡ 3/1994 Roy ..................... G06K 9/6281
5,301,109 A ‡ 4/1994 Landauer ................ G06F 16/33 704/9
5,303,406 A ‡ 4/1994 Hansen ................ H04B 1/1027 455/22
5,305,205 A ‡ 4/1994 Weber ................... G06F 40/247 715/23
5,305,421 A ‡ 4/1994 Li ....................... G10L 19/0018 704/21
5,305,768 A ‡ 4/1994 Gross ................... A61C 15/046 132/32
5,309,359 A ‡ 5/1994 Katz ................. G06F 16/24573
5,315,689 A ‡ 5/1994 Kanazawa .............. G10L 15/00 704/23
5,317,507 A ‡ 5/1994 Gallant ................. G06F 16/355 715/26
5,317,647 A ‡ 5/1994 Pagallo .................. G06K 9/726 382/16
5,325,297 A ‡ 6/1994 Bird ........................ G06F 16/40 715/20
5,325,298 A ‡ 6/1994 Gallant ................. G06F 16/355 704/9
5,325,462 A ‡ 6/1994 Farrett .................. G10L 13/033 704/25
5,326,270 A ‡ 7/1994 Ostby ...................... G09B 7/04 434/11
5,327,342 A ‡ 7/1994 Roy ...................... G06F 40/103 345/46
5,327,498 A ‡ 7/1994 Hamon ................... G10L 13/07 704/26
5,329,608 A ‡ 7/1994 Bocchieri ............ G10L 15/187 704/24
5,333,236 A ‡ 7/1994 Bahl ....................... G10L 19/06 704/25
5,333,266 A ‡ 7/1994 Boaz ..................... H04L 51/066 379/10
5,333,275 A ‡ 7/1994 Wheatley ................ G10L 15/18 704/23
5,335,011 A ‡ 8/1994 Addeo ..................... H04N 7/15 384/14
5,335,276 A ‡ 8/1994 Thompson .......... H04M 1/0245 379/35
5,341,293 A ‡ 8/1994 Vertelney .............. G06F 3/0481 715/23
5,341,466 A ‡ 8/1994 Perlin ................... G06T 3/0025 345/42
5,345,536 A ‡ 9/1994 Hoshimi ................. G10L 15/10 704/24
5,349,645 A ‡ 9/1994 Zhao ..................... G10L 15/142 704/24
5,353,374 A ‡ 10/1994 Wilson .................... G06T 9/004 704/21
5,353,376 A ‡ 10/1994 Oh .......................... G10L 15/20 379/88
5,353,377 A ‡ 10/1994 Kuroda .................. G09B 19/04 704/25
5,353,408 A ‡ 10/1994 Kato ................... G10L 21/0208 704/22
5,353,432 A ‡ 10/1994 Richek .................. G06F 9/4411 710/10
5,357,431 A ‡ 10/1994 Nakada ............. G06F 16/90344 715/20
5,367,640 A ‡ 11/1994 Hamilton .............. G06F 9/4411 710/10
5,369,575 A ‡ 11/1994 Lamberti .............. G06F 40/253 704/9
5,369,577 A ‡ 11/1994 Kadashevich ........ G06F 40/253 704/9
5,371,853 A ‡ 12/1994 Kao ........................ G10L 19/12 704/20
5,371,901 A ‡ 12/1994 Reed ..................... H04M 1/271 455/11
5,373,566 A ‡ 12/1994 Murdock ............... G06K 9/685 382/15
5,377,103 A ‡ 12/1994 Lamberti ............ G06F 16/3329 704/9
5,377,301 A ‡ 12/1994 Rosenberg ............ G10L 19/038 704/22
5,377,303 A ‡ 12/1994 Firman ................... G06F 3/038 704/25
5,384,671 A ‡ 1/1995 Fisher .................. G11B 5/5526 360/51
5,384,892 A ‡ 1/1995 Strong .................. G10L 15/193 704/24
5,384,893 A ‡ 1/1995 Hutchins ................. G10L 13/08 704/25
5,386,494 A ‡ 1/1995 White ...................... G06F 3/167 704/23
5,386,556 A ‡ 1/1995 Hedin ..................... G06F 40/58
5,390,236 A ‡ 2/1995 Klausner ............. H04M 1/2745 379/88
5,390,279 A ‡ 2/1995 Strong .................. G10L 15/193 704/20
5,390,281 A ‡ 2/1995 Luciw ..................... G06F 9/453 706/11
5,392,419 A ‡ 2/1995 Walton .................. G06F 40/263 358/1
5,396,625 A ‡ 3/1995 Parkes .................... G06T 9/008
5,400,434 A ‡ 3/1995 Pearson .................. G10L 13/06 704/26
5,404,295 A ‡ 4/1995 Katz ................. G06F 16/24573 715/23
5,406,305 A ‡ 4/1995 Shimomura ......... G09G 3/3406 345/10
5,408,060 A ‡ 4/1995 Muurinen ................ G05G 1/02 200/31
5,412,756 A ‡ 5/1995 Bauman ................. G06N 5/043 706/45
5,412,804 A ‡ 5/1995 Krishna ............ G06F 16/24544
5,412,806 A ‡ 5/1995 Du ...................... G06F 16/2471
5,418,951 A ‡ 5/1995 Damashek ............ G06F 40/263

(56) References Cited

U.S. PATENT DOCUMENTS 5,422,656 A ‡ 6/1995 Allard .................. G06F 1/1626 345/17
5,424,947 A ‡ 6/1995 Nagao .................. G06F 40/211 704/9
5,425,108 A ‡ 6/1995 Hwang .................... G06K 7/14 382/10
5,428,731 A ‡ 6/1995 Powers, III ........... G06F 16/748 715/20
5,434,777 A ‡ 7/1995 Luciw ..................... G06F 9/453 704/9
5,440,615 A ‡ 8/1995 Caccuro ................ H04M 3/533 379/20
5,442,598 A ‡ 8/1995 Haikawa .......... G11B 20/10527 369/30
5,442,780 A ‡ 8/1995 Takanashi ......... G06F 16/24522
5,444,823 A ‡ 8/1995 Nguyen ................. G06N 5/027 706/54
5,449,368 A ‡ 9/1995 Kuzmak .......... A61B 17/12013 604/90
5,450,523 A ‡ 9/1995 Zhao .............................. 704/24
5,455,888 A ‡ 10/1995 Iyengar ............... G10L 19/0204 704/20
5,457,768 A ‡ 10/1995 Tsuboi .................... G10L 15/18 704/21
5,459,488 A ‡ 10/1995 Geiser ................. H04M 1/2477 345/17
5,463,696 A ‡ 10/1995 Beernink ........... G06K 9/00429 382/18
5,463,725 A ‡ 10/1995 Henckel ................ G06F 3/0483 715/77
5,465,401 A ‡ 11/1995 Thompson ........... H04B 1/3816 379/35
5,469,529 A ‡ 11/1995 Bimbot ................... G10L 17/06 704/23
5,471,611 A ‡ 11/1995 McGregor ........ G06F 16/24522
5,473,728 A ‡ 12/1995 Luginbuhl ............ G10L 15/144 704/24
5,475,587 A ‡ 12/1995 Anick ................... G06F 40/253 704/9
5,475,796 A ‡ 12/1995 Iwata ...................... G10L 13/10 704/25
5,477,447 A ‡ 12/1995 Luciw ..................... G06F 9/453 704/9
5,477,448 A ‡ 12/1995 Golding ................ G06F 40/253 704/9
5,477,451 A ‡ 12/1995 Brown .................... G06F 40/55 704/9
5,479,488 A ‡ 12/1995 Lennig ................ H04M 3/4931 379/21
5,481,739 A ‡ 1/1996 Staats ..................... G06T 9/008 712/22
5,483,261 A ‡ 1/1996 Yasutake ............... G06F 3/0425 178/18
5,485,372 A ‡ 1/1996 Golding ................ G06F 40/232 704/9
5,485,543 A ‡ 1/1996 Aso ........................ G10L 13/02 704/21
5,488,204 A ‡ 1/1996 Mead ...................... G06F 3/041 178/18
5,488,727 A ‡ 1/1996 Agrawal ............... G06F 9/4491 717/15
5,490,234 A ‡ 2/1996 Narayan ................. G10L 13/07 704/26
5,491,758 A ‡ 2/1996 Bellegarda ........... G06K 9/6293 382/18
5,491,772 A ‡ 2/1996 Hardwick ............. G10L 19/005 704/22
5,493,677 A ‡ 2/1996 Balogh .................. G06Q 30/04 382/30
5,495,604 A ‡ 2/1996 Harding .............. G06F 16/2423 707/69
5,497,319 A ‡ 3/1996 Chong .................... G06F 40/55 704/2
5,500,903 A ‡ 3/1996 Gulli ....................... G01S 3/805 381/92
5,500,905 A ‡ 3/1996 Martin ..................... G06K 9/32 382/15
5,500,937 A ‡ 3/1996 Thompson-Rohrlich .................... G06F 3/04883 345/17
5,502,774 A ‡ 3/1996 Bellegarda ........... G06K 9/6293 382/11
5,502,790 A ‡ 3/1996 Yi ......................... G10L 15/144 704/25
5,502,791 A ‡ 3/1996 Nishimura ............ G10L 15/142 704/25
5,515,475 A ‡ 5/1996 Gupta ..................... G10L 15/08 704/24
5,521,816 A ‡ 5/1996 Roche ................... G06F 40/232 704/9
5,524,140 A ‡ 6/1996 Klausner ............. H04M 1/6505 379/88
5,530,861 A ‡ 6/1996 Diamant ............. G06F 9/45512 705/7
5,533,182 A ‡ 7/1996 Bates .................. G06F 3/04812 715/72
5,535,121 A ‡ 7/1996 Roche ................... G06F 40/253 704/9
5,536,902 A ‡ 7/1996 Serra ...................... G10H 3/125 84/623
5,537,317 A ‡ 7/1996 Schabes ................ G06F 40/253 704/9
5,537,618 A ‡ 7/1996 Boulton ................. G09B 5/065 434/11
5,537,647 A ‡ 7/1996 Hermansky ......... G10L 21/0208 704/20
5,543,588 A ‡ 8/1996 Bisset ................... G06F 1/1626 178/18
5,543,897 A ‡ 8/1996 Altrieth, III ....... G03G 15/5016 399/81
5,544,264 A ‡ 8/1996 Bellegarda ........... G06K 9/6293 382/18
5,548,507 A ‡ 8/1996 Martino ................ G06F 40/263 704/1
5,555,343 A ‡ 9/1996 Luther ...................... G06F 3/16 704/25
5,555,344 A ‡ 9/1996 Zunkler .................. G10L 15/12 704/23
5,559,301 A ‡ 9/1996 Bryan, Jr. ............ G10H 1/0008 345/17
5,559,945 A ‡ 9/1996 Beaudet ................ G06F 3/0482 715/84
5,564,446 A ‡ 10/1996 Wiltshire ............... A45D 44/18 132/30
5,565,888 A ‡ 10/1996 Selker ................. G06F 3/04895 715/82
5,568,536 A ‡ 10/1996 Tiller ................ H04M 1/72527 379/10
5,568,540 A ‡ 10/1996 Greco .................. H04M 1/575 379/88
5,570,324 A ‡ 10/1996 Geil .......................... G01S 3/28 367/11
5,572,576 A ‡ 11/1996 Klausner ............. H04M 1/2745 379/88
5,574,823 A ‡ 11/1996 Hassanein ............... G10L 19/02 704/20
5,574,824 A ‡ 11/1996 Slyh .................... G10L 21/0208 704/22
5,577,135 A ‡ 11/1996 Grajski .............. G06K 9/00422 382/18
5,577,164 A ‡ 11/1996 Kaneko ................... G10L 15/22 704/25
5,577,241 A ‡ 11/1996 Spencer ................ G06F 16/334
5,578,808 A ‡ 11/1996 Taylor .................. G06Q 20/363 235/38
5,579,037 A ‡ 11/1996 Tahara .................. G06F 3/0488 345/17

(56) References Cited

U.S. PATENT DOCUMENTS 5,579,436 A ‡ 11/1996 Chou .................... G10L 15/063 704/23
5,581,484 A ‡ 12/1996 Prince .................... G06F 3/014 340/40
5,581,652 A ‡ 12/1996 Abe .................... G10L 21/038 704/22
5,581,655 A ‡ 12/1996 Cohen .................... G09B 19/04 704/24
5,583,993 A ‡ 12/1996 Foster .................... G06F 3/1454 709/20
5,584,024 A ‡ 12/1996 Shwartz .............. G06F 16/2423
5,586,540 A ‡ 12/1996 Marzec .................... F02B 33/40 125/55
5,594,641 A ‡ 1/1997 Kaplan .............. G06F 16/3334
5,596,260 A ‡ 1/1997 Moravec .............. G01R 31/367 320/13
5,596,676 A ‡ 1/1997 Swaminathan ....... G10L 19/012 704/20
5,596,994 A ‡ 1/1997 Bro .................... G06F 19/3456 600/54
5,608,624 A ‡ 3/1997 Luciw .................... G06F 9/453 715/21
5,608,698 A ‡ 3/1997 Yamanoi ................ G11B 19/00 369/47
5,608,841 A ‡ 3/1997 Tsuboka ............... G06K 9/6226 704/23
5,610,812 A ‡ 3/1997 Schabes ................ G06F 40/253 704/9
5,613,036 A ‡ 3/1997 Strong .................. G10L 15/193 704/24
5,613,122 A ‡ 3/1997 Burnard .................. G06F 9/454 713/1
5,615,378 A ‡ 3/1997 Nishino ................ G06F 40/247 704/4
5,615,384 A ‡ 3/1997 Allard .................. G06F 3/0481 715/80
5,616,876 A ‡ 4/1997 Cluts ........................ G09B 5/14 84/609
5,617,386 A ‡ 4/1997 Choi ...................... G10H 1/363 369/12
5,617,507 A ‡ 4/1997 Lee ......................... G10L 13/04 704/20
5,617,539 A ‡ 4/1997 Ludwig .................. G06Q 10/10 348/14
5,619,583 A ‡ 4/1997 Page .................... H04R 23/008 381/17
5,619,694 A ‡ 4/1997 Shimazu ........... G06F 16/24573 725/14
5,621,859 A ‡ 4/1997 Schwartz .............. G10L 15/142 704/25
5,621,903 A ‡ 4/1997 Luciw ..................... G06F 9/453 715/70
5,627,939 A ‡ 5/1997 Huang .................. G10L 15/144 704/22
5,634,084 A ‡ 5/1997 Malsheen ............... G10L 13/08 704/26
5,636,325 A ‡ 6/1997 Farrett .................... G10L 13/10 704/23
5,638,425 A ‡ 6/1997 Meador, III ............ G10L 15/30 379/88
5,638,489 A ‡ 6/1997 Tsuboka ............... G06K 9/6226 704/25
5,638,523 A ‡ 6/1997 Mullet .................. G06F 3/0481 715/85
5,640,487 A ‡ 6/1997 Lau ...................... G10L 15/197 704/24
5,642,464 A ‡ 6/1997 Yue ...................... G10L 19/012 704/21
5,642,466 A ‡ 6/1997 Narayan ................. G10L 13/10 704/20
5,642,519 A ‡ 6/1997 Martin ................ G10L 15/1822 704/25
5,644,656 A ‡ 7/1997 Akra .................... G06K 9/6202 382/19
5,644,727 A ‡ 7/1997 Atkins ................. G06Q 20/102 705/40
5,644,735 A ‡ 7/1997 Luciw ..................... G06F 9/453 715/70
5,649,060 A ‡ 7/1997 Ellozy .................. G11B 27/028 704/27
5,652,828 A ‡ 7/1997 Silverman ............... G10L 13/10 704/25
5,652,884 A ‡ 7/1997 Palevich ................. G06F 9/454 713/1
5,652,897 A ‡ 7/1997 Linebarger .......... G10L 15/1822 704/1
5,661,787 A ‡ 8/1997 Pocock ................ H04N 21/812 379/10
5,664,055 A ‡ 9/1997 Kroon ................... G10L 19/083 704/22
5,664,206 A ‡ 9/1997 Murow ................... G06F 40/55 704/8
5,670,985 A ‡ 9/1997 Cappels, Sr. ....... G06F 3/04897 345/20
5,675,704 A ‡ 10/1997 Juang ...................... G10L 17/00 704/24
5,675,819 A ‡ 10/1997 Schuetze ............... G06F 40/253 704/10
5,678,039 A ‡ 10/1997 Hinks ..................... G06F 9/454
5,678,053 A ‡ 10/1997 Anderson ............ G06F 40/253 704/1
5,682,475 A ‡ 10/1997 Johnson ................... G07C 9/33 726/18
5,682,539 A ‡ 10/1997 Conrad ................... G06F 40/40 704/9
5,684,513 A ‡ 11/1997 Decker ............... F21V 33/0052 341/22
5,687,077 A ‡ 11/1997 Gough, Jr. ........... G06B 13/042 700/29
5,689,287 A ‡ 11/1997 Mackinlay ............ G06T 3/0025 345/42
5,689,616 A ‡ 11/1997 Li ........................ G10L 15/005 704/23
5,689,618 A ‡ 11/1997 Gasper .................. G06T 13/205 345/47
5,692,205 A ‡ 11/1997 Berry .................... G06F 3/0481 715/20
5,696,962 A ‡ 12/1997 Kupiec ............... G06F 16/3338
5,697,793 A ‡ 12/1997 Huffman ............ G06F 15/0283 434/15
5,699,082 A ‡ 12/1997 Marks ..................... G06F 3/038 345/15
5,701,400 A ‡ 12/1997 Amado .................... G06N 5/02 706/45
5,706,442 A ‡ 1/1998 Anderson ............... G06F 3/023 705/35
5,708,659 A ‡ 1/1998 Rostoker ............... G06F 13/128
5,708,822 A ‡ 1/1998 Wical .................... G06F 40/253 704/1
5,710,886 A ‡ 1/1998 Christensen ......... G06Q 20/387 705/14
5,710,922 A ‡ 1/1998 Alley ........................ G06F 9/52
5,712,949 A ‡ 1/1998 Kato .................... G11B 7/0037 386/31
5,712,957 A ‡ 1/1998 Waibel ..................... G06K 9/03 704/24
5,715,468 A ‡ 2/1998 Budzinski ............... G06F 16/36 704/9
5,717,877 A ‡ 2/1998 Orton .................... G06F 3/0481 715/83
5,721,827 A ‡ 2/1998 Logan .................... G06Q 30/04 709/21
5,721,949 A ‡ 2/1998 Smith ................... G06F 3/0626 710/5
5,724,406 A ‡ 3/1998 Juster .................... H04M 3/533 379/20
5,724,985 A ‡ 3/1998 Snell ........................ A61N 1/08 600/51

(56) References Cited

U.S. PATENT DOCUMENTS 5,726,672 A ‡ 3/1998 Hernandez .......... G06F 3/04897 345/22
5,727,950 A ‡ 3/1998 Cook ..................... G09B 19/06 434/35
5,729,694 A ‡ 3/1998 Holzrichter .......... G06Q 20/204 704/27
5,729,704 A ‡ 3/1998 Stone ...................... G06T 11/00 345/61
5,732,216 A ‡ 3/1998 Logan .................... H04H 60/46 704/20
5,732,390 A ‡ 3/1998 Katayanagi ............. G10L 25/78 704/22
5,732,395 A ‡ 3/1998 Alexander Silverman ................. G10L 13/10 704/25
5,734,750 A ‡ 3/1998 Arai ..................... G06K 9/4604 382/18
5,734,791 A ‡ 3/1998 Acero ................... G10L 19/038 704/20
5,736,974 A ‡ 4/1998 Selker ................. G06F 3/04895 715/86
5,737,487 A ‡ 4/1998 Bellegarda ............ G10L 15/065 704/23
5,737,609 A ‡ 4/1998 Reed ......................... G06F 8/78
5,737,734 A ‡ 4/1998 Schultz ................... G06F 16/40
5,739,451 A ‡ 4/1998 Winksy .................... G10H 1/00 84/609
5,740,143 A ‡ 4/1998 Suetomi ................... G11B 7/09 369/47
5,742,705 A ‡ 4/1998 Parthasarathy ...... G06K 9/6857 382/18
5,742,736 A ‡ 4/1998 Haddock ........... H04M 3/53333 379/88
5,745,116 A ‡ 4/1998 Pisutha-Arnond .......................... G06F 3/04883 715/86
5,745,843 A ‡ 4/1998 Wetters ..................... H03L 7/23 332/12
5,745,873 A ‡ 4/1998 Braida .................... G10L 15/00 704/20
5,748,512 A ‡ 5/1998 Vargas .................. G06F 3/0237 345/17
5,748,974 A ‡ 5/1998 Johnson .................. G06F 3/038 704/9
5,749,071 A ‡ 5/1998 Silverman ............... G10L 13/10 704/25
5,749,081 A ‡ 5/1998 Whiteis .................. G06Q 30/02
5,751,906 A ‡ 5/1998 Silverman ............... G10L 13/10 704/25
5,757,358 A ‡ 5/1998 Osga ................... G06F 3/04842 345/15
5,757,979 A ‡ 5/1998 Hongo ..................... G06K 9/42 382/27
5,758,024 A ‡ 5/1998 Alleva .................. G06F 40/279 704/25
5,758,079 A ‡ 5/1998 Ludwig .................. G06Q 10/10
5,758,083 A ‡ 5/1998 Singh .................... H04L 41/042 370/22
5,758,314 A ‡ 5/1998 McKenna ............... G06F 16/10 704/8
5,758,318 A ‡ 5/1998 Kojima ................... G10L 15/22 704/25
5,759,101 A ‡ 6/1998 Von Kohorn ........... A63F 13/12 463/40
5,761,640 A ‡ 6/1998 Kalyanswamy ........ G10L 13/08 704/26
5,761,687 A ‡ 6/1998 Hon ...................... G06F 40/232 715/27
5,764,852 A ‡ 6/1998 Williams ................ G10L 25/78 704/24
5,765,131 A ‡ 6/1998 Stentiford ............... G06F 40/45 704/27
5,765,168 A ‡ 6/1998 Burrows ............... G06F 16/319
5,771,276 A ‡ 6/1998 Wolf ..................... H04M 3/493 379/76
5,774,834 A ‡ 6/1998 Visser ................... G06F 40/232 704/10
5,774,855 A ‡ 6/1998 Foti ......................... G10L 13/07 704/21
5,774,859 A ‡ 6/1998 Houser .............. H04N 5/44543
5,777,614 A ‡ 7/1998 Ando .................... G06F 3/0481 715/72
5,778,405 A ‡ 7/1998 Ogawa .................. G06F 16/322 715/25
5,790,978 A ‡ 8/1998 Olive ...................... G10L 13/08 704/20
5,794,050 A ‡ 8/1998 Dahlgren ............ G06F 16/3338 717/14
5,794,182 A ‡ 8/1998 Manduchi ............ G10L 19/125 704/21
5,794,207 A ‡ 8/1998 Walker ................... G06Q 10/02 705/77
5,794,237 A ‡ 8/1998 Gore, Jr. ............. G06F 11/2273 707/68
5,797,008 A ‡ 8/1998 Burrows ............... G06F 16/328
5,799,268 A ‡ 8/1998 Boguraev ............ G06F 40/289 704/9
5,799,269 A ‡ 8/1998 Schabes ................ G06F 40/253 704/9
5,799,276 A ‡ 8/1998 Komissarchik ......... G10L 15/04 704/20
5,799,279 A ‡ 8/1998 Gould ..................... G10L 15/26 704/27
5,801,692 A ‡ 9/1998 Muzio ................. G06F 3/04895 715/76
5,802,466 A ‡ 9/1998 Gallant ................... H04W 4/12 340/7
5,802,526 A ‡ 9/1998 Fawcett .................. G06F 3/167 348/14
5,806,021 A ‡ 9/1998 Chen ..................... G06F 40/284 704/9
5,812,697 A ‡ 9/1998 Sakai ................. G06K 9/00429 382/18
5,812,698 A ‡ 9/1998 Platt ................... G06K 9/00879 382/18
5,815,142 A ‡ 9/1998 Allard ............... H04M 1/72583 345/17
5,815,225 A ‡ 9/1998 Nelson .................. G06F 1/1637 349/1
5,818,142 A ‡ 10/1998 Edleblute ................. H02K 5/04 310/23
5,818,451 A ‡ 10/1998 Bertram .............. G06F 3/04886 715/84
5,818,924 A ‡ 10/1998 King ................... H04M 1/0202 379/43
5,822,288 A ‡ 10/1998 Shinada ................. G11B 19/00 369/47
5,822,720 A ‡ 10/1998 Bookman ............. G09B 5/065 704/3
5,822,730 A ‡ 10/1998 Roth ....................... G10L 15/08 704/25
5,822,743 A ‡ 10/1998 Gupta ...................... G06N 5/04 706/50
5,825,349 A ‡ 10/1998 Meier ................. G06F 3/04812 345/68
5,825,352 A ‡ 10/1998 Bisset ..................... G06F 3/044 345/17
5,825,881 A ‡ 10/1998 Colvin, Sr. ............ G06Q 20/02 705/78
5,826,261 A ‡ 10/1998 Spencer ................ G06F 16/313
5,828,768 A ‡ 10/1998 Eatwell ................. G06F 1/1616 381/33
5,828,999 A ‡ 10/1998 Bellegarda ............ G06K 9/726 704/24
5,832,433 A ‡ 11/1998 Yashchin ............ H04M 3/4931 704/26
5,832,435 A ‡ 11/1998 Silverman ............... G10L 13/10 704/26

(56) References Cited

U.S. PATENT DOCUMENTS 5,833,134 A ‡ 11/1998 Ho .................... G05D 23/1905 236/49
5,835,077 A ‡ 11/1998 Dao ........................ G01C 9/00 345/15
5,835,079 A ‡ 11/1998 Shieh .................... G06F 3/0488 345/17
5,835,721 A ‡ 11/1998 Donahue ................. H04L 29/06 709/22
5,835,732 A ‡ 11/1998 Kikinis ................. G06F 1/1626 710/30
5,835,893 A ‡ 11/1998 Ushioda .................. G10L 15/18 704/25
5,839,106 A ‡ 11/1998 Bellegarda .......... G10L 15/1815 704/25
5,841,902 A ‡ 11/1998 Tu .......................... G06K 9/222 382/18
5,842,165 A ‡ 11/1998 Raman .................. G10L 15/065 704/25
5,845,255 A ‡ 12/1998 Mayaud ............. G06F 19/3456 705/3
5,848,410 A ‡ 12/1998 Walls .................... G06F 16/954
5,850,480 A ‡ 12/1998 Scanlon ................. G06K 9/723 382/22
5,850,629 A ‡ 12/1998 Holm ....................... G06F 3/16 704/26
5,852,801 A ‡ 12/1998 Hon ....................... G10L 15/22 704/24
5,854,893 A ‡ 12/1998 Ludwig .................. G06Q 10/10 709/20
5,855,000 A ‡ 12/1998 Waibel ..................... G06K 9/03 704/23
5,857,184 A ‡ 1/1999 Lynch ..................... G06F 16/38
5,859,636 A ‡ 1/1999 Pandit .................. G06F 40/103 715/20
5,860,063 A ‡ 1/1999 Gorin .................. G10L 15/1815 704/24
5,860,064 A ‡ 1/1999 Henton ................. G10L 13/033 204/26
5,860,075 A ‡ 1/1999 Hashizume ......... G06F 16/5846 715/21
5,862,223 A ‡ 1/1999 Walker ............. G06Q 10/06311 705/50
5,862,233 A ‡ 1/1999 Poletti .................... G10K 15/08 381/61
5,864,806 A ‡ 1/1999 Mokbel ............... G10L 21/0208 704/23
5,864,815 A ‡ 1/1999 Rozak ..................... G06F 3/167 704/27
5,864,844 A ‡ 1/1999 James ...................... G09B 5/06 434/16
5,864,855 A ‡ 1/1999 Ruocco ................. G06F 16/355
5,864,868 A ‡ 1/1999 Contois ................. G07F 17/305
5,867,799 A ‡ 2/1999 Lang ..................... G06F 16/337
5,870,710 A ‡ 2/1999 Ozawa .................... G06F 3/162 704/50
5,873,056 A ‡ 2/1999 Liddy ................... G06F 16/313 704/9
5,873,064 A ‡ 2/1999 De Armas ................. G06F 3/16 704/27
5,875,427 A ‡ 2/1999 Yamazaki .............. G10L 21/06 704/25
5,875,429 A ‡ 2/1999 Douglas .................... G06F 3/16 704/27
5,875,437 A ‡ 2/1999 Atkins ................. G06Q 20/102 705/40
5,876,396 A ‡ 3/1999 Lo ............................ A61J 1/10 604/41
5,877,751 A ‡ 3/1999 Kanemitsu ......... G01C 21/3611 340/43
5,877,757 A ‡ 3/1999 Baldwin ............. G06F 16/9558 715/70
5,878,393 A ‡ 3/1999 Hata ....................... G10L 13/07 704/26
5,878,394 A ‡ 3/1999 Muhling ................... H03J 9/06 455/15
5,878,396 A ‡ 3/1999 Henton ................... G10L 15/24
5,880,411 A ‡ 3/1999 Gillespie ............. G06F 3/03547 178/18
5,880,731 A ‡ 3/1999 Liles ..................... G06F 3/0481 345/47
5,884,039 A ‡ 3/1999 Ludwig .................. G06Q 10/10
5,884,323 A ‡ 3/1999 Hawkins ................. G06F 16/20
5,890,117 A ‡ 3/1999 Silverman ............... G10L 13/10 704/25
5,890,122 A ‡ 3/1999 Van Kleeck ............ G10L 15/26 704/27
5,891,180 A ‡ 4/1999 Greeninger ........ A61N 1/37258 607/32
5,893,126 A ‡ 4/1999 Drews ................... G06F 3/0481 715/20
5,893,132 A ‡ 4/1999 Huffman ............. G06F 15/0283 434/16
5,895,448 A ‡ 4/1999 Vysotsky .............. G10L 15/065 704/27
5,895,464 A ‡ 4/1999 Bhandari ................ G06F 16/40 704/9
5,895,466 A ‡ 4/1999 Goldberg ............ G06F 16/3329
5,896,321 A ‡ 4/1999 Miller ................. G06F 3/04886 365/18
5,896,500 A ‡ 4/1999 Ludwig .................. G06Q 10/10 348/E07
5,899,972 A ‡ 5/1999 Miyazawa .............. G10L 15/22 704/24
5,905,498 A ‡ 5/1999 Diament ................. G06F 3/033 715/85
5,907,597 A ‡ 5/1999 Mark ...................... H04M 1/66 379/93
5,909,666 A ‡ 6/1999 Gould .................... G09B 19/04 704/25
5,912,951 A ‡ 6/1999 Checchio .............. H04M 3/533 379/67
5,912,952 A ‡ 6/1999 Brendzel ............... H04M 3/493 379/93
5,913,185 A ‡ 6/1999 Martino ................ G06F 40/216 704/8
5,913,193 A ‡ 6/1999 Huang .................... G10L 13/07 704/25
5,915,001 A ‡ 6/1999 Uppaluru ............ H04M 3/4938 379/88
5,915,236 A ‡ 6/1999 Gould ................... G10L 15/285 704/25
5,915,238 A ‡ 6/1999 Tjaden ................. G10H 1/0033 704/25
5,915,249 A ‡ 6/1999 Spencer ................ G06F 16/313 707/74
5,917,487 A ‡ 6/1999 Ulrich ................... G06F 3/0481 715/76
5,918,303 A ‡ 6/1999 Yamaura .................. G10H 1/24 434/30
5,920,327 A ‡ 7/1999 Seidensticker, Jr. ..... G09G 3/20 345/50
5,920,836 A ‡ 7/1999 Gould ..................... G10L 15/18 704/25
5,920,837 A ‡ 7/1999 Gould .................... G09B 19/04 704/25
5,923,757 A ‡ 7/1999 Hocker ................ G06F 1/3259 345/15
5,924,068 A ‡ 7/1999 Richard .................. G10L 13/00 345/90
5,926,769 A ‡ 7/1999 Valimaa .............. H04M 1/2748 455/56
5,926,789 A ‡ 7/1999 Barbara .................. G10L 15/22 704/27
5,930,408 A ‡ 7/1999 Seto ....................... G06K 15/02 382/30
5,930,751 A ‡ 7/1999 Cohrs ..................... G10L 15/22 704/23

(56) References Cited

U.S. PATENT DOCUMENTS 5,930,754 A ‡ 7/1999 Karaali .................. G10L 13/08 704/23
5,930,769 A ‡ 7/1999 Rose ..................... G06Q 30/06 345/41
5,930,783 A ‡ 7/1999 Li ......................... G06F 16/58
5,933,477 A ‡ 8/1999 Wu ...................... H04M 3/533 379/20
5,933,806 A ‡ 8/1999 Beyerlein .............. G10L 15/08 704/23
5,933,822 A ‡ 8/1999 Braden-Harder .......................... G06F 16/3344
5,936,926 A ‡ 8/1999 Yokouchi .............. G11B 19/02 369/47
5,937,163 A ‡ 8/1999 Lee ...................... G06F 16/951 709/21
5,940,811 A ‡ 8/1999 Norris ................... G06Q 20/10 705/35
5,940,841 A ‡ 8/1999 Schmuck ........... G06F 11/1435
5,941,944 A ‡ 8/1999 Messerly ............... G06F 16/10 709/20
5,943,043 A ‡ 8/1999 Furuhata ................ G06F 3/045 345/17
5,943,049 A ‡ 8/1999 Matsubara ............. G06T 11/00 715/71
5,943,052 A ‡ 8/1999 Allen .................. G06F 3/04855 345/17
5,943,429 A ‡ 8/1999 Handel .................. G10L 21/02 381/94
5,943,443 A ‡ 8/1999 Itonori .................... G06K 9/72 358/40
5,943,670 A ‡ 8/1999 Prager .................... G06F 16/35
5,946,647 A ‡ 8/1999 Miller .................. G06F 40/289 704/9
5,946,648 A ‡ 8/1999 Halstead, Jr. ......... G06F 40/253 704/9
5,948,040 A ‡ 9/1999 DeLorme ............... G01C 21/36 340/99
5,949,961 A ‡ 9/1999 Sharman ................ G10L 13/08 704/25
5,950,123 A ‡ 9/1999 Schwelb .......... H04M 1/72552 340/4
5,952,992 A ‡ 9/1999 Helms ..................... G09G 3/36 345/10
5,953,541 A ‡ 9/1999 King ..................... G06F 3/0238 710/67
5,956,021 A ‡ 9/1999 Kubota .............. G06F 3/04886 345/17
5,956,699 A ‡ 9/1999 Wong .................... G06Q 20/06 235/38
5,960,385 A ‡ 9/1999 Skiena ................. G06F 40/253 704/9
5,960,394 A ‡ 9/1999 Gould .................... G10L 15/18 704/27
5,960,422 A ‡ 9/1999 Prasad ................. G06F 16/951
5,963,208 A ‡ 10/1999 Dolan .................. G06F 16/748 715/76
5,963,924 A ‡ 10/1999 Williams ............... G06Q 20/00 705/40
5,963,964 A ‡ 10/1999 Nielsen .............. G06F 16/9558 715/25
5,966,126 A ‡ 10/1999 Szabo ................ G06F 16/2428 715/76
5,970,446 A ‡ 10/1999 Goldberg ............... G10L 15/20 704/23
5,970,474 A ‡ 10/1999 LeRoy ................ G06Q 20/208 700/23
5,973,612 A ‡ 10/1999 Deo ..................... G06F 3/0485 340/7
5,973,676 A ‡ 10/1999 Kawakura .......... G06F 3/04847 345/17
5,974,146 A ‡ 10/1999 Randle .................. G06Q 20/04 705/40
5,977,950 A ‡ 11/1999 Rhyne .................. G06F 1/1626 345/15
5,982,352 A ‡ 11/1999 Pryor ....................... G01S 5/16 345/15
5,982,370 A ‡ 11/1999 Kamper ............... G06F 3/0481 715/76
5,982,891 A ‡ 11/1999 Ginter .................... G06F 21/10 348/E05
5,982,902 A ‡ 11/1999 Terano ................... H04S 1/002 381/11
5,983,179 A ‡ 11/1999 Gould ................... G09B 19/04 704/27
5,983,184 A ‡ 11/1999 Noguchi ............. G09B 21/006 704/27
5,983,216 A ‡ 11/1999 Kirsch ................... G06F 16/30
5,987,132 A ‡ 11/1999 Rowney ............ G06Q 30/0611 705/26
5,987,140 A ‡ 11/1999 Rowney ................ G06Q 20/00 380/28
5,987,401 A ‡ 11/1999 Trudeau ................. G06F 40/58 704/2
5,987,404 A ‡ 11/1999 Della Pietra ........... G06F 40/58 704/9
5,987,440 A ‡ 11/1999 O'Neil .................. G06Q 10/10 705/39
5,990,887 A ‡ 11/1999 Redpath ................. H04L 29/06 709/20
5,991,441 A ‡ 11/1999 Jourjine ............ G06K 9/00416 382/18
5,995,460 A ‡ 11/1999 Takagi ................. G11B 7/0946 369/47
5,995,590 A ‡ 11/1999 Brunet ............... H04M 1/2475 340/4
5,995,918 A ‡ 11/1999 Kendall ............... G06F 40/279 704/1
5,998,972 A ‡ 12/1999 Gong ................... H02J 7/0077 320/13
5,999,169 A ‡ 12/1999 Lee .................... G06F 3/03543 345/16
5,999,895 A ‡ 12/1999 Forest .................. G06F 3/0236 382/18
5,999,908 A ‡ 12/1999 Abelow ............ G06Q 10/0639 705/7
5,999,927 A ‡ 12/1999 Tukey .................. G06F 16/353
6,005,495 A ‡ 12/1999 Connolly ............. G06F 3/0237 341/22
6,006,274 A ‡ 12/1999 Hawkins .............. G06F 1/1626 709/24
6,009,237 A ‡ 12/1999 Hirabayashi ....... G11B 20/1251 386/20
6,011,585 A ‡ 1/2000 Anderson ............. H04N 5/232 345/65
6,014,428 A ‡ 1/2000 Wolf .................... H04M 3/493 379/88
6,016,471 A ‡ 1/2000 Kuhn ..................... G10L 13/08 704/26
6,017,219 A ‡ 1/2000 Adams, Jr. .............. G09B 7/04 434/17
6,018,705 A ‡ 1/2000 Gaudet ................ A61B 5/1121 235/10
6,018,711 A ‡ 1/2000 French-St. George ..................... G10L 15/22 455/23
6,020,881 A ‡ 2/2000 Naughton .............. H04L 29/06 715/74
6,023,536 A ‡ 2/2000 Visser ..................... G06K 9/72 382/22
6,023,676 A ‡ 2/2000 Erell ...................... G10L 15/12 704/24
6,023,684 A ‡ 2/2000 Pearson ................ G06Q 20/00 705/36
6,024,288 A ‡ 2/2000 Gottlich ................ G06K 17/00 235/38
6,026,345 A ‡ 2/2000 Shah ................. G01C 21/3446 340/99

(56) References Cited

U.S. PATENT DOCUMENTS 6,026,375 A ‡ 2/2000 Hall ........................ G06Q 10/08 701/53
6,026,388 A ‡ 2/2000 Liddy ................. G06F 16/3329
6,026,393 A ‡ 2/2000 Gupta ................. G06F 11/2257
6,029,132 A ‡ 2/2000 Kuhn ...................... G10L 13/08 704/25
6,029,135 A ‡ 2/2000 Krasle ...................... G06F 3/16 704/27
6,035,267 A ‡ 3/2000 Watanabe .............. G06F 40/30 704/1
6,035,303 A ‡ 3/2000 Baer ..................... G06F 16/289
6,035,336 A ‡ 3/2000 Lu .......................... H04H 20/82 709/22
6,038,533 A ‡ 3/2000 Buchsbaum .......... G10L 13/027 704/25
6,040,824 A ‡ 3/2000 Maekawa .......... G01C 21/3614 345/17
6,041,023 A ‡ 3/2000 Lakhansingh ....... G11B 27/002 369/2
6,047,255 A ‡ 4/2000 Williamson ............ G10L 13/04 704/21
6,047,300 A ‡ 4/2000 Walfish ................ G06F 40/232 715/25
6,052,654 A ‡ 4/2000 Gaudet ................ A61B 5/1121 324/16
6,052,656 A ‡ 4/2000 Suda ..................... G06F 40/253 704/9
6,054,990 A ‡ 4/2000 Tran ...................... G06F 3/0481 345/17
6,055,514 A ‡ 4/2000 Wren ..................... G06Q 10/10 705/26
6,055,531 A ‡ 4/2000 Bennett ................. G06F 16/685
6,061,646 A ‡ 5/2000 Martino ................ G06F 40/263 704/3
6,064,767 A ‡ 5/2000 Muir .................... G06K 9/6821 382/17
6,064,951 A ‡ 5/2000 Park .................... G06F 16/3337 704/8
6,064,959 A ‡ 5/2000 Young ..................... G10L 15/22 704/25
6,064,960 A ‡ 5/2000 Bellegarda ............. G10L 13/10 704/26
6,064,963 A ‡ 5/2000 Gainsboro ............. G10L 15/26 379/88
6,067,519 A ‡ 5/2000 Lowry .................... G10L 13/07 704/26
6,069,648 A ‡ 5/2000 Suso ................... H04M 1/0218 348/14
6,070,138 A ‡ 5/2000 Iwata ................... G06Q 10/107 704/26
6,070,139 A ‡ 5/2000 Miyazawa ........... G10L 15/065 704/27
6,070,140 A ‡ 5/2000 Tran ...................... G06F 1/3203 704/27
6,070,147 A ‡ 5/2000 Harms ................... G06Q 30/02 705/14
6,073,033 A ‡ 6/2000 Campo ................... H04M 1/05 348/14
6,073,036 A ‡ 6/2000 Heikkinen ........ H04M 1/72519 455/55
6,073,091 A ‡ 6/2000 Kanevsky ............ G10L 15/197 704/25
6,073,097 A ‡ 6/2000 Gould .................... G09B 19/04 704/25
6,076,051 A ‡ 6/2000 Messerly ................ G06F 40/30 704/9
6,076,060 A ‡ 6/2000 Lin ......................... G10L 13/08 704/25
6,076,088 A ‡ 6/2000 Paik ...................... G06F 16/367
6,078,885 A ‡ 6/2000 Beutnagel ............. G10L 15/063 704/23
6,078,914 A ‡ 6/2000 Redfern ................ G06F 16/951
6,081,750 A ‡ 6/2000 Hoffberg ................... G06F 3/00 700/17
6,081,774 A ‡ 6/2000 de Hita ............... G06F 16/3338 704/9
6,081,780 A ‡ 6/2000 Lumelsky ............... G10L 13/08 704/26
6,085,204 A ‡ 7/2000 Chijiwa ............. G06F 15/0283 715/24
6,088,671 A ‡ 7/2000 Gould ...................... G10L 15/26 704/23
6,088,731 A ‡ 7/2000 Kiraly ................... G06F 16/951 709/22
6,092,036 A ‡ 7/2000 Hamann ................. G06F 9/454 704/8
6,092,038 A ‡ 7/2000 Kanevsky ............... H03M 7/30 704/25
6,092,043 A ‡ 7/2000 Squires .................. G09B 19/04 704/25
6,094,649 A ‡ 7/2000 Bowen .................. G06F 16/951 707/71
6,097,391 A ‡ 8/2000 Wilcox ................. G06F 3/0483 715/77
6,101,468 A ‡ 8/2000 Gould ..................... G10L 15/22 704/25
6,101,470 A ‡ 8/2000 Eide ........................ G10L 13/10 704/26
6,105,865 A ‡ 8/2000 Hardesty ................ G06Q 20/04 235/38
6,108,627 A ‡ 8/2000 Sabourin ............... G10L 15/187 704/10
6,108,640 A ‡ 8/2000 Slotznick ............... G06Q 30/06 705/7
6,111,562 A ‡ 8/2000 Downs .................. G06F 3/0481 715/72
6,111,572 A ‡ 8/2000 Blair ....................... G06F 9/454 715/70
6,115,686 A ‡ 9/2000 Chung .................... G10L 13/08 704/26
6,116,907 A ‡ 9/2000 Baker .................. G09B 21/009 434/15
6,119,101 A ‡ 9/2000 Peckover ............... G06Q 30/02 705/14
6,121,960 A ‡ 9/2000 Carroll .................. G06F 1/1626 345/16
6,122,340 A ‡ 9/2000 Darley .................... G01P 15/08 377/23
6,122,614 A ‡ 9/2000 Kahn .................... G10L 15/063 704/23
6,122,616 A ‡ 9/2000 Henton ................... G10L 13/02 704/25
6,122,647 A ‡ 9/2000 Horowitz ............. G06F 16/954 715/20
6,125,284 A ‡ 9/2000 Moore .................... G10L 15/02 455/55
6,125,346 A ‡ 9/2000 Nishimura ............. G10L 13/07 704/23
6,125,356 A ‡ 9/2000 Brockman ............. G06Q 20/10 705/26
6,129,582 A ‡ 10/2000 Wilhite .................. H01R 13/66 439/50
6,138,098 A ‡ 10/2000 Shieber ................. G06F 40/211 704/25
6,138,158 A ‡ 10/2000 Boyle ..................... H04L 67/02 709/20
6,141,642 A ‡ 10/2000 Oh .......................... G10L 13/08 704/26
6,141,644 A ‡ 10/2000 Kuhn ...................... G10L 17/02 704/23
6,144,377 A ‡ 11/2000 Oppermann ............ G06F 9/451 715/74
6,144,380 A ‡ 11/2000 Shwarts ................ G06F 3/0483 345/17
6,144,938 A ‡ 11/2000 Surace .................. G10L 13/033 704/25
6,144,939 A ‡ 11/2000 Pearson .................. G10L 13/07 704/20

(56) References Cited

U.S. PATENT DOCUMENTS

| | | | | | |
|---|---|---|---|---|---|
| 6,151,401 | A ‡ | 11/2000 | Annaratone | G06F 1/1616 | 361/67 |
| 6,154,551 | A ‡ | 11/2000 | Frenkel | H04R 23/008 | 381/16 |
| 6,154,720 | A ‡ | 11/2000 | Onishi | G06F 40/47 | 704/2 |
| 6,157,935 | A ‡ | 12/2000 | Tran | G06F 3/04883 | 382/18 |
| 6,161,084 | A ‡ | 12/2000 | Messerly | G06F 40/284 | 704/9 |
| 6,161,087 | A ‡ | 12/2000 | Wightman | G10L 15/26 | 704/21 |
| 6,161,944 | A ‡ | 12/2000 | Leman | G06F 1/1616 | 345/16 |
| 6,163,769 | A ‡ | 12/2000 | Acero | G10L 13/07 | 704/24 |
| 6,163,809 | A ‡ | 12/2000 | Buckley | H04L 51/30 | 709/20 |
| 6,167,369 | A ‡ | 12/2000 | Schulze | G06F 40/284 | 704/9 |
| 6,169,538 | B1 ‡ | 1/2001 | Nowlan | G06F 3/0488 | 341/22 |
| 6,172,948 | B1 ‡ | 1/2001 | Keller | G11B 17/22 | 369/83 |
| 6,173,194 | B1 ‡ | 1/2001 | Vanttila | G06F 1/1626 | 379/43 |
| 6,173,251 | B1 ‡ | 1/2001 | Ito | G06F 16/30 | 704/7 |
| 6,173,261 | B1 ‡ | 1/2001 | Arai | G10L 15/063 | 704/25 |
| 6,173,263 | B1 ‡ | 1/2001 | Conkie | G10L 13/07 | 704/26 |
| 6,173,279 | B1 ‡ | 1/2001 | Levin | H04M 3/4931 | 704/9 |
| 6,177,905 | B1 ‡ | 1/2001 | Welch | G01S 19/14 | 342/35 |
| 6,177,931 | B1 ‡ | 1/2001 | Alexander | G06Q 30/0269 | 348/56 |
| 6,179,432 | B1 ‡ | 1/2001 | Zhang | G06F 3/0202 | 362/84 |
| 6,182,028 | B1 ‡ | 1/2001 | Karaali | G10L 15/18 | 704/10 |
| 6,182,099 | B1 ‡ | 1/2001 | Nakasato | G06F 40/232 | 715/23 |
| 6,185,533 | B1 ‡ | 2/2001 | Holm | G10L 13/10 | 704/21 |
| 6,188,391 | B1 ‡ | 2/2001 | Seely | G06F 3/044 | 178/18 |
| 6,188,967 | B1 ‡ | 2/2001 | Kurtzberg | G06F 3/16 | 702/84 |
| 6,188,999 | B1 ‡ | 2/2001 | Moody | G06F 8/30 | 706/11 |
| 6,191,939 | B1 ‡ | 2/2001 | Burnett | G06F 1/1616 | 361/67 |
| 6,192,253 | B1 ‡ | 2/2001 | Charlier | H04B 1/385 | 455/34 |
| 6,192,340 | B1 ‡ | 2/2001 | Abecassis | G10H 1/0058 | 455/18 |
| 6,195,641 | B1 ‡ | 2/2001 | Loring | G10L 15/30 | 704/27 |
| 6,199,076 | B1 ‡ | 3/2001 | Logan | G06Q 30/06 | 715/20 |
| 6,205,456 | B1 ‡ | 3/2001 | Nakao | G06F 16/345 | 715/20 |
| 6,208,044 | B1 ‡ | 3/2001 | Viswanadham | G06K 7/0047 | 310/12 |
| 6,208,932 | B1 ‡ | 3/2001 | Ohmura | G08G 1/0962 | 701/53 |
| 6,208,956 | B1 ‡ | 3/2001 | Motoyama | G06F 40/58 | 704/2 |
| 6,208,964 | B1 ‡ | 3/2001 | Sabourin | G10L 15/063 | 704/23 |
| 6,208,967 | B1 ‡ | 3/2001 | Pauws | G10L 15/04 | 704/25 |
| 6,208,971 | B1 ‡ | 3/2001 | Bellegarda | G10L 15/1822 | 704/27 |
| 6,212,564 | B1 ‡ | 4/2001 | Harter | G06F 9/451 | 709/22 |
| 6,216,102 | B1 ‡ | 4/2001 | Martino | G06F 40/216 | 704/9 |
| 6,216,131 | B1 ‡ | 4/2001 | Liu | G06F 16/258 | |
| 6,217,183 | B1 ‡ | 4/2001 | Shipman | G06F 3/0202 | 200/31 |
| 6,222,347 | B1 ‡ | 4/2001 | Gong | G06F 1/263 | 320/13 |
| 6,226,403 | B1 ‡ | 5/2001 | Parthasarathy | G06K 9/4604 | 345/17 |
| 6,226,533 | B1 ‡ | 5/2001 | Akahane | H04M 1/7255 | 455/18 |
| 6,226,614 | B1 ‡ | 5/2001 | Mizuno | G10L 13/033 | 704/25 |
| 6,226,655 | B1 ‡ | 5/2001 | Borman | H04L 29/06 | 715/20 |
| 6,230,322 | B1 ‡ | 5/2001 | Saib | H04N 5/44513 | 348/43 |
| 6,232,539 | B1 ‡ | 5/2001 | Looney | G10H 1/0041 | 434/30 |
| 6,232,966 | B1 ‡ | 5/2001 | Kurlander | G06T 11/60 | 715/76 |
| 6,233,545 | B1 ‡ | 5/2001 | Datig | G06N 3/004 | 704/2 |
| 6,233,547 | B1 ‡ | 5/2001 | Denber | G06F 16/90332 | 704/9 |
| 6,233,559 | B1 ‡ | 5/2001 | Balakrishnan | G06F 9/451 | 704/27 |
| 6,233,578 | B1 ‡ | 5/2001 | Machihara | G06F 16/25 | |
| 6,237,025 | B1 ‡ | 5/2001 | Ludwig | G06Q 10/10 | 709/20 |
| 6,240,303 | B1 ‡ | 5/2001 | Katzur | H04M 1/271 | 379/88 |
| 6,243,681 | B1 ‡ | 6/2001 | Guji | G10L 13/08 | 455/41 |
| 6,246,981 | B1 ‡ | 6/2001 | Papineni | G10L 15/22 | 704/23 |
| 6,248,946 | B1 ‡ | 6/2001 | Dwek | G10H 1/0058 | 84/609 |
| 6,249,606 | B1 ‡ | 6/2001 | Kiraly | G06F 3/04883 | 345/15 |
| 6,259,436 | B1 ‡ | 7/2001 | Moon | G06F 3/0488 | 345/17 |
| 6,259,826 | B1 ‡ | 7/2001 | Pollard | H04N 1/047 | 382/28 |
| 6,260,011 | B1 ‡ | 7/2001 | Heckerman | G09B 5/062 | 704/23 |
| 6,260,013 | B1 ‡ | 7/2001 | Sejnoha | G10L 15/063 | 704/24 |
| 6,260,016 | B1 ‡ | 7/2001 | Holm | G10L 13/10 | 704/20 |
| 6,260,024 | B1 ‡ | 7/2001 | Shkedy | G06Q 10/087 | 705/23 |
| 6,266,098 | B1 ‡ | 7/2001 | Cove | H04N 5/44513 | 348/56 |
| 6,266,637 | B1 ‡ | 7/2001 | Donovan | G10L 13/06 | 704/25 |
| 6,268,859 | B1 ‡ | 7/2001 | Andresen | G06T 15/40 | 345/42 |
| 6,269,712 | B1 ‡ | 8/2001 | Zentmyer | F16D 41/064 | 746/50 |
| 6,271,835 | B1 ‡ | 8/2001 | Hoeksma | G06F 3/0236 | 345/16 |
| 6,272,456 | B1 ‡ | 8/2001 | de Campos | G06F 40/263 | 704/8 |
| 6,272,464 | B1 ‡ | 8/2001 | Kiraz | G10L 13/08 | 704/23 |
| 6,275,795 | B1 ‡ | 8/2001 | Tzirkel-Hancock | G10L 15/02 | 704/21 |
| 6,275,824 | B1 ‡ | 8/2001 | O'Flaherty | G06F 21/6227 | |

(56) References Cited

U.S. PATENT DOCUMENTS 6,278,443 B1 ‡ 8/2001 Amro ..................... G06F 3/038 178/18
6,278,970 B1 ‡ 8/2001 Milner ................... G10L 15/02 704/20
6,282,507 B1 ‡ 8/2001 Horiguchi ............ G06F 40/211 704/3
6,282,511 B1 ‡ 8/2001 Mayer ................ H04M 3/4938 704/27
6,285,785 B1 ‡ 9/2001 Bellegarda .............. G06K 9/00 382/18
6,285,786 B1 ‡ 9/2001 Seni .................. G06K 9/00879 382/18
6,289,085 B1 ‡ 9/2001 Miyashita ............ G10L 13/033 379/67
6,289,124 B1 ‡ 9/2001 Okamoto .............. G06K 9/222 382/18
6,289,301 B1 ‡ 9/2001 Higginbotham ........ G06F 40/10 704/1
6,289,353 B1 ‡ 9/2001 Hazlehurst .......... G06F 16/3332
6,292,772 B1 ‡ 9/2001 Kantrowitz ........... G06F 40/263 704/9
6,292,778 B1 ‡ 9/2001 Sukkar ................... G10L 15/08 704/24
6,295,390 B1 ‡ 9/2001 Kobayashi ............ H04N 1/028 382/31
6,295,541 B1 ‡ 9/2001 Bodnar ................ G06F 16/275
6,297,818 B1 ‡ 10/2001 Ulrich .................. G06F 3/0481 715/20
6,298,314 B1 ‡ 10/2001 Blackadar ........... A61B 5/1121 235/10
6,298,321 B1 ‡ 10/2001 Karlov ................... H03M 7/30 701/1
6,300,947 B1 ‡ 10/2001 Kanevsky ........... G06F 16/9577 715/86
6,304,844 B1 ‡ 10/2001 Pan ....................... G10L 15/02 704/23
6,304,846 B1 ‡ 10/2001 George ................ G10L 13/033 704/20
6,307,548 B1 ‡ 10/2001 Flinchem ............. G06F 3/0237 715/81
6,308,149 B1 ‡ 10/2001 Gaussier .............. G06F 40/268 704/9
6,310,610 B1 ‡ 10/2001 Beaton ................. G06F 3/0488 345/17
6,311,152 B1 ‡ 10/2001 Bai ...................... G06F 40/289 704/9
6,311,157 B1 ‡ 10/2001 Strong ................ G10L 15/1822 704/25
6,311,189 B1 ‡ 10/2001 deVries ................ G06F 16/951
6,317,237 B1 ‡ 11/2001 Nakao ..................... G01H 9/00 398/13
6,317,594 B1 ‡ 11/2001 Gossman .......... H04M 3/42127 455/41
6,317,707 B1 ‡ 11/2001 Bangalore ............ G06F 40/284 704/9
6,317,831 B1 ‡ 11/2001 King ................... H04L 63/0428 713/17
6,321,092 B1 ‡ 11/2001 Fitch ........................ G01S 5/12 455/45
6,321,179 B1 ‡ 11/2001 Glance .................. G06Q 30/02 702/18
6,323,846 B1 ‡ 11/2001 Westerman ............ G06F 3/044 345/17
6,324,499 B1 ‡ 11/2001 Lewis .................... G10L 15/26 704/23
6,324,502 B1 ‡ 11/2001 Handel ............... G10L 21/0208 704/22
6,324,512 B1 ‡ 11/2001 Junqua ............... H04N 5/44543
6,324,514 B2 ‡ 11/2001 Matulich ................ G10L 15/26 704/27
6,330,538 B1 ‡ 12/2001 Breen .................... G10L 13/08 704/26
6,331,867 B1 ‡ 12/2001 Eberhard ............. G06F 3/0485 715/86
6,332,175 B1 ‡ 12/2001 Birrell ............. G11B 20/10527 369/30
6,334,103 B1 ‡ 12/2001 Surace ................... G10L 15/22 704/25
6,335,722 B1 ‡ 1/2002 Tani .................. G05B 23/0216 345/17
6,336,365 B1 ‡ 1/2002 Blackadar .......... G01P 15/0922 73/514
6,336,727 B1 ‡ 1/2002 Kim ..................... G06F 1/1616 345/16
6,340,937 B1 ‡ 1/2002 Stepita-Klauco ....... G06F 9/454 341/23
6,341,316 B1 ‡ 1/2002 Kloba .................... H04L 29/06 709/24
6,343,267 B1 ‡ 1/2002 Kuhn .................. G06K 9/6247 704/22
6,345,240 B1 ‡ 2/2002 Havens ................ G06F 9/5027 703/21
6,345,250 B1 ‡ 2/2002 Martin ............... H04M 3/4936 379/88
6,351,522 B1 ‡ 2/2002 Vitikainen ........... H04M 3/533 379/67
6,351,762 B1 ‡ 2/2002 Ludwig ................. G06Q 10/10
6,353,442 B1 ‡ 3/2002 Masui .................. G06F 3/0482 345/68
6,353,794 B1 ‡ 3/2002 Davis ..................... G01C 21/00 340/99
6,356,287 B1 ‡ 3/2002 Ruberry ............... G06F 1/1656 715/86
6,356,854 B1 ‡ 3/2002 Schubert ........... G06K 9/00362 356/45
6,356,864 B1 ‡ 3/2002 Foltz ...................... G06F 40/30 704/1
6,356,905 B1 ‡ 3/2002 Gershman .......... G06Q 30/0633 709/21
6,357,147 B1 ‡ 3/2002 Darley .................... G01P 1/023 36/132
6,359,572 B1 ‡ 3/2002 Vale ..................... G06F 3/0237 341/23
6,359,970 B1 ‡ 3/2002 Burgess .................. H04L 47/10 379/14
6,360,227 B1 ‡ 3/2002 Aggarwal ............ G06F 16/954
6,360,237 B1 ‡ 3/2002 Schulz ................. G06F 40/166 715/25
6,363,348 B1 ‡ 3/2002 Besling ............... G06K 9/6217 704/25
6,366,883 B1 ‡ 4/2002 Campbell .............. G10L 13/07 704/25
6,366,884 B1 ‡ 4/2002 Bellegarda ............. G10L 13/10 704/26
6,374,217 B1 ‡ 4/2002 Bellegarda .......... G10L 15/1815 704/24
6,374,226 B1 ‡ 4/2002 Hunt ...................... G10L 15/26 704/27
6,377,530 B1 ‡ 4/2002 Burrows ............. G11B 31/003 369/30
6,377,925 B1 ‡ 4/2002 Greene, Jr. ............ G10L 21/06 379/52
6,377,928 B1 ‡ 4/2002 Saxena ..................... G06F 3/16 704/27
6,381,593 B1 ‡ 4/2002 Yano .................... G06F 16/951
6,385,586 B1 ‡ 5/2002 Dietz ...................... G10L 15/26 704/27
6,385,662 B1 ‡ 5/2002 Moon ..................... G06F 9/542 719/31
6,389,114 B1 ‡ 5/2002 Dowens .............. H04L 12/1813 379/10
6,397,183 B1 ‡ 5/2002 Baba ......................... G06F 3/16 704/25
6,397,186 B1 ‡ 5/2002 Bush ....................... G06F 3/167 704/27
6,400,806 B1 ‡ 6/2002 Uppaluru ............ H04M 3/4938 379/88

(56) References Cited

U.S. PATENT DOCUMENTS 6,400,996 B1 ‡ 6/2002 Hoffberg ............ G05B 19/0426 370/21
6,401,065 B1 ‡ 6/2002 Kanevsky ............ G06F 3/0238 704/25
6,401,085 B1 ‡ 6/2002 Gershman ............. G06Q 50/22
6,405,169 B1 ‡ 6/2002 Kondo .................... G10L 13/08 704/25
6,405,238 B1 ‡ 6/2002 Votipka ................. G06F 16/954 709/20
6,408,272 B1 ‡ 6/2002 White ..................... G10L 15/30 704/27
6,411,924 B1 ‡ 6/2002 de Hita ................. G06F 40/211 704/9
6,411,932 B1 ‡ 6/2002 Molnar .................. G09B 19/04 704/25
6,415,250 B1 ‡ 7/2002 van den Akker ..... G06F 40/216 704/9
6,417,873 B1 ‡ 7/2002 Fletcher .............. G06F 16/9577 715/85
6,421,305 B1 ‡ 7/2002 Gioscia .................. G11B 23/36 345/15
6,421,672 B1 ‡ 7/2002 McAllister ............ G06F 16/632
6,421,707 B1 ‡ 7/2002 Miller ..................... H04L 29/06 709/20
6,424,944 B1 ‡ 7/2002 Hikawa ................... G10L 13/08 704/25
6,430,531 B1 ‡ 8/2002 Polish ..................... G10L 15/22 704/25
6,430,551 B1 ‡ 8/2002 Thelen ................... G09B 19/06
6,434,522 B1 ‡ 8/2002 Tsuboka ................ G10L 15/144 704/22
6,434,524 B1 ‡ 8/2002 Weber ..................... H04L 29/06 704/25
6,434,529 B1 ‡ 8/2002 Walker ................ G10L 15/1822 704/27
6,434,604 B1 ‡ 8/2002 Harada ............... H04L 12/1827 709/20
6,437,818 B1 ‡ 8/2002 Ludwig .................. G06Q 10/10 348/14
6,438,523 B1 ‡ 8/2002 Oberteuffer ............. G06F 3/038 704/27
6,442,518 B1 ‡ 8/2002 Van Thong ............. G10L 15/26 704/23
6,442,523 B1 ‡ 8/2002 Siegel .................... G09B 5/065 704/27
6,446,076 B1 ‡ 9/2002 Burkey ................... G06F 9/451 704/27
6,448,485 B1 ‡ 9/2002 Barile .................. G10H 1/0041 84/477
6,448,986 B1 ‡ 9/2002 Smith ................... G06F 3/0481 715/79
6,449,620 B1 ‡ 9/2002 Draper .................. G06F 16/258
6,453,281 B1 ‡ 9/2002 Walters ................. G06F 3/0481 704/20
6,453,292 B2 ‡ 9/2002 Ramaswamy .......... G10L 15/22 704/23
6,453,312 B1 ‡ 9/2002 Goiffon ............... G06F 16/3323
6,453,315 B1 ‡ 9/2002 Weissman ........... G06F 16/3338
6,456,616 B1 ‡ 9/2002 Rantanen ................ H04M 3/42 370/35
6,456,972 B1 ‡ 9/2002 Gladstein .............. G10L 15/222 704/25
6,460,015 B1 ‡ 10/2002 Hetherington ........ G06F 40/129 704/8
6,460,029 B1 ‡ 10/2002 Fries ................... G06F 16/3329
6,462,778 B1 ‡ 10/2002 Abram ............... H04N 1/00323 348/23
6,463,128 B1 ‡ 10/2002 Elwin ................. H04M 1/6016 379/52
6,463,413 B1 ‡ 10/2002 Applebaum ............ G10L 15/06 704/24
6,466,654 B1 ‡ 10/2002 Cooper ................... G10L 13/00 379/88
6,467,924 B2 ‡ 10/2002 Shipman ............... G06F 3/0202 200/31
6,469,712 B1 ‡ 10/2002 Hilpert, Jr. .............. G06F 3/012 715/72
6,469,722 B1 ‡ 10/2002 Kinoe .................. G06F 3/0481 715/80
6,469,732 B1 ‡ 10/2002 Chang ..................... G10L 25/78 348/14
6,470,347 B1 ‡ 10/2002 Gillam .............. G06F 16/90344
6,473,630 B1 ‡ 10/2002 Baranowski ........... H04B 1/385 455/57
6,473,754 B1 ‡ 10/2002 Matsubayashi ......... G06F 16/30
6,477,488 B1 ‡ 11/2002 Bellegarda ............ G10L 15/197 704/9
6,477,494 B2 ‡ 11/2002 Hyde-Thomson ...... G10L 13/08 379/88
6,487,533 B2 ‡ 11/2002 Hyde-Thomson ...... G10L 13/08 379/88
6,487,534 B1 ‡ 11/2002 Thelen .................... G10L 15/30 704/27
6,487,663 B1 ‡ 11/2002 Jaisimha ................. G06F 21/10 713/19
6,489,951 B1 ‡ 12/2002 Wong .................. G06F 3/04886 345/17
6,490,547 B1 ‡ 12/2002 Atkin ...................... G06F 40/58 704/8
6,490,560 B1 ‡ 12/2002 Ramaswamy .......... G10L 17/10 704/23
6,493,006 B1 ‡ 12/2002 Gourdol ................ G06F 3/0482 715/81
6,493,428 B1 ‡ 12/2002 Hillier ................... H04M 1/271 379/14
6,493,652 B1 ‡ 12/2002 Ohlenbusch ......... A61B 5/1038 324/16
6,493,667 B1 ‡ 12/2002 de Souza .............. G10L 15/144 704/24
6,499,013 B1 ‡ 12/2002 Weber ................... G10L 15/265 704/25
6,499,014 B1 ‡ 12/2002 Chihara .................. G10L 13/10 704/26
6,499,016 B1 ‡ 12/2002 Anderson .......... H04N 1/00127 704/27
6,501,937 B1 ‡ 12/2002 Ho .......................... G09B 5/00 434/11
6,502,194 B1 ‡ 12/2002 Berman ............ G06Q 30/0601 370/23
6,505,158 B1 ‡ 1/2003 Conkie ................... G10L 13/07 704/26
6,505,175 B1 ‡ 1/2003 Silverman .............. G06Q 40/00 705/35
6,505,183 B1 ‡ 1/2003 Loofbourrow ........ G06F 16/972 706/45
6,507,829 B1 ‡ 1/2003 Richards ............... G06F 16/353 706/45
6,510,406 B1 ‡ 1/2003 Marchisio ............. G06F 40/268 704/9
6,510,412 B1 ‡ 1/2003 Sasai .................. G06F 15/0225 704/25
6,510,417 B1 ‡ 1/2003 Woods ................ H04M 3/4938 379/88
6,513,006 B2 ‡ 1/2003 Howard ............. G10L 15/1822
6,513,008 B2 ‡ 1/2003 Pearson ................ G10L 13/033 704/26
6,513,063 B1 ‡ 1/2003 Julia ....................... G06F 9/465 709/21
6,519,565 B1 ‡ 2/2003 Clements ................ G10L 17/00 704/25
6,519,566 B1 ‡ 2/2003 Boyer ................. G06F 3/04892 704/27
6,523,026 B1 ‡ 2/2003 Gillis .................. G06F 16/3332
6,523,061 B1 ‡ 2/2003 Halverson .............. G06F 9/465 709/20
6,523,172 B1 ‡ 2/2003 Martinez-Guerra .... G06F 8/427 704/9

(56) References Cited

U.S. PATENT DOCUMENTS 6,526,351 B2 ‡ 2/2003 Whitham ............. G01C 21/343 701/43
6,526,382 B1 ‡ 2/2003 Yuschik ................ G10L 15/065 704/25
6,526,395 B1 ‡ 2/2003 Morris ................... G06N 3/004 706/15
6,529,592 B1 ‡ 3/2003 Khan ...................... H04L 12/14 379/10
6,529,608 B2 ‡ 3/2003 Gersabeck .......... B60R 16/0373 371/11
6,532,444 B1 ‡ 3/2003 Weber ..................... G10L 15/19 704/25
6,532,446 B1 ‡ 3/2003 King ....................... G10L 15/22 704/23
6,535,610 B1 ‡ 3/2003 Stewart ................. G06F 1/1605 381/92
6,535,852 B2 ‡ 3/2003 Eide ........................ G10L 13/02 704/26
6,535,983 B1 ‡ 3/2003 McCormack ........... G06F 1/266 370/41
6,536,139 B2 ‡ 3/2003 Darley .................... G01P 1/023 36/132
6,538,665 B2 ‡ 3/2003 Crow ...................... G06F 3/048 715/72
6,542,171 B1 ‡ 4/2003 Satou ................. A63B 24/0003 463/30
6,542,584 B1 ‡ 4/2003 Sherwood ............. H04M 3/533 379/21
6,542,868 B1 ‡ 4/2003 Badt ....................... G10L 13/00 704/27
6,546,262 B1 ‡ 4/2003 Freadman ........... H04M 1/6041 455/55
6,546,367 B2 ‡ 4/2003 Otsuka .................... G10L 13/10 704/26
6,546,388 B1 ‡ 4/2003 Edlund ................. G06F 16/951
6,549,497 B2 ‡ 4/2003 Miyamoto ......... G11B 27/3027 369/47
6,553,343 B1 ‡ 4/2003 Kagoshima ............. G10L 13/07 704/26
6,553,344 B2 ‡ 4/2003 Bellegarda ............. G10L 13/10 704/26
6,556,971 B1 ‡ 4/2003 Rigsby .................. G06F 3/0481 33/286
6,556,983 B1 ‡ 4/2003 Altschuler ........... G06K 9/6296 706/55
6,560,903 B1 ‡ 5/2003 Darley ................. A63B 3/0031 24/712
6,563,769 B1 ‡ 5/2003 Van Der Meulen ... G06Q 30/06 369/30
6,564,186 B1 ‡ 5/2003 Kiraly .................. G09B 21/006 704/26
6,567,549 B1 ‡ 5/2003 Marianetti, II ..... G06F 3/04883 382/18
6,570,557 B1 ‡ 5/2003 Westerman ......... G06F 3/04883 341/22
6,570,596 B2 ‡ 5/2003 Frederiksen .......... G06F 3/0362 345/15
6,582,342 B2 ‡ 6/2003 Kaufman ........... A63B 71/0622 482/1
6,583,806 B2 ‡ 6/2003 Ludwig .................. G06Q 10/10 348/14
6,584,464 B1 ‡ 6/2003 Warthen .............. G06F 16/3334
6,587,403 B1 ‡ 7/2003 Keller .................... G11B 17/22 369/30
6,587,404 B1 ‡ 7/2003 Keller .................... G11B 17/22 369/30
6,590,303 B1 ‡ 7/2003 Austin ................. H01H 25/008 200/51
6,591,379 B1 ‡ 7/2003 LeVine ............... G06F 11/0715 714/15
6,594,673 B1 ‡ 7/2003 Smith ................... G06F 16/954
6,594,688 B2 ‡ 7/2003 Ludwig .................. G06Q 10/10 370/28
6,597,345 B2 ‡ 7/2003 Hirshberg ............. G06F 3/0234 341/22
6,598,021 B1 ‡ 7/2003 Shambaugh .......... G10L 15/005 379/88
6,598,022 B2 ‡ 7/2003 Yuschik ................ G10L 15/065 704/27
6,598,039 B1 ‡ 7/2003 Livowsky ........... G06F 16/3338
6,598,054 B2 ‡ 7/2003 Schuetze ............... G06F 16/358
6,601,026 B2 ‡ 7/2003 Appelt ................ G06F 16/3338 704/9
6,601,234 B1 ‡ 7/2003 Bowman-Amuah ........................ G06Q 10/06375 717/10
6,603,837 B1 ‡ 8/2003 Kesanupalli .......... H04M 3/533 379/26
6,604,059 B2 ‡ 8/2003 Strubbe ................ G06Q 10/109 700/29
6,606,101 B1 ‡ 8/2003 Malamud ............ G06F 3/04812 715/71
6,606,388 B1 ‡ 8/2003 Townsend .............. G10H 1/125 381/1
6,606,632 B1 ‡ 8/2003 Saulpaugh ............ G06F 16/289
6,611,789 B1 ‡ 8/2003 Darley ................. A61B 5/1038 702/14
6,615,172 B1 ‡ 9/2003 Bennett ............. G06F 16/24522 704/25
6,615,175 B1 ‡ 9/2003 Gazdzinski ............... B66B 1/34 187/39
6,615,176 B2 ‡ 9/2003 Lewis ................... G10L 15/193 704/27
6,615,220 B1 ‡ 9/2003 Austin .................. G06F 16/258
6,621,768 B1 ‡ 9/2003 Keller .................... G11B 17/22 369/30
6,621,892 B1 ‡ 9/2003 Banister ................ H04L 51/066 379/88
6,622,121 B1 ‡ 9/2003 Crepy ..................... G10L 15/01 704/24
6,622,136 B2 ‡ 9/2003 Russell ..................... G06F 8/20 706/45
6,623,529 B1 ‡ 9/2003 Lakritz ................... G06F 40/47 715/20
6,625,583 B1 ‡ 9/2003 Silverman ............ G06F 3/0483 705/35
6,628,808 B1 ‡ 9/2003 Bach ...................... G06K 9/036 235/38
6,631,186 B1 ‡ 10/2003 Adams .................. H04M 1/247 379/20
6,631,346 B1 ‡ 10/2003 Karaorman ......... G10L 15/1822 704/27
6,633,741 B1 ‡ 10/2003 Posa ..................... H04M 1/271 434/31
6,633,846 B1 ‡ 10/2003 Bennett ............. G06F 16/24522 704/25
6,633,932 B1 ‡ 10/2003 Bork ....................... G06F 1/266 320/10
6,642,940 B1 ‡ 11/2003 Dakss ................... G06F 16/748 715/72
6,643,401 B1 ‡ 11/2003 Kashioka ............. G06K 9/6821 382/17
6,643,824 B1 ‡ 11/2003 Bates .................... G06F 3/0481 715/20
6,647,260 B2 ‡ 11/2003 Dusse ..................... H04L 67/16 455/41
6,650,735 B2 ‡ 11/2003 Burton ................ H04M 3/4938 379/20
6,651,042 B1 ‡ 11/2003 Field ................... H04M 1/6505 379/10
6,651,218 B1 ‡ 11/2003 Adler .................... G06F 40/289 715/20
6,654,740 B2 ‡ 11/2003 Tokuda ................ G06K 9/6247 707/76
6,658,389 B1 ‡ 12/2003 Alpdemir .............. G06Q 30/02 704/27
6,658,408 B2 ‡ 12/2003 Yano ..................... G06F 16/951

(56) References Cited

U.S. PATENT DOCUMENTS 6,658,577 B2 ‡ 12/2003 Huppi .................. G06F 1/1613 713/32
6,661,438 B1 ‡ 12/2003 Shiraishi .............. G06F 1/1626 715/78
6,662,023 B1 ‡ 12/2003 Helle .................. H04W 88/02 455/55
6,665,639 B2 ‡ 12/2003 Mozer .................. G04G 21/06 704/23
6,665,640 B1 ‡ 12/2003 Bennett .................. G09B 5/04 704/25
6,665,641 B1 ‡ 12/2003 Coorman ................ G10L 13/06 704/25
6,671,672 B1 ‡ 12/2003 Heck ...................... G10L 17/24 704/27
6,671,683 B2 ‡ 12/2003 Kanno .................. G06F 16/30
6,671,856 B1 ‡ 12/2003 Gillam .................. G06F 40/268 715/21
6,675,169 B1 ‡ 1/2004 Bennett ................ G06F 16/322
6,675,233 B1 ‡ 1/2004 Du ....................... G06F 1/3203 710/14
6,677,932 B1 ‡ 1/2004 Westerman ......... G06F 3/04886 345/16
6,680,675 B1 ‡ 1/2004 Suzuki .................. G01C 21/34 340/53
6,684,187 B1 ‡ 1/2004 Conkie .................. G10L 13/07 704/26
6,684,376 B1 ‡ 1/2004 Kerzman ............. G06F 30/392 716/12
6,690,387 B2 ‡ 2/2004 Zimmerman ....... G06F 3/04883 345/68
6,690,800 B2 ‡ 2/2004 Resnick .................. H04R 3/02 381/73
6,690,828 B2 ‡ 2/2004 Meyers .................. G06K 9/46 358/51
6,691,064 B2 ‡ 2/2004 Vroman ............. B61L 27/0094 702/11
6,691,090 B1 ‡ 2/2004 Laurila .................. G10L 15/02 704/20
6,691,111 B2 ‡ 2/2004 Lazaridis ............. G06F 40/279
6,691,151 B1 ‡ 2/2004 Cheyer .................. G06F 9/465 709/20
6,694,295 B2 ‡ 2/2004 Lindholm .............. G10L 15/22 704/25
6,694,297 B2 ‡ 2/2004 Sato ..................... G10H 1/0008 704/27
6,697,777 B1 2/2004 Ho et al.
6,697,780 B1 ‡ 2/2004 Beutnagel .............. G10L 13/07 704/25
6,697,824 B1 ‡ 2/2004 Bowman-Amuah ...................... G06F 16/958 709/22
6,701,294 B1 ‡ 3/2004 Ball .................... G06F 16/2423 704/25
6,701,305 B1 ‡ 3/2004 Holt .................... G06F 16/3347 706/45
6,701,318 B2 ‡ 3/2004 Fox ...................... G06F 16/338 707/70
6,704,015 B1 ‡ 3/2004 Bovarnick ............. G06Q 10/10 345/44
6,704,034 B1 ‡ 3/2004 Rodriguez ............ G06F 40/103 715/86
6,704,698 B1 ‡ 3/2004 Paulsen, Jr. ........... G06F 40/263 704/1
6,704,710 B2 ‡ 3/2004 Strong ................ G10L 15/1822 704/25
6,708,153 B2 ‡ 3/2004 Brittan .................... G10L 13/08 379/88
6,711,585 B1 ‡ 3/2004 Copperman .......... G06F 16/367
6,714,221 B1 ‡ 3/2004 Christie ................ G06F 3/0485 715/78
6,716,139 B1 ‡ 4/2004 Hosseinzadeh-Dolkhani .............. A63B 24/00 482/1
6,718,324 B2 ‡ 4/2004 Edlund ................. G06F 16/951
6,718,331 B2 ‡ 4/2004 Davis ...................... G06F 9/465
6,720,980 B1 ‡ 4/2004 Lui .......................... G06F 3/16 715/71
6,721,728 B2 ‡ 4/2004 McGreevy .......... G06F 16/2465
6,721,734 B1 ‡ 4/2004 Subasic ................. G06F 16/338
6,724,370 B2 ‡ 4/2004 Dutta .................... G06F 1/1626 341/22
6,725,197 B1 ‡ 4/2004 Wuppermann ......... G10L 15/22 704/25
6,728,675 B1 ‡ 4/2004 Maddalozzo, Jr. ... G06F 3/0481 434/11
6,728,681 B2 ‡ 4/2004 Whitham ............ H04M 3/4938 704/23
6,728,729 B1 ‡ 4/2004 Jawa ....................... G06F 16/40
6,731,312 B2 ‡ 5/2004 Robbin ................ G11B 27/105 715/71
6,732,142 B1 ‡ 5/2004 Bates ...................... G10L 13/00 379/88
6,735,562 B1 ‡ 5/2004 Zhang ..................... G10L 15/01 704/24
6,735,632 B1 ‡ 5/2004 Kiraly .................. G06F 16/951 709/22
6,738,738 B2 ‡ 5/2004 Henton ................. G06F 40/232 704/2
6,738,742 B2 ‡ 5/2004 Badt ....................... G10L 13/00 342/38
6,741,264 B1 ‡ 5/2004 Lesser ................. G10H 1/0025 715/72
6,742,021 B1 ‡ 5/2004 Halverson .............. G06F 9/465 709/21
6,751,592 B1 ‡ 6/2004 Shiga ..................... G10L 13/07 704/25
6,751,595 B2 ‡ 6/2004 Busayapongchai ..... G10L 15/22 704/27
6,751,621 B1 ‡ 6/2004 Calistri-Yeh ............ G06F 16/36
6,754,504 B1 ‡ 6/2004 Reed ...................... G06Q 50/00 455/41
6,757,362 B1 ‡ 6/2004 Cooper ................. H04M 3/527 371/88
6,757,365 B1 ‡ 6/2004 Bogard ................... H04L 51/04 379/88
6,757,646 B2 ‡ 6/2004 Marchisio ............ G06F 16/334 704/8
6,757,653 B2 ‡ 6/2004 Buth ....................... G10L 13/07 704/25
6,757,718 B1 ‡ 6/2004 Halverson .............. G06F 9/465 709/21
6,760,412 B1 ‡ 7/2004 Loucks ................... H04M 3/42 379/20
6,760,700 B2 ‡ 7/2004 Lewis ..................... G10L 13/00 704/23
6,760,754 B1 ‡ 7/2004 Isaacs ................. G06Q 10/107 709/20
6,762,741 B2 ‡ 7/2004 Weindorf ................ G09G 3/20 345/10
6,762,777 B2 ‡ 7/2004 Carroll ................. G06F 3/0481 715/80
6,763,089 B2 ‡ 7/2004 Feigenbaum .......... G09B 21/00 379/52
6,766,294 B2 ‡ 7/2004 MacGinite ............. G10L 15/01 704/23
6,766,295 B1 ‡ 7/2004 Murveit .................. G10L 15/30 379/88
6,766,320 B1 ‡ 7/2004 Wang .................... G06F 16/313
6,766,324 B2 ‡ 7/2004 Carlson ..................... G06F 8/24
6,768,979 B1 ‡ 7/2004 Menendez-Pidal ...... F16J 15/43 704/22
6,771,982 B1 ‡ 8/2004 Toupin ............. H04M 1/72588 455/55
6,772,123 B2 ‡ 8/2004 Cooklev ................. G10L 15/30 379/88

(56) References Cited

U.S. PATENT DOCUMENTS 6,772,195 B1 ‡ 8/2004 Hatlelid .............. G06F 3/04815 345/41
6,772,394 B1 ‡ 8/2004 Kamada ................ G06F 3/0219
6,775,358 B1 ‡ 8/2004 Breitenbach ........ H04M 3/4938 379/88
6,778,951 B1 ‡ 8/2004 Contractor .......... G06F 16/3344 704/9
6,778,952 B2 ‡ 8/2004 Bellegarda ............ G06F 40/216 704/9
6,778,962 B1 ‡ 8/2004 Kasai ...................... G10L 13/10 704/26
6,778,970 B2 ‡ 8/2004 Au .......................... G06F 40/30 706/55
6,778,979 B2 ‡ 8/2004 Grefenstette ....... G06F 16/3323
6,782,510 B1 ‡ 8/2004 Gross .................... G06F 40/232 715/25
6,784,901 B1 ‡ 8/2004 Harvey ............... H04L 12/1827 709/20
6,789,094 B2 ‡ 9/2004 Rudoff .................... G06F 16/10 707/79
6,789,231 B1 ‡ 9/2004 Reynar ................. G06F 40/274 715/25
6,790,704 B2 ‡ 9/2004 Doyle ..................... H01L 23/48 257/72
6,792,082 B1 ‡ 9/2004 Levine ................ H04M 1/7255 379/67
6,792,083 B2 ‡ 9/2004 Dams ...................... G10L 15/10 379/88
6,792,086 B1 ‡ 9/2004 Saylor ................ H04M 3/4938 379/88
6,792,407 B2 ‡ 9/2004 Kibre .................... G10L 13/047 704/26
6,794,566 B2 ‡ 9/2004 Pachet .................... G06F 16/40 84/600
6,795,059 B2 ‡ 9/2004 Endo ................... G06F 3/04886 345/17
6,799,226 B1 ‡ 9/2004 Robbin ................. G06F 3/0607 710/10
6,801,604 B2 ‡ 10/2004 Maes ...................... G10L 15/30 379/88
6,801,964 B1 ‡ 10/2004 Mahdavi ............ H04N 7/17336 710/35
6,803,905 B1 ‡ 10/2004 Capps ................. G06F 3/04886 345/17
6,804,649 B2 ‡ 10/2004 Miranda ................. G10L 13/07 704/25
6,804,677 B2 ‡ 10/2004 Shadmon ................ G06F 16/81 707/75
6,807,536 B2 ‡ 10/2004 Achlioptas ........... G06K 9/6247 324/30
6,807,574 B1 ‡ 10/2004 Partovi .................. G06Q 30/06 709/22
6,809,724 B1 ‡ 10/2004 Shiraishi ................. G06F 1/163 345/15
6,810,379 B1 ‡ 10/2004 Vermeulen .............. G10L 13/07 704/25
6,813,218 B1 ‡ 11/2004 Antonelli ................ G01S 15/86 367/3
6,813,491 B1 ‡ 11/2004 McKinney ............ H04M 1/673 455/41
6,813,607 B1 ‡ 11/2004 Faruquie ................. G10L 21/06 704/25
6,816,578 B1 ‡ 11/2004 Kredo .................. G10L 15/193 379/88
6,820,055 B2 ‡ 11/2004 Saindon .................. G06F 40/58 704/23
6,829,018 B2 ‡ 12/2004 Lin ......................... H04S 5/005 348/51
6,829,603 B1 ‡ 12/2004 Chai ................... G06F 16/3344
6,832,194 B1 ‡ 12/2004 Mozer ..................... G10L 15/28 704/21
6,832,381 B1 ‡ 12/2004 Mathur ................. G06F 9/4843 711/17
6,836,651 B2 ‡ 12/2004 Segal ..................... G06Q 20/32 455/40
6,836,760 B1 ‡ 12/2004 Bellegarda .......... G10L 15/1822 704/23
6,839,464 B2 ‡ 1/2005 Hawkins ............ G06K 9/00429 382/18
6,839,669 B1 ‡ 1/2005 Gould ..................... G10L 15/22 704/24
6,839,670 B1 ‡ 1/2005 Stammler ............ G10L 15/063 704/25
6,839,742 B1 ‡ 1/2005 Dyer ..................... G06F 16/957 709/21
6,842,767 B1 ‡ 1/2005 Partovi .................. G06Q 30/06 709/20
6,847,966 B1 ‡ 1/2005 Sommer ............. G06F 16/3347 707/73
6,847,979 B2 ‡ 1/2005 Allemang ............ G06F 16/367 707/79
6,850,775 B1 ‡ 2/2005 Berg ...................... H04R 25/70 381/31
6,850,887 B2 ‡ 2/2005 Epstein ................... G10L 15/20 704/25
6,851,115 B1 ‡ 2/2005 Cheyer ................... G06F 9/465 719/31
6,856,259 B1 ‡ 2/2005 Sharp .................... G06F 3/0488 178/18
6,857,800 B2 ‡ 2/2005 Zhang ................... G06F 3/0234 200/5 A
6,859,931 B1 ‡ 2/2005 Cheyer ................... G06F 9/465 719/31
6,862,568 B2 ‡ 3/2005 Case ....................... G10L 13/07 704/26
6,862,710 B1 ‡ 3/2005 Marchisio ............ G06F 16/954 715/20
6,862,713 B1 ‡ 3/2005 Kraft ................... G06F 16/3325 715/72
6,865,533 B2 ‡ 3/2005 Addison .................. G09B 5/04 704/26
6,868,045 B1 ‡ 3/2005 Schroder ................. G10L 15/26 340/4
6,868,385 B1 ‡ 3/2005 Gerson ................... G10L 15/30 370/46
6,870,529 B1 ‡ 3/2005 Davis ....................... G09G 5/10 345/20
6,871,346 B1 ‡ 3/2005 Kumbalimutt .......... G06F 9/454 718/10
6,873,953 B1 ‡ 3/2005 Lennig .................... G10L 25/87 704/24
6,873,986 B2 ‡ 3/2005 McConnell ....... G06F 16/90344
6,876,947 B1 ‡ 4/2005 Darley ................. A43B 3/0005 702/16
6,877,003 B2 ‡ 4/2005 Ho ............................ G06F 7/02
6,879,957 B1 ‡ 4/2005 Pechter ................... G10L 13/08 704/26
6,882,335 B2 ‡ 4/2005 Saarinen ............... G06F 1/1605 345/15
6,882,337 B2 ‡ 4/2005 Shetter ................ G06F 3/04886 345/16
6,882,747 B2 ‡ 4/2005 Thawonmas ......... G06F 16/313 382/19
6,882,955 B1 ‡ 4/2005 Ohlenbusch ......... A43B 3/0005 702/16
6,882,971 B2 ‡ 4/2005 Craner .................. H04M 1/247 704/24
6,885,734 B1 ‡ 4/2005 Eberle ................. H04M 3/4938 379/88
6,889,361 B1 ‡ 5/2005 Bates .................... G06F 40/232 715/25
6,895,084 B1 ‡ 5/2005 Saylor ................. H04M 3/4938 379/88
6,895,257 B2 ‡ 5/2005 Boman ............. H04M 1/72547 379/88
6,895,380 B2 ‡ 5/2005 Sepe, Jr. ................. G10L 15/22 704/27

(56) References Cited

U.S. PATENT DOCUMENTS 6,895,558 B1 ‡ 5/2005 Loveland ................ H04L 29/06 715/74
6,898,550 B1 ‡ 5/2005 Blackadar ............ A43B 3/0005 702/18
6,901,364 B2 ‡ 5/2005 Nguyen .............. G10L 15/1815 704/1
6,901,399 B1 ‡ 5/2005 Corston .............. G06F 16/3344
6,904,405 B2 ‡ 6/2005 Suominen ............... G10L 15/22 704/23
6,907,112 B1 ‡ 6/2005 Guedalia ............... H04M 3/533 379/88
6,907,140 B2 ‡ 6/2005 Matsugu ............ G06K 9/00268 382/19
6,910,004 B2 ‡ 6/2005 Tarbouriech .......... G06F 40/284 704/9
6,910,007 B2 ‡ 6/2005 Stylianou .............. G10L 13/033 704/20
6,910,012 B2 ‡ 6/2005 Hartley ................... G10L 15/19 704/23
6,910,186 B2 ‡ 6/2005 Kim ..................... G06Q 10/107 715/70
6,911,971 B2 ‡ 6/2005 Suzuki .................. G06F 1/1616 200/30
6,912,407 B1 ‡ 6/2005 Clarke .................. H04M 1/275 379/93
6,912,498 B2 ‡ 6/2005 Stevens ................... G10L 15/22 704/23
6,912,499 B1 ‡ 6/2005 Sabourin ............... G10L 15/063 704/24
6,915,138 B2 ‡ 7/2005 Kraft ................. H04M 1/72552 455/41
6,915,246 B2 ‡ 7/2005 Gusler .................. G10L 21/028 703/5
6,915,294 B1 ‡ 7/2005 Singh ...................... G06F 40/14
6,917,373 B2 ‡ 7/2005 Vong ..................... G06F 3/0481 715/80
6,918,677 B2 ‡ 7/2005 Shipman ............... G06F 3/0202 362/23
6,924,828 B1 ‡ 8/2005 Hirsch .................. G06F 16/957 715/80
6,925,438 B2 ‡ 8/2005 Mohamed ............... G10L 21/06 345/47
6,928,149 B1 ‡ 8/2005 Panjwani .......... H04M 3/53333 379/88
6,928,614 B1 ‡ 8/2005 Everhart ................ G06Q 10/10 382/30
6,931,255 B2 ‡ 8/2005 Mekuria ................. H04W 4/14 455/46
6,931,384 B1 ‡ 8/2005 Horvitz ............... G10L 15/1822 706/45
6,932,708 B2 ‡ 8/2005 Yamashita ............ A63F 13/005 463/42
6,933,928 B1 ‡ 8/2005 Lilienthal ........... G06F 15/0283 345/15
6,934,394 B1 ‡ 8/2005 Anderson ................ H04R 5/04 381/19
6,934,684 B2 ‡ 8/2005 Alpdemir ............... G06Q 30/02 379/88
6,934,756 B2 ‡ 8/2005 Maes ...................... G10L 15/30 370/35
6,934,812 B1 ‡ 8/2005 Robbin ................. G06F 1/3203 711/13
6,937,975 B1 ‡ 8/2005 Elworthy ................ G06F 40/30 704/9
6,937,986 B2 ‡ 8/2005 Denenberg .......... H04M 3/4936 704/27
6,944,593 B2 ‡ 9/2005 Kuzunuki ............... G10L 15/22 704/25
6,944,846 B2 ‡ 9/2005 Ryzhov ................... G06F 9/454 717/11
6,948,094 B2 ‡ 9/2005 Schultz ............... G06F 11/0772 714/15
6,950,087 B2 ‡ 9/2005 Knox .................... G06F 1/1616 345/10
6,950,502 B1 ‡ 9/2005 Jenkins ................. H04M 3/533 379/88
6,952,799 B2 ‡ 10/2005 Edwards ............... G06F 16/957 715/20
6,954,755 B2 ‡ 10/2005 Reisman ............... G06F 16/951
6,954,899 B1 ‡ 10/2005 Anderson ............... G06F 3/016 345/15
6,956,845 B2 ‡ 10/2005 Baker ................. G06F 11/0709 370/35
6,957,076 B2 ‡ 10/2005 Hunzinger ............ H04W 4/029 455/45
6,957,183 B2 ‡ 10/2005 Malayath ................ G10L 15/02 704/23
6,960,734 B1 ‡ 11/2005 Park ....................... H01H 21/22 200/29
6,961,699 B1 ‡ 11/2005 Kahn ...................... G10L 15/26 704/23
6,961,912 B2 ‡ 11/2005 Aoki ..................... G06F 1/1626 345/16
6,963,759 B1 ‡ 11/2005 Gerson ........................... 455/41
6,963,841 B2 ‡ 11/2005 Handal .................... G09B 5/04 704/25
6,964,023 B2 ‡ 11/2005 Maes ................. G06K 9/00248 715/81
6,965,376 B2 ‡ 11/2005 Tani ................... G06B 23/0216 345/17
6,965,863 B1 ‡ 11/2005 Zuberec .................. G10L 15/22 704/23
6,968,311 B2 ‡ 11/2005 Knockeart ............. G06F 3/023 455/34
6,970,820 B2 ‡ 11/2005 Junqua .................... G10L 13/04 704/25
6,970,881 B1 ‡ 11/2005 Mohan .................... G06F 16/36
6,970,915 B1 ‡ 11/2005 Partovi ............... H04M 3/4938 709/21
6,970,935 B1 ‡ 11/2005 Maes ................ H04L 29/06027 370/35
6,976,090 B2 ‡ 12/2005 Ben-Shaul ........ H04L 29/12066 709/24
6,978,127 B1 ‡ 12/2005 Bulthuis ........... H04M 1/72583 455/41
6,978,239 B2 ‡ 12/2005 Chu ........................ G10L 13/07 704/25
6,980,949 B2 ‡ 12/2005 Ford ..................... G06F 40/284 704/9
6,980,953 B1 ‡ 12/2005 Kanevsky ............... G10L 15/26 704/23
6,980,955 B2 ‡ 12/2005 Okutani .................. G10L 13/06 704/25
6,983,251 B1 ‡ 1/2006 Umemoto ................ H04R 5/04 704/27
6,985,858 B2 ‡ 1/2006 Frey ........................ G10L 15/02 704/23
6,985,865 B1 ‡ 1/2006 Packingham ........... G10L 15/22 704/27
6,985,958 B2 ‡ 1/2006 Lucovsky ........... G06F 21/6218 709/23
6,988,063 B2 ‡ 1/2006 Tokuda ................. G06F 40/253 704/9
6,988,071 B1 ‡ 1/2006 Gazdzinski ............... B66B 1/34 187/39
6,990,450 B2 ‡ 1/2006 Case ....................... G10L 13/07 704/25
6,996,520 B2 ‡ 2/2006 Levin .................... G06F 40/242 704/100
6,996,531 B2 ‡ 2/2006 Korall ................. H04M 3/4938 704/27
6,996,575 B2 ‡ 2/2006 Cox ........................ G06F 16/35 707/73
6,999,066 B2 ‡ 2/2006 Litwiller ............. G09B 21/006 345/17
6,999,914 B1 ‡ 2/2006 Boerner .................. G06F 40/30 704/1

(56) References Cited

U.S. PATENT DOCUMENTS 6,999,925 B2 ‡ 2/2006 Fischer .................. G10L 15/07 704/23
6,999,927 B2 ‡ 2/2006 Mozer .................. G04G 21/06 704/24
7,000,189 B2 ‡ 2/2006 Dutta .................. G06F 16/95 715/72
7,002,556 B2 ‡ 2/2006 Tsukada .................. G06F 3/0421 345/15
7,003,099 B1 ‡ 2/2006 Zhang .................. H04M 9/082 379/38
7,003,463 B1 ‡ 2/2006 Maes et al. ....... H04L 29/06027 704/23
7,003,522 B1 ‡ 2/2006 Reynar .................. G06F 16/986 707/73
7,006,969 B2 ‡ 2/2006 Atal .................. G10L 15/02 704/23
7,006,973 B1 ‡ 2/2006 Genly .................. G10L 15/22 704/25
7,007,026 B2 ‡ 2/2006 Wilkinson .......... G06F 16/9537
7,007,239 B1 ‡ 2/2006 Hawkins .................. H04M 1/7255 715/78
7,010,581 B2 ‡ 3/2006 Brown .................. G06F 3/0481 709/21
7,013,289 B2 ‡ 3/2006 Horn .................. G06Q 10/087 705/14
7,013,308 B1 ‡ 3/2006 Tunstall-Pedoe .................. G06F 16/3329 707/70
7,013,429 B2 ‡ 3/2006 Fujimoto .................. G06Q 10/107 715/75
7,015,894 B2 ‡ 3/2006 Morohoshi ......... G06F 3/03545 345/15
7,020,685 B1 ‡ 3/2006 Chen .................. H04W 88/02 455/40
7,024,363 B1 ‡ 4/2006 Comerford .................. G10L 15/22 704/27
7,024,364 B2 ‡ 4/2006 Guerra .................. H04M 3/4936 704/27
7,024,366 B1 ‡ 4/2006 Deyoe .................. G10L 15/22 704/24
7,024,460 B2 ‡ 4/2006 Koopmas .................. H04L 51/066 709/20
7,027,568 B1 ‡ 4/2006 Simpson ........... H04M 1/72552 379/67
7,027,974 B1 ‡ 4/2006 Busch .................. G06F 40/253 704/4
7,027,990 B2 ‡ 4/2006 Sussman .................. H04M 3/493 704/27
7,028,252 B1 ‡ 4/2006 Baru .................. H04M 3/4938 715/27
7,030,861 B1 ‡ 4/2006 Westerman ......... G06F 3/04883 345/17
7,031,530 B2 ‡ 4/2006 Driggs .................. G06K 9/6292 382/22
7,031,909 B2 ‡ 4/2006 Mao .................. G06F 40/216 704/9
7,035,794 B2 ‡ 4/2006 Sirivara .................. G10L 13/06 704/21
7,035,801 B2 ‡ 4/2006 Jimenez-Feltstrom .................. G10L 13/08 704/25
7,035,807 B1 ‡ 4/2006 Brittain .................. G11B 27/034 704/27
7,036,128 B1 ‡ 4/2006 Julia .................. G06F 9/465 719/31
7,036,681 B2 ‡ 5/2006 Suda .................. B65D 83/0409 221/21
7,038,659 B2 ‡ 5/2006 Rajkowski .................. G06F 3/0233 345/15
7,039,588 B2 ‡ 5/2006 Okutani .................. G10L 13/04 704/25
7,043,420 B2 ‡ 5/2006 Ratnaparkhi ........... G06F 40/56 704/9
7,043,422 B2 ‡ 5/2006 Gao .................. G10L 15/065 704/9
7,046,230 B2 ‡ 5/2006 Zadesky .................. G06F 1/1626 345/15
7,046,850 B2 ‡ 5/2006 Braspenning .................. G06T 7/00 382/20
7,047,193 B1 ‡ 5/2006 Bellegarda .................. G10L 15/063 704/25
7,050,550 B2 ‡ 5/2006 Steinbiss .................. G10L 15/063 379/88
7,050,976 B1 ‡ 5/2006 Packingham ....... H04M 3/4936 704/27
7,050,977 B1 ‡ 5/2006 Bennett .................. G06F 40/289 704/27
7,051,096 B1 ‡ 5/2006 Krawiec .................. G07F 19/20 235/37
7,054,419 B2 ‡ 5/2006 Culliss .................. H04M 3/533 379/67
7,054,888 B2 ‡ 5/2006 LaChapelle .......... G11B 27/034
7,057,607 B2 ‡ 6/2006 Mayoraz .................. G06F 3/0481 178/18
7,058,569 B2 ‡ 6/2006 Coorman .................. G10L 13/07 704/21
7,058,888 B1 ‡ 6/2006 Gjerstad .................. G06F 3/038 715/23
7,058,889 B2 ‡ 6/2006 Trovato .................. H04N 7/163
7,062,223 B2 ‡ 6/2006 Gerber .................. H04B 1/20 455/11
7,062,225 B2 ‡ 6/2006 White .................. A63B 24/0021 455/41
7,062,428 B2 ‡ 6/2006 Hogenhout .................. G10L 15/183 704/9
7,062,438 B2 ‡ 6/2006 Kobayashi .................. G10L 13/033 704/25
7,065,185 B1 ‡ 6/2006 Koch .................. H04M 3/42382 379/88
7,065,485 B1 ‡ 6/2006 Chong-White ......... G10L 21/04 704/20
7,069,213 B2 ‡ 6/2006 Thompson .................. G10L 15/22 379/88
7,069,220 B2 ‡ 6/2006 Coffman .................. G10L 15/22 704/27
7,069,560 B1 ‡ 6/2006 Cheyer .................. G06F 9/465 719/31
7,072,686 B1 ‡ 7/2006 Schrager .................. H04M 1/6066 379/88
7,072,941 B2 ‡ 7/2006 Griffin .................. H04L 12/1827 709/20
7,076,527 B2 ‡ 7/2006 Bellegarda .................. G06Q 10/107 379/93
7,079,713 B2 ‡ 7/2006 Simmons .................. G06K 9/222 382/18
7,082,322 B2 ‡ 7/2006 Harano .................. H01Q 1/243 455/57
7,084,758 B1 ‡ 8/2006 Cole .................. G06Q 10/109 340/30
7,084,856 B2 ‡ 8/2006 Huppi .................. G06F 3/0362 345/16
7,085,723 B2 ‡ 8/2006 Ross .................. G10L 15/30 704/27
7,085,960 B2 ‡ 8/2006 Bouat .................. H04L 12/64 714/11
7,088,345 B2 ‡ 8/2006 Robinson .................. G06F 40/232 345/17
7,089,292 B1 ‡ 8/2006 Roderick .................. G06F 3/016 345/15
7,092,370 B2 ‡ 8/2006 Jiang .................. H04L 12/66 370/32
7,092,887 B2 ‡ 8/2006 Mozer .................. G04G 21/06 704/25
7,092,928 B1 ‡ 8/2006 Elad .................. G06N 5/04 706/60
7,092,950 B2 ‡ 8/2006 Wong .................. G06F 40/197

(56) References Cited

U.S. PATENT DOCUMENTS 7,093,693 B1 ‡ 8/2006 Gazdzinski ............. B66B 1/468 187/38
7,095,733 B1 ‡ 8/2006 Yarlagadda ............. H04L 29/06 370/35
7,096,183 B2 ‡ 8/2006 Junqua .................... G10L 13/08 704/25
7,100,117 B1 ‡ 8/2006 Chwa ................... H04N 21/235
7,103,548 B2 ‡ 9/2006 Squibbs ............ H04M 1/72544 704/26
7,107,204 B1 ‡ 9/2006 Liu ....................... G06F 40/232 704/2
7,111,248 B2 ‡ 9/2006 Mulvey ................. G06F 40/242 715/81
7,111,774 B2 ‡ 9/2006 Song ..................... G06F 3/0224 235/37
7,113,803 B2 ‡ 9/2006 Dehlin .................... H04L 51/04 455/41
7,113,943 B2 ‡ 9/2006 Bradford ............. G06F 16/3346 707/73
7,115,035 B2 ‡ 10/2006 Tanaka .................... G06F 3/048 463/42
7,117,231 B2 ‡ 10/2006 Fischer ................ H04N 21/235
7,120,865 B1 ‡ 10/2006 Horvitz ................ G06Q 10/107 715/21
7,123,696 B2 ‡ 10/2006 Lowe ...................... G06F 16/40 379/88
7,124,081 B1 ‡ 10/2006 Bellegarda .......... G10L 15/1815 704/25
7,124,082 B2 ‡ 10/2006 Freedman ............... G10L 13/08 704/26
7,124,164 B1 ‡ 10/2006 Chemtob ............ H04L 12/1822 709/20
7,127,046 B1 ‡ 10/2006 Smith ..................... H04M 3/44 379/88
7,127,394 B2 ‡ 10/2006 Strong ................ G10L 15/1822 704/25
7,127,396 B2 ‡ 10/2006 Chu ........................ G10L 13/07 704/25
7,127,403 B1 ‡ 10/2006 Saylor ............... H04M 3/42153
7,129,932 B1 ‡ 10/2006 Klarlund ................ G06K 9/723 345/16
7,133,900 B1 ‡ 11/2006 Szeto ...................... H04L 51/04 709/20
7,136,710 B1 ‡ 11/2006 Hoffberg .............. H04N 21/252 700/83
7,136,818 B1 ‡ 11/2006 Cosatto ............... G10L 15/1807 704/27
7,137,126 B1 ‡ 11/2006 Coffman ................. G06F 3/167 719/32
7,139,697 B2 ‡ 11/2006 Hakkinen ............. G06F 40/216 704/9
7,139,714 B2 ‡ 11/2006 Bennett ................. G10L 15/183 704/27
7,139,722 B2 ‡ 11/2006 Perrella ............ G06Q 10/63116 705/7
7,143,028 B2 ‡ 11/2006 Hillis ................... G10K 11/175 704/20
7,143,038 B2 ‡ 11/2006 Katae ...................... G10L 13/06 704/25
7,143,040 B2 ‡ 11/2006 Durston .................. G10L 15/22 704/27
7,146,319 B2 ‡ 12/2006 Hunt ....................... G10L 15/08 704/25
7,146,437 B2 ‡ 12/2006 Robbin ................. G06F 3/0607 710/16
7,149,319 B2 ‡ 12/2006 Roeck .................... H04R 25/50 381/31
7,149,695 B1 ‡ 12/2006 Bellegarda .......... G10L 15/1815 704/27
7,149,964 B1 ‡ 12/2006 Cottrille .................. G06F 40/58 715/23
7,152,070 B1 ‡ 12/2006 Musick ..................... G06F 8/30
7,152,093 B2 ‡ 12/2006 Ludwig .................. G06Q 10/10 709/20
7,154,526 B2 ‡ 12/2006 Foote ..................... H04N 7/142 348/14
7,155,668 B2 ‡ 12/2006 Holland .................. G06F 40/20 715/25
7,158,647 B2 ‡ 1/2007 Azima ................ B42D 15/022 381/15
7,159,174 B2 ‡ 1/2007 Johnson ............... G11B 27/031 715/71
7,162,412 B2 ‡ 1/2007 Yamada .................. G06F 40/47 704/7
7,162,482 B1 ‡ 1/2007 Dunning ............... G06F 16/683 707/73
7,165,073 B2 ‡ 1/2007 Vandersluis .......... G06F 16/242
7,166,791 B2 ‡ 1/2007 Robbin ................ G10H 1/0008 84/477
7,171,350 B2 ‡ 1/2007 Lin ....................... G06F 40/295 704/9
7,171,360 B2 ‡ 1/2007 Huang .................... G10L 15/07 704/23
7,174,042 B1 ‡ 2/2007 Simmons ........... G06K 9/00402 345/16
7,174,295 B1 ‡ 2/2007 Kivimaki ............. G06F 40/117 704/26
7,174,297 B2 ‡ 2/2007 Guerra .................... G10L 15/30 704/27
7,174,298 B2 ‡ 2/2007 Sharma ................. G10L 15/065 379/40
7,177,794 B2 ‡ 2/2007 Mani ....................... G06F 40/53 704/8
7,177,798 B2 ‡ 2/2007 Hsu ......................... G10L 15/18 704/10
7,177,817 B1 ‡ 2/2007 Khosla .................... G10L 15/22 704/25
7,181,386 B2 ‡ 2/2007 Mohri ..................... G06F 40/20 704/1
7,181,388 B2 ‡ 2/2007 Tian ........................ G10L 15/12 704/10
7,184,064 B2 ‡ 2/2007 Zimmerman ......... G06F 3/0485 345/68
7,185,276 B2 ‡ 2/2007 Keswa .................... H04L 63/08 707/99
7,188,085 B2 ‡ 3/2007 Pelletier ................. G06Q 30/02 701/51
7,190,351 B1 ‡ 3/2007 Goren ................... G06F 1/1626 345/15
7,190,794 B2 ‡ 3/2007 Hinde .................. G11B 19/025 381/17
7,191,118 B2 ‡ 3/2007 Bellegarda ............ G06F 40/284 704/9
7,191,131 B1 ‡ 3/2007 Nagao ..................... G10L 13/00 704/25
7,193,615 B2 ‡ 3/2007 Kim ...................... G06F 3/0238 345/16
7,194,186 B1 ‡ 3/2007 Strub .................. G11B 19/122 360/72
7,194,413 B2 ‡ 3/2007 Mahoney ............... G06Q 10/08 704/27
7,194,471 B1 ‡ 3/2007 Nagatsuka ............ G06F 16/355
7,194,611 B2 ‡ 3/2007 Bear ...................... G06Q 10/10 341/22
7,194,699 B2 ‡ 3/2007 Thomson ............ G06F 3/04886 345/17
7,197,120 B2 ‡ 3/2007 Luehrig ............. G06Q 30/0258 370/26
7,197,460 B1 ‡ 3/2007 Gupta ..................... G06F 3/167 704/27
7,200,550 B2 ‡ 4/2007 Menezes ................. G06F 40/44 704/10
7,200,558 B2 ‡ 4/2007 Kato ....................... G10L 13/10 704/23
7,200,559 B2 ‡ 4/2007 Wang ...................... G10L 15/22 704/25
7,203,297 B2 ‡ 4/2007 Vitikainen ............ H04M 3/533 379/20

(56) References Cited

U.S. PATENT DOCUMENTS

| | | | | | |
|---|---|---|---|---|---|
| 7,203,646 | B2 ‡ | 4/2007 | Bennett | G06F 40/289 | 704/25 |
| 7,206,809 | B2 ‡ | 4/2007 | Ludwig | G06Q 10/10 | 709/20 |
| 7,212,827 | B1 ‡ | 5/2007 | Veschl | H04W 68/00 | 455/41 |
| 7,216,008 | B2 ‡ | 5/2007 | Sakata | G11B 27/105 | 700/94 |
| 7,216,073 | B2 ‡ | 5/2007 | Lavi | G06F 40/284 | 704/9 |
| 7,216,080 | B2 ‡ | 5/2007 | Tsiao | G06F 3/16 | 704/25 |
| 7,218,920 | B2 ‡ | 5/2007 | Hyon | H04M 1/7255 | 455/41 |
| 7,218,943 | B2 ‡ | 5/2007 | Klassen | H04L 51/16 | 455/41 |
| 7,219,063 | B2 ‡ | 5/2007 | Schalk | G06Q 30/02 | 704/27 |
| 7,219,123 | B1 ‡ | 5/2007 | Fiechter | H04M 1/72561 | |
| 7,225,125 | B2 ‡ | 5/2007 | Bennett | G10L 15/22 | 704/23 |
| 7,228,278 | B2 ‡ | 6/2007 | Nguyen | H04M 3/4936 | 704/25 |
| 7,231,343 | B1 ‡ | 6/2007 | Treadgold | G06F 40/247 | 704/9 |
| 7,231,597 | B1 ‡ | 6/2007 | Braun | G06F 40/169 | 715/20 |
| 7,233,790 | B2 ‡ | 6/2007 | Kjellberg | G06Q 20/12 | 455/41 |
| 7,233,904 | B2 ‡ | 6/2007 | Luisi | A63F 13/10 | 704/27 |
| 7,234,026 | B2 ‡ | 6/2007 | Robbin | G06F 1/3203 | 711/13 |
| 7,236,932 | B1 ‡ | 6/2007 | Grajski | G10L 15/26 | 704/27 |
| 7,240,002 | B2 ‡ | 7/2007 | Minamino | G10L 15/08 | 704/23 |
| 7,243,130 | B2 ‡ | 7/2007 | Horvitz | G05B 19/404 | 709/20 |
| 7,243,305 | B2 ‡ | 7/2007 | Schabes | G06F 40/232 | 715/25 |
| 7,246,118 | B2 ‡ | 7/2007 | Chastain | G06F 40/169 | |
| 7,246,151 | B2 ‡ | 7/2007 | Isaacs | G06Q 10/107 | 709/20 |
| 7,248,900 | B2 ‡ | 7/2007 | Deeds | H04M 19/041 | 379/14 |
| 7,251,313 | B1 ‡ | 7/2007 | Miller | H04M 3/53333 | 379/28 |
| 7,251,454 | B2 ‡ | 7/2007 | White | A63B 24/0021 | 455/41 |
| 7,254,773 | B2 ‡ | 8/2007 | Bates | G06F 40/242 | 715/25 |
| 7,257,537 | B2 ‡ | 8/2007 | Ross | G10L 15/1822 | 704/27 |
| 7,259,752 | B1 ‡ | 8/2007 | Simmons | G06F 3/04817 | 345/17 |
| 7,260,529 | B1 ‡ | 8/2007 | Lengen | G06F 3/16 | 704/23 |
| 7,260,567 | B2 ‡ | 8/2007 | Parikh | G06F 16/322 | 707/74 |
| 7,263,373 | B2 ‡ | 8/2007 | Mattisson | H04M 1/6016 | 367/11 |
| 7,266,189 | B1 ‡ | 9/2007 | Day | H04M 3/56 | 379/15 |
| 7,266,495 | B1 ‡ | 9/2007 | Beaufays | G10L 15/06 | 704/23 |
| 7,266,496 | B2 ‡ | 9/2007 | Wang | G10L 15/28 | 704/20 |
| 7,266,499 | B2 ‡ | 9/2007 | Surace | H04M 3/4936 | 704/27 |
| 7,269,544 | B2 ‡ | 9/2007 | Simske | G06F 40/253 | 704/4 |
| 7,269,556 | B2 ‡ | 9/2007 | Kiss | G10L 15/02 | 704/24 |
| 7,272,224 | B1 ‡ | 9/2007 | Normile | H04M 9/082 | 379/38 |
| 7,275,063 | B2 ‡ | 9/2007 | Horn | G06F 16/22 | |
| 7,277,088 | B2 ‡ | 10/2007 | Robinson | G06F 3/0489 | 345/17 |
| 7,277,854 | B2 ‡ | 10/2007 | Bennett | G10L 15/22 | 704/25 |
| 7,277,855 | B1 ‡ | 10/2007 | Acker | G10L 13/02 | 704/26 |
| 7,280,958 | B2 ‡ | 10/2007 | Pavlov | G10L 21/02 | 381/93 |
| 7,283,072 | B1 ‡ | 10/2007 | Plachta | H03M 7/3088 | 341/10 |
| 7,289,102 | B2 ‡ | 10/2007 | Hinckley | G06F 1/1626 | 345/15 |
| 7,290,039 | B1 ‡ | 10/2007 | Lisitsa | G06F 3/023 | 709/20 |
| 7,292,579 | B2 ‡ | 11/2007 | Morris | H04L 12/2854 | 370/33 |
| 7,292,979 | B2 ‡ | 11/2007 | Karas | G10L 15/005 | 704/24 |
| 7,292,980 | B1 ‡ | 11/2007 | August | G10L 13/00 | 704/25 |
| 7,296,019 | B1 ‡ | 11/2007 | Chandrasekar | G06F 40/232 | |
| 7,296,230 | B2 ‡ | 11/2007 | Fukatsu | G06F 16/954 | 715/71 |
| 7,299,033 | B2 ‡ | 11/2007 | Kjellberg | H04L 29/06 | 455/41 |
| 7,302,392 | B1 ‡ | 11/2007 | Thenthiruperai | G10L 15/19 | 704/25 |
| 7,302,394 | B1 ‡ | 11/2007 | Baray | G10L 15/18 | 704/25 |
| 7,302,686 | B2 ‡ | 11/2007 | Togawa | G06F 9/4887 | 709/20 |
| 7,308,404 | B2 ‡ | 12/2007 | Venkataraman | G10L 15/065 | 704/25 |
| 7,308,408 | B1 ‡ | 12/2007 | Stifelman | G10L 15/22 | 704/26 |
| 7,310,329 | B2 ‡ | 12/2007 | Vieri | H04M 3/5322 | 370/35 |
| 7,310,600 | B1 ‡ | 12/2007 | Garner | G10L 15/12 | 704/23 |
| 7,310,605 | B2 ‡ | 12/2007 | Janakiraman | G10L 13/00 | 704/27 |
| 7,313,523 | B1 ‡ | 12/2007 | Bellegarda | G10L 13/033 | 704/25 |
| 7,315,809 | B2 ‡ | 1/2008 | Xun | G06F 40/279 | 211/40 |
| 7,315,818 | B2 ‡ | 1/2008 | Stevens | G10L 15/22 | 704/23 |
| 7,318,020 | B1 ‡ | 1/2008 | Kim | G06F 40/58 | 704/2 |
| 7,319,957 | B2 ‡ | 1/2008 | Robinson | G06K 9/222 | 704/25 |
| 7,321,783 | B2 ‡ | 1/2008 | Kim | B60R 25/102 | 455/55 |
| 7,322,023 | B2 ‡ | 1/2008 | Shulman | G06F 8/33 | 715/70 |
| 7,324,833 | B2 ‡ | 1/2008 | White | G06Q 30/0267 | |
| 7,324,947 | B2 ‡ | 1/2008 | Jordan | G06F 3/16 | 704/27 |
| 7,328,155 | B2 ‡ | 2/2008 | Endo | G10L 15/08 | 704/25 |
| 7,328,250 | B2 ‡ | 2/2008 | Wang | H04L 51/12 | 709/20 |
| 7,345,670 | B2 ‡ | 3/2008 | Armstrong | G05G 9/04737 | 345/15 |
| 7,345,671 | B2 ‡ | 3/2008 | Robbin | G06F 1/1626 | 178/18 |
| 7,349,953 | B2 ‡ | 3/2008 | Lisitsa | G06F 3/023 | 709/20 |
| 7,353,139 | B1 ‡ | 4/2008 | Burrell | A61B 5/02438 | 701/49 |

(56) References Cited

U.S. PATENT DOCUMENTS 7,359,493 B1 ‡ 4/2008 Wang ..................... G06Q 30/02 379/88
7,359,671 B2 ‡ 4/2008 Richenstein ........... H04H 20/62 340/42
7,359,851 B2 ‡ 4/2008 Tong ..................... G06F 40/263 704/8
7,360,158 B1 ‡ 4/2008 Beeman ................. G06Q 30/02 715/70
7,362,738 B2 ‡ 4/2008 Taube ..................... H04L 67/18 370/33
7,363,227 B2 ‡ 4/2008 Mapes-Riordan ...... G10L 21/06 704/27
7,363,586 B1 ‡ 4/2008 Briggs .................... H04L 41/22 715/73
7,365,260 B2 ‡ 4/2008 Kawashima ......... G10H 1/0041 704/25
7,366,461 B1 ‡ 4/2008 Brown ............... G11B 20/1803 455/2
7,373,291 B2 ‡ 5/2008 Garst ....................... G06K 9/72 704/10
7,373,612 B2 ‡ 5/2008 Risch ...................... G06F 16/34 715/85
7,376,556 B2 ‡ 5/2008 Bennett ................... G06F 40/20 704/21
7,376,632 B1 ‡ 5/2008 Sadek ..................... G06F 40/56 706/12
7,376,645 B2 ‡ 5/2008 Bernard .................. G10L 15/26
7,378,963 B1 ‡ 5/2008 Begault .................... G08B 7/06 340/51
7,379,874 B2 ‡ 5/2008 Schmid ................... G10L 13/04 704/27
7,380,203 B2 ‡ 5/2008 Keely .................... G06K 9/222 704/23
7,383,170 B2 ‡ 6/2008 Mills ....................... G10L 15/01 704/27
7,386,438 B1 ‡ 6/2008 Franz .................... G06F 40/263 704/8
7,386,449 B2 ‡ 6/2008 Sun ..................... G10L 15/1822 704/25
7,386,799 B1 ‡ 6/2008 Clanton .................. A63F 13/12 715/75
7,389,224 B1 ‡ 6/2008 Elworthy ............ G06F 16/3341 704/9
7,389,225 B1 ‡ 6/2008 Jensen .................... G06F 40/30 704/9
7,392,185 B2 ‡ 6/2008 Bennett ................... G06F 40/20 704/24
7,394,947 B2 ‡ 7/2008 Li ........................ G06K 9/6297 382/30
7,398,209 B2 ‡ 7/2008 Kennewick ............. G10L 15/22 704/25
7,401,300 B2 ‡ 7/2008 Nurmi ................... G06F 1/1626 345/15
7,403,938 B2 ‡ 7/2008 Harrison ............. G06F 16/3334
7,403,941 B2 ‡ 7/2008 Bedworth ......... G06F 16/24522
7,404,143 B2 ‡ 7/2008 Freelander ............ G06F 40/232 715/25
7,409,337 B1 ‡ 8/2008 Potter ................... G06F 40/242 704/9
7,409,347 B1 ‡ 8/2008 Bellegarda ............. G10L 13/06 704/25
7,412,389 B2 ‡ 8/2008 Yang ....................... G06T 13/80 345/47
7,412,470 B2 ‡ 8/2008 Masuno .................... G06F 7/57 375/24
7,415,100 B2 ‡ 8/2008 Cooper ................. H04M 3/527 379/88
7,415,469 B2 ‡ 8/2008 Singh ...................... G06F 40/14
7,418,389 B2 ‡ 8/2008 Chu ........................ G10L 13/08 704/26
7,418,392 B1 ‡ 8/2008 Mozer ..................... G10L 15/26 315/30
7,426,467 B2 ‡ 9/2008 Nashida .............. H04L 12/2805 704/27
7,426,468 B2 ‡ 9/2008 Coifman ................. G10L 15/26 704/27
7,427,024 B1 ‡ 9/2008 Gazdzinski ............ G06Q 10/08 235/38
7,428,541 B2 ‡ 9/2008 Houle ..................... G06F 16/35
7,433,869 B2 ‡ 10/2008 Gollapudi ............. G06F 16/313
7,433,921 B2 ‡ 10/2008 Ludwig .................. G06Q 10/10 709/20
7,436,947 B2 ‡ 10/2008 Ordille ................ G06Q 10/107 379/21
7,441,184 B2 ‡ 10/2008 Frerebeau ............ G06F 16/258 715/23
7,443,316 B2 ‡ 10/2008 Lim ...................... G06F 3/0237 341/22
7,444,589 B2 ‡ 10/2008 Zellner ................ G06F 16/382 715/25
7,447,360 B2 ‡ 11/2008 Li .......................... G06K 9/222 382/18
7,447,624 B2 ‡ 11/2008 Fuhrmann ............... G06F 9/454 704/8
7,447,635 B1 ‡ 11/2008 Konopka ................ G10L 15/22 704/23
7,447,637 B1 ‡ 11/2008 Grant ...................... G06F 3/167 704/27
7,451,081 B1 ‡ 11/2008 Gajic ...................... G10L 15/07 704/23
7,454,351 B2 ‡ 11/2008 Jeschke ............... B60R 16/0373 704/27
7,460,652 B2 ‡ 12/2008 Chang ................... H04M 3/493 379/21
7,461,043 B2 ‡ 12/2008 Hess .................. G06F 9/44505 706/46
7,467,087 B1 ‡ 12/2008 Gillick .................. G10L 15/063 704/26
7,467,164 B2 ‡ 12/2008 Marsh .................. G11B 27/322
7,472,061 B1 ‡ 12/2008 Alewine ................. G10L 13/08 704/24
7,472,065 B2 ‡ 12/2008 Aaron ..................... G10L 13/08 704/25
7,475,010 B2 ‡ 1/2009 Chao ....................... G06F 40/30 704/10
7,475,015 B2 ‡ 1/2009 Epstein ............... G10L 15/1815 704/23
7,475,063 B2 ‡ 1/2009 Datta .................. G06F 16/3338
7,477,238 B2 ‡ 1/2009 Fux ....................... G06F 3/0237 341/22
7,477,240 B2 ‡ 1/2009 Yanagisawa ........ G06F 3/04886 178/18
7,478,037 B2 ‡ 1/2009 Strong ................ G10L 15/1822 704/9
7,478,091 B2 ‡ 1/2009 Mojsilovic ............ G06F 19/321
7,478,129 B1 ‡ 1/2009 Chemtob ............ H04L 12/1827 709/20
7,479,948 B2 ‡ 1/2009 Kim .................... G06F 3/04883 345/17
7,479,949 B2 ‡ 1/2009 Jobs .................... G06F 3/04886 345/17
7,483,832 B2 ‡ 1/2009 Tischer ................. G10L 13/033 704/25
7,483,894 B2 ‡ 1/2009 Cao ....................... G06F 16/951
7,487,089 B2 ‡ 2/2009 Mozer ...................... G07C 9/37 704/24
7,487,093 B2 ‡ 2/2009 Mutsuno ............... G10L 13/033 704/25
7,490,034 B2 ‡ 2/2009 Finnigan ............... G06F 40/242 704/10
7,490,039 B1 ‡ 2/2009 Shaffer ................... G10L 13/08 704/26
7,493,560 B1 ‡ 2/2009 Kipnes .................... G06F 9/453 715/72
7,496,498 B2 ‡ 2/2009 Chu ........................ G10L 13/08 704/2
7,496,512 B2 ‡ 2/2009 Zhao ....................... G10L 15/02 704/24

(56) References Cited

U.S. PATENT DOCUMENTS 7,499,923 B2 ‡ 3/2009 Kawatani ............. G06K 9/6218
7,502,738 B2 ‡ 3/2009 Kennewick ............. G10L 15/22 704/25
7,505,795 B1 ‡ 3/2009 Lim .................. H04W 52/0232 455/57
7,508,324 B2 ‡ 3/2009 Suraqui ................. G06F 40/274 341/22
7,508,373 B2 ‡ 3/2009 Lin ......................... G06F 3/018 345/15
7,516,123 B2 ‡ 4/2009 Betz ...................... G06F 16/951
7,519,327 B2 ‡ 4/2009 White ................ A63B 24/0021 455/41
7,519,398 B2 ‡ 4/2009 Hirose .............. H04M 1/72552 455/41
7,522,927 B2 ‡ 4/2009 Fitch ......................... G01S 5/12 455/45
7,523,036 B2 ‡ 4/2009 Akabane ................ G06Q 30/06 704/26
7,523,108 B2 ‡ 4/2009 Cao ......................... G06F 16/29
7,526,466 B2 ‡ 4/2009 Au .......................... G06F 40/30 706/55
7,526,738 B2 ‡ 4/2009 Ording ................ G06F 3/04842 715/86
7,528,713 B2 ‡ 5/2009 Singh .................... G01S 5/0252 340/53
7,529,671 B2 ‡ 5/2009 Rockenbeck ......... G10L 15/142 704/25
7,529,676 B2 ‡ 5/2009 Koyama ......................... 704/27
7,535,997 B1 ‡ 5/2009 McQuaide, Jr. ...... H04L 51/066 379/88
7,536,029 B2 ‡ 5/2009 Choi ..................... G01S 3/7864 348/14
7,536,565 B2 ‡ 5/2009 Girish .................. H05K 5/0278 713/30
7,538,685 B1 ‡ 5/2009 Cooper ............ H04M 1/72519 340/69
7,539,619 B1 ‡ 5/2009 Seligman ................ G10L 15/30 704/27
7,539,656 B2 ‡ 5/2009 Fratkina ................. G06N 5/042 706/45
7,541,940 B2 ‡ 6/2009 Upton ...................... G08B 1/08 340/68
7,542,967 B2 ‡ 6/2009 Hurst-Hiller ......... G06F 16/685
7,542,971 B2 ‡ 6/2009 Thione .................. G06F 40/166
7,543,232 B2 ‡ 6/2009 Easton, Jr. .............. G06F 9/453 715/70
7,546,382 B2 ‡ 6/2009 Healey ...................... G06F 8/00 704/1
7,546,529 B2 ‡ 6/2009 Reynar ................. G06F 40/274 715/25
7,548,895 B2 ‡ 6/2009 Pulsipher ............... G06Q 10/10 706/45
7,552,045 B2 ‡ 6/2009 Barliga ................. G06F 40/263 704/8
7,552,055 B2 ‡ 6/2009 Lecoeuche .......... H04M 3/4938 704/27
7,555,431 B2 ‡ 6/2009 Bennett ................... G10L 15/18 704/25
7,555,496 B1 ‡ 6/2009 Lantrip ................... G06F 16/34
7,558,381 B1 ‡ 7/2009 Ali ..................... H04M 1/6505 379/88
7,558,730 B2 ‡ 7/2009 Davis ...................... G10L 15/26 704/23
7,559,026 B2 ‡ 7/2009 Girish .................... H04N 7/142 715/71
7,561,069 B2 ‡ 7/2009 Horstemeyer ... G06Q 10/06311 340/99
7,562,007 B2 ‡ 7/2009 Hwang ................. G06F 40/263 704/8
7,562,032 B2 ‡ 7/2009 Abbosh .................. G06Q 20/20 455/45
7,565,104 B1 ‡ 7/2009 Brown ................... H04H 60/72 455/3
7,565,380 B1 ‡ 7/2009 Venkatachary ........... G06F 7/02
7,571,092 B1 ‡ 8/2009 Nieh ....................... G06F 9/454 704/2
7,571,106 B2 ‡ 8/2009 Cao ........................ G06Q 10/06 705/1
7,577,522 B2 ‡ 8/2009 Rosenberg ............. G01C 21/20 340/53
7,580,551 B1 ‡ 8/2009 Srihari ............... G06K 9/00161 340/5
7,580,576 B2 ‡ 8/2009 Wang .................. G06F 3/03545 345/17
7,580,839 B2 ‡ 8/2009 Tamura ................. G10L 13/033 379/88
7,584,093 B2 ‡ 9/2009 Potter ................... G06F 40/247 704/9
7,584,278 B2 ‡ 9/2009 Rajarajan .............. G06F 9/5055 709/22
7,584,429 B2 ‡ 9/2009 Fabritius ................. G06F 3/038 345/15
7,593,868 B2 ‡ 9/2009 Margiloff ............... G06Q 30/02 705/14
7,596,269 B2 ‡ 9/2009 King ..................... G06F 16/316 382/17
7,596,499 B2 ‡ 9/2009 Anguera Miro ........ G10L 13/08 704/27
7,596,606 B2 ‡ 9/2009 Codignotto ......... H04L 67/1097 709/20
7,596,765 B2 ‡ 9/2009 Almas ................... G06F 3/0482 715/85
7,599,918 B2 ‡ 10/2009 Shen ................... G06F 16/9535
7,603,349 B1 ‡ 10/2009 Kraft ...................... G06Q 10/10
7,603,381 B2 ‡ 10/2009 Burke .................. G06Q 10/063 705/7
7,606,444 B1 ‡ 10/2009 Erol ................... G06K 9/00711 382/30
7,609,179 B2 ‡ 10/2009 Diaz-Gutierrez ....... H03M 7/40 341/50
7,610,258 B2 ‡ 10/2009 Yuknewicz ........... G06F 3/0482
7,613,264 B2 ‡ 11/2009 Wells ...................... G10L 21/04 375/21
7,614,008 B2 ‡ 11/2009 Ording ................ G06F 3/04883 715/77
7,617,094 B2 ‡ 11/2009 Aoki ..................... H04M 3/564 370/26
7,620,407 B1 ‡ 11/2009 Donald ................... H04L 51/38 455/46
7,620,549 B2 ‡ 11/2009 Di Cristo .............. G06F 40/232 704/25
7,620,894 B1 ‡ 11/2009 Kahn .................... G06F 3/0481 715/70
7,623,119 B2 ‡ 11/2009 Autio .................. G06F 3/04883 345/17
7,624,007 B2 ‡ 11/2009 Bennett ................... G10L 15/22 704/9
7,627,481 B1 ‡ 12/2009 Kuo ...................... G10L 19/025 704/50
7,630,901 B2 ‡ 12/2009 Omi ........................ G06F 3/038 704/25
7,633,076 B2 ‡ 12/2009 Huppi ............... H04M 1/72563 250/55
7,634,409 B2 ‡ 12/2009 Kennewick ............. G10L 15/08 704/25
7,634,413 B1 ‡ 12/2009 Kuo ...................... G10L 19/035 704/22
7,634,718 B2 ‡ 12/2009 Nakajima ........... G06F 3/04883 715/20
7,634,732 B1 ‡ 12/2009 Blagsvedt ............. G06F 3/0481 707/99
7,636,657 B2 ‡ 12/2009 Ju ......................... G10L 15/193 704/10
7,640,158 B2 ‡ 12/2009 Detlef ................... G06F 40/232 704/23
7,640,160 B2 ‡ 12/2009 Di Cristo ................ G10L 15/22 704/25

(56) References Cited

U.S. PATENT DOCUMENTS 7,643,990 B1 ‡ 1/2010 Bellegarda ............ G10L 15/187 704/21
7,647,225 B2 ‡ 1/2010 Bennett ................. G10L 15/005 704/25
7,649,454 B2 ‡ 1/2010 Singh .................. G06Q 10/109 340/53
7,649,877 B2 ‡ 1/2010 Vieri ................... H04M 3/5322 370/35
7,653,883 B2 ‡ 1/2010 Hotelling .............. G06F 3/0485 715/86
7,656,393 B2 ‡ 2/2010 King ..................... G06F 1/1643 345/17
7,657,424 B2 ‡ 2/2010 Bennett .................... G09B 5/04 704/9
7,657,430 B2 2/2010 Ogawa
7,657,828 B2 ‡ 2/2010 Lucas ................. H04M 3/4938 715/20
7,657,844 B2 ‡ 2/2010 Gibson ................. G06F 16/957 715/82
7,657,849 B2 ‡ 2/2010 Chaudhri ............ G06F 3/04883 715/86
7,660,715 B1 2/2010 Thambiratnam
7,663,607 B2 ‡ 2/2010 Hotelling .............. G06F 3/0416 345/17
7,664,558 B2 ‡ 2/2010 Lindahl .................. G10L 21/04 700/94
7,664,638 B2 ‡ 2/2010 Cooper .................. G04G 21/06 704/23
7,668,710 B2 2/2010 Doyle
7,669,134 B1 ‡ 2/2010 Christie .................. H04L 51/04 715/75
7,672,841 B2 ‡ 3/2010 Bennett .................. G06F 40/42 704/21
7,672,952 B2 ‡ 3/2010 Isaacson ................ G06K 9/627 707/99
7,673,238 B2 ‡ 3/2010 Girish .................. G11B 27/005 715/71
7,673,251 B1 3/2010 Wibisono
7,673,340 B1 ‡ 3/2010 Cohen ................ H04M 11/3438 379/26
7,676,026 B1 ‡ 3/2010 Baxter, Jr. .......... H04M 1/2473 379/88
7,676,365 B2 ‡ 3/2010 Hwang ................. G10L 15/063 704/24
7,676,463 B2 ‡ 3/2010 Thompson ............ G06F 16/355 707/99
7,679,534 B2 ‡ 3/2010 Kay ..................... G06F 40/274 341/22
7,680,649 B2 ‡ 3/2010 Park ..................... G06F 40/268 704/10
7,681,126 B2 ‡ 3/2010 Roose .................. G06F 40/232 715/25
7,683,886 B2 ‡ 3/2010 Willey .................. G06F 3/0236 345/15
7,683,893 B2 ‡ 3/2010 Kim ..................... G06F 3/0488 178/18
7,684,985 B2 ‡ 3/2010 Dominach .............. G10L 15/22 704/23
7,684,990 B2 ‡ 3/2010 Caskey ................... G10L 15/22 704/25
7,684,991 B2 ‡ 3/2010 Stohr ..................... G06F 16/64 704/27
7,689,245 B2 ‡ 3/2010 Cox .................. H04M 3/42229 455/55
7,689,408 B2 ‡ 3/2010 Chen .................... G06F 40/295 704/8
7,689,409 B2 ‡ 3/2010 Heinecke .............. G06F 40/268 704/9
7,689,412 B2 3/2010 Wu et al.
7,689,421 B2 ‡ 3/2010 Li ........................ G10L 13/033 704/25
7,689,916 B1 3/2010 Goel et al.
7,693,715 B2 ‡ 4/2010 Hwang ................... G10L 13/08 704/25
7,693,717 B2 ‡ 4/2010 Kahn ...................... G10L 15/22 704/26
7,693,719 B2 ‡ 4/2010 Chu ..................... G10L 13/033 704/25
7,693,720 B2 ‡ 4/2010 Kennewick ......... G06F 16/3329 704/27
7,698,131 B2 ‡ 4/2010 Bennett ................. G06F 16/951 704/21
7,698,136 B1 4/2010 Nguyen et al.
7,702,500 B2 ‡ 4/2010 Blaedow ................. G06F 40/40 704/9
7,702,508 B2 ‡ 4/2010 Bennett ................... G06F 40/42 704/25
7,703,091 B1 ‡ 4/2010 Martin ...................... G06F 8/61 717/17
7,706,510 B2 ‡ 4/2010 Ng .................... H04M 1/72552 379/88
7,707,026 B2 ‡ 4/2010 Liu ........................ G06F 40/47 704/7
7,707,027 B2 ‡ 4/2010 Balchandran ......... G06F 40/216 704/9
7,707,032 B2 ‡ 4/2010 Wang ...................... G10L 15/08 704/23
7,707,221 B1 ‡ 4/2010 Dunning ................. G06F 16/68 707/77
7,707,226 B1 4/2010 Tonse
7,707,267 B2 ‡ 4/2010 Lisitsa .................... G06F 3/038 709/20
7,710,262 B2 ‡ 5/2010 Ruha .................. A61B 5/02055 340/53
7,711,129 B2 ‡ 5/2010 Lindahl .................. H03G 5/165 381/10
7,711,550 B1 ‡ 5/2010 Feinberg ............... G06F 40/295 704/9
7,711,565 B1 ‡ 5/2010 Gazdzinski ............... B66B 3/00 187/39
7,711,672 B2 ‡ 5/2010 Au ......................... G06F 40/30 706/55
7,712,053 B2 ‡ 5/2010 Bradford ............... G06F 3/0233 715/86
7,716,056 B2 ‡ 5/2010 Weng .................... G06F 40/295 704/27
7,716,077 B1 5/2010 Mikurak
7,716,216 B1 ‡ 5/2010 Harik .................... G06F 16/951 707/72
7,720,674 B2 ‡ 5/2010 Kaiser ............... G06F 16/24522 704/9
7,720,683 B1 ‡ 5/2010 Vermeulen ............. G10L 15/22 704/23
7,721,226 B2 ‡ 5/2010 Barabe .................. G06F 3/0482 715/70
7,721,301 B2 ‡ 5/2010 Wong ...................... G10L 15/26 455/56
7,724,242 B2 ‡ 5/2010 Hillis ...................... G06F 3/011 345/17
7,724,696 B1 ‡ 5/2010 Parekh .................. G06F 1/3203 370/31
7,725,307 B2 ‡ 5/2010 Bennett ................. G06F 16/243 704/9
7,725,318 B2 ‡ 5/2010 Gavalda .................. G10L 15/32 704/25
7,725,320 B2 ‡ 5/2010 Bennett ................. G06F 40/289 704/25
7,725,321 B2 ‡ 5/2010 Bennett ............... G06F 16/3344 704/25
7,725,419 B2 5/2010 Lee et al.
7,725,838 B2 ‡ 5/2010 Williams ............ H04M 1/2748 715/81
7,729,904 B2 ‡ 6/2010 Bennett ................. G06F 16/243 704/21
7,729,916 B2 ‡ 6/2010 Coffman ............. H04M 3/4938 704/27
7,734,461 B2 ‡ 6/2010 Kwak ................... G06F 40/205 704/9

(56) References Cited

U.S. PATENT DOCUMENTS 7,735,012 B2 ‡ 6/2010 Naik ........ G11B 27/10 715/72
7,739,588 B2 ‡ 6/2010 Reynar ........ G06F 40/169 715/23
7,742,953 B2 ‡ 6/2010 King ........ G06F 16/41 705/26
7,743,188 B2 ‡ 6/2010 Haitani ........ H04M 1/27475 710/67
7,747,616 B2 ‡ 6/2010 Yamada ........ G06F 16/156 707/72
7,752,152 B2 ‡ 7/2010 Paek ........ G10L 15/22 706/20
7,756,707 B2 7/2010 Garner et al.
7,756,708 B2 ‡ 7/2010 Cohen ........ G10L 15/065 704/24
7,756,868 B2 ‡ 7/2010 Lee ........ G06F 16/951 707/72
7,756,871 B2 ‡ 7/2010 Yacoub ........ G06K 9/00463 707/73
7,757,173 B2 ‡ 7/2010 Beaman ........ G06F 3/167 715/72
7,757,176 B2 7/2010 Vakil et al.
7,757,182 B2 ‡ 7/2010 Elliott ........ G06F 3/0481 715/77
7,761,296 B1 ‡ 7/2010 Bakis ........ G10L 13/02 704/23
7,763,842 B2 ‡ 7/2010 Hsu ........ G06F 1/1613 250/22
7,770,104 B2 8/2010 Scopes
7,774,202 B2 8/2010 Spengler et al.
7,774,204 B2 ‡ 8/2010 Mozer ........ G10L 15/26 315/30
7,774,388 B1 ‡ 8/2010 Runchey ........ G06F 16/95 707/81
7,774,753 B1 8/2010 Reilly et al.
7,777,717 B2 ‡ 8/2010 Fux ........ G06F 40/274 345/15
7,778,432 B2 ‡ 8/2010 Larsen ........ H04R 25/554 381/31
7,778,595 B2 ‡ 8/2010 White ........ G06Q 30/0267 455/3
7,778,632 B2 ‡ 8/2010 Kurlander ........ H04M 1/72566 348/61
7,778,830 B2 ‡ 8/2010 Davis ........ G10L 15/19 704/23
7,779,069 B2 8/2010 Frid-Nielsen et al.
7,779,353 B2 ‡ 8/2010 Grigoriu ........ G06F 40/14 715/25
7,779,356 B2 ‡ 8/2010 Griesmer ........ G06F 8/33 715/70
7,779,357 B2 ‡ 8/2010 Naik ........ G11B 27/10 715/72
7,783,283 B2 ‡ 8/2010 Kuusinen ........ H04M 1/575 455/41
7,783,486 B2 ‡ 8/2010 Rosser ........ G10L 13/00 704/27
7,788,590 B2 ‡ 8/2010 Taboada ........ G06F 9/451 715/76
7,788,663 B2 ‡ 8/2010 Illowsky ........ G06F 1/3203 717/17
7,796,980 B1 ‡ 9/2010 McKinney ........ H04H 60/25 379/26
7,797,265 B2 ‡ 9/2010 Brinker ........ G06F 16/353 706/45
7,797,269 B2 ‡ 9/2010 Rieman ........ G06F 40/274 706/62
7,797,331 B2 ‡ 9/2010 Theimer ........ H04M 1/7255 707/76
7,797,338 B2 9/2010 Feng et al.
7,797,629 B2 ‡ 9/2010 Fux ........ G06F 40/274 715/25
7,801,721 B2 ‡ 9/2010 Rosart ........ G06F 3/0484 704/8
7,801,728 B2 ‡ 9/2010 Ben-David ........ G10L 15/26 704/27
7,801,729 B2 ‡ 9/2010 Mozer ........ G10L 15/26 704/25
7,805,299 B2 ‡ 9/2010 Coifman ........ G10L 15/065 704/23
7,809,550 B1 ‡ 10/2010 Barrows ........ G06F 40/129 704/4
7,809,565 B2 ‡ 10/2010 Coifman ........ G10L 15/08 704/23
7,809,569 B2 ‡ 10/2010 Attwater ........ G10L 15/08 704/23
7,809,570 B2 ‡ 10/2010 Kennewick ........ G10L 15/22 704/25
7,809,610 B2 ‡ 10/2010 Cao ........ G06Q 10/0620 705/26
7,809,744 B2 ‡ 10/2010 Nevidomski ........ G06F 16/90344 707/75
7,813,729 B2 10/2010 Lee et al.
7,818,165 B2 ‡ 10/2010 Carlgren ........ G06F 40/263 704/8
7,818,176 B2 ‡ 10/2010 Freeman ........ G06Q 30/0242 704/27
7,818,215 B2 ‡ 10/2010 King ........ G06Q 30/0623 705/26
7,818,291 B2 ‡ 10/2010 Ferguson ........ G06F 16/2428 707/60
7,818,672 B2 ‡ 10/2010 McCormack ........ G06F 3/048 715/70
7,822,608 B2 ‡ 10/2010 Cross, Jr. ........ G10L 15/22 704/25
7,823,123 B2 ‡ 10/2010 Sabbouh ........ G06F 16/972 717/10
7,826,945 B2 ‡ 11/2010 Zhang ........ G08G 1/096775 701/36
7,827,047 B2 ‡ 11/2010 Anderson ........ G06Q 10/02 705/5
7,831,246 B1 11/2010 Smith et al.
7,831,423 B2 ‡ 11/2010 Schubert ........ G06F 40/157 704/24
7,831,426 B2 ‡ 11/2010 Bennett ........ G10L 15/18 704/25
7,831,432 B2 ‡ 11/2010 Bodin ........ G11B 27/34 704/26
7,835,504 B1 11/2010 Donald et al.
7,836,437 B2 ‡ 11/2010 Kacmarcik ........ A63F 13/10 717/13
7,840,348 B2 ‡ 11/2010 Kim ........ G01C 21/36 340/98
7,840,400 B2 ‡ 11/2010 Lavi ........ G06F 40/30 704/9
7,840,447 B2 ‡ 11/2010 Kleinrock ........ G06Q 30/0283 705/26
7,840,581 B2 ‡ 11/2010 Ross ........ G06F 16/48 707/75
7,840,912 B2 ‡ 11/2010 Elias ........ G06F 3/04883 715/86
7,844,394 B2 ‡ 11/2010 Kim ........ G01C 21/36 340/99
7,848,924 B2 ‡ 12/2010 Nurminen ........ G10L 13/033 704/22
7,848,926 B2 ‡ 12/2010 Goto ........ G10L 15/06 704/23
7,853,444 B2 ‡ 12/2010 Wang ........ G06F 40/44 704/2
7,853,445 B2 ‡ 12/2010 Bachenko ........ G06F 40/268 704/9
7,853,574 B2 ‡ 12/2010 Kraenzel ........ G06F 16/9535 707/70
7,853,577 B2 ‡ 12/2010 Sundaresan ........ G06Q 30/08 707/70
7,853,664 B1 ‡ 12/2010 Wang ........ G06Q 30/06 379/88

(56) References Cited

U.S. PATENT DOCUMENTS 7,853,900 B2 ‡ 12/2010 Nguyen ................ G06Q 30/00 715/86
7,861,164 B2 12/2010 Qin
7,865,817 B2 ‡ 1/2011 Ryan ...................... G06F 3/147 715/23
7,869,998 B1 1/2011 Fabbrizio et al.
7,869,999 B2 ‡ 1/2011 Amato ................... G10L 13/08 704/25
7,870,118 B2 ‡ 1/2011 Jiang .................. G06F 16/3347 707/70
7,870,133 B2 ‡ 1/2011 Krishnamoorthy ... G06F 16/355 707/73
7,873,149 B2 1/2011 Schultz et al.
7,873,519 B2 ‡ 1/2011 Bennett .............. G06F 16/3329 704/25
7,873,523 B2 1/2011 Potter et al.
7,873,654 B2 ‡ 1/2011 Bernard ............. G06F 16/3329 707/76
7,877,705 B2 ‡ 1/2011 Chambers ............ G06F 3/0485 715/83
7,880,730 B2 ‡ 2/2011 Robinson ............. G06F 3/0489 345/17
7,881,283 B2 ‡ 2/2011 Cormier ........... H04M 1/72563 340/40
7,881,936 B2 ‡ 2/2011 Longe .................... G10L 15/24 704/25
7,885,390 B2 ‡ 2/2011 Chaudhuri ........ H04M 3/42153 379/26
7,885,844 B1 ‡ 2/2011 Cohen ................... G06Q 10/10
7,886,233 B2 ‡ 2/2011 Rainisto ................ G06F 3/0237 715/77
7,889,101 B2 2/2011 Yokota
7,889,184 B2 ‡ 2/2011 Blumenberg ......... G06F 3/0482 345/17
7,889,185 B2 ‡ 2/2011 Blumenberg ......... G06F 3/0488 345/17
7,890,329 B2 2/2011 Wu et al.
7,890,330 B2 ‡ 2/2011 Ozkaragoz ............. G10L 13/06 434/15
7,890,652 B2 ‡ 2/2011 Bull ...................... G06Q 10/02 709/23
7,895,039 B2 2/2011 Braho et al.
7,895,531 B2 ‡ 2/2011 Radtke ................. G06F 40/166 715/81
7,899,666 B2 ‡ 3/2011 Varone ................. G06F 40/247 704/9
7,904,297 B2 3/2011 Mirkovic et al.
7,908,287 B1 ‡ 3/2011 Katragadda ........... G06F 40/274 707/76
7,912,289 B2 ‡ 3/2011 Kansal .................. G06K 9/325 358/1
7,912,699 B1 ‡ 3/2011 Saraclar ................ G10L 15/142 704/9
7,912,702 B2 ‡ 3/2011 Bennett ................... G10L 15/30 704/9
7,912,720 B1 ‡ 3/2011 Hakkani-Tur ........ G06F 40/253 704/27
7,912,828 B2 ‡ 3/2011 Bonnet ................. G06F 40/279 707/70
7,913,185 B1 ‡ 3/2011 Benson ................. G06F 16/958 715/80
7,916,979 B2 ‡ 3/2011 Simmons .............. G06K 9/222 382/18
7,917,364 B2 3/2011 Yacoub
7,917,367 B2 ‡ 3/2011 Di Cristo ............. G06F 16/335 704/27
7,917,497 B2 ‡ 3/2011 Harrison ............. G06F 16/3334 707/71
7,920,678 B2 ‡ 4/2011 Cooper ................. H04M 3/527 379/8
7,920,682 B2 ‡ 4/2011 Byrne ................... H04M 1/645 379/88
7,920,857 B2 ‡ 4/2011 Lau ...................... G06Q 10/109 455/41
7,925,525 B2 ‡ 4/2011 Chin .................... G06Q 10/109 340/53
7,925,610 B2 ‡ 4/2011 Elbaz ....................... G06N 5/02 706/55
7,929,805 B2 ‡ 4/2011 Wang ...................... G06K 9/00 382/29
7,930,168 B2 ‡ 4/2011 Weng ...................... G10L 15/19 704/1
7,930,183 B2 ‡ 4/2011 Odell ..................... G10L 15/26 704/27
7,930,197 B2 ‡ 4/2011 Ozzie .................. G06Q 10/063 705/7
7,933,399 B2 4/2011 Knott et al.
7,936,339 B2 ‡ 5/2011 Marggraff ............ G06F 3/0227 345/15
7,936,861 B2 ‡ 5/2011 Knott .................... H04M 3/493 379/72
7,936,863 B2 5/2011 John et al.
7,937,075 B2 5/2011 Zellner
7,941,009 B2 ‡ 5/2011 Li ..................... G06K 9/00664 382/30
7,945,294 B2 ‡ 5/2011 Zhang .................. H04M 1/271 379/88
7,945,470 B1 ‡ 5/2011 Cohen ................... G06Q 10/06 705/7
7,949,529 B2 ‡ 5/2011 Weider .................... G10L 15/22 704/27
7,949,534 B2 ‡ 5/2011 Davis ...................... G10L 15/26 704/10
7,949,752 B2 5/2011 White et al.
7,953,679 B2 ‡ 5/2011 Chidlovskii ....... G06K 9/00463 706/18
7,957,975 B2 ‡ 6/2011 Burns ..................... G10L 15/22 704/27
7,958,136 B1 ‡ 6/2011 Curtis .................. G06F 16/313 707/75
7,962,179 B2 ‡ 6/2011 Huang ................ H04M 1/0237 345/65
7,974,835 B2 7/2011 Balchandran et al.
7,974,844 B2 ‡ 7/2011 Sumita ................ G10L 15/1815 704/23
7,974,972 B2 ‡ 7/2011 Cao ........................ G06F 16/29 707/72
7,975,216 B2 ‡ 7/2011 Woolf ................ G06F 16/9558 715/23
7,983,478 B2 ‡ 7/2011 Liu ...................... G06K 9/6297 382/16
7,983,915 B2 ‡ 7/2011 Knight .................... G10L 15/26 704/25
7,983,917 B2 ‡ 7/2011 Kennewick ............. G10L 15/08 704/25
7,983,919 B2 ‡ 7/2011 Conkie .................. G10L 13/08 704/26
7,983,997 B2 ‡ 7/2011 Allen ..................... G06F 3/038 706/12
7,984,062 B2 ‡ 7/2011 Dunning ................ G06F 16/68 707/76
7,986,431 B2 ‡ 7/2011 Emori .................. G06F 3/1204 358/1
7,987,151 B2 ‡ 7/2011 Schott ................... G06N 5/043 706/62
7,987,176 B2 7/2011 Latzina et al.
7,987,244 B1 ‡ 7/2011 Lewis ................... G10L 13/033 709/21
7,991,614 B2 ‡ 8/2011 Washio .................. G10L 15/05 704/21
7,992,085 B2 ‡ 8/2011 Wang-Aryattanwanich ............... G06F 16/9558 715/71
7,996,228 B2 ‡ 8/2011 Miller .................... G10L 15/30 379/11
7,996,589 B2 ‡ 8/2011 Schultz .............. G06F 3/04895 710/73

(56) References Cited

U.S. PATENT DOCUMENTS 7,996,769 B2 ‡ 8/2011 Fux ........ G06F 40/232 715/25
7,996,792 B2 ‡ 8/2011 Anzures ........ G11B 27/34 715/86
7,999,669 B2 ‡ 8/2011 Singh ........ G06Q 10/109 340/53
8,000,453 B2 ‡ 8/2011 Cooper ........ H04M 3/527 379/88
8,001,125 B1 8/2011 Magdalin et al.
8,005,664 B2 ‡ 8/2011 Hanumanthappa ... G06F 40/129 704/4
8,005,679 B2 ‡ 8/2011 Jordan ........ G06F 3/16 704/27
8,006,180 B2 ‡ 8/2011 Tunning ........ G06F 40/232 715/25
8,010,367 B2 8/2011 Muschett et al.
8,010,614 B1 8/2011 Musat et al.
8,014,308 B2 ‡ 9/2011 Gates, III ........ H04L 12/66 370/25
8,015,006 B2 ‡ 9/2011 Kennewick ........ G10L 15/22 704/23
8,015,011 B2 ‡ 9/2011 Nagano ........ G10L 13/07 704/25
8,015,144 B2 ‡ 9/2011 Zheng ........ G01C 21/20 706/52
8,018,431 B1 ‡ 9/2011 Zehr ........ G06F 1/1626 345/15
8,019,271 B1 ‡ 9/2011 Izdepski ........ H04H 60/73 455/3
8,019,604 B2 9/2011 Ma
8,020,104 B2 9/2011 Robarts et al.
8,024,195 B2 ‡ 9/2011 Mozer ........ G10L 15/22 704/27
8,024,415 B2 ‡ 9/2011 Horvitz ........ G05B 19/404 709/20
8,027,836 B2 ‡ 9/2011 Baker ........ G10L 19/0018 704/26
8,031,943 B2 ‡ 10/2011 Chen ........ G06F 9/543 382/18
8,032,383 B1 ‡ 10/2011 Bhardwaj ........ G10L 15/30 704/27
8,032,409 B1 10/2011 Mikurak
8,036,901 B2 ‡ 10/2011 Mozer ........ G10L 15/22 704/27
8,037,034 B2 ‡ 10/2011 Plachta ........ H03M 7/3088 707/69
8,041,557 B2 ‡ 10/2011 Liu ........ G06F 40/242 704/7
8,041,570 B2 ‡ 10/2011 Mirkovic ........ G06F 40/40 704/27
8,041,611 B2 ‡ 10/2011 Kleinrock ........ G06Q 30/0283 705/26
8,042,053 B2 ‡ 10/2011 Darwish ........ G06F 40/131 715/76
8,046,231 B2 10/2011 Hirota et al.
8,046,363 B2 ‡ 10/2011 Cha ........ G06F 16/355 707/73
8,046,374 B1 ‡ 10/2011 Bromwich ........ H04L 63/1466 707/75
8,050,500 B1 ‡ 11/2011 Batty ........ G06K 9/00429 382/18
8,050,919 B2 11/2011 Das
8,054,180 B1 11/2011 Scofield et al.
8,055,296 B1 11/2011 Persson et al.
8,055,502 B2 ‡ 11/2011 Clark ........ G10L 15/22 704/24
8,055,708 B2 ‡ 11/2011 Chitsaz ........ H04L 63/0245 709/20
8,056,070 B2 ‡ 11/2011 Goller ........ G06F 8/65 704/23
8,060,824 B2 ‡ 11/2011 Brownrigg, Jr. ...... G06F 3/0483 715/71
8,064,753 B2 ‡ 11/2011 Freeman ........ G11B 27/034 386/33
8,065,143 B2 ‡ 11/2011 Yanagihara ........ G10L 15/26 455/56
8,065,155 B1 ‡ 11/2011 Gazdzinski ........ B66B 1/24 704/27
8,065,156 B2 ‡ 11/2011 Gazdzinski ........ G05D 23/1917 704/27
8,068,604 B2 ‡ 11/2011 Leeds ........ H04M 1/656 379/16
8,069,046 B2 ‡ 11/2011 Kennewick ........ G10L 15/183 704/25
8,069,422 B2 ‡ 11/2011 Sheshagiri ........ H04L 12/2803 715/74
8,073,681 B2 ‡ 12/2011 Baldwin ........ G06F 40/30 704/9
8,073,695 B1 ‡ 12/2011 Hendricks ........ G09B 5/065 379/88
8,077,153 B2 ‡ 12/2011 Benko ........ G06F 3/0488 345/17
8,078,473 B1 ‡ 12/2011 Gazdzinski ........ B66B 3/002 704/27
8,078,978 B2 12/2011 Perry et al.
8,082,153 B2 ‡ 12/2011 Coffman ........ H04M 3/4936 704/27
8,082,498 B2 ‡ 12/2011 Salamon ........ G06F 40/232 715/25
8,090,571 B2 ‡ 1/2012 Elshishiny ........ G06F 40/242 704/9
8,095,364 B2 ‡ 1/2012 Longe ........ G10L 15/24 704/25
8,099,289 B2 ‡ 1/2012 Mozer ........ G10L 15/30 704/27
8,099,395 B2 ‡ 1/2012 Pabla ........ G06F 16/9577 707/66
8,099,418 B2 ‡ 1/2012 Inoue ........ G06F 16/90335 707/74
8,103,510 B2 ‡ 1/2012 Sato ........ B60R 16/0373 704/23
8,103,947 B2 1/2012 Lunt et al.
8,107,401 B2 ‡ 1/2012 John ........ G06Q 10/107 370/25
8,112,275 B2 ‡ 2/2012 Kennewick ........ G10L 15/22 704/24
8,112,280 B2 ‡ 2/2012 Lu ........ G10L 15/222 704/27
8,117,026 B2 2/2012 Lee et al.
8,117,037 B2 ‡ 2/2012 Gazdzinski ........ B66B 3/008 704/27
8,117,542 B2 ‡ 2/2012 Radtke ........ G06F 9/451 715/70
8,121,413 B2 ‡ 2/2012 Hwang ........ G06F 16/957 382/18
8,121,837 B2 ‡ 2/2012 Agapi ........ G10L 21/0208 704/23
8,122,094 B1 ‡ 2/2012 Kotab ........ H04N 21/2747 706/52
8,122,353 B2 ‡ 2/2012 Bouta ........ G06F 40/129 715/26
8,130,929 B2 3/2012 Wilkes et al.
8,131,557 B2 ‡ 3/2012 Davis ........ G10L 15/26 704/10
8,135,115 B1 ‡ 3/2012 Hogg, Jr. ........ H04M 1/64 379/88
8,138,912 B2 ‡ 3/2012 Singh ........ G01S 5/0252 340/53
8,140,330 B2 3/2012 Cevik et al.
8,140,335 B2 ‡ 3/2012 Kennewick ........ G06Q 30/0261 704/25
8,140,368 B2 3/2012 Eggenberger et al.
8,140,567 B2 ‡ 3/2012 Padovitz ........ G06F 16/93 707/76
8,145,489 B2 3/2012 Freeman et al.
8,150,694 B2 ‡ 4/2012 Kennewick ........ G10L 15/183 704/25

(56) References Cited

U.S. PATENT DOCUMENTS

| | | | | |
|---|---|---|---|---|
| 8,150,700 | B2 ‡ | 4/2012 | Shin | G06F 3/167 704/27 |
| 8,155,956 | B2 ‡ | 4/2012 | Cho | G10L 15/005 704/23 |
| 8,156,005 | B2 ‡ | 4/2012 | Vieri | G06Q 30/0241 705/14 |
| 8,160,877 | B1 | 4/2012 | Nucci et al. | |
| 8,160,883 | B2 ‡ | 4/2012 | Lecoeuche | H04M 1/72561 379/88 |
| 8,165,321 | B2 ‡ | 4/2012 | Paquier | H04S 1/007 381/11 |
| 8,165,886 | B1 ‡ | 4/2012 | Gagnon | G10L 15/19 704/27 |
| 8,166,019 | B1 ‡ | 4/2012 | Lee | G06Q 10/02 707/70 |
| 8,166,032 | B2 ‡ | 4/2012 | Sommer | G06F 16/355 707/73 |
| 8,170,790 | B2 ‡ | 5/2012 | Lee | G01C 21/26 701/40 |
| 8,170,966 | B1 | 5/2012 | Musat et al. | |
| 8,171,137 | B1 | 5/2012 | Parks et al. | |
| 8,175,872 | B2 | 5/2012 | Kristjansson et al. | |
| 8,175,876 | B2 | 5/2012 | Bou-Ghazale et al. | |
| 8,179,370 | B1 ‡ | 5/2012 | Yamasani | G06F 3/0237 345/16 |
| 8,188,856 | B2 ‡ | 5/2012 | Singh | G06Q 10/109 340/53 |
| 8,190,359 | B2 ‡ | 5/2012 | Bourne | G01C 21/20 701/41 |
| 8,190,596 | B2 | 5/2012 | Nambiar et al. | |
| 8,194,827 | B2 | 6/2012 | Jaiswal et al. | |
| 8,195,460 | B2 | 6/2012 | Degani et al. | |
| 8,195,467 | B2 ‡ | 6/2012 | Mozer | G10L 15/30 704/27 |
| 8,195,468 | B2 ‡ | 6/2012 | Weider | G10L 15/22 704/27 |
| 8,200,489 | B1 | 6/2012 | Baggenstoss | |
| 8,200,495 | B2 ‡ | 6/2012 | Braho | G10L 15/065 704/27 |
| 8,201,109 | B2 ‡ | 6/2012 | Van Os | G06F 40/166 715/86 |
| 8,204,238 | B2 ‡ | 6/2012 | Mozer | H04B 11/00 340/38 |
| 8,205,788 | B1 ‡ | 6/2012 | Gazdzinski | G06Q 10/08 235/37 |
| 8,209,183 | B1 ‡ | 6/2012 | Patel | G06F 40/232 704/27 |
| 8,213,911 | B2 | 7/2012 | Williams et al. | |
| 8,219,115 | B1 ‡ | 7/2012 | Nelissen | H04W 4/021 455/45 |
| 8,219,406 | B2 ‡ | 7/2012 | Yu | G06F 3/038 704/27 |
| 8,219,407 | B1 ‡ | 7/2012 | Roy | G10L 15/1815 704/27 |
| 8,219,555 | B1 | 7/2012 | Mianji | |
| 8,219,608 | B2 ‡ | 7/2012 | alSafadi | A61B 5/00 709/20 |
| 8,224,649 | B2 ‡ | 7/2012 | Chaudhari | G10L 17/00 704/24 |
| 8,224,757 | B2 | 7/2012 | Bohle | |
| 8,228,299 | B1 ‡ | 7/2012 | Maloney | G06Q 20/14 345/17 |
| 8,233,919 | B2 | 7/2012 | Haag et al. | |
| 8,234,111 | B2 | 7/2012 | Lloyd et al. | |
| 8,239,206 | B1 | 8/2012 | LeBeau et al. | |
| 8,239,207 | B2 ‡ | 8/2012 | Seligman | G10L 15/30 704/27 |
| 8,244,545 | B2 | 8/2012 | Paek et al. | |
| 8,244,712 | B2 ‡ | 8/2012 | Serlet | G06F 16/173 707/71 |
| 8,250,071 | B1 | 8/2012 | Killalea et al. | |
| 8,254,829 | B1 | 8/2012 | Kindred et al. | |
| 8,255,216 | B2 | 8/2012 | White | |
| 8,255,217 | B2 ‡ | 8/2012 | Stent | G10L 15/06 704/24 |
| 8,260,117 | B1 | 9/2012 | Xu et al. | |
| 8,260,247 | B2 | 9/2012 | Lazaridis et al. | |
| 8,260,617 | B2 ‡ | 9/2012 | Dhanakshirur | G10L 15/22 379/88 |
| 8,260,619 | B1 | 9/2012 | Bansal et al. | |
| 8,270,933 | B2 ‡ | 9/2012 | Riemer | H04M 1/72577 455/34 |
| 8,271,287 | B1 | 9/2012 | Kermani | |
| 8,275,621 | B2 ‡ | 9/2012 | Alewine | G10L 13/08 704/23 |
| 8,275,736 | B2 | 9/2012 | Guo et al. | |
| 8,279,171 | B2 ‡ | 10/2012 | Hirai | G10L 15/22 345/15 |
| 8,280,438 | B2 | 10/2012 | Barbera | |
| 8,285,546 | B2 ‡ | 10/2012 | Reich | G10L 15/187 704/25 |
| 8,285,551 | B2 ‡ | 10/2012 | Gazdzinski | G10L 15/00 704/27 |
| 8,285,553 | B2 ‡ | 10/2012 | Gazdzinski | G06Q 30/0259 704/27 |
| 8,285,737 | B1 | 10/2012 | Lynn et al. | |
| 8,290,777 | B1 ‡ | 10/2012 | Nguyen | G10L 13/00 345/15 |
| 8,290,778 | B2 ‡ | 10/2012 | Gazdzinski | G10L 13/00 704/27 |
| 8,290,781 | B2 ‡ | 10/2012 | Gazdzinski | G06F 3/14 704/27 |
| 8,296,124 | B1 ‡ | 10/2012 | Holsztynska | G06F 40/51 704/2 |
| 8,296,145 | B2 ‡ | 10/2012 | Clark | G10L 15/22 704/24 |
| 8,296,146 | B2 ‡ | 10/2012 | Gazdzinski | G10L 15/02 704/27 |
| 8,296,153 | B2 ‡ | 10/2012 | Gazdzinski | G01C 21/206 704/27 |
| 8,296,380 | B1 ‡ | 10/2012 | Kelly | H04L 51/32 709/20 |
| 8,296,383 | B2 ‡ | 10/2012 | Lindahl | G10L 15/30 709/20 |
| 8,300,776 | B2 | 10/2012 | Davies et al. | |
| 8,300,801 | B2 ‡ | 10/2012 | Sweeney | H04M 9/08 379/39 |
| 8,301,456 | B2 ‡ | 10/2012 | Gazdzinski | G06F 3/0488 704/27 |
| 8,311,189 | B2 | 11/2012 | Champlin et al. | |
| 8,311,834 | B1 ‡ | 11/2012 | Gazdzinski | B66B 3/006 704/27 |
| 8,311,835 | B2 ‡ | 11/2012 | Lecoeuche | H04M 1/72561 704/27 |
| 8,311,838 | B2 ‡ | 11/2012 | Lindahl | G06F 3/167 704/27 |
| 8,312,017 | B2 ‡ | 11/2012 | Martin | G06Q 30/02 707/73 |
| 8,321,786 | B2 ‡ | 11/2012 | Lunati | G06F 40/232 715/25 |
| 8,326,627 | B2 | 12/2012 | Kennewick et al. | |
| 8,332,205 | B2 | 12/2012 | Krishnan et al. | |
| 8,332,218 | B2 ‡ | 12/2012 | Cross, Jr. | 704/23 |
| 8,332,224 | B2 ‡ | 12/2012 | Di Cristo | G10L 15/22 704/25 |
| 8,332,748 | B1 ‡ | 12/2012 | Karam | G06F 16/3338 715/24 |
| 8,335,689 | B2 | 12/2012 | Wittenstein et al. | |
| 8,340,975 | B1 ‡ | 12/2012 | Rosenberger | G10L 15/22 704/27 |
| 8,345,665 | B2 ‡ | 1/2013 | Vieri | H04M 3/5322 370/35 |
| 8,346,563 | B1 | 1/2013 | Hjelm et al. | |
| 8,346,757 | B1 | 1/2013 | Lamping et al. | |
| 8,352,183 | B2 ‡ | 1/2013 | Thota | G06Q 10/107 340/99 |
| 8,352,268 | B2 ‡ | 1/2013 | Naik | G10L 13/033 704/25 |

(56) References Cited

U.S. PATENT DOCUMENTS 8,352,272 B2 ‡ 1/2013 Rogers .................... G10L 13/00 704/26
8,355,919 B2 ‡ 1/2013 Silverman ............... G10L 13/08 704/26
8,359,234 B2 ‡ 1/2013 Vieri .................... G06Q 10/107 705/14
8,370,145 B2 2/2013 Endo et al.
8,370,158 B2 ‡ 2/2013 Gazdzinski ............. B66B 3/008 704/27
8,371,503 B2 ‡ 2/2013 Gazdzinski ............ G06Q 10/08 235/38
8,374,871 B2 ‡ 2/2013 Ehsani .................. G10L 15/005 704/25
8,375,320 B2 ‡ 2/2013 Kotler .................. G06Q 10/109 709/20
8,380,504 B1 ‡ 2/2013 Peden ................... G10L 13/086 704/20
8,380,507 B2 ‡ 2/2013 Herman ................ G10L 13/033 704/26
8,381,107 B2 ‡ 2/2013 Rottler .................. G06F 3/0482 715/72
8,381,135 B2 ‡ 2/2013 Hotelling .............. G06F 3/0485 715/86
8,386,485 B2 ‡ 2/2013 Kerschberg ......... G06F 16/3326 707/73
8,386,926 B1 ‡ 2/2013 Matsuoka ............. G06F 40/232 715/25
8,391,844 B2 ‡ 3/2013 Novick ............... H04M 1/7255 379/67
8,396,714 B2 ‡ 3/2013 Rogers .................... G10L 13/08 704/25
8,396,715 B2 3/2013 Odell et al.
8,401,163 B1 3/2013 Kirchhoff et al.
8,406,745 B1 ‡ 3/2013 Upadhyay ............. H04L 51/066 379/88
8,407,239 B2 3/2013 Dean et al.
8,423,288 B2 ‡ 4/2013 Stahl .................... G01C 21/362 701/41
8,428,758 B2 ‡ 4/2013 Naik ....................... G10L 21/00 381/10
8,433,572 B2 4/2013 Caskey et al.
8,433,778 B1 4/2013 Shreesha et al.
8,434,133 B2 4/2013 Kulkarni et al.
8,442,821 B1 5/2013 Vanhoucke
8,447,612 B2 ‡ 5/2013 Gazdzinski ............ G01C 21/00 704/27
8,452,597 B2 ‡ 5/2013 Bringert .................. G10L 15/28 704/25
8,452,602 B1 5/2013 Bringert et al.
8,453,058 B1 5/2013 Coccaro et al.
8,457,959 B2 6/2013 Kaiser
8,458,115 B2 ‡ 6/2013 Cai ....................... G06F 16/353 706/52
8,458,278 B2 ‡ 6/2013 Christie .................. H04L 51/04 709/20
8,463,592 B2 6/2013 Lu et al.
8,464,150 B2 ‡ 6/2013 Davidson ................ G06F 40/56 715/26
8,473,289 B2 6/2013 Jitkoff et al.
8,477,323 B2 7/2013 Low et al.
8,478,816 B2 7/2013 Parks et al.
8,479,122 B2 ‡ 7/2013 Hotelling .............. G06F 3/0418 715/86
8,484,027 B1 ‡ 7/2013 Murphy ................... G09B 5/06 704/25
8,489,599 B2 ‡ 7/2013 Bellotti ............... G06F 16/4393 707/73
8,498,857 B2 ‡ 7/2013 Kopparapu ............. G06F 40/40 704/2
8,514,197 B2 8/2013 Shahraray et al.
8,515,736 B1 8/2013 Duta
8,515,750 B1 ‡ 8/2013 Lei .......................... G10L 15/26 379/88
8,521,513 B2 ‡ 8/2013 Millett .................. G06F 40/154 704/9
8,521,526 B1 8/2013 Lloyd et al.
8,521,531 B1 8/2013 Kim
8,527,276 B1 ‡ 9/2013 Senior .................... G06N 3/084 704/25
8,533,266 B2 9/2013 Koulomzin et al.
8,537,033 B2 9/2013 Gueziec
8,539,342 B1 9/2013 Lewis
8,543,375 B2 9/2013 Hong
8,543,397 B1 9/2013 Nguyen
8,543,398 B1 9/2013 Strope et al.
8,560,229 B1 ‡ 10/2013 Park ....................... G01C 21/20 701/43
8,560,366 B2 10/2013 Mikurak
8,571,528 B1 10/2013 Channakeshava
8,571,851 B1 10/2013 Tickner et al.
8,577,683 B2 11/2013 Dewitt
8,583,416 B2 ‡ 11/2013 Huang ................ G10L 15/1822 704/25
8,583,511 B2 11/2013 Hendrickson
8,583,638 B2 11/2013 Donelli
8,589,156 B2 11/2013 Burke et al.
8,589,374 B2 11/2013 Chaudhari
8,589,869 B2 ‡ 11/2013 Wolfram ................... G06F 8/30 717/10
8,589,911 B1 11/2013 Sharkey et al.
8,595,004 B2 ‡ 11/2013 Koshinaka ............ G10L 15/187 704/23
8,595,642 B1 11/2013 Lagassey
8,600,743 B2 12/2013 Lindahl et al.
8,600,746 B1 12/2013 Lei et al.
8,600,930 B2 12/2013 Sata
8,606,090 B2 12/2013 Eyer
8,606,568 B1 ‡ 12/2013 Tickner ............... G10L 15/1815 704/23
8,606,576 B1 12/2013 Barr et al.
8,606,577 B1 12/2013 Stewart et al.
8,615,221 B1 12/2013 Cosenza et al.
8,620,659 B2 ‡ 12/2013 Di Cristo ............. G06F 40/232 704/25
8,620,662 B2 ‡ 12/2013 Bellegarda ............. G10L 13/06 704/26
8,626,681 B1 ‡ 1/2014 Jurca ...................... G06N 20/00 706/12
8,630,841 B2 1/2014 Van Caldwell et al.
8,635,073 B2 1/2014 Chang
8,638,363 B2 1/2014 King et al.
8,639,516 B2 1/2014 Lindahl et al.
8,645,128 B1 2/2014 Agiomyrgiannakis
8,645,137 B2 ‡ 2/2014 Bellegarda ............. G10L 17/04 704/25
8,645,138 B1 ‡ 2/2014 Weinstein ............... G10L 15/19 704/23
8,654,936 B1 ‡ 2/2014 Eslambolchi ....... H04L 12/2818 379/88
8,655,646 B2 ‡ 2/2014 Lee ......................... G10L 15/18 704/9
8,655,901 B1 ‡ 2/2014 Li ......................... G06F 16/951 707/76
8,660,843 B2 ‡ 2/2014 Falcon .................... G10L 15/22 704/23
8,660,849 B2 ‡ 2/2014 Gruber .................. G10L 15/183 704/27
8,660,924 B2 2/2014 Hoch et al.
8,660,970 B1 ‡ 2/2014 Fiedorowicz .......... G06N 5/043 706/15
8,661,112 B2 ‡ 2/2014 Creamer ........... H04M 3/42059 379/88
8,661,340 B2 ‡ 2/2014 Goldsmith ............ G06F 3/0482 715/25
8,670,979 B2 ‡ 3/2014 Gruber .................... G10L 13/02 704/9
8,675,084 B2 ‡ 3/2014 Bolton ................ H04M 1/7253 348/21

(56) References Cited

U.S. PATENT DOCUMENTS

| | | | | |
|---|---|---|---|---|
| 8,676,904 | B2 ‡ | 3/2014 | Lindahl | G10L 15/30 709/20 |
| 8,677,377 | B2 ‡ | 3/2014 | Cheyer | G09B 21/00 719/31 |
| 8,681,950 | B2 ‡ | 3/2014 | Vlack | G06F 16/284 379/88 |
| 8,682,667 | B2 ‡ | 3/2014 | Haughay | G10L 15/22 704/24 |
| 8,687,777 | B1 | 4/2014 | Lavian et al. | |
| 8,688,446 | B2 ‡ | 4/2014 | Yanagihara | G10L 15/26 455/56 |
| 8,688,453 | B1 ‡ | 4/2014 | Joshi | G10L 15/1822 704/25 |
| 8,689,135 | B2 | 4/2014 | Portele et al. | |
| 8,694,322 | B2 | 4/2014 | Snitkovskiy | |
| 8,695,074 | B2 | 4/2014 | Saraf | |
| 8,696,364 | B2 ‡ | 4/2014 | Cohen | G09B 7/00 434/32 |
| 8,706,472 | B2 ‡ | 4/2014 | Ramerth | G06F 40/53 704/2 |
| 8,706,474 | B2 | 4/2014 | Blume et al. | |
| 8,706,503 | B2 | 4/2014 | Cheyer et al. | |
| 8,707,195 | B2 | 4/2014 | Fleizach et al. | |
| 8,712,778 | B1 | 4/2014 | Thenthiruperai | |
| 8,713,119 | B2 ‡ | 4/2014 | Lindahl | G10L 15/30 709/20 |
| 8,713,418 | B2 ‡ | 4/2014 | King | G06Q 30/02 715/20 |
| 8,719,006 | B2 ‡ | 5/2014 | Bellegarda | G10L 13/02 704/1 |
| 8,719,014 | B2 ‡ | 5/2014 | Wagner | G06F 40/166 704/23 |
| 8,719,039 | B1 | 5/2014 | Sharifi | |
| 8,731,610 | B2 ‡ | 5/2014 | Appaji | H04M 1/72572 455/55 |
| 8,731,912 | B1 ‡ | 5/2014 | Tickner | H04M 19/04 704/20 |
| 8,731,942 | B2 ‡ | 5/2014 | Cheyer | G10L 15/26 704/27 |
| 8,739,208 | B2 ‡ | 5/2014 | Davis | H04M 1/72533 725/37 |
| 8,744,852 | B1 ‡ | 6/2014 | Seymour | G06F 3/0481 704/25 |
| 8,751,971 | B2 | 6/2014 | Fleizach et al. | |
| 8,760,537 | B2 ‡ | 6/2014 | Johnson | G06T 5/50 348/22 |
| 8,762,145 | B2 ‡ | 6/2014 | Ouchi | G01S 3/80 704/23 |
| 8,762,156 | B2 ‡ | 6/2014 | Chen | G10L 15/26 704/10 |
| 8,762,469 | B2 ‡ | 6/2014 | Lindahl | G10L 15/30 709/20 |
| 8,768,693 | B2 ‡ | 7/2014 | Somekh | G06F 16/58 704/23 |
| 8,768,702 | B2 ‡ | 7/2014 | Mason | G10L 15/22 704/25 |
| 8,775,154 | B2 | 7/2014 | Clinchant et al. | |
| 8,775,177 | B1 | 7/2014 | Heigold et al. | |
| 8,775,931 | B2 ‡ | 7/2014 | Fux | G06F 40/232 715/27 |
| 8,781,456 | B2 | 7/2014 | Prociw | |
| 8,781,841 | B1 ‡ | 7/2014 | Wang | H04M 3/56 379/20 |
| 8,793,301 | B2 | 7/2014 | Wegenkittl et al. | |
| 8,798,255 | B2 | 8/2014 | Lubowich et al. | |
| 8,798,995 | B1 ‡ | 8/2014 | Edara | G10L 15/00 704/24 |
| 8,799,000 | B2 | 8/2014 | Guzzoni et al. | |
| 8,805,690 | B1 ‡ | 8/2014 | Lebeau | G06F 3/165 704/27 |
| 8,812,299 | B1 | 8/2014 | Su | |
| 8,812,302 | B2 | 8/2014 | Xiao et al. | |
| 8,812,321 | B2 | 8/2014 | Gilbert et al. | |
| 8,823,507 | B1 | 9/2014 | Touloumtzis | |
| 8,831,947 | B2 | 9/2014 | Wasserblat et al. | |
| 8,831,949 | B1 | 9/2014 | Smith et al. | |
| 8,838,457 | B2 ‡ | 9/2014 | Cerra | G10L 15/183 704/27 |
| 8,855,915 | B2 ‡ | 10/2014 | Furuhata | G08G 1/096741 701/40 |
| 8,861,925 | B1 ‡ | 10/2014 | Ohme | H04N 5/932 386/20 |
| 8,862,252 | B2 | 10/2014 | Rottler et al. | |
| 8,868,111 | B1 | 10/2014 | Kahn et al. | |
| 8,868,409 | B1 ‡ | 10/2014 | Mengibar | G06F 40/30 704/9 |
| 8,868,469 | B2 | 10/2014 | Xu et al. | |
| 8,868,529 | B2 | 10/2014 | Lerenc | |
| 8,880,405 | B2 ‡ | 11/2014 | Cerra | G10L 15/30 704/27 |
| 8,886,534 | B2 | 11/2014 | Nakano et al. | |
| 8,886,540 | B2 ‡ | 11/2014 | Cerra | G10L 15/183 704/27 |
| 8,886,541 | B2 ‡ | 11/2014 | Friedlander | H04L 17/02 704/27 |
| 8,892,446 | B2 | 11/2014 | Cheyer et al. | |
| 8,893,023 | B2 | 11/2014 | Perry et al. | |
| 8,897,822 | B2 | 11/2014 | Martin | |
| 8,898,064 | B1 | 11/2014 | Thomas et al. | |
| 8,898,568 | B2 | 11/2014 | Bull et al. | |
| 8,903,716 | B2 ‡ | 12/2014 | Chen | H04M 1/72563 704/9 |
| 8,909,693 | B2 | 12/2014 | Frissora et al. | |
| 8,918,321 | B2 | 12/2014 | Czahor | |
| 8,922,485 | B1 | 12/2014 | Lloyd | |
| 8,930,176 | B2 | 1/2015 | Li et al. | |
| 8,930,191 | B2 ‡ | 1/2015 | Gruber | B60K 35/00 704/25 |
| 8,938,394 | B1 | 1/2015 | Faaborg et al. | |
| 8,938,450 | B2 | 1/2015 | Spivack et al. | |
| 8,938,688 | B2 | 1/2015 | Bradford et al. | |
| 8,942,986 | B2 | 1/2015 | Cheyer et al. | |
| 8,943,423 | B2 ‡ | 1/2015 | Merrill | G06F 8/34 715/70 |
| 8,972,240 | B2 | 3/2015 | Brockett et al. | |
| 8,972,432 | B2 | 3/2015 | Shaw et al. | |
| 8,972,878 | B2 ‡ | 3/2015 | Mohler | G06F 3/04817 715/76 |
| 8,976,063 | B1 | 3/2015 | Hawkins et al. | |
| 8,976,108 | B2 | 3/2015 | Hawkins et al. | |
| 8,977,255 | B2 | 3/2015 | Freeman et al. | |
| 8,983,383 | B1 ‡ | 3/2015 | Haskin | H04M 1/6041 455/41 |
| 8,989,713 | B2 | 3/2015 | Doulton | |
| 8,990,235 | B2 | 3/2015 | King et al. | |
| 8,994,660 | B2 | 3/2015 | Neels et al. | |
| 8,995,972 | B1 | 3/2015 | Cronin | |
| 8,996,350 | B1 | 3/2015 | Dub et al. | |
| 8,996,376 | B2 | 3/2015 | Fleizach et al. | |
| 8,996,381 | B2 ‡ | 3/2015 | Mozer | G10L 15/22 704/23 |
| 8,996,639 | B1 | 3/2015 | Faaborg et al. | |
| 9,002,714 | B2 | 4/2015 | Kim et al. | |
| 9,009,046 | B1 ‡ | 4/2015 | Stewart | G06F 40/30 704/25 |
| 9,015,036 | B2 | 4/2015 | Karov Zangvil et al. | |
| 9,020,804 | B2 | 4/2015 | Barbaiani et al. | |
| 9,026,425 | B2 | 5/2015 | Nikoulina et al. | |
| 9,026,426 | B2 | 5/2015 | Wu et al. | |
| 9,031,834 | B2 | 5/2015 | Coorman et al. | |
| 9,031,970 | B1 | 5/2015 | Das et al. | |
| 9,037,967 | B1 | 5/2015 | Al-jefri et al. | |
| 9,043,208 | B2 | 5/2015 | Koch et al. | |
| 9,043,211 | B2 | 5/2015 | Haiut et al. | |
| 9,046,932 | B2 | 6/2015 | Medlock et al. | |
| 9,049,255 | B2 | 6/2015 | Macfarlane et al. | |
| 9,049,295 | B1 | 6/2015 | Cooper et al. | |
| 9,053,706 | B2 | 6/2015 | Jitkoff et al. | |
| 9,058,105 | B2 | 6/2015 | Drory et al. | |
| 9,058,332 | B1 | 6/2015 | Darby et al. | |

(56) References Cited

U.S. PATENT DOCUMENTS 9,058,811 B2 6/2015 Wang et al.
9,063,979 B2 6/2015 Chiu et al.
9,064,495 B1 6/2015 Torok et al.
9,065,660 B2 6/2015 Ellis et al.
9,070,247 B2 6/2015 Kuhn et al.
9,070,366 B1 ‡ 6/2015 Mathias .................. G06F 40/35
9,071,701 B2 6/2015 Donaldson et al.
9,075,435 B1 7/2015 Noble et al.
9,076,448 B2 7/2015 Bennett et al.
9,076,450 B1 7/2015 Sadek et al.
9,081,411 B2 ‡ 7/2015 Kalns ........................ G06F 8/00
9,081,482 B1 ‡ 7/2015 Zhai ...................... G06F 3/0237
9,082,402 B2 7/2015 Yadgar et al.
9,083,581 B1 7/2015 Addepalli et al.
9,094,636 B1 7/2015 Sanders et al.
9,098,467 B1 ‡ 8/2015 Blanksteen ............. G10L 15/22
9,101,279 B2 8/2015 Ritchey et al.
9,112,984 B2 8/2015 Sejnoha et al.
9,117,447 B2 8/2015 Gruber et al.
9,123,338 B1 ‡ 9/2015 Sanders .............. H04M 3/4936
9,143,907 B1 9/2015 Caldwell et al.
9,159,319 B1 10/2015 Hoffmeister
9,164,983 B2 10/2015 Liu et al.
9,171,541 B2 10/2015 Kennewick et al.
9,171,546 B1 10/2015 Pike
9,183,845 B1 11/2015 Gopalakrishnan et al.
9,190,062 B2 ‡ 11/2015 Haughay ................. G10L 15/22
9,208,153 B1 12/2015 Zaveri et al.
9,213,754 B1 12/2015 Zhan et al.
9,218,122 B2 12/2015 Thoma et al.
9,218,809 B2 ‡ 12/2015 Bellegarda .............. G10L 17/04
9,218,819 B1 12/2015 Stekkelpa et al.
9,223,537 B2 ‡ 12/2015 Brown .................... G06F 3/165
9,236,047 B2 1/2016 Rasmussen
9,241,073 B1 1/2016 Rensburg et al.
9,251,713 B1 2/2016 Giovanniello et al.
9,255,812 B2 ‡ 2/2016 Maeoka ............. G01C 21/3626
9,258,604 B1 ‡ 2/2016 Bilobrov ........... H04N 21/4586
9,262,412 B2 2/2016 Yang et al.
9,262,612 B2 2/2016 Cheyer
9,263,058 B2 2/2016 Huang et al.
9,280,535 B2 3/2016 Varma et al.
9,282,211 B2 3/2016 Osawa
9,286,910 B1 3/2016 Li et al.
9,292,487 B1 ‡ 3/2016 Weber ................... G10L 15/187
9,292,489 B1 3/2016 Sak et al.
9,292,492 B2 3/2016 Sarikaya et al.
9,299,344 B2 ‡ 3/2016 Braho ..................... G10L 25/78
9,300,718 B2 3/2016 Khanna
9,301,256 B2 3/2016 Mohan et al.
9,305,543 B2 ‡ 4/2016 Fleizach ................. G10L 13/00
9,305,548 B2 ‡ 4/2016 Kennewick ............. G10L 15/30
9,311,308 B2 4/2016 Sankarasubramaniam et al.
9,311,912 B1 ‡ 4/2016 Swietlinski ............. G10L 13/04
9,313,317 B1 ‡ 4/2016 LeBeau .................. G06F 3/165
9,318,108 B2 ‡ 4/2016 Gruber .................... G06F 40/40
9,325,809 B1 4/2016 Barros et al.
9,325,842 B1 4/2016 Siddiqi et al.
9,330,659 B2 5/2016 Ju et al.
9,330,668 B2 5/2016 Nanavati et al.
9,330,720 B2 5/2016 Lee
9,335,983 B2 5/2016 Breiner et al.
9,338,493 B2 ‡ 5/2016 Van Os .............. H04N 21/2541
9,349,368 B1 ‡ 5/2016 Lebeau ................... G06F 3/165
9,355,472 B2 5/2016 Kocienda et al.
9,361,084 B1 6/2016 Costa
9,367,541 B1 6/2016 Servan et al.
9,368,114 B2 6/2016 Larson et al.
9,377,871 B2 ‡ 6/2016 Waddell ................ G06F 40/274
9,378,740 B1 6/2016 Rosen et al.
9,380,155 B1 6/2016 Reding et al.
9,383,827 B1 7/2016 Faaborg et al.
9,384,185 B2 7/2016 Medlock et al.
9,390,726 B1 7/2016 Smus et al.
9,396,722 B2 7/2016 Chung et al.
9,401,147 B2 7/2016 Jitkoff et al.
9,406,224 B1 8/2016 Sanders et al.
9,406,299 B2 8/2016 Gollan et al.
9,408,182 B1 8/2016 Hurley et al.
9,412,392 B2 8/2016 Lindahl
9,418,650 B2 8/2016 Bharadwaj et al.
9,423,266 B2 ‡ 8/2016 Clark ................. G01C 21/3644
9,424,246 B2 8/2016 Spencer et al.
9,424,840 B1 8/2016 Hart et al.
9,431,021 B1 8/2016 Scalise et al.
9,432,499 B2 8/2016 Hajdu et al.
9,436,918 B2 9/2016 Pantel et al.
9,437,186 B1 9/2016 Liu et al.
9,437,189 B2 9/2016 Epstein et al.
9,442,687 B2 9/2016 Park et al.
9,443,527 B1 9/2016 Watanabe et al.
9,454,599 B2 9/2016 Golden et al.
9,454,957 B1 9/2016 Mathias et al.
9,465,798 B2 10/2016 Lin
9,465,833 B2 10/2016 Aravamudan et al.
9,465,864 B2 10/2016 Hu et al.
9,466,027 B2 10/2016 Byrne et al.
9,466,294 B1 10/2016 Tunstall-pedoe et al.
9,471,566 B1 10/2016 Zhang et al.
9,472,196 B1 10/2016 Wang et al.
9,483,388 B2 11/2016 Sankaranarasimhan et al.
9,483,461 B2 11/2016 Fleizach et al.
9,484,021 B1 11/2016 Mairesse et al.
9,495,129 B2 11/2016 Fleizach et al.
9,501,741 B2 11/2016 Cheyer et al.
9,502,025 B2 11/2016 Kennewick et al.
9,508,028 B2 11/2016 Bannister et al.
9,510,044 B1 11/2016 Pereira et al.
9,514,470 B2 12/2016 Topatan et al.
9,519,453 B2 12/2016 Perkuhn et al.
9,524,355 B2 12/2016 Forbes et al.
9,531,862 B1 12/2016 Vadodaria
9,535,906 B2 1/2017 Lee et al.
9,536,527 B1 1/2017 Carlson
9,547,647 B2 1/2017 Badaskar
9,548,050 B2 1/2017 Gruber et al.
9,548,979 B1 1/2017 Johnson et al.
9,569,549 B1 2/2017 Jenkins et al.
9,575,964 B2 2/2017 Yadgar et al.
9,578,173 B2 2/2017 Sanghavi et al.
9,607,612 B2 3/2017 Deleeuw
9,619,200 B2 4/2017 Chakladar et al.
9,620,113 B2 4/2017 Kennewick et al.
9,620,126 B2 4/2017 Chiba
9,626,955 B2 4/2017 Fleizach et al.
9,633,004 B2 4/2017 Giuli et al.
9,633,191 B2 4/2017 Fleizach et al.
9,633,660 B2 4/2017 Haughay
9,652,453 B2 5/2017 Mathur et al.
9,658,746 B2 5/2017 Cohn et al.
9,659,002 B2 5/2017 Medlock et al.
9,659,298 B2 5/2017 Lynch et al.
9,665,567 B2 5/2017 Li et al.
9,665,662 B1 5/2017 Gautam et al.
9,668,121 B2 5/2017 Naik et al.
9,672,725 B2 6/2017 Dotan-Cohen et al.
9,691,378 B1 6/2017 Meyers et al.
9,697,822 B1 7/2017 Naik et al.
9,697,827 B1 7/2017 Lilly et al.
9,698,999 B2 7/2017 Mutagi
9,720,907 B2 8/2017 Bangalore et al.
9,721,566 B2 8/2017 Newendorp et al.
9,723,130 B2 8/2017 Rand
9,734,817 B1 8/2017 Putrycz
9,734,839 B1 8/2017 Adams
9,741,343 B1 8/2017 Miles et al.
9,747,083 B1 8/2017 Roman et al.
9,747,093 B2 8/2017 Latino et al.
9,755,605 B1 9/2017 Li et al.
9,767,710 B2 9/2017 Lee et al.
9,786,271 B1 10/2017 Combs et al.
9,792,907 B2 10/2017 Bocklet et al.
9,812,128 B2 11/2017 Mixter et al.
9,813,882 B1 11/2017 Masterman

(56) References Cited

U.S. PATENT DOCUMENTS 9,818,400 B2 11/2017 Paulik et al.
9,823,811 B2 11/2017 Brown et al.
9,823,828 B2 11/2017 Zambetti et al.
9,830,044 B2 11/2017 Brown et al.
9,830,449 B1 11/2017 Wagner
9,842,584 B1 12/2017 Hart et al.
9,846,685 B2 12/2017 Li
9,858,925 B2 1/2018 Gruber et al.
9,858,927 B2 1/2018 Williams et al.
9,886,953 B2 2/2018 Lemay et al.
9,887,949 B2 2/2018 Shepherd et al.
9,916,839 B1 3/2018 Scalise et al.
9,922,642 B2 3/2018 Pitschel et al.
9,934,777 B1 4/2018 Joseph et al.
9,934,785 B1 4/2018 Hulaud
9,946,862 B2 4/2018 Yun et al.
9,948,728 B2 4/2018 Linn et al.
9,959,129 B2 5/2018 Kannan et al.
9,966,065 B2 5/2018 Gruber et al.
9,966,068 B2 5/2018 Cash et al.
9,967,381 B1 5/2018 Kashimba et al.
9,971,495 B2 5/2018 Shetty et al.
9,984,686 B1 5/2018 Mutagi et al.
9,986,419 B2 5/2018 Naik et al.
9,990,176 B1 6/2018 Gray
9,998,552 B1 6/2018 Ledet
10,001,817 B2 6/2018 Zambetti et al.
10,013,416 B1 7/2018 Bhardwaj et al.
10,013,654 B1 7/2018 Levy et al.
10,013,979 B1 7/2018 Roma et al.
10,019,436 B2 7/2018 Huang
10,032,451 B1 7/2018 Mamkina et al.
10,032,455 B2 7/2018 Newman et al.
10,037,758 B2 7/2018 Jing et al.
10,043,516 B2 8/2018 Saddler et al.
10,049,161 B2 8/2018 Kaneko
10,049,663 B2 8/2018 Orr et al.
10,049,668 B2 8/2018 Huang et al.
10,055,681 B2 8/2018 Brown et al.
10,074,360 B2 9/2018 Kim
10,074,371 B1 9/2018 Wang et al.
10,083,213 B1 9/2018 Podgorny et al.
10,083,690 B2 9/2018 Giuli et al.
10,088,972 B2 10/2018 Brown et al.
10,089,072 B2 10/2018 Piersol et al.
10,096,319 B1 10/2018 Jin et al.
10,101,887 B2 10/2018 Bernstein et al.
10,102,359 B2 10/2018 Cheyer
10,127,901 B2 11/2018 Zhao et al.
10,127,908 B1 11/2018 Deller et al.
10,134,425 B1 11/2018 Johnson, Jr.
10,169,329 B2 1/2019 Futrell et al.
10,170,123 B2 1/2019 Orr et al.
10,170,135 B1 1/2019 Pearce et al.
10,175,879 B2 1/2019 Missig et al.
10,176,167 B2 1/2019 Evermann
10,176,802 B1 1/2019 Ladhak et al.
10,185,542 B2 1/2019 Carson et al.
10,186,254 B2 1/2019 Williams et al.
10,186,266 B1 1/2019 Devaraj et al.
10,191,627 B2 1/2019 Cieplinski et al.
10,191,646 B2 1/2019 Zambetti et al.
10,191,718 B2 1/2019 Rhee et al.
10,192,546 B1 1/2019 Piersol et al.
10,192,552 B2 1/2019 Raitio et al.
10,192,557 B2 1/2019 Lee et al.
10,199,051 B2 2/2019 Binder et al.
10,200,824 B2 2/2019 Gross et al.
10,216,351 B2 2/2019 Yang
10,216,832 B2 2/2019 Bangalore et al.
10,223,066 B2 3/2019 Martel et al.
10,225,711 B2 3/2019 Parks et al.
10,229,356 B1 3/2019 Liu et al.
10,248,308 B2 4/2019 Karunamuni et al.
10,255,922 B1 4/2019 Sharifi et al.
10,269,345 B2 4/2019 Castillo Sanchez et al.
10,296,160 B2 5/2019 Shah et al.
10,297,253 B2 5/2019 Walker, II et al.
10,303,772 B2 5/2019 Hosn et al.
10,304,463 B2 5/2019 Mixter et al.
10,311,482 B2 6/2019 Baldwin
10,311,871 B2 6/2019 Newendorp et al.
10,325,598 B2 6/2019 Basye et al.
10,332,513 B1 6/2019 D'souza et al.
10,332,518 B2 6/2019 Garg et al.
10,346,753 B2 7/2019 Soon-Shiong et al.
10,353,975 B2 7/2019 Oh et al.
10,354,677 B2 7/2019 Mohamed et al.
10,356,243 B2 7/2019 Sanghavi et al.
10,366,692 B1 7/2019 Adams et al.
10,372,814 B2 8/2019 Gliozzo et al.
10,389,876 B2 8/2019 Engelke et al.
10,402,066 B2 9/2019 Kawana
10,403,283 B1 9/2019 Schramm et al.
10,410,637 B2 9/2019 Paulik et al.
10,417,037 B2 9/2019 Gruber et al.
10,417,554 B2 9/2019 Scheffler
10,446,142 B2 10/2019 Lim et al.
10,469,665 B1 11/2019 Bell et al.
10,474,961 B2 11/2019 Brigham et al.
10,496,705 B1 12/2019 Irani et al.
10,497,365 B2 12/2019 Gruber et al.
10,504,518 B1 12/2019 Irani et al.
10,521,946 B1 12/2019 Roche et al.
10,568,032 B2 2/2020 Freeman et al.
10,659,851 B2 5/2020 Lister et al.
10,757,499 B1 8/2020 Vautrin et al.
2001/0005859 A1‡ 6/2001 Okuyama ............... H04L 29/00 709/24
2001/0020259 A1‡ 9/2001 Sekiguchi ............. G06F 9/4406 710/26
2001/0027394 A1‡ 10/2001 Theimer ................. G10L 15/26 704/25
2001/0027396 A1‡ 10/2001 Sato ..................... G10H 1/0008 704/26
2001/0029455 A1‡ 10/2001 Chin ..................... G06F 40/232 704/27
2001/0030660 A1‡ 10/2001 Zainoulline ......... G06F 3/04812 715/72
2001/0032080 A1‡ 10/2001 Fukada ................... G10L 13/10 704/25
2001/0041021 A1‡ 11/2001 Boyle ....................... G06F 3/14 382/30
2001/0042107 A1‡ 11/2001 Palm ................. H04L 29/06027 709/21
2001/0044724 A1‡ 11/2001 Hon ...................... G06F 40/216 704/26
2001/0047264 A1‡ 11/2001 Roundtree ............. G06Q 10/04 704/27
2001/0055963 A1‡ 12/2001 Cloutier .................. H04W 4/12 455/41
2001/0056342 A1‡ 12/2001 Piehn ................. H04N 1/00488 704/3
2001/0056347 A1‡ 12/2001 Chazan ................... G10L 13/07 704/25
2002/0001395 A1‡ 1/2002 Davis ...................... G06F 21/10 382/10
2002/0002039 A1‡ 1/2002 Qureshey ........... G06Q 30/0641 455/34
2002/0002413 A1‡ 1/2002 Tokue ..................... G06F 21/10 700/94
2002/0002461 A1‡ 1/2002 Tetsumoto .............. G10L 13/08 704/27
2002/0002465 A1‡ 1/2002 Maes .................... G10L 15/065 704/27
2002/0004703 A1‡ 1/2002 Gaspard, II .......... G01C 21/343 701/41
2002/0010581 A1‡ 1/2002 Euler ...................... G10L 15/02 704/23
2002/0010584 A1‡ 1/2002 Schultz ..................... G06F 3/16 704/27

(56) References Cited

U.S. PATENT DOCUMENTS

2002/0010589 A1‡ 1/2002 Nashida .............. H04L 12/2805 704/27
2002/0010726 A1‡ 1/2002 Rogson ................. G06F 40/232 715/25
2002/0010798 A1‡ 1/2002 Ben-Shaul ........ H04L 29/12066 709/24
2002/0013707 A1‡ 1/2002 Shaw .................... G10L 15/063 704/25
2002/0013784 A1‡ 1/2002 Swanson ................ H04H 20/28
2002/0013852 A1‡ 1/2002 Janik ................... H04L 12/2856 709/23
2002/0015024 A1‡ 2/2002 Westerman ............. G06F 3/044 345/17
2002/0015064 A1‡ 2/2002 Robotham ............ G06F 3/0481 715/86
2002/0021278 A1‡ 2/2002 Hinckley .............. G06F 1/1626 345/15
2002/0026315 A1‡ 2/2002 Miranda ................. G10L 13/04 704/25
2002/0026456 A1‡ 2/2002 Bradford ................. G06F 40/30 715/21
2002/0031254 A1‡ 3/2002 Lantrip ................ G06K 9/6253 382/15
2002/0031262 A1‡ 3/2002 Imagawa ............... G11B 27/28 382/19
2002/0032048 A1‡ 3/2002 Kitao .................. H04M 1/6091 455/56
2002/0032564 A1‡ 3/2002 Ehsani .................. G06F 40/247 704/23
2002/0032591 A1‡ 3/2002 Mahaffy ............... H04M 3/493 709/20
2002/0032751 A1‡ 3/2002 Bharadwaj .............. H04L 29/06 709/21
2002/0035467 A1‡ 3/2002 Morimoto ............ G06F 40/289 704/9
2002/0035469 A1‡ 3/2002 Holzapfel ............ G10L 15/063 704/21
2002/0035474 A1‡ 3/2002 Alpdemir ............... G06Q 30/02 704/27
2002/0040297 A1‡ 4/2002 Tsiao ........................ G06F 3/16 704/25
2002/0040359 A1‡ 4/2002 Green ..................... G06F 40/30
2002/0042707 A1‡ 4/2002 Zhao ..................... G06F 40/211 704/9
2002/0045438 A1‡ 4/2002 Tagawa ............. H04M 1/72519 455/41
2002/0045961 A1‡ 4/2002 Gibbs .............. G11B 20/10527 700/94
2002/0046025 A1‡ 4/2002 Hain ....................... G10L 13/08 704/24
2002/0046315 A1‡ 4/2002 Miller ..................... G06F 9/451 711/1
2002/0052730 A1‡ 5/2002 Nakao ..................... G06F 40/20 704/10
2002/0052740 A1‡ 5/2002 Charlesworth ......... G06F 16/48 704/22
2002/0052746 A1‡ 5/2002 Handelman ............ H04N 7/163 704/27
2002/0052747 A1‡ 5/2002 Sarukkai ............. H04M 3/4938 704/27
2002/0052913 A1‡ 5/2002 Yamada ............. G06F 16/9535 709/20
2002/0054094 A1‡ 5/2002 Matsuda ................ G06Q 10/10 715/75
2002/0055844 A1‡ 5/2002 L'Esperance ......... H04M 1/271 704/26
2002/0055934 A1‡ 5/2002 Lipscomb ........... G06F 16/4387
2002/0057293 A1‡ 5/2002 Liao .................... G06F 3/04883 715/78
2002/0059066 A1‡ 5/2002 O'Hagan ................ G10L 15/30 704/23
2002/0059068 A1‡ 5/2002 Rose ....................... G10L 15/08 704/24
2002/0065659 A1‡ 5/2002 Isono ...................... G10L 13/04 704/26
2002/0065797 A1‡ 5/2002 Meidan .................. G06Q 30/02
2002/0067308 A1‡ 6/2002 Robertson .............. G01C 21/00 342/35
2002/0069063 A1‡ 6/2002 Buchner ............. H04L 12/2803 704/27
2002/0069071 A1‡ 6/2002 Knockeart .............. G06F 3/023 704/27
2002/0069220 A1‡ 6/2002 Tran .................... G06F 3/04883 715/20
2002/0072816 A1‡ 6/2002 Shdema ............. H04L 12/2805 700/94
2002/0072908 A1‡ 6/2002 Case ....................... G10L 13/07 704/26
2002/0072914 A1‡ 6/2002 Alshawi .................. G10L 15/22 704/27
2002/0072915 A1‡ 6/2002 Bower .................... G10L 13/00 704/27
2002/0073177 A1‡ 6/2002 Clark ...................... G06F 21/10 709/21
2002/0077082 A1‡ 6/2002 Cruickshank ......... H04L 51/066 455/41
2002/0077817 A1‡ 6/2002 Atal ........................ G10L 15/02 704/25
2002/0078041 A1‡ 6/2002 Wu ......................... G06F 16/86
2002/0080163 A1‡ 6/2002 Morey ............... H04N 7/17318 715/72
2002/0083068 A1‡ 6/2002 Quass ................... G06F 40/174
2002/0085037 A1‡ 7/2002 Leavitt ................ G06F 3/04817 715/76
2002/0086680 A1‡ 7/2002 Hunzinger ............ H04W 4/029 455/45
2002/0087306 A1‡ 7/2002 Lee ....................... G10L 15/197 704/23
2002/0087508 A1‡ 7/2002 Hull ....................... G16C 20/70
2002/0087974 A1‡ 7/2002 Sprague ............ H04L 29/06027 725/32
2002/0091511 A1‡ 7/2002 Hellwig .................. G10L 15/30 704/20
2002/0091529 A1‡ 7/2002 Whitham ............ H04M 3/4938 704/27
2002/0095286 A1‡ 7/2002 Ross ................... G10L 15/1822 704/23
2002/0095290 A1‡ 7/2002 Kahn .................... G10L 15/063 704/26
2002/0099547 A1‡ 7/2002 Chu ........................ G10L 13/07 704/26
2002/0099552 A1‡ 7/2002 Rubin ..................... G09F 27/00 704/27
2002/0101447 A1‡ 8/2002 Carro .................... G06F 16/748 715/76
2002/0103641 A1‡ 8/2002 Kuo ........................ G10L 15/22 704/23
2002/0103644 A1‡ 8/2002 Brocious ................. G10L 15/26 704/24
2002/0103646 A1‡ 8/2002 Kochanski ............ G10L 13/047 704/26
2002/0107684 A1‡ 8/2002 Gao ...................... G06F 40/211 704/4
2002/0109709 A1‡ 8/2002 Sagar .................. G06F 3/04842 715/70
2002/0110248 A1‡ 8/2002 Kovales .................. G10L 13/00 381/56
2002/0111198 A1‡ 8/2002 Heie .................... G08B 3/1025 455/57
2002/0111810 A1‡ 8/2002 Khan ................. G01C 21/3608 704/27
2002/0116082 A1‡ 8/2002 Gudorf ................ G11B 27/034 700/94
2002/0116171 A1‡ 8/2002 Russell ..................... G06F 8/20 704/4
2002/0116185 A1‡ 8/2002 Cooper .................. G04G 21/06 704/23

(56) References Cited

U.S. PATENT DOCUMENTS

2002/0116189 A1‡ 8/2002 Yeh ........................ G10L 17/08 704/24
2002/0116420 A1‡ 8/2002 Allam .................. G06F 40/106 715/27
2002/0117384 A1‡ 8/2002 Marchant .............. G09B 23/18 200/1 R
2002/0120697 A1‡ 8/2002 Generous ............... H04L 29/06 709/20
2002/0120925 A1‡ 8/2002 Logan ............... H04N 7/17318 725/9
2002/0122053 A1‡ 9/2002 Dutta ................. G06F 16/9577 715/72
2002/0123891 A1‡ 9/2002 Epstein ................ G10L 15/197 704/23
2002/0123894 A1‡ 9/2002 Woodward ............. G10L 15/22 704/26
2002/0126097 A1‡ 9/2002 Savolainen ........... G06F 3/0237 345/16
2002/0128821 A1‡ 9/2002 Ehsani ................. G06F 40/216 704/10
2002/0128827 A1‡ 9/2002 Bu ......................... G10L 15/02 704/22
2002/0128840 A1‡ 9/2002 Hinde .................. G10L 15/063 704/25
2002/0129057 A1‡ 9/2002 Spielberg ............... G06F 3/165 715/20
2002/0133347 A1‡ 9/2002 Schoneburg ........... G06F 40/35 704/25
2002/0133348 A1‡ 9/2002 Pearson ............... G10L 13/033 704/25
2002/0135565 A1‡ 9/2002 Gordon ................. G06F 3/0421 345/16
2002/0135618 A1‡ 9/2002 Maes ................ G06K 9/00248 715/76
2002/0137505 A1‡ 9/2002 Eiche .................. B60R 11/0241 455/42
2002/0138254 A1‡ 9/2002 Isaka ...................... G10L 21/02 704/20
2002/0138265 A1‡ 9/2002 Stevens ................... G10L 15/22 704/25
2002/0138270 A1‡ 9/2002 Bellegarda ............. G10L 13/10 704/26
2002/0138616 A1‡ 9/2002 Basson ................ G06Q 20/123 709/22
2002/0140679 A1‡ 10/2002 Wen ...................... G06F 3/0234 345/16
2002/0143533 A1‡ 10/2002 Lucas .................. G06F 40/174 704/23
2002/0143542 A1‡ 10/2002 Eide ........................ G10L 13/02 704/26
2002/0143551 A1‡ 10/2002 Sharma .................. G10L 15/30 704/27
2002/0143826 A1‡ 10/2002 Day .................... G06F 16/9577 715/27
2002/0151297 A1‡ 10/2002 Remboski ........... B60R 16/0231 455/41
2002/0152045 A1‡ 10/2002 Dowling .................. G09G 3/14 702/10
2002/0152255 A1‡ 10/2002 Smith, Jr. ......... H04M 3/42068 718/10
2002/0154160 A1‡ 10/2002 Hosokawa ........ H04M 1/72525 715/73
2002/0156771 A1‡ 10/2002 Frieder ............ G06F 16/90332
2002/0161865 A1‡ 10/2002 Nguyen .............. H04L 12/2803 709/22
2002/0163544 A1‡ 11/2002 Baker ................ G06F 3/04817 715/83
2002/0164000 A1‡ 11/2002 Cohen ................... H04M 3/493 379/88
2002/0165918 A1‡ 11/2002 Bettis ................... G06Q 10/107 709/20
2002/0166123 A1‡ 11/2002 Schrader .............. G11B 27/105 725/58
2002/0167534 A1‡ 11/2002 Burke ................... G06F 3/0481 345/62
2002/0169592 A1‡ 11/2002 Aityan .................... G06F 40/58 704/2
2002/0169605 A1‡ 11/2002 Damiba ................ G10L 15/063 704/23
2002/0173273 A1‡ 11/2002 Spurgat .................. G11B 27/10 455/66
2002/0173889 A1‡ 11/2002 Odinak ................... B60R 11/02 701/36
2002/0173961 A1‡ 11/2002 Guerra .................... G10L 13/08 704/25
2002/0173962 A1‡ 11/2002 Tang ..................... G10L 13/033 704/26
2002/0173966 A1‡ 11/2002 Henton ................. G10L 15/187 704/27
2002/0177993 A1‡ 11/2002 Veditz .................. G06F 40/197 704/8
2002/0184003 A1‡ 12/2002 Hakkinen ............. G06F 40/263 704/8
2002/0184015 A1‡ 12/2002 Li .......................... G10L 25/78 704/23
2002/0184027 A1‡ 12/2002 Brittan .................. G10L 13/047 704/25
2002/0184189 A1‡ 12/2002 Hay ....................... G06Q 30/06
2002/0189426 A1‡ 12/2002 Hirade ..................... G10H 1/08 84/603
2002/0191029 A1‡ 12/2002 Gillespie ............... G06F 3/0481 715/81
2002/0193996 A1‡ 12/2002 Squibbs ........... H04M 1/72544 704/26
2002/0196911 A1‡ 12/2002 Gao ...................... H04M 1/271 379/88
2002/0198714 A1‡ 12/2002 Zhou ................... G10L 15/1822 704/25
2002/0198715 A1‡ 12/2002 Belrose .................. G10L 15/00 704/26
2003/0001881 A1‡ 1/2003 Mannheimer ........ G11B 19/025 715/72
2003/0002632 A1‡ 1/2003 Bhogal ............... H04M 1/7255 379/67
2003/0003609 A1‡ 1/2003 Sauer ................ B01L 3/502761 438/14
2003/0003897 A1‡ 1/2003 Hyon .................. H04M 1/7255 455/41
2003/0004968 A1‡ 1/2003 Romer ................ G06F 16/5846
2003/0009459 A1‡ 1/2003 Chastain ............... G06F 40/169
2003/0013483 A1‡ 1/2003 Ausems ........... H04M 1/72522 455/55
2003/0016770 A1‡ 1/2003 Trans ....................... H04B 1/00 375/34
2003/0018475 A1‡ 1/2003 Basu .................. G06K 9/00228 704/27
2003/0020760 A1‡ 1/2003 Takatsu ............. G03G 15/5016 715/81
2003/0023420 A1‡ 1/2003 Goodman ............. G06F 3/0237 704/1
2003/0023426 A1‡ 1/2003 Pun ....................... G06F 3/0237 704/1
2003/0025676 A1‡ 2/2003 Cappendijk ......... G06F 3/04886 345/17
2003/0026392 A1‡ 2/2003 Brown ............. H04M 3/42221 379/88
2003/0026402 A1‡ 2/2003 Clapper ................ H04M 1/652 379/14
2003/0028380 A1‡ 2/2003 Freeland ................. G10L 13/00 704/26
2003/0030645 A1‡ 2/2003 Ribak ................. G06F 16/9577 345/58
2003/0033148 A1‡ 2/2003 Silverman ............... G10L 15/20 704/27
2003/0033152 A1‡ 2/2003 Cameron ................ G10L 15/07 704/27

(56) References Cited

U.S. PATENT DOCUMENTS

2003/0033153 A1‡ 2/2003 Olson ................... G06F 1/1605 704/27
2003/0033214 A1‡ 2/2003 Mikkelsen ............. G06Q 30/04 705/26
2003/0036909 A1‡ 2/2003 Kato .................. G03G 15/5016 704/27
2003/0037073 A1‡ 2/2003 Tokuda ................... G06F 16/35 715/23
2003/0037077 A1‡ 2/2003 Brill ...................... G06F 40/232 715/25
2003/0037254 A1‡ 2/2003 Fischer ..................... G06F 8/60 709/24
2003/0038786 A1‡ 2/2003 Nguyen ................ G06F 1/1624 345/16
2003/0040908 A1‡ 2/2003 Yang ...................... H04R 3/005 704/23
2003/0046075 A1‡ 3/2003 Stone ...................... G06F 40/42 704/25
2003/0046401 A1‡ 3/2003 Abbott .................... G06F 9/451 709/22
2003/0046434 A1‡ 3/2003 Flanagin .............. G06Q 10/109 709/24
2003/0048881 A1‡ 3/2003 Trajkovic ............ H04M 1/6505 379/88
2003/0050781 A1‡ 3/2003 Tamura .................... G10H 1/08 704/26
2003/0051136 A1‡ 3/2003 Curtis ................. H04L 12/1822 713/16
2003/0055537 A1‡ 3/2003 Odinak .................. B60K 35/00 701/1
2003/0055623 A1‡ 3/2003 Epstein ................. G06F 40/289 704/1
2003/0061317 A1‡ 3/2003 Brown ................ G06F 16/9577 709/22
2003/0061570 A1‡ 3/2003 Hatori ..................... G06F 40/42 715/25
2003/0063073 A1‡ 4/2003 Geaghan ............... G06F 3/0416 345/17
2003/0069893 A1‡ 4/2003 Kanai ................... G06F 16/487
2003/0074195 A1‡ 4/2003 Bartosik ................. G10L 15/22 704/23
2003/0074198 A1‡ 4/2003 Sussman ............... H04M 1/247 704/27
2003/0074457 A1‡ 4/2003 Kluth .................. G06F 21/6218 709/22
2003/0076301 A1‡ 4/2003 Tsuk ..................... G06F 1/1626 345/15
2003/0078766 A1‡ 4/2003 Appelt ................ G06F 16/3338 704/9
2003/0078779 A1‡ 4/2003 Desai ........................ G06F 3/16 704/25
2003/0078780 A1‡ 4/2003 Kochanski ............. G10L 13/10 704/25
2003/0078969 A1‡ 4/2003 Sprague .................. H04L 29/06 709/20
2003/0079024 A1‡ 4/2003 Hough ................... G06Q 10/10 709/22
2003/0079038 A1‡ 4/2003 Robbin ................. G06F 1/1613 709/23
2003/0080991 A1‡ 5/2003 Crow ...................... G06F 3/048 715/71
2003/0083113 A1‡ 5/2003 Chua ................... H04M 1/6083 455/56
2003/0083878 A1‡ 5/2003 Lee ......................... G10L 13/07 704/26
2003/0083884 A1‡ 5/2003 Odinak .................. G10L 15/22 704/27
2003/0084350 A1‡ 5/2003 Eibach .................... H04L 63/08 726/4
2003/0085870 A1‡ 5/2003 Hinckley .............. G06F 1/1626 345/15
2003/0086699 A1‡ 5/2003 Benyamin ............ G11B 19/025 386/24
2003/0088414 A1‡ 5/2003 Huang .................... G10L 15/07 704/24
2003/0088421 A1‡ 5/2003 Maes ...................... G10L 15/30 704/27
2003/0090467 A1‡ 5/2003 Hohl ..................... G06F 3/0233 345/16
2003/0090474 A1‡ 5/2003 Schaefer ................. G06F 3/041 345/17
2003/0095096 A1‡ 5/2003 Robbin ................. G06F 1/1626 345/15
2003/0097210 A1‡ 5/2003 Horst ...................... B61C 17/12 701/19
2003/0097379 A1‡ 5/2003 Ireton .................. G11B 27/034
2003/0097407 A1‡ 5/2003 Litwin .................... H04L 51/38 709/20
2003/0097408 A1‡ 5/2003 Kageyama .......... H04L 12/1818 709/20
2003/0098892 A1‡ 5/2003 Hiipakka .............. G06F 3/0481 715/84
2003/0099335 A1‡ 5/2003 Tanaka .................. H04M 3/493 379/88
2003/0101045 A1‡ 5/2003 Moffatt ................... G10L 13/07 704/7
2003/0101054 A1‡ 5/2003 Davis ...................... G10L 15/26 704/23
2003/0115060 A1‡ 6/2003 Junqua .................... G10L 15/24 704/23
2003/0115064 A1‡ 6/2003 Gusler .................. G10L 21/028 704/27
2003/0115067 A1 6/2003 Ibaraki et al.
2003/0115186 A1‡ 6/2003 Wilkinson .......... G06F 16/9537
2003/0115552 A1‡ 6/2003 Jahnke .................... G06F 9/454 715/20
2003/0117365 A1‡ 6/2003 Shteyn .................. G06F 3/0481 345/15
2003/0120494 A1‡ 6/2003 Jost ......................... G10L 15/22 704/27
2003/0122652 A1‡ 7/2003 Himmelstein ......... G05B 15/02 340/5
2003/0122787 A1‡ 7/2003 Zimmerman ....... G06F 3/04883 345/17
2003/0125927 A1‡ 7/2003 Seme .................... H04L 51/063 704/3
2003/0125955 A1‡ 7/2003 Arnold .................... G10L 15/30 704/27
2003/0126559 A1‡ 7/2003 Fuhrmann .............. G06F 9/454 715/22
2003/0128819 A1‡ 7/2003 Lee ......................... H04L 51/38 379/88
2003/0130847 A1‡ 7/2003 Case ....................... G10L 13/06 704/26
2003/0131320 A1‡ 7/2003 Kumhyr .................. G06F 9/454 715/20
2003/0133694 A1‡ 7/2003 Yeo ........................ H04N 5/783 386/32
2003/0134678 A1‡ 7/2003 Tanaka .................... G06F 3/048 463/42
2003/0135501 A1‡ 7/2003 Frerebeau ............. G06F 40/221
2003/0135740 A1‡ 7/2003 Talmor .................... G06F 21/32 713/18
2003/0140088 A1‡ 7/2003 Robinson ............... G06Q 10/10 709/20
2003/0144846 A1‡ 7/2003 Denenberg ...................... 704/27
2003/0145285 A1‡ 7/2003 Miyahira .............. G06F 40/232 715/25
2003/0147512 A1‡ 8/2003 Abburi ................ H04M 1/7255 379/88
2003/0149557 A1‡ 8/2003 Cox .................. H04M 3/42229 704/2
2003/0149567 A1‡ 8/2003 Schmitz ................ G06F 16/958 704/27
2003/0149978 A1‡ 8/2003 Plotnick ............... G06Q 10/109 725/39

(56) References Cited

U.S. PATENT DOCUMENTS

2003/0152203 A1‡ 8/2003 Berger .................... H04L 51/36 379/93
2003/0152894 A1‡ 8/2003 Townshend ............. G09B 7/04 434/17
2003/0154079 A1‡ 8/2003 Ota ......................... G10L 15/22 704/24
2003/0154081 A1‡ 8/2003 Chu ........................ G10L 13/06 704/26
2003/0157968 A1‡ 8/2003 Boman ............. H04M 1/72547 455/56
2003/0158732 A1‡ 8/2003 Pi ........................... G10L 15/22 704/25
2003/0158735 A1‡ 8/2003 Yamada .................. G10L 13/00 704/26
2003/0158737 A1‡ 8/2003 Csicsatka ............. G11B 27/034 704/27
2003/0160702 A1‡ 8/2003 Tanaka ..................... G10H 1/00 340/69
2003/0160830 A1‡ 8/2003 DeGross ............... G06F 40/242 715/80
2003/0163316 A1‡ 8/2003 Addison .................. G09B 5/04 704/26
2003/0164848 A1‡ 9/2003 Dutta .................... G06F 3/0481 715/72
2003/0167155 A1 9/2003 Reghetti
2003/0167167 A1‡ 9/2003 Gong ...................... G10L 15/22 704/25
2003/0167318 A1‡ 9/2003 Robbin ................. G06F 1/1613 709/22
2003/0167335 A1‡ 9/2003 Alexander ............. H04L 29/06 709/22
2003/0171928 A1‡ 9/2003 Falcon .................... G10L 15/22 704/27
2003/0171936 A1‡ 9/2003 Sall ......................... G10L 15/04 704/50
2003/0174830 A1‡ 9/2003 Boyer ..................... H04M 3/51 379/26
2003/0177046 A1‡ 9/2003 Socha-Leialoha ... G06Q 10/103 717/10
2003/0179222 A1‡ 9/2003 Noma ................... G06F 16/954 715/70
2003/0182115 A1‡ 9/2003 Malayath ................ G10L 15/02 704/23
2003/0182131 A1‡ 9/2003 Arnold .................... G10L 15/32 704/27
2003/0187655 A1‡ 10/2003 Dunsmuir ......... H04M 3/53333 704/27
2003/0187659 A1‡ 10/2003 Cho .................... H04L 12/2803 704/27
2003/0187775 A1‡ 10/2003 Du .......................... G06F 9/441 705/37
2003/0187844 A1‡ 10/2003 Li ......................... G06F 16/583
2003/0187925 A1‡ 10/2003 Inala ..................... H04L 69/329 709/20
2003/0188005 A1‡ 10/2003 Yoneda ................... H04L 29/06 709/23
2003/0188192 A1‡ 10/2003 Tang ................... H04L 63/0263 726/13
2003/0190074 A1‡ 10/2003 Loudon ................ G06K 9/6297 382/18
2003/0191625 A1‡ 10/2003 Gorin .................... G10L 15/193 704/1
2003/0191645 A1‡ 10/2003 Zhou ....................... G10L 13/08 704/26
2003/0193481 A1‡ 10/2003 Sokolsky .............. G06F 3/0488 345/17
2003/0194080 A1‡ 10/2003 Michaelis ......... H04M 3/42153 379/25
2003/0195741 A1‡ 10/2003 Mani ....................... G06F 40/53 704/8
2003/0197736 A1‡ 10/2003 Murphy ................ G06F 3/0236 715/78
2003/0197744 A1‡ 10/2003 Irvine ..................... G06F 3/038 715/85
2003/0200085 A1‡ 10/2003 Nguyen .................. G10L 15/08 704/23
2003/0200452 A1‡ 10/2003 Tagawa ..................... G06F 3/16 713/19
2003/0200858 A1‡ 10/2003 Xie .......................... G10H 1/26 84/609
2003/0202697 A1‡ 10/2003 Simard ............. G06K 9/00456 382/19
2003/0204392 A1‡ 10/2003 Finnigan .............. G06F 40/242 704/10
2003/0204492 A1‡ 10/2003 Wolf .................. G06F 16/3343
2003/0206199 A1‡ 11/2003 Pusa .................... G06F 3/0482 715/79
2003/0208756 A1‡ 11/2003 Macrae ............. G06Q 30/0269 725/34
2003/0210266 A1‡ 11/2003 Cragun .................. G06F 9/451 715/76
2003/0212543 A1‡ 11/2003 Epstein .................. G06F 40/30 704/9
2003/0212961 A1‡ 11/2003 Soin .................... G06F 3/04895 715/27
2003/0214519 A1‡ 11/2003 Smith .................. G06F 3/0481 345/66
2003/0216919 A1‡ 11/2003 Roushar ................ G06F 40/289 704/26
2003/0221198 A1‡ 11/2003 Sloo ..................... H04N 5/4401 725/13
2003/0224760 A1‡ 12/2003 Day ........................ H04L 29/06 455/41
2003/0228863 A1‡ 12/2003 Vander Veen ...... H04M 1/7255 455/41
2003/0228909 A1‡ 12/2003 Tanaka ................ H04L 12/1827 463/42
2003/0229490 A1‡ 12/2003 Etter ....................... G10L 21/04 704/21
2003/0229616 A1‡ 12/2003 Wong ...................... G06F 16/40
2003/0233230 A1‡ 12/2003 Ammicht .............. G10L 15/183 704/23
2003/0233237 A1‡ 12/2003 Garside ................... G06F 3/038 704/27
2003/0233240 A1‡ 12/2003 Kaatrasalo ............. G10L 19/00 704/27
2003/0234824 A1‡ 12/2003 Litwiller .............. G09B 21/006 715/86
2003/0236663 A1‡ 12/2003 Dimitrova ............... G10L 15/04 704/24
2004/0001396 A1‡ 1/2004 Keller ..................... G11B 17/22 369/30
2004/0006467 A1‡ 1/2004 Anisimovich ....... G06K 9/6842 704/25
2004/0008277 A1‡ 1/2004 Nagaishi .............. G06K 9/3266 348/46
2004/0010484 A1‡ 1/2004 Foulger ................ G06F 16/338 706/50
2004/0012556 A1‡ 1/2004 Yong .................... G06F 3/0202 345/10
2004/0013252 A1‡ 1/2004 Craner .................. H04M 1/247 379/14
2004/0015342 A1‡ 1/2004 Garst ....................... G06K 9/72 704/5
2004/0021676 A1‡ 2/2004 Chen ..................... G06F 3/0485 345/68
2004/0022369 A1‡ 2/2004 Vitikainen ............ H04M 3/533 379/67
2004/0022373 A1‡ 2/2004 Suder .................... H04M 3/533 379/88
2004/0023643 A1‡ 2/2004 Vander Veen ...... H04M 1/7255 455/41
2004/0030551 A1‡ 2/2004 Marcu ..................... G06F 40/45 704/24
2004/0030554 A1‡ 2/2004 Boxberger-Oberoi ...................... G10L 13/027 704/26

(56) References Cited

U.S. PATENT DOCUMENTS

2004/0030556 A1‡ 2/2004 Bennett ............... G06F 16/3344 704/27
2004/0030559 A1‡ 2/2004 Payne ..................... G10L 15/22 704/27
2004/0030996 A1‡ 2/2004 Van Liempd ....... G06F 16/9535 715/27
2004/0036715 A1‡ 2/2004 Warren ................... G06F 9/453 715/71
2004/0048627 A1‡ 3/2004 Olvera-Hernandez ..................... H04W 4/14 455/46
2004/0049388 A1‡ 3/2004 Roth ....................... G10L 15/19 704/25
2004/0049391 A1‡ 3/2004 Polanyi ............... G10L 15/1807 704/27
2004/0051729 A1‡ 3/2004 Borden, IV ......... H04M 3/4938 715/72
2004/0052338 A1‡ 3/2004 Celi, Jr. et al. ......... H04L 49/90 379/88
2004/0054530 A1‡ 3/2004 Davis ...................... G10L 15/19 704/23
2004/0054533 A1‡ 3/2004 Bellegarda ............ G10L 15/063 704/25
2004/0054534 A1‡ 3/2004 Junqua .................. G10L 13/033 704/25
2004/0054535 A1‡ 3/2004 Mackie ................... G10L 13/08 704/26
2004/0054541 A1‡ 3/2004 Kryze .................. G06F 16/433 704/27
2004/0054690 A1‡ 3/2004 Hillerbrand ............ G06Q 10/06
2004/0055446 A1‡ 3/2004 Robbin ................ G10H 1/0008 84/615
2004/0056899 A1‡ 3/2004 Sinclair, II ................ G06T 3/40 715/80
2004/0059577 A1‡ 3/2004 Pickering ................ G10L 13/08 704/26
2004/0059790 A1‡ 3/2004 Austin-Lane ........... H04L 51/04 709/20
2004/0061717 A1‡ 4/2004 Menon .................. G06F 16/957 715/72
2004/0062367 A1‡ 4/2004 Fellenstein ....... H04M 3/53333 379/88
2004/0064593 A1‡ 4/2004 Sinclair ................... H04L 67/42 709/25
2004/0069122 A1‡ 4/2004 Wilson ................. G10H 1/0058 84/609
2004/0070567 A1‡ 4/2004 Longe ....................... G06F 3/02 345/15
2004/0070612 A1‡ 4/2004 Sinclair .................. G06F 9/451 715/76
2004/0073427 A1‡ 4/2004 Moore .................... G10L 13/08 704/25
2004/0073428 A1‡ 4/2004 Zlokarnik ............ G10L 13/033 704/26
2004/0076086 A1‡ 4/2004 Keller .................... G11B 17/22 369/30
2004/0078382 A1‡ 4/2004 Mercer ................ G11B 19/025
2004/0085162 A1‡ 5/2004 Agarwal ................. G10L 15/22 333/19
2004/0085368 A1‡ 5/2004 Johnson, Jr. .......... G06F 3/0486 715/86
2004/0086120 A1‡ 5/2004 Akins, III ............ G11B 27/034 380/24
2004/0093213 A1‡ 5/2004 Conkie ................... G10L 13/07 704/25
2004/0093215 A1‡ 5/2004 Gupta ..................... G06F 3/038 704/27
2004/0093328 A1‡ 5/2004 Damle .................. G06F 16/367
2004/0094018 A1‡ 5/2004 Ueshima ................ G10H 1/361 84/610
2004/0096105 A1‡ 5/2004 Holtsberg ............. G06K 9/222 382/18
2004/0098250 A1‡ 5/2004 Kimchi ................... G06F 16/36 704/9
2004/0100479 A1‡ 5/2004 Nakano ................. G06F 1/1626 715/70
2004/0106432 A1‡ 6/2004 Kanamori ......... H04M 1/72522 455/55
2004/0107169 A1‡ 6/2004 Lowe ...................... G06F 16/40 705/59
2004/0111266 A1‡ 6/2004 Coorman ................ G10L 13/06 704/26
2004/0111332 A1‡ 6/2004 Baar ..................... G06F 3/0481 705/50
2004/0114731 A1‡ 6/2004 Gillett ....................... G06T 9/00 379/88
2004/0120476 A1‡ 6/2004 Harrison ............... H04M 3/493 379/88
2004/0122656 A1‡ 6/2004 Abir ........................ G06F 16/30 704/4
2004/0122664 A1‡ 6/2004 Lorenzo ............. H04M 1/6025 704/22
2004/0122673 A1‡ 6/2004 Park ........................ G10L 15/22 704/27
2004/0124583 A1‡ 7/2004 Landis .................. A63F 3/0423 273/27
2004/0125088 A1‡ 7/2004 Zimmerman ......... G06F 3/0485 345/17
2004/0125922 A1‡ 7/2004 Specht ................. G10K 11/175 379/88
2004/0127198 A1‡ 7/2004 Roskind ............ H04M 1/72566 455/41
2004/0127241 A1‡ 7/2004 Shostak ................ H04W 4/029 455/50
2004/0128137 A1‡ 7/2004 Bush ....................... G06F 3/167 704/27
2004/0128614 A1‡ 7/2004 Andrews ................. G06F 40/58 715/20
2004/0133817 A1‡ 7/2004 Choi ....................... G06F 1/162 713/30
2004/0135701 A1‡ 7/2004 Yasuda ............. G05B 19/0421 340/4
2004/0135774 A1‡ 7/2004 La Monica ........... G06F 3/0233 345/17
2004/0136510 A1‡ 7/2004 Vander Veen ...... H04M 1/7255 379/88
2004/0138869 A1‡ 7/2004 Heinecke .............. G06F 40/216 704/1
2004/0145607 A1‡ 7/2004 Alderson ................ G06F 9/451 715/74
2004/0153306 A1‡ 8/2004 Tanner .................. G06F 40/242 704/4
2004/0155869 A1‡ 8/2004 Robinson .............. G06F 3/0237 345/16
2004/0160419 A1‡ 8/2004 Padgitt ................ G06F 3/04842 345/17
2004/0162741 A1‡ 8/2004 Flaxer .................... G06Q 10/10 705/7
2004/0170379 A1‡ 9/2004 Yao .................. H04N 21/23106 386/24
2004/0174399 A1‡ 9/2004 Wu ....................... G06F 40/166 715/86
2004/0174434 A1‡ 9/2004 Walker ............... H04N 1/32128 348/21
2004/0176958 A1‡ 9/2004 Salmenkaita ..... H04M 1/72572 704/27
2004/0177319 A1‡ 9/2004 Horn ....................... G06F 16/22 715/20
2004/0178994 A1‡ 9/2004 Kairls, Jr. ............. G06F 3/0418 345/17
2004/0181392 A1‡ 9/2004 Parikh ................... G06F 16/322 704/10
2004/0183833 A1‡ 9/2004 Chua ..................... G06F 3/0237 715/77
2004/0186713 A1‡ 9/2004 Gomas et al. ....... G09B 21/006 704/23
2004/0186714 A1‡ 9/2004 Baker ..................... G10L 15/08 704/23

(56) References Cited

U.S. PATENT DOCUMENTS

| | | | | | |
|---|---|---|---|---|---|
| 2004/0186777 | A1 ‡ | 9/2004 | Margiloff | G06Q 30/02 | 705/14 |
| 2004/0186857 | A1 ‡ | 9/2004 | Serlet | G06F 16/173 | |
| 2004/0193398 | A1 ‡ | 9/2004 | Chu | G10L 13/08 | 704/3 |
| 2004/0193420 | A1 ‡ | 9/2004 | Kennewick | G06F 16/3329 | 704/25 |
| 2004/0193421 | A1 ‡ | 9/2004 | Blass | G10L 13/02 | 704/25 |
| 2004/0193426 | A1 ‡ | 9/2004 | Maddux | G06Q 30/02 | 704/27 |
| 2004/0196256 | A1 ‡ | 10/2004 | Wobbrock | G04G 21/08 | 345/15 |
| 2004/0198436 | A1 ‡ | 10/2004 | Alden | H04B 1/3805 | 455/55 |
| 2004/0199375 | A1 ‡ | 10/2004 | Ehsani | G10L 15/197 | 704/4 |
| 2004/0199387 | A1 ‡ | 10/2004 | Wang | G06Q 30/06 | 704/24 |
| 2004/0199663 | A1 ‡ | 10/2004 | Horvitz | G05B 19/404 | 709/23 |
| 2004/0203520 | A1 ‡ | 10/2004 | Schirtzinger | G06F 1/162 | 455/90 |
| 2004/0205151 | A1 ‡ | 10/2004 | Sprigg | H04W 8/245 | 709/21 |
| 2004/0205671 | A1 ‡ | 10/2004 | Sukehiro | G06F 40/242 | 715/25 |
| 2004/0208302 | A1 ‡ | 10/2004 | Urban | H04M 1/575 | 379/14 |
| 2004/0210442 | A1 ‡ | 10/2004 | Glynn | G06Q 10/06 | 704/27 |
| 2004/0210634 | A1 ‡ | 10/2004 | Ferrer | G06Q 30/02 | 709/20 |
| 2004/0213419 | A1 ‡ | 10/2004 | Varma | 381/92 | |
| 2004/0215731 | A1 ‡ | 10/2004 | Tzann-en Szeto | H04L 51/04 | 709/20 |
| 2004/0216049 | A1 ‡ | 10/2004 | Lewis | G10L 15/24 | 715/24 |
| 2004/0218451 | A1 ‡ | 11/2004 | Said | G06F 3/0481 | 365/22 |
| 2004/0220798 | A1 ‡ | 11/2004 | Chi | B60R 25/257 | 704/20 |
| 2004/0220809 | A1 ‡ | 11/2004 | Wang | G06F 40/205 | 704/25 |
| 2004/0221235 | A1 ‡ | 11/2004 | Marchisio | G06F 40/211 | 715/26 |
| 2004/0223485 | A1 ‡ | 11/2004 | Arellano | H04L 51/04 | 370/35 |
| 2004/0223599 | A1 ‡ | 11/2004 | Bear | H04M 3/436 | 379/20 |
| 2004/0224638 | A1 ‡ | 11/2004 | Fadell | G06F 1/1632 | 455/66 |
| 2004/0225501 | A1 ‡ | 11/2004 | Cutaia | G10L 13/033 | 704/26 |
| 2004/0225504 | A1 ‡ | 11/2004 | Junqua | G06F 3/16 | 704/27 |
| 2004/0225650 | A1 ‡ | 11/2004 | Cooper | H04M 3/527 | |
| 2004/0225746 | A1 ‡ | 11/2004 | Niell | H04W 4/00 | 709/23 |
| 2004/0230420 | A1 ‡ | 11/2004 | Kadambe | G10L 15/07 | 704/20 |
| 2004/0230637 | A1 ‡ | 11/2004 | Lecoueche | G10L 15/20 | 709/20 |
| 2004/0236778 | A1 ‡ | 11/2004 | Junqua | G11B 27/002 | |
| 2004/0242286 | A1 ‡ | 12/2004 | Benco | H04M 3/28 | 455/57 |
| 2004/0243412 | A1 ‡ | 12/2004 | Gupta | G10L 15/07 | 704/25 |
| 2004/0243419 | A1 ‡ | 12/2004 | Wang | G10L 15/1822 | 704/27 |
| 2004/0249629 | A1 ‡ | 12/2004 | Webster | G10L 13/10 | 704/4 |
| 2004/0249637 | A1 ‡ | 12/2004 | Baker | G10L 15/1822 | 704/23 |
| 2004/0249667 | A1 ‡ | 12/2004 | Oon | G16H 10/60 | 705/2 |
| 2004/0252119 | A1 ‡ | 12/2004 | Hunleth | G06F 3/0482 | 345/44 |
| 2004/0252604 | A1 ‡ | 12/2004 | Johnson | G11B 27/034 | 369/47 |
| 2004/0252966 | A1 ‡ | 12/2004 | Holloway | H04N 9/8042 | 386/23 |
| 2004/0254791 | A1 ‡ | 12/2004 | Coifman | G10L 15/26 | 704/24 |
| 2004/0254792 | A1 ‡ | 12/2004 | Busayapongchai | H04M 3/4938 | 704/26 |
| 2004/0257432 | A1 ‡ | 12/2004 | Girish | H04N 7/142 | 348/14 |
| 2004/0259536 | A1 ‡ | 12/2004 | Keskar | H04M 1/72569 | 455/41 |
| 2004/0260438 | A1 ‡ | 12/2004 | Chernetsky | G10L 15/22 | 701/36 |
| 2004/0260547 | A1 ‡ | 12/2004 | Cohen | G10L 15/20 | 704/23 |
| 2004/0260718 | A1 ‡ | 12/2004 | Fedorov | G06F 9/44505 | |
| 2004/0261023 | A1 ‡ | 12/2004 | Bier | G06F 40/186 | 715/23 |
| 2004/0262051 | A1 ‡ | 12/2004 | Carro | G06F 3/044 | 178/18 |
| 2004/0263636 | A1 ‡ | 12/2004 | Cutler | H04N 7/15 | 348/21 |
| 2004/0267825 | A1 ‡ | 12/2004 | Novak | G11B 27/105 | |
| 2004/0268253 | A1 ‡ | 12/2004 | DeMello | G06F 40/169 | 715/23 |
| 2004/0268262 | A1 ‡ | 12/2004 | Gupta | G06F 9/451 | 715/71 |
| 2005/0002507 | A1 ‡ | 1/2005 | Timmins | H04M 3/4878 | 379/18 |
| 2005/0010409 | A1 ‡ | 1/2005 | Hull | G06K 15/00 | 704/24 |
| 2005/0012723 | A1 ‡ | 1/2005 | Pallakoff | G06F 1/1616 | 345/17 |
| 2005/0015254 | A1 ‡ | 1/2005 | Beaman | G06F 3/167 | 704/27 |
| 2005/0015751 | A1 ‡ | 1/2005 | Grassens | G06F 11/3624 | 717/13 |
| 2005/0015772 | A1 ‡ | 1/2005 | Saare | H04L 67/02 | 719/31 |
| 2005/0021330 | A1 ‡ | 1/2005 | Mano | G10L 15/148 | 704/23 |
| 2005/0022114 | A1 ‡ | 1/2005 | Shanahan | G06F 16/93 | 715/23 |
| 2005/0024341 | A1 ‡ | 2/2005 | Gillespie | G06F 1/1616 | 345/17 |
| 2005/0024345 | A1 ‡ | 2/2005 | Eastty | G06F 3/04847 | 345/17 |
| 2005/0027385 | A1 ‡ | 2/2005 | Yueh | G10H 1/0041 | 700/94 |
| 2005/0030175 | A1 ‡ | 2/2005 | Wolfe | G08B 13/2462 | 340/53 |
| 2005/0031106 | A1 ‡ | 2/2005 | Henderson | H04M 1/576 | 379/14 |
| 2005/0033582 | A1 ‡ | 2/2005 | Gadd | G06Q 30/02 | 704/27 |
| 2005/0033771 | A1 ‡ | 2/2005 | Schmitter | G06Q 30/02 | |
| 2005/0034164 | A1 ‡ | 2/2005 | Sano | H04N 7/17318 | 725/91 |
| 2005/0038657 | A1 ‡ | 2/2005 | Roth | G10L 15/19 | 704/26 |
| 2005/0039141 | A1 ‡ | 2/2005 | Burke | G06F 16/957 | 715/81 |
| 2005/0042591 | A1 ‡ | 2/2005 | Bloom | G11B 27/034 | 434/30 |
| 2005/0043946 | A1 ‡ | 2/2005 | Ueyama | G10L 15/30 | 704/23 |
| 2005/0043949 | A1 ‡ | 2/2005 | Roth | G10L 15/14 | 704/25 |

(56) References Cited

U.S. PATENT DOCUMENTS

2005/0044569 A1‡ 2/2005 Marcus ................ G06Q 20/123 725/42
2005/0045373 A1‡ 3/2005 Born ..................... G06F 3/0482 174/25
2005/0049862 A1‡ 3/2005 Choi ....................... G10L 17/00 704/23
2005/0049870 A1‡ 3/2005 Zhang ..................... G10L 15/10 704/25
2005/0049880 A1‡ 3/2005 Roth ....................... G10L 15/19 704/27
2005/0055212 A1‡ 3/2005 Nagao ..................... G10L 13/00 704/27
2005/0055403 A1‡ 3/2005 Brittan .................... H04L 29/06 709/20
2005/0058438 A1‡ 3/2005 Hayashi ........... G11B 20/00086 386/23
2005/0060155 A1‡ 3/2005 Chu ........................ G10L 25/69 704/26
2005/0071165 A1‡ 3/2005 Hofstader ............ G09B 21/006 704/27
2005/0071332 A1‡ 3/2005 Ortega ................ G06F 16/3338
2005/0071437 A1‡ 3/2005 Bear ...................... G06Q 10/10 709/21
2005/0074113 A1‡ 4/2005 Mathew ................. G06Q 10/06 379/26
2005/0075881 A1‡ 4/2005 Rigazio ............... G06F 16/7844 704/27
2005/0080613 A1‡ 4/2005 Colledge ............... G06F 16/951 704/9
2005/0080620 A1‡ 4/2005 Rao ..................... G10L 21/0208 704/22
2005/0080625 A1‡ 4/2005 Bennett ................. G10L 15/005 704/24
2005/0080632 A1‡ 4/2005 Endo ...................... G10L 15/08 704/27
2005/0080780 A1‡ 4/2005 Colledge ............... G06F 16/951
2005/0086059 A1‡ 4/2005 Bennett ............. G06F 16/24522 704/27
2005/0086255 A1‡ 4/2005 Schran .................... G06F 11/34
2005/0086605 A1‡ 4/2005 Ferrer .................... G06Q 30/02 715/74
2005/0091118 A1‡ 4/2005 Fano .................... G06Q 10/109 705/26
2005/0094475 A1‡ 5/2005 Naoi ................... G06F 16/9577 365/23
2005/0099398 A1‡ 5/2005 Garside ................. G06F 40/171 345/17
2005/0100214 A1‡ 5/2005 Zhang .................... G06K 9/222 382/17
2005/0102144 A1‡ 5/2005 Rapoport .............. G10L 13/033 704/26
2005/0102614 A1‡ 5/2005 Brockett ............... G06F 40/279 715/23
2005/0102625 A1‡ 5/2005 Lee ................... H04M 1/72547 715/72
2005/0105712 A1‡ 5/2005 Williams .............. G10L 13/027 379/26
2005/0108001 A1‡ 5/2005 Aarskog ............... G06F 40/289 455/56
2005/0108017 A1‡ 5/2005 Esser .................... G10L 15/005 704/27
2005/0108074 A1‡ 5/2005 Bloechl ............ G06Q 10/06311 705/7
2005/0108338 A1‡ 5/2005 Simske ................ G06Q 10/107 709/20
2005/0108344 A1‡ 5/2005 Tafoya ................ G06Q 10/107 709/20
2005/0108642 A1‡ 5/2005 Sinclair, II .......... G06F 9/44505 715/70
2005/0114124 A1‡ 5/2005 Liu ..................... G10L 21/0208 704/22
2005/0114140 A1‡ 5/2005 Brackett ................. G10L 15/01 704/27
2005/0114306 A1‡ 5/2005 Shu ..................... G06F 16/9535
2005/0114791 A1‡ 5/2005 Bollenbacher ........ G06F 3/0485 715/78
2005/0119890 A1‡ 6/2005 Hirose .................... G10L 13/08 704/26
2005/0119897 A1‡ 6/2005 Bennett ................. G10L 15/005 704/27
2005/0125216 A1‡ 6/2005 Chitrapura ............. G06F 40/30 704/1
2005/0125226 A1‡ 6/2005 Magee ..................... G07C 9/37 704/24
2005/0125235 A1‡ 6/2005 Lazay ................... H04M 1/271 704/27
2005/0131951 A1‡ 6/2005 Zhang .................. G06K 9/6215
2005/0132301 A1‡ 6/2005 Ikeda ................. G06F 3/04842 715/81
2005/0136949 A1‡ 6/2005 Barnes .................. G06F 40/134 455/46
2005/0138305 A1‡ 6/2005 Zellner ................. H04M 3/533 711/15
2005/0140504 A1‡ 6/2005 Marshall .............. G06K 7/0008 340/48
2005/0143972 A1‡ 6/2005 Gopalakrishnan ...... G06F 40/20 704/10
2005/0144003 A1‡ 6/2005 Iso-Sipila ............... G10L 13/08 704/26
2005/0144070 A1‡ 6/2005 Cheshire ........... G06Q 30/0267 705/14
2005/0144568 A1‡ 6/2005 Gruen ................... G06F 3/0482 715/82
2005/0148356 A1‡ 7/2005 Ferguson ............ G06Q 10/107 455/50
2005/0149214 A1‡ 7/2005 Yoo ........................ G11B 27/34 700/94
2005/0149330 A1‡ 7/2005 Katae ...................... G10L 13/06 704/26
2005/0149332 A1‡ 7/2005 Kuzunuki ............... G10L 15/22 704/27
2005/0149510 A1‡ 7/2005 Shafrir .................. G06F 16/367
2005/0152558 A1‡ 7/2005 Van Tassel ........... G10H 1/0091 381/61
2005/0152602 A1‡ 7/2005 Chen ...................... G06K 9/222 382/18
2005/0154578 A1‡ 7/2005 Tong ....................... G06F 40/14 704/5
2005/0154591 A1‡ 7/2005 Lecoeuche .............. G10L 15/30 704/27
2005/0159939 A1‡ 7/2005 Mohler ................. G06F 40/109 704/4
2005/0159957 A1‡ 7/2005 Roth ....................... G10L 15/22 704/27
2005/0162395 A1‡ 7/2005 Unruh ................... G06F 3/0236 345/16
2005/0165015 A1‡ 7/2005 Ncube .................. C07D 213/26 514/23
2005/0165607 A1‡ 7/2005 Di Fabbrizio .......... G10L 15/22 704/25
2005/0166153 A1‡ 7/2005 Eytchison ............. G06F 3/0482 715/74
2005/0177359 A1 8/2005 Lu et al.
2005/0177445 A1‡ 8/2005 Church .................. G06Q 30/02 705/26
2005/0181770 A1‡ 8/2005 Helferich ............ H04M 1/7255 455/41
2005/0182616 A1‡ 8/2005 Kotipalli ............... G06F 40/126 704/2
2005/0182627 A1‡ 8/2005 Tanaka ............ G11B 20/00007 704/24
2005/0182628 A1‡ 8/2005 Choi ....................... G10L 15/08 704/25
2005/0182629 A1‡ 8/2005 Coorman ................ G10L 13/06 704/26
2005/0182630 A1‡ 8/2005 Miro ....................... G10L 13/08 704/26

(56) References Cited

U.S. PATENT DOCUMENTS

2005/0182765 A1 ‡ 8/2005 Liddy .................. G06F 16/335
2005/0184958 A1 ‡ 8/2005 Gnanamgari ......... G06F 3/0386 345/15
2005/0187770 A1 ‡ 8/2005 Kompe .................. G10L 17/02 704/25
2005/0187773 A1 ‡ 8/2005 Filoche ............... H04M 3/4938 704/26
2005/0190970 A1 ‡ 9/2005 Griffin ................. G06F 3/0237 382/20
2005/0192801 A1 ‡ 9/2005 Lewis .................... G10L 15/18 704/24
2005/0192812 A1 ‡ 9/2005 Buchholz .............. G10L 19/012 704/27
2005/0195077 A1 ‡ 9/2005 McCulloch ........... G06Q 50/22 340/50
2005/0195429 A1 ‡ 9/2005 Archbold .............. G06F 9/4881 358/1
2005/0196733 A1 ‡ 9/2005 Budra ..................... G09B 7/00 434/17
2005/0201572 A1 ‡ 9/2005 Lindahl ................. H03G 5/165 381/10
2005/0202854 A1 ‡ 9/2005 Kortum ................. H01R 27/00 455/57
2005/0203738 A1 ‡ 9/2005 Hwang ................. G10L 15/063 704/24
2005/0203747 A1 ‡ 9/2005 Lecoeuche .......... H04M 3/4938 704/27
2005/0203991 A1 ‡ 9/2005 Kawamura ........... G06F 16/686 709/20
2005/0209848 A1 ‡ 9/2005 Ishii .................... H04L 12/1831 704/23
2005/0210394 A1 ‡ 9/2005 Crandall ............. H04L 12/1831 715/75
2005/0216331 A1 ‡ 9/2005 Ahrens ................. G06Q 10/00 705/7
2005/0222843 A1 ‡ 10/2005 Kahn .................... G10L 15/063 704/23
2005/0222973 A1 ‡ 10/2005 Kaiser ..................... G06F 16/93
2005/0228665 A1 ‡ 10/2005 Kobayashi ........... H04N 21/235 704/24
2005/0245243 A1 ‡ 11/2005 Zuniga ............. H04N 21/26208 455/41
2005/0246350 A1 ‡ 11/2005 Canaran ................ G06F 40/221
2005/0246365 A1 ‡ 11/2005 Lowles ................ G06F 3/0237
2005/0246686 A1 ‡ 11/2005 Seshadri ................ G06N 5/046 717/11
2005/0246726 A1 ‡ 11/2005 Labrou ................... G06F 9/465 719/32
2005/0251572 A1 ‡ 11/2005 McMahan ............. H04L 43/065 709/22
2005/0254481 A1 ‡ 11/2005 Vishik ..................... H04L 51/36 370/35
2005/0261901 A1 ‡ 11/2005 Davis ...................... G10L 15/19 704/23
2005/0262440 A1 ‡ 11/2005 Stanciu ................... G06F 40/14 715/23
2005/0267738 A1 ‡ 12/2005 Wilkinson ............. G06F 40/58 704/9
2005/0267757 A1 ‡ 12/2005 Iso-Sipila .............. G10L 13/08 704/26
2005/0268247 A1 ‡ 12/2005 Baneth ................ G06F 3/04886 715/78
2005/0271216 A1 ‡ 12/2005 Lashkari .................. H04R 3/04 381/59
2005/0273332 A1 ‡ 12/2005 Scott ..................... G06F 40/274 704/24
2005/0273337 A1 ‡ 12/2005 Erell ....................... G10L 13/08 704/26
2005/0273626 A1 ‡ 12/2005 Pearson ............... G06Q 20/341 713/18
2005/0278297 A1 ‡ 12/2005 Nelson .................. G06Q 30/01
2005/0278643 A1 ‡ 12/2005 Ukai ........................ G09G 5/00 715/75
2005/0278647 A1 ‡ 12/2005 Leavitt ................ G06F 3/04817 715/76
2005/0283363 A1 ‡ 12/2005 Weng .................. G10L 15/1822 704/25
2005/0283364 A1 ‡ 12/2005 Longe ..................... G10L 15/24 704/25
2005/0283726 A1 ‡ 12/2005 Lunati ................... G06F 40/232 715/25
2005/0283729 A1 ‡ 12/2005 Morris ................ G06F 3/04842 715/72
2005/0288934 A1 ‡ 12/2005 Omi ....................... G06F 3/038 704/27
2005/0288936 A1 ‡ 12/2005 Busayapongchai ......................... H04M 3/4936 704/27
2005/0289458 A1 ‡ 12/2005 Kylmanen ............. G06F 16/95 715/23
2005/0289463 A1 ‡ 12/2005 Wu ........................ G06F 40/129 715/25
2006/0001652 A1 ‡ 1/2006 Chiu ................... G06F 3/04855 345/17
2006/0004570 A1 ‡ 1/2006 Ju .......................... G10L 15/22 704/24
2006/0004640 A1 ‡ 1/2006 Swierczek ......... G06Q 30/0623 705/26
2006/0004744 A1 ‡ 1/2006 Nevidomski ..... G06F 16/90344
2006/0007174 A1 ‡ 1/2006 Shen ................... G06F 3/04855 345/17
2006/0009973 A1 ‡ 1/2006 Nguyen ............. H04M 3/4936 704/25
2006/0013414 A1 ‡ 1/2006 Shih .................... H03G 3/3005 381/10
2006/0013446 A1 ‡ 1/2006 Stephens ................ H04M 1/67 382/11
2006/0015326 A1 ‡ 1/2006 Mori ...................... G06F 40/53 704/9
2006/0015341 A1 ‡ 1/2006 Baker .................. G10L 15/063 704/25
2006/0015484 A1 ‡ 1/2006 Weng .................... G06F 40/295
2006/0015819 A1 ‡ 1/2006 Hawkins ............ H04M 1/7255 715/78
2006/0018446 A1 ‡ 1/2006 Schmandt ........... H04M 1/6505 379/88
2006/0018492 A1 ‡ 1/2006 Chiu ...................... H04S 1/002 381/10
2006/0020890 A1 ‡ 1/2006 Kroll ..................... G06F 1/1626 715/71
2006/0025999 A1 ‡ 2/2006 Feng ...................... G10L 13/10 704/26
2006/0026233 A1 ‡ 2/2006 Tenembaum ........... A63F 13/12 709/20
2006/0026521 A1 ‡ 2/2006 Hotelling ............. G06F 3/0418 715/70
2006/0026535 A1 ‡ 2/2006 Hotelling ............. G06F 3/0418 715/86
2006/0026536 A1 ‡ 2/2006 Hotelling ............. G06F 3/0418 715/86
2006/0033724 A1 ‡ 2/2006 Chaudhri ............. G06F 3/0482 345/17
2006/0035632 A1 ‡ 2/2006 Sorvari ............ H04M 1/72547 455/41
2006/0036946 A1 ‡ 2/2006 Radtke ................. G06F 40/166 715/71
2006/0041424 A1 ‡ 2/2006 Todhunter ............ G06F 16/345 704/9
2006/0041431 A1 ‡ 2/2006 Maes ..................... G10L 15/30 704/27
2006/0041590 A1 ‡ 2/2006 King ................. G06K 17/0016
2006/0047632 A1 ‡ 3/2006 Zhang .................. G06F 16/367
2006/0050865 A1 ‡ 3/2006 Kortum .................. G06F 9/453 379/26
2006/0052141 A1 ‡ 3/2006 Suzuki ............... H04M 1/6091 455/56

(56) References Cited

U.S. PATENT DOCUMENTS

2006/0053007 A1‡ 3/2006 Niemisto ................ G10L 25/78 704/23
2006/0053365 A1‡ 3/2006 Hollander ............ G06F 16/954 715/20
2006/0053379 A1‡ 3/2006 Henderson ........... G06F 3/0481 715/75
2006/0053387 A1‡ 3/2006 Ording ................ G06F 3/04883 715/77
2006/0058999 A1‡ 3/2006 Barker ..................... G09B 5/04 704/25
2006/0059424 A1‡ 3/2006 Petri ....................... G06F 9/454 715/25
2006/0059437 A1‡ 3/2006 Conklin, III .......... G06F 3/0481 715/80
2006/0060762 A1‡ 3/2006 Chan ..................... H04M 1/605 250/22
2006/0061488 A1‡ 3/2006 Dunton ................ G06Q 10/109 340/98
2006/0064693 A1‡ 3/2006 Messer ..................... G06F 8/38 718/10
2006/0067535 A1‡ 3/2006 Culbert .................. H04S 1/007 381/58
2006/0067536 A1‡ 3/2006 Culbert .................. H04S 1/007 381/58
2006/0069567 A1‡ 3/2006 Tischer ................. G10L 13/033 704/26
2006/0069664 A1‡ 3/2006 Ling ................ G06F 16/90335
2006/0072248 A1‡ 4/2006 Watanabe ............. H04R 9/066 360/31
2006/0072716 A1‡ 4/2006 Pham .................. H04M 3/4285 379/88
2006/0074628 A1‡ 4/2006 Elbaz .................... G06F 40/263 704/8
2006/0074651 A1‡ 4/2006 Arun ....................... G10L 15/22 704/23
2006/0074660 A1‡ 4/2006 Waters .................... G10L 15/26 704/25
2006/0074674 A1‡ 4/2006 Zhang ..................... G10L 13/04 704/26
2006/0074750 A1‡ 4/2006 Clark ................. G06Q 30/0264 705/14
2006/0074898 A1‡ 4/2006 Gavalda .................. G10L 15/32
2006/0075429 A1‡ 4/2006 Istvan .................... H04N 7/163 725/39
2006/0077055 A1‡ 4/2006 Basir .................... G06Q 10/109 340/53
2006/0080098 A1‡ 4/2006 Campbell ............. G10L 15/063 704/24
2006/0085187 A1‡ 4/2006 Barquilla ................ G10L 13/08 704/24
2006/0085465 A1‡ 4/2006 Nori ...................... G06F 16/213
2006/0085757 A1‡ 4/2006 Andre ..................... G06F 3/041 715/77
2006/0093998 A1‡ 5/2006 Vertegaal ................ G06F 3/011 434/23
2006/0095265 A1‡ 5/2006 Chu ...................... G10L 13/033 704/26
2006/0095790 A1‡ 5/2006 Nguyen ............. G06Q 20/3224 713/18
2006/0095846 A1‡ 5/2006 Nurmi ..................... G06F 3/016 715/70
2006/0095848 A1‡ 5/2006 Naik ...................... G11B 27/10 715/71
2006/0097991 A1‡ 5/2006 Hotelling ................ G06F 3/044 345/17
2006/0100848 A1‡ 5/2006 Cozzi .................... G06F 40/129 704/5
2006/0100849 A1‡ 5/2006 Chan ..................... G06F 40/169 704/8
2006/0101354 A1‡ 5/2006 Hashimoto ........... G06F 3/0482 715/86
2006/0103633 A1‡ 5/2006 Gioeli ............... H04M 1/72522 345/17
2006/0106592 A1‡ 5/2006 Brockett ................. G06F 40/20 704/1
2006/0106594 A1‡ 5/2006 Brockett ................. G06F 40/20 704/9
2006/0106595 A1‡ 5/2006 Brockett ................. G06F 40/45 704/9
2006/0111906 A1‡ 5/2006 Cross ...................... G10L 15/26 704/25
2006/0111909 A1‡ 5/2006 Maes ................ H04L 29/06027 704/27
2006/0116874 A1‡ 6/2006 Samuelsson ............ G10L 19/26
2006/0116877 A1‡ 6/2006 Pickering ................ G10L 15/08 704/23
2006/0117002 A1‡ 6/2006 Swen .................... G06F 16/353
2006/0119582 A1‡ 6/2006 Ng ...................... G06F 3/04883 345/16
2006/0122834 A1‡ 6/2006 Bennett ............... G10L 15/1822 704/25
2006/0122836 A1‡ 6/2006 Cross, Jr. ................ G10L 15/30 704/26
2006/0129379 A1‡ 6/2006 Ramsey .................. G06F 3/038 704/9
2006/0129929 A1‡ 6/2006 Weber ..................... G06F 40/18 715/26
2006/0130006 A1‡ 6/2006 Chitale ................. G06F 40/263 717/13
2006/0132812 A1‡ 6/2006 Barnes .................. G06F 40/166 358/1
2006/0135214 A1‡ 6/2006 Zhang ................... H04M 1/271 455/56
2006/0136213 A1‡ 6/2006 Hirose .................. G10L 13/033 704/26
2006/0136280 A1‡ 6/2006 Cho ....................... G06Q 10/06 705/7
2006/0136352 A1‡ 6/2006 Brun ..................... G06F 40/268
2006/0141990 A1‡ 6/2006 Zak ................... H04M 1/72522 455/41
2006/0142576 A1‡ 6/2006 Meng ................... C07D 239/26 544/31
2006/0142993 A1‡ 6/2006 Menendez-Pidal .......................... G06F 16/353 704/9
2006/0143007 A1‡ 6/2006 Koh ........................ G10L 15/22 704/24
2006/0143559 A1‡ 6/2006 Spielberg ................ G06F 3/165 715/20
2006/0143576 A1‡ 6/2006 Gupta .................. G06K 9/6293 715/80
2006/0148520 A1‡ 7/2006 Baker ................. G06F 3/04817 455/55
2006/0149557 A1‡ 7/2006 Kaneko ................. G06F 40/242 704/27
2006/0149558 A1‡ 7/2006 Kahn .................... G10L 15/063 704/27
2006/0150087 A1‡ 7/2006 Cronenberger ....... G06F 16/338 715/25
2006/0152496 A1‡ 7/2006 Knaven .................. G06F 3/023 345/17
2006/0153040 A1‡ 7/2006 Girish .................. G06F 3/0414 369/59
2006/0156252 A1‡ 7/2006 Sheshagiri .......... H04L 12/2803 715/82
2006/0156307 A1‡ 7/2006 Kunjithapatham ... G06F 9/4843 718/10
2006/0161870 A1‡ 7/2006 Hotelling ............. G06F 3/0485 715/86
2006/0161871 A1‡ 7/2006 Hotelling ............. G06F 3/0485 715/86
2006/0161872 A1‡ 7/2006 Rytivaara ............... H04L 51/38 715/86
2006/0165105 A1‡ 7/2006 Shenfield ................ G06F 9/546 370/40
2006/0167676 A1‡ 7/2006 Plumb .................. G06F 40/232 704/6

(56) References Cited

U.S. PATENT DOCUMENTS

2006/0168150 A1‡ 7/2006 Naik ................. H04L 29/06027 709/21
2006/0168507 A1‡ 7/2006 Hansen .............. H04N 21/2335 715/20
2006/0168539 A1‡ 7/2006 Hawkins ........... H04W 12/0608 715/78
2006/0172720 A1‡ 8/2006 Islam ................ H04M 1/72536 455/40
2006/0173683 A1‡ 8/2006 Roth ..................... G10L 15/183 704/25
2006/0173684 A1‡ 8/2006 Fischer ................... G10L 15/20 704/25
2006/0174207 A1‡ 8/2006 Deshpande .......... G06Q 10/107 715/75
2006/0178868 A1‡ 8/2006 Billerey-Mosier .......................... G06Q 10/087 704/9
2006/0181519 A1‡ 8/2006 Vernier ............... G06F 3/04886 345/17
2006/0183466 A1‡ 8/2006 Lee ......................... H04W 4/00 455/41
2006/0184886 A1‡ 8/2006 Chung ................. G06Q 10/107 715/75
2006/0187073 A1‡ 8/2006 Lin .................... G01R 31/3648 340/63
2006/0190269 A1‡ 8/2006 Tessel ..................... G10L 15/30 704/27
2006/0190436 A1‡ 8/2006 Richardson ....... G06F 16/24534
2006/0190577 A1‡ 8/2006 Yamada ........... H04L 29/06027 709/22
2006/0193518 A1‡ 8/2006 Dong ................. G06K 9/00859 382/18
2006/0194181 A1‡ 8/2006 Rosenberg ............... G09B 5/06 434/31
2006/0195206 A1‡ 8/2006 Moon ..................... G06T 9/007 700/94
2006/0195323 A1‡ 8/2006 Monne .................... G10L 15/30 704/27
2006/0197753 A1‡ 9/2006 Hotelling ................ G06F 1/169 345/17
2006/0197755 A1‡ 9/2006 Bawany .................. G06F 1/266 345/17
2006/0200253 A1‡ 9/2006 Hoffberg ............... G05B 15/02 700/19
2006/0200342 A1‡ 9/2006 Corston-Oliver ..... G06F 40/253 704/10
2006/0200347 A1‡ 9/2006 Kim ....................... G10L 15/22 704/23
2006/0205432 A1‡ 9/2006 Hawkins ........... H04M 1/27475 455/55
2006/0206313 A1‡ 9/2006 Xu ........................ G06F 40/242 704/10
2006/0206454 A1‡ 9/2006 Forstall ................. G06F 16/951
2006/0206724 A1‡ 9/2006 Schaufele ............... G10L 17/00 713/18
2006/0212415 A1‡ 9/2006 Backer ................ G06F 16/3347 706/45
2006/0217967 A1‡ 9/2006 Goertzen .................. G06F 3/16 704/20
2006/0218244 A1‡ 9/2006 Rasmussen ............. H04L 67/12 709/21
2006/0221738 A1‡ 10/2006 Park ......................... G11C 7/12 365/20
2006/0221788 A1‡ 10/2006 Lindahl ................... G10L 21/04 369/47
2006/0224570 A1‡ 10/2006 Quiroga ................ G06F 40/247
2006/0229802 A1‡ 10/2006 Vertelney ........... G01C 21/3617 701/53
2006/0229870 A1‡ 10/2006 Kobal ..................... G10L 15/22 704/25
2006/0229876 A1‡ 10/2006 Aaron ..................... G10L 13/07 704/26
2006/0230350 A1‡ 10/2006 Baluja ................... G06F 16/951 715/70
2006/0230410 A1‡ 10/2006 Kurganov ........... H04M 3/4938 719/31
2006/0234680 A1‡ 10/2006 Doulton ............ H04M 1/72547 455/41
2006/0235550 A1‡ 10/2006 Csicsatka ............. G11B 27/034 700/94
2006/0235700 A1‡ 10/2006 Wong ...................... G10L 15/26 704/27
2006/0235841 A1‡ 10/2006 Betz ...................... G06F 16/951
2006/0236262 A1‡ 10/2006 Bathiche ................. G06F 3/016 715/78
2006/0239419 A1‡ 10/2006 Joseph .................. H04M 1/651 379/67
2006/0239471 A1‡ 10/2006 Mao ....................... H04R 1/406 381/92
2006/0240866 A1‡ 10/2006 Eilts ...................... G06F 1/3203 455/55
2006/0241948 A1‡ 10/2006 Abrash ................... G10L 25/87 704/27
2006/0242190 A1‡ 10/2006 Wnek ................... G06F 16/367
2006/0246955 A1‡ 11/2006 Nirhamo ............... G06F 3/0482 455/56
2006/0247931 A1‡ 11/2006 Caskey ................... G10L 15/22 704/27
2006/0252457 A1‡ 11/2006 Schrager ............. H04M 1/6066 455/55
2006/0253210 A1‡ 11/2006 Rosenberg ........... G11B 27/005 700/94
2006/0253787 A1‡ 11/2006 Fogg ..................... G06F 3/0481 715/75
2006/0256934 A1‡ 11/2006 Mazor ................. H04M 1/7255 379/88
2006/0258376 A1‡ 11/2006 Ewell, Jr. ................ H04M 1/66 455/45
2006/0262876 A1‡ 11/2006 LaDue ..................... H04B 7/00 375/29
2006/0265208 A1‡ 11/2006 Assadollahi .......... G06F 40/274 704/9
2006/0265503 A1‡ 11/2006 Jones ...................... H04L 67/06 709/22
2006/0265648 A1‡ 11/2006 Rainisto .............. G06F 3/04886 715/25
2006/0271627 A1‡ 11/2006 Szczepanek ............ H04L 67/02 709/20
2006/0274051 A1‡ 12/2006 Longe ................... G06F 3/0489 345/17
2006/0274905 A1‡ 12/2006 Lindahl .................... H04R 5/04 381/61
2006/0277031 A1‡ 12/2006 Ramsey ................ G06F 40/279 704/9
2006/0277058 A1‡ 12/2006 J'maev ................ G06Q 30/016 705/30
2006/0282264 A1‡ 12/2006 Denny ................ G10L 21/0208 704/23
2006/0282415 A1‡ 12/2006 Shibata ................... G06F 16/93
2006/0282455 A1‡ 12/2006 Lee ..................... G06F 16/9024
2006/0286527 A1‡ 12/2006 Morel ...................... G09B 5/00 434/30
2006/0287864 A1‡ 12/2006 Pusa ....................... G10L 15/26 704/27
2006/0288024 A1‡ 12/2006 Braica ..................... H04L 45/00
2006/0291666 A1‡ 12/2006 Ball ........................ G06F 3/165 381/58
2006/0293876 A1‡ 12/2006 Kamatani ............... G06F 40/30 704/2
2006/0293880 A1‡ 12/2006 Elshishiny ............ G06F 16/374 704/10
2006/0293886 A1‡ 12/2006 Odell ...................... G10L 15/08 704/23
2006/0293889 A1‡ 12/2006 Kiss ........................ G10L 15/22 704/23
2007/0003026 A1‡ 1/2007 Hodge .................. H04M 3/533 379/88

(56) References Cited

U.S. PATENT DOCUMENTS

2007/0004451 A1‡ 1/2007 C. Anderson ......... G06F 1/1626 455/55
2007/0005849 A1‡ 1/2007 Oliver .................. G06F 40/171 710/72
2007/0006098 A1‡ 1/2007 Krumm .................. H04W 4/18 715/82
2007/0011154 A1‡ 1/2007 Musgrove ........... G06F 16/3338
2007/0014280 A1‡ 1/2007 Cormier ........... H04M 1/72563 370/35
2007/0016563 A1‡ 1/2007 Omoigui ................ G06F 16/36
2007/0016865 A1‡ 1/2007 Johnson ............... G11B 27/031 715/71
2007/0021956 A1‡ 1/2007 Qu ....................... G06F 40/263 704/8
2007/0022380 A1‡ 1/2007 Swartz .................... G06F 9/451 715/73
2007/0025704 A1‡ 2/2007 Tsukazaki ............... G06F 16/68 386/23
2007/0026852 A1‡ 2/2007 Logan .............. H04M 1/72561 455/42
2007/0027732 A1‡ 2/2007 Hudgens ................ G06Q 10/06 705/7
2007/0028009 A1‡ 2/2007 Robbin ................. G06F 3/0607 710/16
2007/0030824 A1‡ 2/2007 Ribaudo ............... G01S 5/0018 370/32
2007/0032247 A1‡ 2/2007 Shaffer .................. H04L 67/18 455/45
2007/0033003 A1‡ 2/2007 Morris .................... G10L 15/04 704/9
2007/0033005 A1‡ 2/2007 Cristo ..................... G10L 15/22 704/9
2007/0033026 A1‡ 2/2007 Bartosik ................. G10L 15/26 704/23
2007/0033054 A1‡ 2/2007 Snitkovskiy ............ G06F 3/167 704/27
2007/0036117 A1‡ 2/2007 Taube ..................... H04L 67/18 370/33
2007/0036286 A1‡ 2/2007 Champlin ............ H04L 51/066 379/67
2007/0036294 A1‡ 2/2007 Chaudhuri ........ H04M 3/42153 379/88
2007/0038436 A1‡ 2/2007 Cristo .................. G06F 40/232 704/9
2007/0038609 A1‡ 2/2007 Wu ...................... G06F 16/334
2007/0040813 A1‡ 2/2007 Kushler ................ G06F 3/0237 345/17
2007/0041361 A1‡ 2/2007 Iso-Sipila ............ H04M 1/271 370/35
2007/0042812 A1‡ 2/2007 Basir .................. H04M 1/6091 455/56
2007/0043568 A1‡ 2/2007 Dhanakshirur ... H04M 3/42144 704/25
2007/0043687 A1‡ 2/2007 Bodart ................. G06Q 10/107
2007/0043820 A1‡ 2/2007 George ................... H04L 15/04 709/20
2007/0044038 A1‡ 2/2007 Horentrup ............ G06F 3/0482 715/84
2007/0046641 A1‡ 3/2007 Lim ..................... G06F 3/0237 345/17
2007/0047719 A1‡ 3/2007 Dhawan .................. G06F 3/167 379/23
2007/0050184 A1‡ 3/2007 Drucker ................ G06F 16/635 704/3
2007/0050191 A1‡ 3/2007 Weider .................... G10L 15/22 704/27
2007/0050393 A1‡ 3/2007 Vogel .................... G06F 16/367
2007/0050712 A1‡ 3/2007 Hull ...................... G06F 40/169 715/23
2007/0052586 A1‡ 3/2007 Horstemeyer ... G06Q 10/06311 342/45
2007/0055493 A1‡ 3/2007 Lee ....................... G06F 40/247 704/9
2007/0055508 A1‡ 3/2007 Zhao ..................... H04R 25/55 704/22
2007/0055514 A1‡ 3/2007 Beattie .................... G10L 15/08 704/23
2007/0055525 A1‡ 3/2007 Kennewick ........... G10L 15/183 704/25
2007/0055529 A1‡ 3/2007 Kanevsky ........... G10L 15/1815 704/27
2007/0058832 A1‡ 3/2007 Hug ........................ G06F 21/10 381/38
2007/0060107 A1‡ 3/2007 Day .................. H04M 1/72566 455/41
2007/0060118 A1‡ 3/2007 Guyette ........... H04M 1/72533 455/42
2007/0061487 A1‡ 3/2007 Moore .................... G06F 16/27 709/24
2007/0061712 A1‡ 3/2007 Bodin ................... G06F 16/258 715/23
2007/0061754 A1‡ 3/2007 Ardhanari ........... G06F 3/04895 715/81
2007/0067173 A1‡ 3/2007 Bellegarda ............ G10L 15/063 704/26
2007/0067272 A1‡ 3/2007 Flynt ..................... G06F 3/0482
2007/0073540 A1‡ 3/2007 Hirakawa .............. G10L 15/22 704/25
2007/0073541 A1‡ 3/2007 Tian ........................ G10L 15/12 704/25
2007/0073745 A1‡ 3/2007 Scott ..................... G06F 16/374
2007/0074131 A1‡ 3/2007 Assadollahi .......... G06F 40/274 715/81
2007/0075965 A1‡ 4/2007 Huppi ............... H04M 1/72563 345/15
2007/0079027 A1‡ 4/2007 Marriott ........... H04M 1/72522 710/62
2007/0080936 A1‡ 4/2007 Tsuk ..................... G06F 1/1626 345/15
2007/0083467 A1‡ 4/2007 Lindahl ........... H04N 21/85406 705/50
2007/0083623 A1‡ 4/2007 Nishimura ........ H04M 1/72552 709/22
2007/0088556 A1‡ 4/2007 Andrew .................. G10L 15/19 704/27
2007/0089132 A1‡ 4/2007 Qureshey ............... H04H 20/82 725/39
2007/0089135 A1‡ 4/2007 Qureshey ................ G06F 16/68 725/45
2007/0093277 A1‡ 4/2007 Cavacuiti .......... H04M 1/72527 455/56
2007/0094026 A1‡ 4/2007 Ativanichayaphong ..................... G10L 15/193 704/25
2007/0098195 A1‡ 5/2007 Holmes ................ H04R 25/558 381/31
2007/0100206 A1‡ 5/2007 Lin ........................ A61B 1/125 600/15
2007/0100602 A1‡ 5/2007 Kim ...................... G06F 40/242 704/8
2007/0100619 A1‡ 5/2007 Purho ................... G06F 3/0237 704/23
2007/0100624 A1‡ 5/2007 Weng .................... G06F 40/216 704/25
2007/0100635 A1‡ 5/2007 Mahajan ................. G10L 15/22 704/27
2007/0100709 A1‡ 5/2007 Lee .................... G06Q 30/0256 705/26
2007/0100790 A1‡ 5/2007 Cheyer .................. G09B 23/28
2007/0100814 A1‡ 5/2007 Lee ....................... G06F 40/295
2007/0100883 A1‡ 5/2007 Rose ..................... G06F 16/904
2007/0106491 A1‡ 5/2007 Carter ................. G06F 16/3344 704/4
2007/0106497 A1‡ 5/2007 Ramsey ................ G06F 40/295 704/9
2007/0106512 A1‡ 5/2007 Acero ................... G06F 16/685 704/26

(56) References Cited

U.S. PATENT DOCUMENTS

2007/0106513 A1‡ 5/2007 Boillot .................... G10L 13/06 704/26
2007/0106657 A1‡ 5/2007 Brzeski .................... G06F 16/36
2007/0106674 A1‡ 5/2007 Agrawal ................ G06Q 30/02
2007/0106685 A1‡ 5/2007 Houh .................... G06F 16/728
2007/0112562 A1‡ 5/2007 Vainio .................. G11B 27/105 704/20
2007/0116195 A1‡ 5/2007 Thompson .............. G04L 51/36 379/67
2007/0118351 A1‡ 5/2007 Sumita .................... G06F 40/45 704/2
2007/0118377 A1‡ 5/2007 Badino .................. G10L 13/08 704/26
2007/0118378 A1‡ 5/2007 Skuratovsky ......... G10L 13/033 704/26
2007/0121846 A1‡ 5/2007 Altberg ................. H04M 15/00 379/11
2007/0124131 A1‡ 5/2007 Chino ..................... G06F 40/58 704/3
2007/0124132 A1‡ 5/2007 Takeuchi .............. G06F 40/263 704/9
2007/0124149 A1‡ 5/2007 Shen ...................... G10L 15/26 704/27
2007/0124291 A1‡ 5/2007 Hassan ................... G06F 16/34
2007/0124676 A1‡ 5/2007 Amundsen .............. G06F 9/451 715/70
2007/0127888 A1‡ 6/2007 Hayashi ............... G11B 27/322 386/23
2007/0128777 A1‡ 6/2007 Yin ........................ H01L 27/12 438/15
2007/0129059 A1‡ 6/2007 Nadarajah ......... H04M 3/53333 455/41
2007/0130014 A1‡ 6/2007 Altberg ............. G06Q 30/0273 705/14
2007/0130128 A1‡ 6/2007 Garg ................. G06F 16/24578
2007/0132738 A1‡ 6/2007 Lowles .................. G06F 3/043 345/17
2007/0133771 A1‡ 6/2007 Stifelman ............... H04M 3/48 379/14
2007/0135187 A1‡ 6/2007 Kreiner ................. H04M 1/271 455/57
2007/0135949 A1‡ 6/2007 Snover .................... G06F 9/544 700/86
2007/0136064 A1‡ 6/2007 Carroll .................. G06F 3/0233 704/25
2007/0136778 A1‡ 6/2007 Birger ............. H04N 21/43637 725/11
2007/0143163 A1‡ 6/2007 Weiss ..................... G06Q 10/06 705/7
2007/0149252 A1‡ 6/2007 Jobs ...................... H04M 15/00 455/56
2007/0150289 A1 6/2007 Sakuramoto et al.
2007/0150403 A1‡ 6/2007 Mock ..................... G06Q 40/04 705/37
2007/0150444 A1‡ 6/2007 Chesnais ................. H04L 67/18
2007/0150842 A1‡ 6/2007 Chaudhri .............. G06F 3/0488 715/86
2007/0152978 A1‡ 7/2007 Kocienda ............ G06F 3/04883 345/17
2007/0152980 A1‡ 7/2007 Kocienda .............. G06F 3/0236 345/17
2007/0155346 A1‡ 7/2007 Mijatovic ............... H04W 4/18 455/90
2007/0156410 A1‡ 7/2007 Stohr ...................... G06F 16/64 704/27
2007/0156627 A1‡ 7/2007 D'Alicandro ....... G06F 16/9562
2007/0157089 A1‡ 7/2007 Van Os ............... G06F 3/04817 715/70
2007/0157268 A1‡ 7/2007 Girish .................. G11B 27/005 725/90
2007/0162274 A1‡ 7/2007 Ruiz ................... G06F 16/2428 704/9
2007/0162296 A1‡ 7/2007 Altberg ................. H04M 15/00 705/1
2007/0162414 A1‡ 7/2007 Horowitz .............. G06F 16/355
2007/0165003 A1‡ 7/2007 Fux ....................... G06F 40/232 345/17
2007/0167136 A1‡ 7/2007 Groth ................... G06Q 10/109 455/41
2007/0168922 A1‡ 7/2007 Kaiser ..................... G06F 40/56 717/10
2007/0173233 A1‡ 7/2007 Vander Veen ...... H04M 1/7255 455/41
2007/0173267 A1‡ 7/2007 Klassen .................. H04L 51/16 455/46
2007/0174057 A1‡ 7/2007 Genly .................. H04N 5/4403 704/27
2007/0174188 A1‡ 7/2007 Fish ....................... G06Q 20/10 705/39
2007/0174350 A1‡ 7/2007 Pell ......................... G06F 9/451
2007/0174396 A1‡ 7/2007 Kumar ................. G06Q 10/107 709/20
2007/0179776 A1‡ 8/2007 Segond ................. G06F 16/332 704/9
2007/0179778 A1‡ 8/2007 Gong .................. H04M 3/4931 704/9
2007/0180383 A1‡ 8/2007 Naik ...................... G11B 27/10 715/72
2007/0182595 A1‡ 8/2007 Ghasabian ............ G06F 1/1615 341/22
2007/0185551 A1‡ 8/2007 Meadows .......... A61N 1/36071 607/61
2007/0185754 A1‡ 8/2007 Schmidt ................. G06Q 10/06 705/7
2007/0185831 A1‡ 8/2007 Churcher ................ G06F 16/93
2007/0185917 A1‡ 8/2007 Prahlad ................. G06F 16/907
2007/0188901 A1‡ 8/2007 Heckerman ............ G09B 19/00 360/23
2007/0192026 A1‡ 8/2007 Lee ......................... G06F 3/038 701/43
2007/0192027 A1‡ 8/2007 Lee ......................... G06F 3/038 701/43
2007/0192105 A1‡ 8/2007 Neeracher ............... G10L 13/08 704/25
2007/0192179 A1‡ 8/2007 Van Luchene ......... G06Q 30/02 705/14
2007/0192293 A1‡ 8/2007 Swen .................... G06F 16/338
2007/0192403 A1‡ 8/2007 Heine ..................... H04W 4/12 709/20
2007/0192744 A1‡ 8/2007 Reponen ............... G06F 3/0236 715/83
2007/0198267 A1‡ 8/2007 Jones .................... G06F 16/332 704/25
2007/0198269 A1‡ 8/2007 Braho ..................... G10L 15/01 704/27
2007/0198273 A1‡ 8/2007 Hennecke ............... G10L 15/26 704/27
2007/0198566 A1‡ 8/2007 Sustik ..................... G06F 30/30
2007/0203955 A1‡ 8/2007 Pomerantz ........... G11B 27/102
2007/0207785 A1‡ 9/2007 Chatterjee ......... H04M 3/53333 455/41
2007/0208555 A1‡ 9/2007 Blass ................................ 704/9
2007/0208569 A1‡ 9/2007 Subramanian ...... G10L 19/0018 704/27
2007/0208579 A1‡ 9/2007 Peterson ................ G06Q 10/10 379/71
2007/0208726 A1‡ 9/2007 Krishnaprasad .... G06F 16/3334
2007/0211071 A1‡ 9/2007 Slotznick .............. G06F 16/957 345/59
2007/0213099 A1‡ 9/2007 Bast ...................... G06F 3/0338 455/56
2007/0213857 A1‡ 9/2007 Bodin ..................... G06F 16/40 700/94
2007/0213984 A1‡ 9/2007 Ativanichayaphong .................... G06F 3/167 704/25

(56) References Cited

U.S. PATENT DOCUMENTS

| | | | | |
|---|---|---|---|---|
| 2007/0217693 | A1 ‡ | 9/2007 | Kretzschmar, Jr. | G06F 16/3344 382/22 |
| 2007/0219645 | A1 ‡ | 9/2007 | Thomas | G05B 15/02 700/29 |
| 2007/0219777 | A1 ‡ | 9/2007 | Chu | G06F 40/263 704/9 |
| 2007/0219801 | A1 ‡ | 9/2007 | Sundaram | G10L 17/04 704/27 |
| 2007/0219803 | A1 ‡ | 9/2007 | Chiu | G10L 15/22 704/27 |
| 2007/0219983 | A1 ‡ | 9/2007 | Fish | G06F 16/3325 |
| 2007/0225980 | A1 ‡ | 9/2007 | Sumita | G10L 15/1815 704/24 |
| 2007/0225984 | A1 ‡ | 9/2007 | Milstein | G10L 25/48 704/27 |
| 2007/0226652 | A1 ‡ | 9/2007 | Kikuchi | G06F 3/048 715/83 |
| 2007/0229323 | A1 ‡ | 10/2007 | Plachta | H03M 7/3088 341/51 |
| 2007/0230729 | A1 ‡ | 10/2007 | Naylor | H04R 25/407 381/32 |
| 2007/0233484 | A1 ‡ | 10/2007 | Coelho | G10L 17/02 704/25 |
| 2007/0233487 | A1 ‡ | 10/2007 | Cohen | G10L 15/065 705/25 |
| 2007/0233490 | A1 ‡ | 10/2007 | Yao | G10L 13/08 704/26 |
| 2007/0233497 | A1 ‡ | 10/2007 | Paek | G10L 15/22 704/27 |
| 2007/0233692 | A1 ‡ | 10/2007 | Lisa | G06F 3/0488 |
| 2007/0233725 | A1 ‡ | 10/2007 | Michmerhuizen | G10L 13/08 |
| 2007/0238488 | A1 ‡ | 10/2007 | Scott | G06F 3/0482 455/56 |
| 2007/0238489 | A1 ‡ | 10/2007 | Scott | 455/56 |
| 2007/0238520 | A1 ‡ | 10/2007 | Kacmarcik | A63F 13/10 |
| 2007/0239429 | A1 ‡ | 10/2007 | Johnson et al. | |
| 2007/0239453 | A1 | 10/2007 | Paek et al. | |
| 2007/0240043 | A1 ‡ | 10/2007 | Fux et al. | 715/25 |
| 2007/0240044 | A1 ‡ | 10/2007 | Fux et al. | |
| 2007/0240045 | A1 ‡ | 10/2007 | Fux | G06F 40/232 715/25 |
| 2007/0241885 | A1 ‡ | 10/2007 | Clipsham | G08B 21/24 340/53 |
| 2007/0244702 | A1 ‡ | 10/2007 | Kahn | G10L 15/22 704/26 |
| 2007/0244976 | A1 ‡ | 10/2007 | Carroll et al. | G06Q 10/107 709/20 |
| 2007/0247441 | A1 ‡ | 10/2007 | Kim | G06F 3/04883 345/17 |
| 2007/0255435 | A1 ‡ | 11/2007 | Cohen | H04R 1/1016 700/94 |
| 2007/0255979 | A1 ‡ | 11/2007 | Deily | G06F 11/3476 714/45 |
| 2007/0257890 | A1 ‡ | 11/2007 | Hotelling | G06F 3/0418 345/17 |
| 2007/0258642 | A1 ‡ | 11/2007 | Thota | G06F 16/29 382/17 |
| 2007/0260460 | A1 ‡ | 11/2007 | Hyatt | H04M 1/72547 704/26 |
| 2007/0260595 | A1 ‡ | 11/2007 | Beatty | G06F 16/322 |
| 2007/0260822 | A1 ‡ | 11/2007 | Adams | H04M 1/7253 711/14 |
| 2007/0261080 | A1 ‡ | 11/2007 | Saetti | G09B 5/065 725/61 |
| 2007/0265831 | A1 ‡ | 11/2007 | Dinur | G06F 40/232 704/10 |
| 2007/0265850 | A1 ‡ | 11/2007 | Kennewick | G10L 15/22 704/25 |
| 2007/0271104 | A1 ‡ | 11/2007 | McKay | G10L 13/047 704/27 |
| 2007/0271510 | A1 ‡ | 11/2007 | Grigoriu | G06F 40/14 715/25 |
| 2007/0274468 | A1 ‡ | 11/2007 | Cai | H04M 3/53333 379/67 |
| 2007/0276651 | A1 ‡ | 11/2007 | Bliss | G10L 15/30 704/9 |
| 2007/0276714 | A1 ‡ | 11/2007 | Beringer | G06Q 10/0631 705/7 |
| 2007/0276810 | A1 ‡ | 11/2007 | Rosen | G06F 16/38 |
| 2007/0277088 | A1 ‡ | 11/2007 | Bodin | G06F 16/957 715/20 |
| 2007/0282595 | A1 ‡ | 12/2007 | Tunning | G06F 40/284 704/9 |
| 2007/0285958 | A1 ‡ | 12/2007 | Platchta | H03M 7/3088 365/68 |
| 2007/0286363 | A1 ‡ | 12/2007 | Burg | G06Q 30/0225 379/88 |
| 2007/0286399 | A1 ‡ | 12/2007 | Ramamoorthy | H04M 1/7255 379/35 |
| 2007/0288238 | A1 ‡ | 12/2007 | Hetherington | G10L 25/87 704/24 |
| 2007/0288241 | A1 ‡ | 12/2007 | Cross | G10L 15/06 704/27 |
| 2007/0288449 | A1 ‡ | 12/2007 | Datta | G06F 40/247 |
| 2007/0291108 | A1 ‡ | 12/2007 | Huber | H04N 7/15 348/14 |
| 2007/0294077 | A1 ‡ | 12/2007 | Narayanan | G06F 40/284 704/2 |
| 2007/0294083 | A1 ‡ | 12/2007 | Bellegarda | G10L 17/04 704/25 |
| 2007/0294199 | A1 ‡ | 12/2007 | Nelken | G06F 40/30 706/50 |
| 2007/0294263 | A1 ‡ | 12/2007 | Punj | H04M 3/493 |
| 2007/0299664 | A1 ‡ | 12/2007 | Peters | G06F 40/16 704/23 |
| 2007/0299831 | A1 ‡ | 12/2007 | Williams | G06F 16/3329 |
| 2007/0300140 | A1 ‡ | 12/2007 | Makela | H04M 1/67 714/79 |
| 2008/0001785 | A1 ‡ | 1/2008 | Elizarov | G06F 3/0236 341/22 |
| 2008/0010355 | A1 ‡ | 1/2008 | Vieri | H04M 3/5322 709/20 |
| 2008/0010605 | A1 ‡ | 1/2008 | Frank | G06F 16/38 715/76 |
| 2008/0012950 | A1 ‡ | 1/2008 | Lee | H04N 5/23248 348/20 |
| 2008/0013751 | A1 ‡ | 1/2008 | Hiselius | H03G 9/005 381/10 |
| 2008/0015863 | A1 ‡ | 1/2008 | Agapi | G10L 15/22 704/27 |
| 2008/0015864 | A1 ‡ | 1/2008 | Ross | G10L 15/1822 704/27 |
| 2008/0016575 | A1 ‡ | 1/2008 | Vincent | H04L 51/14 726/26 |
| 2008/0021708 | A1 ‡ | 1/2008 | Bennett | G10L 15/005 704/25 |
| 2008/0021886 | A1 ‡ | 1/2008 | Wang-Aryattanwanich | G06F 16/9558 |
| 2008/0022208 | A1 ‡ | 1/2008 | Morse | G11B 27/105 715/72 |
| 2008/0027726 | A1 ‡ | 1/2008 | Hansen | G10L 13/00 704/26 |
| 2008/0031475 | A1 ‡ | 2/2008 | Goldstein | G06F 16/60 381/15 |
| 2008/0033719 | A1 ‡ | 2/2008 | Hall | H04L 29/06027 704/23 |
| 2008/0034032 | A1 ‡ | 2/2008 | Healey | G06F 8/00 709/20 |
| 2008/0034044 | A1 ‡ | 2/2008 | Bhakta | G06Q 10/00 709/20 |
| 2008/0036743 | A1 ‡ | 2/2008 | Westerman | G06F 3/038 345/17 |
| 2008/0040339 | A1 ‡ | 2/2008 | Zhou | G06F 16/3334 |
| 2008/0042970 | A1 ‡ | 2/2008 | Liang | G06F 3/16 345/15 |

(56) References Cited

U.S. PATENT DOCUMENTS

2008/0043936 A1‡ 2/2008 Liebermann ........... G06Q 20/06 379/52
2008/0043943 A1‡ 2/2008 Sipher .................. G06Q 10/107 379/88
2008/0046239 A1‡ 2/2008 Boo ........................ G10L 13/00 704/23
2008/0046250 A1‡ 2/2008 Agapi ................... G10L 15/075 704/27
2008/0046422 A1‡ 2/2008 Lee ..................... G06F 16/2471
2008/0046820 A1‡ 2/2008 Lee ....................... G06F 3/0238 715/71
2008/0046948 A1‡ 2/2008 Verosub .............. G06F 16/9535 725/11
2008/0048908 A1‡ 2/2008 Sato .................... B60R 16/0373 342/20
2008/0052063 A1‡ 2/2008 Bennett ............. G06F 16/24522 704/8
2008/0052073 A1‡ 2/2008 Goto ....................... G10L 15/06 704/25
2008/0052077 A1‡ 2/2008 Bennett ................... G10L 15/18 704/25
2008/0052080 A1‡ 2/2008 Narayanan ......... G06K 9/00308 704/27
2008/0052262 A1‡ 2/2008 Kosinov ............. G06F 16/9032
2008/0055194 A1‡ 3/2008 Baudino ................. G06F 3/011 345/8
2008/0056459 A1‡ 3/2008 Vallier ............. H04L 29/06027 379/88
2008/0056579 A1‡ 3/2008 Guha ..................... G06K 9/222 382/18
2008/0059190 A1‡ 3/2008 Chu ........................ G10L 13/06 704/25
2008/0059200 A1‡ 3/2008 Puli ........................ G10L 13/00 704/27
2008/0059876 A1‡ 3/2008 Hantler ................. G06F 40/242 715/25
2008/0062141 A1‡ 3/2008 Chandhri .............. G06F 3/0482 345/17
2008/0065382 A1‡ 3/2008 Gerl ..................... G10H 1/0008 704/25
2008/0065387 A1‡ 3/2008 Cross, Jr. .............. G10L 17/005 704/27
2008/0071529 A1‡ 3/2008 Silverman ............... G10L 13/02 704/22
2008/0071544 A1‡ 3/2008 Beaufays ............ H04M 3/4935 704/27
2008/0075296 A1‡ 3/2008 Lindahl .................... H04R 5/04 381/80
2008/0076972 A1‡ 3/2008 Dorogusker ....... A61B 5/02055 600/30
2008/0077310 A1‡ 3/2008 Murlidar .............. G08G 1/0962 701/11
2008/0077384 A1‡ 3/2008 Agapi ..................... G06F 9/454 704/2
2008/0077386 A1‡ 3/2008 Gao ........................ G06F 40/40 704/3
2008/0077391 A1‡ 3/2008 Chino ..................... G10L 13/00 704/7
2008/0077393 A1‡ 3/2008 Gao ...................... G06F 40/263 704/8
2008/0077406 A1‡ 3/2008 Ganong, III ............ G10L 15/22 704/25
2008/0077859 A1‡ 3/2008 Schabes ................ G06F 40/232 715/25
2008/0079566 A1‡ 4/2008 Singh .................... G01S 5/0252 340/53
2008/0080411 A1‡ 4/2008 Cole ..................... H04W 48/16 370/32
2008/0082332 A1‡ 4/2008 Mallett ................... G10L 15/07 704/25
2008/0082338 A1‡ 4/2008 O'Neil ................... A61B 5/145 704/27
2008/0082390 A1‡ 4/2008 Hawkins ................ G06Q 10/06 705/7
2008/0082576 A1‡ 4/2008 Bodin .................. G11B 27/105
2008/0082651 A1‡ 4/2008 Singh .................. G06Q 10/109 709/22
2008/0084974 A1‡ 4/2008 Dhanakshirur ..... H04M 3/4936 379/88
2008/0091406 A1‡ 4/2008 Baldwin ................. G10L 15/18 704/4
2008/0091426 A1‡ 4/2008 Rempel ................... G10L 15/26 704/25
2008/0091443 A1‡ 4/2008 Strope .................. G06Q 10/103 705/30
2008/0096531 A1‡ 4/2008 McQuaide .............. H04L 67/26 455/41
2008/0096726 A1‡ 4/2008 Riley ................. A63B 24/0075 482/8
2008/0097937 A1‡ 4/2008 Hadjarian .............. G06N 20/00 706/12
2008/0098302 A1‡ 4/2008 Roose ................... G06F 20/242 715/25
2008/0098480 A1‡ 4/2008 Henry ................. G06F 21/6218 726/26
2008/0057922 A1‡ 5/2008 Kokes ..................... G06F 16/68 455/41
2008/0100579 A1‡ 5/2008 Robinson .............. G06F 3/0233 345/16
2008/0101584 A1‡ 5/2008 Gray ..................... H04M 3/436 379/22
2008/0103774 A1‡ 5/2008 White ..................... G10L 15/08 704/25
2008/0109222 A1‡ 5/2008 Liu ........................ G06Q 30/02 704/24
2008/0109402 A1‡ 5/2008 Wang ...................... G06F 40/14
2008/0114480 A1‡ 5/2008 Harb ...................... G06Q 30/06 700/94
2008/0114598 A1‡ 5/2008 Prieto ................... G10L 15/005 704/25
2008/0114604 A1‡ 5/2008 Wei ......................... G06F 3/038 704/27
2008/0114841 A1‡ 5/2008 Lambert ................ G06Q 10/00 709/20
2008/0115084 A1‡ 5/2008 Scott ......................... G06F 3/02 715/81
2008/0118143 A1‡ 5/2008 Gordon ............. G01B 11/2513 382/15
2008/0119953 A1‡ 5/2008 Reed ....................... G06F 16/68 700/94
2008/0120102 A1‡ 5/2008 Rao ......................... G10L 15/22 704/23
2008/0120112 A1‡ 5/2008 Jordan ...................... G06F 3/16 704/27
2008/0120196 A1‡ 5/2008 Reed .................... G06Q 20/204 705/17
2008/0120311 A1‡ 5/2008 Reed ....................... G06F 16/40
2008/0120312 A1‡ 5/2008 Reed ....................... G06F 16/40
2008/0120330 A1‡ 5/2008 Reed ....................... G06F 16/40
2008/0120342 A1‡ 5/2008 Reed ....................... G06F 16/40
2008/0122796 A1‡ 5/2008 Jobs ...................... G06F 3/0488 345/17
2008/0124695 A1‡ 5/2008 Myers .................... G09B 5/062 434/31
2008/0126075 A1‡ 5/2008 Thorn ................... G06F 3/0237 704/3
2008/0126077 A1‡ 5/2008 Thorn ............... H04M 1/72552 704/8
2008/0126091 A1‡ 5/2008 Clark ...................... G10L 15/22 704/24
2008/0126093 A1‡ 5/2008 Sivadas ................... G10L 13/08 704/25
2008/0126100 A1‡ 5/2008 Grost ...................... G10L 15/08 704/27
2008/0126491 A1‡ 5/2008 Portele .................. G06F 16/258 709/20
2008/0129520 A1‡ 6/2008 Lee ....................... H01M 10/48 340/63

(56) References Cited

U.S. PATENT DOCUMENTS

2008/0130867 A1‡ 6/2008 Bowen .................... H04M 1/03 379/44
2008/0131006 A1‡ 6/2008 Oliver ................ G06K 9/00463 382/22
2008/0132221 A1‡ 6/2008 Willey ................. G06Q 10/109 455/42
2008/0133215 A1‡ 6/2008 Sarukkai ............. H04M 3/4938 704/2
2008/0133228 A1‡ 6/2008 Rao ........................ G10L 15/24 704/23
2008/0133230 A1‡ 6/2008 Herforth ................ G01C 21/26 704/23
2008/0133241 A1‡ 6/2008 Baker ................. G10L 19/0018 704/26
2008/0133956 A1‡ 6/2008 Fadell .................. G06F 1/3203 713/34
2008/0140413 A1‡ 6/2008 Millman .................. G09B 7/02 704/27
2008/0140416 A1‡ 6/2008 Shostak .............. H04M 1/6041 704/27
2008/0140652 A1‡ 6/2008 Millman ................ G09B 17/00
2008/0140657 A1‡ 6/2008 Azvine ................. G06F 16/338
2008/0140702 A1‡ 6/2008 Reed ....................... G06F 16/40
2008/0141125 A1‡ 6/2008 Ghassabian ........... G06F 40/274 715/26
2008/0141180 A1‡ 6/2008 Reed ...................... G06F 16/40 715/85
2008/0141182 A1‡ 6/2008 Barsness ................. G06F 16/34 715/86
2008/0146245 A1‡ 6/2008 Appaji .............. H04M 1/72572 455/45
2008/0146290 A1‡ 6/2008 Sreeram .............. H04M 1/6066 455/56
2008/0147408 A1‡ 6/2008 Da Palma ............... G10L 15/22 704/27
2008/0147411 A1‡ 6/2008 Dames .................... G10L 15/20 704/27
2008/0147874 A1‡ 6/2008 Yoneda ................... H04L 29/06 709/23
2008/0150900 A1‡ 6/2008 Han .................... G06F 3/04886 345/17
2008/0154577 A1‡ 6/2008 Kim ........................ G06F 40/45 704/2
2008/0154600 A1‡ 6/2008 Tian ...................... G10L 15/083 704/25
2008/0154612 A1‡ 6/2008 Evermann et al.
2008/0154828 A1‡ 6/2008 Antebi et al. .................. 706/46
2008/0157867 A1‡ 7/2008 Krah
2008/0161113 A1‡ 7/2008 Hansen et al. .......... A63F 13/23 463/42
2008/0162120 A1‡ 7/2008 MacTavish et al. .... G10L 21/06
2008/0163119 A1‡ 7/2008 Kim et al.
2008/0163131 A1‡ 7/2008 Hirai et al. .................... 715/86
2008/0165144 A1‡ 7/2008 Forstall et al. ................ 345/17
2008/0165980 A1‡ 7/2008 Pavlovic et al. ....... H03G 9/005
2008/0165994 A1‡ 7/2008 Caren et al.
2008/0167013 A1‡ 7/2008 Novick ............... H04M 1/7255 455/41
2008/0167858 A1‡ 7/2008 Christie ................ G06F 3/0237 704/10
2008/0168366 A1‡ 7/2008 Kocienda .............. G06F 3/0237 715/76
2008/0183473 A1‡ 7/2008 Nagano ................... G10L 13/07 704/25
2008/0186960 A1‡ 8/2008 Kocheisen .............. G06F 3/165 370/35
2008/0189099 A1‡ 8/2008 Friedman .............. G06F 16/637 704/8
2008/0189106 A1‡ 8/2008 Low .................. G01C 21/3608 704/23
2008/0189110 A1‡ 8/2008 Freeman ............ G06Q 30/0242 704/25
2008/0189114 A1‡ 8/2008 Fail ..................... G09B 21/006 704/27
2008/0189606 A1‡ 8/2008 Rybak .................. G06F 40/274 715/26
2008/0195312 A1‡ 8/2008 Aaron ................. G06Q 10/109 455/41
2008/0195388 A1‡ 8/2008 Bower ................. G06F 3/0237 704/24
2008/0195391 A1‡ 8/2008 Marple ................... G10L 13/06 704/26
2008/0195601 A1‡ 8/2008 Ntoulas ................ G06F 16/313
2008/0195630 A1‡ 8/2008 Exartier .................. H04L 67/16
2008/0195940 A1‡ 8/2008 Gail ..................... G06F 40/242 715/25
2008/0200142 A1‡ 8/2008 Abdel-Kader .... H04M 1/72536 455/40
2008/0201306 A1‡ 8/2008 Cooper ................ H04M 3/527
2008/0201375 A1‡ 8/2008 Khedouri ............ G06Q 20/206
2008/0204379 A1‡ 8/2008 Perez-Noguera ..... G06F 1/1605 345/80
2008/0207176 A1‡ 8/2008 Brackbill ............ H04M 1/7255 455/41
2008/0208585 A1‡ 8/2008 Ativanichayaphong .................... G10L 15/1815 704/27
2008/0208587 A1‡ 8/2008 Ben-David ............. G10L 15/26 704/27
2008/0208864 A1‡ 8/2008 Cucerzan ............. G06F 40/295
2008/0212796 A1‡ 9/2008 Denda ...................... G09B 5/04 381/97
2008/0219641 A1‡ 9/2008 Sandrew ........... H04N 21/4307 386/20
2008/0221866 A1‡ 9/2008 Katragadda ............ G06F 40/44 704/8
2008/0221879 A1‡ 9/2008 Cerra ..................... G10L 15/30 704/23
2008/0221880 A1‡ 9/2008 Cerra ................... G10L 15/065 704/23
2008/0221887 A1‡ 9/2008 Rose ...................... G10L 15/20 704/24
2008/0221889 A1‡ 9/2008 Cerra ................. H04M 3/4938 704/25
2008/0221903 A1‡ 9/2008 Kanevsky ........... G10L 15/1822 704/27
2008/0222118 A1‡ 9/2008 Scian ................. H04M 1/2757
2008/0226130 A1‡ 9/2008 Kansal ................. G06F 16/583 382/10
2008/0228463 A1‡ 9/2008 Mori .................... G06F 40/216 704/2
2008/0228485 A1‡ 9/2008 Owen ................ G06F 16/3343 704/25
2008/0228490 A1‡ 9/2008 Fischer ................ G06F 16/748 704/27
2008/0228495 A1‡ 9/2008 Cross, Jr. ............ H04M 3/4938 704/27
2008/0228496 A1‡ 9/2008 Yu .......................... G06F 3/038 704/27
2008/0228928 A1‡ 9/2008 Donelli ................. H04L 65/601 709/22
2008/0229185 A1‡ 9/2008 Lynch ................... G06F 40/169 715/23
2008/0229218 A1‡ 9/2008 Maeng .................... G06F 3/048 715/76
2008/0235017 A1‡ 9/2008 Satomura ................ G10L 15/22 704/24
2008/0235024 A1‡ 9/2008 Goldberg .............. G10L 13/033 704/26
2008/0235027 A1‡ 9/2008 Cross ...................... G10L 15/22 704/27
2008/0240569 A1‡ 10/2008 Tonouchi ........... G06K 9/00402 382/18
2008/0242280 A1‡ 10/2008 Shapiro ............ H04N 21/25891 455/41
2008/0244390 A1‡ 10/2008 Fux ....................... G06F 40/232 715/25

(56) References Cited

U.S. PATENT DOCUMENTS

2008/0244446 A1‡ 10/2008 LeFevre ................ G06F 3/0236 715/81
2008/0247519 A1‡ 10/2008 Abella .................... G10L 15/22 379/88
2008/0247529 A1‡ 10/2008 Barton .................. H04M 3/436 379/21
2008/0248797 A1‡ 10/2008 Freeman ........... H04M 1/72533 455/42
2008/0249770 A1‡ 10/2008 Kim ........................ G10L 15/08 704/23
2008/0249778 A1‡ 10/2008 Barton .................... H04L 51/04 704/27
2008/0253577 A1‡ 10/2008 Eppolito ................... H04S 7/40 381/17
2008/0254425 A1‡ 10/2008 Cohen ...................... G09B 7/00 434/30
2008/0255837 A1‡ 10/2008 Kahn ...................... G10L 25/48 704/23
2008/0255842 A1‡ 10/2008 Simhi ..................... G10L 25/78 704/24
2008/0255845 A1‡ 10/2008 Bennett .................... G09B 5/04 704/25
2008/0255852 A1‡ 10/2008 Hu .......................... G10L 15/18 704/27
2008/0256613 A1‡ 10/2008 Grover .................... G06F 21/32 726/5
2008/0259022 A1‡ 10/2008 Mansfield ............. G06F 40/274 345/15
2008/0262828 A1‡ 10/2008 Och ........................ G06F 40/44 704/3
2008/0262838 A1‡ 10/2008 Nurminen ............. G10L 13/033 704/22
2008/0262846 A1‡ 10/2008 Burns ..................... H04L 51/38 704/26
2008/0263139 A1‡ 10/2008 Martin .................... H04L 67/04 709/20
2008/0270118 A1‡ 10/2008 Kuo ...................... G06F 40/129 704/9
2008/0270138 A1‡ 10/2008 Knight .................... G10L 15/26 704/26
2008/0270139 A1‡ 10/2008 Shi .......................... G10L 13/10 704/26
2008/0270140 A1‡ 10/2008 Hertz .................... G10L 13/033 704/26
2008/0270151 A1‡ 10/2008 Mahoney ............... G06Q 30/02 705/1
2008/0277473 A1‡ 11/2008 Kotlarsky .......... G06K 7/10722 235/46
2008/0281510 A1‡ 11/2008 Shahine ................. G06Q 10/06 701/40
2008/0288259 A1‡ 11/2008 Chambers ............... G10L 15/22 704/27
2008/0288460 A1‡ 11/2008 Poniatowski ...... H04N 21/4135
2008/0292112 A1‡ 11/2008 Valenzuela ............ H04R 1/323 381/97
2008/0294418 A1‡ 11/2008 Cleary ................ H04L 41/0803 703/21
2008/0294651 A1‡ 11/2008 Masuyama .......... G06K 9/6219
2008/0294981 A1‡ 11/2008 Balzano ................ G06F 16/958 715/25
2008/0298563 A1‡ 12/2008 Rondeau ........... H04M 3/53391 379/88
2008/0298766 A1‡ 12/2008 Wen .................... G06F 16/5854 386/28
2008/0299523 A1‡ 12/2008 Chai ...................... G09B 19/04 434/15
2008/0300871 A1‡ 12/2008 Gilbert .................... G10L 15/26 704/23
2008/0300878 A1‡ 12/2008 Bennett ................... G06F 40/20 704/25
2008/0303645 A1‡ 12/2008 Seymour .............. G09B 21/003 340/40
2008/0306727 A1‡ 12/2008 Thurmair ................ G06F 40/44 704/4
2008/0312909 A1‡ 12/2008 Hermansen ............. G06F 16/33 704/9
2008/0312928 A1‡ 12/2008 Goebel ................... G10L 15/26 704/25
2008/0313335 A1‡ 12/2008 Jung ...................... G06Q 30/02 709/22
2008/0316183 A1‡ 12/2008 Westerman ........... G06F 3/0416 345/17
2008/0319738 A1‡ 12/2008 Liu ....................... G06F 40/232 704/10
2008/0319753 A1‡ 12/2008 Hancock ................. G10L 13/04 704/26
2008/0319763 A1‡ 12/2008 Di Fabbrizio .......... G10L 21/06 704/27
2008/0319783 A1‡ 12/2008 Yao .................... G06Q 30/0281 705/34
2009/0003115 A1‡ 1/2009 Lindahl ................. G06F 1/3225 365/22
2009/0005012 A1‡ 1/2009 van Heugten ...... H04M 1/7255 455/41
2009/0005891 A1‡ 1/2009 Batson .................... G06F 3/165 700/94
2009/0006097 A1‡ 1/2009 Etezadi ................... G10L 13/08 704/26
2009/0006099 A1‡ 1/2009 Sharpe .................... G10L 15/22 704/27
2009/0006100 A1‡ 1/2009 Badger ........................... 704/27
2009/0006343 A1‡ 1/2009 Platt ...................... G06F 16/242
2009/0006345 A1‡ 1/2009 Platt .................. G06F 16/90332
2009/0006488 A1‡ 1/2009 Lindahl ................ H04N 21/242
2009/0006671 A1‡ 1/2009 Batson .................... G06F 3/165 710/38
2009/0007001 A1‡ 1/2009 Morin ................... G06F 3/0237 715/77
2009/0011709 A1‡ 1/2009 Akasaka ............... H04W 24/00 455/41
2009/0012748 A1‡ 1/2009 Beish .................. G06F 11/3636 702/18
2009/0012775 A1‡ 1/2009 El Hady ................. G06F 40/53 704/2
2009/0018828 A1‡ 1/2009 Nakadai .................. G10L 15/20 704/23
2009/0018829 A1‡ 1/2009 Kuperstein ............. G10L 15/26 704/23
2009/0018834 A1‡ 1/2009 Cooper ................. H04M 3/527 704/25
2009/0018835 A1‡ 1/2009 Cooper ................. H04M 3/527 704/25
2009/0018839 A1‡ 1/2009 Cooper ................. H04M 3/527 704/26
2009/0018840 A1‡ 1/2009 Lutz ................... G01C 21/3608 704/27
2009/0022329 A1‡ 1/2009 Mahowald ............... H03G 3/32 381/57
2009/0024595 A1‡ 1/2009 Chen ....................... G06F 40/58
2009/0028435 A1‡ 1/2009 Wu .......................... G06K 9/34 382/19
2009/0030800 A1‡ 1/2009 Grois ..................... G06Q 30/02 705/14
2009/0030978 A1‡ 1/2009 Johnson ............. H04N 21/4825 709/20
2009/0043580 A1‡ 2/2009 Mozer ..................... G10L 13/00 704/25
2009/0043583 A1‡ 2/2009 Agapi ................... G10L 13/033 704/26
2009/0043763 A1‡ 2/2009 Peng ..................... G06F 16/954
2009/0044094 A1‡ 2/2009 Rapp ..................... G06F 40/274 715/22
2009/0048821 A1‡ 2/2009 Yam .................... G06F 3/04842 704/3
2009/0048845 A1‡ 2/2009 Burckart ................. G10L 15/26 704/27
2009/0049067 A1‡ 2/2009 Murray ................... G06F 40/30
2009/0054046 A1 2/2009 Whittington et al.

(56) References Cited

U.S. PATENT DOCUMENTS

| | | | | | |
|---|---|---|---|---|---|
| 2009/0055168 | A1 ‡ | 2/2009 | Wu | G06F 40/216 | 704/10 |
| 2009/0055175 | A1 ‡ | 2/2009 | Terrell, II | G10L 15/01 | 704/23 |
| 2009/0055179 | A1 ‡ | 2/2009 | Cho | G10L 15/193 | 704/24 |
| 2009/0055186 | A1 ‡ | 2/2009 | Lance | G09B 21/006 | 704/26 |
| 2009/0055381 | A1 ‡ | 2/2009 | Wu | G06F 40/258 | |
| 2009/0058823 | A1 ‡ | 3/2009 | Kocienda | G06F 3/04886 | 345/17 |
| 2009/0058860 | A1 ‡ | 3/2009 | Fong | G06F 40/20 | 345/46 |
| 2009/0060351 | A1 ‡ | 3/2009 | Li | G06K 9/4642 | 382/22 |
| 2009/0060472 | A1 ‡ | 3/2009 | Bull | G11B 27/105 | 386/34 |
| 2009/0063974 | A1 ‡ | 3/2009 | Bull | G06F 3/0414 | 715/71 |
| 2009/0064031 | A1 ‡ | 3/2009 | Bull | G06F 3/0485 | 715/78 |
| 2009/0070097 | A1 ‡ | 3/2009 | Wu | G06F 40/129 | 704/2 |
| 2009/0070102 | A1 ‡ | 3/2009 | Maegawa | G10L 15/183 | 704/9 |
| 2009/0070109 | A1 ‡ | 3/2009 | Didcock | G10L 15/30 | 704/23 |
| 2009/0070114 | A1 ‡ | 3/2009 | Staszak | G09B 5/06 | 704/26 |
| 2009/0074214 | A1 ‡ | 3/2009 | Bradford | H04R 25/558 | 381/31 |
| 2009/0076792 | A1 ‡ | 3/2009 | Lawson-Tancred | G06F 40/166 | 704/2 |
| 2009/0076796 | A1 ‡ | 3/2009 | Daraselia | G06F 40/30 | 704/9 |
| 2009/0076819 | A1 ‡ | 3/2009 | Wouters | G10L 13/033 | 704/26 |
| 2009/0076821 | A1 ‡ | 3/2009 | Brenner | G06F 16/68 | 704/26 |
| 2009/0076825 | A1 ‡ | 3/2009 | Bradford | H04R 25/552 | 704/27 |
| 2009/0077165 | A1 ‡ | 3/2009 | Rhodes | G06Q 10/06 | 709/20 |
| 2009/0079622 | A1 ‡ | 3/2009 | Seshadri | G01C 21/00 | 342/35 |
| 2009/0083034 | A1 ‡ | 3/2009 | Hernandez | G10L 15/22 | 704/25 |
| 2009/0083035 | A1 ‡ | 3/2009 | Huang | G10L 13/08 | 704/26 |
| 2009/0083036 | A1 ‡ | 3/2009 | Zhao | G10L 13/10 | 704/26 |
| 2009/0083037 | A1 ‡ | 3/2009 | Gleason | G10L 13/033 | 704/26 |
| 2009/0083047 | A1 ‡ | 3/2009 | Lindahl | G10L 21/04 | 704/50 |
| 2009/0089058 | A1 ‡ | 4/2009 | Bellegarda | G06F 40/284 | 704/25 |
| 2009/0092239 | A1 ‡ | 4/2009 | Macwan | G10L 15/26 | 379/20 |
| 2009/0092260 | A1 ‡ | 4/2009 | Powers | A61N 1/3993 | 381/57 |
| 2009/0092261 | A1 ‡ | 4/2009 | Bard | G06F 1/206 | 381/71 |
| 2009/0092262 | A1 ‡ | 4/2009 | Costa | G06F 1/20 | 381/71 |
| 2009/0094029 | A1 ‡ | 4/2009 | Koch | H04M 3/42221 | 704/24 |
| 2009/0094033 | A1 ‡ | 4/2009 | Mozer | G10L 15/22 | 704/25 |
| 2009/0097634 | A1 ‡ | 4/2009 | Nambiar | H04M 3/5183 | 379/26 |
| 2009/0097637 | A1 ‡ | 4/2009 | Boscher | G06F 7/723 | 380/28 |
| 2009/0100049 | A1 ‡ | 4/2009 | Cao | G06F 16/951 | |
| 2009/0100454 | A1 ‡ | 4/2009 | Weber | G11B 27/034 | 725/9 |
| 2009/0104898 | A1 ‡ | 4/2009 | Harris | H04M 1/663 | 455/41 |
| 2009/0106026 | A1 ‡ | 4/2009 | Ferrieux | G10L 15/08 | 704/25 |
| 2009/0106376 | A1 ‡ | 4/2009 | Tom | G06Q 10/107 | 709/20 |
| 2009/0106397 | A1 ‡ | 4/2009 | O'Keefe | G06F 16/487 | 709/21 |
| 2009/0112572 | A1 ‡ | 4/2009 | Thorn | G06F 3/038 | 704/3 |
| 2009/0112576 | A1 ‡ | 4/2009 | Jackson | G06F 40/274 | 704/9 |
| 2009/0112592 | A1 ‡ | 4/2009 | Candelore | H04N 5/42203 | 704/24 |
| 2009/0112677 | A1 ‡ | 4/2009 | Rhett | G06Q 10/06 | 705/7 |
| 2009/0112892 | A1 ‡ | 4/2009 | Cardie | G06F 16/345 | |
| 2009/0119587 | A1 ‡ | 5/2009 | Allen | G06F 3/038 | 715/70 |
| 2009/0123021 | A1 ‡ | 5/2009 | Jung | G11B 27/28 | 382/10 |
| 2009/0123071 | A1 ‡ | 5/2009 | Iwasaki | G06K 9/2054 | 382/17 |
| 2009/0125477 | A1 ‡ | 5/2009 | Lu | G06F 40/47 | |
| 2009/0128505 | A1 ‡ | 5/2009 | Partridge | G06F 3/04883 | 345/17 |
| 2009/0132253 | A1 ‡ | 5/2009 | Bellegarda | G10L 13/06 | 704/25 |
| 2009/0132255 | A1 ‡ | 5/2009 | Lu | G10L 15/22 | 704/27 |
| 2009/0137286 | A1 ‡ | 5/2009 | Luke | G06F 1/1626 | 455/56 |
| 2009/0138736 | A1 ‡ | 5/2009 | Chin | G06F 1/1626 | 713/32 |
| 2009/0138828 | A1 ‡ | 5/2009 | Schultz | G06Q 10/10 | 715/85 |
| 2009/0144049 | A1 ‡ | 6/2009 | Haddad | G06F 40/129 | 704/3 |
| 2009/0144428 | A1 ‡ | 6/2009 | Bowater | G06F 3/16 | 709/22 |
| 2009/0144609 | A1 ‡ | 6/2009 | Liang | G06F 40/295 | 715/23 |
| 2009/0146848 | A1 ‡ | 6/2009 | Ghassabian | G06F 1/1615 | 341/22 |
| 2009/0150147 | A1 ‡ | 6/2009 | Jacoby | G11B 27/105 | 704/23 |
| 2009/0150156 | A1 ‡ | 6/2009 | Kennewick | G06Q 30/0261 | 704/25 |
| 2009/0152349 | A1 ‡ | 6/2009 | Bonev | G06Q 30/00 | 235/38 |
| 2009/0153288 | A1 ‡ | 6/2009 | Hope | G06F 3/0482 | 340/3 |
| 2009/0154669 | A1 ‡ | 6/2009 | Wood | H04M 1/7255 | 379/88 |
| 2009/0157382 | A1 ‡ | 6/2009 | Bar | G06F 16/93 | 704/8 |
| 2009/0157384 | A1 ‡ | 6/2009 | Toutanova | G06F 40/268 | 704/9 |
| 2009/0157401 | A1 ‡ | 6/2009 | Bennett | G06F 40/42 | 704/24 |
| 2009/0158200 | A1 ‡ | 6/2009 | Palahnuk | G06Q 30/00 | 715/78 |
| 2009/0158323 | A1 ‡ | 6/2009 | Bober | G11B 27/105 | 725/37 |
| 2009/0158423 | A1 ‡ | 6/2009 | Orlassino | G06F 21/32 | 726/19 |
| 2009/0160803 | A1 ‡ | 6/2009 | Hashimoto | G06F 3/0488 | 345/17 |
| 2009/0164301 | A1 ‡ | 6/2009 | O'Sullivan | G06Q 30/02 | 705/14 |
| 2009/0164441 | A1 ‡ | 6/2009 | Cheyer | G06F 16/367 | |

(56) References Cited

U.S. PATENT DOCUMENTS

2009/0164655 A1‡ 6/2009 Pettersson ........... H04L 65/4015 709/23
2009/0164937 A1‡ 6/2009 Alviar ................. G06F 3/03547 715/80
2009/0167508 A1‡ 7/2009 Fadell ..................... G06F 3/016 340/40
2009/0167509 A1‡ 7/2009 Fadell ...................... G08B 6/00 340/40
2009/0171578 A1‡ 7/2009 Kim ................... G01C 21/3632 701/41
2009/0171662 A1‡ 7/2009 Huang ................ G10L 15/1822 704/25
2009/0171664 A1‡ 7/2009 Kennewick ............. G10L 15/22 704/25
2009/0172108 A1‡ 7/2009 Singh .................. H04M 3/5307 709/20
2009/0172542 A1‡ 7/2009 Girish .................. G11B 27/105 715/71
2009/0174667 A1‡ 7/2009 Kocienda .............. G06F 3/0237 345/16
2009/0174677 A1‡ 7/2009 Gehani ............... G06F 3/04847 345/17
2009/0177300 A1‡ 7/2009 Lee .................. G11B 20/10527 700/94
2009/0177461 A1‡ 7/2009 Ehsani .................... G10L 15/02 704/2
2009/0177966 A1‡ 7/2009 Chaudhri .............. G06F 1/1626 715/71
2009/0182445 A1‡ 7/2009 Girish ................... G06F 1/1616 700/94
2009/0187402 A1‡ 7/2009 Scholl ..................... G10L 15/01 704/23
2009/0187577 A1‡ 7/2009 Reznik .................. G06F 16/635
2009/0187950 A1‡ 7/2009 Nicas ...................... G10L 13/00 725/56
2009/0191895 A1‡ 7/2009 Singh .................... G01S 5/0252 455/45
2009/0192782 A1‡ 7/2009 Drewes ................... G06F 40/44 704/3
2009/0192787 A1‡ 7/2009 Roon .................... G06F 40/216 704/9
2009/0198497 A1‡ 8/2009 Kwon ................... G10L 13/033 704/26
2009/0204409 A1‡ 8/2009 Mozer ..................... G10L 15/30 704/27
2009/0204478 A1‡ 8/2009 Kaib .................. G06Q 30/0201 705/7
2009/0204596 A1‡ 8/2009 Brun ..................... G06F 40/295
2009/0204601 A1‡ 8/2009 Grasset ............... G06F 16/9535
2009/0204620 A1‡ 8/2009 Thione .................... G10L 15/22
2009/0210230 A1‡ 8/2009 Schwarz ................. G10L 15/08 704/25
2009/0210232 A1‡ 8/2009 Sanchez .................. G10L 15/22 704/27
2009/0213134 A1‡ 8/2009 Stephanick .......... G06H 3/0236 345/58
2009/0215503 A1‡ 8/2009 Zhang ................... H04M 1/271 455/56
2009/0216396 A1‡ 8/2009 Yamagata .......... A61B 5/02055 701/31
2009/0216540 A1‡ 8/2009 Tessel ..................... G10L 15/30 704/27
2009/0216704 A1‡ 8/2009 Zheng .................... G01C 21/20 706/52
2009/0221274 A1‡ 9/2009 Venkatakrishnan ........................ H04M 1/6505 455/41
2009/0222257 A1‡ 9/2009 Sumita .................... G06F 40/58 704/3
2009/0222270 A2‡ 9/2009 Likens .................... G10L 15/26 704/27
2009/0222488 A1‡ 9/2009 Boerries ............. G06F 16/9562
2009/0225041 A1 9/2009 Kida et al.
2009/0228126 A1‡ 9/2009 Spielberg ................ G06F 3/165 700/94
2009/0228273 A1‡ 9/2009 Wang .................... G06F 40/232 704/23
2009/0228281 A1‡ 9/2009 Singleton ................ G10L 15/22 704/27
2009/0228439 A1‡ 9/2009 Manolescu ........... G06F 16/951
2009/0228792 A1‡ 9/2009 van Os ............... G06F 3/04883 715/70
2009/0228842 A1‡ 9/2009 Westerman ......... G06F 3/04883 715/86
2009/0234638 A1‡ 9/2009 Ranjan .................... G06F 40/20 704/9
2009/0234655 A1‡ 9/2009 Kwon ............................ 704/27
2009/0235280 A1‡ 9/2009 Tannier .................. G06Q 10/00 719/31
2009/0239202 A1‡ 9/2009 Stone ....................... G09B 5/00 434/17
2009/0239552 A1‡ 9/2009 Churchill ............ G06F 16/9537 455/45
2009/0240485 A1‡ 9/2009 Dalal ...................... G06F 40/40 704/2
2009/0241054 A1‡ 9/2009 Hendricks .......... H04N 7/17318 715/77
2009/0241760 A1‡ 10/2009 Georges ............... G10H 1/0025 84/645
2009/0247237 A1‡ 10/2009 Mittleman ............ H04M 1/026 455/56
2009/0248182 A1‡ 10/2009 Logan .................... G06Q 30/06 700/94
2009/0248395 A1‡ 10/2009 Alewine ................. G10L 13/08 704/7
2009/0248420 A1‡ 10/2009 Basir ................... H04M 1/6075 704/27
2009/0248422 A1‡ 10/2009 Li .......................... G06F 40/45 704/27
2009/0249198 A1‡ 10/2009 Davis ...................... G06F 40/30 715/26
2009/0249247 A1‡ 10/2009 Tseng ................ H04M 1/72552 715/80
2009/0252350 A1‡ 10/2009 Seguin ................... H03G 9/005 381/10
2009/0253457 A1‡ 10/2009 Seguin ................... H03G 9/005 455/55
2009/0253463 A1‡ 10/2009 Shin .................. H04M 1/72583 455/56
2009/0254339 A1‡ 10/2009 Seguin ................... H03G 9/005 704/21
2009/0254345 A1‡ 10/2009 Fleizach ............... G10L 13/043 704/26
2009/0254819 A1‡ 10/2009 Song ..................... G06F 40/242 715/25
2009/0254823 A1‡ 10/2009 Barrett ................. H04N 21/235 715/71
2009/0259969 A1‡ 10/2009 Pallakoff ............... G06F 1/1616 715/80
2009/0265368 A1‡ 10/2009 Crider ....................... G06F 8/38
2009/0271109 A1‡ 10/2009 Lee ........................ G01C 21/20 701/53
2009/0271175 A1‡ 10/2009 Bodin ..................... G10L 13/00 704/2
2009/0271176 A1‡ 10/2009 Bodin ..................... G06F 40/58 704/2
2009/0271178 A1‡ 10/2009 Bodin ..................... G06F 40/58 704/8
2009/0271188 A1‡ 10/2009 Agapi ................. G10L 21/0208 704/23
2009/0271189 A1‡ 10/2009 Agapi ..................... G10L 15/01 704/23
2009/0274315 A1‡ 11/2009 Carnes ................... H04B 1/123 381/66
2009/0281789 A1‡ 11/2009 Waibel ................ G10L 15/1815 704/3
2009/0284482 A1‡ 11/2009 Chin .................. G06F 3/04883 345/17

(56) References Cited

U.S. PATENT DOCUMENTS

2009/0286514 A1‡ 11/2009 Lichorowic ......... H04M 3/4938 455/41
2009/0287583 A1‡ 11/2009 Holmes ................... G06F 21/10 705/26
2009/0290718 A1‡ 11/2009 Kahn ....................... H03G 3/32 381/57
2009/0292987 A1‡ 11/2009 Sorenson ................ G06F 9/543 715/25
2009/0296552 A1‡ 12/2009 Hicks ................... G11B 19/041 369/53
2009/0298474 A1‡ 12/2009 George ................... G10L 13/00 455/41
2009/0298529 A1‡ 12/2009 Mahajan ........... H04M 1/72561 455/55
2009/0299745 A1‡ 12/2009 Kennewick ............. G10L 15/22 704/25
2009/0299849 A1‡ 12/2009 Cao ........................ G06Q 10/06 705/14
2009/0300391 A1‡ 12/2009 Jessup ................... G06F 1/3203 713/32
2009/0300488 A1‡ 12/2009 Salamon ................ G06Q 50/16 715/25
2009/0304198 A1‡ 12/2009 Herre .................... G10L 19/008 381/66
2009/0306967 A1‡ 12/2009 Nicolov .................. G06F 40/30 704/9
2009/0306969 A1‡ 12/2009 Goud .................... G06F 40/274 704/10
2009/0306979 A1‡ 12/2009 Jaiswal ................ G10L 15/063 704/23
2009/0306980 A1‡ 12/2009 Shin ...................... G06F 1/1626 704/23
2009/0306981 A1‡ 12/2009 Cromack ................ G10L 15/26 704/23
2009/0306985 A1‡ 12/2009 Roberts ................... G06F 3/017 704/25
2009/0306988 A1‡ 12/2009 Chen ........................ H04K 1/04 704/26
2009/0306989 A1‡ 12/2009 Kaji ........................ G10L 15/22 704/27
2009/0307162 A1‡ 12/2009 Bui ........................ G06N 5/022 706/12
2009/0307201 A1‡ 12/2009 Dunning ................. G06F 16/68
2009/0307584 A1‡ 12/2009 Davidson ................ G06F 40/56 715/25
2009/0313014 A1‡ 12/2009 Shin ........................ G10L 15/22 704/23
2009/0313023 A1‡ 12/2009 Jones .................... G10L 13/047 704/26
2009/0313026 A1‡ 12/2009 Coffman ............... G06F 16/957 704/27
2009/0313544 A1‡ 12/2009 Wood ...................... G06F 3/048 715/71
2009/0313564 A1‡ 12/2009 Rottler ................. G11B 27/105 715/76
2009/0316943 A1‡ 12/2009 Frigola Munoz ...... H04R 7/045 381/33
2009/0318119 A1‡ 12/2009 Basir ..................... H04M 1/271 455/41
2009/0318198 A1‡ 12/2009 Carroll ............... H04M 1/6066 455/56
2009/0319266 A1‡ 12/2009 Brown .................... G06F 9/451 704/23
2009/0320126 A1 12/2009 Harada
2009/0326923 A1‡ 12/2009 Yan ....................... G06F 40/295 704/9
2009/0326936 A1‡ 12/2009 Nagashima ..................... 704/23
2009/0326938 A1‡ 12/2009 Marila .................... G10L 15/22 704/23
2009/0326949 A1‡ 12/2009 Douthitt .............. H04L 67/2842 704/26
2009/0327977 A1‡ 12/2009 Bachfischer ........... B60K 35/00 715/86
2010/0004918 A1‡ 1/2010 Lee ....................... G06F 40/166 704/3
2010/0004930 A1 1/2010 Strope et al.
2010/0004931 A1‡ 1/2010 Ma .......................... G10L 15/08 704/24
2010/0005081 A1‡ 1/2010 Bennett ................... G10L 15/30 704/9
2010/0007569 A1 1/2010 Sim et al.
2010/0010803 A1‡ 1/2010 Ishikawa ................ G06F 40/40 704/9
2010/0010814 A1‡ 1/2010 Patel ....................... G10L 15/22 704/25
2010/0010948 A1 1/2010 Ito et al.
2010/0013760 A1‡ 1/2010 Hirai ....................... G06F 3/167 345/15
2010/0013796 A1‡ 1/2010 Abileah .............. G02F 1/13338 345/17
2010/0017212 A1‡ 1/2010 Attwater ................ G10L 15/08 704/27
2010/0017382 A1‡ 1/2010 Katragadda ........... G06F 16/951 706/12
2010/0017741 A1 1/2010 Karp et al.
2010/0019834 A1‡ 1/2010 Zerbe ........................ G06F 1/26 327/53
2010/0020035 A1 1/2010 Ryu et al.
2010/0023318 A1‡ 1/2010 Lemoine .............. G06F 40/289 704/9
2010/0023320 A1‡ 1/2010 Di Cristo ............. G06F 40/232 704/9
2010/0023331 A1 1/2010 Duta et al.
2010/0026526 A1‡ 2/2010 Yokota ............ G08G 1/096827 340/99
2010/0030549 A1‡ 2/2010 Lee ....................... G06F 1/1626 704/4
2010/0030562 A1 2/2010 Yoshizawa et al.
2010/0030928 A1‡ 2/2010 Conroy ................ G06F 1/3203 710/23
2010/0031143 A1‡ 2/2010 Rao ....................... G06F 3/0237 715/26
2010/0031150 A1 2/2010 Andrew
2010/0036653 A1‡ 2/2010 Kim ........................ G06F 40/58 704/3
2010/0036655 A1‡ 2/2010 Cecil ..................... G06F 3/0237 704/10
2010/0036660 A1‡ 2/2010 Bennett ................... G10L 15/30 704/23
2010/0036829 A1 2/2010 Leyba
2010/0036928 A1 2/2010 Granito et al.
2010/0037183 A1‡ 2/2010 Miyashita ............. G06F 3/0481 715/86
2010/0037187 A1 2/2010 Kondziela
2010/0039495 A1 2/2010 Rahman et al.
2010/0042400 A1‡ 2/2010 Block ..................... G10L 15/18 704/9
2010/0042576 A1‡ 2/2010 Roettger ............... G06F 40/194 706/55
2010/0046842 A1‡ 2/2010 Conwell ................ G06K 9/228 382/21
2010/0049498 A1‡ 2/2010 Cao ....................... G06F 40/284 704/9
2010/0049514 A1‡ 2/2010 Kennewick ........... G10L 15/183 704/23
2010/0050064 A1‡ 2/2010 Liu ..................... G06F 16/4393 715/20
2010/0050074 A1 2/2010 Nachmani et al.
2010/0054512 A1‡ 3/2010 Solum .................... H04R 25/30 381/31
2010/0054601 A1 3/2010 Anbalagan et al.
2010/0057435 A1 3/2010 Kent et al.
2010/0057443 A1 3/2010 Di Cristo et al.
2010/0057457 A1‡ 3/2010 Ogata ..................... G10L 15/04 704/23
2010/0057461 A1‡ 3/2010 Neubacher ............ G10L 15/063 704/24

(56) References Cited

U.S. PATENT DOCUMENTS

2010/0057643 A1‡ 3/2010 Yang ................ H04M 1/72522 706/11
2010/0058200 A1 3/2010 Jablokov et al.
2010/0060646 A1‡ 3/2010 Unsal ..................... G06T 13/80 345/47
2010/0063804 A1‡ 3/2010 Sato ..................... G10L 19/038 704/20
2010/0063825 A1‡ 3/2010 Williams ............. G11B 27/038 704/50
2010/0063961 A1‡ 3/2010 Guiheneuf ............. G06F 16/58 707/62
2010/0064113 A1‡ 3/2010 Lindahl ................ G06F 12/023 711/17
2010/0064218 A1‡ 3/2010 Bull ...................... G06F 3/167 715/71
2010/0064226 A1 3/2010 Stefaniak et al.
2010/0066546 A1 3/2010 Aaron
2010/0066684 A1 3/2010 Shahraray et al.
2010/0067723 A1‡ 3/2010 Bergmann .......... H04M 1/6066 381/31
2010/0067867 A1‡ 3/2010 Lin ................... G06K 9/00711 386/24
2010/0070281 A1‡ 3/2010 Conkie ................ G06F 3/0482 704/26
2010/0070517 A1 3/2010 Ghosh et al.
2010/0070521 A1 3/2010 Clinchant et al.
2010/0070899 A1‡ 3/2010 Hunt ...................... G06F 16/95 715/76
2010/0071003 A1‡ 3/2010 Bychkov ............... G06Q 30/02 725/46
2010/0073201 A1 3/2010 Holcomb et al.
2010/0076760 A1‡ 3/2010 Kraenzel ........................ 704/23
2010/0076968 A1 3/2010 Boyns et al.
2010/0076993 A1‡ 3/2010 Klawitter ........... G06F 16/9577 707/76
2010/0077350 A1‡ 3/2010 Lim ....................... G06F 9/451 715/81
2010/0077469 A1 3/2010 Furman et al.
2010/0079501 A1‡ 4/2010 Ikeda ................... G06F 3/0485 345/66
2010/0079508 A1 4/2010 Hodge et al.
2010/0080398 A1‡ 4/2010 Waldmann .......... H04R 25/658 381/66
2010/0080470 A1‡ 4/2010 Deluca .............. G06K 9/00664 382/20
2010/0081456 A1‡ 4/2010 Singh .................. G06Q 10/109 455/45
2010/0081487 A1‡ 4/2010 Chen .................. G10L 21/0208 455/57
2010/0082239 A1 4/2010 Hardy et al.
2010/0082286 A1‡ 4/2010 Leung .................... G01L 5/165 702/14
2010/0082327 A1‡ 4/2010 Rogers ................... G10L 13/08 704/4
2010/0082328 A1‡ 4/2010 Rogers ................... G10L 13/08 704/8
2010/0082329 A1‡ 4/2010 Silverman .............. G10L 13/08 704/8
2010/0082333 A1 4/2010 Al-Shammari
2010/0082343 A1 4/2010 Levit et al.
2010/0082345 A1 4/2010 Wang et al.
2010/0082346 A1‡ 4/2010 Rogers ................... G10L 13/00 704/26
2010/0082347 A1‡ 4/2010 Rogers ................... G10L 13/08 704/26
2010/0082348 A1‡ 4/2010 Silverman .............. G10L 13/08 704/26
2010/0082349 A1‡ 4/2010 Bellegarda ............. G10L 13/08 704/26
2010/0082376 A1 4/2010 Levitt
2010/0082567 A1 4/2010 Rosenblatt et al.
2010/0082653 A1 4/2010 Nair
2010/0082970 A1‡ 4/2010 Lindahl .................. G06F 21/10 713/15
2010/0086152 A1‡ 4/2010 Rank ................... H04R 25/554 381/31
2010/0086153 A1‡ 4/2010 Hagen ................... H04R 25/70 381/31
2010/0086156 A1‡ 4/2010 Rank ................... H04R 25/554 381/31
2010/0088020 A1‡ 4/2010 Sano ................. G01C 21/3492 701/53
2010/0088093 A1‡ 4/2010 Lee ........................ G10L 15/20 704/23
2010/0088100 A1‡ 4/2010 Lindahl .................. G10L 15/30 704/27
2010/0094632 A1 4/2010 Davis et al.
2010/0098231 A1‡ 4/2010 Wohlert ............... H04M 3/436 379/20
2010/0099354 A1 4/2010 Johnson
2010/0100080 A1 4/2010 Huculak et al.
2010/0100212 A1‡ 4/2010 Lindahl .................. G10L 21/04 700/94
2010/0100371 A1 4/2010 Yuezhong et al.
2010/0100384 A1‡ 4/2010 Ju .......................... G10L 15/22 704/25
2010/0100385 A1 4/2010 Davis et al.
2010/0100515 A1 4/2010 Bangalore et al.
2010/0100816 A1‡ 4/2010 McCloskey .......... G06F 40/186 715/25
2010/0103776 A1‡ 4/2010 Chan ...................... G01S 11/14 367/11
2010/0106486 A1‡ 4/2010 Hua .................... G06K 9/6226 704/9
2010/0106498 A1‡ 4/2010 Morrison ............. G10L 15/265 704/23
2010/0106500 A1‡ 4/2010 McKee .................. G10L 13/00 704/23
2010/0106503 A1‡ 4/2010 Farrell ................... G10L 17/04 704/24
2010/0106975 A1 4/2010 Vandervort
2010/0114856 A1‡ 5/2010 Kuboyama ............ G06F 16/58 707/70
2010/0114887 A1 5/2010 Conway et al.
2010/0121637 A1‡ 5/2010 Roy ....................... G10L 15/22 704/23
2010/0122306 A1 5/2010 Pratt et al.
2010/0125456 A1‡ 5/2010 Weng ..................... G10L 15/22 704/25
2010/0125458 A1‡ 5/2010 Franco ................... G10L 15/22 704/25
2010/0125460 A1‡ 5/2010 Mellott .................. G10L 15/22 704/27
2010/0125811 A1‡ 5/2010 Moore ................ G06F 3/04817 715/84
2010/0127854 A1 5/2010 Helvick et al.
2010/0128701 A1 5/2010 Nagaraja
2010/0131265 A1 5/2010 Liu et al.
2010/0131269 A1‡ 5/2010 Park .................... G10K 11/178 704/23
2010/0131273 A1‡ 5/2010 Aley-Raz ............... G10L 17/24 704/24
2010/0131498 A1‡ 5/2010 Linthicum ........... G06F 16/338 707/72
2010/0131899 A1‡ 5/2010 Hubert ................... G06F 16/86 715/82
2010/0138215 A1‡ 6/2010 Williams ............... G10L 15/22 704/9
2010/0138224 A1‡ 6/2010 Bedingfield, Sr. ...... G10L 15/22 704/27
2010/0138416 A1‡ 6/2010 Bellotti ................ G06F 16/436 707/73
2010/0138680 A1‡ 6/2010 Brisebois ............. G06F 1/1626 713/32
2010/0138759 A1‡ 6/2010 Roy ................... G06F 9/44505 715/76
2010/0138798 A1 6/2010 Wilson et al.

(56) References Cited

U.S. PATENT DOCUMENTS

| | | | | | |
|---|---|---|---|---|---|
| 2010/0142740 | A1‡ | 6/2010 | Roerup | H04R 25/556 | 381/33 |
| 2010/0145694 | A1‡ | 6/2010 | Ju | G10L 15/1815 | 704/23 |
| 2010/0145700 | A1‡ | 6/2010 | Kennewick | G06F 16/3329 | 704/25 |
| 2010/0145707 | A1 | 6/2010 | Ljolje et al. | | |
| 2010/0146442 | A1‡ | 6/2010 | Nagasaka | G06Q 10/10 | 715/81 |
| 2010/0150321 | A1‡ | 6/2010 | Harris | H04M 1/271 | 379/88 |
| 2010/0153114 | A1 | 6/2010 | Shih et al. | | |
| 2010/0153115 | A1‡ | 6/2010 | Klee | G10L 13/08 | 704/26 |
| 2010/0153448 | A1‡ | 6/2010 | Harpur | G06F 16/9535 | 707/77 |
| 2010/0153576 | A1 | 6/2010 | Wohlert et al. | | |
| 2010/0153968 | A1 | 6/2010 | Engel | | |
| 2010/0158207 | A1 | 6/2010 | Dhawan et al. | | |
| 2010/0161311 | A1 | 6/2010 | Massuh | | |
| 2010/0161313 | A1‡ | 6/2010 | Karttunen | G06F 40/289 | 704/9 |
| 2010/0161337 | A1 | 6/2010 | Pulz et al. | | |
| 2010/0161554 | A1‡ | 6/2010 | Datuashvili | G06F 16/24556 | 707/61 |
| 2010/0164897 | A1‡ | 7/2010 | Morin | G06F 3/0237 | 345/17 |
| 2010/0169075 | A1‡ | 7/2010 | Raffa | G10L 13/00 | 704/9 |
| 2010/0169093 | A1 | 7/2010 | Washio | | |
| 2010/0169097 | A1‡ | 7/2010 | Nachman | G06F 3/038 | 704/27 |
| 2010/0169098 | A1‡ | 7/2010 | Patch | 704/27 | |
| 2010/0171713 | A1‡ | 7/2010 | Kwok | G06F 3/0488 | 345/17 |
| 2010/0174544 | A1‡ | 7/2010 | Heifets | H04M 3/4938 | 704/26 |
| 2010/0175066 | A1‡ | 7/2010 | Paik | G06F 1/3203 | 718/10 |
| 2010/0179932 | A1‡ | 7/2010 | Yoon | B60W 40/09 | 706/12 |
| 2010/0179991 | A1‡ | 7/2010 | Lorch | H04M 1/7253 | 709/20 |
| 2010/0180218 | A1‡ | 7/2010 | Boston | G06F 3/0481 | 715/75 |
| 2010/0185434 | A1 | 7/2010 | Burvall et al. | | |
| 2010/0185448 | A1‡ | 7/2010 | Meisel | G10L 15/08 | 704/25 |
| 2010/0185949 | A1‡ | 7/2010 | Jaeger | G06F 3/0481 | 715/73 |
| 2010/0191466 | A1 | 7/2010 | Deluca et al. | | |
| 2010/0191520 | A1‡ | 7/2010 | Gruhn | G06F 3/0237 | 704/9 |
| 2010/0192221 | A1 | 7/2010 | Waggoner | | |
| 2010/0195865 | A1 | 8/2010 | Luff | | |
| 2010/0197359 | A1‡ | 8/2010 | Harris | H04M 1/6075 | 455/56 |
| 2010/0198821 | A1 | 8/2010 | Loritz et al. | | |
| 2010/0199180 | A1‡ | 8/2010 | Brichter | G06F 3/0482 | 715/70 |
| 2010/0199215 | A1‡ | 8/2010 | Seymour | G06F 3/0481 | 715/80 |
| 2010/0199340 | A1 | 8/2010 | Jonas et al. | | |
| 2010/0204986 | A1‡ | 8/2010 | Kennewick | G10L 15/22 | 704/22 |
| 2010/0211199 | A1‡ | 8/2010 | Naik | G10L 21/00 | 700/94 |
| 2010/0211379 | A1 | 8/2010 | Gorman et al. | | |
| 2010/0211644 | A1 | 8/2010 | Lavoie et al. | | |
| 2010/0215195 | A1 | 8/2010 | Harma et al. | | |
| 2010/0216509 | A1‡ | 8/2010 | Riemer | H04M 1/72577 | 455/55 |
| 2010/0217581 | A1 | 8/2010 | Hong | | |
| 2010/0217604 | A1‡ | 8/2010 | Baldwin | G10L 17/22 | 704/27 |
| 2010/0222033 | A1‡ | 9/2010 | Scott | H04M 3/5322 | 455/41 |
| 2010/0222098 | A1‡ | 9/2010 | Garg | H04M 1/72552 | 455/55 |
| 2010/0223055 | A1‡ | 9/2010 | McLean | H04M 1/2476 | 704/23 |
| 2010/0223056 | A1‡ | 9/2010 | Kadirkamanathan | G10L 15/02 | 704/23 |
| 2010/0223131 | A1‡ | 9/2010 | Scott | H04M 1/2757 | 705/14 |
| 2010/0225599 | A1 | 9/2010 | Danielsson et al. | | |
| 2010/0225809 | A1‡ | 9/2010 | Connors | G06F 15/0283 | 348/50 |
| 2010/0227642 | A1 | 9/2010 | Kim et al. | | |
| 2010/0228540 | A1‡ | 9/2010 | Bennett | G06F 40/44 | 704/9 |
| 2010/0228549 | A1‡ | 9/2010 | Herman | G10L 13/033 | 704/26 |
| 2010/0228691 | A1‡ | 9/2010 | Yang | G06F 16/958 | 706/12 |
| 2010/0229082 | A1‡ | 9/2010 | Karmarkar | H04M 1/72547 | 715/20 |
| 2010/0229100 | A1‡ | 9/2010 | Miller | G06F 16/955 | 715/74 |
| 2010/0231474 | A1‡ | 9/2010 | Yamagajo | H01Q 1/2216 | 343/76 |
| 2010/0235167 | A1‡ | 9/2010 | Bourdon | G10L 15/063 | 704/23 |
| 2010/0235341 | A1‡ | 9/2010 | Bennett | G06F 16/243 | 707/70 |
| 2010/0235729 | A1‡ | 9/2010 | Kocienda | G06F 3/04886 | 715/25 |
| 2010/0235732 | A1‡ | 9/2010 | Bergman | G06F 3/0488 | 715/70 |
| 2010/0235770 | A1‡ | 9/2010 | Ording | G06F 3/04886 | 715/76 |
| 2010/0235780 | A1 | 9/2010 | Westerman et al. | | |
| 2010/0235793 | A1 | 9/2010 | Ording et al. | | |
| 2010/0241418 | A1‡ | 9/2010 | Maeda | G10L 15/1815 | 704/9 |
| 2010/0246784 | A1 | 9/2010 | Frazier et al. | | |
| 2010/0250542 | A1‡ | 9/2010 | Fujimaki | G06K 9/6269 | 707/73 |
| 2010/0250599 | A1‡ | 9/2010 | Schmidt | G06Q 30/02 | 707/78 |
| 2010/0255858 | A1‡ | 10/2010 | Juhasz | H04W 48/02 | 455/45 |
| 2010/0257160 | A1‡ | 10/2010 | Cao | G06F 16/29 | 707/72 |
| 2010/0257478 | A1‡ | 10/2010 | Longe | G06F 3/0237 | 715/77 |
| 2010/0257490 | A1 | 10/2010 | Lyon et al. | | |
| 2010/0262599 | A1‡ | 10/2010 | Nitz | G06F 16/285 | 707/72 |
| 2010/0263015 | A1 | 10/2010 | Pandey et al. | | |
| 2010/0268537 | A1 | 10/2010 | Al-Telmissani | | |
| 2010/0268539 | A1‡ | 10/2010 | Xu | G10L 13/04 | 704/26 |
| 2010/0269040 | A1‡ | 10/2010 | Lee | G06F 3/04817 | 715/70 |
| 2010/0274482 | A1 | 10/2010 | Feng | | |
| 2010/0274753 | A1‡ | 10/2010 | Liberty | G06F 16/3322 | 706/50 |
| 2010/0277579 | A1‡ | 11/2010 | Cho | G06K 9/00335 | 348/61 |
| 2010/0278320 | A1‡ | 11/2010 | Arsenault | H04L 12/66 | 379/88 |
| 2010/0278391 | A1 | 11/2010 | Hsu et al. | | |
| 2010/0278453 | A1‡ | 11/2010 | King | G06F 40/197 | 382/32 |
| 2010/0280983 | A1‡ | 11/2010 | Cho | G06F 3/0346 | 706/46 |

(56) References Cited

U.S. PATENT DOCUMENTS

2010/0281034 A1‡ 11/2010 Petrou .................. G06F 16/951 707/74
2010/0286984 A1 11/2010 Wandinger et al.
2010/0286985 A1‡ 11/2010 Kennewick ............ G10L 15/22 704/25
2010/0287241 A1 11/2010 Swanburg et al.
2010/0287514 A1‡ 11/2010 Cragun .............. G06F 16/9558 715/86
2010/0290632 A1 11/2010 Lin
2010/0293460 A1‡ 11/2010 Budelli .............. G06F 3/04842 715/70
2010/0295645 A1‡ 11/2010 Falldin .................... H02H 9/08 336/17
2010/0299133 A1‡ 11/2010 Kopparapu ............ G10L 15/06 704/2
2010/0299138 A1‡ 11/2010 Kim ..................... G06F 40/205 704/9
2010/0299142 A1‡ 11/2010 Freeman ................ G10L 15/26 704/9
2010/0299444 A1 11/2010 Nilo et al.
2010/0302056 A1‡ 12/2010 Dutton ................... H04W 4/18 340/8
2010/0303254 A1 12/2010 Yoshizawa et al.
2010/0304342 A1 12/2010 Zilber
2010/0304705 A1‡ 12/2010 Hursey ................. H04M 11/04 455/40
2010/0305807 A1‡ 12/2010 Basir .................. B60R 16/0373 701/31
2010/0305947 A1‡ 12/2010 Schwarz ............ G10L 15/1815 704/25
2010/0311395 A1 12/2010 Zheng et al.
2010/0312547 A1‡ 12/2010 Van Os .................. G10L 15/26 704/9
2010/0312566 A1‡ 12/2010 Odinak .................. G10L 15/22 704/27
2010/0318293 A1 12/2010 Brush et al.
2010/0318357 A1 12/2010 Istvan et al.
2010/0318366 A1 12/2010 Sullivan et al.
2010/0318570 A1 12/2010 Narasinghanallur et al.
2010/0318576 A1‡ 12/2010 Kim ...................... G06Q 10/04 707/80
2010/0322438 A1‡ 12/2010 Siotis ..................... H03G 3/007 381/98
2010/0324709 A1‡ 12/2010 Starmen ............... G06F 15/025 700/94
2010/0324895 A1‡ 12/2010 Kurzweil ............... G10L 13/00 704/23
2010/0324896 A1‡ 12/2010 Attwater ................ G10L 15/08 704/23
2010/0324905 A1‡ 12/2010 Kurzweil ............... G10L 13/00 704/26
2010/0325131 A1 12/2010 Dumais et al.
2010/0325158 A1‡ 12/2010 Oral ..................... G06F 16/338 707/78
2010/0325573 A1‡ 12/2010 Estrada ................ G06F 3/0483 715/77
2010/0325588 A1‡ 12/2010 Reddy ................ H04L 63/0263 715/85
2010/0330908 A1 12/2010 Maddern et al.
2010/0332003 A1 12/2010 Yaguez
2010/0332220 A1‡ 12/2010 Hursey ............ H04M 3/42221 704/20
2010/0332224 A1‡ 12/2010 Makela ............... G09B 21/007 704/23
2010/0332235 A1‡ 12/2010 David ................ G06F 16/3329 704/27
2010/0332236 A1‡ 12/2010 Tan .................... H04M 1/6066 704/27
2010/0332280 A1‡ 12/2010 Bradley ................ G06Q 10/06 705/7
2010/0332348 A1‡ 12/2010 Cao ..................... G06Q 20/102 705/26
2010/0332428 A1‡ 12/2010 McHenry .............. G06Q 10/10 706/12
2010/0332976 A1‡ 12/2010 Fux ...................... G06F 3/0237 715/25
2010/0333030 A1‡ 12/2010 Johns ..................... G06F 3/048 715/83
2010/0333163 A1‡ 12/2010 Daly ................... H04N 5/4403 725/13
2011/0002487 A1‡ 1/2011 Panther ................... H04R 5/04 381/30
2011/0004475 A1‡ 1/2011 Bellegarda ............. G10L 15/08 704/25
2011/0006876 A1 1/2011 Moberg et al.
2011/0009107 A1 1/2011 Guba et al.
2011/0010178 A1‡ 1/2011 Lee ...................... G06F 40/129 704/26
2011/0010644 A1‡ 1/2011 Merrill ..................... G06F 8/34 715/76
2011/0015928 A1 1/2011 Odell et al.
2011/0016150 A1‡ 1/2011 Engstrom .............. G06F 16/58 707/77
2011/0016421 A1 1/2011 Krupka et al.
2011/0018695 A1‡ 1/2011 Bells ...................... G06F 3/016 340/40
2011/0021211 A1 1/2011 Ohki
2011/0021213 A1‡ 1/2011 Carr .................... H04B 5/0031 455/45
2011/0022292 A1‡ 1/2011 Shen .................. G10L 15/1815 701/53
2011/0022388 A1‡ 1/2011 Wu ........................ G10L 17/22 704/24
2011/0022393 A1‡ 1/2011 Waller .............. G01C 21/3608 704/27
2011/0022394 A1‡ 1/2011 Wide ................ G06K 9/00718 704/27
2011/0022472 A1‡ 1/2011 Zon ....................... G06Q 20/10 705/14
2011/0022952 A1‡ 1/2011 Wu ...................... G06F 40/232 715/25
2011/0028083 A1 2/2011 Soitis
2011/0029616 A1‡ 2/2011 Wang .................. G06Q 10/107 709/20
2011/0029637 A1 2/2011 Morse
2011/0030067 A1 2/2011 Wilson
2011/0033064 A1‡ 2/2011 Johnson .............. H04R 1/1083 381/94
2011/0034183 A1 2/2011 Haag et al.
2011/0035144 A1‡ 2/2011 Okamoto .......... G01C 21/3641 701/53
2011/0035434 A1‡ 2/2011 Lockwood .......... H04L 29/1216 709/20
2011/0038489 A1‡ 2/2011 Visser .................. G01S 3/8006 381/92
2011/0039584 A1 2/2011 Merrett
2011/0040707 A1 2/2011 Theisen et al.
2011/0045841 A1‡ 2/2011 Kuhlke ................. G06Q 10/06 455/45
2011/0047072 A1‡ 2/2011 Ciurea .................. G06Q 20/10 705/39
2011/0047149 A1‡ 2/2011 Vaananen .......... G06F 16/9537 707/72
2011/0047161 A1‡ 2/2011 Myaeng ............. G06F 16/3338 707/74
2011/0047246 A1 2/2011 Frissora et al.
2011/0047266 A1 2/2011 Yu et al.
2011/0047605 A1 2/2011 Sontag et al.
2011/0050591 A1‡ 3/2011 Kim ..................... G06F 3/0488 345/17
2011/0050592 A1‡ 3/2011 Kim ..................... G06F 3/0488 345/17
2011/0054647 A1‡ 3/2011 Chipchase ........ H04M 3/42127 700/94
2011/0054894 A1‡ 3/2011 Phillips .................. G10L 15/07 704/23
2011/0054901 A1‡ 3/2011 Qin ........................ G06F 40/45 704/25

(56) References Cited

U.S. PATENT DOCUMENTS

2011/0055244 A1 3/2011 Donelli
2011/0055256 A1‡ 3/2011 Phillips .................. G10L 15/30 707/76
2011/0060584 A1‡ 3/2011 Ferrucci ................ G06F 40/232 704/9
2011/0060587 A1‡ 3/2011 Phillips .................. G10L 15/30 704/23
2011/0060589 A1‡ 3/2011 Weinberg ................ G10L 15/26 704/25
2011/0060807 A1‡ 3/2011 Martin ................ H04L 67/2847 709/21
2011/0060812 A1 3/2011 Middleton
2011/0064378 A1 3/2011 Gharaat et al.
2011/0064387 A1 3/2011 Mendeloff et al.
2011/0065456 A1‡ 3/2011 Brennan ............... H04W 48/04 455/45
2011/0066366 A1‡ 3/2011 Ellanti ............... G01C 21/3438 701/53
2011/0066436 A1 3/2011 Bezar
2011/0066468 A1‡ 3/2011 Huang ............... G01C 21/3438 705/7
2011/0066602 A1 3/2011 Studer et al.
2011/0066634 A1‡ 3/2011 Phillips .................. G10L 15/22 707/76
2011/0072033 A1 3/2011 White et al.
2011/0072114 A1 3/2011 Hoffert et al.
2011/0072492 A1‡ 3/2011 Mohler ............... G06F 3/04817 726/3
2011/0075818 A1 3/2011 Vance et al.
2011/0076994 A1‡ 3/2011 Kim ...................... G06Q 1/109 455/41
2011/0077943 A1 3/2011 Miki et al.
2011/0080260 A1 4/2011 Wang et al.
2011/0081889 A1 4/2011 Gao et al.
2011/0082688 A1‡ 4/2011 Kim ...................... G06F 40/211 704/9
2011/0083079 A1‡ 4/2011 Farrell .................. G06F 3/0237 715/73
2011/0087491 A1‡ 4/2011 Wittenstein ............ G10L 15/26 704/23
2011/0087685 A1 4/2011 Lin et al.
2011/0090078 A1‡ 4/2011 Kim ..................... G06Q 10/109 340/52
2011/0092187 A1 4/2011 Miller
2011/0093261 A1‡ 4/2011 Angott .................... G10L 15/10 704/20
2011/0093265 A1‡ 4/2011 Stent ....................... G10L 15/06 704/24
2011/0093271 A1‡ 4/2011 Bernard .................. G06F 40/30 704/25
2011/0093272 A1 4/2011 Isobe et al.
2011/0099000 A1‡ 4/2011 Rai ......................... G06F 40/53 704/2
2011/0099157 A1 4/2011 LeBeau et al.
2011/0102161 A1 5/2011 Heubel et al.
2011/0103682 A1‡ 5/2011 Chidlovskii ......... G06K 9/6284 382/15
2011/0105097 A1 5/2011 Tadayon et al.
2011/0106534 A1 5/2011 Lebeau et al.
2011/0106536 A1 5/2011 Klappert
2011/0106736 A1‡ 5/2011 Aharonson .......... G06Q 10/109 706/12
2011/0106878 A1 5/2011 Cho et al.
2011/0106892 A1‡ 5/2011 Nelson ................. G06Q 10/109 709/20
2011/0110502 A1‡ 5/2011 Daye ................... H04M 3/4936 379/88
2011/0111724 A1 5/2011 Baptiste
2011/0112825 A1 5/2011 Bellegarda
2011/0112827 A1‡ 5/2011 Kennewick ............ G10L 15/30 704/9
2011/0112837 A1‡ 5/2011 Kurki-Suonio ......... G10L 15/22 704/23
2011/0112838 A1 5/2011 Adibi
2011/0112921 A1‡ 5/2011 Kennewick ............. G10L 15/18 705/26
2011/0116480 A1 5/2011 Li et al.
2011/0116610 A1‡ 5/2011 Shaw ...................... H04W 4/18 379/88
2011/0119049 A1‡ 5/2011 Ylonen ................. G06F 40/211 704/9
2011/0119051 A1‡ 5/2011 Li ......................... G10L 15/065 704/10
2011/0119623 A1 5/2011 Kim
2011/0119713 A1 5/2011 Chang et al.
2011/0119715 A1‡ 5/2011 Chang .................... G08C 17/02 725/53
2011/0123004 A1‡ 5/2011 Chang ................... G06F 16/433 379/88
2011/0125498 A1‡ 5/2011 Pickering ............... G10L 15/22 704/24
2011/0125540 A1‡ 5/2011 Jang ...................... G06Q 10/10 705/7
2011/0125701 A1 5/2011 Nair et al.
2011/0130958 A1‡ 6/2011 Stahl .................... G06Q 21/362 701/53
2011/0131036 A1‡ 6/2011 DiCristo ................. G10L 15/22 704/9
2011/0131038 A1‡ 6/2011 Oyaizu ................... G10L 15/06 704/10
2011/0131045 A1‡ 6/2011 Cristo ..................... G10L 15/26 704/24
2011/0137636 A1‡ 6/2011 Srihari .................... G06F 40/53 704/2
2011/0137664 A1 6/2011 Kho et al.
2011/0141141 A1‡ 6/2011 Kankainen ......... G01C 21/3647 345/63
2011/0143718 A1 6/2011 Engelhart, Sr.
2011/0143726 A1 6/2011 de Silva
2011/0143811 A1‡ 6/2011 Rodriguez ......... G06K 9/00986 455/55
2011/0144857 A1‡ 6/2011 Wingrove ............. B60K 35/00 701/31
2011/0144901 A1‡ 6/2011 Wang ................ G01C 21/3629 701/53
2011/0144973 A1‡ 6/2011 Bocchieri .............. G06F 40/58 704/2
2011/0144999 A1‡ 6/2011 Jang .................. G06K 9/00892 704/27
2011/0145718 A1‡ 6/2011 Ketola .................. G06F 3/0346 715/73
2011/0151415 A1 6/2011 Darling et al.
2011/0151830 A1‡ 6/2011 Blanda, Jr. ............ H04W 24/02 455/40
2011/0153209 A1‡ 6/2011 Geelen ................... G08G 1/005 701/53
2011/0153322 A1‡ 6/2011 Kwak ..................... G10L 15/22 704/23
2011/0153324 A1‡ 6/2011 Ballinger ............. G10L 15/005 704/23
2011/0153325 A1 6/2011 Ballinger et al.
2011/0153329 A1 6/2011 Moorer
2011/0153330 A1‡ 6/2011 Yazdani .................. G10L 13/00 704/26
2011/0153373 A1‡ 6/2011 Dantzig ................. G06Q 10/02 705/5
2011/0154193 A1 6/2011 Creutz et al.
2011/0157029 A1‡ 6/2011 Tseng .................. G06F 3/04883 345/17
2011/0161072 A1 6/2011 Terao et al.
2011/0161076 A1‡ 6/2011 Davis .................. G06F 3/04842 704/23
2011/0161079 A1‡ 6/2011 Gruhn .................. G10L 15/193 704/23
2011/0161309 A1‡ 6/2011 Lung .................. G06F 16/9535 707/70
2011/0161852 A1‡ 6/2011 Vainio ................ G06F 3/04842 715/76
2011/0166851 A1 7/2011 LeBeau et al.

(56) References Cited

U.S. PATENT DOCUMENTS

2011/0166855 A1 7/2011 Vermeulen et al.
2011/0166862 A1 7/2011 Eshed et al.
2011/0167350 A1‡ 7/2011 Hoellwarth ........... G06F 3/0483 715/72
2011/0173003 A1 7/2011 Levanon et al.
2011/0173537 A1 7/2011 Hemphill
2011/0175810 A1‡ 7/2011 Markovic ............... G06F 3/011 345/15
2011/0178804 A1 7/2011 Inoue et al.
2011/0179002 A1‡ 7/2011 Dumitru ............... G06F 16/951 707/70
2011/0179372 A1‡ 7/2011 Moore .................. G06F 3/0237 715/77
2011/0183627 A1 7/2011 Ueda et al.
2011/0183650 A1‡ 7/2011 McKee ............ H04M 1/72519 455/41
2011/0184721 A1‡ 7/2011 Subramanian ...... G10L 19/0018 704/4
2011/0184730 A1‡ 7/2011 LeBeau ................... G10L 15/30 704/20
2011/0184736 A1 7/2011 Slotznick
2011/0184737 A1 7/2011 Nakano et al.
2011/0184768 A1 7/2011 Norton et al.
2011/0184789 A1 7/2011 Kirsch
2011/0185288 A1 7/2011 Gupta et al.
2011/0191108 A1 8/2011 Friedlander
2011/0191271 A1‡ 8/2011 Baker ................ G06F 3/04842 706/11
2011/0191344 A1‡ 8/2011 Jin .......................... G06F 16/00 707/73
2011/0195758 A1‡ 8/2011 Damale ............... H04M 1/6075 455/56
2011/0196670 A1 8/2011 Dang et al.
2011/0197128 A1‡ 8/2011 Assadollahi .......... G06F 40/274 715/25
2011/0199312 A1 8/2011 Okuta
2011/0201385 A1‡ 8/2011 Higginbotham ...... G10L 13/043 455/56
2011/0201387 A1‡ 8/2011 Paek ...................... G06N 20/00 455/56
2011/0202526 A1‡ 8/2011 Lee ..................... G06F 16/3344 707/72
2011/0202594 A1 8/2011 Ricci
2011/0202874 A1 8/2011 Ramer et al.
2011/0205149 A1‡ 8/2011 Tom .................. G06Q 30/0255 345/15
2011/0208511 A1‡ 8/2011 Sikstrom ................. G06F 40/30 704/9
2011/0208524 A1‡ 8/2011 Haughay ................. G10L 15/22 704/24
2011/0209088 A1‡ 8/2011 Hinckley ............. G06F 3/0488 715/81
2011/0212717 A1‡ 9/2011 Rhoads ............. G06K 9/00664 455/42
2011/0216093 A1 9/2011 Griffin
2011/0218806 A1‡ 9/2011 Alewine ................. G10L 13/08 704/25
2011/0218855 A1‡ 9/2011 Cao .................... G06Q 30/0251 705/14
2011/0219018 A1‡ 9/2011 Bailey ..................... G10L 15/10 707/76
2011/0223893 A1‡ 9/2011 Lau ......................... G10L 15/22 455/41
2011/0224972 A1‡ 9/2011 Millett .................... G06F 40/14 704/9
2011/0228913 A1‡ 9/2011 Cochinwala ...... H04M 3/42221 379/85
2011/0231182 A1‡ 9/2011 Weider .................... G10L 15/22 704/9
2011/0231184 A1‡ 9/2011 Kerr .................. H04M 1/72522 704/20
2011/0231188 A1‡ 9/2011 Kennewick ............. G10L 15/08 704/23
2011/0231218 A1 9/2011 Tovar
2011/0231432 A1‡ 9/2011 Sata ...................... G06F 40/242 707/76
2011/0231474 A1‡ 9/2011 Locker .................... G10L 15/26 709/20
2011/0238191 A1 9/2011 Kristjansson et al.
2011/0238407 A1‡ 9/2011 Kent ....................... G10L 13/06 704/3
2011/0238408 A1‡ 9/2011 Larcheveque .......... G06F 40/35 704/9
2011/0238676 A1‡ 9/2011 Liu .......................... G01S 5/02 707/75
2011/0239111 A1‡ 9/2011 Grover .................. G06F 40/232 715/25
2011/0242007 A1‡ 10/2011 Gray ..................... G06F 3/0488 345/17
2011/0244888 A1 10/2011 Ohki
2011/0246471 A1‡ 10/2011 Rakib .................... G11B 27/28 707/74
2011/0249144 A1‡ 10/2011 Chang .................. G11B 27/105 348/23
2011/0250570 A1‡ 10/2011 Mack ................ H04M 3/42093 434/16
2011/0252108 A1 10/2011 Morris et al.
2011/0257966 A1 10/2011 Rychlik
2011/0258188 A1‡ 10/2011 AbdAlmageed .... G06F 16/7844 707/73
2011/0260829 A1 10/2011 Lee
2011/0260861 A1‡ 10/2011 Singh ................... G06Q 10/109 340/53
2011/0264530 A1 10/2011 Santangelo et al.
2011/0264643 A1‡ 10/2011 Cao ........................ G06F 16/29 707/70
2011/0264999 A1 10/2011 Bells et al.
2011/0270604 A1 11/2011 Qi et al.
2011/0274303 A1‡ 11/2011 Filson .................... H04R 1/021 381/33
2011/0276595 A1 11/2011 Kirkland et al.
2011/0276598 A1‡ 11/2011 Kozempel ........... G06F 16/3344 707/77
2011/0276944 A1‡ 11/2011 Bergman ............ G06F 11/3684 717/12
2011/0279368 A1‡ 11/2011 Klein ...................... G06F 3/011 345/15
2011/0280143 A1 11/2011 Li et al.
2011/0282663 A1 11/2011 Talwar et al.
2011/0282888 A1‡ 11/2011 Koperski ............. G06F 16/951 707/75
2011/0282903 A1 11/2011 Zhang
2011/0282906 A1‡ 11/2011 Wong .................... G06F 16/434 707/78
2011/0283189 A1 11/2011 McCarty
2011/0283190 A1 11/2011 Poltorak
2011/0288852 A1 11/2011 Dymetman et al.
2011/0288855 A1 11/2011 Roy
2011/0288861 A1‡ 11/2011 Kurzweil ................. G09B 5/06 704/23
2011/0288863 A1 11/2011 Rasmussen
2011/0288866 A1 11/2011 Rasmussen
2011/0288917 A1 11/2011 Wanek et al.
2011/0289530 A1 11/2011 Dureau et al.
2011/0298585 A1‡ 12/2011 Barry ..................... G06F 21/32 340/5
2011/0301943 A1‡ 12/2011 Patch .................... G10L 15/265 704/9
2011/0302162 A1‡ 12/2011 Xiao ....................... G06F 16/29 707/72
2011/0302645 A1 12/2011 Headley
2011/0306426 A1‡ 12/2011 Novak ................... G06Q 30/02 463/42
2011/0307241 A1‡ 12/2011 Waibel .................... G06F 40/58 704/2
2011/0307254 A1 12/2011 Hunt et al.
2011/0307491 A1‡ 12/2011 Fisk .................... G06F 16/4393 707/74

(56) References Cited

U.S. PATENT DOCUMENTS

2011/0307810 A1‡ 12/2011 Hilerio .................. G06F 3/0481 715/76
2011/0313775 A1‡ 12/2011 Laligand ........ H04N 21/234336 704/27
2011/0313803 A1 12/2011 Friend et al.
2011/0314003 A1 12/2011 Ju et al.
2011/0314032 A1‡ 12/2011 Bennett ............... G06F 16/3344 707/74
2011/0314404 A1‡ 12/2011 Kotler .................. G06Q 10/109 715/77
2011/0314539 A1 12/2011 Horton
2011/0320187 A1‡ 12/2011 Motik ................. G06F 16/3329 704/9
2012/0002820 A1‡ 1/2012 Leichter .............. G10L 21/0208 381/73
2012/0005602 A1‡ 1/2012 Anttila .................. G06F 3/1431 715/76
2012/0008754 A1‡ 1/2012 Mukherjee .............. G10L 15/22 379/88
2012/0010886 A1‡ 1/2012 Razavilar .............. G10L 15/005 704/24
2012/0011138 A1‡ 1/2012 Dunning ................. G06F 16/68 707/75
2012/0013609 A1‡ 1/2012 Reponen ............... G06F 3/0346 345/41
2012/0015629 A1‡ 1/2012 Olsen ...................... G06F 21/35 455/41
2012/0016658 A1 1/2012 Wu et al.
2012/0016678 A1‡ 1/2012 Gruber ...................... G06F 9/54 704/27
2012/0019400 A1‡ 1/2012 Patel ...................... G08C 17/00 340/87
2012/0020490 A1‡ 1/2012 Leichter .............. G10L 21/0208 381/71
2012/0020503 A1 1/2012 Endo et al.
2012/0022787 A1‡ 1/2012 LeBeau ................... G06F 1/329 701/52
2012/0022857 A1‡ 1/2012 Baldwin ............. G10L 15/1815 704/9
2012/0022860 A1‡ 1/2012 Lloyd ..................... G10L 15/20 704/22
2012/0022868 A1‡ 1/2012 LeBeau ................... G10L 15/26 704/23
2012/0022869 A1‡ 1/2012 Lloyd ................... G10L 15/065 704/24
2012/0022870 A1‡ 1/2012 Kristjansson ....... G10L 21/0208 704/24
2012/0022872 A1‡ 1/2012 Gruber .................... G06F 40/35 704/27
2012/0022874 A1‡ 1/2012 Lloyd ..................... G10L 15/22 704/27
2012/0022876 A1‡ 1/2012 LeBeau .............. G01C 21/3661 704/27
2012/0022967 A1‡ 1/2012 Bachman ............... G06Q 30/02 705/26
2012/0023088 A1‡ 1/2012 Cheng ................... G06F 16/951 707/70
2012/0023095 A1‡ 1/2012 Wadycki ........... G06F 16/24578 707/72
2012/0023462 A1‡ 1/2012 Rosing .................. G06F 3/0483 715/86
2012/0026395 A1 2/2012 Jin et al.
2012/0029661 A1‡ 2/2012 Jones ................. G05B 19/0426 700/17
2012/0029910 A1‡ 2/2012 Medlock ............... G06F 3/0237 704/9
2012/0034904 A1‡ 2/2012 LeBeau ................... G10L 15/22 455/41
2012/0035907 A1‡ 2/2012 Lebeau ............. H04M 3/42348 704/2
2012/0035908 A1‡ 2/2012 Lebeau ................... G10L 13/00 704/2
2012/0035924 A1‡ 2/2012 Jitkoff ..................... G10L 15/30 704/23
2012/0035925 A1‡ 2/2012 Friend ..................... G06F 3/167 704/23
2012/0035926 A1‡ 2/2012 Ambler ................... G10L 15/26 704/23
2012/0035931 A1‡ 2/2012 LeBeau ................... G06F 3/167 704/25
2012/0035932 A1‡ 2/2012 Jitkoff ................. G10L 15/1815 704/25
2012/0035935 A1 2/2012 Park et al.
2012/0036556 A1‡ 2/2012 LeBeau ................. G06F 21/629 726/3
2012/0039539 A1‡ 2/2012 Boiman ................. G11B 27/28 382/19
2012/0039578 A1 2/2012 Issa et al.
2012/0041752 A1‡ 2/2012 Wang ...................... G06F 40/10 704/2
2012/0041756 A1 2/2012 Hanazawa et al.
2012/0041759 A1 2/2012 Barker et al.
2012/0042014 A1‡ 2/2012 Desai ................... G06Q 10/107 709/20
2012/0042343 A1‡ 2/2012 Laligand ........ H04N 21/234336 725/53
2012/0052945 A1 3/2012 Miyamoto et al.
2012/0053815 A1‡ 3/2012 Montanari .......... F02D 19/0684 701/10
2012/0053829 A1 3/2012 Agarwal et al.
2012/0053945 A1‡ 3/2012 Gupta ..................... G10L 15/22 704/25
2012/0056815 A1‡ 3/2012 Mehra ..................... G06F 3/018 345/16
2012/0059655 A1‡ 3/2012 Cartales .................. G10L 15/30 704/25
2012/0059813 A1 3/2012 Sejnoha et al.
2012/0060052 A1 3/2012 White et al.
2012/0062473 A1 3/2012 Xiao et al.
2012/0064975 A1 3/2012 Gault et al.
2012/0066212 A1 3/2012 Jennings
2012/0066581 A1‡ 3/2012 Spalink ................. G06F 40/169 715/23
2012/0075054 A1 3/2012 Ge et al.
2012/0075184 A1 3/2012 Madhvanath
2012/0077479 A1 3/2012 Sabotta et al.
2012/0078611 A1 3/2012 Soltani et al.
2012/0078624 A1‡ 3/2012 Yook ....................... G10L 25/78 704/23
2012/0078627 A1‡ 3/2012 Wagner ................. G06F 40/166 704/23
2012/0078635 A1 3/2012 Rothkopf et al.
2012/0078747 A1 3/2012 Chakrabarti et al.
2012/0082317 A1‡ 4/2012 Pance .................... H04R 7/045 381/59
2012/0083286 A1‡ 4/2012 Kim ................... G06Q 30/0261 455/45
2012/0084086 A1‡ 4/2012 Gilbert .................... G10L 15/32 704/23
2012/0084087 A1 4/2012 Yang et al.
2012/0084089 A1 4/2012 Lloyd et al.
2012/0084634 A1‡ 4/2012 Wong .................... G06F 40/169 715/23
2012/0088219 A1‡ 4/2012 Briscoe .................. G06N 20/00 434/36
2012/0089331 A1 4/2012 Schmidt et al.
2012/0089659 A1 4/2012 Halevi et al.
2012/0101823 A1 4/2012 Weng et al.
2012/0105257 A1 5/2012 Murillo et al.
2012/0108166 A1 5/2012 Hymel
2012/0108221 A1‡ 5/2012 Thomas ............ H04M 1/72522 455/41
2012/0109632 A1 5/2012 Sugiura et al.
2012/0109753 A1 5/2012 Kennewick et al.
2012/0109997 A1 5/2012 Sparks et al.
2012/0110456 A1 5/2012 Larco et al.
2012/0114108 A1 5/2012 Katis et al.
2012/0116770 A1‡ 5/2012 Chen .................. H04M 3/4938 704/27

(56) References Cited

U.S. PATENT DOCUMENTS

2012/0117499 A1‡ 5/2012 Mori ................ H04M 1/72583 715/76
2012/0117590 A1 5/2012 Agnihotri et al.
2012/0124126 A1‡ 5/2012 Alcazar .................. H04L 67/16 709/20
2012/0124177 A1 5/2012 Sparks
2012/0124178 A1 5/2012 Sparks
2012/0128322 A1‡ 5/2012 Shaffer ............... H04N 9/8205 386/24
2012/0130709 A1 5/2012 Bocchieri et al.
2012/0130995 A1 5/2012 Risvik et al.
2012/0135714 A1 5/2012 King, II
2012/0136529 A1 5/2012 Curtis et al.
2012/0136572 A1‡ 5/2012 Norton .............. G01C 21/3407 701/46
2012/0136649 A1 5/2012 Freising et al.
2012/0136855 A1 5/2012 Ni et al.
2012/0136985 A1‡ 5/2012 Popescu ................ G06Q 10/10 709/22
2012/0137367 A1‡ 5/2012 Dupont .................. G06F 21/00 726/25
2012/0149342 A1 6/2012 Cohen et al.
2012/0149394 A1‡ 6/2012 Singh ................... G01S 5/0252 455/45
2012/0150532 A1 6/2012 Mirowski et al.
2012/0150544 A1 6/2012 McLoughlin et al.
2012/0150580 A1‡ 6/2012 Norton .............. G01C 21/3407 705/7
2012/0158293 A1‡ 6/2012 Burnham .............. G01C 21/20 701/43
2012/0158399 A1 6/2012 Tremblay et al.
2012/0158422 A1‡ 6/2012 Burnham .............. G06Q 10/00 705/2
2012/0159380 A1‡ 6/2012 Kocienda ........... G06F 3/04886 715/78
2012/0163710 A1‡ 6/2012 Skaff ................... G06K 9/6226 382/16
2012/0166177 A1 6/2012 Beld et al.
2012/0166196 A1‡ 6/2012 Ju .......................... G10L 15/19 704/25
2012/0166429 A1 6/2012 Moore et al.
2012/0166942 A1 6/2012 Ramerth et al.
2012/0166959 A1 6/2012 Hilerio et al.
2012/0166998 A1 6/2012 Cotterill et al.
2012/0173222 A1 7/2012 Wang et al.
2012/0173244 A1 7/2012 Kwak et al.
2012/0173464 A1‡ 7/2012 Tur ....................... G06N 5/022 706/11
2012/0174121 A1‡ 7/2012 Treat ...................... G06F 9/542 719/31
2012/0176255 A1 7/2012 Choi et al.
2012/0179457 A1‡ 7/2012 Newman ................ G10L 15/30 704/20
2012/0179467 A1 7/2012 Williams et al.
2012/0179471 A1 7/2012 Newman et al.
2012/0185237 A1‡ 7/2012 Gajic ..................... G10L 15/07 704/8
2012/0185480 A1 7/2012 Ni et al.
2012/0185781 A1‡ 7/2012 Guzman .............. G06Q 10/107 715/75
2012/0191461 A1‡ 7/2012 Lin ........................ G06F 3/165 704/27
2012/0192096 A1‡ 7/2012 Bowman .............. G06F 3/0481 715/78
2012/0197743 A1‡ 8/2012 Grigg .................... G06Q 20/20 705/16
2012/0197995 A1‡ 8/2012 Caruso ................. G06F 16/137 709/20
2012/0197998 A1‡ 8/2012 Kessel ............... H04L 67/1095 709/20
2012/0201362 A1‡ 8/2012 Crossan ................. G10L 15/26 379/88
2012/0203767 A1 8/2012 Williams et al.
2012/0209454 A1 8/2012 Miller et al.
2012/0209654 A1 8/2012 Romagnino et al.
2012/0209853 A1‡ 8/2012 Desai ..................... G06F 16/93 707/74
2012/0209874 A1‡ 8/2012 Wong .............. H04N 21/25825 707/76
2012/0210266 A1 8/2012 Jiang et al.
2012/0210378 A1 8/2012 Mccoy et al.
2012/0214141 A1‡ 8/2012 Raya ....................... G09B 5/06 434/18
2012/0214517 A1‡ 8/2012 Singh .................. G06Q 10/109 455/45
2012/0215640 A1 8/2012 Ramer et al.
2012/0215762 A1‡ 8/2012 Hall ..................... G06F 16/972 707/71
2012/0221339 A1‡ 8/2012 Wang ..................... G10L 13/08 704/26
2012/0221552 A1‡ 8/2012 Reponen ............ G06F 16/9537 707/72
2012/0223889 A1‡ 9/2012 Medlock ............ G06F 3/04886 345/16
2012/0223936 A1‡ 9/2012 Aughey ................. G06T 19/00 345/41
2012/0232885 A1‡ 9/2012 Barbosa ............... G06F 40/242 704/9
2012/0232886 A1‡ 9/2012 Capuozzo .......... H04L 12/2814 704/9
2012/0232906 A1‡ 9/2012 Lindahl .................. G10L 15/30 704/27
2012/0233207 A1 9/2012 Mohajer
2012/0233266 A1 9/2012 Hassan et al.
2012/0233280 A1 9/2012 Ebara
2012/0239403 A1 9/2012 Cano et al.
2012/0239661 A1‡ 9/2012 Giblin .................... H04L 65/60 707/74
2012/0239761 A1 9/2012 Linner et al.
2012/0242482 A1‡ 9/2012 Elumalai ............. G06Q 10/109 340/53
2012/0245719 A1‡ 9/2012 Story, Jr. .............. G06F 3/0488 700/94
2012/0245939 A1 9/2012 Braho et al.
2012/0245941 A1‡ 9/2012 Cheyer .................. G06F 21/32 704/24
2012/0245944 A1‡ 9/2012 Gruber ................. G10L 15/183 704/27
2012/0246064 A1‡ 9/2012 Balkow ................. G06Q 40/02 705/39
2012/0250858 A1‡ 10/2012 Iqbal .................... G06F 9/4856 380/44
2012/0252367 A1‡ 10/2012 Gaglio ................... G10L 13/00 455/66
2012/0252540 A1‡ 10/2012 Kirigaya ............. H04M 1/6083 455/56
2012/0253785 A1 10/2012 Hamid et al.
2012/0253791 A1 10/2012 Heck et al.
2012/0254143 A1‡ 10/2012 Varma .................. G06F 16/243 707/70
2012/0254152 A1‡ 10/2012 Park ...................... G06Q 30/02 707/71
2012/0254290 A1‡ 10/2012 Naaman ................. H04L 67/34 709/20
2012/0259615 A1 10/2012 Morin et al.
2012/0262296 A1 10/2012 Bezar
2012/0265482 A1 10/2012 Grokop et al.
2012/0265528 A1‡ 10/2012 Gruber ................... G10L 15/18 704/235
2012/0265535 A1‡ 10/2012 Bryant-Rich et al. .......... 704/27
2012/0265787 A1 10/2012 Hsu et al.
2012/0265806 A1 10/2012 Blanchflower et al.
2012/0271625 A1‡ 10/2012 Bernard ............. G06F 16/3329 704/9
2012/0271634 A1‡ 10/2012 Lenke
2012/0271635 A1‡ 10/2012 Ljolje .................. G10L 15/063
2012/0271640 A1‡ 10/2012 Basir .................. H04M 1/6075
2012/0271676 A1‡ 10/2012 Aravamudan et al.
2012/0275377 A1‡ 11/2012 Lehane et al.
2012/0278744 A1 11/2012 Kozitsyn et al.

(56) References Cited

U.S. PATENT DOCUMENTS

2012/0278812 A1 11/2012 Wang
2012/0284015 A1 11/2012 Drewes
2012/0284027 A1‡ 11/2012 Mallett et al.
2012/0290291 A1 11/2012 Shelley et al.
2012/0290300 A1‡ 11/2012 Lee .................... G09B 19/06 704/23
2012/0290657 A1 11/2012 Parks et al.
2012/0295708 A1‡ 11/2012 Hernandez-Abrego .................... A63F 3/167 463/36
2012/0296638 A1 11/2012 Patwa
2012/0296649 A1‡ 11/2012 Bansal .................... G10L 17/24 704/24
2012/0296654 A1‡ 11/2012 Hendrickson ........... G10L 13/02 704/26
2012/0296891 A1‡ 11/2012 Rangan ............... G06F 16/3347 707/72
2012/0297341 A1 11/2012 Glazer et al.
2012/0297348 A1‡ 11/2012 Santoro ............... G06F 3/04883 715/86
2012/0303369 A1‡ 11/2012 Brush ..................... G10L 17/02 704/24
2012/0303371 A1 11/2012 Labsky et al.
2012/0304124 A1‡ 11/2012 Chen ..................... G06F 3/0236 715/82
2012/0304239 A1 11/2012 Shahraray et al.
2012/0309363 A1‡ 12/2012 Gruber ................. G06Q 10/109 455/41
2012/0310642 A1‡ 12/2012 Cao ........................ G10L 15/19 704/23
2012/0310649 A1‡ 12/2012 Cannistraro ............ G10L 15/19 704/26
2012/0310652 A1‡ 12/2012 O'Sullivan ............. G06F 3/167 704/27
2012/0310922 A1 12/2012 Johnson et al.
2012/0311478 A1‡ 12/2012 van Os ................. G06F 3/0488 715/78
2012/0311583 A1‡ 12/2012 Gruber et al. ....... G06Q 10/109 718/10
2012/0311584 A1‡ 12/2012 Gruber ................. G06Q 10/109 718/10
2012/0311585 A1‡ 12/2012 Gruber ................. G06Q 10/109 718/10
2012/0316774 A1 12/2012 Yariv et al.
2012/0316862 A1 12/2012 Sultan et al.
2012/0316875 A1 12/2012 Nyquist et al.
2012/0316878 A1‡ 12/2012 Singleton ................ G10L 15/19 704/25
2012/0316955 A1 12/2012 Panguluri et al.
2012/0317194 A1‡ 12/2012 Tian ...................... H04W 8/005 709/20
2012/0317498 A1‡ 12/2012 Logan ..................... H04L 51/24 715/75
2012/0321112 A1‡ 12/2012 Schubert ................ H04R 25/43 381/31
2012/0323560 A1 12/2012 Perez Cortes et al.
2012/0324391 A1‡ 12/2012 Tocci ...................... G06F 3/048 715/77
2012/0327009 A1‡ 12/2012 Fleizach ............. G06F 3/04883 345/17
2012/0329529 A1 12/2012 van der Raadt
2012/0330660 A1‡ 12/2012 Jaiswal ................... G10L 15/26 704/23
2012/0330661 A1‡ 12/2012 Lindahl ................... G10L 15/30 704/23
2012/0330990 A1‡ 12/2012 Chen ................... G06F 16/3322 707/76
2013/0002716 A1 1/2013 Walker et al.
2013/0005405 A1‡ 1/2013 Prociw .............. H04M 1/72563 455/56
2013/0006633 A1‡ 1/2013 Grokop ................. G10L 15/063 704/24
2013/0006637 A1‡ 1/2013 Kanevsky ........... G10L 15/1822 704/25
2013/0006638 A1‡ 1/2013 Lindahl ................... G10L 15/30 704/25
2013/0007240 A1 1/2013 Qiu et al.
2013/0007648 A1‡ 1/2013 Gamon ................ G06Q 10/109 715/77
2013/0009858 A1 1/2013 Lacey
2013/0010575 A1 1/2013 He et al.
2013/0013313 A1‡ 1/2013 Shechtman ........... G10L 13/033 704/26
2013/0013319 A1 1/2013 Grant et al.
2013/0014026 A1 1/2013 Beringer et al.
2013/0018659 A1‡ 1/2013 Chi ......................... G06F 1/163 704/27
2013/0018863 A1 1/2013 Regan et al.
2013/0024277 A1 1/2013 Tuchman et al.
2013/0024576 A1 1/2013 Dishneau et al.
2013/0027875 A1‡ 1/2013 Zhu ...................... H05K 7/1487 361/67
2013/0028404 A1 1/2013 Omalley et al.
2013/0030787 A1 1/2013 Cancedda et al.
2013/0030789 A1 1/2013 Dalce
2013/0030804 A1‡ 1/2013 Zavaliagkos ........... G10L 15/26 704/23
2013/0030815 A1‡ 1/2013 Madhvanath ........... G06F 3/038 704/27
2013/0030904 A1 1/2013 Aidasani et al.
2013/0030913 A1 1/2013 Zhu et al.
2013/0030955 A1 1/2013 David
2013/0031162 A1 1/2013 Willis et al.
2013/0031476 A1 1/2013 Coin et al.
2013/0033643 A1 2/2013 Kim et al.
2013/0035086 A1 2/2013 Chardon et al.
2013/0035942 A1‡ 2/2013 Kim ........................ G06F 3/167 704/27
2013/0035961 A1‡ 2/2013 Yegnanarayanan .... G16H 10/60 705/3
2013/0041647 A1‡ 2/2013 Ramerth ................. G06F 40/53 704/2
2013/0041654 A1‡ 2/2013 Walker .................. G10L 13/027 704/9
2013/0041661 A1‡ 2/2013 Lee ........................ G10L 15/26 704/23
2013/0041665 A1 2/2013 Jang et al.
2013/0041667 A1 2/2013 Longe et al.
2013/0041968 A1‡ 2/2013 Cohen ..................... H04L 51/24 709/20
2013/0046544 A1 2/2013 Kay et al.
2013/0047178 A1 2/2013 Moon et al.
2013/0050089 A1 2/2013 Neels et al.
2013/0054550 A1‡ 2/2013 Bolohan ............. H04L 29/0854 707/70
2013/0054609 A1‡ 2/2013 Rajput .................. G06F 16/683 707/74
2013/0054613 A1‡ 2/2013 Bishop .................... G06F 16/93 707/74
2013/0054631 A1 2/2013 Govani et al.
2013/0054675 A1 2/2013 Jenkins et al.
2013/0054706 A1‡ 2/2013 Graham ................ H04M 19/04 709/20
2013/0055099 A1‡ 2/2013 Yao ...................... G06Q 10/101 715/73
2013/0055147 A1‡ 2/2013 Vasudev .................. G06F 8/38 715/78
2013/0060571 A1 3/2013 Soemo et al.
2013/0061139 A1 3/2013 Mahkovec et al.
2013/0063611 A1 3/2013 Papakipos et al.
2013/0066832 A1‡ 3/2013 Sheehan et al. ....... G06Q 10/00 707/63
2013/0067307 A1‡ 3/2013 Tian ........................ G06F 40/58 715/22
2013/0067312 A1 3/2013 Rose
2013/0067421 A1 3/2013 Osman et al.
2013/0069769 A1 3/2013 Pennington et al.
2013/0073286 A1‡ 3/2013 Bastea-Forte ........... G10L 15/22 704/24

(56) References Cited

U.S. PATENT DOCUMENTS

2013/0073293 A1 3/2013 Jang et al.
2013/0073346 A1 3/2013 Chun et al.
2013/0073580 A1 3/2013 Mehanna et al.
2013/0073676 A1* 3/2013 Cockcroft ........... G06F 16/9566 709/217
2013/0078930 A1 3/2013 Chen et al.
2013/0080152 A1‡ 3/2013 Brun .................. G06F 16/3344 704/9
2013/0080162 A1‡ 3/2013 Chang ..................... G10L 15/34 704/23
2013/0080167 A1‡ 3/2013 Mozer ..................... G10L 17/22 704/24
2013/0080177 A1‡ 3/2013 Chen ....................... G10L 15/26 704/27
2013/0080178 A1 3/2013 Kang et al.
2013/0080251 A1 3/2013 Dempski
2013/0082967 A1 4/2013 Hillis et al.
2013/0085755 A1‡ 4/2013 Bringert .................. G10L 15/28 704/23
2013/0085761 A1‡ 4/2013 Bringert .................. G06F 3/167 704/27
2013/0086609 A1 4/2013 Levy et al.
2013/0090921 A1‡ 4/2013 Liu ......................... G10L 15/22 704/10
2013/0091090 A1‡ 4/2013 Spivack ................ G06F 16/958 707/60
2013/0095805 A1‡ 4/2013 LeBeau ................... G10L 17/22 455/41
2013/0096909 A1 4/2013 Brun et al.
2013/0096911 A1 4/2013 Beaufort et al.
2013/0096917 A1 4/2013 Edgar et al.
2013/0097566 A1‡ 4/2013 Berglund .............. G06F 3/0482 715/86
2013/0097682 A1 4/2013 Zeljkovic et al.
2013/0100017 A1 4/2013 Papakipos et al.
2013/0100268 A1 4/2013 Mihailidis et al.
2013/0103391 A1‡ 4/2013 Millmore ............... G06Q 10/06 704/9
2013/0103405 A1 4/2013 Namba et al.
2013/0106742 A1‡ 5/2013 Lee ....................... G06F 3/0484 345/17
2013/0107053 A1 5/2013 Ozaki
2013/0110505 A1‡ 5/2013 Gruber .................... G10L 13/08 704/9
2013/0110515 A1‡ 5/2013 Guzzoni ................. G10L 21/06 704/27
2013/0110518 A1‡ 5/2013 Gruber ................ G06F 16/3344 704/27
2013/0110519 A1‡ 5/2013 Cheyer ................. G06F 40/279 704/27
2013/0110520 A1‡ 5/2013 Cheyer ................. G06F 40/279 704/27
2013/0110943 A1 5/2013 Menon et al.
2013/0111330 A1 5/2013 Staikos et al.
2013/0111348 A1‡ 5/2013 Gruber .................... G10L 13/08 715/72
2013/0111365 A1 5/2013 Chen et al.
2013/0111487 A1‡ 5/2013 Cheyer ..................... G06F 9/54 718/10
2013/0111581 A1 5/2013 Griffin et al.
2013/0115927 A1‡ 5/2013 Gruber .................... H04W 4/16 455/41
2013/0117022 A1‡ 5/2013 Chen ....................... G10L 13/02 704/23
2013/0124189 A1‡ 5/2013 Baldwin ................. G06F 40/20 704/9
2013/0124672 A1 5/2013 Pan
2013/0125168 A1 5/2013 Agnihotri et al.
2013/0132081 A1 5/2013 Ryu et al.
2013/0132084 A1 5/2013 Stonehocker et al.
2013/0132089 A1 5/2013 Fanty et al.
2013/0132871 A1‡ 5/2013 Zeng ....................... G06F 3/018 715/76
2013/0138440 A1 5/2013 Strope et al.
2013/0141551 A1 6/2013 Kim
2013/0142317 A1 6/2013 Reynolds
2013/0142345 A1 6/2013 Waldmann
2013/0144594 A1‡ 6/2013 Bangalore ........... G06F 3/04842 704/2
2013/0144616 A1‡ 6/2013 Bangalore ............. G10L 15/075 704/22
2013/0151339 A1‡ 6/2013 Kim ....................... G06Q 30/02 705/14
2013/0152092 A1‡ 6/2013 Yadgar ................ H04M 3/4936 718/10
2013/0154811 A1 6/2013 Ferren et al.
2013/0155948 A1 6/2013 Pinheiro et al.
2013/0156198 A1 6/2013 Kim et al.
2013/0157629 A1 6/2013 Lee et al.
2013/0158977 A1‡ 6/2013 Senior ..................... G10L 25/60 704/9
2013/0159847 A1 6/2013 Banke et al.
2013/0159861 A1 6/2013 Rottler et al.
2013/0165232 A1‡ 6/2013 Nelson ................ G07F 17/3218 463/42
2013/0166278 A1 6/2013 James et al.
2013/0166303 A1 6/2013 Chang et al.
2013/0166332 A1 6/2013 Hammad
2013/0166442 A1‡ 6/2013 Nakajima .............. G06Q 30/06 705/39
2013/0167242 A1 6/2013 Paliwal
2013/0170738 A1‡ 7/2013 Capuozzo .......... G06K 9/00677 382/15
2013/0172022 A1‡ 7/2013 Seymour ............... H04M 19/04 455/45
2013/0173258 A1 7/2013 Liu et al.
2013/0173268 A1 7/2013 Weng et al.
2013/0173513 A1 7/2013 Chu et al.
2013/0174034 A1 7/2013 Brown et al.
2013/0176147 A1 7/2013 Anderson et al.
2013/0176244 A1 7/2013 Yamamoto et al.
2013/0176592 A1‡ 7/2013 Sasaki ................... G06F 3/1296 358/1
2013/0179168 A1 7/2013 Bae et al.
2013/0179172 A1 7/2013 Nakamura et al.
2013/0179440 A1‡ 7/2013 Gordon .................. G06Q 10/06 707/73
2013/0183942 A1 7/2013 Novick et al.
2013/0183944 A1 7/2013 Mozer et al.
2013/0185059 A1‡ 7/2013 Riccardi ................. G10L 15/02 704/9
2013/0185066 A1 7/2013 Tzirkel-hancock et al.
2013/0185074 A1‡ 7/2013 Gruber ...................... G06F 9/54 704/25
2013/0185081 A1‡ 7/2013 Cheyer ................... G06F 40/40 704/27
2013/0185336 A1‡ 7/2013 Singh .................... G06F 16/338 707/79
2013/0187850 A1 7/2013 Schulz et al.
2013/0187857 A1 7/2013 Griffin et al.
2013/0190021 A1 7/2013 Vieri et al.
2013/0191117 A1‡ 7/2013 Atti ......................... G10L 25/84 704/22
2013/0191408 A1 7/2013 Volkert
2013/0197911 A1‡ 8/2013 Wei ....................... G10L 15/265 704/23
2013/0197914 A1 8/2013 Yelvington et al.
2013/0198159 A1 8/2013 Hendry
2013/0198841 A1 8/2013 Poulson
2013/0204813 A1 8/2013 Master et al.
2013/0204897 A1 8/2013 McDougall
2013/0204967 A1 8/2013 Seo et al.
2013/0207898 A1 8/2013 Sullivan et al.
2013/0210410 A1 8/2013 Xu
2013/0210492 A1 8/2013 You et al.
2013/0218553 A1‡ 8/2013 Fujii ....................... G10L 15/26 704/9
2013/0218560 A1‡ 8/2013 Hsiao .................. G10L 21/0205 704/23
2013/0218574 A1 8/2013 Falcon et al.

(56) References Cited

U.S. PATENT DOCUMENTS

2013/0218899 A1 8/2013 Raghavan et al.
2013/0219333 A1 8/2013 Palwe et al.
2013/0222249 A1 8/2013 Pasquero et al.
2013/0225128 A1‡ 8/2013 Gomar .................. G10L 17/005 455/41
2013/0226935 A1 8/2013 Bai et al.
2013/0231917 A1‡ 9/2013 Naik ..................... G10L 13/086 704/9
2013/0234947 A1 9/2013 Kristensson et al.
2013/0235987 A1‡ 9/2013 Arroniz-Escobar ........................ H04M 1/2757 379/93
2013/0238326 A1 9/2013 Kim et al.
2013/0238647 A1‡ 9/2013 Thompson ............. G06Q 10/06 707/75
2013/0238729 A1 9/2013 Holzman et al.
2013/0244615 A1‡ 9/2013 Miller ................... H04W 12/06 455/41
2013/0246048 A1‡ 9/2013 Nagase ................. G06F 40/129 704/9
2013/0246050 A1 9/2013 Yu et al.
2013/0246329 A1 9/2013 Pasquero et al.
2013/0253911 A1‡ 9/2013 Petri ....................... G06F 9/454 704/9
2013/0253912 A1‡ 9/2013 Medlock ............... G06F 40/205 704/9
2013/0262168 A1 10/2013 Makanawala et al.
2013/0268263 A1 10/2013 Park et al.
2013/0268956 A1 10/2013 Recco
2013/0275117 A1‡ 10/2013 Winer ..................... G06F 40/53 704/3
2013/0275138 A1 10/2013 Gruber et al.
2013/0275164 A1‡ 10/2013 Gruber .................... G10L 17/22 705/5
2013/0275199 A1 10/2013 Proctor, Jr. et al.
2013/0275625 A1 10/2013 Taivalsaari et al.
2013/0275875 A1‡ 10/2013 Gruber .................... G06F 3/167 715/72
2013/0275899 A1‡ 10/2013 Schubert ............... G06F 3/0481 715/76
2013/0279724 A1 10/2013 Stafford et al.
2013/0282709 A1 10/2013 Zhu et al.
2013/0283168 A1‡ 10/2013 Brown .................... G06F 3/165 715/72
2013/0283199 A1 10/2013 Selig et al.
2013/0283283 A1 10/2013 Wang et al.
2013/0285913 A1 10/2013 Griffin et al.
2013/0289991 A1‡ 10/2013 Eshwar ............... G06F 16/9574 704/24
2013/0289993 A1‡ 10/2013 Rao ....................... G06F 40/274 704/25
2013/0289994 A1‡ 10/2013 Newman ........... H04M 1/72519 704/25
2013/0291015 A1 10/2013 Pan
2013/0297198 A1 11/2013 Velde et al.
2013/0297317 A1 11/2013 Lee et al.
2013/0297319 A1‡ 11/2013 Kim ........................ G10L 15/22 704/27
2013/0297348 A1‡ 11/2013 Cardoza ................. G16H 10/60 705/3
2013/0300645 A1 11/2013 Fedorov
2013/0300648 A1 11/2013 Kim et al.
2013/0303106 A1 11/2013 Martin
2013/0304479 A1‡ 11/2013 Teller ...................... G06F 3/013 704/27
2013/0304758 A1‡ 11/2013 Gruber ................ G06F 16/9535 707/76
2013/0304815 A1‡ 11/2013 Puente .................... H04L 67/10 709/20
2013/0305119 A1 11/2013 Kern et al.
2013/0307855 A1‡ 11/2013 Lamb ................... H04N 13/344 345/47
2013/0307997 A1‡ 11/2013 O'Keefe ................. H04L 51/10 348/20
2013/0308922 A1‡ 11/2013 Sano .................. H04N 21/4316 386/24
2013/0311179 A1 11/2013 Wagner
2013/0311184 A1 11/2013 Badavne et al.
2013/0311487 A1 11/2013 Moore et al.
2013/0311997 A1 11/2013 Gruber et al.
2013/0315038 A1 11/2013 Ferren et al.
2013/0316679 A1 11/2013 Miller et al.
2013/0316746 A1 11/2013 Miller et al.
2013/0317921 A1 11/2013 Havas
2013/0321267 A1 12/2013 Bhatti et al.
2013/0322634 A1‡ 12/2013 Bennett ................... G10L 21/00 381/17
2013/0322665 A1 12/2013 Bennett et al.
2013/0325340 A1 12/2013 Forstall et al.
2013/0325436 A1 12/2013 Wang et al.
2013/0325443 A1‡ 12/2013 Begeja .................. G10L 15/063 704/9
2013/0325447 A1 12/2013 Levien et al.
2013/0325448 A1‡ 12/2013 Levien .................... G10L 19/00 704/20
2013/0325480 A1 12/2013 Lee et al.
2013/0325481 A1‡ 12/2013 van Os ................... G10L 21/00 704/27
2013/0325484 A1‡ 12/2013 Chakladar ............... G10L 15/22 704/27
2013/0325967 A1 12/2013 Parks et al.
2013/0325970 A1 12/2013 Roberts et al.
2013/0325979 A1‡ 12/2013 Mansfield ............... H04L 51/32 709/20
2013/0328809 A1 12/2013 Smith
2013/0329023 A1‡ 12/2013 Suplee, III ........... G06K 9/2081 348/61
2013/0331127 A1 12/2013 Sabatelli et al.
2013/0332159 A1 12/2013 Federighi et al.
2013/0332162 A1 12/2013 Keen
2013/0332164 A1‡ 12/2013 Nalk ..................... G10L 15/187 704/24
2013/0332168 A1‡ 12/2013 Kim ...................... G06F 16/632 704/25
2013/0332172 A1 12/2013 Prakash et al.
2013/0332400 A1‡ 12/2013 Gonzalez ................ G06F 16/48 706/12
2013/0332538 A1 12/2013 Clark et al.
2013/0339256 A1 12/2013 Shroff
2013/0339991 A1 12/2013 Ricci
2013/0342672 A1 12/2013 Gray et al.
2013/0343584 A1 12/2013 Bennett et al.
2013/0343721 A1 12/2013 Abecassis
2013/0346065 A1 12/2013 Davidson et al.
2013/0346068 A1‡ 12/2013 Solem ................. G06F 16/5866 704/9
2013/0346347 A1 12/2013 Patterson et al.
2013/0347018 A1 12/2013 Limp et al.
2013/0347029 A1 12/2013 Tang et al.
2013/0347102 A1 12/2013 Shi
2013/0347117 A1 12/2013 Parks et al.
2014/0001255 A1 1/2014 Anthoine
2014/0006012 A1‡ 1/2014 Zhou ................... G06F 16/3344 704/9
2014/0006025 A1‡ 1/2014 Krishnan ................ G10L 17/00 704/24
2014/0006027 A1‡ 1/2014 Kim ........................ G10L 15/22 704/24
2014/0006030 A1 1/2014 Fleizach et al.
2014/0006153 A1‡ 1/2014 Thangam ........... G06Q 30/0271 705/14
2014/0006483 A1 1/2014 Garmark et al.
2014/0006496 A1 1/2014 Dearman et al.
2014/0006562 A1 1/2014 Handa et al.
2014/0006947 A1 1/2014 Garmark et al.
2014/0006955 A1 1/2014 Greenzeiger et al.
2014/0008163 A1 1/2014 Mikonaho et al.
2014/0012574 A1 1/2014 Pasupalak et al.
2014/0012580 A1‡ 1/2014 Ganong, III ........ G10L 15/1815 704/25

(56) References Cited

U.S. PATENT DOCUMENTS

2014/0012586 A1 1/2014 Rubin et al.
2014/0012587 A1 1/2014 Park
2014/0019116 A1‡ 1/2014 Lundberg ................ G06F 40/58 704/8
2014/0019133 A1‡ 1/2014 Bao ....................... G06F 40/279 704/25
2014/0019460 A1 1/2014 Sambrani et al.
2014/0028029 A1 1/2014 Jochman
2014/0028477 A1 1/2014 Michalske
2014/0028735 A1‡ 1/2014 Williams ............... G09G 3/344 345/69
2014/0032453 A1 1/2014 Eustice et al.
2014/0033071 A1‡ 1/2014 Gruber ............... G06Q 10/1097 715/75
2014/0035823 A1 2/2014 Khoe et al.
2014/0037075 A1 2/2014 Bouzid et al.
2014/0039888 A1 2/2014 Taubman et al.
2014/0039893 A1 2/2014 Weiner et al.
2014/0039894 A1‡ 2/2014 Shostak .................. G10L 15/04 704/25
2014/0040274 A1‡ 2/2014 Aravamudan ........ G06F 16/367 707/74
2014/0040748 A1‡ 2/2014 Lemay .................... G06F 3/167 715/72
2014/0040754 A1 2/2014 Donelli
2014/0040801 A1 2/2014 Patel et al.
2014/0040918 A1‡ 2/2014 Li ..................... H04M 1/72522 719/31
2014/0040961 A1 2/2014 Green et al.
2014/0046934 A1 2/2014 Zhou et al.
2014/0047001 A1 2/2014 Phillips et al.
2014/0052451 A1 2/2014 Cheong et al.
2014/0052680 A1 2/2014 Nitz et al.
2014/0052791 A1‡ 2/2014 Chakra ................... H04L 51/12 709/20
2014/0053082 A1‡ 2/2014 Park ........................ H04L 51/22 715/75
2014/0053101 A1 2/2014 Buehler et al.
2014/0053210 A1 2/2014 Cheong et al.
2014/0057610 A1 2/2014 Olincy et al.
2014/0059030 A1‡ 2/2014 Hakkani-Tur .... G06F 16/24522 707/70
2014/0067361 A1 3/2014 Nikoulina et al.
2014/0067371 A1‡ 3/2014 Liensberger .......... G06F 40/242 704/9
2014/0067402 A1 3/2014 Kim
2014/0067738 A1 3/2014 Kingsbury
2014/0068751 A1‡ 3/2014 Last ........................ G06F 21/35 726/16
2014/0074454 A1 3/2014 Brown et al.
2014/0074466 A1 3/2014 Sharifi et al.
2014/0074470 A1‡ 3/2014 Jansche ................. G10L 15/187 704/24
2014/0074472 A1‡ 3/2014 Lin ........................ G08C 17/02 704/24
2014/0074483 A1 3/2014 Van Os
2014/0074589 A1 3/2014 Nielsen et al.
2014/0074815 A1‡ 3/2014 Plimton ................ G06F 16/951 707/70
2014/0075453 A1 3/2014 Bellessort et al.
2014/0078065 A1‡ 3/2014 Akkok ................ G06F 3/04886 345/16
2014/0079195 A1 3/2014 Srivastava et al.
2014/0080410 A1 3/2014 Jung et al.
2014/0080428 A1‡ 3/2014 Rhoads ................... H04W 4/70 455/88
2014/0081619 A1‡ 3/2014 Solntseva ............ G06F 17/289 704/3
2014/0081633 A1‡ 3/2014 Badaskar ................ G10L 15/26 704/23
2014/0081635 A1 3/2014 Yanagihara
2014/0081829 A1 3/2014 Milne
2014/0081941 A1 3/2014 Bai et al.
2014/0082500 A1 3/2014 Wilensky et al.
2014/0082501 A1‡ 3/2014 Bae ......................... G06F 3/167 715/72
2014/0082715 A1 3/2014 Grajek et al.
2014/0086458 A1‡ 3/2014 Rogers .................... G10L 15/00 382/11
2014/0087711 A1‡ 3/2014 Geyer ................... H04W 4/021 455/41
2014/0088952 A1 3/2014 Fife et al.
2014/0088961 A1 3/2014 Woodward et al.
2014/0088964 A1 3/2014 Bellegarda
2014/0088970 A1 3/2014 Kang
2014/0095171 A1‡ 4/2014 Lynch ..................... G10L 17/22 704/27
2014/0095172 A1 4/2014 Cabaco et al.
2014/0095173 A1 4/2014 Lynch et al.
2014/0095601 A1 4/2014 Abuelsaad et al.
2014/0095965 A1 4/2014 Li
2014/0096209 A1 4/2014 Saraf et al.
2014/0098247 A1‡ 4/2014 Rao ......................... H04W 4/20 348/20
2014/0100847 A1 4/2014 Ishii et al.
2014/0101127 A1 4/2014 Simhon et al.
2014/0104175 A1 4/2014 Ouyang et al.
2014/0108017 A1‡ 4/2014 Mason .................... G10L 13/00 704/27
2014/0108391 A1 4/2014 Volkert
2014/0112556 A1 4/2014 Kalinli-akbacak
2014/0114554 A1 4/2014 Lagassey
2014/0115062 A1 4/2014 Liu et al.
2014/0115114 A1 4/2014 Garmark et al.
2014/0118155 A1‡ 5/2014 Bowers ................. G06F 11/328 340/81
2014/0118624 A1 5/2014 Jang et al.
2014/0122059 A1 5/2014 Patel et al.
2014/0122085 A1 5/2014 Piety et al.
2014/0122086 A1‡ 5/2014 Kapur ..................... G06F 3/017 704/27
2014/0122136 A1 5/2014 Jayanthi
2014/0122153 A1 5/2014 Truitt
2014/0129226 A1 5/2014 Lee et al.
2014/0132935 A1 5/2014 Kim et al.
2014/0134983 A1 5/2014 Jung et al.
2014/0135036 A1‡ 5/2014 Bonanni ............... H04W 4/023 455/45
2014/0136013 A1 5/2014 Wolverton et al.
2014/0136187 A1‡ 5/2014 Wolverton .............. G10L 15/22 704/9
2014/0136195 A1‡ 5/2014 Abdossalami .......... G10L 15/26 704/23
2014/0136212 A1‡ 5/2014 Kwon ..................... G10L 15/22 704/27
2014/0136946 A1‡ 5/2014 Matas ................. G06F 3/04842 715/23
2014/0136987 A1 5/2014 Rodriguez
2014/0142922 A1 5/2014 Liang et al.
2014/0142923 A1‡ 5/2014 Jones .................... G06F 40/274 704/9
2014/0142935 A1 5/2014 Lindahl et al.
2014/0142953 A1 5/2014 Kim et al.
2014/0143550 A1 5/2014 Ganong, III et al.
2014/0143721 A1‡ 5/2014 Suzuki ................. G06K 9/2063 715/81
2014/0146200 A1‡ 5/2014 Scott ........................ G06K 9/34 348/23
2014/0149118 A1 5/2014 Lee et al.
2014/0152577 A1‡ 6/2014 Yuen ................. H04M 1/72569 345/17
2014/0153709 A1 6/2014 Byrd et al.
2014/0155031 A1‡ 6/2014 Lee ......................... H04W 4/20 455/41
2014/0156262 A1 6/2014 Yuen et al.
2014/0156279 A1 6/2014 Okamoto et al.
2014/0157319 A1 6/2014 Kimura et al.
2014/0157422 A1‡ 6/2014 Livshits .............. G06F 21/6245 726/26

(56) References Cited

U.S. PATENT DOCUMENTS

2014/0163951 A1‡ 6/2014 Nikoulina ............... G06F 40/42 704/4
2014/0163953 A1 6/2014 Parikh
2014/0163954 A1 6/2014 Joshi et al.
2014/0163962 A1 6/2014 Castelli et al.
2014/0163976 A1 6/2014 Park et al.
2014/0163977 A1 6/2014 Hoffmeister et al.
2014/0163981 A1 6/2014 Cook et al.
2014/0163995 A1 6/2014 Burns et al.
2014/0164305 A1 6/2014 Lynch et al.
2014/0164312 A1 6/2014 Lynch et al.
2014/0164476 A1 6/2014 Thomson
2014/0164508 A1‡ 6/2014 Lynch ............... H04L 29/08081 709/20
2014/0164532 A1‡ 6/2014 Lynch ................ H04L 12/1818 709/20
2014/0164533 A1 6/2014 Lynch et al.
2014/0164953 A1 6/2014 Lynch et al.
2014/0169795 A1 6/2014 Clough
2014/0171064 A1 6/2014 Das
2014/0172878 A1 6/2014 Clark et al.
2014/0173460 A1 6/2014 Kim
2014/0176814 A1 6/2014 Ahn
2014/0179295 A1 6/2014 Luebbers et al.
2014/0180499 A1 6/2014 Cooper et al.
2014/0180689 A1‡ 6/2014 Kim ........................ G10L 15/32 704/24
2014/0180697 A1 6/2014 Torok et al.
2014/0181865 A1 6/2014 Koganei
2014/0188460 A1 7/2014 Ouyang et al.
2014/0188477 A1‡ 7/2014 Zhang ..................... G10L 15/22 704/25
2014/0188478 A1 7/2014 Zhang
2014/0188485 A1 7/2014 Kim et al.
2014/0188835 A1 7/2014 Zhang et al.
2014/0195226 A1 7/2014 Yun et al.
2014/0195230 A1 7/2014 Han et al.
2014/0195233 A1 7/2014 Bapat et al.
2014/0195244 A1 7/2014 Cha et al.
2014/0195251 A1‡ 7/2014 Zeinstra .................. G10L 15/22 704/27
2014/0195252 A1‡ 7/2014 Gruber .................... G10L 15/22 704/27
2014/0198048 A1 7/2014 Unruh et al.
2014/0203939 A1‡ 7/2014 Harrington ............ H05B 45/20 340/58
2014/0205076 A1 7/2014 Kumar et al.
2014/0207439 A1 7/2014 Venkatapathy et al.
2014/0207446 A1 7/2014 Klein et al.
2014/0207447 A1 7/2014 Jiang et al.
2014/0207466 A1 7/2014 Smadi
2014/0207468 A1 7/2014 Bartnik
2014/0207582 A1‡ 7/2014 Flinn .................. G06Q 30/0255 705/14
2014/0211944 A1 7/2014 Hayward et al.
2014/0214429 A1 7/2014 Pantel
2014/0214537 A1 7/2014 Yoo et al.
2014/0215513 A1 7/2014 Ramer et al.
2014/0218372 A1‡ 8/2014 Missig .................... G06F 3/044 345/47
2014/0222435 A1 8/2014 Li et al.
2014/0222436 A1‡ 8/2014 Binder .................. G10L 15/265 704/27
2014/0222678 A1 8/2014 Sheets et al.
2014/0222967 A1 8/2014 Harrang et al.
2014/0223377 A1‡ 8/2014 Shaw .................. G06F 11/1458 715/83
2014/0223481 A1‡ 8/2014 Fundament ........ H04N 21/4828 725/40
2014/0226503 A1 8/2014 Cooper et al.
2014/0229184 A1 8/2014 Shires
2014/0230055 A1 8/2014 Boehl
2014/0232570 A1 8/2014 Skinder et al.
2014/0232656 A1‡ 8/2014 Pasquero .............. G06F 3/0219 345/16
2014/0236595 A1‡ 8/2014 Gray ..................... G10L 15/063 704/23
2014/0236986 A1‡ 8/2014 Guzman ............. G06Q 10/107 707/76
2014/0237042 A1‡ 8/2014 Ahmed ................... H04L 67/02 709/20
2014/0237366 A1 8/2014 Poulos et al.
2014/0244248 A1 8/2014 Arisoy et al.
2014/0244249 A1 8/2014 Mohamed et al.
2014/0244254 A1 8/2014 Ju et al.
2014/0244257 A1‡ 8/2014 Colibro ................... G10L 17/20 704/24
2014/0244258 A1‡ 8/2014 Song ....................... G10L 15/18 704/24
2014/0244263 A1 8/2014 Pontual et al.
2014/0244266 A1 8/2014 Brown et al.
2014/0244268 A1 8/2014 Abdelsamie et al.
2014/0244270 A1 8/2014 Han et al.
2014/0244271 A1‡ 8/2014 Lindahl .................. G10L 15/30 704/27
2014/0244712 A1 8/2014 Walters et al.
2014/0245140 A1 8/2014 Brown et al.
2014/0247383 A1‡ 9/2014 Dave ................. H04N 5/23293 348/33
2014/0247926 A1‡ 9/2014 Gainsboro .......... H04M 3/2281 379/88
2014/0249812 A1 9/2014 Bou-Ghazale et al.
2014/0249816 A1 9/2014 Pickering et al.
2014/0249817 A1‡ 9/2014 Hart ....................... G10L 15/22 704/23
2014/0249820 A1 9/2014 Hsu et al.
2014/0249821 A1 9/2014 Kennewick et al.
2014/0250046 A1‡ 9/2014 Winn .................... G06F 40/216 706/52
2014/0257809 A1 9/2014 Goel et al.
2014/0257815 A1 9/2014 Zhao et al.
2014/0257902 A1 9/2014 Moore et al.
2014/0258324 A1 9/2014 Mauro et al.
2014/0258357 A1 9/2014 Singh et al.
2014/0258857 A1 9/2014 Dykstra-Erickson et al.
2014/0258905 A1 9/2014 Lee et al.
2014/0267022 A1‡ 9/2014 Kim ......................... G06F 3/01 345/15
2014/0267599 A1‡ 9/2014 Drouin ................. G03H 1/2294 348/41
2014/0267933 A1 9/2014 Young
2014/0272821 A1 9/2014 Pitschel et al.
2014/0273979 A1 9/2014 Van Os et al.
2014/0274005 A1 9/2014 Luna et al.
2014/0274203 A1‡ 9/2014 Ganong, III ...... H04W 52/0251 455/55
2014/0274211 A1‡ 9/2014 Sejnoha ........... H04M 1/72519 455/56
2014/0278051 A1 9/2014 Mcgavran et al.
2014/0278343 A1 9/2014 Tran
2014/0278349 A1 9/2014 Grieves et al.
2014/0278379 A1 9/2014 Coccaro et al.
2014/0278390 A1 9/2014 Kingsbury et al.
2014/0278391 A1‡ 9/2014 Braho ..................... G10L 25/78 704/23
2014/0278394 A1 9/2014 Bastyr et al.
2014/0278406 A1‡ 9/2014 Tsumura ................ G06Q 40/00 704/23
2014/0278413 A1‡ 9/2014 Pitschel ................ G10L 15/063 704/24
2014/0278426 A1 9/2014 Jost et al.
2014/0278429 A1 9/2014 Ganong, III
2014/0278435 A1‡ 9/2014 Ganong, III ............ G10L 15/22 704/27
2014/0278436 A1 9/2014 Khanna et al.
2014/0278438 A1 9/2014 Hart et al.
2014/0278443 A1‡ 9/2014 Gunn ................... G06F 3/0488 704/27
2014/0278444 A1 9/2014 Larson et al.

(56) References Cited

U.S. PATENT DOCUMENTS

2014/0278513 A1‡ 9/2014 Prakash ............. G06Q 30/0601 705/2
2014/0279622 A1 9/2014 Lamoureux et al.
2014/0279739 A1 9/2014 Elkington et al.
2014/0279787 A1 9/2014 Cheng et al.
2014/0280072 A1 9/2014 Coleman
2014/0280107 A1 9/2014 Heymans et al.
2014/0280138 A1‡ 9/2014 Li .......................... G06F 16/00 707/73
2014/0280292 A1‡ 9/2014 Skinder ............... G06F 16/3338 707/76
2014/0280353 A1‡ 9/2014 Delaney ................. G16H 10/60 707/79
2014/0280450 A1 9/2014 Luna
2014/0281944 A1 9/2014 Winer
2014/0281983 A1‡ 9/2014 Xian ....................... G06F 3/167 715/71
2014/0281997 A1 9/2014 Fleizach et al.
2014/0282003 A1 9/2014 Gruber et al.
2014/0282007 A1 9/2014 Fleizach
2014/0282045 A1 9/2014 Ayanam et al.
2014/0282178 A1 9/2014 Borzello et al.
2014/0282201 A1 9/2014 Pasquero et al.
2014/0282203 A1 9/2014 Pasquero et al.
2014/0282586 A1‡ 9/2014 Shear .................... G06F 9/5083 718/10
2014/0282743 A1‡ 9/2014 Howard ........... H04N 21/47815 725/60
2014/0288990 A1‡ 9/2014 Moore ............... G06Q 10/1095 705/7
2014/0289508 A1 9/2014 Wang
2014/0297267 A1 10/2014 Spencer et al.
2014/0297281 A1‡ 10/2014 Togawa .................. G10L 15/22 704/25
2014/0297284 A1‡ 10/2014 Gruber .................... G10L 15/18 704/25
2014/0297288 A1 10/2014 Yu et al.
2014/0298395 A1* 10/2014 Yang .................. H04N 21/4363 725/115
2014/0304086 A1 10/2014 Dasdan et al.
2014/0304605 A1‡ 10/2014 Ohmura .................. G06F 3/167 715/72
2014/0309990 A1 10/2014 Gandrabur et al.
2014/0309996 A1 10/2014 Zhang
2014/0310001 A1 10/2014 Kalns et al.
2014/0310002 A1 10/2014 Nitz et al.
2014/0310348 A1 10/2014 Keskitalo et al.
2014/0310365 A1 10/2014 Sample et al.
2014/0310595 A1 10/2014 Acharya et al.
2014/0313007 A1 10/2014 Harding
2014/0315492 A1 10/2014 Woods
2014/0316585 A1‡ 10/2014 Boesveld ............ F24D 19/1009 700/27
2014/0317030 A1 10/2014 Shen et al.
2014/0317502 A1‡ 10/2014 Brown .................. G06F 3/0488 715/70
2014/0324429 A1 10/2014 Weilhammer et al.
2014/0324884 A1 10/2014 Lindahl et al.
2014/0330569 A1 11/2014 Kolavennu et al.
2014/0330951 A1 11/2014 Sukoff et al.
2014/0335823 A1 11/2014 Heredia et al.
2014/0337037 A1‡ 11/2014 Chi ....................... G06F 16/951 704/27
2014/0337048 A1‡ 11/2014 Brown .................... G06F 3/167 705/2
2014/0337266 A1‡ 11/2014 Kalns ....................... G06N 5/02 706/46
2014/0337370 A1 11/2014 Aravamudan et al.
2014/0337371 A1 11/2014 Li
2014/0337438 A1 11/2014 Govande et al.
2014/0337621 A1 11/2014 Nakhimov
2014/0337751 A1 11/2014 Lim et al.
2014/0337814 A1‡ 11/2014 Kalns ........................ G06F 8/00 717/10
2014/0342762 A1 11/2014 Hajdu et al.
2014/0343834 A1 11/2014 Demerchant et al.
2014/0343943 A1 11/2014 Al-telmissani
2014/0343946 A1 11/2014 Torok et al.
2014/0344205 A1 11/2014 Luna et al.
2014/0344627 A1 11/2014 Schaub et al.
2014/0344687 A1 11/2014 Durham et al.
2014/0347181 A1 11/2014 Luna et al.
2014/0350847 A1 11/2014 Ichinokawa
2014/0350924 A1 11/2014 Zurek et al.
2014/0350933 A1 11/2014 Bak et al.
2014/0351741 A1 11/2014 Medlock et al.
2014/0351760 A1‡ 11/2014 Skory .................. G06F 40/274 715/83
2014/0358519 A1‡ 12/2014 Mirkin .................... G06F 40/44 704/3
2014/0358523 A1 12/2014 Sheth et al.
2014/0358549 A1 12/2014 O'Connor et al.
2014/0359637 A1 12/2014 Yan
2014/0359709 A1 12/2014 Nassar et al.
2014/0361973 A1 12/2014 Raux et al.
2014/0363074 A1 12/2014 Dolfing et al.
2014/0364149 A1 12/2014 Marti et al.
2014/0365209 A1‡ 12/2014 Evermann ............... G06F 40/35 704/9
2014/0365214 A1 12/2014 Bayley
2014/0365216 A1 12/2014 Gruber et al.
2014/0365226 A1 12/2014 Sinha
2014/0365227 A1‡ 12/2014 Cash ....................... G10L 15/22 704/27
2014/0365407 A1 12/2014 Brown et al.
2014/0365505 A1 12/2014 Clark et al.
2014/0365880 A1‡ 12/2014 Bellegarda ........ G06F 16/90324 715/26
2014/0365885 A1‡ 12/2014 Carson ................ G06F 3/04842 715/70
2014/0365895 A1‡ 12/2014 Magahern ............... G06F 3/016 715/72
2014/0365922 A1 12/2014 Yang
2014/0365945 A1 12/2014 Karunamuni et al.
2014/0370817 A1 12/2014 Luna
2014/0370841 A1 12/2014 Roberts et al.
2014/0372112 A1 12/2014 Xue et al.
2014/0372356 A1 12/2014 Bilal et al.
2014/0372468 A1 12/2014 Collins et al.
2014/0372931 A1 12/2014 Zhai et al.
2014/0379334 A1 12/2014 Fry
2014/0379341 A1 12/2014 Seo et al.
2014/0379798 A1 12/2014 Bunner et al.
2014/0380285 A1 12/2014 Gabel et al.
2015/0003797 A1‡ 1/2015 Schmidt ............... G11B 27/031 386/20
2015/0004958 A1 1/2015 Wang et al.
2015/0006148 A1 1/2015 Goldszmit et al.
2015/0006157 A1 1/2015 Silva et al.
2015/0006167 A1 1/2015 Kato et al.
2015/0006176 A1 1/2015 Pogue et al.
2015/0006178 A1‡ 1/2015 Peng ....................... G10L 15/18 704/25
2015/0006184 A1 1/2015 Marti et al.
2015/0006199 A1‡ 1/2015 Snider ..................... G06F 19/00 705/3
2015/0012271 A1‡ 1/2015 Peng ....................... G10L 15/08 704/23
2015/0019219 A1 1/2015 Tzirkel-Hancock et al.
2015/0019221 A1 1/2015 Lee et al.
2015/0019944 A1 1/2015 Kalgi
2015/0019974 A1‡ 1/2015 Doi ......................... G06F 3/167 715/72
2015/0025405 A1 1/2015 Vairavan et al.
2015/0026620 A1 1/2015 Kwon et al.
2015/0027178 A1 1/2015 Scalisi
2015/0031416 A1 1/2015 Wells et al.
2015/0032443 A1 1/2015 Karov et al.
2015/0033219 A1 1/2015 Breiner et al.
2015/0033275 A1 1/2015 Natani et al.

(56) References Cited

U.S. PATENT DOCUMENTS

2015/0034855 A1 2/2015 Shen
2015/0038161 A1 2/2015 Jakobson et al.
2015/0039292 A1‡ 2/2015 Suleman ............... G06F 40/216 704/9
2015/0039295 A1 2/2015 Soschen
2015/0039299 A1 2/2015 Weinstein et al.
2015/0039305 A1‡ 2/2015 Huang .................... G10L 15/20 704/23
2015/0039606 A1 2/2015 Salaka et al.
2015/0040012 A1 2/2015 Faaborg et al.
2015/0045003 A1‡ 2/2015 Vora ........................ G06F 3/167 455/41
2015/0045007 A1 2/2015 Cash
2015/0045068 A1 2/2015 Soifer et al.
2015/0046434 A1 2/2015 Lim et al.
2015/0046537 A1‡ 2/2015 Rakib ................... H04L 67/104 709/20
2015/0046828 A1 2/2015 Desai et al.
2015/0050633 A1‡ 2/2015 Christmas ................ G09G 5/14 434/32
2015/0050923 A1 2/2015 Tu et al.
2015/0051754 A1 2/2015 Kwon et al.
2015/0053779 A1 2/2015 Adamek et al.
2015/0053781 A1 2/2015 Nelson et al.
2015/0055879 A1 2/2015 Yang
2015/0058013 A1‡ 2/2015 Pakhomov ............. G10L 25/78 704/24
2015/0058018 A1 2/2015 Georges et al.
2015/0058720 A1 2/2015 Smadja et al.
2015/0058785 A1 2/2015 Ookawara
2015/0065149 A1 3/2015 Russell et al.
2015/0065200 A1‡ 3/2015 Namgung ............. G06F 3/0416 455/56
2015/0066494 A1 3/2015 Salvador et al.
2015/0066496 A1 3/2015 Deoras et al.
2015/0066506 A1‡ 3/2015 Romano ............. G10L 15/1822 704/23
2015/0066516 A1‡ 3/2015 Nishikawa ................ F24C 7/08 704/27
2015/0066817 A1 3/2015 Slayton et al.
2015/0067485 A1‡ 3/2015 Kim ...................... G06F 3/0488 715/25
2015/0067822 A1 3/2015 Randall
2015/0071121 A1 3/2015 Patil et al.
2015/0073788 A1 3/2015 Sak et al.
2015/0073804 A1‡ 3/2015 Senior ..................... G10L 13/06 704/25
2015/0074524 A1 3/2015 Nicholson et al.
2015/0074615 A1 3/2015 Han et al.
2015/0081295 A1 3/2015 Yun et al.
2015/0082229 A1 3/2015 Ouyang et al.
2015/0086174 A1 3/2015 Abecassis et al.
2015/0088511 A1‡ 3/2015 Bharadwaj ............ G10L 15/183 704/24
2015/0088514 A1‡ 3/2015 Typrin .................... G10L 17/00 704/24
2015/0088518 A1 3/2015 Kim et al.
2015/0088522 A1 3/2015 Hendrickson et al.
2015/0088523 A1 3/2015 Schuster
2015/0088998 A1 3/2015 Isensee et al.
2015/0092520 A1 4/2015 Robison et al.
2015/0094834 A1 4/2015 Vega et al.
2015/0095031 A1‡ 4/2015 Conkie ................. G10L 15/187 704/25
2015/0095268 A1 4/2015 Greenzeiger et al.
2015/0095278 A1 4/2015 Flinn et al.
2015/0100144 A1 4/2015 Lee et al.
2015/0100313 A1 4/2015 Sharma
2015/0100316 A1‡ 4/2015 Williams ................ G10L 15/04 704/24
2015/0100537 A1 4/2015 Grieves et al.
2015/0100983 A1 4/2015 Pan
2015/0106093 A1 4/2015 Weeks et al.
2015/0106737 A1 4/2015 Montoy-Wilson et al.
2015/0113407 A1‡ 4/2015 Hoffert ................. G06F 3/0482 715/72
2015/0113435 A1 4/2015 Phillips
2015/0120296 A1 4/2015 Stern et al.
2015/0120641 A1 4/2015 Soon-Shiong et al.
2015/0120723 A1 4/2015 Deshmukh et al.
2015/0121216 A1 4/2015 Brown et al.
2015/0123898 A1 5/2015 Kim et al.
2015/0127337 A1 5/2015 Heigold et al.
2015/0127348 A1 5/2015 Follis
2015/0127350 A1‡ 5/2015 Agiomyrgiannakis ..................... G10L 13/02 704/26
2015/0133049 A1 5/2015 Lee et al.
2015/0133109 A1‡ 5/2015 Freeman ............. H04M 1/7253 455/42
2015/0134318 A1 5/2015 Cuthbert et al.
2015/0134322 A1 5/2015 Cuthbert et al.
2015/0134334 A1 5/2015 Sachidanandam et al.
2015/0135085 A1 5/2015 Shoham et al.
2015/0135123 A1 5/2015 Carr et al.
2015/0140934 A1 5/2015 Abdurrahman et al.
2015/0142420 A1‡ 5/2015 Sarikaya ................. G10L 15/22 704/9
2015/0142438 A1 5/2015 Dai et al.
2015/0142447 A1 5/2015 Kennewick et al.
2015/0142851 A1 5/2015 Gupta et al.
2015/0143419 A1 5/2015 Bhagwat et al.
2015/0148013 A1‡ 5/2015 Baldwin ............... H04W 4/029 455/41
2015/0149177 A1 5/2015 Kalns et al.
2015/0149182 A1 5/2015 Kalns et al.
2015/0149354 A1‡ 5/2015 McCoy .................. G06F 3/167 705/42
2015/0149469 A1‡ 5/2015 Xu ........................ H04L 65/403 707/74
2015/0149899 A1 5/2015 Bernstein et al.
2015/0149964 A1 5/2015 Bernstein et al.
2015/0154001 A1 6/2015 Knox et al.
2015/0154185 A1 6/2015 Waibel
2015/0154976 A1 6/2015 Mutagi
2015/0160855 A1 6/2015 Bi
2015/0161291 A1 6/2015 Gur et al.
2015/0161370 A1‡ 6/2015 North ....................... G07C 9/37 726/5
2015/0161521 A1 6/2015 Shah et al.
2015/0161989 A1 6/2015 Hsu et al.
2015/0162001 A1 6/2015 Kar et al.
2015/0162006 A1 6/2015 Kummer
2015/0163558 A1 6/2015 Wheatley
2015/0169081 A1 6/2015 Neels et al.
2015/0169284 A1 6/2015 Quast et al.
2015/0169336 A1 6/2015 Harper et al.
2015/0169696 A1 6/2015 Krishnappa et al.
2015/0170073 A1 6/2015 Baker
2015/0170664 A1‡ 6/2015 Doherty .................. G06F 3/167 704/27
2015/0172262 A1 6/2015 Ortiz, Jr. et al.
2015/0172463 A1‡ 6/2015 Quast .................. H04M 3/4936 379/88
2015/0178388 A1‡ 6/2015 Winnemoeller .... H04L 12/1827 707/72
2015/0178785 A1 6/2015 Salonen
2015/0179176 A1 6/2015 Ryu et al.
2015/0181285 A1 6/2015 Zhang et al.
2015/0185964 A1 7/2015 Stout
2015/0185996 A1 7/2015 Brown et al.
2015/0186012 A1‡ 7/2015 Coleman ............. G06F 3/04842 715/75
2015/0186110 A1 7/2015 Kannan
2015/0186154 A1 7/2015 Brown et al.
2015/0186155 A1 7/2015 Brown et al.
2015/0186156 A1‡ 7/2015 Brown ................ G06F 3/04817 715/70
2015/0186351 A1 7/2015 Hicks et al.
2015/0186538 A1 7/2015 Yan et al.
2015/0186783 A1 7/2015 Byrne et al.
2015/0187355 A1 7/2015 Parkinson et al.

(56) References Cited

U.S. PATENT DOCUMENTS

2015/0187369 A1 7/2015 Dadu et al.
2015/0189362 A1 7/2015 Lee et al.
2015/0193379 A1 7/2015 Mehta
2015/0193391 A1 ‡ 7/2015 Khvostichenko ..... G06F 40/279 715/20
2015/0193392 A1 ‡ 7/2015 Greenblatt ........... G06Q 10/109 715/20
2015/0194152 A1 ‡ 7/2015 Katuri ..................... G10L 15/22 704/23
2015/0194165 A1 7/2015 Faaborg et al.
2015/0195379 A1 ‡ 7/2015 Zhang ................. G06F 16/9577 709/21
2015/0195606 A1 7/2015 McDevitt
2015/0199077 A1 7/2015 Zuger et al.
2015/0199960 A1 ‡ 7/2015 Huo ...................... G10L 15/063 704/24
2015/0199965 A1 7/2015 Leak et al.
2015/0199967 A1 7/2015 Reddy et al.
2015/0201064 A1 7/2015 Bells et al.
2015/0201077 A1 7/2015 Konig et al.
2015/0205425 A1 7/2015 Kuscher et al.
2015/0205568 A1 7/2015 Matsuoka
2015/0205858 A1 ‡ 7/2015 Xie ....................... G06F 16/243 707/75
2015/0206529 A1 7/2015 Kwon et al.
2015/0208226 A1 7/2015 Kuusilinna et al.
2015/0212791 A1 7/2015 Kumar et al.
2015/0213140 A1 7/2015 Volkert
2015/0213796 A1 7/2015 Waltermann et al.
2015/0215258 A1 7/2015 Nowakowski et al.
2015/0215350 A1 7/2015 Slayton et al.
2015/0220264 A1 8/2015 Lewis et al.
2015/0220507 A1 8/2015 Mohajer et al.
2015/0220715 A1 8/2015 Kim et al.
2015/0220972 A1 8/2015 Subramanya et al.
2015/0221304 A1 ‡ 8/2015 Stewart ................... G06F 40/30 704/23
2015/0221307 A1 8/2015 Shah et al.
2015/0227505 A1 8/2015 Morimoto
2015/0227633 A1 8/2015 Shapira
2015/0228274 A1 8/2015 Leppanen et al.
2015/0228275 A1 8/2015 Watanabe et al.
2015/0228281 A1 ‡ 8/2015 Raniere ................... G06F 3/167 704/27
2015/0228283 A1 8/2015 Ehsani et al.
2015/0228292 A1 8/2015 Goldstein et al.
2015/0230095 A1 8/2015 Smith et al.
2015/0234636 A1 ‡ 8/2015 Barnes, Jr. ........... G06Q 20/322 715/72
2015/0234800 A1 ‡ 8/2015 Ehlen .................. G06F 16/4393 715/20
2015/0237301 A1 8/2015 Shi et al.
2015/0242091 A1 8/2015 Lu et al.
2015/0242385 A1 8/2015 Bao et al.
2015/0243278 A1 ‡ 8/2015 Kibre .................... G10L 15/075 704/24
2015/0243279 A1 8/2015 Morse et al.
2015/0243283 A1 8/2015 Halash et al.
2015/0244665 A1 8/2015 Choi et al.
2015/0245154 A1 ‡ 8/2015 Dadu ...................... G06F 3/167 381/56
2015/0248651 A1 9/2015 Akutagawa et al.
2015/0248886 A1 9/2015 Sarikaya et al.
2015/0253146 A1 9/2015 Annapureddy et al.
2015/0254057 A1 9/2015 Klein et al.
2015/0254058 A1 ‡ 9/2015 Klein ...................... G06F 3/167 704/27
2015/0254333 A1 9/2015 Fife et al.
2015/0255071 A1 ‡ 9/2015 Chiba ............... H04M 1/72522 704/27
2015/0256873 A1 ‡ 9/2015 Klein ............... H04N 21/26283 725/39
2015/0261298 A1 9/2015 Li
2015/0261496 A1 ‡ 9/2015 Faaborg .................. G10L 15/00 715/72
2015/0261850 A1 9/2015 Mittal
2015/0269139 A1 9/2015 McAteer et al.
2015/0269617 A1 9/2015 Mikurak
2015/0269677 A1 9/2015 Milne
2015/0269943 A1 9/2015 VanBlon et al.
2015/0277574 A1 10/2015 Jain et al.
2015/0278348 A1 10/2015 Paruchuri et al.
2015/0278370 A1 10/2015 Stratvert et al.
2015/0278737 A1 10/2015 Chen Huebscher et al.
2015/0279358 A1 10/2015 Kingsbury et al.
2015/0279360 A1 ‡ 10/2015 Mengibar ............... G06F 40/30 704/25
2015/0279366 A1 10/2015 Krestnikov et al.
2015/0281380 A1 10/2015 Wang et al.
2015/0281401 A1 10/2015 Le et al.
2015/0286627 A1 10/2015 Chang et al.
2015/0286716 A1 10/2015 Snibbe et al.
2015/0286937 A1 10/2015 Hildebrand
2015/0287401 A1 10/2015 Lee et al.
2015/0287409 A1 ‡ 10/2015 Jang ..................... G11B 27/031 704/23
2015/0287411 A1 10/2015 Kojima et al.
2015/0288629 A1 10/2015 Choi et al.
2015/0294086 A1 10/2015 Kare et al.
2015/0294377 A1 10/2015 Chow
2015/0294516 A1 ‡ 10/2015 Chiang .................. G06F 21/32 340/5
2015/0295915 A1 10/2015 Xiu
2015/0301796 A1 10/2015 Visser et al.
2015/0302855 A1 10/2015 Kim et al.
2015/0302856 A1 10/2015 Kim et al.
2015/0302857 A1 10/2015 Yamada
2015/0302870 A1 10/2015 Burke
2015/0309997 A1 ‡ 10/2015 Lee ....................... G06F 1/1626 704/3
2015/0310114 A1 10/2015 Ryger et al.
2015/0310858 A1 10/2015 Li et al.
2015/0310862 A1 10/2015 Dauphin et al.
2015/0310879 A1 10/2015 Buchanan et al.
2015/0310888 A1 10/2015 Chen
2015/0312182 A1 10/2015 Langholz
2015/0312409 A1 10/2015 Czarnecki et al.
2015/0314454 A1 11/2015 Breazeal et al.
2015/0317069 A1 11/2015 Clements et al.
2015/0317310 A1 11/2015 Eiche et al.
2015/0319411 A1 11/2015 Kasmir et al.
2015/0324041 A1 ‡ 11/2015 Varley ................... G06F 3/0412 345/17
2015/0324334 A1 11/2015 Lee et al.
2015/0331664 A1 11/2015 Osawa et al.
2015/0331711 A1 ‡ 11/2015 Huang .................. G06F 3/0481 719/32
2015/0332667 A1 11/2015 Mason
2015/0334346 A1 11/2015 Cheatham, III et al.
2015/0339049 A1 ‡ 11/2015 Kasemset ........... G06F 3/04883 715/72
2015/0339391 A1 ‡ 11/2015 Kang .................... G06F 16/433 707/72
2015/0340033 A1 11/2015 Di Fabbrizio et al.
2015/0340040 A1 ‡ 11/2015 Mun ....................... G10L 17/22 704/24
2015/0340042 A1 ‡ 11/2015 Sejnoha ............ H04M 1/72519 704/27
2015/0341717 A1 11/2015 Song et al.
2015/0346845 A1 12/2015 Di Censo et al.
2015/0347086 A1 12/2015 Liedholm et al.
2015/0347381 A1 12/2015 Bellegarda
2015/0347382 A1 ‡ 12/2015 Dolfing ................. G06F 40/274 704/9
2015/0347383 A1 12/2015 Willmore et al.
2015/0347385 A1 12/2015 Flor et al.
2015/0347393 A1 ‡ 12/2015 Futrell .................. G06F 40/194 704/9
2015/0347552 A1 12/2015 Habouzit et al.
2015/0347733 A1 12/2015 Tsou et al.
2015/0347985 A1 12/2015 Gross et al.

(56) References Cited

U.S. PATENT DOCUMENTS

2015/0348533 A1 12/2015 Saddler et al.
2015/0348547 A1‡ 12/2015 Paulik .................. G06F 40/211 704/25
2015/0348548 A1‡ 12/2015 Piernot .................. G06F 3/013 704/23
2015/0348549 A1‡ 12/2015 Giuli .................. G10L 15/1822 704/23
2015/0348551 A1‡ 12/2015 Gruber ................ H04M 3/4936 704/23
2015/0348554 A1 12/2015 Orr et al.
2015/0348555 A1 12/2015 Sugita
2015/0348565 A1 12/2015 Rhoten et al.
2015/0349934 A1 12/2015 Pollack et al.
2015/0350031 A1 12/2015 Burks
2015/0350342 A1 12/2015 Thorpe et al.
2015/0350594 A1 12/2015 Mate et al.
2015/0352999 A1 12/2015 Bando et al.
2015/0355879 A1 12/2015 Beckhardt et al.
2015/0356410 A1 12/2015 Faith et al.
2015/0363587 A1 12/2015 Ahn et al.
2015/0364128 A1 12/2015 Zhao et al.
2015/0364140 A1 12/2015 Thörn
2015/0370531 A1‡ 12/2015 Faaborg .................. G06F 3/167 704/27
2015/0370780 A1‡ 12/2015 Wang .................... G06F 40/274 704/9
2015/0370787 A1 12/2015 Akbacak et al.
2015/0370884 A1 12/2015 Hurley et al.
2015/0371215 A1 12/2015 Zhou et al.
2015/0371529 A1 12/2015 Dolecki
2015/0371639 A1 12/2015 Foerster et al.
2015/0371663 A1 12/2015 Gustafson et al.
2015/0371665 A1 12/2015 Naik et al.
2015/0373183 A1 12/2015 Woolsey et al.
2015/0379118 A1 12/2015 Wickenkamp et al.
2015/0379414 A1 12/2015 Yeh et al.
2015/0379993 A1 12/2015 Subhojit
2015/0381923 A1 12/2015 Wickenkamp et al.
2015/0382047 A1* 12/2015 Van Os .................... G09C 1/00 725/38
2015/0382079 A1 12/2015 Lister et al.
2015/0382147 A1 12/2015 Clark et al.
2016/0004690 A1 1/2016 Bangalore et al.
2016/0005320 A1 1/2016 deCharms et al.
2016/0012038 A1 1/2016 Edwards et al.
2016/0014476 A1 1/2016 Caliendo, Jr. et al.
2016/0018872 A1 1/2016 Tu et al.
2016/0018900 A1 1/2016 Tu et al.
2016/0018959 A1 1/2016 Yamashita et al.
2016/0019886 A1 1/2016 Hong
2016/0021414 A1 1/2016 Padi et al.
2016/0026258 A1 1/2016 Ou et al.
2016/0027431 A1‡ 1/2016 Kurzweil ............ G06F 3/04842 715/20
2016/0028666 A1‡ 1/2016 Li ......................... G06F 3/0482 715/75
2016/0029316 A1 1/2016 Mohan et al.
2016/0034042 A1 2/2016 Joo
2016/0034811 A1 2/2016 Paulik et al.
2016/0036953 A1 2/2016 Lee et al.
2016/0041809 A1 2/2016 Clayton et al.
2016/0042735 A1 2/2016 Vibbert et al.
2016/0042748 A1 2/2016 Jain et al.
2016/0043905 A1 2/2016 Fiedler
2016/0048666 A1 2/2016 Dey et al.
2016/0050254 A1 2/2016 Rao et al.
2016/0055422 A1 2/2016 Li
2016/0062605 A1 3/2016 Agarwal et al.
2016/0063094 A1 3/2016 Udupa et al.
2016/0063998 A1 3/2016 Krishnamoorthy et al.
2016/0070581 A1 3/2016 Soon-Shiong
2016/0071516 A1 3/2016 Lee et al.
2016/0071517 A1 3/2016 Beaver et al.
2016/0071521 A1 3/2016 Haughay
2016/0072940 A1 3/2016 Cronin
2016/0077794 A1 3/2016 Kim et al.
2016/0078860 A1 3/2016 Paulik et al.
2016/0080165 A1 3/2016 Ehsani et al.
2016/0080475 A1 3/2016 Singh et al.
2016/0085295 A1 3/2016 Shimy et al.
2016/0085827 A1 3/2016 Chadha et al.
2016/0086116 A1 3/2016 Rao et al.
2016/0086599 A1 3/2016 Kurata et al.
2016/0088335 A1 3/2016 Zucchetta
2016/0091967 A1‡ 3/2016 Prokofieva ............. G06F 3/013 345/15
2016/0092434 A1 3/2016 Bellegarda
2016/0092447 A1 3/2016 Pathurudeen et al.
2016/0092766 A1 3/2016 Sainath et al.
2016/0093291 A1‡ 3/2016 Kim ........................ G10L 15/00 381/56
2016/0093298 A1 3/2016 Naik et al.
2016/0093301 A1 3/2016 Bellegarda et al.
2016/0093304 A1‡ 3/2016 Kim ........................ G10L 15/26 704/23
2016/0094700 A1 3/2016 Lee et al.
2016/0094889 A1 3/2016 Venkataraman et al.
2016/0094979 A1‡ 3/2016 Naik ................. H04M 3/42348 455/41
2016/0098991 A1 4/2016 Luo et al.
2016/0098992 A1 4/2016 Renard et al.
2016/0099892 A1 4/2016 Palakovich et al.
2016/0099984 A1 4/2016 Karagiannis et al.
2016/0104480 A1 4/2016 Sharifi
2016/0104486 A1 4/2016 Penilla et al.
2016/0111091 A1 4/2016 Bakish
2016/0112746 A1 4/2016 Zhang et al.
2016/0117386 A1 4/2016 Ajmera et al.
2016/0118048 A1 4/2016 Heide
2016/0119338 A1 4/2016 Cheyer
2016/0125048 A1 5/2016 Hamada
2016/0125071 A1 5/2016 Gabbai
2016/0132046 A1 5/2016 Beoughter et al.
2016/0132484 A1 5/2016 Nauze et al.
2016/0132488 A1 5/2016 Clark et al.
2016/0133254 A1 5/2016 Vogel et al.
2016/0139662 A1 5/2016 Dabhade
2016/0140951 A1 5/2016 Agiomyrgiannakis et al.
2016/0140962 A1 5/2016 Sharifi
2016/0147725 A1‡ 5/2016 Patten ................... G06F 40/169 715/23
2016/0148610 A1 5/2016 Kennewick, Jr. et al.
2016/0150020 A1 5/2016 Farmer et al.
2016/0154624 A1 6/2016 Son et al.
2016/0154880 A1 6/2016 Hoarty
2016/0155442 A1 6/2016 Kannan et al.
2016/0155443 A1 6/2016 Khan et al.
2016/0156574 A1 6/2016 Hum et al.
2016/0162456 A1 6/2016 Munro et al.
2016/0163311 A1 6/2016 Crook et al.
2016/0163312 A1 6/2016 Naik et al.
2016/0170966 A1 6/2016 Kolo
2016/0173578 A1 6/2016 Sharma et al.
2016/0173617 A1 6/2016 Allinson
2016/0173960 A1 6/2016 Snibbe et al.
2016/0179462 A1 6/2016 Bjorkengren
2016/0179464 A1 6/2016 Reddy et al.
2016/0179787 A1 6/2016 Deleeuw
2016/0180840 A1 6/2016 Siddiq et al.
2016/0180844 A1‡ 6/2016 VanBlon ............... G10L 15/222 704/27
2016/0182410 A1 6/2016 Janakiraman et al.
2016/0182709 A1 6/2016 Kim et al.
2016/0188181 A1 6/2016 Smith
2016/0188738 A1 6/2016 Gruber et al.
2016/0189717 A1‡ 6/2016 Kannan .................. G10L 17/22 704/27
2016/0196110 A1 7/2016 Yehoshua et al.
2016/0198319 A1 7/2016 Huang et al.
2016/0203002 A1 7/2016 Kannan et al.
2016/0210551 A1 7/2016 Lee et al.
2016/0210981 A1 7/2016 Lee
2016/0212488 A1‡ 7/2016 Os .................... H04N 21/42222

(56) References Cited

U.S. PATENT DOCUMENTS

2016/0217784 A1 7/2016 Gelfenbeyn et al.
2016/0224540 A1 8/2016 Stewart et al.
2016/0224774 A1 8/2016 Pender
2016/0225372 A1 8/2016 Cheung et al.
2016/0227107 A1 8/2016 Beaumont
2016/0232500 A1 8/2016 Wang et al.
2016/0239645 A1 8/2016 Heo et al.
2016/0240187 A1 8/2016 Fleizach et al.
2016/0240189 A1 8/2016 Lee et al.
2016/0240192 A1 8/2016 Raghuvir
2016/0247061 A1 8/2016 Trask et al.
2016/0249319 A1 8/2016 Dotan-Cohen et al.
2016/0253312 A1 9/2016 Rhodes
2016/0253528 A1 9/2016 Gao et al.
2016/0259623 A1 9/2016 Sumner et al.
2016/0259656 A1 9/2016 Sumner et al.
2016/0259779 A1 9/2016 Labský et al.
2016/0260431 A1 9/2016 Newendorp et al.
2016/0260433 A1 9/2016 Sumner et al.
2016/0260434 A1 9/2016 Gelfenbeyn et al.
2016/0260436 A1 ‡ 9/2016 Lemay .................... G10L 15/22
2016/0266871 A1 9/2016 Schmid et al.
2016/0267904 A1 9/2016 Biadsy et al.
2016/0274938 A1 9/2016 Strinati et al.
2016/0275941 A1 9/2016 Bellegarda et al.
2016/0275947 A1 9/2016 Li et al.
2016/0282824 A1 9/2016 Smallwood et al.
2016/0282956 A1 9/2016 Ouyang et al.
2016/0283185 A1 9/2016 Mclaren et al.
2016/0284005 A1 9/2016 Daniel et al.
2016/0284199 A1 9/2016 Dotan-Cohen et al.
2016/0285808 A1 9/2016 Franklin et al.
2016/0286045 A1 9/2016 Shaltiel et al.
2016/0293157 A1 10/2016 Chen et al.
2016/0293168 A1 10/2016 Chen
2016/0294755 A1 10/2016 Prabhu
2016/0299685 A1 10/2016 Zhai et al.
2016/0299882 A1 10/2016 Hegerty et al.
2016/0299883 A1 10/2016 Zhu et al.
2016/0299977 A1 10/2016 Hreha
2016/0300571 A1 10/2016 Foerster et al.
2016/0301639 A1 10/2016 Liu et al.
2016/0307566 A1 10/2016 Bellegarda
2016/0308799 A1 10/2016 Schubert et al.
2016/0313906 A1 10/2016 Kilchenko et al.
2016/0314788 A1 10/2016 Jitkoff et al.
2016/0314792 A1 10/2016 Alvarez et al.
2016/0315996 A1 10/2016 Ha et al.
2016/0317924 A1 11/2016 Tanaka et al.
2016/0321239 A1 11/2016 Iso-Sipilä et al.
2016/0321261 A1 11/2016 Spasojevic et al.
2016/0321358 A1 11/2016 Kanani et al.
2016/0322043 A1 11/2016 Bellegarda
2016/0322044 A1 11/2016 Jung et al.
2016/0322045 A1 11/2016 Hatfield et al.
2016/0322048 A1 11/2016 Amano et al.
2016/0322050 A1 11/2016 Wang et al.
2016/0328147 A1 11/2016 Zhang et al.
2016/0328205 A1 11/2016 Agrawal et al.
2016/0328893 A1 11/2016 Cordova et al.
2016/0329060 A1 11/2016 Ito et al.
2016/0334973 A1 11/2016 Reckhow et al.
2016/0335532 A1 11/2016 Sanghavi et al.
2016/0336007 A1 11/2016 Hanazawa et al.
2016/0336010 A1 11/2016 Lindahl
2016/0336011 A1 11/2016 Koll et al.
2016/0336024 A1 11/2016 Choi et al.
2016/0337299 A1 11/2016 Lane et al.
2016/0337301 A1 11/2016 Rollins et al.
2016/0342317 A1 11/2016 Lim et al.
2016/0342685 A1 11/2016 Basu et al.
2016/0342781 A1 11/2016 Jeon
2016/0350650 A1 12/2016 Leeman-Munk et al.
2016/0351190 A1 12/2016 Piernot et al.
2016/0352567 A1 12/2016 Robbins et al.
2016/0357304 A1 12/2016 Hatori et al.
2016/0357728 A1 12/2016 Bellegarda et al.
2016/0357790 A1 12/2016 Elkington et al.
2016/0357861 A1 12/2016 Carlhian et al.
2016/0357870 A1 12/2016 Hentschel et al.
2016/0358598 A1 12/2016 Williams et al.
2016/0358600 A1 12/2016 Nallasamy et al.
2016/0358619 A1 12/2016 Ramprashad et al.
2016/0359771 A1 12/2016 Sridhar
2016/0360039 A1 12/2016 Sanghavi et al.
2016/0360336 A1 12/2016 Gross et al.
2016/0360382 A1 12/2016 Gross et al.
2016/0364378 A1 12/2016 Futrell et al.
2016/0365101 A1 12/2016 Foy et al.
2016/0371250 A1 12/2016 Rhodes
2016/0372112 A1 12/2016 Miller et al.
2016/0372119 A1 12/2016 Sak et al.
2016/0378747 A1 12/2016 Orr et al.
2016/0379091 A1 12/2016 Lin et al.
2016/0379626 A1 12/2016 Deisher et al.
2016/0379632 A1 12/2016 Hoffmeister et al.
2016/0379633 A1 12/2016 Lehman et al.
2016/0379639 A1 12/2016 Weinstein et al.
2016/0379641 A1 12/2016 Liu et al.
2017/0003931 A1 1/2017 Dvortsov et al.
2017/0004824 A1 1/2017 Yoo et al.
2017/0005818 A1 1/2017 Gould
2017/0011091 A1 1/2017 Chehreghani
2017/0011303 A1 1/2017 Annapureddy et al.
2017/0011742 A1 1/2017 Jing et al.
2017/0013124 A1 1/2017 Havelka et al.
2017/0013331 A1 1/2017 Watanabe et al.
2017/0018271 A1 1/2017 Khan et al.
2017/0019987 A1 1/2017 Dragone et al.
2017/0023963 A1 1/2017 Davis et al.
2017/0025124 A1 1/2017 Mixter et al.
2017/0026318 A1 1/2017 Daniel et al.
2017/0026509 A1 1/2017 Rand
2017/0031576 A1 2/2017 Saoji et al.
2017/0032783 A1 2/2017 Lord et al.
2017/0032787 A1 2/2017 Dayal
2017/0032791 A1 2/2017 Elson et al.
2017/0039283 A1 2/2017 Bennett et al.
2017/0039475 A1 2/2017 Cheyer et al.
2017/0040002 A1 2/2017 Basson et al.
2017/0047063 A1 2/2017 Ohmura et al.
2017/0053652 A1 2/2017 Choi et al.
2017/0055895 A1 3/2017 Jardins et al.
2017/0060853 A1 3/2017 Lee et al.
2017/0061423 A1 3/2017 Bryant et al.
2017/0068423 A1 3/2017 Napolitano et al.
2017/0068513 A1 3/2017 Stasior et al.
2017/0068550 A1 3/2017 Zeitlin
2017/0068670 A1 3/2017 Orr et al.
2017/0069308 A1 3/2017 Aleksic et al.
2017/0075653 A1 3/2017 Dawidowsky et al.
2017/0076720 A1 3/2017 Gopalan et al.
2017/0076721 A1 3/2017 Bargetzi et al.
2017/0078490 A1 3/2017 Kaminsky et al.
2017/0083179 A1 3/2017 Gruber et al.
2017/0083285 A1 3/2017 Meyers et al.
2017/0083504 A1 3/2017 Huang
2017/0084277 A1 3/2017 Sharifi
2017/0085547 A1 3/2017 De Aguiar et al.
2017/0090569 A1 3/2017 Levesque
2017/0091168 A1 3/2017 Bellegarda et al.
2017/0091169 A1 3/2017 Bellegarda et al.
2017/0091612 A1 3/2017 Gruber et al.
2017/0092259 A1 3/2017 Jeon
2017/0092270 A1 3/2017 Newendorp et al.
2017/0092278 A1 3/2017 Evermann et al.
2017/0093356 A1 3/2017 Cudak et al.
2017/0102837 A1 4/2017 Toumpelis
2017/0102915 A1 4/2017 Kuscher et al.
2017/0103749 A1 4/2017 Zhao et al.
2017/0105190 A1 4/2017 Logan et al.
2017/0110117 A1 4/2017 Chakladar et al.
2017/0116177 A1 4/2017 Walla Anmol
2017/0116982 A1 4/2017 Gelfenbeyn et al.

(56) References Cited

U.S. PATENT DOCUMENTS

2017/0116989 A1 4/2017 Yadgar et al.
2017/0124190 A1 5/2017 Wang et al.
2017/0125016 A1 5/2017 Wang
2017/0127124 A9 5/2017 Wilson et al.
2017/0131778 A1 5/2017 Iyer
2017/0132019 A1 5/2017 Karashchuk et al.
2017/0132199 A1 5/2017 Vescovi et al.
2017/0133007 A1 5/2017 Drewes
2017/0140041 A1 5/2017 Dotan-Cohen et al.
2017/0140644 A1 5/2017 Hwang et al.
2017/0140760 A1 5/2017 Sachdev
2017/0147841 A1 5/2017 Stagg et al.
2017/0148044 A1 5/2017 Fukuda et al.
2017/0154033 A1 6/2017 Lee
2017/0154055 A1 6/2017 Dimson et al.
2017/0155940 A1 6/2017 Jin et al.
2017/0161018 A1 6/2017 Lemay et al.
2017/0161268 A1 6/2017 Badaskar
2017/0161293 A1 6/2017 Ionescu et al.
2017/0161393 A1 6/2017 Oh et al.
2017/0162191 A1 6/2017 Grost et al.
2017/0162203 A1 6/2017 Huang et al.
2017/0169818 A1 6/2017 Vanblon et al.
2017/0169819 A1 6/2017 Mese et al.
2017/0177547 A1 6/2017 Ciereszko et al.
2017/0178619 A1 6/2017 Naik et al.
2017/0178620 A1 6/2017 Fleizach et al.
2017/0178626 A1 6/2017 Gruber et al.
2017/0180499 A1 6/2017 Gelfenbeyn et al.
2017/0185375 A1 6/2017 Martel et al.
2017/0185581 A1 6/2017 Bojja et al.
2017/0186429 A1 6/2017 Giuli et al.
2017/0187711 A1 6/2017 Joo et al.
2017/0193083 A1 7/2017 Bhatt et al.
2017/0195493 A1 7/2017 Sudarsan et al.
2017/0195636 A1 7/2017 Child et al.
2017/0199870 A1 7/2017 Zheng et al.
2017/0199874 A1 7/2017 Patel et al.
2017/0200066 A1 7/2017 Wang et al.
2017/0201609 A1 7/2017 Salmenkaita et al.
2017/0201613 A1 7/2017 Engelke et al.
2017/0206899 A1 7/2017 Bryant et al.
2017/0215052 A1 7/2017 Koum et al.
2017/0221486 A1 8/2017 Kurata et al.
2017/0223189 A1 8/2017 Meredith et al.
2017/0227935 A1 8/2017 Su et al.
2017/0228367 A1 8/2017 Pasupalak et al.
2017/0228382 A1 8/2017 Haviv et al.
2017/0230429 A1 8/2017 Garmark et al.
2017/0230497 A1 8/2017 Kim et al.
2017/0230709 A1 8/2017 Van Os et al.
2017/0235361 A1 8/2017 Rigazio et al.
2017/0235618 A1 8/2017 Lin et al.
2017/0235721 A1 8/2017 Almosallam et al.
2017/0236512 A1 8/2017 Williams et al.
2017/0236514 A1 8/2017 Nelson
2017/0238039 A1 8/2017 Sabattini
2017/0242653 A1 8/2017 Lang et al.
2017/0242657 A1 8/2017 Jarvis et al.
2017/0243468 A1 8/2017 Dotan-Cohen et al.
2017/0243576 A1 8/2017 Millington et al.
2017/0243586 A1 8/2017 Civelli et al.
2017/0256256 A1 9/2017 Wang et al.
2017/0263247 A1 9/2017 Kang et al.
2017/0263248 A1 9/2017 Gruber et al.
2017/0263249 A1 9/2017 Akbacak et al.
2017/0264451 A1 9/2017 Yu et al.
2017/0264711 A1 9/2017 Natarajan et al.
2017/0270912 A1 9/2017 Levit et al.
2017/0278514 A1 9/2017 Mathias et al.
2017/0285915 A1 10/2017 Napolitano et al.
2017/0286397 A1 10/2017 Gonzalez
2017/0287472 A1 10/2017 Ogawa et al.
2017/0289305 A1 10/2017 Liensberger et al.
2017/0295446 A1 10/2017 Shivappa
2017/0308609 A1 10/2017 Berkhin et al.
2017/0311005 A1 10/2017 Lin
2017/0316775 A1 11/2017 Le et al.
2017/0316782 A1 11/2017 Haughay
2017/0319123 A1 11/2017 Voss et al.
2017/0323637 A1 11/2017 Naik
2017/0329466 A1 11/2017 Krenkler et al.
2017/0329490 A1 11/2017 Esinovskaya et al.
2017/0329572 A1 11/2017 Shah et al.
2017/0329630 A1 11/2017 Jann et al.
2017/0337035 A1 11/2017 Choudhary et al.
2017/0337478 A1 11/2017 Sarikaya et al.
2017/0345411 A1 11/2017 Raitio et al.
2017/0345420 A1 11/2017 Barnett, Jr.
2017/0345429 A1 11/2017 Hardee et al.
2017/0346949 A1 11/2017 Sanghavi et al.
2017/0351487 A1 12/2017 Avilés-Casco et al.
2017/0352346 A1 12/2017 Paulik et al.
2017/0352350 A1 12/2017 Booker et al.
2017/0357478 A1 12/2017 Piersol et al.
2017/0357632 A1 12/2017 Pagallo et al.
2017/0357633 A1 12/2017 Wang et al.
2017/0357637 A1 12/2017 Nell et al.
2017/0357640 A1 12/2017 Bellegarda et al.
2017/0357716 A1 12/2017 Bellegarda et al.
2017/0358300 A1 12/2017 Laurens et al.
2017/0358301 A1 12/2017 Raitio et al.
2017/0358302 A1 12/2017 Orr et al.
2017/0358303 A1 12/2017 Walker, II et al.
2017/0358304 A1 12/2017 Castillo et al.
2017/0358305 A1 12/2017 Kudurshian et al.
2017/0358317 A1 12/2017 James
2017/0365251 A1 12/2017 Park et al.
2017/0371509 A1 12/2017 Jung et al.
2017/0371885 A1 12/2017 Aggarwal et al.
2017/0374093 A1 12/2017 Dhar et al.
2017/0374176 A1 12/2017 Agrawal et al.
2018/0005112 A1 1/2018 Iso-Sipila et al.
2018/0007060 A1 1/2018 Leblang et al.
2018/0007096 A1 1/2018 Levin et al.
2018/0007538 A1 1/2018 Naik et al.
2018/0012596 A1 1/2018 Piernot et al.
2018/0018248 A1 1/2018 Bhargava et al.
2018/0024985 A1 1/2018 Asano
2018/0033431 A1 2/2018 Newendorp et al.
2018/0033436 A1 2/2018 Zhou
2018/0047201 A1 2/2018 Filev et al.
2018/0047406 A1 2/2018 Park
2018/0052909 A1 2/2018 Sharifi et al.
2018/0054505 A1 2/2018 Hart et al.
2018/0060032 A1 3/2018 Boesen
2018/0060301 A1 3/2018 Li et al.
2018/0060312 A1 3/2018 Won
2018/0061400 A1 3/2018 Carbune et al.
2018/0061401 A1 3/2018 Sarikaya et al.
2018/0062691 A1 3/2018 Barnett, Jr.
2018/0063308 A1 3/2018 Crystal et al.
2018/0063324 A1 3/2018 Van Meter, II
2018/0063624 A1 3/2018 Boesen
2018/0067904 A1 3/2018 Li
2018/0067914 A1 3/2018 Chen et al.
2018/0067918 A1 3/2018 Bellegarda et al.
2018/0069743 A1 3/2018 Bakken et al.
2018/0075847 A1 3/2018 Lee et al.
2018/0088969 A1 3/2018 Vanblon et al.
2018/0089166 A1 3/2018 Meyer et al.
2018/0089588 A1 3/2018 Ravi et al.
2018/0090143 A1 3/2018 Saddler et al.
2018/0091847 A1 3/2018 Wu et al.
2018/0096683 A1 4/2018 James et al.
2018/0096690 A1 4/2018 Mixter et al.
2018/0102914 A1 4/2018 Kawachi et al.
2018/0107917 A1 4/2018 Hewavitharana et al.
2018/0107945 A1 4/2018 Gao et al.
2018/0108346 A1 4/2018 Paulik et al.
2018/0113673 A1 4/2018 Sheynblat
2018/0121432 A1 5/2018 Parson et al.
2018/0122376 A1 5/2018 Kojima
2018/0122378 A1 5/2018 Mixter et al.

(56) References Cited

U.S. PATENT DOCUMENTS

| | | | |
|---|---|---|---|
| 2018/0129967 A1 | 5/2018 | Herreshoff | |
| 2018/0130470 A1 | 5/2018 | Lemay et al. | |
| 2018/0130471 A1 | 5/2018 | Trufinescu et al. | |
| 2018/0137856 A1 | 5/2018 | Gilbert | |
| 2018/0137857 A1 | 5/2018 | Zhou et al. | |
| 2018/0137865 A1 | 5/2018 | Ling | |
| 2018/0143967 A1 | 5/2018 | Anbazhagan et al. | |
| 2018/0144615 A1 | 5/2018 | Kinney et al. | |
| 2018/0144746 A1 | 5/2018 | Mishra et al. | |
| 2018/0144748 A1 | 5/2018 | Leong | |
| 2018/0146089 A1 | 5/2018 | Rauenbuehler et al. | |
| 2018/0150744 A1 | 5/2018 | Orr et al. | |
| 2018/0157372 A1 | 6/2018 | Kurabayashi | |
| 2018/0157992 A1 | 6/2018 | Susskind et al. | |
| 2018/0158548 A1 | 6/2018 | Taheri et al. | |
| 2018/0166076 A1 | 6/2018 | Higuchi et al. | |
| 2018/0167884 A1 | 6/2018 | Dawid et al. | |
| 2018/0173403 A1 | 6/2018 | Carbune et al. | |
| 2018/0173542 A1 | 6/2018 | Chan et al. | |
| 2018/0174406 A1 | 6/2018 | Arashi et al. | |
| 2018/0174576 A1 | 6/2018 | Soltau et al. | |
| 2018/0174597 A1 | 6/2018 | Lee et al. | |
| 2018/0182376 A1 | 6/2018 | Gysel et al. | |
| 2018/0188840 A1 | 7/2018 | Tamura et al. | |
| 2018/0190273 A1 | 7/2018 | Karimli et al. | |
| 2018/0190279 A1 | 7/2018 | Anderson et al. | |
| 2018/0191670 A1 | 7/2018 | Suyama | |
| 2018/0196683 A1 | 7/2018 | Radebaugh et al. | |
| 2018/0210874 A1 | 7/2018 | Fuxman et al. | |
| 2018/0213448 A1 | 7/2018 | Segal et al. | |
| 2018/0218735 A1 | 8/2018 | Hunt et al. | |
| 2018/0225274 A1 | 8/2018 | Tommy et al. | |
| 2018/0232203 A1 | 8/2018 | Gelfenbeyn et al. | |
| 2018/0233140 A1 | 8/2018 | Koishida et al. | |
| 2018/0247065 A1 | 8/2018 | Rhee et al. | |
| 2018/0253209 A1 | 9/2018 | Jaygarl et al. | |
| 2018/0253652 A1 | 9/2018 | Palzer et al. | |
| 2018/0260680 A1 | 9/2018 | Finkelstein et al. | |
| 2018/0268106 A1 | 9/2018 | Velaga | |
| 2018/0270343 A1 | 9/2018 | Rout et al. | |
| 2018/0275839 A1 | 9/2018 | Kocienda et al. | |
| 2018/0276197 A1 | 9/2018 | Nell et al. | |
| 2018/0277113 A1 | 9/2018 | Hartung et al. | |
| 2018/0278740 A1 | 9/2018 | Choi et al. | |
| 2018/0285056 A1 | 10/2018 | Cutler et al. | |
| 2018/0293984 A1 | 10/2018 | Lindahl | |
| 2018/0293988 A1 | 10/2018 | Huang et al. | |
| 2018/0308477 A1 | 10/2018 | Nagasaka | |
| 2018/0308480 A1 | 10/2018 | Jang et al. | |
| 2018/0308485 A1 ‡ | 10/2018 | Kudurshian | G10L 13/02 |
| 2018/0308486 A1 | 10/2018 | Saddler et al. | |
| 2018/0314552 A1 | 11/2018 | Kim et al. | |
| 2018/0315416 A1 | 11/2018 | Berthelsen et al. | |
| 2018/0322112 A1 | 11/2018 | Bellegarda et al. | |
| 2018/0322881 A1 | 11/2018 | Min et al. | |
| 2018/0329677 A1 | 11/2018 | Gruber et al. | |
| 2018/0329957 A1 | 11/2018 | Frazzingaro et al. | |
| 2018/0329982 A1 | 11/2018 | Patel et al. | |
| 2018/0329998 A1 | 11/2018 | Thomson et al. | |
| 2018/0330714 A1 | 11/2018 | Paulik et al. | |
| 2018/0330721 A1 | 11/2018 | Thomson et al. | |
| 2018/0330722 A1 | 11/2018 | Newendorp et al. | |
| 2018/0330723 A1 | 11/2018 | Acero et al. | |
| 2018/0330729 A1 | 11/2018 | Golipour et al. | |
| 2018/0330730 A1 | 11/2018 | Garg et al. | |
| 2018/0330731 A1 | 11/2018 | Zeitlin et al. | |
| 2018/0330733 A1 | 11/2018 | Orr et al. | |
| 2018/0330737 A1 | 11/2018 | Paulik et al. | |
| 2018/0332118 A1 | 11/2018 | Phipps et al. | |
| 2018/0336184 A1 | 11/2018 | Bellegarda et al. | |
| 2018/0336197 A1 | 11/2018 | Skilling et al. | |
| 2018/0336275 A1 | 11/2018 | Graham et al. | |
| 2018/0336439 A1 | 11/2018 | Kliger et al. | |
| 2018/0336449 A1 | 11/2018 | Adan et al. | |
| 2018/0336892 A1 | 11/2018 | Kim et al. | |
| 2018/0336894 A1 | 11/2018 | Graham et al. | |
| 2018/0336904 A1 | 11/2018 | Piercy et al. | |
| 2018/0336905 A1 | 11/2018 | Kim et al. | |
| 2018/0336920 A1 | 11/2018 | Bastian et al. | |
| 2018/0341643 A1 | 11/2018 | Alders et al. | |
| 2018/0343557 A1 | 11/2018 | Naik et al. | |
| 2018/0349084 A1 | 12/2018 | Nagasaka et al. | |
| 2018/0349346 A1 | 12/2018 | Hatori et al. | |
| 2018/0349349 A1 | 12/2018 | Bellegarda et al. | |
| 2018/0349447 A1 | 12/2018 | Maccartney et al. | |
| 2018/0349472 A1 | 12/2018 | Kohlschuetter et al. | |
| 2018/0350345 A1 | 12/2018 | Naik | |
| 2018/0350353 A1 | 12/2018 | Gruber et al. | |
| 2018/0357073 A1 | 12/2018 | Johnson et al. | |
| 2018/0357308 A1 | 12/2018 | Cheyer | |
| 2018/0358015 A1 | 12/2018 | Cash et al. | |
| 2018/0358019 A1 | 12/2018 | Mont-Reynaud | |
| 2018/0365653 A1 | 12/2018 | Cleaver et al. | |
| 2018/0366105 A1 | 12/2018 | Kim | |
| 2018/0373487 A1 | 12/2018 | Gruber et al. | |
| 2018/0374484 A1 | 12/2018 | Huang et al. | |
| 2019/0012141 A1 | 1/2019 | Piersol et al. | |
| 2019/0012449 A1 | 1/2019 | Cheyer | |
| 2019/0013018 A1 | 1/2019 | Rekstad | |
| 2019/0013025 A1 | 1/2019 | Alcorn et al. | |
| 2019/0014450 A1 | 1/2019 | Gruber et al. | |
| 2019/0019077 A1 | 1/2019 | Griffin et al. | |
| 2019/0027152 A1 | 1/2019 | Huang et al. | |
| 2019/0034040 A1 | 1/2019 | Shah et al. | |
| 2019/0034826 A1 | 1/2019 | Ahmad et al. | |
| 2019/0035405 A1 | 1/2019 | Haughay | |
| 2019/0042059 A1 | 2/2019 | Baer | |
| 2019/0042627 A1 | 2/2019 | Osotio et al. | |
| 2019/0043507 A1 | 2/2019 | Huang et al. | |
| 2019/0045040 A1 | 2/2019 | Lee et al. | |
| 2019/0051309 A1 | 2/2019 | Kim et al. | |
| 2019/0057697 A1 | 2/2019 | Giuli et al. | |
| 2019/0065144 A1 | 2/2019 | Sumner et al. | |
| 2019/0065993 A1 | 2/2019 | Srinivasan et al. | |
| 2019/0066674 A1 | 2/2019 | Jaygarl et al. | |
| 2019/0068810 A1 | 2/2019 | Okamoto et al. | |
| 2019/0073998 A1 | 3/2019 | Leblang et al. | |
| 2019/0074009 A1 | 3/2019 | Kim et al. | |
| 2019/0074015 A1 | 3/2019 | Orr et al. | |
| 2019/0074016 A1 | 3/2019 | Orr et al. | |
| 2019/0079476 A1 | 3/2019 | Funes | |
| 2019/0080685 A1 | 3/2019 | Johnson, Jr. | |
| 2019/0080698 A1 | 3/2019 | Miller | |
| 2019/0087412 A1 | 3/2019 | Seyed Ibrahim et al. | |
| 2019/0087455 A1 | 3/2019 | He et al. | |
| 2019/0095050 A1 | 3/2019 | Gruber et al. | |
| 2019/0095171 A1 | 3/2019 | Carson et al. | |
| 2019/0102378 A1 | 4/2019 | Piernot et al. | |
| 2019/0102381 A1 | 4/2019 | Futrell et al. | |
| 2019/0103103 A1 | 4/2019 | Ni et al. | |
| 2019/0103112 A1 | 4/2019 | Walker et al. | |
| 2019/0116264 A1 | 4/2019 | Sanghavi et al. | |
| 2019/0122666 A1 | 4/2019 | Raitio et al. | |
| 2019/0122692 A1 | 4/2019 | Binder et al. | |
| 2019/0124019 A1 | 4/2019 | Leon et al. | |
| 2019/0129615 A1 | 5/2019 | Sundar et al. | |
| 2019/0132694 A1 | 5/2019 | Hanes et al. | |
| 2019/0139541 A1 | 5/2019 | Andersen et al. | |
| 2019/0141494 A1 | 5/2019 | Gross et al. | |
| 2019/0147880 A1 | 5/2019 | Booker et al. | |
| 2019/0149972 A1 | 5/2019 | Parks et al. | |
| 2019/0156830 A1 | 5/2019 | Devaraj et al. | |
| 2019/0158994 A1 | 5/2019 | Gross et al. | |
| 2019/0164546 A1 | 5/2019 | Piernot et al. | |
| 2019/0172467 A1 | 6/2019 | Kim et al. | |
| 2019/0179607 A1 | 6/2019 | Thangarathnam et al. | |
| 2019/0179890 A1 | 6/2019 | Evermann | |
| 2019/0180770 A1 | 6/2019 | Kothari et al. | |
| 2019/0182176 A1 | 6/2019 | Niewczas | |
| 2019/0187787 A1 | 6/2019 | White et al. | |
| 2019/0188326 A1 | 6/2019 | Daianu et al. | |
| 2019/0188328 A1 | 6/2019 | Oyenan et al. | |
| 2019/0189118 A1 | 6/2019 | Piernot et al. | |
| 2019/0189125 A1 | 6/2019 | Van Os et al. | |

(56) References Cited

U.S. PATENT DOCUMENTS

| | | | |
|---|---|---|---|
| 2019/0197053 | A1 | 6/2019 | Graham et al. |
| 2019/0213999 | A1 | 7/2019 | Grupen et al. |
| 2019/0214024 | A1 | 7/2019 | Gruber et al. |
| 2019/0220245 | A1 | 7/2019 | Martel et al. |
| 2019/0220246 | A1 | 7/2019 | Orr et al. |
| 2019/0220247 | A1 | 7/2019 | Lemay et al. |
| 2019/0236130 | A1 | 8/2019 | Li et al. |
| 2019/0236459 | A1 | 8/2019 | Cheyer et al. |
| 2019/0244618 | A1 | 8/2019 | Newendorp et al. |
| 2019/0251339 | A1 | 8/2019 | Hawker |
| 2019/0251960 | A1 | 8/2019 | Maker et al. |
| 2019/0259386 | A1 | 8/2019 | Kudurshian et al. |
| 2019/0272825 | A1 | 9/2019 | O'Malley et al. |
| 2019/0272831 | A1 | 9/2019 | Kajarekar |
| 2019/0273963 | A1 | 9/2019 | Jobanputra et al. |
| 2019/0278841 | A1 | 9/2019 | Pusateri et al. |
| 2019/0287522 | A1 | 9/2019 | Lambourne et al. |
| 2019/0295544 | A1 | 9/2019 | Garcia et al. |
| 2019/0303442 | A1 | 10/2019 | Peitz et al. |
| 2019/0310765 | A1 | 10/2019 | Napolitano et al. |
| 2019/0318739 | A1 | 10/2019 | Garg et al. |
| 2019/0339784 | A1 | 11/2019 | Lemay et al. |
| 2019/0341027 | A1 | 11/2019 | Vescovi et al. |
| 2019/0341056 | A1 | 11/2019 | Paulik et al. |
| 2019/0347063 | A1 | 11/2019 | Liu et al. |
| 2019/0348022 | A1 | 11/2019 | Park et al. |
| 2019/0354548 | A1 | 11/2019 | Orr et al. |
| 2019/0355346 | A1 | 11/2019 | Bellegarda |
| 2019/0361729 | A1 | 11/2019 | Gruber et al. |
| 2019/0369748 | A1 | 12/2019 | Hindi et al. |
| 2019/0369842 | A1 | 12/2019 | Dolbakian et al. |
| 2019/0370292 | A1 | 12/2019 | Irani et al. |
| 2019/0370323 | A1 | 12/2019 | Davidson et al. |
| 2019/0371315 | A1 | 12/2019 | Newendorp et al. |
| 2019/0371316 | A1 | 12/2019 | Weinstein et al. |
| 2019/0371317 | A1 | 12/2019 | Irani et al. |
| 2019/0371331 | A1 | 12/2019 | Schramm et al. |
| 2019/0372902 | A1 | 12/2019 | Piersol |
| 2019/0373102 | A1 | 12/2019 | Weinstein et al. |
| 2020/0019609 | A1 | 1/2020 | Yu et al. |
| 2020/0042334 | A1 | 2/2020 | Radebaugh et al. |
| 2020/0043482 | A1 | 2/2020 | Gruber et al. |
| 2020/0043489 | A1 | 2/2020 | Bradley et al. |
| 2020/0044485 | A1 | 2/2020 | Smith et al. |
| 2020/0053218 | A1 | 2/2020 | Gray |
| 2020/0058299 | A1 | 2/2020 | Lee et al. |
| 2020/0075018 | A1 | 3/2020 | Chen |
| 2020/0091958 | A1 | 3/2020 | Curtis et al. |
| 2020/0092625 | A1 | 3/2020 | Raffle |
| 2020/0098362 | A1 | 3/2020 | Piernot et al. |
| 2020/0098368 | A1 | 3/2020 | Lemay et al. |
| 2020/0104357 | A1 | 4/2020 | Bellegarda et al. |
| 2020/0104362 | A1 | 4/2020 | Yang et al. |
| 2020/0104369 | A1 | 4/2020 | Bellegarda |
| 2020/0104668 | A1 | 4/2020 | Sanghavi et al. |
| 2020/0105260 | A1 | 4/2020 | Piernot et al. |
| 2020/0125820 | A1 | 4/2020 | Kim et al. |
| 2020/0127988 | A1 | 4/2020 | Bradley et al. |
| 2020/0135209 | A1 | 4/2020 | Delfarah et al. |
| 2020/0137230 | A1 | 4/2020 | Spohrer |
| 2020/0143812 | A1 | 5/2020 | Walker, II et al. |
| 2020/0159579 | A1 | 5/2020 | Shear et al. |
| 2020/0160179 | A1 | 5/2020 | Chien et al. |
| 2020/0169637 | A1 | 5/2020 | Sanghavi et al. |
| 2020/0175566 | A1 | 6/2020 | Bender et al. |
| 2020/0184964 | A1 | 6/2020 | Myers et al. |
| 2020/0193997 | A1 | 6/2020 | Piernot et al. |
| 2020/0221155 | A1 | 7/2020 | Hansen et al. |
| 2020/0227034 | A1 | 7/2020 | Summa et al. |
| 2020/0227044 | A1 | 7/2020 | Lindahl |
| 2020/0249985 | A1 | 8/2020 | Zeitlin |
| 2020/0252508 | A1 | 8/2020 | Gray |
| 2020/0267222 | A1 | 8/2020 | Phipps et al. |
| 2020/0272485 | A1 | 8/2020 | Karashchuk et al. |
| 2020/0279556 | A1 | 9/2020 | Gruber et al. |
| 2020/0279576 | A1 | 9/2020 | Binder et al. |
| 2020/0279627 | A1 | 9/2020 | Nida et al. |
| 2020/0285327 | A1 | 9/2020 | Hindi et al. |
| 2020/0286472 | A1 | 9/2020 | Newendorp et al. |
| 2020/0286493 | A1 | 9/2020 | Orr et al. |
| 2020/0302356 | A1 | 9/2020 | Gruber et al. |
| 2020/0302919 | A1 | 9/2020 | Greborio et al. |
| 2020/0302925 | A1 | 9/2020 | Shah et al. |
| 2020/0302932 | A1 | 9/2020 | Schramm et al. |
| 2020/0304955 | A1 | 9/2020 | Gross et al. |
| 2020/0304972 | A1 | 9/2020 | Gross et al. |
| 2020/0305084 | A1 | 9/2020 | Freeman et al. |
| 2020/0312317 | A1 | 10/2020 | Kothari et al. |
| 2020/0314191 | A1 | 10/2020 | Madhavan et al. |
| 2020/0319850 | A1 | 10/2020 | Stasior et al. |
| 2020/0327895 | A1 | 10/2020 | Gruber et al. |
| 2020/0356243 | A1 | 11/2020 | Meyer et al. |
| 2020/0357391 | A1 | 11/2020 | Ghoshal et al. |
| 2020/0357406 | A1 | 11/2020 | York et al. |
| 2020/0357409 | A1 | 11/2020 | Sun et al. |
| 2020/0364411 | A1 | 11/2020 | Evermann |
| 2020/0365155 | A1 | 11/2020 | Milden |
| 2020/0372904 | A1 | 11/2020 | Vescovi et al. |
| 2020/0374243 | A1 | 11/2020 | Jina et al. |
| 2020/0379610 | A1 | 12/2020 | Ford et al. |
| 2020/0379640 | A1 | 12/2020 | Bellegarda et al. |
| 2020/0379726 | A1 | 12/2020 | Blatz et al. |
| 2020/0379727 | A1 | 12/2020 | Blatz et al. |
| 2020/0379728 | A1 | 12/2020 | Gada et al. |
| 2020/0380389 | A1 | 12/2020 | Eldeeb et al. |
| 2020/0380956 | A1 | 12/2020 | Rossi et al. |
| 2020/0380963 | A1 | 12/2020 | Chappidi et al. |
| 2020/0380966 | A1 | 12/2020 | Acero et al. |
| 2020/0380973 | A1 | 12/2020 | Novitchenko et al. |
| 2020/0380980 | A1 | 12/2020 | Shum et al. |
| 2020/0380985 | A1 | 12/2020 | Gada et al. |
| 2020/0382616 | A1 | 12/2020 | Vaishampayan et al. |
| 2020/0382635 | A1 | 12/2020 | Vora et al. |

FOREIGN PATENT DOCUMENTS

| | | | | | |
|---|---|---|---|---|---|
| AU | 2015101171 | A4 | | 10/2015 | |
| AU | 2018100187 | A4 | | 3/2018 | |
| AU | 2017222436 | A1 | | 10/2018 | |
| CA | 2670562 | A1 | | 1/2010 | |
| CA | 2694314 | A1 | | 8/2010 | |
| CA | 2792412 | A1 | | 7/2011 | |
| CA | 2666438 | C | ‡ | 6/2013 | ........ H04M 1/72563 |
| CA | 2666438 | C | | 6/2013 | |
| CH | 681573 | A5 | ‡ | 4/1993 | ........... G07F 19/201 |
| CH | 681573 | A5 | | 4/1993 | |
| CN | 1263385 | A | ‡ | 8/2000 | .......... H04W 52/027 |
| CN | 1263385 | A | | 8/2000 | |
| CN | 1274440 | A | ‡ | 11/2000 | ......... G06F 15/0225 |
| CN | 1274440 | A | | 11/2000 | |
| CN | 1369858 | A | | 9/2002 | |
| CN | 1369858 | A | ‡ | 9/2002 | ........ G06K 9/00221 |
| CN | 1378156 | A | ‡ | 11/2002 | ............. G06F 16/58 |
| CN | 1378156 | A | | 11/2002 | |
| CN | 1383109 | A | ‡ | 12/2002 | |
| CN | 1383109 | A | | 12/2002 | |
| CN | 1407795 | A | | 4/2003 | |
| CN | 1407795 | A | ‡ | 4/2003 | ......... H04N 21/4396 |
| CN | 1125436 | C | ‡ | 10/2003 | ............. G10L 15/22 |
| CN | 1125436 | C | | 10/2003 | |
| CN | 1471098 | A | | 1/2004 | |
| CN | 1471098 | A | ‡ | 1/2004 | ............. H04N 5/783 |
| CN | 1494695 | A | | 5/2004 | |
| CN | 1494695 | A | ‡ | 5/2004 | ........... H04L 51/063 |
| CN | 1535519 | A | ‡ | 10/2004 | ............. H04L 47/50 |
| CN | 1535519 | A | | 10/2004 | |
| CN | 1640191 | A | ‡ | 7/2005 | ......... G10L 21/0364 |
| CN | 1640191 | A | | 7/2005 | |
| CN | 1641563 | A | | 7/2005 | |
| CN | 1673939 | A | ‡ | 9/2005 | |
| CN | 1673939 | A | | 9/2005 | |
| CN | 1864204 | A | | 11/2006 | |
| CN | 1864204 | A | ‡ | 11/2006 | ............. G10L 15/32 |
| CN | 1898721 | A | ‡ | 1/2007 | ............. G01C 21/00 |

(56) References Cited

FOREIGN PATENT DOCUMENTS

| | | | | | |
|---|---|---|---|---|---|
| CN | 1898721 | A | | 1/2007 | |
| CN | 2865153 | Y | | 1/2007 | |
| CN | 2865153 | Y | ‡ | 1/2007 | |
| CN | 1959628 | A | | 5/2007 | |
| CN | 1959628 | A | ‡ | 5/2007 | |
| CN | 1975715 | A | | 6/2007 | |
| CN | 1975715 | A | ‡ | 6/2007 | G06F 17/275 |
| CN | 1995917 | A | | 7/2007 | |
| CN | 1995917 | A | ‡ | 7/2007 | |
| CN | 101008942 | A | ‡ | 8/2007 | |
| CN | 101008942 | A | | 8/2007 | |
| CN | 101162153 | A | ‡ | 4/2008 | |
| CN | 101162153 | A | | 4/2008 | |
| CN | 101179754 | A | ‡ | 5/2008 | |
| CN | 101179754 | A | | 5/2008 | |
| CN | 101183525 | A | ‡ | 5/2008 | G10L 15/26 |
| CN | 101183525 | A | | 5/2008 | |
| CN | 101188644 | A | | 5/2008 | |
| CN | 101188644 | A | ‡ | 5/2008 | |
| CN | 101228503 | A | | 7/2008 | |
| CN | 101228503 | A | ‡ | 7/2008 | G06F 9/453 |
| CN | 101233741 | A | | 7/2008 | |
| CN | 101233741 | A | ‡ | 7/2008 | H04W 4/029 |
| CN | 101246020 | A | ‡ | 8/2008 | |
| CN | 101246020 | A | | 8/2008 | |
| CN | 101297541 | A | | 10/2008 | |
| CN | 101297541 | A | ‡ | 10/2008 | H04M 7/0045 |
| CN | 101427244 | A | | 5/2009 | |
| CN | 101427244 | A | ‡ | 5/2009 | G06F 17/289 |
| CN | 101535983 | A | ‡ | 9/2009 | G10L 25/51 |
| CN | 101535983 | A | | 9/2009 | |
| CN | 101632316 | A | ‡ | 1/2010 | H04W 4/08 |
| CN | 101632316 | A | | 1/2010 | |
| CN | 101636736 | A | | 1/2010 | |
| CN | 101636736 | A | ‡ | 1/2010 | H04L 67/02 |
| CN | 101667424 | A | | 3/2010 | |
| CN | 101673544 | A | ‡ | 3/2010 | G10L 15/22 |
| CN | 101673544 | A | | 3/2010 | |
| CN | 101751387 | A | | 6/2010 | |
| CN | 101833286 | A | | 9/2010 | |
| CN | 101847405 | A | | 9/2010 | |
| CN | 101847405 | A | ‡ | 9/2010 | G10L 15/1815 |
| CN | 101855521 | A | | 10/2010 | |
| CN | 101894547 | A | | 11/2010 | |
| CN | 101894547 | A | ‡ | 11/2010 | |
| CN | 101910960 | A | | 12/2010 | |
| CN | 101923853 | A | | 12/2010 | |
| CN | 101930789 | A | | 12/2010 | |
| CN | 101939740 | A | ‡ | 1/2011 | G06Q 30/0261 |
| CN | 101939740 | A | | 1/2011 | |
| CN | 101951553 | A | ‡ | 1/2011 | |
| CN | 101951553 | A | | 1/2011 | |
| CN | 101958958 | A | | 1/2011 | |
| CN | 101971250 | A | | 2/2011 | |
| CN | 101992779 | A | | 3/2011 | |
| CN | 102056026 | A | | 5/2011 | |
| CN | 102122506 | A | | 7/2011 | |
| CN | 102124515 | A | | 7/2011 | |
| CN | 102137085 | A | | 7/2011 | |
| CN | 102137193 | A | | 7/2011 | |
| CN | 102160043 | A | ‡ | 8/2011 | G10L 15/32 |
| CN | 102160043 | A | | 8/2011 | |
| CN | 102201235 | A | | 9/2011 | |
| CN | 102214187 | A | | 10/2011 | |
| CN | 102237088 | A | | 11/2011 | |
| CN | 102246136 | A | | 11/2011 | |
| CN | 102246136 | A | ‡ | 11/2011 | G06F 3/165 |
| CN | 202035047 | U | ‡ | 11/2011 | |
| CN | 202035047 | U | | 11/2011 | |
| CN | 102282609 | A | | 12/2011 | |
| CN | 202092650 | U | | 12/2011 | |
| CN | 202092650 | U | ‡ | 12/2011 | |
| CN | 102340590 | A | | 2/2012 | |
| CN | 102346557 | A | | 2/2012 | |
| CN | 102368256 | A | | 3/2012 | |
| CN | 102402985 | A | | 4/2012 | |
| CN | 102405463 | A | | 4/2012 | |
| CN | 102498457 | A | | 6/2012 | |
| CN | 102510426 | A | | 6/2012 | |
| CN | 102629246 | A | | 8/2012 | |
| CN | 102651217 | A | | 8/2012 | |
| CN | 102681896 | A | | 9/2012 | |
| CN | 102682769 | A | | 9/2012 | |
| CN | 102682771 | A | | 9/2012 | |
| CN | 102685295 | A | | 9/2012 | |
| CN | 102693725 | A | | 9/2012 | |
| CN | 102694909 | A | | 9/2012 | |
| CN | 202453859 | U | | 9/2012 | |
| CN | 102722478 | A | | 10/2012 | |
| CN | 102737104 | A | | 10/2012 | |
| CN | 102750087 | A | | 10/2012 | |
| CN | 102792320 | A | | 11/2012 | |
| CN | 102801853 | A | | 11/2012 | |
| CN | 102820033 | A | | 12/2012 | |
| CN | 102844738 | A | | 12/2012 | |
| CN | 102866828 | A | | 1/2013 | |
| CN | 102870065 | A | | 1/2013 | |
| CN | 102882752 | A | | 1/2013 | |
| CN | 102917004 | A | | 2/2013 | |
| CN | 102917271 | A | | 2/2013 | |
| CN | 102918493 | A | | 2/2013 | |
| CN | 102955652 | A | | 3/2013 | |
| CN | 103035240 | A | | 4/2013 | |
| CN | 103035251 | A | | 4/2013 | |
| CN | 103038728 | A | | 4/2013 | |
| CN | 103093334 | A | | 5/2013 | |
| CN | 103135916 | A | | 6/2013 | |
| CN | 103198831 | A | | 7/2013 | |
| CN | 103209369 | A | | 7/2013 | |
| CN | 103226949 | A | | 7/2013 | |
| CN | 103236260 | A | | 8/2013 | |
| CN | 103246638 | A | | 8/2013 | |
| CN | 103268315 | A | | 8/2013 | |
| CN | 103280218 | A | | 9/2013 | |
| CN | 103292437 | A | | 9/2013 | |
| CN | 103327063 | A | | 9/2013 | |
| CN | 103365279 | A | | 10/2013 | |
| CN | 103366741 | A | | 10/2013 | |
| CN | 103390016 | A | | 11/2013 | |
| CN | 103412789 | A | | 11/2013 | |
| CN | 103426428 | A | | 12/2013 | |
| CN | 103455234 | A | | 12/2013 | |
| CN | 103456306 | A | | 12/2013 | |
| CN | 103533143 | A | | 1/2014 | |
| CN | 103533154 | A | | 1/2014 | |
| CN | 103543902 | A | | 1/2014 | |
| CN | 103562863 | A | | 2/2014 | |
| CN | 103608859 | A | | 2/2014 | |
| CN | 103645876 | A | | 3/2014 | |
| CN | 103716454 | A | | 4/2014 | |
| CN | 103727948 | A | | 4/2014 | |
| CN | 103744761 | A | | 4/2014 | |
| CN | 103760984 | A | | 4/2014 | |
| CN | 103765385 | A | | 4/2014 | |
| CN | 103792985 | A | | 5/2014 | |
| CN | 103794212 | A | | 5/2014 | |
| CN | 103795850 | A | | 5/2014 | |
| CN | 103841268 | A | | 6/2014 | |
| CN | 103902373 | A | | 7/2014 | |
| CN | 103930945 | A | | 7/2014 | |
| CN | 103959751 | A | | 7/2014 | |
| CN | 203721183 | U | | 7/2014 | |
| CN | 103971680 | A | | 8/2014 | |
| CN | 104007832 | A | | 8/2014 | |
| CN | 104038621 | A | | 9/2014 | |
| CN | 104090652 | A | | 10/2014 | |
| CN | 104113471 | A | | 10/2014 | |
| CN | 104125322 | A | | 10/2014 | |
| CN | 104144377 | A | | 11/2014 | |
| CN | 104169837 | A | | 11/2014 | |
| CN | 104180815 | A | | 12/2014 | |
| CN | 104243699 | A | | 12/2014 | |
| CN | 104281259 | A | | 1/2015 | |
| CN | 104284257 | A | | 1/2015 | |

(56) References Cited

FOREIGN PATENT DOCUMENTS

| | | | | |
|---|---|---|---|---|
| CN | 104335207 A | | 2/2015 | |
| CN | 104335234 A | | 2/2015 | |
| CN | 104374399 A | | 2/2015 | |
| CN | 104423625 A | | 3/2015 | |
| CN | 104427104 A | | 3/2015 | |
| CN | 104463552 A | | 3/2015 | |
| CN | 104487929 A | | 4/2015 | |
| CN | 104516522 A | | 4/2015 | |
| CN | 104573472 A | | 4/2015 | |
| CN | 104575501 A | | 4/2015 | |
| CN | 104584010 A | | 4/2015 | |
| CN | 104604274 A | | 5/2015 | |
| CN | 104679472 A | | 6/2015 | |
| CN | 104769584 A | | 7/2015 | |
| CN | 104854583 A | | 8/2015 | |
| CN | 104869342 A | | 8/2015 | |
| CN | 104951077 A | | 9/2015 | |
| CN | 104967748 A | | 10/2015 | |
| CN | 104969289 A | | 10/2015 | |
| CN | 104978963 A | | 10/2015 | |
| CN | 105025051 A | | 11/2015 | |
| CN | 105027197 A | | 11/2015 | |
| CN | 105093526 A | | 11/2015 | |
| CN | 105100356 A | | 11/2015 | |
| CN | 105190607 A | | 12/2015 | |
| CN | 105247511 A | | 1/2016 | |
| CN | 105264524 A | | 1/2016 | |
| CN | 105278681 A | | 1/2016 | |
| CN | 105320251 A | | 2/2016 | |
| CN | 105320726 A | | 2/2016 | |
| CN | 105379234 A | | 3/2016 | |
| CN | 105430186 A | | 3/2016 | |
| CN | 105471705 A | | 4/2016 | |
| CN | 105472587 A | | 4/2016 | |
| CN | 105556592 A | | 5/2016 | |
| CN | 105808200 A | | 7/2016 | |
| CN | 105830048 A | | 8/2016 | |
| CN | 105869641 A | | 8/2016 | |
| CN | 106030699 A | | 10/2016 | |
| CN | 106062734 A | | 10/2016 | |
| CN | 106415412 A | | 2/2017 | |
| CN | 106462383 A | | 2/2017 | |
| CN | 106463114 A | | 2/2017 | |
| CN | 106465074 A | | 2/2017 | |
| CN | 106534469 A | | 3/2017 | |
| CN | 106776581 A | | 5/2017 | |
| CN | 107450800 A | | 12/2017 | |
| CN | 107480161 A | | 12/2017 | |
| CN | 107491468 A | | 12/2017 | |
| CN | 107545262 A | | 1/2018 | |
| CN | 107608998 A | | 1/2018 | |
| CN | 107615378 A | | 1/2018 | |
| CN | 107919123 A | | 4/2018 | |
| CN | 107924313 A | | 4/2018 | |
| CN | 107978313 A | | 5/2018 | |
| CN | 108647681 A | | 10/2018 | |
| CN | 109447234 A | | 3/2019 | |
| CN | 109657629 A | | 4/2019 | |
| CN | 110135411 A | | 8/2019 | |
| CN | 110531860 A | | 12/2019 | |
| CN | 110598671 A | | 12/2019 | |
| CN | 110647274 A | | 1/2020 | |
| CN | 110825469 A | | 2/2020 | |
| DE | 3837590 A1 | ‡ | 5/1990 | |
| DE | 3837590 A1 | | 5/1990 | |
| DE | 4126902 A1 | ‡ | 2/1992 | |
| DE | 4126902 A1 | | 2/1992 | |
| DE | 4334773 A1 | | 4/1994 | |
| DE | 4334773 A1 | ‡ | 4/1994 | |
| DE | 4445023 A1 | | 6/1996 | |
| DE | 4445023 A1 | ‡ | 6/1996 | |
| DE | 002004029203 A1 | | 12/2005 | |
| DE | 10200402920 3 A1 | ‡ | 12/2005 | |
| DE | 19841541 B4 | | 12/2007 | |
| DE | 19841541 B4 | ‡ | 12/2007 | ........... G07F 17/305 |
| DE | 10200802425 8 A1 | ‡ | 11/2009 | |
| DE | 102008024258 A1 | | 11/2009 | |
| DE | 202016008226 U1 | | 5/2017 | |
| EP | 30390 A1 | ‡ | 6/1981 | |
| EP | 30390 A1 | | 6/1981 | |
| EP | 57514 A1 | ‡ | 8/1982 | |
| EP | 57514 A1 | | 8/1982 | |
| EP | 59880 A2 | ‡ | 9/1982 | |
| EP | 59880 A2 | | 9/1982 | |
| EP | 138061 A1 | | 4/1985 | |
| EP | 138061 A1 | ‡ | 4/1985 | |
| EP | 140777 A1 | ‡ | 5/1985 | |
| EP | 140777 A1 | | 5/1985 | |
| EP | 218859 A2 | ‡ | 4/1987 | |
| EP | 218859 A2 | | 4/1987 | |
| EP | 262938 A1 | ‡ | 4/1988 | |
| EP | 262938 A1 | | 4/1988 | |
| EP | 138061 B1 | ‡ | 6/1988 | |
| EP | 138061 B1 | | 6/1988 | |
| EP | 283995 A2 | ‡ | 9/1988 | |
| EP | 283995 A2 | | 9/1988 | |
| EP | 293259 A2 | ‡ | 11/1988 | |
| EP | 293259 A2 | | 11/1988 | |
| EP | 299572 A2 | ‡ | 1/1989 | |
| EP | 299572 A2 | | 1/1989 | |
| EP | 313975 A2 | | 5/1989 | |
| EP | 313975 A2 | ‡ | 5/1989 | |
| EP | 314908 A2 | | 5/1989 | |
| EP | 314908 A2 | ‡ | 5/1989 | |
| EP | 327408 A2 | ‡ | 8/1989 | |
| EP | 327408 A2 | | 8/1989 | |
| EP | 389271 A2 | ‡ | 9/1990 | |
| EP | 389271 A2 | | 9/1990 | |
| EP | 411675 A2 | ‡ | 2/1991 | |
| EP | 411675 A2 | | 2/1991 | |
| EP | 441089 A2 | ‡ | 8/1991 | |
| EP | 441089 A2 | | 8/1991 | |
| EP | 464712 A2 | | 1/1992 | |
| EP | 464712 A2 | ‡ | 1/1992 | |
| EP | 476972 A2 | | 3/1992 | |
| EP | 476972 A2 | ‡ | 3/1992 | |
| EP | 534410 A2 | ‡ | 3/1993 | |
| EP | 534410 A2 | | 3/1993 | |
| EP | 558312 A1 | | 9/1993 | |
| EP | 558312 A1 | ‡ | 9/1993 | |
| EP | 559349 A1 | ‡ | 9/1993 | |
| EP | 559349 A1 | | 9/1993 | |
| EP | 570660 A1 | ‡ | 11/1993 | |
| EP | 570660 A1 | | 11/1993 | |
| EP | 575146 A2 | | 12/1993 | |
| EP | 575146 A2 | ‡ | 12/1993 | |
| EP | 578604 A1 | | 1/1994 | |
| EP | 578604 A1 | ‡ | 1/1994 | |
| EP | 586996 A2 | | 3/1994 | |
| EP | 586996 A2 | ‡ | 3/1994 | |
| EP | 609030 A1 | | 8/1994 | |
| EP | 609030 A1 | ‡ | 8/1994 | |
| EP | 651543 A2 | | 5/1995 | |
| EP | 651543 A2 | ‡ | 5/1995 | |
| EP | 679005 A1 | | 10/1995 | |
| EP | 679005 A1 | ‡ | 10/1995 | |
| EP | 795811 A1 | ‡ | 9/1997 | |
| EP | 795811 A1 | | 9/1997 | |
| EP | 476972 B1 | ‡ | 5/1998 | |
| EP | 476972 B1 | | 5/1998 | |
| EP | 845894 A2 | ‡ | 6/1998 | |
| EP | 845894 A2 | | 6/1998 | |
| EP | 852052 A1 | | 7/1998 | |
| EP | 852052 A1 | ‡ | 7/1998 | |
| EP | 863453 A1 | ‡ | 9/1998 | |
| EP | 863453 A1 | | 9/1998 | |
| EP | 863469 A2 | ‡ | 9/1998 | |
| EP | 863469 A2 | | 9/1998 | |
| EP | 867860 A2 | | 9/1998 | |
| EP | 867860 A2 | ‡ | 9/1998 | |
| EP | 869697 A2 | | 10/1998 | |
| EP | 869697 A2 | ‡ | 10/1998 | |
| EP | 559349 B1 | | 1/1999 | |
| EP | 559349 B1 | ‡ | 1/1999 | |

(56) References Cited

FOREIGN PATENT DOCUMENTS

EP 889626 A1 ‡ 1/1999
EP 889626 A1 1/1999
EP 917077 A2 5/1999
EP 917077 A2 ‡ 5/1999
EP 691023 B1 ‡ 9/1999
EP 691023 B1 9/1999
EP 946032 A2 ‡ 9/1999
EP 946032 A2 9/1999
EP 981236 A1 ‡ 2/2000
EP 981236 A1 2/2000
EP 982732 A1 ‡ 3/2000
EP 982732 A1 3/2000
EP 984430 A2 3/2000
EP 984430 A2 ‡ 3/2000
EP 1001588 A2 5/2000
EP 1001588 A2 ‡ 5/2000 .......... H04M 1/2745
EP 1014277 A1 ‡ 6/2000
EP 1014277 A1 6/2000
EP 1028425 A2 ‡ 8/2000 ........... G11B 27/105
EP 1028425 A2 8/2000
EP 1028426 A2 8/2000
EP 1028426 A2 ‡ 8/2000 ......... H04N 21/4135
EP 1047251 A2 ‡ 10/2000 .......... H04M 1/6505
EP 1047251 A2 10/2000
EP 1052566 A1 ‡ 11/2000
EP 1052566 A1 11/2000
EP 1076302 A1 ‡ 2/2001
EP 1076302 A1 2/2001
EP 1091615 A1 ‡ 4/2001
EP 1091615 A1 4/2001
EP 1094406 A2 4/2001
EP 1094406 A2 ‡ 4/2001 ......... G06F 16/3334
EP 1107229 A2 ‡ 6/2001 ......... G10L 15/1822
EP 1107229 A2 6/2001
EP 1229496 A2 8/2002
EP 1229496 A2 ‡ 8/2002 ............. G06F 21/32
EP 1233600 A2 ‡ 8/2002 ........ H04M 1/72519
EP 1233600 A2 8/2002
EP 1245023 A1 ‡ 10/2002
EP 1245023 A1 10/2002
EP 1246075 A2 10/2002
EP 1246075 A2 ‡ 10/2002 ......... G06F 17/2715
EP 1280326 A1 1/2003
EP 1280326 A1 ‡ 1/2003
EP 1291848 A2 3/2003
EP 1291848 A2 ‡ 3/2003 ............. G10L 13/08
EP 1311102 A1 ‡ 5/2003
EP 1311102 A1 5/2003
EP 1315084 A1 5/2003
EP 1315084 A1 ‡ 5/2003
EP 1315086 A1 ‡ 5/2003
EP 1315086 A1 5/2003
EP 1347361 A1 ‡ 9/2003
EP 1347361 A1 9/2003
EP 1368961 A2 ‡ 12/2003 ............. G06Q 10/10
EP 1368961 A2 12/2003
EP 1379061 A2 1/2004
EP 1379061 A2 ‡ 1/2004 .......... H04M 1/7255
EP 1432219 A1 6/2004
EP 1432219 A1 ‡ 6/2004
EP 1435620 A1 ‡ 7/2004
EP 1435620 A1 7/2004
EP 1480421 A1 ‡ 11/2004
EP 1480421 A1 11/2004
EP 1517228 A2 ‡ 3/2005 ........... G06F 3/0486
EP 1517228 A2 3/2005
EP 1536612 A1 6/2005
EP 1536612 A1 ‡ 6/2005
EP 1566948 A1 ‡ 8/2005
EP 1566948 A1 8/2005
EP 1650938 A1 4/2006
EP 1650938 A1 ‡ 4/2006
EP 1675025 A2 6/2006
EP 1675025 A2 ‡ 6/2006 ........... G06F 16/951
EP 1693829 A1 8/2006
EP 1693829 A1 ‡ 8/2006
EP 1699042 A1 ‡ 9/2006
EP 1699042 A1 9/2006
EP 1739546 A2 1/2007
EP 1739546 A2 ‡ 1/2007 ............. G10L 15/26
EP 1181802 B1 2/2007
EP 1181802 B1 ‡ 2/2007 ...... H04M 1/274525
EP 1818786 A1 8/2007
EP 1818786 A1 ‡ 8/2007
EP 1892700 A1 ‡ 2/2008
EP 1892700 A1 2/2008
EP 1912205 A2 ‡ 4/2008 ............. G10L 15/26
EP 1912205 A2 4/2008
EP 1939860 A1 ‡ 7/2008
EP 1939860 A1 7/2008
EP 651543 B1 ‡ 9/2008
EP 651543 B1 9/2008
EP 1909263 B1 1/2009
EP 1909263 B1 ‡ 1/2009 ........... G10L 15/005
EP 1335620 B1 3/2009
EP 1335620 B1 ‡ 3/2009 ............ H04W 4/029
EP 2069895 A1 6/2009
EP 2069895 A1 ‡ 6/2009
EP 2094032 A1 ‡ 8/2009
EP 2094032 A1 8/2009
EP 2107553 A1 10/2009
EP 2107553 A1 ‡ 10/2009
EP 2109295 A1 ‡ 10/2009
EP 2109295 A1 10/2009
EP 2144226 A1 1/2010
EP 2168399 A1 3/2010
EP 1720375 B1 7/2010
EP 1720375 B1 ‡ 7/2010 ............. H04L 69/08
EP 2205010 A1 ‡ 7/2010
EP 2205010 A1 7/2010
EP 2250640 A1 11/2010
EP 2309491 A1 ‡ 4/2011
EP 2309491 A1 4/2011
EP 2329348 A1 6/2011
EP 2339576 A2 6/2011
EP 2355093 A2 8/2011
EP 2393056 A1 12/2011
EP 2400373 A1 ‡ 12/2011
EP 2400373 A1 12/2011
EP 2431842 A2 ‡ 3/2012 ......... G06F 3/04883
EP 2431842 A2 3/2012
EP 2523109 A1 11/2012
EP 2523188 A1 11/2012
EP 2551784 A1 ‡ 1/2013
EP 2551784 A1 1/2013
EP 2555536 A1 ‡ 2/2013
EP 2555536 A1 2/2013
EP 2575128 A2 ‡ 4/2013 ......... G10L 15/1822
EP 2575128 A2 4/2013
EP 2632129 A1 8/2013
EP 2639792 A1 9/2013
EP 2669889 A2 12/2013
EP 2672229 A2 12/2013
EP 2672231 A2 12/2013
EP 2675147 A1 12/2013
EP 2680257 A1 1/2014
EP 2683147 A1 1/2014
EP 2683175 A1 1/2014
EP 2717259 A2 4/2014
EP 2725577 A2 4/2014
EP 2733598 A2 5/2014
EP 2733598 A2 ‡ 5/2014 ........... G06F 3/0488
EP 2733896 A1 5/2014
EP 2743846 A2 6/2014
EP 2760015 A1 7/2014
EP 2781883 A2 9/2014
EP 2801890 A1 11/2014
EP 2801890 A1 ‡ 11/2014
EP 2801972 A1 ‡ 11/2014
EP 2801972 A1 11/2014
EP 2801974 A2 11/2014
EP 2824564 A1 1/2015
EP 2849177 A1 3/2015
EP 2879402 A1 6/2015

(56) References Cited

FOREIGN PATENT DOCUMENTS

| | | | | | |
|---|---|---|---|---|---|
| EP | 2881939 | A1 | | 6/2015 | |
| EP | 2891049 | A1 | | 7/2015 | |
| EP | 2930715 | A1 | | 10/2015 | |
| EP | 2938022 | A1 | | 10/2015 | |
| EP | 2940556 | A1 | ‡ | 11/2015 | |
| EP | 2940556 | A1 | | 11/2015 | |
| EP | 2947859 | A1 | | 11/2015 | |
| EP | 2950307 | A1 | | 12/2015 | |
| EP | 2957986 | A1 | | 12/2015 | |
| EP | 2985984 | A2 | | 2/2016 | |
| EP | 2891049 | A4 | | 3/2016 | |
| EP | 3032532 | A1 | | 6/2016 | |
| EP | 3035329 | A1 | | 6/2016 | |
| EP | 3038333 | A1 | | 6/2016 | |
| EP | 3115905 | A1 | | 1/2017 | |
| EP | 3125097 | A2 | | 2/2017 | |
| EP | 3224708 | A1 | | 10/2017 | |
| EP | 3246916 | A1 | | 11/2017 | |
| EP | 3300074 | A1 | | 3/2018 | |
| EP | 2983065 | B1 | | 8/2018 | |
| EP | 3392876 | A1 | | 10/2018 | |
| EP | 3401773 | A1 | | 11/2018 | |
| EP | 3506151 | A1 | | 7/2019 | |
| FR | 2911201 | A1 | ‡ | 7/2008 | |
| FR | 2911201 | A1 | | 7/2008 | |
| GB | 2293667 | A | | 4/1996 | |
| GB | 2293667 | A | ‡ | 4/1996 | .......... G06F 16/242 |
| GB | 2310559 | A | | 8/1997 | |
| GB | 2310559 | A | ‡ | 8/1997 | .......... G06D 1/1626 |
| GB | 2323694 | A | | 9/1998 | |
| GB | 2323694 | A | ‡ | 9/1998 | .......... H04M 3/5307 |
| GB | 2342802 | A | ‡ | 4/2000 | ............... H04N 7/15 |
| GB | 2342802 | A | | 4/2000 | |
| GB | 2343285 | A | | 5/2000 | |
| GB | 2343285 | A | ‡ | 5/2000 | ............. G10L 15/22 |
| GB | -2343285 | A | ‡ | 5/2000 | ............. G10L 15/22 |
| GB | 2346500 | A | | 8/2000 | |
| GB | 2346500 | A | ‡ | 8/2000 | .......... H04W 52/027 |
| GB | 2352377 | A | ‡ | 1/2001 | .............. H04M 1/19 |
| GB | 2352377 | A | | 1/2001 | |
| GB | 2384399 | A | ‡ | 7/2003 | ............. H04L 29/06 |
| GB | 2384399 | A | | 7/2003 | |
| GB | 2402855 | A | | 12/2004 | |
| GB | 2402855 | A | ‡ | 12/2004 | ........... G06F 17/275 |
| GB | 2445436 | A | | 7/2008 | |
| GB | 2445436 | A | ‡ | 7/2008 | ........ H04M 1/72563 |
| GB | 2470585 | A1 | | 12/2010 | |
| IT | FI20010199 | A1 | ‡ | 4/2003 | |
| IT | FI20010199 | A1 | | 4/2003 | |
| JP | 55-80084 | A | ‡ | 6/1980 | |
| JP | 55-80084 | A | | 6/1980 | |
| JP | 57-41731 | A | ‡ | 3/1982 | |
| JP | 57-41731 | A | | 3/1982 | |
| JP | 59-57336 | A | | 4/1984 | |
| JP | 59-57336 | A | ‡ | 4/1984 | |
| JP | 62-153326 | A | | 7/1987 | |
| JP | 62-153326 | A | ‡ | 7/1987 | |
| JP | 1-500631 | A | | 3/1989 | |
| JP | 1-500631 | A | ‡ | 3/1989 | |
| JP | 1-254742 | A | | 10/1989 | |
| JP | 1-254742 | A | ‡ | 10/1989 | |
| JP | 2-86397 | A | ‡ | 3/1990 | |
| JP | 2-86397 | A | | 3/1990 | |
| JP | 2-153415 | A | | 6/1990 | |
| JP | 2-153415 | A | ‡ | 6/1990 | |
| JP | 3-113578 | A | ‡ | 5/1991 | |
| JP | 3-113578 | A | | 5/1991 | |
| JP | 4-236624 | A | | 8/1992 | |
| JP | 4-236624 | A | ‡ | 8/1992 | |
| JP | 5-79951 | A | | 3/1993 | |
| JP | 5-79951 | A | ‡ | 3/1993 | |
| JP | 5-165459 | A | ‡ | 7/1993 | |
| JP | 5-165459 | A | | 7/1993 | |
| JP | 5-293126 | A | | 11/1993 | |
| JP | 5-293126 | A | ‡ | 11/1993 | |
| JP | 6-19965 | A | ‡ | 1/1994 | |
| JP | 6-19965 | A | | 1/1994 | |
| JP | 6-69954 | A | | 3/1994 | |
| JP | 6-69954 | A | ‡ | 3/1994 | |
| JP | 6-274586 | A | ‡ | 9/1994 | |
| JP | 6-274586 | A | | 9/1994 | |
| JP | 6-332617 | A | | 12/1994 | |
| JP | 6-332617 | A | ‡ | 12/1994 | |
| JP | 7-199379 | A | | 8/1995 | |
| JP | 7-199379 | A | ‡ | 8/1995 | |
| JP | 7-219961 | A | | 8/1995 | |
| JP | 7-219961 | A | ‡ | 8/1995 | |
| JP | 7-320051 | A | | 12/1995 | |
| JP | 7-320051 | A | ‡ | 12/1995 | |
| JP | 7-320079 | A | ‡ | 12/1995 | |
| JP | 7-320079 | A | | 12/1995 | |
| JP | 8-63330 | A | ‡ | 3/1996 | |
| JP | 8-63330 | A | | 3/1996 | |
| JP | 8-185265 | A | | 7/1996 | |
| JP | 8-185265 | A | ‡ | 7/1996 | |
| JP | 8-223281 | A | ‡ | 8/1996 | |
| JP | 8-223281 | A | | 8/1996 | |
| JP | 8-227341 | A | ‡ | 9/1996 | |
| JP | 8-227341 | A | | 9/1996 | |
| JP | 9-18585 | A | ‡ | 1/1997 | |
| JP | 9-18585 | A | | 1/1997 | |
| JP | 9-27000 | A | | 1/1997 | |
| JP | 9-27000 | A | ‡ | 1/1997 | |
| JP | 9-55792 | A | ‡ | 2/1997 | |
| JP | 9-55792 | A | | 2/1997 | |
| JP | 9-259063 | A | | 10/1997 | |
| JP | 9-259063 | A | ‡ | 10/1997 | |
| JP | 9-265457 | A | ‡ | 10/1997 | |
| JP | 9-265457 | A | | 10/1997 | |
| JP | 10-31497 | A | | 2/1998 | |
| JP | 10-31497 | A | ‡ | 2/1998 | |
| JP | 10-78952 | A | | 3/1998 | |
| JP | 10-78952 | A | ‡ | 3/1998 | |
| JP | 10-105324 | A | ‡ | 4/1998 | ......... G06F 3/04883 |
| JP | 10-105324 | A | | 4/1998 | |
| JP | 10-274997 | A | | 10/1998 | |
| JP | 10-274997 | A | ‡ | 10/1998 | |
| JP | 10-320169 | A | | 12/1998 | |
| JP | 10-320169 | A | ‡ | 12/1998 | |
| JP | 11-06743 | A | ‡ | 1/1999 | |
| JP | 11-06743 | A | | 1/1999 | |
| JP | 11-45241 | A | ‡ | 2/1999 | |
| JP | 11-45241 | A | | 2/1999 | |
| JP | 11-136278 | A | ‡ | 5/1999 | |
| JP | 11-136278 | A | | 5/1999 | |
| JP | 11-231886 | A | ‡ | 8/1999 | |
| JP | 11-231886 | A | | 8/1999 | |
| JP | 11-265400 | A | ‡ | 9/1999 | |
| JP | 11-265400 | A | | 9/1999 | |
| JP | 2000-32140 | A | ‡ | 1/2000 | |
| JP | 2000-32140 | A | | 1/2000 | |
| JP | 2000-90119 | A | ‡ | 3/2000 | |
| JP | 2000-90119 | A | | 3/2000 | |
| JP | 2000-99225 | A | ‡ | 4/2000 | |
| JP | 2000-99225 | A | | 4/2000 | |
| JP | 2000-134407 | A | ‡ | 5/2000 | |
| JP | 2000-134407 | A | | 5/2000 | |
| JP | 2000-163031 | A | | 6/2000 | |
| JP | 2000-163031 | A | ‡ | 6/2000 | |
| JP | 2000-207167 | A | | 7/2000 | |
| JP | 2000-207167 | A | ‡ | 7/2000 | |
| JP | 2000-216910 | A | | 8/2000 | |
| JP | 2000-216910 | A | ‡ | 8/2000 | |
| JP | 2000-224663 | A | | 8/2000 | |
| JP | 2000-224663 | A | ‡ | 8/2000 | |
| JP | 2000-272349 | A | | 10/2000 | |
| JP | 2000-272349 | A | ‡ | 10/2000 | ................ B60J 7/22 |
| JP | 2000-331004 | A | ‡ | 11/2000 | |
| JP | 2000-331004 | A | | 11/2000 | |
| JP | 2000-339137 | A | | 12/2000 | |
| JP | 2000-339137 | A | ‡ | 12/2000 | |
| JP | 2000-352988 | A | ‡ | 12/2000 | |
| JP | 2000-352988 | A | | 12/2000 | |
| JP | 2000-352989 | A | ‡ | 12/2000 | ........... G10L 15/063 |

(56) References Cited

FOREIGN PATENT DOCUMENTS

JP 2000-352989 A 12/2000
JP 2001-13978 A ‡ 1/2001
JP 2001-13978 A 1/2001
JP 2001-14319 A ‡ 1/2001
JP 2001-14319 A 1/2001
JP 2001-22498 A ‡ 1/2001
JP 2001-22498 A 1/2001
JP 2001-34289 A ‡ 2/2001
JP 2001-34289 A 2/2001
JP 2001-34290 A 2/2001
JP 2001-34290 A ‡ 2/2001
JP 2001-56233 A ‡ 2/2001
JP 2001-56233 A 2/2001
JP 2001-109493 A 4/2001
JP 2001-109493 A ‡ 4/2001
JP 2001-125896 A ‡ 5/2001
JP 2001-125896 A 5/2001
JP 2001-148899 A 5/2001
JP 2001-148899 A ‡ 5/2001
JP 2001-273283 A ‡ 10/2001 ........... G06F 40/216
JP 2001-273283 A 10/2001
JP 2001-282813 A ‡ 10/2001 ........... G06F 16/532
JP 2001-282813 A 10/2001
JP 2001-296880 A ‡ 10/2001 ............. G10L 13/08
JP 2001-296880 A 10/2001
JP 2002-14954 A 1/2002
JP 2002-14954 A ‡ 1/2002
JP 2002-24212 A ‡ 1/2002
JP 2002-24212 A 1/2002
JP 2002-30676 A ‡ 1/2002
JP 2002-30676 A 1/2002
JP 2002-41276 A 2/2002
JP 2002-41276 A ‡ 2/2002
JP 2002-41624 A 2/2002
JP 2002-41624 A ‡ 2/2002
JP 2002-82748 A 3/2002
JP 2002-82748 A ‡ 3/2002
JP 2002-82893 A ‡ 3/2002
JP 2002-82893 A 3/2002
JP 2002-132804 A ‡ 5/2002
JP 2002-132804 A 5/2002
JP 2002-169588 A ‡ 6/2002
JP 2002-169588 A 6/2002
JP 2002-230021 A ‡ 8/2002
JP 2002-230021 A 8/2002
JP 2002-524806 A ‡ 8/2002
JP 2002-524806 A 8/2002
JP 2002-281562 A 9/2002
JP 2002-281562 A ‡ 9/2002
JP 2002-342033 A 11/2002
JP 2002-342033 A ‡ 11/2002
JP 2002-342212 A ‡ 11/2002 .......... H04M 3/4938
JP 2002-342212 A 11/2002
JP 2002-344880 A ‡ 11/2002
JP 2002-344880 A 11/2002
JP 2002-542501 A 12/2002
JP 2002-542501 A ‡ 12/2002
JP 2003-15682 A 1/2003
JP 2003-15682 A ‡ 1/2003
JP 2003-44091 A ‡ 2/2003
JP 2003-44091 A 2/2003
JP 2003-84877 A ‡ 3/2003
JP 2003-84877 A 3/2003
JP 2003-517158 A 5/2003
JP 2003-517158 A ‡ 5/2003
JP 2003-233568 A 8/2003
JP 2003-233568 A ‡ 8/2003
JP 2003-244317 A 8/2003
JP 2003-244317 A ‡ 8/2003 ............. H04L 67/26
JP 2003-527656 A 9/2003
JP 2003-527656 A ‡ 9/2003
JP 2003-288356 A 10/2003
JP 2003-288356 A ‡ 10/2003
JP 2003-533909 A ‡ 11/2003
JP 2003-533909 A 11/2003
JP 2004-48804 A 2/2004
JP 2004-48804 A ‡ 2/2004
JP 2004-54080 A 2/2004
JP 2004-54080 A ‡ 2/2004
JP 2004-505322 A 2/2004
JP 2004-505322 A ‡ 2/2004
JP 2004-505525 A 2/2004
JP 2004-505525 A ‡ 2/2004
JP 2004-86356 A 3/2004
JP 2004-86356 A ‡ 3/2004
JP 2004-94936 A ‡ 3/2004
JP 2004-94936 A 3/2004
JP 2004-117905 A 4/2004
JP 2004-117905 A ‡ 4/2004
JP 2004-152063 A 5/2004
JP 2004-152063 A ‡ 5/2004
JP 2004-523004 A ‡ 7/2004
JP 2004-523004 A 7/2004
JP 2004-295837 A ‡ 10/2004
JP 2004-295837 A 10/2004
JP 2004-534268 A ‡ 11/2004
JP 2004-534268 A 11/2004
JP 2004-347786 A 12/2004
JP 2004-347786 A ‡ 12/2004
JP 2005-55782 A 3/2005
JP 2005-55782 A ‡ 3/2005
JP 2005-63257 A 3/2005
JP 2005-63257 A ‡ 3/2005
JP 2005-70645 A 3/2005
JP 2005-70645 A ‡ 3/2005
JP 2005-80094 A 3/2005
JP 2005-80094 A ‡ 3/2005
JP 2005-86624 A 3/2005
JP 2005-86624 A ‡ 3/2005
JP 2005-506602 A 3/2005
JP 2005-506602 A ‡ 3/2005
JP 2005-92441 A ‡ 4/2005
JP 2005-92441 A 4/2005
JP 2005-149481 A ‡ 6/2005
JP 2005-149481 A 6/2005
JP 2005-181386 A 7/2005
JP 2005-181386 A ‡ 7/2005
JP 2005-189454 A ‡ 7/2005
JP 2005-189454 A 7/2005
JP 2005-221678 A 8/2005
JP 2005-221678 A ‡ 8/2005
JP 2005-283843 A ‡ 10/2005
JP 2005-283843 A 10/2005
JP 2005-311864 A ‡ 11/2005
JP 2005-311864 A 11/2005
JP 2005-332212 A ‡ 12/2005
JP 2005-332212 A 12/2005
JP 2006-4274 A ‡ 1/2006
JP 2006-4274 A 1/2006
JP 2006-23860 A ‡ 1/2006
JP 2006-23860 A 1/2006
JP 2006-30447 A 2/2006
JP 2006-30447 A ‡ 2/2006
JP 2006-31092 A ‡ 2/2006
JP 2006-31092 A 2/2006
JP 2006-59094 A 3/2006
JP 2006-59094 A ‡ 3/2006
JP 2006-80617 A ‡ 3/2006
JP 2006-80617 A 3/2006
JP 2006-107438 A 4/2006
JP 2006-107438 A ‡ 4/2006 ............. G06Q 10/06
JP 2006-146008 A ‡ 6/2006 ............. G10L 15/06
JP 2006-146008 A 6/2006
JP 2006-146182 A ‡ 6/2006 ............. G06F 3/167
JP 2006-146182 A 6/2006
JP 2006-155368 A 6/2006
JP 2006-155368 A ‡ 6/2006 ............. G06Q 10/06
JP 2006-189394 A 7/2006
JP 2006-189394 A ‡ 7/2006
JP 2006-195637 A 7/2006
JP 2006-195637 A ‡ 7/2006
JP 2006-201870 A ‡ 8/2006
JP 2006-201870 A 8/2006
JP 2006-208696 A ‡ 8/2006 ............. G06F 3/167

(56) References Cited

FOREIGN PATENT DOCUMENTS

| | | | | | |
|---|---|---|---|---|---|
| JP | 2006-208696 | A | | 8/2006 | |
| JP | 2006-244296 | A | | 9/2006 | |
| JP | 2006-244296 | A | ‡ | 9/2006 | |
| JP | 2006-267328 | A1 | ‡ | 10/2006 | |
| JP | 2006-267328 | A1 | | 10/2006 | |
| JP | 2006-302091 | A | ‡ | 11/2006 | |
| JP | 2006-302091 | A | | 11/2006 | |
| JP | 2006-526185 | A | ‡ | 11/2006 | |
| JP | 2006-526185 | A | | 11/2006 | |
| JP | 2007-4633 | A | | 1/2007 | |
| JP | 2007-4633 | A | ‡ | 1/2007 | |
| JP | 2007-17990 | A | | 1/2007 | |
| JP | 2007-17990 | A | ‡ | 1/2007 | |
| JP | 2007-500903 | A | | 1/2007 | |
| JP | 2007-500903 | A | ‡ | 1/2007 | |
| JP | 2007-53796 | A | ‡ | 3/2007 | |
| JP | 2007-53796 | A | | 3/2007 | |
| JP | 2007-79690 | A | ‡ | 3/2007 | |
| JP | 2007-79690 | A | | 3/2007 | |
| JP | 2007-171534 | A | | 7/2007 | |
| JP | 2007-171534 | A | ‡ | 7/2007 | |
| JP | 007-193794 | A | ‡ | 8/2007 | G06Q 10/109 |
| JP | 2007-193794 | A | ‡ | 8/2007 | G06Q 10/109 |
| JP | 2007-193794 | A | | 8/2007 | |
| JP | 2007-206317 | A | | 8/2007 | |
| JP | 2007-206317 | A | ‡ | 8/2007 | |
| JP | 2007-264471 | A | ‡ | 10/2007 | |
| JP | 2007-264471 | A | | 10/2007 | |
| JP | 2007-264792 | A | ‡ | 10/2007 | |
| JP | 2007-264792 | A | | 10/2007 | |
| JP | 2007-264892 | A | | 10/2007 | |
| JP | 2007-264892 | A | ‡ | 10/2007 | |
| JP | 2007-299352 | A | | 11/2007 | |
| JP | 2007-299352 | A | ‡ | 11/2007 | |
| JP | 2007-325089 | A | ‡ | 12/2007 | |
| JP | 2007-325089 | A | | 12/2007 | |
| JP | 2008-21002 | A | | 1/2008 | |
| JP | 2008-21002 | A | ‡ | 1/2008 | |
| JP | 2008-26381 | A | | 2/2008 | |
| JP | 2008-26381 | A | ‡ | 2/2008 | |
| JP | 2008-39928 | A | | 2/2008 | |
| JP | 2008-39928 | A | ‡ | 2/2008 | |
| JP | 2008-58813 | A | ‡ | 3/2008 | |
| JP | 2008-58813 | A | | 3/2008 | |
| JP | 2008-90545 | A | ‡ | 4/2008 | |
| JP | 2008-90545 | A | | 4/2008 | |
| JP | 2008-97003 | A | ‡ | 4/2008 | |
| JP | 2008-97003 | A | | 4/2008 | |
| JP | 2008-134949 | A | | 6/2008 | |
| JP | 2008-134949 | A | ‡ | 6/2008 | |
| JP | 2008-526101 | A | | 7/2008 | |
| JP | 2008-526101 | A | ‡ | 7/2008 | |
| JP | 2008-185693 | A | | 8/2008 | |
| JP | 2008-185693 | A | ‡ | 8/2008 | |
| JP | 2008-198022 | A | ‡ | 8/2008 | |
| JP | 2008-198022 | A | | 8/2008 | |
| JP | 2008-217468 | A | | 9/2008 | |
| JP | 2008-217468 | A | ‡ | 9/2008 | |
| JP | 2008-228129 | A | | 9/2008 | |
| JP | 2008-228129 | A | ‡ | 9/2008 | |
| JP | 2008-233678 | A | ‡ | 10/2008 | G10L 15/22 |
| JP | 2008-233678 | A | | 10/2008 | |
| JP | 2008-236448 | A | ‡ | 10/2008 | |
| JP | 2008-236448 | A | | 10/2008 | |
| JP | 2008-252161 | A | | 10/2008 | |
| JP | 2008-252161 | A | ‡ | 10/2008 | |
| JP | 2008-268684 | A | | 11/2008 | |
| JP | 2008-268684 | A | ‡ | 11/2008 | |
| JP | 2008-271481 | A | ‡ | 11/2008 | |
| JP | 2008-271481 | A | | 11/2008 | |
| JP | 2009-503623 | A | ‡ | 1/2009 | |
| JP | 2009-503623 | A | | 1/2009 | |
| JP | 2009-36999 | A | | 2/2009 | |
| JP | 2009-36999 | A | ‡ | 2/2009 | |
| JP | 2009-47920 | A | | 3/2009 | |
| JP | 2009-47920 | A | ‡ | 3/2009 | |
| JP | 2009-98490 | A | | 5/2009 | |
| JP | 2009-98490 | A | ‡ | 5/2009 | |
| JP | 2009-140444 | A | | 6/2009 | |
| JP | 2009-140444 | A | ‡ | 6/2009 | |
| JP | 2009-186989 | A | ‡ | 8/2009 | G10L 15/22 |
| JP | 2009-186989 | A | | 8/2009 | |
| JP | 2009-193448 | A | | 8/2009 | |
| JP | 2009-193448 | A | ‡ | 8/2009 | |
| JP | 2009-193457 | A | | 8/2009 | |
| JP | 2009-193457 | A | ‡ | 8/2009 | |
| JP | 2009-193532 | A | ‡ | 8/2009 | |
| JP | 2009-193532 | A | | 8/2009 | |
| JP | 2009-205367 | A | | 9/2009 | |
| JP | 2009-205367 | A | ‡ | 9/2009 | A61B 5/681 |
| JP | 2009-294913 | A | | 12/2009 | |
| JP | 2009-294913 | A | ‡ | 12/2009 | |
| JP | 2009-294946 | A | | 12/2009 | |
| JP | 2009-294946 | A | ‡ | 12/2009 | |
| JP | 2010-66519 | A | ‡ | 3/2010 | |
| JP | 2010-66519 | A | | 3/2010 | |
| JP | 2010-78602 | A | | 4/2010 | |
| JP | 2010-78979 | A | ‡ | 4/2010 | |
| JP | 2010-78979 | A | | 4/2010 | |
| JP | 2010-108378 | A | | 5/2010 | |
| JP | 2010-108378 | A | ‡ | 5/2010 | G06F 16/58 |
| JP | 2010-109789 | A | | 5/2010 | |
| JP | 2010-518475 | A | | 5/2010 | |
| JP | 2010-518526 | A | | 5/2010 | |
| JP | 2010-518526 | A | ‡ | 5/2010 | |
| JP | 2010-122928 | A | | 6/2010 | |
| JP | 2010-135976 | A | | 6/2010 | |
| JP | 2010-146347 | A | | 7/2010 | |
| JP | 2010-157207 | A | | 7/2010 | |
| JP | 2010-157207 | A | ‡ | 7/2010 | G06F 9/44 |
| JP | 2010-166478 | A | | 7/2010 | |
| JP | 2010-205111 | A | | 9/2010 | |
| JP | 2010-224236 | A | ‡ | 10/2010 | |
| JP | 2010-224236 | A | | 10/2010 | |
| JP | 2010-236858 | A | | 10/2010 | |
| JP | 4563106 | B2 | | 10/2010 | |
| JP | 4563106 | B2 | ‡ | 10/2010 | |
| JP | 2010-256392 | A | | 11/2010 | |
| JP | 2010-535377 | A | ‡ | 11/2010 | |
| JP | 2010-535377 | A | | 11/2010 | |
| JP | 2010-287063 | A | ‡ | 12/2010 | |
| JP | 2010-287063 | A | | 12/2010 | |
| JP | 2011-33874 | A | | 2/2011 | |
| JP | 2011-41026 | A | ‡ | 2/2011 | |
| JP | 2011-41026 | A | | 2/2011 | |
| JP | 2011-45005 | A | ‡ | 3/2011 | |
| JP | 2011-45005 | A | | 3/2011 | |
| JP | 2011-59659 | A | | 3/2011 | |
| JP | 2011-59659 | A | ‡ | 3/2011 | |
| JP | 2011-81541 | A | | 4/2011 | |
| JP | 2011-81541 | A | ‡ | 4/2011 | |
| JP | 2011-525045 | A | | 9/2011 | |
| JP | 2011-525045 | A | ‡ | 9/2011 | |
| JP | 2011-237621 | A | | 11/2011 | |
| JP | 2011-238022 | A | | 11/2011 | |
| JP | 2011-250027 | A | | 12/2011 | |
| JP | 2012-014394 | A | | 1/2012 | |
| JP | 2012-502377 | A | | 1/2012 | |
| JP | 2012-22478 | A | | 2/2012 | |
| JP | 2012-33997 | A | | 2/2012 | |
| JP | 2012-37619 | A | | 2/2012 | |
| JP | 2012-63536 | A | | 3/2012 | |
| JP | 2012-508530 | A | | 4/2012 | |
| JP | 2012-89020 | A | | 5/2012 | |
| JP | 2012-116442 | A | | 6/2012 | |
| JP | 2012-142744 | A | | 7/2012 | |
| JP | 2012-147063 | A | | 8/2012 | |
| JP | 2012-150804 | A | | 8/2012 | |
| JP | 2012-518847 | A | | 8/2012 | |
| JP | 2012-211932 | A | | 11/2012 | |
| JP | 2013-37688 | A | | 2/2013 | |
| JP | 2013-46171 | A | | 3/2013 | |
| JP | 2013-511214 | A | | 3/2013 | |
| JP | 2013-511214 | A | ‡ | 3/2013 | |

(56) References Cited

FOREIGN PATENT DOCUMENTS

| | | | | | |
|---|---|---|---|---|---|
| JP | 2013-65284 | A | | 4/2013 | |
| JP | 2013-73240 | A | | 4/2013 | |
| JP | 2013-513315 | A | | 4/2013 | |
| JP | 2013-80476 | A | | 5/2013 | |
| JP | 2013-517566 | A | | 5/2013 | |
| JP | 2013-517566 | A | ‡ | 5/2013 | |
| JP | 2013-134430 | A | | 7/2013 | |
| JP | 2013-134729 | A | | 7/2013 | |
| JP | 2013-140520 | A | | 7/2013 | |
| JP | 2013-527947 | A | | 7/2013 | |
| JP | 2013-527947 | A | ‡ | 7/2013 | |
| JP | 2013-528012 | A | | 7/2013 | |
| JP | 2013-148419 | A | | 8/2013 | |
| JP | 2013-156349 | A | | 8/2013 | |
| JP | 2013-200423 | A | | 10/2013 | |
| JP | 2013-205999 | A | | 10/2013 | |
| JP | 2013-238936 | A | | 11/2013 | |
| JP | 2013-258600 | A | | 12/2013 | |
| JP | 2014-2586 | A | | 1/2014 | |
| JP | 2014-10688 | A | | 1/2014 | |
| JP | 2014-26629 | A | | 2/2014 | |
| JP | 2014-45449 | A | | 3/2014 | |
| JP | 2014-507903 | A | | 3/2014 | |
| JP | 2014-60600 | A | | 4/2014 | |
| JP | 2014-72586 | A | | 4/2014 | |
| JP | 2014-77969 | A | | 5/2014 | |
| JP | 2014-89711 | A | | 5/2014 | |
| JP | 2014-109889 | A | | 6/2014 | |
| JP | 2014-124332 | A | | 7/2014 | |
| JP | 2014-126600 | A | | 7/2014 | |
| JP | 2014-140121 | A | | 7/2014 | |
| JP | 2014-518409 | A | | 7/2014 | |
| JP | 2014-142566 | A | | 8/2014 | |
| JP | 2014-145842 | A | | 8/2014 | |
| JP | 2014-146940 | A | | 8/2014 | |
| JP | 2014-150323 | A | | 8/2014 | |
| JP | 2014-191272 | A | | 10/2014 | |
| JP | 2014-219614 | A | | 11/2014 | |
| JP | 2014-222514 | A | | 11/2014 | |
| JP | 2015-4928 | A | | 1/2015 | |
| JP | 2015-8001 | A | | 1/2015 | |
| JP | 2015-12301 | A | | 1/2015 | |
| JP | 2015-18365 | A | | 1/2015 | |
| JP | 2015-501022 | A | | 1/2015 | |
| JP | 2015-504619 | A | | 2/2015 | |
| JP | 2015-41845 | A | | 3/2015 | |
| JP | 2015-52500 | A | | 3/2015 | |
| JP | 2015-60423 | A | | 3/2015 | |
| JP | 2015-81971 | A | | 4/2015 | |
| JP | 2015-83938 | A | | 4/2015 | |
| JP | 2015-94848 | A | | 5/2015 | |
| JP | 2015-514254 | A | | 5/2015 | |
| JP | 2015-519675 | A | | 7/2015 | |
| JP | 2015-524974 | A | | 8/2015 | |
| JP | 2015-526776 | A | | 9/2015 | |
| JP | 2015-527683 | A | | 9/2015 | |
| JP | 2015-528140 | A | | 9/2015 | |
| JP | 2015-528918 | A | | 10/2015 | |
| JP | 2015-531909 | A | | 11/2015 | |
| JP | 2016-504651 | A | | 2/2016 | |
| JP | 2016-508007 | A | | 3/2016 | |
| JP | 2016-71247 | A | | 5/2016 | |
| JP | 2016-119615 | A | | 6/2016 | |
| JP | 2016-151928 | A | | 8/2016 | |
| JP | 2016-524193 | A | | 8/2016 | |
| JP | 2016-536648 | A | | 11/2016 | |
| JP | 2017-19331 | A | | 1/2017 | |
| JP | 2017-537361 | A | | 12/2017 | |
| JP | 6291147 | B1 | | 2/2018 | |
| JP | 2018-525950 | A | | 9/2018 | |
| KR | 10-1999-0073234 | A | ‡ | 10/1999 | |
| KR | 10-1999-0073234 | A | | 10/1999 | |
| KR | 2001-0093654 | A | ‡ | 10/2001 | ........... G06F 16/487 |
| KR | 2001-0093654 | A | | 10/2001 | |
| KR | 10-2001-0102132 | A | ‡ | 11/2001 | |
| KR | 10-2001-0102132 | A | | 11/2001 | |
| KR | 2002-0013984 | A | ‡ | 2/2002 | |
| KR | 2002-0013984 | A | | 2/2002 | |
| KR | 2002-0057262 | A | ‡ | 7/2002 | |
| KR | 2002-0057262 | A | | 7/2002 | |
| KR | 2002-004149 | A | | 8/2002 | |
| KR | 2002-0064149 | A | ‡ | 8/2002 | ......... G06F 16/9038 |
| KR | 2002-0069952 | A | | 9/2002 | |
| KR | 2002-0069952 | A | ‡ | 9/2002 | |
| KR | 2003-0016993 | A | | 3/2003 | |
| KR | 2003-0016993 | A | ‡ | 3/2003 | |
| KR | 10-2004-0014835 | A | ‡ | 2/2004 | |
| KR | 10-2004-0014835 | A | | 2/2004 | |
| KR | 10-2004-0044632 | A | ‡ | 5/2004 | |
| KR | 10-2004-0044632 | A | | 5/2004 | |
| KR | 10-2005-0083561 | A | ‡ | 8/2005 | |
| KR | 10-2005-0083561 | A | | 8/2005 | |
| KR | 10-2005-0090568 | A | ‡ | 9/2005 | |
| KR | 10-2005-0090568 | A | | 9/2005 | |
| KR | 10-206-0011603 | A | ‡ | 2/2006 | |
| KR | 10-2006-0011603 | A | | 2/2006 | |
| KR | 10-2006-0011603 | A | ‡ | 2/2006 | |
| KR | 10-2006-0012730 | A | | 2/2006 | |
| KR | 10-2006-0012730 | A | ‡ | 2/2006 | |
| KR | 10-2006-0055313 | A | ‡ | 5/2006 | |
| KR | 10-2006-0055313 | A | | 5/2006 | |
| KR | 10-2006-0073574 | A | | 6/2006 | |
| KR | 10-2006-0073574 | A | ‡ | 6/2006 | |
| KR | 10-2006-0091469 | A | | 8/2006 | |
| KR | 10-2006-0091469 | A | ‡ | 8/2006 | |
| KR | 10-2007-0024262 | A | ‡ | 3/2007 | |
| KR | 10-2007-0024262 | A | | 3/2007 | |
| KR | 10-2007-0071675 | | ‡ | 7/2007 | |
| KR | 10-2007-0071675 | A | | 7/2007 | |
| KR | 10-2007-0071675 | A | ‡ | 7/2007 | |
| KR | 10-2007-0094767 | A | ‡ | 9/2007 | |
| KR | 10-2007-0094767 | A | | 9/2007 | |
| KR | 10-0757496 | B1 | | 9/2007 | |
| KR | 10-0757496 | B1 | ‡ | 9/2007 | |
| KR | 10-2007-0100837 | A | | 10/2007 | |
| KR | 10-2007-0100837 | A | ‡ | 10/2007 | |
| KR | 10-0776800 | B1 | | 11/2007 | |
| KR | 10-0776800 | B1 | ‡ | 11/2007 | |
| KR | 10-0801227 | B1 | | 2/2008 | |
| KR | 10-0801227 | B1 | ‡ | 2/2008 | ........... G02B 6/0038 |
| KR | 10-0810500 | B1 | | 3/2008 | |
| KR | 10-0810500 | B1 | ‡ | 3/2008 | |
| KR | 10-2008-0033070 | A | | 4/2008 | |
| KR | 10-2008-0033070 | A | ‡ | 4/2008 | |
| KR | 10-2009-0033070 | A | ‡ | 4/2008 | |
| KR | 10-2008-0049647 | A | | 6/2008 | |
| KR | 10-2008-0049647 | A | ‡ | 6/2008 | |
| KR | 10-2008-0059332 | A | ‡ | 6/2008 | |
| KR | 10-2008-0059332 | A | | 6/2008 | |
| KR | 10-2008-0109322 | A | | 12/2008 | |
| KR | 10-2008-0109322 | A | ‡ | 12/2008 | |
| KR | 10-2009-0001716 | A | | 1/2009 | |
| KR | 10-2009-0001716 | A | ‡ | 1/2009 | |
| KR | 10-2009-0028464 | A | | 3/2009 | |
| KR | 10-2009-0028464 | A | ‡ | 3/2009 | |
| KR | 10-2009-0030117 | A | ‡ | 3/2009 | |
| KR | 10-2009-0030117 | A | | 3/2009 | |
| KR | 10-2009-0086805 | A | ‡ | 8/2009 | |
| KR | 10-2009-0086805 | A | | 8/2009 | |
| KR | 10-0920267 | B1 | | 10/2009 | |
| KR | 10-0920267 | B1 | ‡ | 10/2009 | |
| KR | 10-2009-0122944 | A | | 12/2009 | |
| KR | 10-2009-0122944 | A | ‡ | 12/2009 | |
| KR | 10-2009-0127961 | A | ‡ | 12/2009 | |
| KR | 10-2009-0127961 | A | | 12/2009 | |
| KR | 10-2010-0015958 | A | ‡ | 2/2010 | |
| KR | 10-2010-0015958 | A | | 2/2010 | |
| KR | 10-2010-0048571 | A | ‡ | 5/2010 | |
| KR | 10-2010-0048571 | A | | 5/2010 | |
| KR | 10-2010-0053149 | A | | 5/2010 | |
| KR | 10-2010-0119519 | A | ‡ | 11/2010 | |
| KR | 10-2010-0119519 | A | | 11/2010 | |
| KR | 10-2011-0005937 | A | | 1/2011 | |
| KR | 10-2011-0013625 | A | | 2/2011 | |

(56) References Cited

FOREIGN PATENT DOCUMENTS

| | | | | | |
|---|---|---|---|---|---|
| KR | 10-2011-0043644 | A | ‡ | 4/2011 | |
| KR | 10-2011-0043644 | A | | 4/2011 | |
| KR | 10-1032792 | B1 | | 5/2011 | |
| KR | 10-1032792 | B1 | ‡ | 5/2011 | |
| KR | 10-2011-0068490 | A | | 6/2011 | |
| KR | 10-2011-0068490 | A | ‡ | 6/2011 | |
| KR | 10-2011-0072847 | A | ‡ | 6/2011 | |
| KR | 10-2011-0072847 | A | | 6/2011 | |
| KR | 10-2011-0086492 | A | | 7/2011 | |
| KR | 10-2011-0104620 | A | | 9/2011 | |
| KR | 10-2011-0113414 | A | ‡ | 10/2011 | |
| KR | 10-2011-0113414 | A | | 10/2011 | |
| KR | 10-2011-0115134 | A | | 10/2011 | |
| KR | 10-2011-0115134 | A | ‡ | 10/2011 | |
| KR | 10-2012-0020164 | A | | 3/2012 | |
| KR | 10-2012-0031722 | A | | 4/2012 | |
| KR | 10-2012-0031722 | A | ‡ | 4/2012 | |
| KR | 10-2012-0066523 | A | | 6/2012 | |
| KR | 10-2012-0082371 | A | | 7/2012 | |
| KR | 10-2012-0084472 | A | | 7/2012 | |
| KR | 10-1178310 | B1 | | 8/2012 | |
| KR | 10-2012-0120316 | A | ‡ | 11/2012 | |
| KR | 10-2012-0120316 | A | | 11/2012 | |
| KR | 10-2012-0137424 | A | | 12/2012 | |
| KR | 10-2012-0137435 | A | ‡ | 12/2012 | |
| KR | 10-2012-0137435 | A | | 12/2012 | |
| KR | 10-2012-0137440 | A | | 12/2012 | |
| KR | 10-2012-0138826 | A | ‡ | 12/2012 | |
| KR | 10-2012-0138826 | A | | 12/2012 | |
| KR | 10-2012-0139827 | A | | 12/2012 | |
| KR | 10-1193668 | B1 | | 12/2012 | |
| KR | 10-1193668 | B1 | ‡ | 12/2012 | ............. G09B 19/06 |
| KR | 10-2013-0035983 | A | | 4/2013 | |
| KR | 10-2013-0090947 | A | | 8/2013 | |
| KR | 10-2013-0108563 | A | | 10/2013 | |
| KR | 10-2013-0131252 | A | | 10/2013 | |
| KR | 10-1334342 | B1 | | 11/2013 | |
| KR | 10-2013-0133629 | A | | 12/2013 | |
| KR | 10-2014-0024271 | A | | 2/2014 | |
| KR | 10-2014-0031283 | A | | 3/2014 | |
| KR | 10-2014-0033574 | A | | 3/2014 | |
| KR | 10-2014-0055204 | A | | 5/2014 | |
| KR | 10-2014-0068752 | A | | 6/2014 | |
| KR | 10-2014-0088449 | A | | 7/2014 | |
| KR | 10-2014-0106715 | A | | 9/2014 | |
| KR | 10-2014-0147557 | A | | 12/2014 | |
| KR | 10-2015-0013631 | A | | 2/2015 | |
| KR | 10-1506510 | B1 | | 3/2015 | |
| KR | 10-2015-0038375 | A | | 4/2015 | |
| KR | 10-2015-0039380 | A | | 4/2015 | |
| KR | 10-2015-0041974 | A | | 4/2015 | |
| KR | 10-2015-0043512 | A | | 4/2015 | |
| KR | 10-2015-0095624 | A | | 8/2015 | |
| KR | 10-2015-0095624 | A | ‡ | 8/2015 | |
| KR | 10-1555742 | B1 | | 9/2015 | |
| KR | 10-2015-0113127 | A | | 10/2015 | |
| KR | 10-2015-0138109 | A | | 12/2015 | |
| KR | 10-2016-0004351 | A | ‡ | 1/2016 | |
| KR | 10-2016-0004351 | A | | 1/2016 | |
| KR | 10-2016-0010523 | A | | 1/2016 | |
| KR | 10-2016-0040279 | A | ‡ | 4/2016 | |
| KR | 10-2016-0040279 | A | | 4/2016 | |
| KR | 10-2016-0055839 | A | | 5/2016 | |
| KR | 10-2016-0065503 | A | | 6/2016 | |
| KR | 10-2016-0101198 | A | | 8/2016 | |
| KR | 10-2016-0140694 | A | | 12/2016 | |
| KR | 10-2017-0036805 | A | | 4/2017 | |
| KR | 10-2017-0107058 | A | | 9/2017 | |
| NL | 1014847 | C | | 10/2001 | |
| NL | 1014847 | C | ‡ | 10/2001 | |
| RU | 2273106 | C2 | | 3/2006 | |
| RU | 2273106 | C2 | ‡ | 3/2006 | ............. G06Q 20/32 |
| RU | 2349970 | C2 | ‡ | 3/2009 | .......... H04M 3/4938 |
| RU | 2349970 | C2 | | 3/2009 | |
| RU | 2353068 | C2 | ‡ | 4/2009 | ........ H04M 1/72552 |
| RU | 2353068 | C2 | | 4/2009 | |
| RU | 2364917 | C2 | | 8/2009 | |
| RU | 2364917 | C2 | ‡ | 8/2009 | ......... G06F 9/44505 |
| TW | 468323 | B | | 12/2001 | |
| TW | 468323 | B | ‡ | 12/2001 | |
| TW | 200601264 | A | ‡ | 1/2006 | |
| TW | 200601264 | A | | 1/2006 | |
| TW | 200638337 | A | | 11/2006 | |
| TW | 200643744 | A | | 12/2006 | |
| TW | 200801988 | A | | 1/2008 | |
| TW | I301373 | B | | 9/2008 | |
| TW | M348993 | U | | 1/2009 | |
| TW | 200943903 | A | | 10/2009 | |
| TW | 201018258 | A | | 5/2010 | |
| TW | 201027515 | A1 | | 7/2010 | |
| TW | 201028996 | A1 | | 8/2010 | |
| TW | 201110108 | A1 | | 3/2011 | |
| TW | 201142823 | A1 | | 12/2011 | |
| TW | 201227715 | A1 | | 7/2012 | |
| TW | 201245989 | A1 | | 11/2012 | |
| TW | 201312548 | A1 | | 3/2013 | |
| WO | 1993/020640 | A1 | | 10/1993 | |
| WO | 1994/016434 | A1 | | 7/1994 | |
| WO | 1994/029788 | A1 | | 12/1994 | |
| WO | 1995/002221 | A1 | | 1/1995 | |
| WO | 1995/016950 | A1 | | 6/1995 | |
| WO | 1995/017746 | A1 | | 6/1995 | |
| WO | 1997/010586 | A1 | | 3/1997 | |
| WO | 1997/026612 | A1 | | 7/1997 | |
| WO | 1997/029614 | A1 | | 8/1997 | |
| WO | 1997/038488 | A1 | | 10/1997 | |
| WO | 1997/049044 | A1 | | 12/1997 | |
| WO | 1998/009270 | A1 | | 3/1998 | |
| WO | 1998/033111 | A1 | | 7/1998 | |
| WO | 1998/041956 | A1 | | 9/1998 | |
| WO | 1999/001834 | A1 | | 1/1999 | |
| WO | 1999/008238 | A1 | | 2/1999 | |
| WO | 1999/016181 | A1 | | 4/1999 | |
| WO | 1999/056227 | A1 | | 11/1999 | |
| WO | 2000/014727 | A1 | | 3/2000 | |
| WO | 2000/014728 | A1 | | 3/2000 | |
| WO | 2000/019697 | A1 | | 4/2000 | |
| WO | 2000/022820 | A1 | | 4/2000 | |
| WO | 2000/029964 | A1 | | 5/2000 | |
| WO | 2000/030070 | A2 | | 5/2000 | |
| WO | 2000/038041 | A1 | | 6/2000 | |
| WO | 2000/044173 | A1 | | 7/2000 | |
| WO | 2000/060435 | A2 | | 10/2000 | |
| WO | 2000/060435 | A3 | | 10/2000 | |
| WO | 2000/063766 | A1 | | 10/2000 | |
| WO | 2000/068936 | A1 | | 11/2000 | |
| WO | 2001/006489 | A1 | | 1/2001 | |
| WO | 2001/030046 | A2 | | 4/2001 | |
| WO | 2001/030047 | A2 | | 4/2001 | |
| WO | 2001/033569 | A1 | | 5/2001 | |
| WO | 2001/035391 | A1 | | 5/2001 | |
| WO | 2001/044912 | A2 | | 6/2001 | |
| WO | 2001/046946 | A1 | | 6/2001 | |
| WO | 2001/065413 | A1 | | 9/2001 | |
| WO | 2001/067753 | A1 | | 9/2001 | |
| WO | 2001/071480 | A2 | | 9/2001 | |
| WO | 2002/010900 | A2 | | 2/2002 | |
| WO | 2002/025610 | A1 | | 3/2002 | |
| WO | 2002/031814 | A1 | | 4/2002 | |
| WO | 2002/037469 | A2 | | 5/2002 | |
| WO | 2002/049253 | A2 | | 6/2002 | |
| WO | 2002/071259 | A1 | | 9/2002 | |
| WO | 2002/073603 | A1 | | 9/2002 | |
| WO | 2003/003152 | A2 | | 1/2003 | |
| WO | 2003/003765 | A1 | | 1/2003 | |
| WO | 2003/023786 | A2 | | 3/2003 | |
| WO | 2003/036457 | A2 | | 5/2003 | |
| WO | 2003/041364 | A2 | | 5/2003 | |
| WO | 2003/049494 | A1 | | 6/2003 | |
| WO | 2003/056789 | A1 | | 7/2003 | |
| WO | 2003/067202 | A2 | | 8/2003 | |
| WO | 2003/084196 | A1 | | 10/2003 | |
| WO | 2003/094489 | A1 | | 11/2003 | |
| WO | 2003/105125 | A1 | | 12/2003 | |

(56) References Cited

FOREIGN PATENT DOCUMENTS

WO 2003/107179 A1 12/2003
WO 2004/008801 A1 1/2004
WO 2004/025938 A1 3/2004
WO 2004/047415 A1 6/2004
WO 2004/055637 A2 7/2004
WO 2004/057486 A1 7/2004
WO 2004/061850 A1 7/2004
WO 2004/084413 A2 9/2004
WO 2005/003920 A2 1/2005
WO 2005/008505 A1 1/2005
WO 2005/008899 A1 1/2005
WO 2005/010725 A2 2/2005
WO 2005/027472 A2 3/2005
WO 2005/027485 A1 3/2005
WO 2005/031737 A1 4/2005
WO 2005/034082 A1 4/2005
WO 2005/034085 A1 4/2005
WO 2005/041455 A1 5/2005
WO 2005/059895 A1 6/2005
WO 2005/064592 A1 7/2005
WO 2005/069171 A1 7/2005
WO 2005/101176 A2 10/2005
WO 2006/020305 A2 2/2006
WO 2006/037545 A2 4/2006
WO 2006/054724 A1 5/2006
WO 2006/056822 A1 6/2006
WO 2006/078246 A1 7/2006
WO 2006/084144 A2 8/2006
WO 2006/101649 A2 9/2006
WO 2006/129967 A1 12/2006
WO 2006/133571 A1 12/2006
WO 2007/002753 A2 1/2007
WO 2007/036762 A1 4/2007
WO 2007/080559 A2 7/2007
WO 2007/083894 A1 7/2007
WO 2008/030970 A2 3/2008
WO 2008/071231 A1 6/2008
WO 2008/085742 A2 7/2008
WO 2008/098900 A2 8/2008
WO 2008/109835 A2 8/2008
WO 2008/120036 A1 10/2008
WO 2008/130095 A1 10/2008
WO 2008/140236 A1 11/2008
WO 2008/142472 A1 11/2008
WO 2008/153639 A1 12/2008
WO 2009/009240 A2 1/2009
WO 2009/016631 A2 2/2009
WO 2009/017280 A1 2/2009
WO 2009/075912 A1 6/2009
WO 2009/104126 A1 8/2009
WO 2009/156438 A1 12/2009
WO 2009/156978 A1 12/2009
WO 2010/013369 A1 2/2010
WO 2010/054373 A2 5/2010
WO 2010/075623 A1 7/2010
WO 2010/100937 A1 9/2010
WO 2010/141802 A1 12/2010
WO 2010/144651 A2 12/2010
WO 2011/028842 A2 3/2011
WO 2011/057346 A1 5/2011
WO 2011/060106 A1 5/2011
WO 2011/082521 A1 7/2011
WO 2011/088053 A2 7/2011
WO 2011/093025 A1 8/2011
WO 2011/100142 A2 8/2011
WO 2011/116309 A1 9/2011
WO 2011/123122 A1 10/2011
WO 2011/133543 A1 10/2011
WO 2011/133573 A2 10/2011
WO 2011/097309 A3 12/2011
WO 2011/150730 A1 12/2011
WO 2011/163350 A1 12/2011
WO 2011/088053 A3 1/2012
WO 2012/008434 A1 1/2012
WO 2012/019020 A1 2/2012
WO 2012/019637 A1 2/2012
WO 2012/063260 A2 5/2012
WO 2012/092562 A1 7/2012
WO 2012/112331 A2 8/2012
WO 2012/129231 A1 9/2012
WO 2012/063260 A3 10/2012
WO 2012/135157 A2 10/2012
WO 2012/154317 A1 11/2012
WO 2012/154748 A1 11/2012
WO 2012/155079 A2 11/2012
WO 2012/167168 A2 12/2012
WO 2012/173902 A2 12/2012
WO 2013/009578 A2 1/2013
WO 2013/022135 A1 2/2013
WO 2013/022223 A2 2/2013
WO 2013/048880 A1 4/2013
WO 2013/049358 A1 4/2013
WO 2013/057153 A1 4/2013
WO 2013/122310 A1 8/2013
WO 2013/137660 A1 9/2013
WO 2013/163113 A1 10/2013
WO 2013/163857 A1 11/2013
WO 2013/169842 A2 11/2013
WO 2013/173504 A1 11/2013
WO 2013/173511 A2 11/2013
WO 2013/176847 A1 11/2013
WO 2013/184953 A1 12/2013
WO 2013/184990 A1 12/2013
WO 2014/003138 A1 1/2014
WO 2014/004544 A2 1/2014
WO 2014/021967 A1 2/2014
WO 2014/022148 A1 2/2014
WO 2014/028735 A2 2/2014
WO 2014/028797 A1 2/2014
WO 2014/031505 A1 2/2014
WO 2014/032461 A1 3/2014
WO 2014/047047 A1 3/2014
WO 2014/066352 A1 5/2014
WO 2014/070872 A2 5/2014
WO 2014/078965 A1 5/2014
WO 2014/093339 A1 6/2014
WO 2014/096506 A1 6/2014
WO WO-2014/093339 A1 ‡ 6/2014
WO 2014/124332 A2 8/2014
WO 2014/137074 A1 9/2014
WO 2014/138604 A1 9/2014
WO 2014/143959 A2 9/2014
WO 2014/144395 A2 9/2014
WO 2014/144579 A1 9/2014
WO 2014/144949 A2 9/2014
WO 2014/151153 A2 9/2014
WO 2014/124332 A3 10/2014
WO 2014/159578 A1 10/2014
WO 2014/159581 A1 10/2014
WO 2014/162570 A1 10/2014
WO 2014/169269 A1 10/2014
WO 2014/173189 A1 10/2014
WO 2013/173504 A8 12/2014
WO 2014/197336 A1 12/2014
WO 2014/197635 A2 12/2014
WO 2014/197730 A1 12/2014
WO 2014/200728 A1 12/2014
WO 2014/204659 A2 12/2014
WO 2014/210392 A2 12/2014
WO 2015/018440 A1 2/2015
WO 2015/020942 A1 2/2015
WO 2015/029379 A1 3/2015
WO 2015/030796 A1 3/2015
WO 2015/041882 A1 3/2015
WO 2015/041892 A1 3/2015
WO 2015/047932 A1 4/2015
WO 2015/053485 A1 4/2015
WO 2015/084659 A1 6/2015
WO 2015/092943 A1 6/2015
WO 2015/094169 A1 6/2015
WO 2015/094369 A1 6/2015
WO 2015/098306 A1 7/2015
WO 2015/099939 A1 7/2015
WO 2015/116151 A1 8/2015

(56) References Cited

FOREIGN PATENT DOCUMENTS

| | | | |
|---|---|---|---|
| WO | WO-2015/116151 | A1 ‡ | 8/2015 |
| WO | 2015/151133 | A1 | 10/2015 |
| WO | 2015/153310 | A1 | 10/2015 |
| WO | 2015/157013 | A1 | 10/2015 |
| WO | 2015/183401 | A1 | 12/2015 |
| WO | 2015/183699 | A1 | 12/2015 |
| WO | 2015/184186 | A1 | 12/2015 |
| WO | 2015/184387 | A1 | 12/2015 |
| WO | 2015/200207 | A1 | 12/2015 |
| WO | 2016/027933 | A1 | 2/2016 |
| WO | 2016/028946 | A1 | 2/2016 |
| WO | 2016/033257 | A1 | 3/2016 |
| WO | 2016/039992 | A1 | 3/2016 |
| WO | 2016/052164 | A1 | 4/2016 |
| WO | 2016/054230 | A1 | 4/2016 |
| WO | 2016/057268 | A1 | 4/2016 |
| WO | 2016/075081 | A1 | 5/2016 |
| WO | 2016/085775 | A2 | 6/2016 |
| WO | 2016/085776 | A1 | 6/2016 |
| WO | 2016/100139 | A1 | 6/2016 |
| WO | 2016/111881 | A1 | 7/2016 |
| WO | 2016/144840 | A1 | 9/2016 |
| WO | 2016/144982 | A1 | 9/2016 |
| WO | 2016/144983 | A1 | 9/2016 |
| WO | 2016/175354 | A1 | 11/2016 |
| WO | 2016/187149 | A1 | 11/2016 |
| WO | 2016/190950 | A1 | 12/2016 |
| WO | 2016/209444 | A1 | 12/2016 |
| WO | 2016/209924 | A1 | 12/2016 |
| WO | 2017/044257 | A1 | 3/2017 |
| WO | 2017/044260 | A1 | 3/2017 |
| WO | 2017/044629 | A1 | 3/2017 |
| WO | 2017/053311 | A1 | 3/2017 |
| WO | 2017/059388 | A1 | 4/2017 |
| WO | 2017/071420 | A1 | 5/2017 |
| WO | 2017/142116 | A1 | 8/2017 |
| WO | 2017/160487 | A1 | 9/2017 |
| WO | 2017/213682 | A1 | 12/2017 |
| WO | 2018/009397 | A1 | 1/2018 |
| WO | 2018/213401 | A1 | 11/2018 |
| WO | 2018/213415 | A1 | 11/2018 |
| WO | 2019/067930 | A1 | 4/2019 |
| WO | 2019/078576 | A1 | 4/2019 |
| WO | 2019/079017 | A1 | 4/2019 |
| WO | 2019/147429 | A1 | 8/2019 |
| WO | 2019/236217 | A1 | 12/2019 |
| WO | 2020/010530 | A1 | 1/2020 |

OTHER PUBLICATIONS

Gruber, Tom, “Ontologies, Web 2.0 and Beyond”, Ontology Summit, Available online at <http://tomgruber.org/writing/ontolog-social-web-keynote.htm>, Apr. 2007, 17 pages.‡

Gruber, Tom, “Ontology of Folksonomy: A Mash-Up of Apples and Oranges”, Int’l Journal on Semantic Web Information Systems, vol. 3, No. 2, 2007, 7 pages.‡

Sony Eiicsson Corporate, “Sony Ericsson to introduce Auto pairing. TM. to Improve Bluetooth.TM. Connectivity Between Headsets and Phones”, Press Release, available at <http://www.sonyericsson.com/spg.jsp?cc=global&c=en&ver=4001&template=pc3_1_ 1&z...>, Sep. 28, 2005, 2 pages.‡

Spiller, Karen, “Low-Decibel Earbuds Keep Noise at a Reasonable Level”, available at <http://www.nashuatelegraph.com/apps/pbcs.dll/article?Date=20060813&Cat e...>, Aug. 13, 2006, 3 pages.‡

Su et al., “A Review of ZoomText Xtra Screen Magnification Program for Windows 95”, Journal of Visual Impairment & Blindness, Feb. 1998, pp. 116-119.‡

Su, Joseph C., “A Review of Telesensory’s Vista PCI Screen Magnification System”, Journal of Visual Impairment & Blindness, Oct. 1998, pp. 705, 707-710.‡

Martin et al., “Information Brokering in an Agent Architecture”, Proceedings of the Second International Conference on the Practical Application of Intelligent Agents and Multi-Agent Technology, Apr. 1997, pp. 1-20.‡

Sugumaran, V., “A Distributed Intelligent Agent-Based Spatial Decision Support System”, Proceedings of the Americas Conference on Information system (AMCIS), Dec. 31, 1998, 4 pages.‡

Sycara et al., “Coordination of Multiple Intelligent Software Agents”, International Journal of Cooperative Information Systems (IJCIS), vol. 5, No. 2 & 3, 1996, 31 pages.‡

Meet Ivee, Your Wi-Fi Voice Activated Assistant, available at http://www.helloivee.com/>, retrieved on Feb. 10, 2014, 8 pages.‡

T3 Magazine, “Creative MuVo TX 256MB”, available at http://www.t3.co.uk/reviews/entertainment/mp3 player/creativemuvo_tx_256mb>, Aug. 17, 2004, 1 page.‡

TAOS, “TAOS, Inc. Announces Industry’s First Ambient Light Sensor to Convert Light Intensity to Digital Signals”, News Release, available at <http://www.taosine.com/pressrelease_090902.htm>, Sep. 16, 2002, 3 pages.‡

Tello, Ernest R., “Natural-Language Systems”, Mastering AI Tools and Techniques, Howard W. Sams Company, 1988.‡

Menta, Richard, “1200 Song MP3 Portable is a Milestone Player”, available at http://www.mp3newswire.net/stories/personaljuke.html>, Jan. 11, 2000, 4 pages.‡

Tofel, Kevin C., “SpeakToIt: A Personal Assistant for Older iPhones, iPads”, Apple News, Tips and Reviews, Feb. 9, 2012, 7 pages.‡

Microsoft Corporation, Microsoft Office Word 2003 (SP2), Microsoft Corporation, SP3 as of 2005, pages MSWord 2003 Figures 1-5, 1983-2003.‡

Top 10 Best Practices for Voice User Interface Design available at <http://www.developer.com/voice/article.php/1567051/Top-10-Best- Practices-for-Voice-UserInterface-Design.htm>, Nov. 1, 2002, 4 pages.‡

Microsoft Word 2000 Microsoft Corporation, pages MSWord Figures 1-5, 1999.‡

Miller, Chance, “Google Keyboard Updated with New Personalized Suggestions Feature”, available at <http://9to5google.com/2014/03/19/google-keyboard-updated-with-new-personalized-suggestions-feature/>, Mar. 19, 2014, 4 pages.‡

Milstead et al., “Metadata: Cataloging by Any Other Name”, available at <http://www.iicm.tugraz.at/thesis/cguetldiss/literatur/Kapitel06/References/Milstead_et_al._1999/metadata.html>, Jan. 1999, 18 pages.‡

Milward et al., “D2.2: Dynamic Multimodal Interface Reconfiguration, Talk and Look: Tools for Ambient Linguistic Knowledge”, available at <http://www.ihmc.us/users/ablaylock!Pubs/Files/talk d2.2.pdf>, Aug. 8, 2006, 69 pages.‡

Uslan et al., “A Review of Supernova Screen Magnification Program for Windows”, Journal of Visual Impairment Blindness, Feb. 1999, pp. 108-110.‡

Uslan et al., “A Review of Two Screen Magnification Programs for Windows 95: Magnum 95 and LP-Windows”, Journal of Visual Impairment & Blindness, Sep.-Oct. 1997, pp. 9-13.‡

Veiga, Alex, “At&T Wireless Launching Music Service”, available at <http://bizyahoo.com/ap/041005/att_mobile_music_5.html?printer=l>, Oct. 5, 2004, 2 pages.‡

Moore et al., “Combining Linguistic and Statistical Knowledge Sources in Natural-Language Processing for ATIS”, SRI International, Artificial Intelliquence Center, 1995, 4 pages.‡

Verschelde, Jan, “MATLAB Lecture 8. Special Matrices in MATLAB”, UIC, Dept. of Math, Stat. & CS, MCS 320, Introduction to Symbolic Computation, 2007, 4 pages.‡

Vlingo InCar, “Distracted Driving Solution with Vlingo InCar”, YouTube Video, Available online at <http://www.youtube.com/watch?v=Vqs8XfXxgz4>, Oct. 2010, 2 pages.‡

Murty et al., “Combining Evidence from Residual Phase and MFCC Features for Speaker Recognition”, IEEE Signal Processing Letters, vol. 13, No. 1, Jan. 2006, 4 pages.‡

Nadoli et al., “Intelligent Agents in the Simulation of Manufacturing Systems”, Proceedings of the SCS Multiconference on AI and Simulation, 1989, 1 page.‡

IAP Sports Lingo 0×09 Protocol V1.00, May 1, 2006, 17 pages.‡

NCIP Staff, “Magnification Technology”, available at <http://www2.edc.org/ncip/library/vi/magnsfi.htm>, 1994, 6 pages.‡

(56) References Cited

OTHER PUBLICATIONS

Wilson, Mark, "New iPod Shuffle Moves Buttons to Headphones, Adds Text to Speech", available at <http://gizmodo.com/5167946/new-ipod-shuffle-moves- buttons-to-headphones-adds-text-to-speech, Mar. 11, 2009, 13 pages.‡
Ng, Simon, "Google's Task List Now Comes to lphone", SimonBlog, Available at <http://www.simonblog.com/2009/02/04/googles-task-list-now-comes-to- iphone/, Feb. 4, 2009, 33 pages.‡
Zainab, "Google Input Tools Shows Onscreen Keyboard in Multiple Languages [Chrome]", available at <http://www.addictivetips.com/internet-tips/google- input-tools-shows-multiple-language-onscreen-keyboards-chrome>/, Jan. 3, 2012, 3 pages.‡
Osxdaily, "Get a List of Siri Commands Directly from Siri", Available at <http://osxdaily.com/2013/02/05/list-siri-commands >/, Feb. 5, 2013, 15 pages.‡
Zelig, "A Review of the Palm Treo 750v"' available at <http://www.mtekk.com.au/Articles/tabid/54/articleType/ArticleView/articleId /769/A-Review-of-the-Palm-Treo-750v.aspx>, Feb. 5, 2007, 3 pages.‡
Panasonic, "Toughbook 28: Powerful, Rugged and Wireless", Panasonic: Toughbook Models, available at <http://www.pansonic.com/computer/notebook/html/01a_s8.htm>, retrieved on Dec. 19, 2002, 3 pages.‡
Zhao, Y., "An Acoustic-Phonetic-Based Speaker Adaptation Technique for Improving Speaker-Independent Continuous Speech Recognition", IEEETransactions on Speech and Audio Processing, vol. 2, No. 3, Jul. 1994, pp. 381-394.‡
Papadimitriou et al., "Latent Semantic Indexing: A Probabilistic Analysis", Available online at <http://citeseerx.ist.psu.edu/messaqes/downloadsexceeded.htm;>, Nov. 14, 1997, 21 pages.‡
Patent Abstracts of Japan, vol. 014, No. 273 (E-0940)Jun. 13, 1990 (Jun. 13, 1990)-& JP 02 086057 A (Japan Storage Battery Co LTD), Mar. 27, 1900 (Mar. 27, 1990).‡
Karp, P. D., "A Generic Knowledge-Base Access Protocol", Available online at <http://lecture.cs.buu.ac.th/-f450353/Document/gfp.pdf>, May 12, 1994, 66 pages.‡
Gruber, Thomas R., "Interactive Acquisition of Justifications: Learning "Why" by Being Told "What"", Knowledge Systems Laboratory, Technical Report KSL, Original Oct. 1990, Revised Feb. 1991, 24 pages.‡
Butler, Travis, "Archos Jukebox 6000 Challenges Nomad Jukebox", available at <http://tidbits.com/article/6521>, Aug. 13, 2001, 5 pages.‡
Schluter et al., "Using Phase Spectrum Information for Improved Speech Speech, and Signal Processing, Recognition Performance", IEEE International Conference on Acoustics, Speech, and Signal Processing, 2001, pp. 133-136.‡
Campbell et al.,"An Expandable Error-Protected 4800 BPS CELP Coder (U.S. Federal Standard 4800 BPS Voice Coder)", (Proceedings of IEEE Int3 1 Acoustics, Speech, and Signal Processing Conference, May 1983), as reprinted in Vector Quantization (IEEE Press, 1990), 1990, pp. 328-330.‡
Gruber, Tom, "Every Ontology is a Treaty—A Social Agreement—Among People with Some Common Motive in Sharing", Official Quarterly Bulletin of AIS Special Interest Group on Semantic Web and Information Systems, vol. 1, No. 3, 2004, pp. 1-5.‡
Gruber, Tom, "Helping Organizations Collaborate, Communicate, and Learn", Presentation to NASA Ames Research, Available online at <http://tomgruber.org/writing/organizational-intelligence-talk.html>, Mar.-Oct. 2003, 30 pages.‡
Schone et al., "Knowledge-Free Induction of Morphology Using Latent Semantic Analysis", Proceedings of the 2nd Workshop on Learning Language in Logic and the 4th Conference on Computational Natural Language Learning, vol. 7, 2000, pp. 67-72.‡
Kline et al., "Improving GUI Accessibility for People with Low Vision", CHI '95 Proceedings of the SIGCHI Conference on Human Factors in Computing Systems, May 7-11, 1995, pp. 114-121.‡
Kline et al., "UnWindows 1.0: X Windows Tools for Low Vision Users", ACM SIGCAPH Computers and the Physically Handicapped, No. 49, Mar. 1994, pp. 1-5.‡
Knownav, "Knowledge Navigator", YouTube Video available at http://www.youtube.com/watch?v=QRH8eimU_20>, Apr. 29, 2008, 1 page.‡
Konolige, Kurt, "A Framework for a Portable Natural-Language in erface to Large Data Bases", SRI International, Technical Note 197, Oct. 12, 1979, 54 pages.‡
Choularton et al., "User Responses to Speech Recognition Errors: Consistency of Behaviour Across Domains", Proceedings of the 10th Australian International Conference on Speech Science & Technology, Dec. 8-10, 2004, pp. 457-462.‡
Lee et al., "A Multi-Touch Three Dimensional Touch-Sensitive Tablet", CHI '85 Proceedings of the SIGCHI Conference on Human Factors in Computing System, Apr. 1985, pp. 21-25.‡
Lee et al., "Golden Mandarin (II)—An Intelligent Mandarin Dictation Machsne for Chinese Character Input with Adaptation/Learning Functions", International Symposium on Speech, Image Processing and Neural Networks, Hong Kong, Apr. 1994, 5 pages.‡
Lee et al., "System Description of Golden Mandarin (I) Voice Input for Unlimited Chinese Characters", International Conference on Computer Processing of Chinese & Oriental Languages, vol. 5, No. 3 4, Nov. 1991, 16 pages.‡
Cohen et al., "An Open Agent Architecture", available at <http://citeseerx.ist.psu.edu/viewdoc/summary?doi=10.1.1.30.480>, 1994, 8 pages.‡
International Search Report and Written Opinion received for PCT Patent Application No. PCT/US2013/044834, dated Dec. 20, 2013, 13 pages.‡
Creative Technology Ltd., "Creative NOMAD® II: Getting Started—User Guide (on Line Version)", available at <http://ecl.images-amazon.com/media/i3d/01/A/man-migrate/MANUAL000026434.pdf>, Apr. 2000, 46 pages.‡
Creative Technology Ltd., "Creative Nomad®: Digital Audio Player: User Guide (On-Line Version)", available at <http://ecl.images-amazon.com/media/i3d/01/A/man-migrate/MANUAL000010757.pdf>, Jun. 1999, 40 pages.‡
Public Safety Technologies, "Tracer 2000 Computer", available at http://www.pst911.com/tracer.html, retrieved on Dec. 19, 2002, 3 pages.‡
Creative, "Digital MP3 Player", available at <http://web.archive.org/web/20041024074823/www.creative.com/products/product.asp?category=213subcategory=216&product=4983, 2004, 1 page.‡
Intraspect Software, "The Intraspect Knowledge Management Solution: Technical Overview", available at <http://tomgruber.org/writing/intraspect- whitepaper-1998.pdf, 1998, 18 pages.‡
International Search Report and Written Opinion received for PCT Patent Application No. PCT/US2014/049568, dated Nov. 14, 2014, 12 pages.‡
International Search Report and Written Opinion received for PCT Patent Application No. PCT/US2015/019322, dated Jun. 18, 2015, 16 pages.‡
Ren et al., "Efficient Strategies for Selecting Small Targets on Pen-Based Systems: An Evaluation Experiment for Selection Strategies and Strategy Classifications", Proceedings of the IFIP TC2/TC13 WG2.7/WG13.4 Seventh Working Conference on Engineering for Human-Computer Interaction, vol. 150, 1998, pp. 19-37.‡
Diamond Multimedia Systems, Inc., "Rio PMP300: User's Guide", available at <http://eel.images-amazon.com/media/i3d/01/A/man-migrate/MANUAL000022854.pdf>, 1998, 28 pages.‡
Iso-Sipila et al., "Multi-Lingual Speaker-Independent Voice User Interface for Mobile Devices", ICASSP 2006 Proceedings, IEEE International Conference on Acoustics, Speech and Signal Processing May 14, 2006, pp. 1-081.‡
IBM, "Why Buy: ThinkPad", available at <http://www.pc.ibm.com/us/thinkpad/easeofuse.html>, retrieved on Dec. 19, 2002, 2 pages.‡
id3.org, "id3v2.4.0—Frames", available at <http://id3.org/id3v2.4.0- frames?action=print, retrieved on Jan. 22, 2015, 41 pages.‡
International Preliminary Report on Patentability received for PCT Patent Application No. PCT/US2005/030234, dated Mar. 20, 2007, 9 pages.‡
International Preliminary Report on Patentability received for PCT Patent Application No. PCT/US2011/037014, dated Dec. 13, 2012, 10 pages.‡

(56) References Cited

OTHER PUBLICATIONS

Baudel et al., "2 Techniques for Improved HC Interaction: Toolglass & Magic Lenses: The See-Through Interface", Apple Inc., Video Clip, CHI'94 Video Program on a CD, 1994.‡

Abcom Pty. Ltd. "12.1 925 Candela Mobile PC", LCDHardware.com, available at <http://www.lcdhardware.com/panel/12_1_panel/default.asp.>, retrieved on Dec. 19, 2002, 2 pages.‡

Extended European Search Report (includes Partial European Search Report and European Search Opinion) received for European Patent Application No. 15169349.6, dated Jul. 28, 2015, 8 pages.‡

Extended European Search Report (includes Partial European Search Report and European Search Opinion) received for European Patent Application No. 16150079.8, dated Feb. 18, 2016, 7 pages.‡

International Preliminary Report on Patentability received for PCT Patent Application No. PCT/US2014/023826, datedd Sep. 24, 2015, 9 pages.‡

Aikawa et al., "Generation for Multilingual MT", available at <http://mtarchive.info/mts-2001-Aikawa.pdf>, retrieved on Sep. 18, 2001, 6 pages.‡

Alshawi et al., "Declarative Derivation of Database Queries from Meaning Representations", Proceedings of the BANKAI Workshop on Intelligent Information Access, Oct. 19914, 21 pages.‡

International Search Report Written Opinion received for PCT Patent Application No. PCT/US2016/021410, dated Jul. 26, 2016, 19 pages.‡

Bociurkiw, Michael, "Product Guide: Vanessa Matz"' available at <http://www.forbes.com/asap/2000/1127/vmartzprint.html, retrieved on Jan. 23, 2003, 2 pages.‡

Amano, Junko, "A User-Friendly Authoring System for Digital Talking Books", IEICE Technical Report, The Institute of Electronics, Information and Communication Engineers, vol. 103, No. 418, Nov. 6, 2003, pp. 33-40.‡

Amrel Corporation, "Rocky Matrix BackLit Keyboard", available at <http://www.amrel.com/asi_matrixkeyboard.html, retrieved on Dec. 19, 2002, 1 page.‡

Burke et al., "Question Answering from Frequently Asked Question Files", AI Magazine, vol. 18, No. 2, 1997, 10 pages.‡

Apple Computer, Inc., "Welcome to Tiger", available at <http://www.maths.dundee.ac.uk/software/Welcom_to_Mac_OS_X_v10.4_Ti ger.pdf>, 2005, pp. 1-32.‡

Office Action received for Danish Patent Application No. PA201770035, dated Oct. 17, 2017, 4 pages.‡

Office Action received for Danish Patent Application No. PA201770035, dated Mar. 23, 2017, 6 pages.‡

Office Action received for Danish Patent Application No. PA201770036, dated Jun. 20, 2017, 10 pages.‡

Office Action received for Danish Patent Application No. PA201770036, dated Feb. 21, 2018, 3 pages.‡

Office Action received for Danish Patent Application No. PA201770032, dated Oct. 19, 2017, 2 pages.‡

Office Action received for Danish Patent Application No. PA201770035, dated Mar. 20, 2018, 5 pages.‡

Office Action received for Danish Patent Application No. PA201770032, dated Apr. 18, 2017, 10 pages.‡

Extended European Search Report received for European Patent Application No. 16904830.3, dated Jun. 24, 2019, 8 pages.‡

Extended European Search Report received for European Patent Application No. 19157463.1, dated Jun. 6, 2019, 8 pages.‡

Office Action received for Korean Patent Application No. 10-2019-7004448, dated Sep. 19, 2019, 12 pages (6 pages of English translation and 6 pages of Official Copy).‡

Intention to Grant received for Danish Patent Application No. PA201770036, dated May 1, 2018, 2 pages.‡

Notice of Acceptance received for Australian Patent Application No. 2018241102, dated May 22, 2019, 3 pages.‡

Decision to Grant received for Danish Patent Application No. PA201770032, dated May 22, 2019, 2 pages.‡

Invitation to Pay Additional Fees Received for PCT Patent Application No. PCT/US2016/059953, dated Dec. 29, 2016, 2 pages.‡

Leong et al., "CASIS: A Context-Aware Speech Interface System", Proceedings of the 10th International Conference on Intelligent User Interfaces, Jan. 2005, pp. 231-238.‡

Leung et al., "A Review and Taxonomy of Distortion-Oriented Presentation Techniques", ACM Transactions on Computer-Human Interaction (TOCHI), vol. 1, No. 2, Jun. 1994, pp. 126-160.‡

Leveseque et al., "A Fundamental Tradeoff in Knowledge Representation and Reasoning", Readings in Knowledge Representation, 1985, 30 pages.‡

Levinson et al., "Speech synthesis in telecommunications", IEEE Communications Magazine, vol. 31, No. 11, Nov. 1993, pp. 46-53.‡

Lewis, "Speech synthesis in a computer aided learning environment", UK IT, Mar. 19-22, 1990, pp. 294-298.‡

Gruber, Tom, "It Is What It Does: The Pragmatics of Ontology for Knowledge Sharing", Proceedings of the International CIDOC CRM Symposium, Available online at <http://tomgruber.org/writing/cidoc-onyology.htm>, Mar. 26, 2003, 21 pages.‡

Lewis, Cameron, "Task Ave for iPhone Review", Mac Life, Available at <http://www.maclife.com/article/reviews/taskaveiphonereview >, Mar. 3, 2011, 5 pages.‡

Simkovitz, Daniel, "LP-DOS Magnifies the PC Screen", IEEE, 1992, pp. 203-204.‡

Gruber, Tom, "Ontologies, Web 2.0 and Beyond", Ontology Summit, Available online at <http://tomgruber.org/writing/ontolog-social-web-keynote.htm, Apr. 2007, 17 pages.‡

Lewis, Peter, "Two New Ways to Buy Your Bits", CNN Money, available at <http://money.cnn.com/2003/12/30/commentary/ontechnology/download/>,, Dec. 31, 2003, 4 pages.‡

Simonite, Tom, "One Easy Way to Make Siri Smarter", Technology Review, Oct. 18, 2011, 2 pages.‡

Gruber, Tom, "Ontology of Folksonomy: A Mash-Up of Apples and Oranges", Int'l Journal on Semantic Web & Information Systems, vol. 3, No. 2, 2007, 7 pages.‡

Gruber, Tom, "Siri, A Virtual Personal Assistant-Bringing Intelligence to the Interface", Semantic Technologies Conference, Jun. 16, 2009, 21 pages.‡

Li et al., "A Phonotactic Language model for Spoken Language Identification", Proceedings of the 43rd Annual Meeting of the ACL, Jun. 25, 2005, pp. 515-522.‡

Singh et al., "Automatic Generation of Phone Sets and Lexical Transcriptions", Acoustics, Speech and Signal Processing (ICASSP'00), 2000, 1 page.‡

Gruber, Tom, "TagOntology", Presentation to Tag Camp, Oct. 29, 2005, 20 pages.‡

Singh, N., "Unifying Heterogeneous Information Models", Communications of the ACM, 1998, 13 pages.‡

Lieberman et al., "Out of Context: Computer Systems that Adapt to, and Learn from, Context", IBM Systems Journal, vol. 39, No. 3 & 4, 2000, pp. 617-632.‡

Sinitsyn, Alexander, "A Synchronization Framework for Personal Mobile Servers", Proceedings of the Second IEEE Annual Conference on Pervasive Computing and Communications Workshops, Piscataway, 2004, pp. 1, 3 and 5.‡

Lieberman, Henry, "A Multi-Scale, Multi-Layer, Translucent Virtual Space", Proceedings of IEEE Conference on Information Visualization, Aug. 1997, pp. 124-131.‡

Slaney et al., "On the Importance of Time—A Temporal Representation of Sound", Visual Representation of Speech Signals, 1993, pp. 95-116.‡

Lieberman, Henry, "Powers of Ten Thousand: Navigating in Large Information Spaces", Proceedings of the ACM Symposium on User Interface Software and Technology, Nov. 1994, pp. 1-2.‡

Smeaton, Alan F., "Natural Language Processing and Information Retrieval", Information Processing and Management, vol. 26, No. 1, 1990, pp. 19-20.‡

Lin et al., "A Distributed Architecture for Cooperative Spoken Dialogue Agents with Coherent Dialogue State and History", Available on line at <http://citeseerx.ist.psu.edu/viewdoc/summary?doi=10.1.1.42.272>, 1999, 4 pages.‡

Smith et al., "Guidelines for Designing User Interface Software", User Lab, Inc., Aug. 1986, pp. 1-384.‡

Lin et al., "A New Framework for Recognition of Mandarin Syllables with Tones Using Sub-syllabic Unites", IEEE Interna-

(56) References Cited

OTHER PUBLICATIONS tional Conference on Acoustics, Speech and Signal Processing (ICASSP-93), Apr. 1993, 4 pages.‡
Smith et al., "Relating Distortion to Performance in Distortion Oriented Displays", Proceedings of Sixth Australian Conference on Computer-Human Interaction, Nov. 1996, pp. 6-11.‡
Linde et al., "An Algorithm for Vector Quantizer Design", IEEE Transactions on Communications, vol. 28, No. 1, Jan. 1980, 12 pages.‡
Sony Eiicsson Corporate, "Sony Ericsson to introduce Auto pairing. TM. to Improve Bluetooth.TM. Connectivity Between Headsets and Phones", Press Release, available at <http://www.sonyericsson.com/spg.jsp?cc=global&c=en&ver=4001template =pc3_1_ 1&z...>, Sep. 28, 2005, 2 pages.‡
Liu et al., "Efficient Joint Compensation of Speech for the Effects of Additive Noise and Linear Filtering", IEEE International Conference of Acoustics, Speech and Signal Processing, ICASSP-92, Mar. 1992, 4 pages.‡
Soong et al., "A High Quality Subband Speech Coder with Backward Adaptive Predictor and Optimal Time-Frequency Bit Assignment", (Proceedings of the IEEE International Acoustics, Speech, and Signal Processing Conference, Apr. 1986), as reprinted in Vector Quantization (IEEE Press, 1990), 1990, pp. 316-319.‡
Logan et al., "Mel Frequency Cepstral Co-efficients for Music Modeling", International Symposium on Music Information Retrieval, 2000, 2 pages.‡
Speaker Recognition, Wikipedia, The Free Enclyclopedia, Nov. 2, 2010, 4 pages.‡
Gruber, Tom, "Where the Social Web Meets the Semantic Web", Presentation at the 5th International Semantic Web Conference, Nov. 2006, 38 pages.‡
Lowerre, B. T., "The-Harpy Speech Recognition System", Doctoral Dissertation, Department of Computer Science, Carnegie Mellon University, Apr. 1976, 20 pages.‡
Spiller, Karen, "Low-Decibel Earbuds Keep Noise at a Reasonable Level", available at <http://www.nashuatelegraph.com/apps/pbcs.dll/article?Date=20060813&Cat 3...>, Aug. 13, 2006, 3 pages.‡
Gruhn et al., "A Research Perspective on Computer-Assisted Office Work", IBM Systems Journal, vol. 18, No. 3, 1979, pp. 432-456.‡
Lyon, R., "A Computational Model of Binaural Localization and Separation", Proceedings of IEEE International Conference on Acoustics, Speech and Signal Processing, Apr. 1983, pp. 1148-1151.‡
SRI International, "The Open Agent Architecture TM 1.0 Distribution", Open Agent Architecture (OAA), 1999, 2 pages.‡
Guay, Matthew, "Location-Driven Productivity with Task Ave", available at <http://iphone.appstorm.net/reviews/productivity/location-driven-productivity-with-task-ave/>, Feb. 19, 2011, 7 pages.‡
Lyons et al., "Augmenting Conversations Using Dual-Purpose Speech", Proceedings of the 17th Annual ACM Symposium on User interface Software and Technology, 2004, 10 pages.‡
SRI, "SRI Speech: Products: Software Development Kits: EduSpeak", available at <http://web.archive.org/web/20090828084033/http://www.speechatsri.com/ products/eduspeak>shtml, retrieved on Jun. 20, 2013, 2 pages.‡
Lyons, Richard F., "CCD Correlators for Auditory Models", Proceedings of the Twenty-Fifth Asilomar Conference on Signals, Systems and Computers, Nov. 4-6, 1991, pp. 785-789.‡
Guida et al., "NLI: A Robust Interface for Natural Language Person-Machine Communication", International Journal of Man-Machine Studies, vol. 17, 1982, 17 pages.‡
Srihari, R. K.., "Use of Multimedia Input in Automated Image Annotation and Content-based Retrieval", Proceedings of Spie, International Society for Optical Engineering, vol. 2420, Feb. 9, 1995., pp. 249-260.‡
Macchi, Marian, "Issues in Text-to-Speech Synthesis" Proceedings of IEEE International Joint Symposia on Intelligence and Systems, May 21, 1998, pp. 318-325.‡
Srinivas et al., "Monet: A Multi-Media System for Conferencing and Application Sharing in Distributed Systems", CERC Technical Report Series Research Note, Feb. 1992.‡
Mackenzie et al., "Alphanumeric Entry on Pen-Based Computers", International Journal of Human-Computer Studies, vol. 41, 1994, pp. 775-792.‡
Mackinlay et al., "The Perspective Wall: Detail and Context Smoothly Integrated", ACM, 1991, pp. 173-179.‡
Macsimum News, "Apple Files Patent for an Audio Interface for the iPod", available at <http://www.macsimumnews.com/index.php/archive/applefilespatent_for_an_audio_interface_for_theipod>, retrieved on Jul. 13, 2006, 8 pages.‡
Starr et al., "Knowledge-Intensive Query Processing", Proceedings of the 5th KRDB Workshop, Seattle, May 31, 1998, 6 pages.‡
Mactech, "KeyStrokes 3.5 for Mac OS X Boosts Word Prediction", available at <http://www.mactech.com/news/?p=1007129>, retrieved on Jan. 7, 2008, 3 pages.‡
Guim, Mark, "How to Set a Person-Based Reminder with Cortana", available at <http://www.wpcentral.com/how-to-person-based-reminder-cortana>, Apr. 26, 2014, 15 pages.‡
Maghbouleh, Arman, "An Empirical Comparison of Automatic Decision Tree and Linear Regression Models for Vowel Durations", Revised Version of a Paper Presented at the Computational Phonology in Speech Technology Workshop, 1996 Annual Meeting of the Association for Computational Linguistics in Santa Cruz, California, 7 pages.‡
Stealth Computer Corporation, "Peripherals for Industrial Keyboards & Pointing Devices", available at <http://www.stealthcomputer.com/peripheralsoem.htm>, retrieved on Dec. 19, 2002, 6 pages.‡
Gurevych et al., "Semantic Coherence Scoring Using an Ontology", North American Chapter of the Association for Computational Linguistics Archive, Proceedings of the 2003 Conference of the North American Chapter of the Association for Computational Linguistics on Human Language Technology, May 27, 2003, 8 pages.‡
Steinberg, Gene, "Sonicblue Rio Car (10 GB, Reviewed: 6 GB)", available at <http://electronics.cnet.com/electronics/0-6342420-1304-4098389.htrnl>, Dec. 12, 2000, 2 pages.‡
Mahedero et al., "Natural Language Processing of Lyrics", In Proceedings of the 13th Annual ACM International Conference on Multimedia, ACM, Nov. 6-11, 2005, 4 pages.‡
Mangu et al., "Finding Consensus in Speech Recognition: Word Error Minimization and Other Applications of Confusion Networks", Computer Speech and Language, vol. 14, No. 4, 2000, pp. 291-294.‡
Stent et al., "Geo-Centric Language Models for Local Business Voice Search", AT&T Labs—Research, 2009, pp. 389-396.‡
Stent et al., "The CommandTalk Spoken Dialogue System", SRI International, 1999, pp. 183-190.‡
Manning etal, "Foundations of Statistical Natural Language Processing", The MIT Press, Cambridge Massachusetts, 1999, pp. 10-11.‡
Guzzoni et al., "A Unified Platform for Building Intelligent Web Interaction Assistants", Proceedings of the 2006 IEEE/WIC/ACM International Conference on Web Intelligence and Intelligent Agent Technology, Computer Society, 2006, 4 pages.‡
Stern et al., "Multiple Approaches to Robust Speech Recognition", Proceedings of Speech and Natural Language Workshop, 1992, 6 pages.‡
Guzzoni et al., "Active, A Platform for Building Intelligent Operating Rooms", Surgetica 2007 Computer-Aided Medical Interventions: Tools and Applications, 2007, pp. 191-198.‡
Marcus et al., "Building a Large Annotated Corpus of English: The Penn Treebank", Computational Linguistics, vol. 19, No. 2, 1993, pp. 313-330.‡
Stickel, Mark E., "A Nonclausal Connection-Graph Resolution Theorem-Proving Program", Proceedings of AAAI'82, 1982, 5 pages.‡
Guzzoni et al., "Active, a platform for Building Intelligent Software", Computational Intelligence, available at <http://www.informatik.uni-trier.del-ley/pers/hd/g/Guzzoni:Didier>, 2006, 5 pages.‡

(56) References Cited

OTHER PUBLICATIONS

Stifleman, L., "Not Just Another Voice Mail System", Proceedings of 1991 Conference, American Voice, Atlanta GA, Sep. 24-26, 1991, pp. 21-26.‡
Markel et al., "Linear Prediction of Speech", Springer-Verlag, Berlin, Heidelberg, New York, 1976, 12 pages.‡
Stone et al., "The Movable Filter as a User Interface Tool", CHI '94 Human Factors in Computing Systems, 1994, pp. 306-312.‡
Guzzoni et al., "Active, A Tool for Building Intelligent User Interfaces", ASC 2007, Palma de Mallorca, Aug. 2007, 6 pages.‡
Markel et al., "Linear Production of Speech", Reviews, 1976, pp. xii, 288.‡
Strom et al., "Intelligent Barge-In in Conversational Systems", MIT laboratory for Computer Science, 2000, 4 pages.‡
Guzzoni et al., "Many Robots Make Short Work", AAAI Robot Contest, SRI International, 1996, 9 pages.‡
Martin et al., "Building and Using Practical Agent Applications", SRI International, PAAM Tutorial, 1998, 78 pages.‡
Stuker et al., "Cross-System Adaptation and Combination for Continuous Speech Recognition: The Influence of Phoneme Set and Acoustic Front-End", Influence of Phoneme Set and Acoustic Front-End, Interspeech, Sep. 17-21, 2006, pp. 521-524.‡
Guzzoni et al., "Modeling Human-Agent Interaction with Active Ontologies", AAAI Spring Symposium, Interaction Challenges for Intelligent Assistants, Stanford University, Palo Alto, California, 2007, 8 pages.‡
Martin et al., "Building Distributed Software Systems with the Open Agent Architecture", Proceedings of the Third International Conference on the Practical Application of Intelligent Agents and Multi-Agent Technology, Mar. 1998, pp. 355-376.‡
Guzzoni, D., "Active: A Unified Platform for Building Intelligent Assistant Applications", Oct. 25, 2007, 262 pages.‡
Su et al., "A Review of ZoomText Xtra Screen Magnification Program for Windows 95", Journal of Visual Impairment Blindness Feb. 1998, pp. 116-119.‡
Martin et al., "Development Tools for the Open Agent Architecture", Proceedings of the International Conference on the Practical Application of Intelligent Agents and Multi-Agent Technology, Apr. 1996, pp. 1-17.‡
Haas et al., "An Approach to Acquiring and Applying Knowledge", SRI international, Nov. 1980, 22 pages.‡
Su, Joseph C., "A Review of Telesensory's Vista PCI Screen Magnification System", Journal of Visual Impairment Blindness, Oct. 1998, pp. 705, 707-710.‡
Martin et al., "Information Brokering in an Agent Architecture", Proceedings of the Second International Conference on the Practical Application of Agents and Multi-Agent Technology, Apr. 1996, pp. 1-17.‡
Hadidi et al., "Student's Acceptance of Web-Based Course Offerings: An Empirical Assessment", Proceedings of the Americas Conference on Information Systems(AMCIS), 1998, 4 pages.‡
Sugumaran, V., "A Distributed Intelligent Agent-Based Spatial Decision Support System", Proceedings of the Americas Conference on Information systems (AMCIS), Dec. 31, 1998, 4 pages.‡
Martin et al., "The Open Agent Architecture: A Framework for Building Distributed Software Systems", Applied Artificial Intelligence: An International Journal, vol. 13, No. 1-2, available at <http://adam.cheyer.com/papers/oaa.pdf>>, retrieved from internet on Jan.-Mar. 1999.‡
Sullivan, Danny, "How Google Instant's Autocomplete Suggestions Work", available at http://searchengineland.com/how-google-instant-autocomplete- suggestions-work-62592>, Apr. 6, 2011, 12 pages.‡
Martin et al., "Transportability and Generality in a Natural-Language Interface System", Proceedings of the Eighth International Joint Conference on Artificial Intelligence, Technical Note 293, Aug. 1983, 21 pages.‡
Haga et al., "A Usability Survey of a Contents-Based Video Retrieval System by Combining Digital Video and an Electronic Bulletin Board", The Internet and Higher Education, vol. 8, No. 3, 2005, pp. 251-262.‡
Martins et al., "Extracting and Exploring the Geo-Temporal Semantics of Textual Resources", Semantic Computing, IEEE International Conference, 2008, pp. 1-9.‡
Summerfield et al., "ASIC Implementation of the Lyon Cochlea Model", Proceedings of the 1992 International Conference on Acoustics, Speech and Signal Processing, IEEE, vol. V, 1992, pp. 673-676.‡
Hain et al., "The Papageno TTS System", Siemens AG, Corporate Technology, Munich, Germany TC-STAR Workshop, 2006, 6 pages.‡
Masui, Toshiyuki, "POBox: An Efficient Text Input Method for Handheld and Ubiquitous Computers", Proceedings of the 1st International Symposium on Handheld and Ubiquitous Computing, 1999, 12 pages.‡
Haitsma et al., "A Highly Robust Audio Fingerprinting System", In Proceedings of the International Symposium on Music Information Retrieval (ISMIR), 2002, 9 pages.‡
Matiasek et al., "Tamic-P: A System for NL Access to Social Insurance Database", 4th International Conference on Applications of Natural Language to Information Systems, Jun. 1999, 7 pages.‡
Sundaram et al., "Latent Perceptual Mapping with Data-Driven Variable- Length Acoustic Units for Template-Based Speech Recognition", ICASSP 2012, Mar. 2012, pp. 4125-4128.‡
Halbert, D. C., "Programming by Example", Dept. Electrical Engineering and Comp. Sciences, University of California, Berkley, Nov. 1984, pp. 1-76.‡
Sycara et al., "Coordination of Multiple Intelligent Software Agents", International Journal of Cooperative Information Systems (IJCIS), vol. 5, No. 2 3, 1996, 31 pages.‡
Matsui et al., "Speaker Adaptation of Tied-Mixture-Based Phoneme Models for Text-Prompted Speaker Recognition", 1994 IEEE International Conference on Acoustics, Speech and Signal Processing, Apr. 19-22, 1994, 1-125-1-128.‡
Hall, William S., "Adapt Your Program for Worldwide Use with Windows.TM. Internationalization Support", Microsoft Systems Journal, vol. 6, No. 6, Nov./Dec. 1991, pp. 29-58.‡
Sycara et al., "Distributed Intelligent Agents", IEEE Expert, vol. 11, No. 6, Dec. 1996, 32 pages.‡
Matsuzawa, A, "Low-Voltage and Low-Power Circuit Design for Mixed Analog/Digital Systems in Portable Equipment", IEEE Journal of Solid-State Circuits, vol. 29, No. 4, 1994, pp. 470-480.‡
Haoui et al., "Embedded Coding of Speech: A Vector Quantization Approach", (Proceedings of the IEEE International Acoustics, Speech and Signal Processing Conference, Mar. 1985), as reprinted in Vector Quantization (IEEE Press, 1990), 1990, pp. 297-299.‡
Sycara et al., "Dynamic Service Matchmaking among Agents in Open Information Environments", SIGMOD Record, 1999, 7 pages.‡
Hardwar, Devindra, "Driving App Waze Builds its own Siri for Hands-Free Voice Control", Available online at <http://venturebeat.com/2012/02/09/driving-app-waze-builds-its-own-siri-for- hands-free-voice-control/>, retrieved on Feb. 9, 2012, 4 pages.‡
McGuire et al., "SHADE: Technology for Knowledge-Based Collaborative Engineering", Journal of Concurrent Engineering Applications and Research (CERA), 1993, 18 pages.‡
Sycara et al., "The RETSINA MAS Infrastructure", Autonomous Agents and Multi-Agent Systems, vol. 7, 2003, 20 pages.‡
Harris, F. J., "On the Use of Windows for Harmonic Analysis with the Discrete Fourier Transform", In Proceedings of the IEEE, vol. 66, No. 1, Jan. 1978, 34 pages.‡
Meet Ivee, Your Wi-Fi Voice Activated Assistant, available at <http://www.helloivee.com/>, retrieved on Feb. 10, 2014, 8 pages.‡
T3 Magazine, "Creative MuVo TX 256MB", available at <http://www.t3.co.uk/reviews/entertainment/mp3_player/creativemuvo_tx_256mb>, Aug. 17, 2004, 1 page.‡
Hartson et al., "Advances in Human-Computer Interaction", Chapters 1, 5, and 6, vol. 3, 1992, 121 pages.‡
TAOS, "TAOS, Inc. Announces Industry's First Ambient Light Sensor to Convert Light Intensity to Digital Signals", News Release, available at <http://www.taosine.com/presssrelease_090902.htm >, Sep. 16, 2002, 3 pages.‡
Mel Scale, Wikipedia the Free Encyclopedia, Last modified on Oct. 13, 2009 and retrieved on Jul. 28, 2010, available at <http://en.wikipedia.org/wiki/Melscale>, 2 pages.‡

(56) References Cited

OTHER PUBLICATIONS

Mellinger, David K., “Feature-Map Methods for Extracting Sound Frequency Modulation”, IEEE Computer Society Press, 1991, pp. 795-799.‡
Hashimoto, Yoshiyuki , “Simple Guide for iPhone Siri, Which Can Be Operated with Your Voice”, Shuwa System Co., Ltd., vol. 1, Jul. 5, 2012, pp. 8, 130, 131.‡
Taylor et al., “Speech Synthesis by Phonological Structure Matching”, International Speech Communication Association, vol. 2, Section 3, 1999, 4 pages.‡
Meng et al., “Generating Phonetic Cognates to Handle Named Entities in English-Chinese Cross-Language Spoken Document Retrieval”, Automatic Speech Recognition and Understanding, Dec. 2001, pp. 311-314.‡
Hawkins et al., “Hierarchical Temporal Memory: Concepts, Theory and Terminology”, Numenta, Inc., Mar. 27, 2007, 20 pages.‡
Tello, Ernest R., “Natural-Language Systems”, Mastering AI Tools and Techniques, Howard W. Sams & Company, 1988.‡
Meng et al., “Wheels: A Conversational System in the Automobile Classified Domain”, Proceedings of Fourth International Conference on Spoken Language, ICSLP 96, vol. 1, Oct. 1996, 4 pages.‡
Tenenbaum et al., “Data Structure Using Pascal”, Prentice-Hall, Inc., 1981, 34 pages.‡
He et al., “Personal Security Agent: KQML-Based PKI”, The Robotics Institute, Carnegie-Mellon University, Paper, 1997, 14 pages.‡
Menico, Costas, “Faster String Searches”, Dr. Dobb’s Journal, vol. 14, No. 7, Jul. 1989, pp. 74-77.‡
Textndrive, “Text’nDrive App Demo-Listen and Reply to your Messages by Voice while Driving!”, YouTube Video available at <http://www.youtube.com/watch?v=WaGfzoHsAMw>, Apr. 27, 2010, 1 page.‡
Menta, Richard, “1200 Song MP3 Portable is a Milestone Player”, available at <http://www.mp3newswire.net/stories/personaljuke.html>, Jan. 11, 2000, 4 pages.‡
Headset Button Controller v7.3 APK Full APP Download for Android, Blackberry, iPhone, 11 pages.‡
Merlin et al., “Non Directly Acoustic Process for Costless Speaker Recognition and Indexation”, International Workshop on Intelligent Communication Technologies and Applications, Jan. 1, 1999, 5 pages.‡
Hear voice from Google translate, Available on URL:https://www.youtube.com/watch?v=18AvMhFqD28, Jan. 28, 2011.‡
TG3 Electronics, Inc., “BL82 Series Backlit Keyboards”, available at <http://www.tg3electronics.com/products/backlit/backlit.htm >, retrieved on Dec. 19, 2002, 2 pages.‡
Meyer, Mike, “A Shell for Modern Personal Computers”, University of California, Aug. 1987, pp. 13-19.‡
The HP 150, “Hardware: Compact, Powerful, and Innovative”, vol. 8, No. 10, Oct. 1983, pp. 36-50.‡
Meyrowitz et al., “Brewin: An Adaptable Design Strategy for Window Manager/Virtual Terminal Systems”, Department of Computer Science, Brown University, 1981, pp. 180-189.‡
Tidwell, Jenifer, “Animated Transition”, Designing Interfaces, Patterns for effective Interaction Design, Nov. 2005, First Edition, 4 pages.‡
Miastkowski, Stan, “paperWorks Makes Paper Intelligent”, Byte Magazine, Jun. 1992.‡
Michos et al., “Towards an Adaptive Natural Language Interface to Command Languages”, Natural Language Engineering, vol. 2, No. 3, 1996, pp. 191-209.‡
Timothy et al., “Speech-Based Annotation and Retrieval of Digital Photographs”, Interspeech. 8th Annual Conference of the International Speech Communication Association, Aug. 27, 2007, pp. 2165-2168.‡
Microsoft Corporation, “Microsoft MS-DOS Operating System User’s Guide”, Microsoft Corporation, 1982, pp. 4-1 to 4-16, 5-1 to 5-19.‡
Tofel, Kevin C., “SpeakTolt: A Personal Assistant for Older iPhones, iPads”, Apple News, Tips and Reviews, Feb. 9, 2012, 7 pages.‡
Heger et al., “Knowbot: An Adaptive Data Base Interface”, Nuclear Science and Engineering, V. 107, No. 2, Feb. 1991, pp. 142-157.‡
Tombros et al., “Users’ Perception of Relevance of Spoken Documents”, Journal of the American Society for Information Science, New York, Aug. 2000, pp. 929-939.‡
Helm et al., “Building Visual Language Parsers”, Proceedings of CHI’91, Proceedings of the SIGCHI Conference on Human Factors in Computing Systems, 1991, 8 pages.‡
Microsoft Corporation, Microsoft Office Word 2003 (SP2), Microsoft Corporation, SP3 as of 2005, pp. MSWord 2003 Figures 1-5, 1983-2003.‡
Top 10 Best Practices for Voice User Interface Design available at <http://www.developer.com/voice/article.php/1567051/Top-10-Best-Practices-for-Voice-UserInterface-Design.htm, Nov. 1, 2002, 4 pages.‡
Touch, Joseph, “Zoned Analog Personal Teleconferencing”, USC / Information Sciences Institute, 1993, pp. 1-19.‡
Hendrickson, Bruce, “Latent Semantic Analysis and Fiedler Retrieval”, Discrete Algorithms and Mathematics Department, Sandia National Labs, Albuquerque, NM, Sep. 21, 2006, 12 pages.‡
Microsoft Press, “Microsoft Windows User’s Guide for the Windows Graphical Environment”, version 3.0, 1985-1990, pp. 33-41 & 70-74.‡
Toutanova et al., “Feature-Rich Part-of-Speech Tagging with a Cyclic Dependency Network”, Computer Science Dept., Stanford University, Stanford CA 94305-9040, 2003, 8 pages.‡
Hendrix et al., “Developing a Natural Language Interface to Complex Data”, ACM Transactions on Database Systems, vol. 3, No. 2, Jun. 1978, pp. 105-147.‡
Microsoft Windows XP, “Magnifier Utility”, Oct. 25, 2001, 2 pages.‡
Trigg et al., “Hypertext Habitats: Experiences of Writers in NoteCards”, Hypertext ’87 Papers; Intelligent Systems Laboratory, Xerox Palo Alto Research Center, 1987, pp. 89-108.‡
Hendrix et al., “The Intelligent Assistant: Technical Considerations Involved in Designing Q&A’s Natural-Language Interface”, Byte Magazine, Issue 14, Dec. 1987, 1 page.‡
Trowbridge, David, “Using Andrew for Development of Educational Applications”, Center for Design of Educational Computing, Carnegie-Mellon University (CMU-ITC-85-065), Jun. 2, 1985, pp. 1-6.‡
Microsoft Word 2000 Microsoft Corporation, pp. MSWord Figures 1-5, 1999.‡
Hendrix et al., “Transportable Natural-Language Interfaces to Databases”, SRI International, Technical Note 228, Apr. 30, 1981, 18 pages.‡
Tsai et al., “Attributed Grammar—A Tool for Combining Syntactic and Statistical Approaches to Pattern Recognition”, IEEE Transactions on Systems, Man and Cybernetics, vol. SMC-10, No. 12, Dec. 1980, 13 pages.‡
Microsoft, “Turn on and Use Magnifier”, available at <http://www.microsoft.com/windowsxp/using/accessibility/magnifierturnon.m spx>, retrieved on Jun. 6, 2009.‡
Hendrix, Gary G., “Human Engineering for Applied Natural Language Processing”, SRI International, Technical Note 139, Feb. 1977, 27 pages.‡
Tsao et al., “Matrix Quantizer Design for LPC Speech Using the Generalized Lloyd Algorithm”, (IEEE Transactions on Acoustics, Speech and Signal Processing, Jun. 1985), as reprinted in Vector Quantization (IEEE Press, 1990), 1990, pp. 237-245.‡
Microsoft/Ford, “Basic Sync Commands”, www.SyncMyRide.com, Sep. 14, 2007, 1 page.‡
Miller, Chance, “Google Keyboard Updated with New Personalized Suggestions Feature”, available at <http://9to5google.com/2014/03/19/google-keyboard-updated-with-new-personalized-suggestions-feature/, Mar. 19, 2014, 4 pages.‡
Tucker, Joshua, “Too Lazy to Grab Your TV Remote? Use Siri Instead”, Engadget, Nov. 30, 2011, 8 pages.‡
Milner, N. P., “A Review of Human Performance and Preferences with Different Input Devices to Computer Systems”, Proceedings of the Fourth Conference of the British Computer Society on People and Computers, Sep. 5-9, 1988, pp. 341-352.‡

(56) References Cited

OTHER PUBLICATIONS

Hendrix, Gary G., "Klaus: A System for Managing Information and Computational Resources", SRI International, Technical Note 230, Oct. 1980, 34 pages.‡

Milstead et al., "Metadata: Cataloging by Any Other Name", available at <http://www.iicm.tugraz.at/thesis/cgueddiss/literatur/Kapite106/References/Milstead_et_al._1999/metadata.html>, Jan. 1999, 18 pages.‡

Tur et al., "The CALO Meeting Assistant System", IEEE Transactions on Audio, Speech and Language Processing, vol. 18, No. 6, Aug. 2010, pp. 1601-1611.‡

Milward et al., "D2.2: Dynamic Multimodal Interface Reconfiguration, Talk and Look: Tools for Ambient Linguistic Knowledge", available at <http://www.ihmc.us/users/nblaylock?Pubs/Files talk d2.2.pdf>, Aug. 8, 2006, 69 pages.‡

Hendrix, Gary G., "Lifer: A Natural Language Interface Facility", SRI Stanford Research Institute, Technical Note 135, Dec. 1976, 9 pages.‡

Tur et al., "The CALO Meeting Speech Recognition and Understanding System", Proc. IEEE Spoken Language Technology Workshop, 2008, 4 pages.‡

Miniman, Jared, "Applian Software's Replay Radio and Player v1.02", pocketnow.com—Review, available at <http://www.pocketnow.com/reviews/replay/replay.htm>, Jul. 31, 2001, 16 pages.‡

Turletti, Thierry, "The INRIA Videoconferencing System (IVS)", Oct. 1994, pp. 1-7.‡

Hendrix, Gary G., "Natural-Language Interface", American Journal of Computational Linguistics, vol. 8, No. 2, Apr.-Jun. 1982, pp. 56-61.‡

Minimum Phase, Wikipedia the free Encyclopedia, Last modified on Jan. 12, 2010 and retrieved on Jul. 28, 2010, available at <http://en.wikipedia.org/wiki/Minimumphase>, 8 pages.‡

Tyson et al., "Domain-Independent Task Specification in the TACITUS Natural Language System", SRI International, Artificial Intelligence Center, May 1990, 16 pages.‡

Hendrix, Gary G., "The Lifer Manual: A Guide to Building Practical Natural Language Interfaces", SRI International, Technical Note 138, Feb. 1977, 76 pages.‡

Minker et al., "Hidden Understanding Models for Machine Translation", Proceedings of ETRW on Interactive Dialogue in Multi-Modal Systems, Jun. 1999, pp. 1-4.‡

Udell, J., "Computer Telephony", BYTE, vol. 19, No. 7, Jul. 1994, 9 pages.‡

Mitra et al., "A Graph-Oriented Model for Articulation of Ontology Interdependencies", Advances in Database Technology, Lecture Notes in Computer Science, vol. 1777, 2000, pp. 1-15.‡

Henrich et al., "Language Identification for the Automatic Grapheme-To-Phoneme Conversion of Foreign Words in a German Text-To-Speech System", Proceedings of the European Conference on Speech Communication and Technology, vol. 2, Sep. 1989, pp. 220-223.‡

Moberg et al., "Cross-Lingual Phoneme Mapping for Multilingual Synthesis Systems", Proceedings of the 8th International Conference on Spoken Language Processing, Jeju Island, Korea, INTERSPEECH 2004, Oct. 4-8, 2004, 4 pages.‡

Hermansky, H., "Perceptual Linear Predictive (PLP) Analysis of Speech", Journal of the Acoustical Society of America, vol. 87, No. 4, Apr. 1990, 15 pages.‡

Uslan et al., "A Review of Henter-Joyce's MAGic for Windows NT", Journal of Visual Impairment and Blindness, Dec. 1999, pp. 666-668.‡

Moberg, M., "Contributions to Multilingual Low-Footprint TTs System for Hand-Held Devices", Doctoral Thesis, Tampere University of Technology, Aug. 17, 2007, 82 pages.‡

Uslan et al., "A Review of Supernova Screen Magnification Program for Windows", Journal of Visual & Impairment Blindness, Feb. 1999, pp. 108-110.‡

Hermansky, H., "Recognition of Speech in Additive and Convolutional Noise Based on Rasta Spectral Processing", Proceedings of IEEE International Conference on Acoustics, Speech and Signal Processing (ICASSP'93), Apr. 1993, 4 pages.‡

Mobile Speech Solutions, Mobile Accessibility, SVOX AG Product Information Sheet, available at <http://www.svox.com/site/bra840604/con782768/mob965831936.aSQ?osLan g=1>, Sep. 27, 2012, 1 page.‡

Uslan et al., "A Review of Two Screen Magnification Programs for Windows 95: Magnum 95 and LP-Windows", Journal of Visual Impairment & Blindness, Sep.-Oct. 1997, 9-13.‡

Heyer et al., "Exploring Expression Data: Identification and Analysis of Coexpressed Genes", Genome Research, vol. 9, 1999, pp. 1106-1115.‡

Mobile Tech News, "T9 Text Input Software Updated", available at <http://www.mobiletechnews.com/info/2004/11/23/122155.html >, Nov. 23, 2004, 4 pages.‡

Van Santen, J. P.H., "Contextual Effects on Vowel Duration", Journal Speech Communication, vol. 11, No. 6, Dec. 1992, pp. 513-546.‡

Modi et al., "CMRadar: A Personal Assistant Agent for Calendar Management", AAAI, Intelligent Systems Demonstrations, 2004, pp. 1020-1021.‡

Hill, R. D., "Some Important Features and Issues in User Interface Management System", Dynamic Graphics Project, University of Toronto, CSRI, vol. 21, No. 2, Apr. 1987, pp. 116-120.‡

Mok et al., "Media Searching on Mobile Devices", IEEE EIT 2007 Proceedings, 2007, pp. 126-129.‡

Veiga, Alex, "AT&T Wireless Launching Music Service", available at <http://bizyahoo.com/ap/041005/att_mobile_music_5.html?printer=1>, Oct. 5, 2004, 2 pages.‡

Hinckley et al., "A Survey of Design Issues in Spatial Input", UIST '94 Proceedings of the 7th Annual ACM Symposium on User Interface Software and Technology, 1994, pp. 213-222.‡

Hiroshi, "TeamWork Station: Towards a Seamless Shared Workspace", NTT Human Interface Laboratories, CSCW 90 Proceedings, Oct. 1990, pp. 13-26.‡

Vepa et al., "New Objective Distance Measures for Spectral Discontinuities in Concatenative Speech Synthesis", Proceedings of the IEEE 2002 Workshop on Speech Synthesis, 2002, 4 pages.‡

Moore et al., "Combining Linguistic and Statistical Knowledge Sources in Natural-Language Processing for Atis", SRI International, Artificial Intellqence Center, 1995, 4 pages.‡

Hirschman et al., "Multi-Site Data Collection and Evaluation in Spoken Language Understanding", Proceedings of the Workshop on Human Language Technology, 1993, pp. 19-24.‡

Verschelde, Jan, "MATLAB Lecture 8. Special Matrices in MATLAB", UIC, Dept. of Math, Stat. CS, MCS 320, Introduction to Symbolic Computation, 2007, 4 pages.‡

Hobbs et al., "Fastus: A System for Extracting Information from Natural-Language Text", SRI International, Technical Note 519, Nov. 19, 1992, 26 pages.‡

Viegas et al., "Chat Circles", SIGCHI Conference on Human Factors in Computing Systems, May 15-20, 1999, pp. 9-16.‡

Moore et al., "SRI's Experience with the ATIS Evaluation", Proceedings of the Workshop on Speech and Natural Language, Jun. 1990, pp. 147-148.‡

Hobbs et al., "Fastus: Extracting Information from Natural-Language Texts", SRI International, 1992, pp. 1-22.‡

Viikki et al., "Speaker- and Language-Independent Speech Recognition in Mobile Communication Systems", IEEE, vol. 1, 2001, pp. 5-8.‡

Moore et al., "The Information Warfare Advisor: An Architecture for Interacting with Intelligent Agents Across the Web", Proceedings of Americas Conference on Information Systems (AMCIS), Dec. 31, 1998, pp. 186-188.‡

Hobbs, Jerry R., "Sublanguage and Knowledge", SRI International, Technical Note 329, Jun. 1984, 30 pages.‡

Vingron, Martin, "Near-Optimal Sequence Alignment", Current Opinion in Structural Biology, vol. 6, No. 3, 1996, pp. 346-352.‡

Moore, Robert C., "Handling Complex Queries in a Distributed Data Base", SRI International, Technical Note 170, Oct. 8, 1979, 38 pages.‡

(56) References Cited

OTHER PUBLICATIONS

Hodjat et al., "Iterative Statistical Language Model Generation for use with an Agent-Oriented Natural Language Interface", Proceedings of HCI International, vol. 4, 2003, pp. 1422-1426.‡

Moore, Robert C., "Practical Natural-Language Processing by Computer", SRI International, Technical Note 251, Oct. 1981, 34 pages.‡

Hoehfeld et al., "Learning with Limited Numerical Precision Using the Cascade-Correlation Algorithm", IEEE Transactions on Neural Networks, vol. 3, No. 4, Jul. 1992, 18 pages.‡

Moore, Robert C., "The Role of Logic in Knowledge Representation and Commonsense Reasoning", SRI International, Technical Note 264, Jun. 1982, 19 pages.‡

Vlingo InCar, "Distracted Driving Solution with Vlingo InCar", YouTube Video, Available online at<http://www.youtube.com/watch?v=Vqs8Xxgz4>, Oct. 2010, 2 pages.‡

Moore, Robert C., "Using Natural-Language Knowledge Sources in Speech Recognition", SRI International, Artificial Intelligence Center, Jan. 1999, pp. 1-24.‡

Holmes, "Speech System and Research", 1955, pp. 129-135, 152-153.‡

Vlingo, "Vlingo Launches Voice Enablement Application on Apple App Store", Press Release, Dec. 3, 2008, 2 pages.‡

Moran et al., "Intelligent Agent-Based User Interfaces", Proceedings of International Workshop on Human Interface Technology, Oct. 1995, pp. 1-4.‡

Holmes, J. N., "Speech Synthesis and Recognition-Stochastic Models for Word Recognition", Published by Chapman Hall, London, ISBN 0 412 534304, 1998, 7 pages.‡

Moran et al., "Multimodal User Interfaces in the Open Agent Architecture", International Conference on Intelligent User Interfaces (IU197), 1997, 8 pages.‡

Vogel et al., "Shift: A Technique for Operating Pen-Based Interfaces Using Touch", CHI '07 Proceedings, Mobile Interaction Techniques I, Apr. 28-May 3, 2007, pp. 657-666.‡

Voiceassist, "Send Text, Listen to and Send E-Mail by Voice", YouTube Video, Available online at <http://www.youtube.com/watch?v=0tEU61nHHA4>, Jul. 30, 2009, 1 page.‡

Hon et al., "CMU Robust Vocabulary-Independent Speech Recognition System", IEEE International Conference on Acoustics, Speech and Signal Processing (ICASSP-91), Apr. 1991, 4 pages.‡

Moran, Douglas B., "Quantifier Scoping in the SRI Core Language Engine", Proceedings of the 26th Annual Meeting on Association for Computational Linguistics, 1988, pp. 33-40.‡

Voiceonthego, "Voice on the Go (BlackBerry)", YouTube Video, available online at <http://www.youtube.com/watch?v=pJqpWgQS98w>, Jul. 27, 2009, 1 page.‡

Hon et al., "Towards Large Vocabulary Mandarin Chinese Speech Recognition", Conference on Acoustics, Speech, and Signal Processing, ICASSP-94, IEEE International, vol. 1, Apr. 1994, pp. 545-548.‡

Morgan, B., "Business Objects (Business Objects for Windows) Business Objects Inc.", DBMS, vol. 5, No. 10, Sep. 1992, 3 pages.‡

Hopper, Andy, "Pandora—An Experimental System for Multimedia Applications", Olivetti Research Laboratory, Apr. 1990, pp. 19-34.‡

W3C Working Draft, "Speech Synthesis Markup Language Specification for the Speech Interface Framework", available at <http://www.w3org./TR/speech- synthesis>, retrieved on Dec. 14, 2000, 42 pages.‡

Morland, D. V., "Human Factors Guidelines for Terminal Interface Design", Communications ofthe ACM vol. 26, No. 7, Jul. 1983, pp. 484-494.‡

Wadlow, M. G., "The Role of Human Interface Guidelines in the Design of Multimedia Applications", Carnegie Mellon University (To be Published in Current Psychology: Research and Reviews, Summer 1990 (CMU-ITC-91-101), 1990, pp. 1-22.‡

Morris et al., "Andrew: A Distributed Personal Computing Environment", Communications of the ACM, (Mar. 1986); vol. 29 No. 3,, Mar. 1986, pp. 184-201.‡

Wahlster et al., "Smartkom: Multimodal Communication with a Life-Like Character", Eurospeech-Scandinavia, 7th European Conference on Speech Communication and Technology, 2001, 5 pages.‡

Morton, Philip, "Checking If An Element Is Hidden", StackOverflow, Available at <http://stackoverflow.com/questions/178325/checking-if-an-element-is- hidden>, Oct. 7, 2008, 12 pages.‡

Horvitz et al., "Handsfree Decision Support: Toward a Non-invasive Human-Computer Interface", Proceedings of the Symposium on Computer Applications in Medical Care, IEEE Computer Society Press, 1995, p. 955.‡

Waibel, Alex, "Interactive Translation of Conversational Speech", Computer, vol. 29, No. 7, Jul. 1996, pp. 41-48.‡

Motro, Amihai, "Flex: A Tolerant and Cooperative User Interface to Databases", IEEE Transactions on Knowledge and Data Engineering, vol. 2, No. 2, Jun. 1990, pp. 231-246.‡

Horvitz et al., "In Pursuit of Effective Handsfree Decision Support: Coupling Bayesian Inference, Speech Understanding, and User Models", 1995, 8 pages.‡

Waldinger et al., "Deductive Question Answering from Multiple Resources", New Directions in Question Answering, Published by AAAI, Menlo Park, 2003, 22 pages.‡

Mountford et al., "Talking and Listening to Computers", The Art of Human-Computer Interface Design, Apple Computer, Inc., Addison-Wesley Publishing Company, Inc., 1990, 17 pages.‡

Walker et al., "Natural Language Access to Medical Text", SRI International, Artificial Intelligence Center, Mar. 1981, 23 pages.‡

Howard, John H., "(Abstract) An Overview of the Andrew File System", Information Technology Center, Carnegie Mellon University; (CMU-ITC-88-062) to Appear in a future issue of the ACM Transactions on Computer Systems, 1988, pp. 1-6.‡

Mozer, Michael C., "An Intelligent Environment must be Adaptive", IEEE Intelligent Systems, 1999, pp. 11-13.‡

Walker et al., "The LOCUS Distributed Operating System 1", University of California Los Angeles, 1983, pp. 49-70.‡

Muller et al., "CSCW'92 Demonstrations", 1992, pp. 11-14.‡

Waltz, D., "An English Language Question Answering System for a Large Relational Database", ACM, vol. 21, No. 7, 1978, 14 pages.‡

Murty et al., "Combining Evidence from Residual Phase and MFCC Features Jan. for Speaker Recognition", IEEE Signal Processing Letters, vol. 13, No. 1, 2006, 4 pages.‡

Wang et al., "An Industrial-Strength Audio Search Algorithm", In Proceedings of the International Conference on Music Information Retrieval (ISMIR), 2003, 7 pages.‡

Wang et al., "An Initial Study on Large Vocabulary Continuous Mandarin Speech Recognition with Limited Training Data Based on Sub-Syllabic Models", International Computer Symposium, vol. 2, 1994, pp. 1140-1145.‡

Wang et al., "Tone Recognition of Continuous Mandarin Speech Based on Hidden Markov Model", International Journal of Pattern Recognition and Artificial Intelligence, vol. 8, 1994, pp. 233-245.‡

Ward et al., "A Class Based Language Model for Speech Recognition", IEEE, 1996, 3 pages.‡

Murveit et al., "Integrating Natural Language Constraints into HMM-Based Speech Recognition", International Conference on Acoustics, Speech and Signal Processing, Apr. 1990, 5 pages.‡

Ward et al., "Recent Improvements in the CMU Spoken Language Understanding System", Arpa Human Language Technology Workshop, 1994, 4 pages.‡

Huang et al., "A Novel Approach to Robust Speech Endpoint Detection in Car Environments", Acoustics, Speech, and Signal Processing 2000, ICASSP'00, Proceeding S. 2000 IEEE International Conference on Jun. 5-9, 2000, vol. 3, Jun. 5, 2000, pp. 1751-1754.‡

Ward, Wayne, "The CMU Air Travel Information Service: Understanding Spontaneous Speech", Proceedings of the Workshop on Speech and Natural Language, HLT '90, 1990, pp. 127-129.‡

Murveit et al., "Speech Recognition in SRI's Resource Management and ATIS Systems", Proceedings of the Workshop on Speech and Natural Language, 1991, pp. 94-100.‡

Ware et al., "The DragMag Image Magnifier Prototype I", Apple Inc., Video Clip, Marlon, on a CD, Applicant is not Certain about the Date for the Video Clip., 1995.‡

(56) References Cited

OTHER PUBLICATIONS

Huang et al., "Real-Time Software-Based Video Coder for Multimedia Communication Systems", Department of Computer Science and Information Engineering, 1993, 10 pages.‡

Ware et al., "The DragMag Image Magnifier", CHI '95 Mosaic of Creativity, May 7-11, 1995, pp. 407-408.‡

Musicmatch, "Musicmatch and Xing Technology Introduce Musicmatch Jukebox", Press Releases, available at <http://www.musicmatch.com/info/company/press/releases/?year= 1998&release=2 >, May 18, 1998, 2 pages.‡

Huang et al., "The Sphinx-II Speech Recognition System: An Overview", Computer, Speech and Language, vol. 7, No. 2, 1993, 14 pages.‡

Muthesamy et al., "Speaker-Independent Vowel Recognition: Spectograms versus Cochleagrams", IEEE, Apr. 1990.‡

Warren et al., "An Efficient Easily Adaptable System for Interpreting Natural Language Queries", American Journal of Computational Linguistics, vol. 8, No. 3-4, 1982, 11 pages.‡

Hukin, R. W., "Testing an Auditory Model by Resynthesis", European Conference on Speech Communication and Technology, Sep. 26-29, 1989, pp. 243-246.‡

My Cool Aids, "What's New", available at <http://www.mycoolaids.com/>, 2012, 1 page.‡

Watabe et al., "Distributed Multiparty Desktop Conferencing System: MERMAID", CSCW 90 Proceedings, Oct. 1990, pp. 27-38.‡

Hunt, "Unit Selection in a Concatenative Speech Synthesis System Using a Large Speech Database", Copyright 1996 IEEE "To appear in Proc. ICASSP-96, May 7-10, Atlanta, GA" ATR Interpreting Telecommunications Research Labs, Kyoto Japan, 1996, pp. 373-376.‡

Myers, Brad A., "Shortcutter for Palm", available at <http://www.cs.cmu.edu/--'pebbles/v5/shortcutter/palm/index.html>, retrieved on Jun. 18, 2014, 10 pages.‡

Weizenbaum, J., "ELIZA—A Computer Program for the Study of Natural Language Communication Between Man and Machine", Communications of the ACM, vol. 9, No. 1, Jan. 1966, 10 pages.‡

Werner et al., "Prosodic Aspects of Speech, Universite de Lausanne", Fundamentals of Speech Synthesis and Speech Recognition: Basic Concepts, State of the Art and Future Challenges, 1994, 18 pages.‡

N200 Hands-Free Bluetooth Car Kit, available at <www.wirelessground.com>, retrieved on Mar. 19, 2007, 3 pages.‡

Westerman, Wayne, "Hand Tracking, Finger Identification and Chordic Manipulation on a Multi-Touch Surface", Doctoral Dissertation, 1999, 363 Pages.‡

Nadoli et al., "Intelligent Agents in the Simulation of Manufacturing Systems", Proceedings of the SCS Multiconference on AI and Simulation, 1989, 1 page.‡ iAP Sports Lingo 0x09 Protocol V1.00, May 1, 2006, 17 pages.‡

What is Fuzzy Logic?, available at <http://www.cs.cmu.edu>, retrieved on Apr. 15, 1993, 5 pages.‡

Nakagawa et al., "Speaker Recognition by Combining MFCC and Phase Information", IEEE International Conference on Acoustics, Speech and Signal Processing (ICASSP), Mar. 2010, 4 pages.‡

IBM Corporation, "Simon Says Here's How", Users Manual, 1994, 3 pages.‡

White, George M., "Speech Recognition, Neural Nets, and Brains", Jan. 1992, pp. 1-48.‡

Nakagawa et al., "Unknown Word Guessing and Part-of-Speech Tagging Using Support Vector Machines", Proceedings of the 6th NLPRS, 2001, pp. 325-331.‡

Naone, Erica, "TR10: Intelligent Software Assistant", Technology Review, Mar.-Apr. 2009, 2 pages.‡

IBM, "Integrated Audio-Graphics User Interface", IBM Technical Disclosure Bulletin, vol. 33, No. 11, Apr. 1991, 4 pages.‡

Wikipedia, "Acoustic Model", available at <http://en.wikipedia.org/wiki/AcousticModel>, retrieved on Sep. 14, 2011, 2 pages.‡

Navigli, Roberto, "Word Sense Disambiguation: A Survey", ACM Computing Surveys, vol. 41, No. 2, Feb. 2009, 70 pages.‡

Wikipedia, "Language Model", available at <http://en.wikipedia.org/wiki/Languagemodel>, retrieved on Sep. 14, 2011, 3 pages.‡

NCIP Staff, "Magnification Technology", available at <http://www2.edc.org/ncip/library/vi/magnifi.htm>, 1994, 6 pages.‡

Wikipedia, "Speech Recognition", available at <http://en.wikipedia.org/wiki/Speechrecognition>, retrieved on Sep. 14, 2011, 10 pages.‡

Wilensky et al., "Talking to UNIX in English: An Overview of UC", Communications of the ACM, vol. 27, No. 6, Jun. 1984, pp. 574-593.‡

Feigenbaum et al., "Computer-Assisted Semantic Annotation of Scientific Life Works", Oct. 15, 2007, 22 pages.‡

NCIP, "NCIP Library: Word Prediction Collection", available at <http://www2.edc.org/ncip/library/wp/toc.htm>, 1998, 4 pages.‡

Wilson, Mark, "New iPod Shuffle Moves Buttons to Headphones, Adds Text to Speech", available at <http://gizmodo.com/5167946/new-ipod-shuffle-moves- buttons-to-headphones-adds-text-to-speech >, Mar. 11, 2009, 13 pages.‡

Ferguson et al., "TRIPS: An Integrated Intelligent Problem-Solving Assistant", Proceedings of the Fifteenth National Conference on Artificial Intelligence (AAAI-98) and Tenth Conference on Innovative Applications of Artificial Intelligence (IAAI-98), 1998, 7 pages.‡

NCIP, "What is Word Prediction?", available at <http://www2.edc.org/NCIP/library/wp/whatis.htm>, 1998, 2 pages.‡

Windows XP: A Big Surprise!—Experiencing Amazement from Windows XP, New Computer, No. 2, Feb. 28, 2002, 8 pages.‡

Fikes et al., "A Network-Based Knowledge Representation and its Natural Deduction System", SRI International, Jul. 1977, 43 pages.‡

NDTV, "Sony SmartWatch 2 Launched in India for Rs. 14,990", available at <http://gadgets.ndtv.com/others/news/sony-smartwatch-2-launched-in-india-for-rs-14990-420319>, Sep. 18, 2013, 4 pages.‡

Winiwarter et al., "Adaptive Natural Language Interfaces to FAQ Knowledge Bases", Proceedings of 4th International Conference on Applications of Natural Language to Information Systems, Austria, Jun. 1999, 22 pages.‡

Findlater et al., "Beyond Qwerty: Augmenting Touch-Screen Keyboards with Multi-Touch Gestures for Non-Alphanumeric Input", CHI '12, Austin, Texas, USA, May 5-10, 2012, 4 pages.‡

Neches et al., "Enabling Technology for Knowledge Sharing", Fall, 1991, pp. 37-56.‡

Wirelessinfo, "SMS/MMS Ease of Use (8.0)", available at <http://www.wirelessinfo.com/content/palm-Treo-750-Cell-Phone-Review/Messaging.htm>, Mar. 2007, 3 pages.‡

Newton, Harry, "Newton's Telecom Dictionary", Mar. 1998, pp. 62, 155, 610-611, 771.‡

Wolff, M., "Post Structuralism and the ARTFUL Database: Some Theoretical Considerations", Information Technology and Libraries, vol. 13, No. 1, Mar. 1994, 10 pages.‡

Ng, Simon, "Google's Task List Now Comes to 1phone", SimonBlog, Available at <http://www.simonblog.com/2009/02/04/googles-task-list-now-comes-to- iphone>/, Feb. 4, 2009, 33 pages.‡

Wong et al., "An 800 Bit/s Vector Quantization LPC Vocoder", (IEEE Transactions on Acoustics, Speech and Signal Processing, Oct. 1982), as reprinted in Vector Quantization (IEEE Press, 1990), 1990, pp. 222-232.‡

Nguyen et al., "Generic Manager for Spoken Dialogue Systems", In DiaBruck: 7th Workshop on the Semantics and Pragmatics of Dialogue, Proceedings, 2003, 2 pages.‡

Wong et al., "Very Low Data Rate Speech Compression with LPC Vector and Matrix Quantization", (Proceedings of the IEEE Int'l Acoustics, Speech and Signal Processing Conference, Apr. 1983), as reprinted in Vector Quantization (IEEE Press, 1990), 1990, pp. 233-236.‡

Fiscus, J. G., "A Post-Processing System to Yield Reduced Word Error Rates: Recognizer Output Voting Error Reduction (ROVER)", IEEE Proceedings, Automatic Speech Recognition and Understanding, Dec. 14-17, 1997, pp. 347-354.‡

Niesler et al., "A Variable-Length Category-Based N-Gram Language Model", IEEE International Conference on Acoustics, Speech and Signal Processing (ICASSP'96), vol. 1, May 1996, 6 pages.‡

Worldwide Character Encoding, Version 2.0, vols. 1,2 by Unicode, Inc., 12 pages.‡

Written Opinion received for PCT Patent Application No. PCT/US2005/046797, dated Nov. 24, 2006, 9 pages.‡

(56) References Cited

OTHER PUBLICATIONS

Fisher et al., "Virtual Environment Display System", Interactive 3D Graphics, Oct. 23-24, 1986, pp. 77-87.‡
Wu et al., "Automatic Generation of Synthesis Units and Prosodic Information for Chinese Concatenative Synthesis", Speech Communication, vol. 35, No. 3-4, Oct. 2001, pp. 219-237.‡
Nilsson, B. A., "Microsoft Publisher is an Honorable Start for DTP Beginners", Computer Shopper, Feb. 1, 1992, 2 pages.‡
Forsdick, Harry, "Explorations into Real-Time Multimedia Conferencing", Proceedings of the Ifip Tc 6 International Symposium on Computer Message Systems, 1986, 331 pages.‡
Wu et al., "KDA: A Knowledge-Based Database Assistant", Proceeding of the Fifth International Conference on Engineering (IEEE Cat.No. 89CH2695-5), 1989, 8 pages.‡
Frisse, M. E., "Searching for Information in a Hypertext Medical Handbook", Communications of the ACM, vol. 31, No. 7, Jul. 1988, 8 pages.‡
Wu, M., "Digital Speech Processing and Coding", Multimedia Signal Processing, Lecture-2 Course Presentation, University of Maryland, College Park, 2003, 8 pages.‡
Furnas et al., "Space-Scale Diagrams: Understanding Multiscale Interfaces", CHI '95 Proceedings of the SIGCHI Conference on Human Factors in Computing Systems, 1995, pp. 234-241.‡
Noik, Emanuel G., "Layout-Independent Fisheye Views of Nested Graphs", IEEE Proceedings of Symposium on Visual Languages, 1993, 6 pages.‡
Furnas, George W., "Effective View Navigation", Proceedings of the ACM SIGCHI Conference on Human Factors in Computing Systems, Mar. 1997, pp. 367-374.‡
Wu, M., "Speech Recognition, Synthesis, and H.C.I.", Multimedia Signal Processing, Lecture-3 Course Presentation, University of Maryland, College Park, 2003, 11 pages.‡
Nonhoff-Arps et al., "StraBenmusik: Portable MP3-Spieler mit USB Anschluss", CT Magazin Fuer Computer Technik, Verlag Heinz Heise GMBH, Hannover DE, No. 25, 2000, pp. 166-175.‡
Furnas, George W., "Generalized Fisheye Views", CHI '86 Proceedings of the SIGCHI Conference on Human Factors in Computing Systems, vol. 17, No. 4, Apr. 1986, pp. 16-23.‡
Wyle, M. F., "A Wide Area Network Information Filter", Proceedings of First International Conference on Artificial Intelligence on Wall Street, Oct. 1991, 6 pages.‡
Northern Telecom, "Meridian Mail PC User Guide", 1988, 17 Pages.‡
Furnas, George W., "The Fisheye Calendar System", Bellcore Technical Memorandum, Nov. 19, 1991.‡
Notenboom, Leo A., "Can I Retrieve Old MSN Messenger Conversations?", available at <http://ask-leo.com/can_i_retrieve_old_msn_messengerconversations.html>, Mar. 11, 2004, 23 pages.‡
Gamback et al., "The Swedish Core Language Engine", NOTEX Conference, 1992, 17 pages.‡
Xiang et al., "Correcting Phoneme Recognition Errors in Learning Word Pronunciation through Speech Interaction", Speech Communication, vol. 55, No. 1, Jan. 1, 2013, pp. 190-203.‡
Noth et al., "Verbmobil: The Use of Prosody in the Linguistic Components of a Speech Understanding System", IEEE Transactions on Speech and Audio Processing, vol. 8, No. 5, Sep. 2000, pp. 519-532.‡
Gannes, Liz, "Alfred App Gives Personalized Restaurant Recommendations", AllThingsD, Jul. 18, 2011, pp. 1-3.‡
Xu et al., "Speech-Based Interactive Games for Language Learning: Reading, Translation, and Question-Answering", Computational Linguistics and Chinese Language Processing, vol. 14, No. 2, Jun. 2009, pp. 133-160.‡
Gardner, Jr., P. C., "A System for the Automated Office Environment", IBM Systems Journal, vol. 20, No. 3, 1981, pp. 321-345.‡
O'Connor, Roryj., "Apple Banking on Newton's Brain", San Jose Mercury News, Apr. 22, 1991.‡
Yang et al., "Auditory Representations of Acoustic Signals", IEEE Transactions of Information Theory, vol. 38, No. 2, Mar. 1992, pp. 824-839.‡
Garretson, R., "IBM Adds 'Drawing Assistant' Design Tool to Graphic Series", PC Week, vol. 2, No. 32, Aug. 13, 1985, 1 page.‡
Odubiyi et al., "SAIRE—A Scalable Agent-Based Information Retrieval Engine", Proceedings of the First International Conference on Autonomous Agents, 1997, 12 pages.‡
Yang et al., "Hidden Markov Model for Mandarin Lexical Tone Recognition", IEEE Transactions on Acoustics, Speech and Signal Processing, vol. 36, No. 7, Jul. 1988, pp. 988-992.‡
Ohsawa et al., "A computational Model of an Intelligent Agent Who Talks with a Person", Research Reports on Information Sciences, Series C, No. 92, Apr. 1989, pp. 1-18.‡
Gautier et al., "Generating Explanations of Device Behavior Using Compositional Modeling and Causal Ordering", CiteSeerx, 1993, pp. 89-97.‡
Yang et al., "Smart Sight: A Tourist Assistant System", Proceedings of Third International Symposium on Wearable Computers, 1999, 6 pages.‡
Gaver et al., "One Is Not Enough: Multiple Views in a Media Space", INTERCHI, Apr. 24-29, 1993, pp. 335-341.‡
Ohtomo et al., "Two-Stage Recognition Method of Hand-Written Chinese Characters Using an Integrated Neural Network Model", Denshi Joohoo Tsuushin Gakkai Ronbunshi, D-II, vol. J74, Feb. 1991, pp. 158-165.‡
Yankelovich et al., "Intermedia: The Concept and the Construction of a Seamless Information Environment", Computer Magazine, IEEE, Jan. 1988, 16 pages.‡
Gaver et al., "Realizing a Video Environment: EuroPARC's RAVE System", Rank Xerox Cambridge EuroPARC, 1992, pp. 27-35.‡
Okazaki et al., "Multi-Fisheye Transformation Method for Large-Scale Network Maps", IEEE Japan, vol. 44, No. 6, 1995, pp. 495-500.‡
Yarowsky, David, "Homograph Disambiguation in Text-to-Speech Synthesis", Chapter 12, Progress in Speech Synthesis, 1997, pp. 157-172.‡
Gervasio et al., "Active Preference Learning for Personalized Calendar Scheduling Assistance", CiteSeerx, Proceedings of IUI'05, Jan. 2005, pp. 90-97.‡
Yiourgalis et al., "Text-to-Speech system for Greek", ICASSP 91, vol. 1, May 14-17, 1991, pp. 525-528.‡
Omologo et al., "Microphone Array Based Speech Recognition with Different Talker-Array Positions", IEEE International Conference on Acoustics, Speech, and Signal Processing, vol. 1, Apr. 21-24, 1997, pp. 227-230.‡
Yoon et al., "Letter-to-Sound Rules for Korean", Department of Linguistics, The Ohio State University, 2002, 4 pages.‡
Giachin et al., "Word Juncture Modeling Using Inter-Word Context-Dependent Phone-Like Units", Cselt Technical Reports, vol. 20, No. 1, Mar. 1992, pp. 43-47.‡
Oregon Scientific, "512MB Waterproof MP3 Player with FM Radio & Built-in Pedometer", available at <http://www2.oregonscientific.com/shop/product.asp?cid=4&scid=11&pid=58 1>, retrieved on Jul. 31, 2006, 2 pages.‡
Young, S. J., "The HTK Book", Available on <http://htk.eng.cam.ac.uk>, 4 pages.‡
Gillespie, Kelly, "Adventures in Integration", Data Based Advisor, vol. 9, No. 9, Sep. 1991, pp. 90-92.‡
Youtube, "New bar search for Facebook", Available at "https://www.youtube.com/watch?v=vwgN1WbvCas", 1 page.‡
Gillespie, Kelly, "Internationalize Your Applications with Unicode", Data Based Advisor, vol. 10, No. 10, Oct. 1992, pp. 136-137.‡
Yunker, John, "Beyond Borders: Web Globalization Strategies", New Riders, Aug. 22, 2002, 11 pages.‡
Oregon Scientific, "Waterproof Music Player with FM Radio and Pedometer (MP121)—User Manual", 2005, 24 pages.‡
Gilloire et al., "Innovative Speech Processing for Mobile Terminals: An Annotated Bibliography", Signal Processing, vol. 80, No. 7, Jul. 2000, pp. 1149-1166.‡
Zainab, "Google Input Tools Shows Onscreen Keyboard in Multiple Languages [Chrome]", available at <http://www.addictivetips.com/internet-tips/google- input-tools-shows-multiple-language-onscreen-keyboards-chrome/, Jan. 3, 2012, 3 pages.‡

(56) References Cited

OTHER PUBLICATIONS

Osxdaily, "Get a List of Siri Commands Directly from Siri", Available at <http://osxdaily.com/2013/02/05/list-siri-commands/, Feb. 5, 2013, 15 pages.‡
Glass et al., "Multilingual Language Generation Across Multiple Domains", International Conference on Spoken Language Processing, Japan, Sep. 1994, 5 pages.‡
Owei et al., "Natural Language Query Filtration in the Conceptual Query Language", IEEE, 1997, pp. 539-549.‡
Zelig, "A Review of the Palm Treo 750v", available at <http://www.mtekk.com.au/Articles/tabid/54/articleType/ArticleView/articleld /769/A-Review-of-the-Palm-Treo-750v.aspx, Feb. 5, 2007, 3 pages.‡
Glass et al., "Multilingual Spoken-Language Understanding in the Mit Voyager System", Available online at <http://groups.csail.mit.edu/sls/publications/1995/speechcomm95- voyager.pdf>, Aug. 1995, 29 pages.‡
Zeng et al., "Cooperative Intelligent Software Agents", The Robotics Institute, Carnegie-Mellon University, Mar. 1995, 13 pages.‡
Padilla, Alfredo, "Palm Treo 750 Cell Phone Review—Messaging", available at <http://www.wirelessinfo.com/content/palm-Treo-750-Cell-Phone-Review/Messaging.htm>, Mar. 17, 2007, 6 pages.‡
Palay et al., "The Andrew Toolkit: An Overview", Information Technology Center, Carnegie-Mellon University, 1988, pp. 1-15.‡
Palm, Inc., "User Guide: Your Palm® Treo.TM. 755p Smartphone", 2005-2007, 304 pages.‡
Glass, Alyssa, "Explaining Preference Learning", CiteSeerx, 2006, pp. 1-5.‡
Zhang et al., "Research of Text Classification Model Based on Latent Semantic Analysis and Improved HS-SVM", Intelligent Systems and Applications (ISA), 2010 2nd International Workshop, May 22-23, 2010, 5 pages.‡
Pan et al., "Natural Language Aided Visual Query Building for Complex Data Access", In proceeding of: Proceedings of the Twenty-Second Conference on Innovative Applications of Artificial Intelligence, XP055114607, Jul. 11, 2010.‡
Glinert-Stevens, Susan, "Microsoft Publisher: Desktop Wizardry", PC Sources, vol. 3, No. 2, Feb. 1992, 1 page.‡
Zhao et al., "Intelligent Agents for Flexible Workflow Systems", Proceedings of the Americas Conference on Information Systems (AMCIS), Oct. 1998, 4 pages.‡
Panasonic, "Toughbook 28: Powerful, Rugged and Wireless", Panasonic: Toughbook Models, available at <http://www.panasonic.com/computer/notebook/html/01a_s8.htm>, retrieved on Dec. 19, 2002, 3 pages.‡
Zhao, Y., "An Acoustic-Phonetic-Based Speaker Adaptation Technique for Improving Speaker-Independent Continuous Speech Recognition", IEEE Transactions on Speech and Audio Processing, vol. 2, No. 3, Jul. 1994, pp. 380-394.‡
Zhong et al., "JustSpeak: Enabling Universal Voice Control on Android", W4A'14, Proceedings of the 11th Web for All Conference, No. 36, Apr. 7-9, 2014, 8 pages.‡
Pannu et al., "A Learning Personal Agent for Text Filtering and Notification", Proceedings of the International Conference of Knowledge Based Systems, 1996, pp. 1-11.‡
Ziegler, K, "A Distributed Information System Study", IBM Systems Journal, vol. 18, No. 3, 1979, pp. 374-401.‡
Papadimitriou et al., "Latent Semantic Indexing: A Probabilistic Analysis", Available online at <http://citeseerx.ist.psu.edu/messaqes/downloadsexceeded.html>, Nov. 14, 1997, 21 pages.‡
Zipnick et al., "U.S. Appl. No. 10/859,661, filed Jun. 2, 2004".‡
Glossary of Adaptive Technologies: Word Prediction, available at <http://www.utoronto.ca/atrc/reference/techwordpred.html>, retrieved on Dec. 6, 2005, 5 pages.‡
Parks et al., "Classification of Whale and Ice Sounds with a cochlear Model", IEEE, Mar. 1992.‡
Zovato et al., "Towards Emotional Speech Synthesis: A Rule based Approach", Proceedings of 5th ISCA Speech Synthesis Workshop—Pittsburgh, 2004, pp. 219-220.‡
Gmail, "About Group Chat", available at <http://mail.google.com/support/bin/answer.py?answer=81090>, Nov. 26, 2007, 2 pages.‡
Parson, T. W., "Voice and Speech Processing", Pitch and Formant Estimation, McGraw-Hill, Inc., ISBN: 0-07-0485541-0, 1987, 15 pages.‡
Zue et al., "From Interface to Content: Translingual Access and Delivery of On-Line Information", Eurospeech, 1997, 4 pages.‡
Goddeau et al., "A Form-Based Dialogue Manager for Spoken Language Applications", Available online at <http://phasedance.com/pdf!icslp96.pdf>, Oct. 1996, 4 pages.‡
Zue et al., "Jupiter: A Telephone-Based Conversational Interface for Weather Information", IEEE Transactions on Speech and Audio Processing, Jan. 2000, 13 pages.‡
Parsons, T. W., "Voice and Speech Processing", Linguistics and Technical Fundamentals, Articulatory Phonetics and Phonemics, McGraw-Hill, Inc., ISBN: 0-07-0485541-0, 1987, 5 pages.‡
Goddeau et al., "Galaxy: A Human-Language Interface to On-Line Travel Information", International Conference on Spoken Language Processing, Yokohama, 1994, pp. 707-710.‡
Patent Abstracts of Japan, vol. 014, No. 273 (E-0940)Jun. 13, 1990 (Jun. 13, 1990) -& JP 02 086057 A (Japan Storage Battery Co Ltd), Mar. 27, 1990 (Mar. 27, 1990).‡
Zue et al., "Pegasus: A Spoken Dialogue Interface for On-Line Air Travel Planning", Speech Communication, vol. 15, 1994, 10 pages.‡
Goldberg et al., "Using Collaborative Filtering to Weave an Information Tapestry", Communications of the ACM, vol. 35, No. 12, Dec. 1992, 10 pages.‡
Zue et al., "The Voyager Speech Understanding System: Preliminary Development and Evaluation", Proceedings of IEEE, International Conference on Acoustics, Speech and Signal Processing, 1990, 4 pages.‡
Pathak et al., "Privacy-preserving Speech Processing: Cryptographic and String-matching Frameworks Show Promise", In: IEEE signal processing magazine, retrieved from <http://www.merl.com/publications/docs/TR2013-063.pdf>, Feb. 13, 2013, 16 pages.‡
Goldberg, Cheryl, "IBM Drawing Assistant: Graphics for the EGA", PC Magazine, vol. 4, No. 26, Dec. 24, 1985, 1 page.‡
Zue, Victor W., "Toward Systems that Understand Spoken Language", ARPA Strategic Computing Institute, Feb. 1994, 9 pages.‡
Patterson et al., "Rendezvous: An Architecture for Synchronous Multi-User Applications", CSCW '90 Proceedings, 1990, pp. 317-328.‡
Zue, Victor, "Conversational Interfaces: Advances and Challenges", Spoken Language System Group, Sep. 1997, 10 pages.‡
Gong et al., "Guidelines for Handheld Mobile Device Interface Design", Proceedings of DSI 2004 Annual Meeting, 2004, pp. 3751-3756.‡
Pearl, Amy, "System Support for Integrated Desktop Video Conferencing", Sunmicrosystems Laboratories, Dec. 1992, pp. 1-15.‡
Gonnet et al., "Handbook of Algorithms and Data Structures: in Pascal and C. (2nd ed.)", Addison-Wesley Longman Publishing Co., 1991, 17 pages.‡
Good et al., "Building a User-Derived Interface", Communications of the ACM; (Oct. 1984) vol. 27, No. 10, Oct. 1984, pp. 1032-1043.‡
Gorin et al., "On Adaptive Acquisition of Language", International Conference on Acoustics, Speech and Signal Processing (ICASSP'90), vol. 1, Apr. 1990, 5 pages.‡
Rudnicky et al., "Creating Natural Dialogs in the Carnegie Mellon Communicator System", Proceedings of Eurospeech, vol. 4, 1999, pp. 1531-1534.‡
Julia et al., "http://www.speech.sri.com/demos/atis.html", Proceedings of AAAI, Spring Symposium, 1997, 5 pages.‡
Gotoh et al., "Document Space Models Using Latent Semantic Analysis", In Proceedings of Eurospeech, 1997, 4 pages.‡
Russell et al., "Artificial Intelligence, A Modern Approach", Prentice Hall, Inc., 1995, 121 pages.‡
Gray et al., "Rate Distortion Speech Coding with a Minimum Discrimination Information Distortion Measure", (IEEE Transactions on Information Theory, Nov. 1981), as reprinted in Vector Quantization (IEEE Press), 1990, pp. 208-221.‡

(56) References Cited

OTHER PUBLICATIONS

Julia et al., “Un Editeur Interactif De Tableaux Dessines a Main Levee (An Interactive Editor for Hand-Sketched Tables)”, Traitement du Signal, vol. 12, No. 6, 1995, pp. 619-626.‡

Gray, R. M., “Vector Quantization”, IEEE ASSP Magazine, Apr. 1984, 26 pages.‡

Kaeppner et al., “Architecture of HeiPhone: A Testbed for Audio/Video Teleconferencing”, IBM European Networking Center, 1993.‡

Russo et al., “Urgency is a Non-Monotonic Function of Pulse Rate”, Journal of the Acoustical Society of America, vol. 122, No. 5, 2007, 6 pages.‡

Green, C., “The Application of Theorem Proving to Question-Answering Systems”, SRI Stanford Research Institute, Artificial Intelligence Group, Jun. 1969, 169 pages.‡

Sabin et al., “Product Code Vector Quantizers for Waveform and Voice Coding”, (IEEE Transactions on Acoustics, Speech and Signal Processing, Jun. 1984), as reprinted in Vector Quantization (IEEE Press, 1990), 1990, pp. 274-288.‡

Kahn et al., “CoABS Grid Scalability Experiments”, Autonomous Agents and Multi-Agent Systems, vol. 7, 2003, pp. 171-178.‡

Greenberg, Saul, “A Fisheye Text Editor for Relaxed-WYSIWIS Groupware”, CHI ’96 Companion, Vancouver, Canada, Apr. 13-18, 1996, 2 pages.‡

Kamba et al., “Using Small Screen Space More Efficiently”, CHI ’96 Proceedings of the SIGCHI Conference on Human Factors in Computing Systems, Apr. 13-18, 1996, pp. 383-390.‡

Sacerdoti et al., “A Ladder User’s Guide (Revised)”, SRI International Artificial Intelligence Center, Mar. 1980, 39 pages.‡

Gregg et al., “DSS Access on the WWW: An Intelligent Agent Prototype”, Proceedings of the Americas Conference on Information Systems, Association for Information Systems, 1998, 3 pages.‡

Griffin et al., “Signal Estimation From Modified Short-Time Fourier Transform”, IEEE Transactions on Acoustics, Speech and Signal Processing, vol. ASSP-32, No. 2, Apr. 1984, pp. 236-243.‡

Sagalowicz, D., “AD-Ladder User’s Guide”, SRI International, Sep. 1980, 42 pages.‡

Kamel et al., “A Graph Based Knowledge Retrieval System”, IEEE International Conference on Systems, Man and Cybernetics, 1990, pp. 269-275.‡

Grishman et al., “Computational Linguistics: An Introduction”, Cambridge University Press, 1986, 172 pages.‡

Kanda et al., “Robust Domain Selection Using Dialogue History in Multi-domain Spoken Dialogue Systems”, Journal of Information Processing Society, vol. 48, No. 5, May 15, 2007, pp. 1980-1989. (English Abstract Submitted).‡

Sakoe et al., “Dynamic Programming Algorithm Optimization for Spoken Word Recognition”, IEEE Transactions on Acoustics, Speech and Signal Processing, vol. ASSP-26, No. 1, Feb. 1978, 8 pages.‡

Grosz et al., “Dialogic: A Core Natural-Language Processing System”, SRI International, Nov. 1982, 17 pages.‡

Salton et al., “On the Application of Syntactic Methodologies in Automatic Text Analysis”, Information Processing and Management, vol. 26, No. 1, Great Britain, 1990, 22 pages.‡

Kanda et al., “Spoken Language Understanding Using Dialogue Context in Database Search Task”, Journal of Information Processing Society of Japan, vol. 47, No. 6, Jun. 15, 2016, pp. 1802-1811. (English Abstract Submitted).‡

Grosz et al., “Research on Natural-Language Processing at SRI”, SRI International, Nov. 1981, 21 pages.‡

Kane et al., “Slide Rule: Making Mobile Touch Screens Accessible to Blind People Using Multi-Touch Interaction Techniques”, ASSETS, Oct. 13-15, 2008, pp. 73-80.‡

Sameshima et al., “Authorization with Security Attributes and Privilege Delegation Access control beyond the ACL”, Computer Communications, vol. 20, 1997, 9 pages.‡

Grosz et al., “TEAM: An Experiment in the Design of Transportable Natural-Language Interfaces”, Artificial Intelligence, vol. 32, 1987, 71 pages.‡

Kang et al., “Quality Improvement of LPC-Processed Noisy Speech by Using Spectral Subtraction”, IEEE Transactions on Acoustics, Speech and Signal Processing, vol. 37, No. 6, Jun. 1989, pp. 939-942.‡

Sankar, Ananth, “Bayesian Model Combination (BAYCOM) for Improved Recognition”, IEEE International Conference on Acoustics, Speech, and Signal Processing (ICASSP), Mar. 18-23, 2005, pp. 845-848.‡

Grosz, B., “Team: A Transportable Natural-Language Interface System”, Proceedings of the First Conference on Applied Natural Language Processing, 1983, 7 pages.‡

San-Segundo et al., “Confidence Measures for Dialogue Management in the CU Communicator System”, Proceedings of Acoustics, Speech and Signal Processing (ICASSP’00), Jun. 2000, 4 pages.‡

Karp, P. D., “A Generic Knowledge-Base Access Protocol”, Available online at <http://lecture.cs.buu.ac.th/-f50353/Document/gfp.pdf>, May 12, 1994, 66 pages.‡

Gruber et al., “An Ontology for Engineering Mathematics”, Fourth International Conference on Principles of Knowledge Representation and Reasoning, Available online at <http://www-ksl.stanford.edu/knowledge- sharing/papers/engmath.html>, 1994, pp. 1-22.‡

Santaholma, Marianne E., “Grammar Sharing Techniques for Rule-based Multilingual NLP Systems”, Proceedings of the 16th Nordic Conference of Computational Linguistics, NODALIDA 2007, May 25, 2007, 8 pages.‡

Gruber et al., “Generative Design Rationale: Beyond the Record and Replay Paradigm”, Knowledge Systems Laboratory, Technical Report KSL 92-59, Dec. 1991, Updated Feb. 1993, 24 pages.‡

Katz et al., “Exploiting Lexical Regularities in Designing Natural Language Systems”, Proceedings of the 12th International Conference on Computational Linguistics, 1988, pp. 1-22.‡

Santen, Jan P., “Assignment of Segmental Duration in Text-to-Speech Synthesis”, Computer Speech and Language, vol. 8, No. 2, Apr. 1994, pp. 95-128.‡

Gruber et al., “Machine-Generated Explanations of Engineering Models: A Compositional Modeling Approach”, Proceedings of International Joint Conference on Artificial Intelligence, 1993, 7 pages.‡

Sarawagi, Sunita, “CRF Package Page”, available at <http://crf.sourceforge.net/>, retrieved on Apr. 6, 2011, 2 pages.‡

Katz et al., “REXTOR: A System for Generating Relations from Natural Language”, Proceedings of the ACL Workshop on Natural Language Processing and Information Retrieval (NLP&IR), Oct. 2000, 11 pages.‡

Katz, Boris, “A Three-Step Procedure for Language Generation”, Massachusetts Institute of Technology, A.I. Memo No. 599, Dec. 1980, pp. 1-40.‡

Gruber et al., “NIKE: A National Infrastructure for Knowledge Exchange”, A Whitepaper Advocating and ATP Initiative on Technologies for Lifelong Learning, Oct. 1994, pp. 1-10.‡

Sarkar et al., “Graphical Fisheye Views of Graphs”, CHI ’92 Proceedings of the SIGCHI Conference on Human Factors in Computing Systems, May 3-7, 1992, pp. 83-91.‡

Katz, Boris, “Annotating the World Wide Web Using Natural Language”, Proceedings of the 5th RIAO Conference on Computer Assisted Information Searching on the Internet, 1997, 7 pages.‡

Gruber et al., “Toward a Knowledge Medium for Collaborative Product Development”, Proceedings of the Second International Conference on Artificial Intelligence in Design, Jun. 1992, pp. 1-19.‡

Sarkar et al., “Graphical Fisheye Views of Graphs”, Systems Research Center, Digital Equipment Corporation,, Mar. 17, 1992, 31 pages.‡

Katz, Boris, “Using English for Indexing and Retrieving”, Proceedings of the 1st RIAO Conference on User-Oriented Content-Based Text and Image Handling, 1988, pp. 314-332.‡

Gruber, Thomas R., “A Translation Approach to Portable Ontology Specifications”, Knowledge Acquisition, vol. 5, No. 2, Jun. 1993, pp. 199-220.‡

Bussey, et al., “Service Architecture, Prototype Description and Network Implications of a Personalized Information Grazing Service”, INFOCOM’90, Ninth Annual Joint Conference of the IEEE

(56) References Cited

OTHER PUBLICATIONS

Computer and Communication Societies, Available at <http://slrohall.com/oublications/>, Jun. 1990, 8 pages.‡
Katz, S. M., "Estimation of Probabilities from Sparse Data for the Language Model Component of a Speech Recognizer", IEEE Transactions on Acoustics, Speech and Signal Processing, vol. ASSP-35, No. 3, Mar. 1987, 3 pages.‡
Gruber, Thomas R., "Automated Knowledge Acquisition for Strategic Knowledge", Machine Learning, vol. 4, 1989, pp. 293-336.‡
Sarkar et al., "Graphical Fisheye Views", Communications of the ACM, vol. 37, No. 12, Dec. 1994, pp. 73-83.‡
Bussler et al., "Web Service Execution Environment (WSMX)", retrieved from Internet on Sep. 17, 2012, available at <http://www.w3.org/Submission/WSMX>, Jun. 3, 2005, 29 pages.‡
Gruber, Thomas R., "Interactive Acquisition of Justifications: Learning "Why" by Being Told "What"", Knowledge Systems Laboratory, Technical Report KSL 91-17, Original Oct. 1990, Revised Feb. 1991, 24 pages.‡
Sarkar et al., "Stretching the Rubber Sheet: A Metaphor for Viewing Large Layouts on Small Screens", UIST'93, ACM, Nov. 3-5, 1993, pp. 81-91.‡
Kazemzadeh et al., "Acoustic Correlates of User Response to Error in Human-Computer Dialogues", Automatic Speech Recognition and Understanding, 2003, pp. 215-220.‡
Gruber, Thomas R., "Toward Principles for the Design of Ontologies used for Knowledge Sharing", International Journal of Human-Computer Studies, vol. 43, No. 5-6, Nov. 1995, pp. 907-928.‡
Butcher, Mike, "EVI Arrives in Town to go Toe-to-Toe with Siri", TechCrunch, Jan. 23, 2012, 2 pages.‡
Kazmucha, Allyson, "How to Send Map Locations Using iMessage", iMore.com, Available at <http://www.imore.com/how-use-imessage-share-your-location-your-iphone>, Aug. 2, 2012, 6 pages.‡
Sarvas et al., "Metadata Creation System for Mobile Images", Conference Proceedings, The Second International Conference on Mobile Systems, Applications and Services, Jun. 6, 2004, pp. 36-48.‡
Gruber, Thomas R., et al., U.S. Appl. No. 61/186,414, filed Jun. 12, 2009 titled "System and Method for Semantic Auto-Completion" 13 pages.‡
Sastry, Ravindra W., "A Need for Speed: A New Speedometer for Runners", submitted to the Department of Electrical Engineering and Computer Science at the Massachusetts Institute of Technology, 1999, pp. 1-42.‡
Butler, Travis, "Archon Jukebox 6000 Challenges Nomad Jukebox", available at <http://tidbits.com/article/6521>, Aug. 13, 2001, 5 pages.‡
Keahey et al., "Non-Linear Image Magnification", Apr. 24, 1996, 11 pages.‡
Gruber, Thomas R., et al., U.S. Appl. No. 61/493,201, filed Jun. 3, 2011 titled "Generating and Processing Data Items That Represent Tasks to Perform", 68 pages.‡
Sato, H., "A Data Model, Knowledge Base and Natural Language Processing for Sharing a Large Statistical Database", Statistical and Scientific Database Management, Lecture Notes in Computer Science, vol. 339, 1989, 20 pages.‡
Butler, Travis, "Portable MP3: The Nomad Jukebox", available at <http://tidbits.com/article/6261>, Jan. 8, 2001, 4 pages.‡
Savoy, J., "Searching Information in Hypertext Systems Using Multiple Sources of Evidence", International Journal of Man-Machine Studies, vol. 38, No. 6, Jun. 1996, 15 pages.‡
Gruber, Thomas R., et al., Unpublished U.S. Appl. No. 61/657,744, filed Jun. 9, 2012 titled "Automatically Adapting User Interfaces for Hands-Free Interaction", 40 pages.‡
Keahey et al., "Nonlinear Magnification Fields", Proceedings of the 1997 IEEE Symposium on Information Visualization, 1997, 12 pages.‡
Buxton et al., "EuroPARC's Integrated Interactive Intermedia Facility (IIIF): Early Experiences", Proceedings of the IFIP WG 8.4 Conference on Multi-User Interfaces and Applications, 1990, pp. 11-34.‡
Keahey et al., "Techniques for Non-Linear Magnification Transformations", IEEE Proceedings of Symposium on Information Visualization, Oct. 1996, pp. 38-45.‡
Scagliola, C., "Language Models and Search Algorithms for Real-Time Speech Recognition", International Journal of Man-Machine Studies, vol. 22, No. 5, 1985, 25 pages.‡
Gruber, Thomas R., et al., U.S. Appl. No. 07/976,970, filed Nov. 16, 1992 titled "Status Bar for Application Windows".‡
Schafer et al., "Digital Representations of Speech Signals", Proceedings of the IEEE, vol. 63, No. 4, Apr. 1975, pp. 662-677.‡
Keahey et al., "Viewing Text With Non-Linear Magnification: An Experimental Study", Department of Computer Science, Indiana University, Apr. 24, 1996, pp. 1-9.‡
Schaffer et al., "Navigating Hierarchically Clustered Networks through Fisheye and Full-Zoom Methods", ACM Transactions on Computer-Human Interaction, vol. 3, No. 2, Jun. 1996, pp. 162-188.‡
Gruber, Tom, "(Avoiding) The Travesty of the Commons", Presentation at NPUC, New Paradigms for User Computing, IBM Almaden Research Center, Jul. 24, 2006, 52 pages.‡
Kennedy, P J., "Digital Data Storage Using Video Disc", IBM Technical Disclosure Bulletin, vol. 24, No. 2, Jul. 1981, p. 1171.‡
Buzo et al., "Speech Coding Based Upon Vector Quantization", IEEE Transactions on Acoustics, Speech and Signal Processing, vol. Assp-28, No. 5, Oct. 1980, 13 pages.‡
Scheifler, R. W., "The X Window System", MIT Laboratory for Computer Science and Gettys, Jim Digital Equipment Corporation and MIT Project Athena; ACM Transactions on Graphics, vol. 5, No. 2, Apr. 1986, pp. 79-109.‡
CALL Centre, "Word Prediction", The CALL Centre & Scottish Executive Education Dept., 1999, pp. 63-73.‡
Kerr, "An Incremental String Search in C: This Data Matching Algorithm Narrows the Search Space with each Keystroke", Computer Language, vol. 6, No. 12, Dec. 1989, pp. 35-39.‡
Gruber, Tom, "2021: Mass Collaboration and the Really New Economy", TNTY Futures, vol. 1, No. 6, Available online at <http://tomgmber.org/writing/tnty2001.htm>, Aug. 2001, 5 pages.‡
Schluter et al., "Using Phase Spectrum Information for Improved Speech Recognition Performance", IEEE International Conference on Acoustics, Speech, and Signal Processing, 2001, pp. 133-136.‡
Caminero-Gil et al., "Data-Driven Discourse Modeling for Semantic Interpretation", Proceedings of the IEEE International Conference on Acoustics, Speech and Signal Processing, May 1996, 6 pages.‡
Kickstarter, "ivee Sleek: Wi-Fi Voice-Activated Assistant", available at <https://www.kickstarter.com/projects/ivee/ivee-sleek-wi-fi-voice-activated-assistant>, retrieved on Feb. 10, 2014, 13 pages.‡
Gruber, Tom, "Big Think Small Screen: How Semantic Computing in the Cloud will Revolutionize the Consumer Experience on the Phone", Keynote Presentation at Web 3.0 Conference, Jan. 2010, 41 pages.‡
Schmandt et al., "A Conversational Telephone Messaging System", IEEE Transactions on Consumer Electronics, vol. CE-30, Aug. 1984, pp. xxi-xxiv.‡
Kikui, Gen-Itiro, "Identifying the Coding System and Language of On-Line Documents on the Internet", International Conference on Computational, Aug. 1996, pp. 652-657.‡
Gruber, Tom, "Collaborating Around Shared Content on the WWW, W3C Workshop on WWW and Collaboration", available at <http://www.w3.org/Collaboration/Workshop/Proceedings/P9.html>, Sep. 1995, 1 page.‡
Campbell et al.,"An Expandable Error-Protected 4800 BPS CELP Coder (U.S. Federal Standard 4800 BPS Voice Coder)", (Proceedings of IEEE Int'l Acoustics, Speech, and Signal Processing Conference, May 1983), as reprinted in Vector Quantization (IEEE Press, 1990), 1990, pp. 328-330.‡
Schmandt et al., "Augmenting a Window System with Speech Input", IEEE Computer Society, Computer, vol. 23, No. 8, Aug. 1990, 8 pages.‡
Gruber, Tom, "Collective Knowledge Systems: Where the Social Web Meets the Semantic Web", Web Semantics: Science, Services and Agents on the World Wide Web, 2007, pp. 1-19.‡

(56) References Cited

OTHER PUBLICATIONS

Kim, E.A. S., "The Structure and Processing of Fundamental Frequency Contours", University of Cambridge, Doctoral Thesis, Apr. 1987, 378 pages.‡
Schmandt et al., "Phone Slave: A Graphical Telecommunications Interface", Proceedings of the SID, vol. 26, No. 1, 1985, pp. 79-82.‡
Cao et al., "Adapting Ranking SVM to Document Retrieval", SIGIR '06, Seattle, WA, Aug. 6-11, 2006, 8 pages.‡
Gruber, Tom, "Despite Our Best Efforts, Ontologies are not the Problem", AAAI Spring Symposium, Available online at <http://tomgruber.org/writing/aaai-ss08.htm>, Mar. 2008, pp. 1-40.‡
Car Working Group, "Hands-Free Profile 1.5 HFP1.5_SPEC", Bluetooth Doc, available at <www.bluetooth.org>, Nov. 25, 2005, 93 pages.‡
Kirstein et al., "Piloting of Multimedia Integrated Communications for European Researchers", Proc. INET '93, 1993, pp. 1-12.‡
Caraballo et al., "Language Identification Based on a Discriminative Text Categorization Technique", Iberspeech 2012—Vii Jornadas En Tecnologia Del Habla and Iii Iberiansl Tech Workshop, Nov. 21, 2012, pp. 1-10.‡
Gruber, Tom, "Enterprise Collaboration Management with Intraspect", Intraspect Technical White Paper, Jul. 2001, pp. 1-24.‡
Schmandt et al., "Phone Slave: A Graphical Telecommunications Interface", Society for Information Display, International Symposium Digest of Technical Papers, Jun. 1984, 4 pages.‡
Card et al., "Readings in Information Visualization Using Vision to Think", Interactive Technologies, 1999, 712 pages.‡
Schmid, H., "Part-of-speech tagging with neural networks", COLING '94 Proceedings of the 15th conference on Computational linguistics—vol. 1, 1994, pp. 172-176.‡
Kitano, H., "PhiDM-Dialog, An Experimental Speech-to-Speech Dialog Translation System", Computer, vol. 24, No. 6, Jun. 1991, 13 pages.‡
Carpendale et al., "3-Dimensional Pliable Surfaces: For the Effective Presentation of Visual Information", UIST '95 Proceedings of the 8th Annual ACM Symposium on User Interface and Software Technology, Nov. 14-17, 1995, pp. 217-226.‡
Gruber, Tom, "Every Ontology is a Treaty—A Social Agreement—Among People with Some Common Motive in Sharing", Official Quarterly Bulletin of AIS Special Interest Group on Semantic Web and Information Systems, vol. 1, No. 2, 2004, pp. 1-5.‡
Kitaoka et al., "Detection and Recognition of Correction Utterances on Misrecognition of Spoken Dialog System", Systems and Computers in Japan, vol. 36, No. 11 Oct. 2005, pp. 24-33.‡
Schnelle, Dirk, "Context Aware Voice User Interfaces for Workflow Support", Dissertation paper, Aug. 27, 2007, 254 pages.‡
Gruber, Tom, "Helping Organizations Collaborate, Communicate, and Learn", Presentation to NASA Ames Research, Available online at <http://tomgruber.org/writing/organizational-intelligence-talk.htm>, Mar.-Oct. 2003, 30 pages.‡
Carpendale et al., "Extending Distortion Viewing from 2D to 3D", IEEE Computer Graphics and Applications, Jul./Aug. 1997, pp. 42-51.‡
Schone et al., "Knowledge-Free Induction of Morphology Using Latent Semantic Analysis", Proceedings of the 2nd Workshop on Learning Language in Logic and the 4th Conference on Computational Natural Language Learning, col. 7, 2000, pp. 67-72.‡
Kjelldahl et al., "Multimedia—Principles, Systems, and Applications", Proceedings of the 1991 Eurographics Workshop on Multimedia Systems, Applications, and Interaction, Apr. 1991.‡
Schooler et al., "A Packet-switched Multimedia Conferencing System", by Eve Schooler, et al; ACM SIGOIS Bulletin, vol. I, No. 1, Jan. 1989, pp. 12-22.‡
Gruber, Tom, "Intelligence at the Interface: Semantic Technology and the Consumer Internet Experience", Presentation at Semantic Technologies Conference, Available online at <http://tomgruber.org/writing/semtech08.htm>, May 20, 2008, pp. 1-40.‡
Klabbers et al., "Reducing Audible Spectral Discontinuities", IEEE Transactions on Speech and Audio Processing, vol. 9, No. 1, Jan. 2001, 13 pages.‡
Carpendale et al., "Making Distortions Comprehensible", IEEE Proceedings of Symposium on Visual Languages, 1997, 10 pages.‡
Schooler et al., "An Architecture for Multimedia Connection Management", Proceedings IEEE 4th Comsoc International Workshop on Multimedia Communications, Apr. 1992, pp. 271-274.‡
Klatt et al., "Linguistic Uses of Segmental Duration in English: Acoustic and Perpetual Evidence", Journal of the Acoustical Society of America, vol. 59, No. 5, May 1976, 16 pages.‡
Carter et al., "The Speech-Language Interface in the Spoken Language Translator", SRI International, Nov. 23, 1994, 9 pages.‡
Schooler et al., "Multimedia Conferencing: Has it Come of Age?", Proceedings 24th Hawaii International Conference on System Sciences, vol. 3, Jan. 1991, pp. 707-716.‡
Fine et al., "Improving GUI Accessibility for People with Low Vision", CHI '95 Proceedings of the SIGCHI Conference on Human Factors in Computing Systems, May 7-11, 1995, pp. 114-121.‡
Carter, D., "Lexical Acquisition in the Core Language Engine", Proceedings of the Fourth Conference of the European Chapter of the Association for Computational Linguistics, 1989, 8 pages.‡
Schooler et al., "The Connection Control Protocol: Architecture Overview", USC/Information Sciences Institute, Jan. 28, 1992, pp. 1-6.‡
Fine et al., "UnWindows 1.0: X Windows Tools for Low Vision Users", ACM SIGCAPH Computers and the Physically Handicapped, No. 49, Mar. 1994, pp. 1-5.‡
Casner et al., "N-Way Conferencing with Packet Video", The Third International Workshop on Packet Video, Mar. 22-23, 1990, pp. 1-6.‡
Knight et al., "Heuristic Search", Production Systems, Artificial Intelligence, 2nd ed., McGraw-Hill, Inc., 1983-1991.‡
Schooler, Eve M., "Case Study: Multimedia Conference Control in a Packet-Switched Teleconferencing System", Journal of Internetworking: Research and Experience, vol. 4, No. 2, Jun. 1993, pp. 99-120.‡
Castleos, "Whole House Voice Control Demonstration", available online at: https://www.youtube.com/watch?v=9SRCoxrZ_W4, Jun. 2, 2012, 26 pages.‡
Knownav, "Knowledge Navigator", YouTube Video available at <http://www.youtube.com/watch?v=QRH8eimU_20>, Apr. 29, 2008, 1 page.‡
Schooler, Eve M., "The Impact of Scaling on a Multimedia Connection Architecture", Multimedia Systems, vol. 1, No. 1, 1993, pp. 2-9.‡
Cawley, Gavin C. "The Application of Neural Networks to Phonetic Modelling", PhD. Thesis, University of Essex, Mar. 1996, 13 pages.‡
Kohler, Joachim, "Multilingual Phone Models for Vocabulary-Independent Speech Recognition Tasks", Speech Communication, vol. 35, No. 1-2, Aug. 2001, pp. 21-30.‡
Schooler, Eve, "A Distributed Architecture for Multimedia Conference Control", ISI Research Report, Nov. 1991, pp. 1-18.‡
International Search Report and Written Opinion received for PCT Patent Application No. PCT/US2007/026243, dated Mar. 31, 2008, 10 pages.‡
Kominek et al., "Impact of Durational Outlier Removal from Unit Selection Catalogs", 5th ISCA Speech Synthesis Workshop, Jun. 14-16, 2004, 6 pages.‡
Chai et al., "Comparative Evaluation of a Natural Language Dialog Based System and a Menu Driven System for Information Access: A Case Study", Proceedings of the International Conference on Multimedia Information Retrieval (RIAO), Paris, Apr. 2000, 11 pages.‡
Schultz, Tanja, "Speaker Characteristics", In: Speaker Classification I, retrieved from <http://ccc.inaoep.mx/'villasen/bib/Speaker%20Characteristics.pdf>, 2007, pp. 47-74.‡
International Search Report and Written Opinion received for PCT Patent Application No. PCT/US2007/088872, dated May 8, 2008, 8 pages.‡
Konolige, Kurt, "A Framework for a Portable Natural-Language Interface to Large Data Bases", Sri International, Technical Note 197, Oct. 12, 1979, 54 pages.‡
Chakarova et al., "Digital Still Cameras—Downloading Images to a Computer", Multimedia Reporting and Convergence, available at

(56) References Cited

OTHER PUBLICATIONS

<http://journalism.berkeley.edu/multimedia/tutorials/stillcams/downloading.h tml>, retrieved on May 9, 2005, 2 pages.‡
Schutze, H., "Dimensions of Meaning", Proceedings of Supercomputing'92 Conference, Nov. 1992, 10 pages.‡
International Search Report and Written Opinion received for PCT Patent Application No. PCT/US2007/088873, dated May 8, 2008, 7 pages.‡
Kroon et al., "Pitch Predictors with High Temporal Resolution", IEEE, vol. 2, 1990, pp. 661-664.‡
Chamberlain, Kim, "Quick Start Guide Natural Reader", available online at <http://atrc.colostate.edu/files/quickstarts/Natural_Reader_Quick_Start_Guide .>, Apr. 2008, 5 pages.‡
International Search Report and Written Opinion received for PCT Patent Application No. PCT/US2008/000032, dated Jun. 12, 2008, 7 pages.‡
Kroon et al., "Quantization Procedures for the Excitation in CELP Coders", (Proceedings of IEEE International Acoustics, Speech, and Signal Processing Conference, Apr. 1987), as reprinted in Vector Quantization (IEEE Press, 1990), 1990, pp. 320-323.‡
Chang et al., "A Segment-Based Speech Recognition System for Isolated Mandarin Syllables", Proceedings TEN CON '93, IEEE Region 10 Conference on Computer, Communication, Control and Power Engineering, vol. 3, Oct. 1993, 6 pages.‡
International Search Report and Written Opinion received for PCT Patent Application No. PCT/US2008/000042, dated May 21, 2008, 7 pages.‡
Schutze, H., "Distributional part-of-speech tagging", EACL '95 Proceedings of the seventh conference on European chapter of the Association for Computational Linguistics, 1995, pp. 141-148.‡
Kubala et al., "Speaker Adaptation from a Speaker-Independent Training Corpus", International Conference on Acoustics, Speech and Signal Processing (ICASSP'90), Apr. 1990, 4 pages.‡
Chang et al., "Discriminative Training of Dynamic Programming based Speech Recognizers", IEEE Transactions on Speech and Audio Processing, vol. 1, No. 2, Apr. 1993, pp. 135-143.‡
International Search Report and Written Opinion received for PCT Patent Application No. PCT/US2008/000043, dated Oct. 10, 2008, 12 pages.‡
Schutze, Hinrich, "Part-of-speech induction from scratch", ACL '93 Proceedings of the 31st annual meeting on Association for Computational Linguistics, 1993, pp. 251-258.‡
Kubala et al., "The Hub and Spoke Paradigm for CSR Evaluation", Proceedings of the Spoken Language Technology Workshop, Mar. 1994, 9 pages.‡
Chartier, David, "Using Multi-Network Meebo Chat Service on Your iPhone", available at <http://www.tuaw.com/2007/07/04/using-multi-network-meebo- chat-service-on-your-iphone/>, Jul. 4, 2007, 5 pages.‡
International Search Report and Written Opinion received for PCT Patent Application No. PCT/US2008/000045, dated Jun. 12, 2008, 7 pages.‡
Schwartz et al., "Context-Dependent Modeling for Acoustic-Phonetic Recognition of Continuous Speech", IEEE International Conference on Acoustics, Speech, and Signal Processing, vol. 10, Apr. 1985, pp. 1205-1208.‡
Kuo et al., "A Radical-Partitioned coded Block Adaptive Neural Network Structure for Large-Volume Chinese Characters Recognition", International Joint Conference on Neural Networks, vol. 3, Jun. 1992, pp. 597-601.‡
Chen et al., "An Improved Method for Image Retrieval Using Speech Annotation", The 9th International Conference on Multi-Media Modeling, Jan. 2003, pp. 1-17.‡
International Search Report and Written Opinion received for PCT Patent Application No. PCT/US2008/000047, dated Sep. 11, 2008, 12 pages.‡
Chen, Yi, "Multimedia Siri Finds and Plays Whatever You Ask for", PSFK Report, Feb. 9, 2012, 9 pages.‡
Kuo et al., "A Radical-Partitioned Neural Network System Using a Modified Sigmoid Function and a Weight-Dotted Radical Selector for Large-Volume Chinese Character Recognition VLSI", IEEE Int. Symp. Circuits and Systems, Jun. 1994, pp. 3862-3865.‡
Schwartz et al., "Improved Hidden Markov Modeling of Phonemes for Continuous Speech Recognition", IEEE International Conference on Acoustics, Speech, and Signal Processing, vol. 9, 1984, pp. 21-24.‡
Kurlander et al. "Comic Chat"' [Online], 1996 [Retrieved on: Feb. 4, 2013], SIGGRAPH '96 Proceedings of the 23rd annual conference on Computer graphics and interactive techniques, [Retrieved from: http://delivery.acm.org/10.1145/240000/237260/p225-kurlander.pdf], 1996, pp. 225-236.‡
International Search Report and Written Opinion received for PCT Patent Application No. PCT/US2008/000059, dated Sep. 19, 2008, 18 pages.‡
Schwartz et al., "The N-Best Algorithm: An Efficient and Exact Procedure for Finding the N Most Likely Sentence Hypotheses", IEEE, 1990, pp. 81-84.‡
Cheyer et al., "Demonstration Video of Multimodal Maps Using an Agent Architecture", published by SRI International no later than 1996, as depicted in Exemplary Screenshots from video entitled Demonstration Video of Multimodal Maps Using an Agent Architecture, 1996, 6 pages.‡
Ladefoged, Peter, "A Course in Phonetics", New York, Harcourt, Brace, Jovanovich, Second Edition, 1982.‡
International Search Report and Written Opinion received for PCT Patent Application No. PCT/US2008/000061, dated Jul. 1, 2008, 13 pages.‡
Scott et al., "Designing Touch Screen Numeric Keypads: Effects of Finger Size, Key Size, and Key Spacing", Proceedings of the Human Factors and Ergonomics Society 41st Annual Meeting, Oct. 1997, pp. 360-364.‡
Cheyer et al., "Demonstration Video of Multimodal Maps Using an Open-Agent Architecture", published by SRI International No. later than 1996, as depicted in Exemplary Screenshots from video entitled Demonstration Video of Multimodal Maps Using an Open-Agent Architecture, 6 pages.‡
Laface et al., "A Fast Segmental Viterbi Algorithm for Large Vocabulary Recognition", International Conference on Acoustics, Speech, and Signal Processing, vol. 1, May 1995, pp. 560-563.‡
International Search Report and Written Opinion received for PCT Patent Application No. PCT/US2009/051954, dated Oct. 30, 2009, 10 pages.‡
International Search Report and Written Opinion received for PCT Patent Application No. PCT/US2009/055577, dated Jan. 26, 2010, 9 pages.‡
Lafferty et al., "Conditional Random Fields: Probabilistic Models for Segmenting and Labeling Sequence Data", Proceedings of the 18th International Conference on Machine Learning, 2001, 9 pages.‡
Cheyer et al., "Multimodal Maps: An Agent-Based Approach", International Conference on Co-operative Multimodal Communication, 1995, 15 pages.‡
Seagrave, Jim, "A Faster Way to Search Text", EXE, vol. 5, No. 3, Aug. 1990, pp. 50-52.‡
International Search Report and Written Opinion received for PCT Patent Application No. PCT/US2010/037378, dated Aug. 25, 2010, 14 pages.‡
Cheyer et al., "Spoken Language and Multimodal Applications for Electronic Realties", Virtual Reality, vol. 3, 1999, pp. 1-15.‡
Laird et al., "SOAR: An Architecture for General Intelligence", Artificial Intelligence, vol. 33, 1987, pp. 1-64.‡
Sears et al., "High Precision Touchscreens: Design Strategies and Comparisons with a Mouse", International Journal of Man-Machine Studies, vol. 34, No. 4, Apr. 1991, pp. 593-613.‡
International Search Report and Written Opinion received for PCT Patent Application No. PCT/US2011/020350, dated Jun. 30, 2011, 17 pages.‡
Cheyer et al., "The Open Agent Architecture", Autonomous Agents and Multi-Agent Systems, vol. 4, Mar. 1, 2001, 6 pages.‡
Lamel et al., "Generation and synthesis of Broadcast Messages", Proceedings of ESCA-NATO Workshop: Applications of Speech Technology, Sep. 1, 1993, 4 pages.‡

(56) References Cited

OTHER PUBLICATIONS

Sears et al., "Investigating Touchscreen Typing: The Effect of Keyboard Size on Typing Speed", Behavior Information Technology, vol. 12, No. 1, 1993, pp. 17-22.‡

International Search Report and Written Opinion received for PCT Patent Application No. PCT/US2011/020825, dated Mar. 18, 2011, 9 pages.‡

Cheyer et al. "The Open Agent Architecture: Building Communities of Distributed Software Agents", Artificial Intelligence Center, SRI International, Power Point Presentation, Available online at <http://www.ai.sri.com/-oaa/>, retrieved on Feb. 21, 1998, 25 pages.‡

Lamping et al., "Laying Out and Visualizing Large Trees Using a Hyperbolic Space", Proceedings of the ACM Symposium on User Interface Software and Technology, Nov. 1994, pp. 13-14.‡

Sears et al., "Touchscreen Keyboards", Apple Inc., Video Clip, Human-Computer Interaction Laboratory, on a CD, Apr. 1991.‡

International Search Report and Written Opinion received for PCT Patent Application No. PCT/US2011/020861, dated Nov. 29, 2011, 12 pages.‡

Lamping et al., "Visualizing Large Trees Using the Hyperbolic Browser", Apple Inc., Video Clip, MIT Media Library, on a CD, 1995.‡

Seide et al., "Improving Speech Understanding by Incorporating Database Constraints and Dialogue History", Proceedings of Fourth International Conference on Philadelphia,, 1996, pp. 1017-1020.‡

Cheyer, A., "Demonstration Video of Vanguard Mobile Portal", published by SRI International no later than 2004, as depicted in 'Exemplary Screenshots from video entitled Demonstration Video of Vanguard Mobile Portal', 2004, 10 pages.‡

International Search Report and Written Opinion received for PCT Patent Application No. PCT/US2012/029810, dated Aug. 17, 2012, 11 pages.‡

Langley et al., "A Design for the ICARUS Architechture", SIGART Bulletin, vol. 2, No. 4, 1991, pp. 104-109.‡

Sen et al., "Indian Accent Text-to-Speech System for Web Browsing", Sadhana, vol. 27, No. 1, Feb. 2002, pp. 113-126.‡

International Search Report and Written Opinion received for PCT Patent Application No. PCT/US2012/034028, dated Jun. 11, 2012, 9 pages.‡

Lantz et al., "Towards a Universal Directory Service", Departments of Computer Science and Electrical Engineering, Stanford University, 1985, pp. 250-260.‡

Cheyer, Adam, "A Perspective on Al & Agent Technologies for SCM", VerticalNet Presentation, 2001, 22 pages.‡

Seneff et al., "A New Restaurant Guide Conversational System: Issues in Rapid Prototyping for Specialized Domains", Proceedings of Fourth International Conference on Spoken Language, vol. 2, 1996, 4 pages.‡

International Search Report and Written Opinion received for PCT Patent Application No. PCT/US2012/040571, dated Nov. 16, 2012, 14 pages.‡

Cheyer, Adam, "About Adam Cheyer", available at <http://www.adam.cheyer.com/about.html>, retrieved on Sep. 17, 2012, 2 pages.‡

Lantz, Keith, "An Experiment in Integrated Multimedia Conferencing", 1986, pp. 267-275.‡

Sethy et al., "A Syllable Based Approach for Improved Recognition of Spoken Names", ITRW on Pronunciation Modeling and Lexicon Adaptation for Spoken language Technology (PMLA2002), Sep. 14-15, 2002, pp. 30-35.‡

Larks, "Intelligent Software Agents", available at <http://www.cs.cmu.edu/'softagents/larks.html> retrieved on Mar. 15, 2013, 2 pages.‡

International Search Report and Written Opinion received for PCT Patent Application No. PCT/US2012/040801, dated Oct. 22, 2012, 20 pages.‡

Sharoff et al., "Register-Domain Separation as a Methodology for Development of Natural Language Interfaces to Databases", Proceedings of Human-Computer Interaction (INTERACT'99), 1999, 7 pages.‡

Lau et al., "Trigger-Based Language Models: A Maximum Entropy Approach", ICASSP'93 Proceedings of the 1993 IEEE international conference on Acoustics, speech, and signal processing: speech processing—vol. II, 1993, pp. 45-48.‡

Choi et al., "Acoustic and Visual Signal based Context Awareness System for Mobile Application", IEEE Transactions on Consumer Electronics, vol. 57, No. 2, May 2011, pp. 738-746.‡

International Search Report and Written Opinion received for PCT Patent Application No. PCT/US2012/040931, dated Feb. 1, 2013, 4 pages (International Search Report only).‡

Sheth et al., "Evolving Agents for Personalized Information Filtering", Proceedings of the Ninth Conference on Artificial Intelligence for Applications, Mar. 1993, 9 pages.‡

Lauwers et al., "Collaboration Awareness in Support of Collaboration Transparency: Requirements for the Next Generation of Shared Window Systems", CHI'90 Proceedings, 1990, pp. 303-311.‡

International Search Report and Written Opinion received for PCT Patent Application No. PCT/US2012/043098, dated Nov. 14, 2012, 9 pages.‡

Sheth et al., "Relationships at the Heart of Semantic Web: Modeling, Discovering, and Exploiting Complex Semantic Relationships", Enhancing the Power of the Internet: Studies in Fuzziness and Soft Computing, Oct. 13, 2002, pp. 1-38.‡

Lauwers et al., "Replicated Architectures for Shared Window Systems: A Critique", COCS '90 Proceedings of the ACM SIGOIS and IEEE CS TC-OA conference on Office information systems, ACM SIGOIS Bulletin, 1990, pp. 249-260.‡

Chomsky et al., "The Sound Pattern of English", New York, Harper and Row, 1968, 242 pages.‡

Shikano et al., "Speaker Adaptation through Vector Quantization", IEEE International Conference on Acoustics, Speech and Signal Processing (ICASSP'86), vol. 11, Apr. 1986, 4 pages.‡

Lazzaro, Joseph J., "Adapting Desktop Computers to Meet the Needs of Disabled Workers is Easier Than You Might Think", Computers for the Disabled, BYTE Magazine, Jun. 1993, 4 pages.‡

International Search Report and Written Opinion received for PCT Patent Application No. PCT/US2012/043100, dated Nov. 15, 2012, 8 pages.‡

Choularton et al., "User Responses to Speech Recognition Errors: Consistency of Behaviour Across Domains", Proceedings of the 10th Australian International Conference on Speech Science Technology, Dec. 8-10, 2004, pp. 457-462.‡

Leahy et al., "Effect of Touch Screen Target Location on User Accuracy", Proceedings of the Human Factors Society 34th Annual Meeting, 1990, 5 pages.‡

Shimazu et al., "CAPIT: Natural Language Interface Design Tool with Keyword Analyzer and Case-Based Parser", NEG Research & Development, vol. 33, No. 4, Oct. 1992, 11 pages.‡

International Search Report and Written Opinion received for PCT Patent Application No. PCT/US2012/056382, dated Dec. 20, 2012, 11 pages.‡

Church, Kenneth W., "Phonological Parsing in Speech Recognition", Kluwer Academic Publishers, 1987.‡

Lee et al., "A Multi-Touch Three Dimensional Touch-Sensitive Tablet", CHI '85 Proceedings of the SIGCHI Conference on Human Factors in Computing Systems, Apr. 1985, pp. 21-25.‡

Shinkle, L., "Team User's Guide", SRI International, Artificial Intelligence Center, Nov. 1984, 78 pages.‡

International Search Report and Written Opinion received for PCT Patent Application No. PCT/US2013/028412, dated Sep. 26, 2013, 17 pages.‡

Cisco Systems, Inc., "Cisco Unity Unified Messaging User Guide", Release 4.0(5), Apr. 14, 2005, 152 pages.‡

Lee et al., "A Real-Time Mandarin Dictation Machine for Chinese Language with Unlimited Texts and Very Large Vocabulary", International Conference on Acoustics, Speech and Signal Processing, vol. 1, Apr. 1990, 5 pages.‡

Shiraki et al., "LPC Speech Coding Based on Variable-Length Segment Quantization", (IEEE Transactions on Acoustics, Speech and Signal Processing, Sep. 1988), as reprinted in Vector Quantization (IEEE Press, 1990), 1990, pp. 250-257.‡

(56) References Cited

OTHER PUBLICATIONS

Cisco Systems, Inc., "Installation Guide for Cisco Unity Unified Messaging with Microsoft Exchange 2003/2000 (With Failover Configured)", Release 4.0(5), Apr. 14, 2005, 152 pages.‡

Lee et al., "Golden Mandarin (II)—An Improved Single-Chip Real-Time Mandarin Dictation Machine for Chinese Language with Very Large Vocabulary", IEEE International Conference of Acoustics, Speech and Signal Processing, vol. 2, 1993, 4 pages.‡

Shklar et al., "InfoHarness: Use of Automatically Generated Metadata for Search and Retrieval of Heterogeneous Information", Proceedings of CAiSE'95, Finland, 1995, 14 pages.‡

Cisco Systems, Inc., "Operations Manager Tutorial, Cisco's IPC Management Solution", 2006, 256 pages.‡

Lee et al., "Golden Mandarin (II)—An Intelligent Mandarin Dictation Machine for Chinese Character Input with Adaptation/Learning Functions", International Symposium on Speech, Image Processing and Neural Networks, Hong Kong, Apr. 1994, 5 pages.‡

Shneiderman, Ben, "Designing the User Interface: Strategies for Effective Human-Computer Interaction", Second Edition, 1992, 599 pages.‡

Codd, E. F., "Databases: Improving Usability and Responsiveness-How About Recently", Copyright 1978, Academic Press, Inc., 1978, 28 pages.‡

Shneiderman, Ben, "Designing the User Interface: Strategies for Effective Human-Computer Interaction", Third Edition, 1998, 669 pages.‡

Lee et al., "On URL Normalization", Proceedings of the International Conference on Computational Science and its Applications, ICCSA 2005, pp. 1076-1085.‡

Shneiderman, Ben, "Direct Manipulation for Comprehensible, Predictable and Controllable User Interfaces", Proceedings of the 2nd International Conference on Intelligent User Interfaces, 1997, pp. 33-39.‡

Lee et al., "System Description of Golden Mandarin (I) Voice Input for Unlimited Chinese Characters", International Conference on Computer Processing of Chinese Oriental Languages, vol. 5, No. 3 & 4, Nov. 1991, 16 pages.‡

Cohen et al., "An Open Agent Architecture", available at http://citeseerx.ist.psu.edu/viewdoc/summary?doi=10.1.1.30.480, 1994, 8 pages.‡

International Search Report and Written Opinion received for PCT Patent Application No. PCT/US2013/028920, dated Jun. 27, 2013, 14 pages.‡

Lee, K. F., "Large-Vocabulary Speaker-Independent Continuous Speech Recognition: The SPHINX System", Partial Fulfillment of the Requirements for the Degree of Doctorof Philosophy, Computer Science Department, Carnegie Mellon University, Apr. 1988, 195 pages.‡

Shneiderman, Ben, "Sparks of Innovation in Human-Computer Interaction", 1993, (Table of Contents, Title Page, Ch. 4, Ch. 6 and List of References).‡

Cohen et al., "Voice User Interface Design,", Excerpts from Chapter 1 and Chapter 10, 2004, 36 pages.‡

International Search Report and Written Opinion received for PCT Patent Application No. PCT/US2013/029156, dated Jul. 15, 2013, 9 pages.‡

Lee, Kai-Fu, "Automatic Speech Recognition", 1989, 14 pages (Table of Contents).‡

Shneiderman, Ben, "The Eyes Have It: A Task by Data Type Taxonomy for Information Visualizations", IEEE Proceedings of Symposium on Visual Languages, 1996, pp. 336-343.‡

International Search Report and Written Opinion received for PCT Patent Application No. PCT/US2013/040971, dated Nov. 12, 2013, 11 pages.‡

Shneiderman, Ben, "Touch Screens Now Offer Compelling Uses", IEEE Software, Mar. 1991, pp. 93-94.‡

Coleman, David W., "Meridian Mail Voice Mail System Integrates Voice Processing and Personal Computing", Speech Technology, vol. 4, No. 2, Mar./Apr. 1988, pp. 84-87.‡

Lemon et al., "Multithreaded Context for Robust Conversational Interfaces: Context- Sensitive Speech Recognition and Interpretation of Corrective Fragments", ACM Transactions on Computer-Human Interaction, vol. 11, No. 3, Sep. 2004, pp. 241-267.‡

Coles et al., "Chemistry Question-Answering", SRI International, Jun. 1969, 15 pages.‡

Shoham et al., "Efficient Bit and Allocation for an Arbitrary Set of Quantizers", (IEEE Transactions on Acoustics, Speech, and Signal Processing, Sep. 1988) as reprinted in Vector Quantization (IEEE Press, 1990), 1990, pp. 289-296.‡

International Search Report and Written Opinion received for PCT Patent Application No. PCT/US2015/047584, dated Nov. 9, 2015, 10 pages.‡

Sigurdsson et al., "Mel Frequency Cepstral Co-efficients: an Evaluation of Robustness of MP3 Encoded Music", Proceedings of the 7th International Conference on Music Information Retrieval, 2006, 4 pages.‡

International Search Report and Written Opinion received for PCT Patent Application No. PCT/US2015/053365, dated Mar. 10, 2016, 20 pages.‡

Coles et al., "Techniques for Information Retrieval Using an Inferential Question-Answering System with Natural-Language Input", SRI International, Nov. 1972, 198 pages.‡

Silverman et al., "Using a Sigmoid Transformation for Improved Modeling of Phoneme Duration", Proceedings of the IEEE International Conference on Acoustics, Speech and Signal Processing, Mar. 1999, 5 pages.‡

International Search Report and Written Opinion received for PCT Patent Application No. PCT/US2015/053366, dated Apr. 26, 2016, 16 pages.‡

International Search Report and Written Opinion received for PCT Patent Application No. PCT/US2013/041225, dated Aug. 23, 2013, 3 pages (International Search Report only).‡

Coles et al., "The Application of Theorem Proving to Information Retrieval", SRI International, Jan. 1971, 21 pages.‡

Penn et al., "Ale for Speech: A Translation Prototype", Bell Laboratories, 1999, 4 pages.‡

International Search Report and Written Opinion received for PCT Patent Application No. PCT/US2016/021103, dated Jun. 8, 2016, 15 pages.‡

International Search Report and Written Opinion received for PCT Patent Application No. PCT/US2013/044574, dated Sep. 27, 2013, 12 pages.‡

Pereira, Fernando, "Logic for Natural Language Analysis", SRI International, Technical Note 275, Jan. 1983, 194 pages.‡

International Search Report and Written Opinion received for PCT Patent Application No. PCT/US2016/021104, dated Jun. 8, 2016, 15 pages.‡

Colt, Sam, "Here's One Way Apple's Smartwatch Could Be Better Than Anything Else", Business Insider, Aug. 21, 2014, pp. 1-4.‡

International Search Report and Written Opinion received for PCT Paten Application No. PCT/US2013/044834, dated Dec. 20, 2013, 13 pages.‡

International Search Report and Written opinion received for PCT Patent Application No. PCT/US2016/021409, dated May 26, 2016, 22 pages.‡

Perrault et al., "Natural-Language Interfaces", SRI International, Technical Note 393, Aug. 22, 1986, 48 pages.‡

International Search Report and Written Opinion received for PCT Patent Application No. PCT/US2013/047659, dated Jul. 7, 2014, 25 pages.‡

Combined Search Report and Examination Report under Sections 17 and 18(3) received for GB Patent Application No. 1009318.5, dated Oct. 8, 2010, 5 pages.‡

International Search report and Written Opinion received for PCT Patent Application No. PCT/US2016/024666, dated Jun. 10, 2016, 13 pages.‡

PhatNoise, Voice Index on Tap, Kenwood Music Keg, available at <http://www. phatnoise.com/kenwood/kenwoodssamail.html >, retrieved on Jul. 13, 2006, 1 page.‡

International Search Report and Written Opinion received for PCT Patent Application No. PCT/US2013/047668, dated Feb. 13, 2014, 17 pages.‡

(56) References Cited

OTHER PUBLICATIONS

Combined Search Report and Examination Report under Sections 17 and 18(3) received for GB Patent Application No. 1217449.6, dated Jan. 17, 2013, 6 pages.‡
International Search Report and Written Opinion received for PCT Patent Application No. PCT/US2016/025404, dated Jun. 24, 2016, 21 pages.‡
Phillipps, Ben, "Touchscreens are Changing the Face of Computers—Today's Users Have Five Types of Touchscreens to Choose from, Each with its Own Unique Characteristics", Electronic Products, Nov. 1994, pp. 63-70.‡
International Search Report and Written Opinion received for PCT Patent Application No. PCT/US2013/052558, dated Jan. 30, 2014, 15 pages.‡
Compaq Inspiration Technology, "Personal Jukebox (PJB)—Systems Research Center and PAAD", Oct. 13, 2000, 25 pages.‡
International Search Report and Written Opinion received for PCT Patent Application No. PCT/US2016/025407, dated Jun. 23, 2016, 18 pages.‡
Phillips, Dick, "The Multi-Media Workstation", SIGGRAPH '89 Panel Proceedings, 1989, pp. 93-109.‡
Compaq, "Personal Jukebox", available at <http://research.compaq.com/SRC/pjb/>, 2001, 3 pages.‡
International Search Report and Written Opinion received for PCT Patent Application No. PCT/US2013/058916, dated Sep. 8, 2014, 10 pages.‡
Phoenix Solutions, Inc., "Declaration of Christopher Schmandt Regarding the MIT Galaxy System", West Interactive Corp., A Delaware Corporation, Document 40, Jul. 2, 2010, 162 pages.‡
International Search Report and Written Opinion received for PCT Patent Application No. PCT/US2016/025408, dated Aug. 11, 2016, 19 pages.‡
Conkie et al., "Preselection of Candidate Units in a Unit Selection-Based Text-to-Speech Synthesis System", ISCA, 2000, 4 pages.‡
International Search Report and Written Opinion received for PCT Patent Application No. PCT/US2013/060121, dated Dec. 6, 2013, 8 pages.‡
Conklin, Jeff, "Hypertext: An Introduction and Survey", Computer Magazine, Sep. 1987, 25 pages.‡
Pickering, J. A., "Touch-Sensitive Screens: The Technologies and Their Application", International Journal of Man-Machine Studies, vol. 25, No. 3, Sep. 1986, pp. 249-269.‡
International Search Report and Written Opinion received for PCT Patent Application No. PCT/US2016/031059, dated Aug. 8, 2016, 11 pages.‡
International Search Report and Written Opinion received for PCT Patent Application No. PCT/US2014/015418, dated Aug. 26, 2014, 17 pages.‡
International Search Report and Written Opinion received for PCT Patent Application No. PCT/US2016/031549, dated Aug. 5, 2016, 35 pages.‡
Picone, J., "Continuous Speech Recognition using Hidden Markov Models", IEEE ASSP Magazine, vol. 7, No. 3, Jul. 1990, 16 pages.‡
Conklin, Jeffrey, "A Survey of Hypertext", MCC Software Technology Program, Dec. 1987, 40 pages.‡
International Search Report and Written Opinion received for PCT Patent Application No. PCT/US2014/016988, dated Apr. 29, 2014, 10 pages.‡
Pingali et al., "Audio-Visual Tracking for Natural Interactivity", ACM Multimedia, Oct. 1999, pp. 373-382.‡
International Search Report and Written Opinion received for PCT Patent Application No. PCT/US2016/031550, dated Aug. 4, 2016, 13 pages.‡
Connolly et al., "Fast Algorithms for Complex Matrix Multiplication Using Surrogates", IEEE Transactions on Acoustics, Speech and Signal Processing, vol. 37, No. 6, Jun. 1989, 13 pages.‡
International Search Report and Written Opinion received for PCT Patent Application No. PCT/US2014/023822, dated Sep. 25, 2014, 14 pages.‡
Constantinides et al., "A Schema Based Approach to Dialog Control", Proceedings of the International Conference on Spoken Language Processing, 1998, 4 pages.‡
International Search Report and Written Opinion received for PCT Patent Application No. PCT/US2016/035105, dated Aug. 29, 2016, 25 pages.‡
Plaisant et al., "Touchscreen Interfaces for Alphanumeric Data Entry", Proceedings of the Human Factors and Ergonomics Society 36th Annual Meeting, 1992, pp. 293-297.‡
International Search Report and Written Opinion received for PCT Patent Application No. PCT/US2014/023826, dated Oct. 9, 2014, 13 pages.‡
International Search Report and Written Opinion received for PCT Patent Application No. PCT/US2016/035107, dated Aug. 31, 2016, 26 pages.‡
Copperi et al., "CELP Coding for High Quality Speech at 8 kbits/s", Proceedings of IEEE International Acoustics, Speech and Signal Processing Conference, Apr. 1986), as reprinted in Vector Quantization (IEEE Press), 1990, pp. 324-327.‡
Plaisant et al., "Touchscreen Toggle Design", CHI'92, May 3-7, 1992, pp. 667-668.‡
International Search Report and Written Opinion received for PCT Patent Application No. PCT/US2014/026871, dated Jul. 23, 2014, 9 pages.‡
Pollock, Stephen, "A Rule-Based Message Filtering System", Published in: Journal, ACM Transactions on Information Systems (TOIS), vol. 6, Issue 3, Jul. 1988, pp. 232-254.‡
International Search Report and Written Opinion received for PCT Patent Application No. PCT/US2014/026873, dated Jan. 5, 2015, 11 pages.‡
International Search Report and Written Opinion received for PCT Patent Application No. PCT/US2016/035112, dated Aug. 22, 2016, 21 pages.‡
Corporate Ladder, BLOC Publishing Corporation, 1991, 1 page.‡
Poly-Optical Products, Inc., "Poly-Optical Fiber Optic Membrane Switch Backlighting", available at <http://www.poly-optical.com/membrane_switches.html>, retrieved on Dec. 19, 2002, 3 pages.‡
International Search Report and Written Opinion received for PCT Patent Application No. PCT/US2014/028785, dated Oct. 17, 2014, 23 pages.‡
Poor, Alfred, "Microsoft Publisher", PC Magazine, vol. 10, No. 20, Nov. 26, 1991, 1 page.‡
International Search Report received for PCT Patent Application No. PCT/GB2009/051684, dated Mar. 12, 2010, 4 pages.‡
Corr, Paul, "Macintosh Utilities for Special Needs Users", available at <http://homepage.mac.com/corrp/macsupt/columns/specneeds.html>, Feb. 1994 (content updated Sep. 19, 1999), 4 pages.‡
International Search Report and Written Opinion received for PCT Patent Application No. PCT/US2014/028950, dated Nov. 25, 2014, 10 pages.‡
International Search Report received for PCT Patent Application No. PCT/US1993/012666, dated Nov. 9, 1994, 8 pages.‡
Potter et al., "An Experimental Evaluation of Three Touch Screen Strategies within a Hypertext Database", International Journal of Human-Computer Interaction, vol. 1, No. 1, 1989, pp. 41-52.‡
Cox et al., "Speech and Language Processing for Next-Millennium Communications Services", Proceedings of the IEEE, vol. 88, No. 8, Aug. 2000, 24 pages.‡
International Search Report and Written Opinion received for PCT Patent Application No. PCT/US2014/029050, dated Jul. 31, 2014, 9 pages.‡
Potter et al., "Improving the Accuracy of Touch Screens: An Experimental Evaluation of Three Strategies", CHI '88 ACM, 1988, pp. 27-32.‡
International Search Report received for PCT Patent Application No. PCT/US1994/000687, dated Jun. 3, 1994, 1 page.‡
Craig et al., "Deacon: Direct English Access and Control", AFIPS Conference Proceedings, vol. 19, San Francisco, Nov. 1966, 18 pages.‡
International Search Report and Written Opinion received for PCT Patent Application No. PCT/US2014/029562, dated Sep. 18, 2014, 21 pages.‡

(56) References Cited

OTHER PUBLICATIONS

International Search Report received for PCT Patent Application No. PCT/US1994/00077, dated May 25, 1994, 2 pages.‡
International Search Report and Written Opinion received for PCT Patent Application No. PCT/US2014/040393, dated Dec. 8, 2014, 23 pages.‡
Creative Technology Ltd., "Creative NOMAD® II: Getting Started—User Guide (On Line Version)", available at <http://ecLimages-amazon.com/media/i3d/01/A/man-migrate/MANUAL000026434.pdf, Apr. 2000, 46 pages.‡
International Search Report received for PCT Patent Application No. PCT/US1995/008369, dated Nov. 8, 1995, 6 pages.‡
Powell, Josh, "Now You See Me . . . Show/Hide Performance", available at http://www.learningjquery.com/2010/05/now-you-see-me-showhide-performance, May 4, 2010.‡
International Search Report and Written Opinion received for PCT Patent Application No. PCT/US2014/040394, dated Aug. 8, 2014, 11 pages.‡
Creative Technology Ltd., "Creative NOMAD®: Digital Audio Player: User Guide (On-Line Version)", available at <http://ecLimages-amazon.com/media/i3d/01/A/man-migrate/MANUAL000010757.pdf, Jun. 1999, 40 pages.‡
International Search Report received for PCT Patent Application No. PCT/US1995/013076, dated Feb. 2, 1996, 1 page.‡
Public Safety Technologies, "Tracer 2000 Computer", available at <http://www.pst911.com/tracer.html>, retrieved on Dec. 19, 2002, 3 pages.‡
International Search Report and Written Opinion received for PCT Patent Application No. PCT/US2014/040397, dated Aug. 27, 2014, 12 pages.‡
International Search Report received for PCT Patent Application No. PCT/US1996/01002, dated Oct. 30, 1996, 4 pages.‡
Pulman et al., "Clare: A Combined Language and Reasoning Engine", Proceedings of JFIT Conference, available at <http://www.cam.sri.com/tr/crc042/paper.ps.Z>, 1993, 8 pages.‡
Creative Technology Ltd., "Nomad Jukebox", User Guide, Version 1.0, Aug. 2000, 52 pages.‡
International Search Report received for PCT Patent Application No. PCT/US2002/024669, dated Nov. 5, 2002, 3 pages.‡
Quazza et al., "Actor: A Multilingual Unit-Selection Speech Synthesis System", Proceedings of 4th ISCA Tutorial and Research Workshop on Speech Synthesis, Jan. 1, 2001, 6 pages.‡
International Search Report and Written Opinion received for PCT Patent Application No. PCT/US2014/040401, dated Sep. 4, 2014, 10 pages.‡
Creative, "Creative NOMAD MuVo TX", available at <http://web.archive.org/web/20041024175952/www.creative.com/products/pfriendly.asp?product=9672>, retrieved on Jun. 6, 2006, 1 page.‡
Quick Search Algorithm, Communications of the ACM, 33(8), 1990, pp. 132-142.‡
International Search Report received for PCT Patent Application No. PCT/US2002/024670, dated Sep. 26, 2002, 3 pages.‡
Creative, "Creative NOMAD MuVo", available at <http://web.archive.org/web/20041024075901/www.creative.com/products/product.asp?category=213&subcategory=216&product=4983>, retrieved on Jun. 7, 2006, 1 page.‡
Rabiner et al., "Digital Processing of Speech Signals", Prentice Hall, 1978, pp. 274-277.‡
International Search Report received for PCT Patent Application No. PCT/US2002/033330, dated Feb. 4, 2003, 6 pages.‡
International Search Report and Written Opinion received for PCT Patent Application No. PCT/US2014/040403, dated Sep. 23, 2014, 9 pages.‡
International Search Report received for PCT Patent Application No. PCT/US2005/046797, dated Nov. 24, 2006, 6 pages.‡
Rabiner et al., "Fundamental of Speech Recognition", AT&T, Published by Prentice-Hall, Inc., ISBN: 0-13-285826-6, 1993, 17 pages.‡
International Search Report and Written Opinion received for PCT Patent Application No. PCT/US2014/040961, dated Mar. 10, 2015, 5 pages.‡
International Search Report received for PCT Patent Application No. PCT/US2011/037014, dated Oct. 4, 2011, 6 pages.‡
Rabiner et al., "Note on the Properties of a Vector Quantizer for LPC Coefficients", Bell System Technical Journal, vol. 62, No. 8, Oct. 1983, 9 pages.‡
Creative, "Digital MP3 Player", available at <http://web.archive.org/web/20041024074823/www.creative.com/products/product.asp?category=213&subcategory=216&product=4983, 2004, 1 page.‡
International Search Report and Written Opinion received for PCT Patent Application No. PCT/US2014/041159, dated Sep. 26, 2014, 10 pages.‡
International Search Report received for PCT Patent Application No. PCT/US2013/041233, dated Nov. 22, 2013, 3 pages.‡
Rampe et al., "SmartForm Designer and SmartForm Assistant", News release, Claris Corp., Jan. 9, 1989, 1 page.‡
Croft et al., "Task Support in an Office System", Proceedings of the Second ACM-SIGOA Conference on Office Information Systems, 1984, pp. 22-24.‡
International Search Report and Written Opinion received for PCT Patent Application No. PCT/US2014/041173, dated Sep. 10, 2014, 11 pages.‡
Intraspect Software, "The Intraspect Knowledge Management Solution: Technical Overview", available at <http://tomgruber.org/writing/intraspect- whitepaper-1998.pdf>, 1998, 18 pages.‡
Rao et al., "Exploring Large Tables with the Table Lens", Apple Inc., Video Clip, Xerox Corp., on a CD, 1994.‡
Crowley et al., "MMConf: An Infrastructure for Building Shared Multimedia Applications", CSCW 90 Proceedings, Oct. 1990, pp. 329-342.‡
International Search Report and Written Opinion received for PCT Paten Application No. PCT/US2014/049568, dated Nov. 14, 2014, 12 pages.‡
Cucerzan et al., "Bootstrapping a Multilingual Part-of-Speech Tagger in One Person-Day", In Proceedings of the 6th Conference on Natural Language Learning, vol. 20, 2002, pp. 1-7.‡
Invitation to Pay Additional Fees and Partial International Search Report received for PCT Patent Application No. PCT/US2004/016519, dated Aug. 4, 2005, 6 pages.‡
Rao et al., "Exploring Large Tables with the Table Lens", CHI'95 Mosaic of Creativity, ACM, May 7-11, 1995, pp. 403-404.‡
International Search Report and Written Opinion received for PCT Patent Application No. PCT/US2014/053951, dated Dec. 8, 2014, 11 pages.‡
Rao et al., "The Table Lens: Merging Graphical and Symbolic Representations in an Interactive Focus+Context Visualization for Tabular Information", Proceedings of the ACM SIGCHI Conference on Human Factors in Computing Systems, Apr. 1994, pp. 1-7.‡
Invitation to Pay Additional Fees and Partial International Search Report received for PCT Patent Application No. PCT/US2005/046797, dated Jul. 3, 2006, 6 pages.‡
Cuperman et al., "Vector Predictive Coding of Speech at 16 kbit s/s", (IEEE Transactions on Communications, Jul. 1985), as reprinted in Vector Quantization (IEEE Press, 1990), 1990, pp. 300-311.‡
International Search Report and Written Opinion received for PCT Patent Application No. PCT/US2014/053957, dated Feb. 19, 2015, 11 pages.‡
Raper, Larry K.,"The C-MU PC Server Project", (CMU-ITC-86-051), Dec. 1986, pp. 1-30.‡
Invitation to Pay Additional Fees and Partial International Search Report received for PCT Patent Application No. PCT/US2006/048738, dated Jul. 10, 2007, 4 pages.‡
Cutkosky et al., "PACT: An Experiment in Integrating Concurrent Engineering Systems", Journal Magazines, Computer, vol. 26, No. 1, Jan. 1993, 14 pages.‡
International Search Report and Written Opinion received for PCT Patent Application No. PCT/US2014/053958, dated Feb. 19, 2015, 10 pages.‡
Ratcliffe et al., "Intelligent Agents Take U.S. Bows", MacWeek, vol. 6, No. 9, Mar. 2, 1992, 1 page.‡

(56) References Cited

OTHER PUBLICATIONS

Dar et al., "DTL's DataSpot: Database Exploration Using Plain Language", Proceedings of the 24th VLDB Conference, New York, 1998, 5 pages.‡
Ratcliffe, M., "ClearAccess 2.0 Allows SQL Searches Off-Line (Structured Query Language) (ClearAccess Corp. Preparing New Version of Data-Access Application with Simplified User Interface, New Features) (Product Announcement)", MacWeek, vol. 6, No. 41, Nov. 16, 1992, 2 pages.‡
International Search Report and Written Opinion received for PCT Patent Application No. PCT/US2015/019320, dated Jul 2, 2015, 14 pages.‡
Ravishankar, Mosur K., "Efficient Algorithms for Speech Recognition", Doctoral Thesis Submitted to School of Computer Science, Computer Science Division, Carnegie Mellon University, Pittsburgh, May 15, 1996, 146 pages.‡
Invitation to Pay Additional Fees and Partial International Search Report received for PCT Patent Application No. PCT/US2011/020350, dated Apr. 14, 2011, 5 pages.‡
Database WPI Section Ch, Week 8733, Derwent Publications Ltd., London, GB; Class A17, AN 87-230826 & JP, A, 62 153 326 (Sanwa Kako KK (Sans) Sanwa Kako Co), Jul. 8, 1987.‡
International Search Report and Written Opinion received for PCT Patent Application No. PCT/US2015/019321, dated Jun. 3, 2015, 11 pages.‡
Invitation to Pay Additional Fees and Partial International Search Report received for PCT Patent Application No. PCT/US2015/023089, dated Jun. 17, 2015, 7 pages.‡
Rayner et al., "Adapting the Core Language Engine to French and Spanish", Cornell University Library, available at <http:1/arxiv.org/abs/cmp-Ig/9605015>, May 10, 1996, 9 pages.‡
Database WPI Section Ch, Week 8947, Derwent Publications Ltd., London, GB; Class A17, An 89-343299 & JP, A, 1 254 742 (Sekisui Plastics KK), Oct. 11, 1989.‡
International Search Report and Written Opinion received for PCT Pa ent Application No. PCT/US2015/019322, dated Jun. 18, 2015, 16 pages.‡
Invitation to Pay Additional Fees received for PCT Application No. PCT/US2016/021410, dated Apr. 28, 2016, 2 pages.‡
Rayner et al., "Deriving Database Queries from Logical Forms by Abductive Definition Expansion", Proceedings of the Third Conference on Applied Natural Language Processing, ANLC, 1992, 8 pages.‡
Davis et al., "A Personal Handheld Multi-Modal Shopping Assistant", International Conference on Networking and Services, IEEE, 2006, 9 pages.‡
Invitation to Pay Additional Fees received for PCT Patent Application No. PCT/US2008/000043, dated Jun. 27, 2008, 4 pages.‡
Rayner et al., "Spoken Language Translation with Mid-90's Technology: A Case Study", Eurospeech, ISCA, Available online at <http://citeseerx.ist.psu.edu/viewdoc/summary?doi=10.1.1.54.8608>, 1993, 4 pages.‡
International Search Report and Written Opinion received for PCT Patent Application No. PCT/US2015/023089, dated Aug. 20, 2015. 16 pages.‡
Davis et al., "Stone Soup Translation", Department of Linguistics, Ohio State University, 2001, 11 pages.‡
Rayner, M., "Abductive Equivalential Translation and its Application to Natural Language Database Interfacing", Dissertation Paper, SRI International, Sep. 1993, 162 pages.‡
International Search Report and Written Opinion received for PCT Patent Application No. PCT/US2015/023097, dated Jul. 7, 2015, 15 pages.‡
Invitation to Pay Additional Fees received for PCT Patent Application No. PCT/US2008/000047, dated Jul. 4, 2008, 4 pages.‡
De Herrera, Chris, "Microsoft ActiveSync 3.1", Version 1.02, available at <http://www.cewindows.net/wce/activesync3.1.htm >, Oct. 13, 2000, 8 pages.‡
Rayner, Manny, "Linguistic Domain Theories: Natural-Language Database Interfacing from First Principles", SRI International, Cambridge, 1993, 11 pages.‡
Invitation to Pay Additional Fees received for PCT Patent Application No. PCT/US2011/037014, dated Aug. 2, 2011, 6 pages.‡
Decker et al., "Designing Behaviors for Information Agents", The Robotics Institute, Carnegie-Mellon University, Paper, Jul. 1996, 15 pages.‡
International Search Report and Written Opinion received for PCT Patent Application No. PCT/US2015/023593, dated Aug. 14, 2015, 16 pages.‡
Decker et al., "Matchmaking and Brokering", The Robotics Institute, Carnegie-Mellon University, Paper, May 1996, 19 pages.‡
Invitation to Pay Additional Fees received for PCT Patent Application No. PCT/US2012/040801, dated Aug. 8, 2012, 2 pages.‡
Reddi, "The Parser".‡
International Search Report and Written Opinion received for PCT Patent Application No. PCT/US2015/025188, dated Jun. 23, 2015, 11 pages.‡
Deerwester et al., "Indexing by Latent Semantic Analysis", Journal of the American Society for Information Science, vol. 41, No. 6, Sep. 1990, 19 pages.‡
International Search Report and Written Opinion received for PCT Patent Application No. PCT/US2015/029554, dated Jul. 16, 2015, 11 pages.‡
Invitation to Pay Additional Fees received for PCT Patent Application No. PCT/US2013/047659, dated Feb. 27, 2014, 7 pages.‡
Degani et al., "'Soft' Controls for Hard Displays: Still a Challenge", Proceedings of the 36th Annual Meeting of the Human Factors Society, 1992, pp. 52-56.‡
Reddy, D. R., "Speech Recognition by Machine: A Review", Proceedings of the IEEE, Apr. 1976, pp. 501-531.‡
International Search Report and Written Opinion received for PCT Patent Application No. PCT/US2015/032470, dated Oct. 1, 2015, 13 pages.‡
Del Strother, Jonathan, "Coverflow", available at <http://www.steelskies.com/coverflow>, retrieved on Jun. 15, 2006, 14 pages.‡
Invitation to Pay Additional Fees received for PCT Patent Application No. PCT/US2013/052558, dated Nov. 7, 2013, 6 pages.‡
Reger et al., "Speech and Speaker Independent Codebook Design in VQ Coding Schemes", (Proceedings of the IEEE International Acoustics, Speech and Signal Processing Conference, Mar. 1985), as reprinted in Vector Quantization (IEEE Press, 1990), 1990, pp. 271-273.‡
International Search Report and Written Opinion received for PCT Patent Application No. PCT/US2015/032724, dated Jul. 27, 2015, 11 pages.‡
Invitation to pay additional fees received for PCT Patent Application No. PCT/US2014/029562, dated Jul. 4, 2014, 7 pages.‡
Remde et al., "SuperBook: An Automatic Tool for Information Exploration—Hypertext?", In Proceedings of Hypertext, 87 Papers, Nov. 1987, 14 pages.‡
Deller, Jr. et al., "Discrete-Time Processing of Speech Signals", Prentice Hall, ISBN: 0-02-328301-7, 1987, 14 pages.‡
International Search Report and Written Opinion received for PCT Patent Application No. PCT/US2015/033051, dated Aug. 5, 2015, 14 pages.‡
Invitation to Pay Additional Fees received for PCT Patent Application No. PCT/US2014/040393, dated Sep. 17, 2014, 7 pages.‡
Ren et al., "Efficient Strategies for Selecting Small Targets on Pen-Based Systems: An Evaluation Experiment for Selection Strategies and Strategy Classification", Proceedings of the IFIP TC2/TC13 WG2.7/WG13.4 Seventh Working Conference on Engineering for Human-Computer Interaction, vol. 150, 1998, pp. 19-37.‡
Diagrammaker, Action Software, 1989.‡
International Search Report and Written Opinion received for PCT Patent Application No. PCT/US2015/047062, dated Jan. 13, 2016, 25 pages.‡
Invitation to Pay Additional Fees received for PCT Patent Application No. PCT/US2014/040961, dated Jan. 14, 2015, 3 pages.‡

(56) References Cited

OTHER PUBLICATIONS

Ren et al., "Improving Selection Performance on Pen-Based Systems: A Study of Pen-Based Interaction for Selection Tasks", ACM Transactions on Computer-Human Interaction, vol. 7, No. 3, Sep. 2000, pp. 384-416.‡
Diagram-Master, Ashton-Tate, 1989.‡
International Search Report and Written Opinion received for PCT Patent Application No. PCT/US2015/047064, dated Nov. 13, 2015, 13 pages.‡
Diamond Multimedia Systems, Inc., "Rio PMP300: User's Guide", available at <http://ecl.images-amazon.com/media/i3d/01/A/man-migrate/MANUAL000022854.pdf, 1998, 28 pages.‡
Invitation to Pay Additional Fees received for PCT Patent Application No. PCT/US2015/047281, dated Oct. 8, 2015, 6 pages.‡
Ren et al., "The Best among Six Strategies for Selecting a Minute Target and the Determination of the Minute Maximum Size of the Targets on a Pen-Based Computer", Human-Computer Interaction Interact, 1997, pp. 85-92.‡
Dickinson et al., "Palmtips: Tiny Containers for All Your Data", PC Magazine, vol. 9, Mar. 1990, p. 218(3).‡
International Search Report and Written Opinion received for PCT Patent Application No. PCT/US2015/047281, dated Dec. 17, 2015, 19 pages.‡
Digital Audio in the New Era, Electronic Design and Application, No. 6, Jun. 30, 2003, 3 pages.‡
Invitation to Pay Additional Fees received for PCT Patent Application No. PCT/US2015/053366, dated Feb. 19, 2016, 8 pages.‡
Reynolds, C. F., "On-Line Reviews: A New Application of the HICOM Conferencing System", IEEE Colloquium on Human Factors in Electronic Mail and Conferencing Systems, Feb. 3, 1989, 4 pages.‡
International Search Report and Written Opinion received for PCT Patent Application No. PCT/US2015/047553, dated Jan. 5, 2016, 10 pages.‡
Digital Equipment Corporation, "Open VMS Software Overview", Software Manual, Dec. 1995, 159 pages.‡
Rice et al., "Monthly Program: Nov. 14, 1995", The San Francisco Bay Area Chapter of ACM SIGCHI, available at <http://www.baychi.org/calendar/19951114>, Nov. 14, 1995, 2 pages.‡
Invitation to Pay Additional Fees received for PCT Patent Application No. PCT/US2016/025408, dated May 13, 2016, 2 pages.‡
International Search Report and Written opinion received for PCT Patent Application No. PCT/US2015/047583, dated Feb. 3, 2016, 11 pages.‡
Invitation to Pay Additional Fees received for PCT Patent Application No. PCT/US2014/028785, dated Jul. 4, 2014, 7 pages.‡
Rice et al., "Using the Web Instead of a Window System", Proceedings of the SIGCHI Conference on Human Factors in Computing Systems, CHI'96, 1996, pp. 1-14.‡
Digital Equipment Corporation, "OpenVMS RTL DECtalk (DTK$) Manual", May 1993, 56 pages.‡
Invitation to pay additional fees received for the PCT Patent Application No. PCT/US2014/015418, dated May 26, 2014, 5 pages.‡
Ricker, Thomas, "Apple Patents Audio User Interface", Engadget, available at <http://www.engadget.com/2006/05/04/apple-patents-audio-user-interface/>, May 4, 2006, 6 pages.‡
Dittenbach et al., "A Natural Language Query Interface for Tourism Information", In: Information and Communication Technologies in Tourism 2003, XP055114393, Feb. 14, 2003, pp. 152-162.‡
Iowegian International, "FIR Filter Properties, DSPGuru, Digital Signal Processing Central", available at <http://www.dspguru.com/dsp/faq/fir/properties> retrieved on Jul. 28, 2010, 6 pages.‡
IBM, "Speech Editor", IBM Technical Disclosure Bulletin, vol. 29, No. 10, Mar. 10, 1987, 3 pages.‡
Riecken, R D., "Adaptive Direct Manipulation", IEEE Xplore, 1991, pp. 1115-1120.‡
Dobrisek et al., "Evolution of the Information-Retrieval System for Blind and Visually-Impaired People", International Journal of Speech Technology, Kluwer Academic Publishers, Bo, vol. 6, No. 3, pp. 301-309.‡
Iphone Hacks, "Native iPhone MMS Application Released", available at <http://www.iphonehacks.com/2007/12/iphone-mms-app.html>, retrieved on Dec. 25, 2007, 5 pages.‡
IBM, "Speech Recognition with Hidden Markov Models of Speech Waveforms", IBM Technical Disclosure Bulletin, vol. 34, No. 1, Jun. 1991, 10 pages.‡
Iphonechat, "iChat for iPhone in JavaScript", available at <http://www.publictivity.com/iPhoneChat/>, retrieved on Dec. 25, 2007, 2 pages.‡
Rigoll, G., "Speaker Adaptation for Large Vocabulary Speech Recognition Systems Using Speaker Markov Models", International Conference on Acoustics, Speech and Signal Processing (ICASSP'89), May 1989, 4 pages.‡
Iso-Sipila et al., "Multi-Lingual Speaker-Independent Voice User Interface for Mobile Devices", ICASSP 2006 Proceedings, IEEE International Conference on Acoustics, Speech and Signal Processing May 14, 2006, pp. 1-1081.‡
IBM, "Why Buy: ThinkPad", available at <http://www.pc.ibm.com/us/thinkpad/easeofuse.html, retrieved on Dec. 19, 2002, 2 pages.‡
Riley, M D., "Tree-Based Modelling of Segmental Durations", Talking Machines Theories, Models and Designs, Elsevier Science Publishers B.V., North-Holland, ISBN: 08-444-89115.3, 1992, 15 pages.‡
Issar et al., "CMU's Robust Spoken Language Understanding System", Proceedings of Eurospeech, 1993, 4 pages.‡
Domingue et al., "Web Service Modeling Ontology (WSMO)—An Ontology for Semantic Web Services", Position Paper at the W3C Workshop on Frameworks for Semantics in Web Services, Innsbruck, Austria, Jun. 2005, 6 pages.‡
Ichat AV, "Video Conferencing for the Rest of Us", Apple—Mac OS X—iChat AV, available at <http://www.apple.com/macosx/features/ichat/>, retrieved on Apr. 13, 2006, 3 pages.‡
Issar, Sunil, "Estimation of Language Models for New Spoken Language Applications", Proceedings of 4th International Conference on Spoken language Processing, Oct. 1996, 4 pages.‡
Donahue et al., "Whiteboards: A Graphical Database Tool", ACM Transactions on Office Information Systems, vol. 4, No. 1, Jan. 1986, pp. 24-41.‡
Rioport, "Rio 500: Getting Started Guide", available at <http://ecl.images-amazon.com/media/i3d/01/A/man-migrate/MANUAL000023453.pdf, 1999, 2 pages.‡
id3.org, "id3v2.4.0-Frames", available at <http://id3.org/id3v2.4.0- frames?action=print>, retrieved on Jan. 22, 2015, 41 pages.‡
Rivlin et al., "Maestro: Conductor of Multimedia Analysis Technologies", SRI International, 1999, 7 pages.‡
Donovan, R. E., "A New Distance Measure for Costing Spectral Discontinuities in Concatenative Speech Synthesisers", available at <http://citeseerx.ist.osu.edu/viewdoc/summarv?doi=10.1.1.21.6398>, 2001, 4 pages.‡
Jabra Corporation, "FreeSpeak: BT200 User Manual", 2002, 42 pages.‡
IEEE 1394 (Redirected from Firewire, Wikipedia, The Free Encyclopedia, available at <http://www.wikipedia.org/wiki/Firewire >, retrieved on Jun. 8, 2003, 2 pages.‡
Rivoira et al., "Syntax and Semantics in a Word-Sequence Recognition System", IEEE International Conference on Acoustics, Speech and Signal Processing (ICASSP'79), Apr. 1979, 5 pages.‡
Dourish et al., "Portholes: Supporting Awareness in a Distributed Work Group", CHI 1992;, May 1992, pp. 541-547.‡
Jabra, "Bluetooth Headset: User Manual", 2005, 17 pages.‡
Interactive Voice, available at <http://www.helloivee.com/company/>, retrieved on Feb. 10, 2014, 2 pages.‡
Dowding et al., "Gemini: A Natural Language System for Spoken-Language Understanding", Proceedings of the Thirty-First Annual Meeting of the Association for Computational Linguistics, 1993, 8 pages.‡
Jabra, "Bluetooth Introduction", 2004, 15 pages.‡

(56) References Cited

OTHER PUBLICATIONS

Robbin et al., "MP3 Player and Encoder for Macintosh!", SoundJam MP Plus, Version 2.0, 2000, 76 pages.‡
International Preliminary Report on Patentability received for PCT Patent Application No. PCT/GB2009/051684, dated Jun. 23, 2011, 10 pages.‡
Robertson et al., "Information Visualization Using 3D Interactive Animation", Communications of the ACM, vol. 36, No. 4, Apr. 1993, pp. 57-71.‡
Jacobs et al., "Scisor: Extracting Information from On-Line News", Communications of the ACM, vol. 33, No. 11, Nov. 1990, 10 pages.‡
Dowding et al., "Interleaving Syntax and Semantics in an Efficient Bottom-Up Parser", Proceedings of the 32nd Annual Meeting of the Association for Computational Linguistics, 1994, 7 pages.‡
International Preliminary Report on Patentability received for PCT Patent Application No. PCT/US1993/012637, dated Apr. 10, 1995, 7 pages.‡
Robertson et al., "The Document Lens", UIST '93, Nov. 3-5, 1993, pp. 101-108.‡
Dragon Naturally Speaking Version 11 Users Guide, Nuance Communications, Inc., Copyright @2002-2010, 132 pages.‡
Janas, Jurgen M., "The Semantics-Based Natural Language Interface to Relational Databases", Chapter 6, Cooperative Interfaces to Information Systems, 1986, pp. 143-188.‡
International Preliminary Report on Patentability received for PCT Patent Application No. PCT/US1993/012666, dated Mar. 1, 1995, 5 pages.‡
Dual Rate Speech Coder for Multimedia Communications Transmitting at 5.3 and 6.3 kbit/s, International Telecommunication Union Recommendation G.723, 7 pages.‡
Roddy et al., "Communication and Collaboration in a Landscape of B2B eMarketplaces", VerticalNet Solutions, White Paper, Jun. 15, 2000, 23 pages.‡
Jawaid et al., "Machine Translation with Significant Word Reordering and Rich Target-Side Morphology", WDS'11 Proceedings of Contributed Papers, Part I, 2011, pp. 161-166.‡
International Preliminary Report on Patentability received for PCT Patent Application No. PCT/US1994/011011, dated Feb. 28, 1996, 4 pages.‡
Dusan et al., "Multimodal Interaction on PDA's Integrating Speech and Pen Inputs", Eurospeech Geneva, 2003, 4 pages.‡
Roddy et al., "Interface Issues in Text Based Chat Rooms", SIGCHI Bulletin, vol. 30, No. 2, Apr. 1998, pp. 119-123.‡
Jaybird, "Everything Wrong with AIM: Because We've All Thought About It", available at <http://www.psychonoble.com/archives/articles/82.html%gt;, May 24, 2006, 3 pages.‡
dyslexic.com, "AlphaSmart 3000 with CoWriter SmartApplet: Don Johnston Special Needs", available at <http://www.dyslexic.com/procuts.php?catid- 2&pid=465&PHPSESSID=2511b800000f7da>, retrieved on Dec. 6, 2005, 13 pages.‡
Root, Robert, "Design of a Multi-Media Vehicle for Social Browsing", Bell Communications Research, 1988, pp. 25-38.‡
Jeffay et al., "Kernel Support for Live Digital Audio and Video", In Proc. of the Second Intl. Workshop on Network and Operating System Support for Digital Audio and Video, vol. 614, Nov. 1991, pp. 10-21.‡
Eagle et al., "Social Serendipity: Proximity Sensing and Cueing", MIT Media Laboratory Technical Note 580, May 2004, 18 pages.‡
Rose et al., "Inside Macintosh", vols. I, II, and III, Addison-Wesley Publishing Company, Inc., Jul. 1988, 1284 pages.‡
International Preliminary Report on Patentability received for PCT Patent Application No. PCT/US1995/008369, dated Oct. 9, 1996, 4 pages.‡
Edwards, John R., "Q&A: Integrated Software with Macros and an Intelligent Assistant", Byte Magazine, vol. 11, No. 1, Jan. 1986, pp. 120-122.‡
Jelinek et al., "Interpolated Estimation of Markov Source Parameters from Sparse Data", In Proceedings of the Workshop on Pattern Recognition in Practice,, May 1980, pp. 381-397.‡
Roseberry, Catherine, "How to Pair a Bluetooth Headset & Cell Phone", available at <http://mobileoffice.about.com/od/usingyourphone/ht/blueheadset_p.htm>, retrieved on Apr. 29, 2006, 2 pages.‡
International Preliminary Report on Patentability received for PCT Patent Application No. PCT/US2004/002873, dated Feb. 1, 2006, 5 pages.‡
Rosenberg et al., "An Overview of the Andrew Message System", Information Technology Center Carnegie-Mellon University, Jul. 1987, pp. 99-108.‡
Jelinek, F., "Self-Organized Language Modeling for Speech Recognition", Readings in Speech Recognition, Edited by Alex Waibel and Kai-Fu Lee, Morgan Kaufmann Publishers, Inc., ISBN: 155860-124-4, 1990, 63 pages.‡
Egido, Carmen, "Video Conferencing as a Technology to Support Group Work: A Review of its Failures", Bell Communications Research, 1988, pp. 13-24.‡
Rosenfeld, R., "A Maximum Entropy Approach to Adaptive Statistical Language Modelling", Computer Speech and Language, vol. 10, No. 3, Jul. 1996, 25 pages.‡
International Preliminary report on Patentability received for PCT Patent Application No. PCT/US2004/016519, dated Jan. 23, 2006, 12 pages.‡
Elio et al., "On Abstract Task Models and Conversation Policies", Proc. Workshop on Specifying and Implementing Conversation Policies, Autonomous Agents'99 Conference, 1999, pp. 1-10.‡
Jennings et al., "A Personal News Service Based on a User Model Neural Network", IEICE Transactions on Information and Systems, vol. E75-D, No. 2, Mar. 1992, 12 pages.‡
International Preliminary Report on Patentability received for PCT Patent Application No. PCT/US2005/030234, dat Mar. 20, 2007, 9 pages.‡
Elliot, Chip, "High-Quality Multimedia Conferencing Through a Long-Haul Packet Network", BBN Systems and Technologies, 1993, pp. 91-98.‡
Ji et al., "A Method for Chinese Syllables Recognition Based upon Sub-syllable Hidden Markov Model", 1994 International Symposium on Speech, Image Processing and Neural Networks, Hong Kong, Apr. 1994, 4 pages.‡
Rosner et al., "In Touch: A Graphical User Interface Development Tool", IEEE Colloquium on Software Tools for Interface Design, Nov. 8, 1990, pp. 12/1-12/7.‡
Elliott et al., "Annotation Suggestion and Search for Personal Multimedia Objects on the Web", CIVR, Jul. 7-9, 2008, pp. 75-84.‡
Rossfrank, "Konstenlose Sprachmitteilungins Festnetz", XP002234425, Dec. 10, 2000, pp. 1-4.‡
Jiang et al., "A Syllable-based Name Transliteration System", Proc. of the 2009 Named Entities Workshop, Aug. 7, 2009, pp. 96-99.‡
Elofson et al., "Delegation Technologies: Environmental Scanning with Intelligent Agents", Jour. of Management Info. Systems, Summer 1991, vol. 8, No. 1, 1991, pp. 37-62.‡
Roszkiewicz, A., "Extending your Apple", Back Talk-Lip Service, A+ Magazine, The Independent Guide for Apple Computing, vol. 2, No. 2, Feb. 1984, 5 pages.‡
Johnson, Jeff A., "A Comparison of User Interfaces for Panning on a Touch-Controlled Display", CHI '95 Proceedings, 1995, 8 pages.‡
Eluminx, "Illuminated Keyboard", available at <http://www.elumix.com/>, retrieved on Dec. 19, 2002, 1 page.‡
International Preliminary Report on Patentability received for PCT Patent Application No. PCT/US2008/000042, dated Jul. 7, 2009, 6 pages.‡
Engst, Adam C., "SoundJam Keeps on Jammi", available at <http://db.tidbits.com/getbits.acgi?tbart=05988>, Jun. 19, 2000, 3 pages.‡
Roucos et al., "A Segment Vocoder at 150 B/S", (Proceedings of the IEEE International Acoustics, Speech and Signal Processing Conference, Apr. 1983), as reprinted in Vector Quantization (IEEE Press, 1990), 1990, pp. 246-249.‡
Johnson, Julia Ann., "A Data Management Strategy for Transportable Natural Language Interfaces", Doctoral Thesis Submitted to the Department of Computer Science, University of British Columbia, Canada, Jun. 1989, 285 pages.‡
Jones, J., "Speech Recognition for Cyclone", Apple Computer, Inc., E.R.S. Revision 2.9, Sep. 10, 1992, 93 pages.‡

(56) References Cited

OTHER PUBLICATIONS

International Preliminary Report on Patentability received for PCT Patent Application No. PCT/US2008/000043, dated Jul. 7, 2009, 8 pages.‡

Jouvet et al., "Evaluating Grapheme-to-phoneme Converters in Automatic Speech Recognition Context", IEEE,, 2012,, pp. 4821-4824.‡

Epstein et al., "Natural Language Access to a Melanoma Data Base", SRI International, Sep. 1978, 7 pages.‡

Roucos et al., "High Quality Time-Scale Modification for Speech", Proceedings of the 1985 IEEE Conference on Acoustics, Speech and Signal Processing, 1985, pp. 493-496.‡

International Preliminary Report on Patentability received for PCT Patent Application No. PCT/US2008/000047, dated Jul. 7, 2009, 8 pages.‡

Ericsson et al., "Software Illustrating a Unified Approach to Multimodality and Multilinguality in the In-Home Domain", Talk and Look: Tools for Ambient Linguistic Knowledge, Dec. 2006, 127 pages‡

International Preliminary Report on Patentability received for PCT Patent Application No. PCT/US2009/051954, dated Mar. 24, 2011, 8 pages.‡

Ericsson Inc., "Cellular Phone with Integrated MP3 Player", Research Disclosure Journal No. 41815, Feb. 1999, 2 pages.‡

Bahl et al., "Large Vocabulary Natural Language Continuous Speech Recognition", Proceedings of 1989 International Conference on Acoustics, Speech and Signal Processing, vol. 1, May 1989, 6 pages.‡

Rubine, Dean Harris, "Combining Gestures and Direct Manipulation", CHI'92, May 3-7, 1992, pp. 659-660.‡

International Preliminary Report on Patentability received for PCT Patent Application No. PCT/US2009/055577, completed on Aug. 6, 2010, 12 pages.‡

Bahl et al., "Multonic Markov Word Models for Large Vocabulary Continuous Speech Recognition", IEEE Transactions on Speech and Audio Processing, vol. 1, No. 3, Jul. 1993, 11 pages.‡

Rubine, Dean Harris, "The Automatic Recognition of Gestures", CMU-CS-91-202, Thesis Submitted in Partial Fulfillment of the Requirements for the Degree of Doctor of Philosophy in Computer Science at Carnegie Mellon University, Dec. 1991, 285 pages.‡

Erol et al., "Multimedia Clip Generation From Documents for Browsing on Mobile Devices", IEEE Transactions on Multimedia, vol. 10, No. 5, Aug. 2008, 13 pages.‡

Eslambolchilar et al., "Making Sense of Fisheye Views", Second Dynamics and Interaction Workshop at University of Glasgow, Aug. 2005, 6 pages.‡

International Preliminary Report on Patentability received for PCT Patent Application No. PCT/US2010/037378, dated Dec. 6, 2011, 9 pages.‡

Bahl et al., "Recognition of a Continuously Read Natural Corpus", IEEE International Conference on Acoustics, Speech, and Signal Processing, vol. 3, Apr. 1978, pp. 422-424.‡

Eslambolchilar et al., "Multimodal Feedback for Tilt Controlled Speed Dependent Automatic Zooming", UIST'04, Oct. 24-27, 2004, 2 pages.‡

Bahl et al., "Speech Recognition with Continuous-Parameter Hidden Markov Models", Proceeding of International Conference on Acoustics, Speech and Signal Processing (ICASSP'88), vol. 1, Apr. 1988, 8 pages.‡

International Preliminary Report on Patentability received for PCT Patent Application No. PCT/US2011/020350, dated Jul. 17, 2012, 12 pages.‡

European Search Report received for European Patent Application No. 01201774.5, dated Sep. 14, 2001, 3 pages.‡

Bajarin, Tim, "With Low End Launched, Apple Turns to Portable Future", PC Week, vol. 7, Oct. 1990, p. 153(1).‡

European Search Report received for European Patent Application No. 99107544.1, dated Jul. 8, 1999, 4 pages.‡

International Preliminary Report on Patentability received for PCT Patent Application No. PCT/US2011/020825, dated Jan. 13, 2012, 17 pages.‡

Ruch et al., "Using Lexical Disambiguation and Named-Entity Recognition to Improve Spelling Correction in the Electronic Patient Record", Artificial Intelligence in Medicine, Sep. 2003, pp. 169-184.‡

International Preliminary Report on Patentability received for PCT Patent Application No. PCT/US2011/020861, dated Aug. 2, 2012, 11 pages.‡

Banbrook, M., "Nonlinear Analysis of Speech from a Synthesis Perspective", A Thesis Submitted for the Degree of Doctor of Philosophy, The University of Edinburgh, Oct. 15, 1996, 35 pages.‡

European Search Report received for European Patent Application No. 99107545.8, dated Jul. 1, 1999, 3 pages.‡

International Preliminary Report on Patentability received for PCT Paten Application No. PCT/US2011/037014, dated Dec. 13, 2012, 10 pages.‡

Evermann et al., "Posterior Probability Decoding, Confidence Estimation and System Combination", Proceedings Speech Transcription Workshop, 2000, 4 pages.‡

2004 Chrysler Pacifica: U-Connect Hands-Free Communication System, The Best and Brightest of 2004, Brief Article, Automotive Industries, Sep. 2003, 1 page.‡

Barrett et al., "How to Personalize the Web", 1997 In proceddings of the ACM SIGCHI Conference on Human Factors in Computer Systems, Mar. 22-27, 1997, pp. 75-82.‡

International Preliminary Report on Patentability received for PCT Patent Application No. PCT/US2012/029810, dated Oct. 3, 2013, 9 pages.‡

Evi, "Meet Evi: The One Mobile Application that Provides Solutions for your Everyday Problems", Feb. 2012, 3 pages.‡

2007 Lexus GS 450h 4dr Sedan (3.5L 6cyl Gas/Electric Hybrid CVT), available at <http://review.cnet.com/4505-10865_16-31833144.html>, retrieved on Aug. 3, 2006, 10 pages.‡

Barthel, B., "Information Access for Visually Impaired Persons: Do We Still Keep a "Document" in "Documentation"?", Professional Communication Conference, Sep. 1995, pp. 62-66.‡

International Preliminary Report on Patentability received for PCT Patent Application No. PCT/US2012/034028, dated Oct. 31, 2013, 7 pages.‡

International Preliminary Report on Patentability received for PCT Patent Application No. PCT/US2012/040571, dated Dec. 19, 2013, 10 pages.‡

Baudel et al., "2 Techniques for Improved HC Interaction: Toolglass Magic Lenses: The See-Through Interface", Apple Inc., Video Clip, CHI'94 Video Program on a CD, 1994.‡

Abcom Pty. Ltd. "12.1" 925 Candela Mobile PC, LCDHardware.com, available at <http://www.lcdhardware.com/panel/12_1_panel/default.asp.>, retrieved on Dec. 19, 2002, 2 pages.‡

Exhibit 1, "Natural Language Interface Using Constrained Intermediate Dictionary of Results", List of Publications Manually Reviewed for the Search of U.S. Pat. No. 7,177,798, Mar. 22, 2013, 1 page.‡

Bear et al., "A System for Labeling Self-Repairs in Speech", SRI International, Feb. 22, 1993, 9 pages.‡

International Preliminary Report on Patentability received for PCT Patent Application No. PCT/US2012/040801, dated Dec. 19, 2013, 16 pages.‡

Extended European Search Report (includes European Search Report and European Search Opinion) received for European Patent Application No. 06256215.2, dated Feb. 20, 2007, 6 pages.‡

Bear et al., "Detection and Correction of Repairs in Human-Computer Dialog", SRI International, May 1992, 11 pages.‡

International Preliminary Report on Patentability received for PCT Patent Application No. PCT/US2012/040931, dated Dec. 18, 2014, 9 pages.‡

Bear et al., "Integrating Multiple Knowledge Sources for Detection and Correction of Repairs in Human-Computer Dialog", Proceedings of the 30th Annual Meeting on Association for Computational Linguistics (ACL), 1992, 8 pages.‡

Extended European Search Report (includes European Search Report and European Search Opinion) received for European Patent Application No. 12186113.2, dated Apr. 28, 2014, 14 pages.‡

(56) References Cited

OTHER PUBLICATIONS

Bear et al., "Using Information Extraction to Improve Document Retrieval", SRI International, Menlo Park, California, 1998, 11 pages.‡
Extended European Search Report (includes Partial European Search Report and European Search Opinion) received for European Patent Application No. 13169672.6, dated Aug. 14, 2013, 11 pages.‡
Beck et al., "Integrating Natural Language, Query Processing, and Semantic Data Models", COMCON Spring '90. IEEE Computer Society International Conference, 1990, Feb. 26-Mar. 2, 1990, pp. 538-543.‡
Extended European Search Report (includes Partial European Search Report and European Search Opinion) received for European Patent Application No. 1516349.6, dated Jul. 28, 2015, 8 pages.‡
Extended European Search Report (includes Partial European Search Report and European Search Opinion) received for European Patent Application No. 15196748.6, dated Apr. 4, 2016.‡
Extended European Search Report (includes Partial European Search Report and European Search Opinion) received for European Patent Application No. 16150079.8, dated Feb. 18, 2016.‡
Extended European Search Report (includes Supplementary European Search Report and Search Opinion) received for European Patent Application No. 07863218.9, dated Dec. 9, 2010, 7 pages.‡
Extended European Search Report (includes Supplementary European Search Report and Search Opinion) received for European Patent Application No. 12727027.0, dated Sep. 26, 2014, 7 pages.‡
Extended European Search Report (inclusive of the Partial European Search Report and European Search Opinion) received for European Patent Application No. 12729332.2, dated Oct. 31, 2014, 6 pages.‡
Bederson et al., "Pad++: A Zooming Graphical Interface for Exploring Alternate Interface Physics", UIST' 94 Proceedings of the 7th Annual ACM symposium on User Interface Software and Technology, Nov. 1994, pp. 17-26.‡
Extended European Search Report and Search Opinion received for European Patent Application No. 12185276.8, dated Dec. 18, 2012, 4 pages.‡
Bederson et al., "The Craft of Information Visualization", Elsevier Science, Inc., 2003, 435 pages.‡
Extended European Search Report received for European Patent Application No. 11159884.3, dated May 20, 2011, 8 pages.‡
Belaid et al., "A Syntactic Approach for Handwritten Mathematical Formula Recognition", IEEE Transactions on Pattern Analysis and Machine Intelligence, vol. PAMI-6, No. 1, Jan. 1984, 7 pages.‡
Bellegarda et al., "A Latent Semantic Analysis Framework for Large-Span Language Modeling", 5th European Conference on Speech, Communication and Technology (EUROSPEECH'97), Sep. 1997, 4 pages.‡
Extended European Search Report received for European Patent Application No. 12186663.6, dated Jul. 16, 2013, 6 pages.‡
Bellegarda et al., "A Multispan Language Modeling Framework for Large Vocabulary Speech Recognition", IEEE Transactions on Speech and Audio Processing, vol. 6, No. 5, Sep. 1998, 12 pages.‡
Extended European Search Report received for European Patent Application No. 13726938.7, dated Dec. 14, 2015, 8 pages.‡
Bellegarda et al., "A Novel Word Clustering Algorithm Based on Latent Semantic Analysis", Proceedings of the IEEE International Conference on Acoustics, Speech and Signal Processing (ICASSP'96), vol. 1, 1996, 4 pages.‡
Extended European Search Report received for European Patent Application No. 13770552.1, dated Jan. 7, 2016, 5 pages.‡
International Preliminary Report on Patentability received for PCT Patent Application No. PCT/US2012/043098, dated Jan. 9, 2014, 8 pages.‡
Extended European Search Report received for European Patent Application No. 14737370.8, dated May 19, 2016, 12 pages.‡
Bellegarda et al., "Experiments Using Data Augmentation for Speaker Adaptation", International Conference on Acoustics, Speech and Signal Processing (ICASSP'95), May 1995, 4 pages.‡
International Preliminary Report on Patentability received for PCT Patent Application No. PCT/US2012/043100, dated Jan. 9, 2014, 7 pages.‡
Bellegarda et al., "On-Line Handwriting Recognition using Statistical Mixtures", Advances in Handwriting and Drawings: A Multidisciplinary Approach, Europia, 6th International IGS Conference on Handwriting and Drawing, Paris, France, Jul. 1993, 11 pages.‡
International Preliminary Report on Patentability received for PCT Patent Application No. PCT/US2012/056382, dated Apr. 10, 2014, 9 pages.‡
Bellegarda et al.,"Performance of the IBM Large Vocabulary Continuous Speech Recognition System on the ARPA Wall Street Journal Task", Signal Processing VII: Theories and Applications, European Association for Signal Processing, 1994, 4 pages.‡
International Preliminary Report on Patentability received for PCT Patent Application No. PCT/US2013/028412, dated Sep. 12, 2014, 12 pages.‡
Bellegarda et al., "The Metamorphic Algorithm: A Speaker Mapping Approach to Data Augmentation", IEEE Transactions on Speech and Audio Processing, vol. 2, No. 3, Jul. 1994, 8 pages.‡
International Preliminary Report on Patentability received for PCT Patent Application No. PCT/US2013/028920, dated Sep. 18, 2014, 11 pages.‡
Bellegarda et al., "Tied Mixture Continuous Parameter Modeling for Speech Recognition", IEEE Transactions on Acoustics, Speech and Signal Processing, vol. 38, No. 12, Dec. 1990, pp. 2033-2045.‡
Fanty et al., "A Comparison of DFT, PLP and Cochleagram for Alphabet Recognition", IEEE, Nov. 1991.‡
International Preliminary Report on Patentability received for PCT Patent Application No. PCT/US2013/029156, dated Sep. 9, 2014, 7 pages.‡
Bellegarda, Jerome R. "Latent Semantic Mapping", IEEE Signal Processing Magazine, vol. 22, No. 5, Sep. 2005, pp. 70-80.‡
International Preliminary Report on Patentability received for PCT Patent Application No. PCT/US2013/041225, dated Nov. 27, 2014, 9 pages.‡
Bellegarda, Jerome R., "Exploiting both Local and Global Constraints for Multi-Span Statistical Language Modeling", Proceeding of the 1998 IEEE International Conference on Acoustics, Speech and Signal Processing (1CASSP'98), vol. 2, May 1998, 5 pages.‡
ABF Software, "Lens—Magnifying Glass 1.5", available at <http://download.com/3000-2437-10262078.html?tag=1st-0-1>, retrieved on Feb. 11, 2004, 1 page.‡
Bellegarda, Jerome R., "Exploiting Latent Semantic Information in Statistical Language Modeling", Proceedings of the IEEE, vol. 88, No. 8, Aug. 2000, 18 pages.‡
International Preliminary Report on Patentability received for PCT Patent Application No. PCT/US2013/041233, dated Nov. 18, 2014, 8 pages.‡
Abut et al., "Low-Rate Speech Encoding Using Vector Quantization and Subband Coding", (Proceedings of the IEEE International Acoustics, Speech and Signal Processing Conference, Apr. 1986), as reprinted in Vector Quantization IEEE Press, 1990, pp. 312-315.‡
Bellegarda, Jerome R., "Interaction-Driven Speech Input—A Data-Driven Approach to the Capture of both Local and Global Language Constraints", available at <http://old.sig.chi.ora/bulletin/1998.2/bellegarda.html>, 1992, 7 pages.‡
International Preliminary Report on Patentability received for PCT Patent Application No. PCT/US2013/044574, dated Dec. 9, 2014, 8 pages.‡
Abut et al., "Vector Quantization of Speech and Speech-Like Waveforms", (IEEE Transactions on Acoustics, Speech, and Signal Processing, Jun. 1982), as reprinted in Vector Quantization (IEEE Press, 1990), 1990, pp. 258-270.‡
Bellegarda, Jerome R., "Large Vocabulary Speech Recognition with Multispan Statistical Language Models", IEEE Transactions on Speech and Audio Processing, vol. 8, No. 1, Jan. 2000, 9 pages.‡
International Preliminary Report on Patentability received for PCT Patent Application No. PCT/US2013/044834, dated Dec. 9, 2014, 9 pages.‡
Acero et al., "Environmental Robustness in Automatic Speech Recognition", International Conference on Acoustics, Speech and Signal Processing (ICASSP'90), Apr. 1990, 4 pages.‡

(56) References Cited

OTHER PUBLICATIONS

Belvin et al., "Development of the HRL Route Navigation Dialogue System", Proceedings of the First International Conference on Human Language Technology Research, Paper, 2001, 5 pages.‡
International Preliminary Report on Patentability received for PCT Patent Application No. PCT/US2013/047659, dated Dec. 31, 2014, 15 pages.‡
Benel et al., "Optimal Size and Spacing of Touchscreen Input Areas", Human-Computer Interaction—Interact, 1987, pp. 581-585.‡
Acero et al., "Robust Speech Recognition by Normalization of the Acoustic Space", International Conference on Acoustics, Speech and Signal Processing, 1991, 4 pages.‡
International Preliminary Report on Patentability received for PCT Patent Application No. PCT/US2013/047668, dated Jan. 8, 2015, 13 pages.‡
Bergmann et al., "An adaptable man-machine interface using connected-word recognition", 2nd European Conference on Speech Communication and Technology (Eurospeech 91), vol. 2, XP002176387, Sep. 24-26, 1991, pp. 467-470.‡
International Preliminary Report on Patentability received for PCT Patent Application No. PCT/US2013/052558, dated Feb. 12, 2015, 12 pages.‡
Beringer et al., "Operator Behavioral Biases Using High-Resolution Touch Input Devices", Proceedings of the Human Factors and Ergonomics Society 33rd Annual Meeting, 1989, 3 pages.‡
Adium, "AboutAdium—Adium X—Trac", available at <http://web.archive.org/web/20070819113247/http://trac.adiumx.com/wiki/A boutAdium>, retrieved on Nov. 25, 2011, 2 pages.‡
International Preliminary Report on Patentability received for PCT Patent Application No. PCT/US2013/058916, dated Mar. 19, 2015, 8 pages.‡
Beringer, Dennis B., "Target Size, Location, Sampling Point and Instruction Set: More Effects on Touch Panel Operation", Proceedings of the Human Factors and Ergonomics Society 34th Annual Meeting, 1990, 5 pages.‡
International Preliminary Report on Patentability received for PCT Patent Application No. PCT/US2013/060121, dated Apr. 2, 2015, 6 pages.‡
Bernabei et al., "Graphical I/O Devices for Medical Users", 14th Annual International Conference of the IEEE on Engineering in Medicine and Biology Society, vol. 3, 1992, pp. 834-836.‡
adobe.com, "Reading PDF Documents with Adobe Reader 6.0—A Guide for People with Disabilities", Available online at "https://www.adobe.com/enterprise/accessibility/pdfs/acro6_cgue.pdf", Jan. 2004, 76 pages.‡
International Preliminary Report on Patentability received for PCT Patent Application No. PCT/US2014/015418, dated Aug. 20, 2015, 12 pages.‡
Bernstein, Macrophone, "Speech Corpus", IEEE/ICASSP, Apr. 22, 1994, pp. 1-81 to 1-84.‡
Agnas et al., "Spoken Language Translator: First-Year Report", SICS (ISSN 0283-3638), SRI and Telia Research AB, Jan. 1994, 161 pages.‡
International Preliminary Report on Patentability received for PCT Patent Application No. PCT/US2014/016988, dated Sep. 3, 2015, 8 pages.‡
Ahlberg et al., "The Alphaslider: A Compact and Rapid Selector", CHI '94 Proceedings of the SIGCHI Conference on Human Factors in Computing Systems, Apr. 1994, pp. 365-371.‡
Berry et al., "PTIME: Personalized Assistance for Calendaring", ACM Transactions on Intelligent Systems and Technology, vol. 2, No. 4, Article 40, Jul. 2011, pp. 1-22.‡
International Preliminary Report on Patentability received for PCT Patent Application No. PCT/US2014/023822, dated Sep. 24, 2015, 12 pages.‡
Ahlberg et al., "Visual Information Seeking: Tight Coupling of Dynamic Query Filters with Starfield Displays", Proceedings of the SIGCHI Conference on Human Factors in Computing Systems, Apr. 24-28, 1994, pp. 313-317.‡
Berry et al., "Symantec", New version of MORE.TM, Apr. 10, 1990, 1 page.‡
International Preliminary Report on Patentability received for PCT Patent Application No. PCT/US2014/023826, dated Sep. 24, 2015, 9 pages.‡
Ahlbom et al., Modeling Spectral Speech Transitions Using Temporal Decomposition Techniques, IEEE International Conference of Acoustics, Speech and Signal Processing (ICASSP'87), vol. 12, Apr. 1987, 4 pages.‡
Berry et al., "Task Management under Change and Uncertainty Constraint Solving Experience with the CALO Project", Proceedings of CP'05 Workshop on Constraint Solving under Change, 2005, 5 pages.‡
International Preliminary Report on Patentability received for PCT Patent Application No. PCT/US2014/026871, dated Sep. 24, 2015, 7 pages.‡
Bertulucci, Jeff, "Google Adds Voice Search to Chrome Browser", PC World, Jun. 14, 2011.‡
Ahlstrom et al., "Overcoming Touchscreen User Fatigue by Workplace Design", CHI '92 Posters and Short Talks of the 1992 SIGCHI Conference on Human Factors in Computing Systems, 1992, pp. 101-102.‡
International Preliminary Report on Patentability received for PCT Patent Application No. PCT/US2014/026873, dated Sep. 24, 2015, 9 pages.‡
Best Buy, "When it Comes to Selecting a Projection TV, Toshiba Makes Everything Perfectly Clear", Previews of New Releases, available at <http://www.bestbuy.com/HomeAudioVideo/Specials/ToshibaTVFeatures.asp> retrieved on Jan. 23, 2003, 5 pages.‡
International Preliminary Report on Patentability received for PCT Patent Application No. PCT/US2014/028785, dated Sep. 24, 2015, 15 pages.‡
Ahmed et al., "Intelligent Natural Language Query Processor", TENCON '89, Fourth IEEE Region 10 International Conference, Nov. 22-24, 1989, pp. 47-49.‡
Betts et al., "Goals and Objectives for User Interface Software", Computer Graphics, vol. 21, No. 2, Apr. 1987, pp. 73-78.‡
International Preliminary Report on Patentability received for PCT Patent Application No. PCT/US2014/028950, dated Sep. 24, 2015, 8 pages.‡
Biemann et al., "Disentangling from Babylonian Confusion—Unsupervised Language Identification", CICLing'05 Proceedings of the 6th international conference on Computational Linguistics and Intelligent Text Processing, vol. 3406, Feb. 2005, pp. 773-784.‡
Ahuja et al., "A Comparison of Application Sharing Mechanisms in Real-Time Desktop Conferencing Systems", At&T Bell Laboratories, 1990, pp. 238-248.‡
International Preliminary Report on Patentability received for PCT Patent Application No. PCT/US2014/029050, dated Sep. 24, 2015, 7 pages.‡
Biemann, Chris, "Unsupervised Part-of-Speech Tagging Employing Efficient Graph Clustering", Proceeding COLING ACL '06 Proceedings of the 21st International Conference on computational Linguistics and 44th Annual Meeting of the Association for Computational Linguistics: Student Research Workshop, 2006, pp. 7-12.‡
Aikawa et al., "Generation for Multilingual MT", available at http://mtarchive.info/MTS-2001-Aikawa.pdf>, retrieved on Sep. 18, 2001, 6 pages.‡
International Preliminary Report on Patentability received for PCT Patent Application No. PCT/US2014/029562, dated Sep. 24, 2015, 16 pages.‡
Aikawa et al., "Speech Recognition Using Time-Warping Neural Networks", Proceedings of the 1991, IEEE Workshop on Neural Networks for Signal Processing, 1991, 10 pages.‡
Bier et al., "Toolglass and Magic Lenses: The See-Through Interface", Computer Graphics (SIGGRAPH '93 Proceedings), vol. 27, 1993, pp. 73-80.‡
International Preliminary Report on Patentability received for PCT Patent Application No. PCT/US2014/040393, dated Dec. 8, 2015, 15 pages.‡
Aikawa, K. "Time-Warping Neural Network for Phoneme Recognition", IEEE International Joint Conference on Neural Networks, vol. 3, Nov. 18-21, 1991, pp. 2122-2127.‡

(56) References Cited

OTHER PUBLICATIONS

Birrell, Andrew, "Personal Jukebox (PJB)", available at <http://birrell.org/andrew/talks/pjb-overview.ppt>, Oct. 13, 2000, 6 pages.‡

International Preliminary Report on Patentability received for PCT Patent Application No. PCT/US2014/040394, dated Dec. 23, 2015, 7 pages.‡

Alfred App, "Alfred", available at <http://www.alfredapp.com/>, retrieved on Feb. 8, 2012, 5 pages.‡

Black et al., "Automatically Clustering Similar Units for Unit Selection in Speech Synthesis", Proceedings of Eurospeech, vol. 2, 1997, 4 pages.‡

Black et al., "Multilingual Text-to-Speech Synthesis", Acoustics, Speech and Signal Processing (ICASSP'04), Proceedings of the IEEE International Conference, vol. 3, May 17-21, 2004, pp. 761-764.‡

International Preliminary Report on Patentability received for PCT Patent Application No. PCT/US2014/040397, dated Dec. 17, 2015, 8 pages.‡

All Music Website, available at <http://www.allmusic.com/>, retrieved on Mar. 19, 2007, 2 pages.‡

Blair et al., "An Evaluation of Retrieval Effectiveness for a Full-Text Document—Retrieval System", Communications of the ACM, vol. 28, No. 3, Mar. 1985, 11 pages.‡

International Preliminary Report on Patentability received for PCT Patent Application No. PCT/US2014/040401, dated Dec. 8, 2015, 6 pages.‡

Allen et al., "Automated Natural Spoken Dialog", Computer, vol. 35, No. 4, Apr. 2002, pp. 51-56.‡

Bleher et al., "A Graphic Interactive Application Monitor", IBM Systems Journal, vol. 19, No. 3, Sep. 1980, pp. 382-402.‡

International Preliminary Report on Patentability received for PCT Patent Application No. PCT/US2014/040403 dated Dec. 23, 2015, 7 pages.‡

Allen, J., "Natural Language Understanding", 2nd Edition, The Benjamin/Cummings Publishing Company, Inc., 1995, 671 pages.‡

BluePhoneElite: About, available at <http://www.reelintelligence.com/BluePhoneElite>, retrieved on Sep. 25, 2006, 2 pages.‡

International Preliminary Report on Patentability received for PCT Patent Application No. PCT/US2014/040961, dated Dec. 17, 2015, 20 pages.‡

BluePhoneElite: Features, available at <http://www.reelintelligence.com/BluePhoneElite/features.shtml,>, retrieved on Sep. 25, 2006, 2 pages.‡

Alleva et al., "Applying SPHINX-II to DARPA Wall Street Journal CSR Task", Proceedings of Speech and Natural Language Workshop, Feb. 1992, pp. 393-398.‡

International Preliminary Report on Patentability received for PCT Patent Application No. PCT/US2014/041159, dated Dec. 17, 2015, 8 pages.‡

Alshawi et al., "CLARE: A Contextual Reasoning and Co-operative Response Framework for the Core Language Engine", SRI International, Cambridge Computer Science Research Centre, Cambridge, Dec. 1992, 273 pages.‡

Bluetooth PC Headsets, "'Connecting' Your Bluetooth Headset with Your Computer", Enjoy Wireless VoIP Conversations, available at <http://www.bluetoothpcheadsets.com/connect.htm>, retrieved on Apr. 29, 2006, 4 pages.‡

International Preliminary Report on Patentability received for PCT Patent Application No. PCT/US2014/041173, dated Dec. 17, 2015, 9 pages.‡

Alshawi et al., "Declarative Derivation of Database Queries from Meaning Representations", Proceedings of the BANKAI Workshop on Intelligent Information Access, Oct. 1991, 12 pages.‡

Bobrow et al., "Knowledge Representation for Syntactic/Semantic Processing", From: AAA-80 Proceedings, Copyright 1980, AAAI, 1980, 8 pages.‡

International Preliminary Report on Patentability received for PCT Patent Application No. PCT/US2014/049568, dated Feb. 18, 2016, 10 pages.‡

Bocchieri et al., "Use of Geographical Meta-Data in ASR Language and Acoustic Models", IEEE International Conference on Acoustics Speech and Signal Processing, 2010, pp. 5118-5121.‡

Alshawi et al., "Logical Forms in the Core Language Engine", Proceedings of the 27th Annual Meeting of the Association for Computational Linguistics, 1989, pp. 25-32.‡

International Search Report & Written Opinion received for PCT Patent Application No. PCT/US2016/021410, dated Jul. 26, 2016, 19 pages.‡

Alshawi et al., "Overview of the Core Language Engine", Proceedings of Future Generation Computing Systems,Tokyo, Sep. 1988, 13 pages.‡

Bociurkiw, Michael, "Product Guide: Vanessa Matz", available at <http://www.forbes.com/asap/2000/1127/vmartzprint.html>, retrieved on Jan. 23, 2003, 2 pages.‡

International Search Report and Written Opinion received for PCT Patent Application No. PCT/US1994/011011, dated Feb. 8, 1995, 3 pages (International Search Report only).‡

Borden IV, G.R., "An Aural User Interface for Ubiquitous Computing", Proceedings of the 6th International Symposium on Wearable Computers, IEEE, 2002, 2 pages.‡

Alshawi, H., "Translation and Monotonic Interpretation/Generation", SRI International, Cambridge Computer Science Research Centre, Cambridge, available at <http://www.cam.sri.com/tr/crc024/paper.ps.Z1992>, Jul. 1992, 18 pages.‡

Borenstein, Nathaniel S., "Cooperative Work in the Andrew Message System", Information Technology Center and Computer Science Department, Carnegie Mellon University; Thyberg, Chris A. Academic Computing, Carnegie Mellon University, 1988, pp. 306-323.‡

Amano et al., "A User-friendly Multimedia Book Authoring System", The Institute of Electronics, Information and Communication Engineers Technical Report, vol. 103, No. 416, Nov. 2003, pp. 33-40.‡

International Search Report and Written Opinion received for PCT Patent Application No. PCT/US2004/002873, dated Oct. 13, 2005, 7 pages.‡

Bouchou et al., "Using Transducers in Natural Language Database Query", Proceedings of 4th International Conference on Applications of Natural Language to Information Systems, Austria, Jun. 1999, 17 pages.‡

Amano, Junko, "A User-Friendly Authoring System for Digital Talking Books", IEICE Technical Report, The Institute of Electronics, Information and Communication Engineers, vol. 103, No. 418, Nov. 6, 200, pp. 33-40.‡

International Search Report and Written Opinion received for PCT Patent Application No. PCT/US2004/016519, dated Nov. 3, 2005, 6 pages.‡

Boy, Guy A., "Intelligent Assistant Systems", Harcourt Brace Jovanovicy, 1991, 1 page.‡

Ambite et al., "Design and Implementation of the CALO Query Manager", American Association for Artificial Intelligence, 2006, 8 pages.‡

International Search Report and Written Opinion received for PCT Patent Application No. PCT/US2005/030234, dated Mar. 17, 2006, 11 pages.‡

Boyer et al., "A Fast String Searching Algorithm", Communications of the ACM, vol. 20, 1977, pp. 762-772.‡

Ambite et al., "Integration of Heterogeneous Knowledge Sources in the CALO Query Manager", The 4th International Conference on Ontologies, Databases and Applications of Semantics (ODBASE), 2005, 18 pages.‡

International Search Report and Written Opinion received for PCT Patent Application No. PCT/US2005/038819, dated Apr. 5, 2006, 12 pages.‡

Amrel Corporation, "Rocky Matrix BackLit Keyboard", available at <http://www.amrel.com/asi_matrixkeyboard.html>, retrieved on Dec. 19, 2002, 1 page.‡

Brain, Marshall, "How MP3 Files Work", available at <http://www.howstuffworks.com>, retrieved on Mar. 19, 2007, 4 pages.‡

International Search Report and Written Opinion received for PCT Patent Application No. PCT/US2006/048669, dated Jul. 2, 2007, 12 pages.‡

(56) References Cited

OTHER PUBLICATIONS

Anastasakos et al., "Duration Modeling in Large Vocabulary Speech Recognition", International Conference on Acoustics, Speech and Signal Processing (ICASSP'95), May 1995, pp. 628-631.‡

Bratt et al., "The SRI Telephone-Based ATIS System", Proceedings of ARPA Workshop on Spoken Language Technology, 1995, 3 pages.‡

International Search Report and Written Opinion received for PCT Patent Application No. PCT/US2006/048670, dated May 21, 2007, 11 pages.‡

Briner, L. L., "Identifying Keywords in Text Data Processing", In Zelkowitz, Marvin V., Ed, Directions and Challenges, 15th Annual Technical Symposium, Gaithersbury, Maryland, Jun. 17, 1976, 7 pages.‡

Anderson et al., "Syntax-Directed Recognition of Hand-Printed Two-Dimensional Mathematics", Proceedings of Symposium on Interactive Systems for Experimental Applied Mathematics: Proceedings of the Association for Computing Machinery Inc. Symposium, 1967, 12 pages.‡

International Search Report and Written Opinion received for PCT Patent Application No. PCT/US2006/048753, dated Jun. 19, 2007, 15 pages.‡

Brown et al., "Browing Graphs Using a Fisheye View", Apple Inc., Video Clip, Systems Research Center, CHI '92 Continued Proceedings on a CD, 1992.‡

Anhui USTC IFL YTEK Co. Ltd., "Flytek Research Center Information Datasheet", available at <http://www.iflttek.com/english/Research.htm>, retrieved on Oct. 15, 2004, 3 pages.‡

Brown et al., "Browsing Graphs Using a Fisheye View", CHI '93 Proceedings of the Interact '93 and Chi '93 Conference on Human Factors in Computing Systems, 1993, p. 516.‡

Ansari et al., "Pitch Modification of Speech using a Low-Sensitivity Inverse Filter Approach", IEEE Signal Processing Letters, vol. 5, No. 3, Mar. 1998, pp. 60-62.‡

Bulyko et al., "Error-Correction Detection and Response Generation in a Spoken Dialogue System", Speech Communication, vol. 45, 2005, pp. 271-288.‡

Anthony et al., "Supervised Adaption for Signature Verification System", IBM Technical Disclosure, Jun. 1, 1978, 3 pages.‡

Bulyko et al., "Joint Prosody Prediction and Unit Selection for Concatenative Speech Synthesis", Electrical Engineering Department, University of Washington, Seattle, 2001, 4 pages.‡

API.AI, "Android App Review—Speaktoit Assistant", Available at <https://www.youtube.com/watch?v=myE498nyfGw>, Mar. 30, 2011, 3 pages.‡

Burger, D., "Improved Access to Computers for the Visually Handicapped: New Prospects and Principles", IEEE Transactions on Rehabilitation Engineering, vol. 2, No. 3, Sep. 1994, pp. 111-118.‡

Appelt et al., "Fastus: A Finite-State Processor for Information Extraction from Real-world Text", Proceedings of IJCAI, 1993, 8 pages.‡

Burke et al., "Question Answering from Frequently Asked Question Files", AI Magazine, vol. 18, No. 2, 1997, 10 pages.‡

Appelt et al., "SRI International Fastus System MUC-6 Test Results and Analysis", SRI International, Menlo Park, California, 1995, 12 pages.‡

Burns et al., "Development of a Web-Based Intelligent Agent for the Fashion Selection and Purchasing Process via Electronic Commerce", Proceedings of the Americas Conference on Information System (AMCIS), Dec. 31, 1998, 4 pages.‡

Appelt et al., "SRI: Description of the JV-FASTUS System used for MUC-5", SRI International, Artificial Intelligence Center, 1993, 19 pages.‡

Busemann et al., "Natural Language Diaglogue Service for Appointment Scheduling Agents", Technical Report RR-97-02, Deutsches Forschungszentrum fur Kunstliche Intelligenz GmbH, 1997, 8 pages.‡

Apple Computer, "Guide Maker User's Guide", Apple Computer, Inc., Apr. 27, 1994, 8 pages.‡

Apple Computer, "Introduction to Apple Guide", Apple Computer, Inc., Apr. 28, 1994, 20 pages.‡

Apple Computer, "Knowledge Navigator", published by Apple Computer no later than 2008, as depicted in Exemplary Screenshots from video entitled 'Knowledge Navigator', 2008, 7 pages.‡

Apple Computer, Inc., "Apple—iPod—Technical Specifications, iPod 20GB and 60GB Mac + PC", available at <http://www.apple.com/ipod/color/specs.html>, 2005, 3 pages.‡

Apple Computer, Inc., "Apple Announces iTunes 2", Press Release, Oct. 23, 2001, 2 pages.‡

Apple Computer, Inc., "Apple Introduces iTunes—World's Best and Easiest to Use Jukebox Software", Macworld Expo, Jan. 9, 2001, 2 pages.‡

Apple Computer, Inc., "Apple's iPod Available in Stores Tomorrow", Press Release, Nov. 9, 2001, 1 page.‡

Apple Computer, Inc., "Inside Macintosh", vol. VI, 1985.‡

Apple Computer, Inc., "iTunes 2, Playlist Related Help Screens", iTunes v2.0, 2000-2001, 8 pages.‡

Apple Computer, Inc., "iTunes 2: Specification Sheet", 2001, 2 pages.‡

Apple Computer, Inc., "iTunes, Playlist Related Help Screens", iTunes v1.0, 2000-2001, 8 pages.‡

Apple Computer, Inc., "QuickTime Movie Playback Programming Guide", Aug. 11, 2005, pp. 1-58.‡

Apple Computer, Inc., "QuickTime Overview", Aug. 11, 2005, pp. 1-34.‡

Apple Computer, Inc., "Welcome to Tiger", available at <http://www.maths.dundee.ac.uk/software/Welcome_to_Mac_OS_X_v10.4_Ti ger.pdf>, 2005, pp. 1-32.‡

Apple, "iPhone User's Guide", Available at <http://mesnotices.20minutes.fr/manuel-notice-mode- emploi/APPLE/IPHONE%2D%5FE#>, Retrieved on Mar. 27, 2008, Jun. 2007, 137 pages.‡

Apple, "VoiceOver", available at <http://www.apple.com/accessibility/voiceover/>, Feb. 2009, 5 pages.‡

Applebaum et al., "Enhancing the Discrimination of Speaker Independent Hidden Markov Models with Corrective Training", International Conference on Acoustics, Speech, and Signal Processing, May 23, 1989, pp. 302-305.‡

AppleEvent Manager, which is described in the publication Inside Macintosh vol. VI, available from Addison-Wesley Publishing Company, 1985.‡

Arango et al., "Touring Machine: A Software Platform for Distributed Multimedia Applications", 1992 IFIP International Conference on Upper Layer Protocols, Architectures, and Applications, May 1992, pp. 1-11.‡

Archbold et al., "A Team User's Guide", SRI International, Dec. 21, 1981, 70 pages.‡

Arons, Barry M., "The Audio-Graphical Interface to a Personal Integrated Telecommunications System", Thesis Submitted to the Department of Architecture at the Massachusetts Institute of Technology, Jun. 1984, 88 pages.‡

Asanovic et al.,"Experimental Determination of Precision Requirements for Back-Propagation Training of Artificial Neural Networks", Proceedings of the 2nd International Conference of Microelectronics for Neural Networks, 1991, www.ICSI.Berkelev.EDU, 1991, 7 pages.‡

Atal et al., "Efficient Coding of LPC Parameters by Temporal Decomposition", IEEE International Conference on Acoustics, Speech and Signal Processing (ICASSP'83), Apr. 1983, 4 pages.‡

Badino et al., "Language Independent Phoneme Mapping for Foreign TTS", 5th ISCA Speech Synthesis Workshop, Pittsburgh, PA, Jun. 14-16, 2004, 2 pages.‡

Baechtle et al., "Adjustable Audio Indicator", IBM Technical Disclosure Bulletin, Jul. 1, 1984, 2 pages.‡

Baeza-Yates, Ricardo, "Visualization of Large Answers in Text Databases", AVI '96 Proceedings of the Workshop on Advanced Visual Interfaces, 1996, pp. 101-107.‡

Bahl et al., "A Maximum Likelihood Approach to Continuous Speech Recognition", IEEE Transaction on Pattern Analysis and Machine Intelligence, vol. PAMI-5, No. 2, Mar. 1983, 13 pages.‡

Bahl et al., "A Tree-Based Statistical Language Model for Natural Language Speech Recognition", IEEE Transactions on Acoustics, Speech and Signal Processing, vol. 37, No. 7, Jul. 1989, 8 pages.‡

(56) References Cited

OTHER PUBLICATIONS

Bahl et al., "Acoustic Markov Models Used in the Tangora Speech Recognition System", Proceeding of International Conference on Acoustics, Speech and Signal Processing (ICASSP'88), vol. 1, Apr. 1988, 4 pages.‡
Decision to Grant received for Danish Patent Application No. PA201770036, dated Oct. 8, 2018, 2 pages.‡
Notice of Acceptance received for Australian Patent application No. 2016409890, dated Jul. 6, 2018, 3 pages.‡
Office Action received for Japanese Patent Application No. 2018-535277, dated Nov. 19, 2018, 10 pages (5 pages of English Translation and 5 pages of Official Copy).‡
International Preliminary Report on Patentability received for PCT Patent Application No. PCT/US2016/059953, dated Dec. 20, 2018, 9 pages.‡
Office Action received for Danish Patent Application No. PA201770032, dated Feb. 18, 2019, 2 pages.‡
International Search Report and Written Opinion received for PCT Patent Application No. PCT/US2016/059953, dated Mar. 10, 2017, 13 pages.‡
Office Action received for Danish Patent Application No. PA201770032, dated Apr. 16, 2018, 5 pages.‡
Office Action received for Australian Patent Application No. 2019213416, dated Aug. 14, 2019, 4 pages.‡
Office Action received for Japanese Patent Application No. 2019-121991, dated Aug. 30, 2019, 4 pages (2 pages of English Translation and 2 pages of Official copy).‡
Corrected Notice of Allowance received for U.S. Appl. No. 16/402,922, dated Jul. 8, 2020, 2 pages.
Notice of Allowance received for U.S. Appl. No. 16/402,922, dated Jun. 22, 2020, 10 pages.
Advisory Action received for U.S. Appl. No. 16/024,447, dated Jan. 28, 2020, 7 pages.
Applicant-Initiated Interview Summary received for U.S. Appl. No. 16/024,447, dated Jan. 17, 2020, 4 pages.
Applicant-Initiated Interview Summary received for U.S. Appl. No. 16/402,922, dated Jan. 17, 2020, 3 pages.
Corrected Notice of Allowance received for U.S. Appl. No. 15/271,766, dated Jan. 28, 2020, 2 pages.
Final Office Action received for U.S. Appl. No. 16/402,922, dated Jan. 31, 2020, 22 pages.
Office Action received for Chinese Patent Application No. 201910010561.2, dated Jul. 1, 2020, 19 pages (10 pages of English Translation and 9 pages of Official Copy).
Summons to Attend Oral Proceedings received for European Patent Application No. 19150734.2, mailed on Aug. 5, 2020, 9 pages.
Non-Final Office Action received for U.S. Appl. No. 16/024,447, dated Feb. 28, 2020, 63 pages.
Office Action received for European Patent Application No. 16904830.3, dated Feb. 28, 2020, 7 pages.
Office Action received for European Patent Application No. 19150734.2, dated Feb. 21, 2020, 7 pages.
Office Action received for European Patent Application No. 19157463.1, dated Mar. 2, 2020, 7 pages.
2007 Lexus GS 450h 4dr Sedan (3.5L 6cyl Gas/Electric Hybrid CVT), available at <http://review.cnet.com/4505-10865_16-31833144.html>, retrieved on Aug. 3, 2006, 10 pages.
Abcom Pty. Ltd. "12.1" 925 Candela Mobile PC, LCDHardware.com, available at <http://www.lcdhardware.com/pane1/12_1_panel/default.asp>, retrieved on Dec. 19, 2002, 2 pages.
ABF Software, "Lens-Magnifying Glass 1.5", available at <http://download.com/3000-2437-10262078.html?tag=1st-0-1>, retrieved on Feb. 11, 2004, 1 page.
Adium, "AboutAdium—Adium X—Trac", available at <http://web.archive.org/web/20070819113247/http://trac.adiumx.com/wiki/AboutAdium>, retrieved on Nov. 25, 2011, 2 pages.
Ahuja et al., "A Comparison of Application Sharing Mechanisms in Real-Time Desktop Conferencing Systems", At&T Bell Laboratories, 1990, pp. 238-248.
Aikawa et al., "Generation for Multilingual MT", available at <http://mtarchive.info/MTS-2001-Aikawa.pdf>, retrieved on Sep. 18, 2001, 6 pages.
Alfred App, "Alfred", available at <http://www.alfredapp.com/>, retrieved on Feb. 8, 2012, 5 pages.
All Music Website, available at <http://www.allmusic.com/>, retrieved on Mar. 19, 2007, 2 pages.
Alshawi, H., "Translation and Monotonic Interpretation/Generation", SRI International, Cambridge Computer Science Research Centre, Cambridge, available at <http://www.cam.sri.com/tr/crc024/paper.ps.Z1992>, Jul. 1992, 18 pages.
Amrel Corporation, "Rocky Matrix BackLit Keyboard", available at <http://www.amrel.com/asi_matrixkeyboard.html>, retrieved on Dec. 19, 2002, 1 page.
Anhui USTC Ifl Ytek Co. Ltd., "Flytek Research Center Information Datasheet", available at <http://www.iflttek.com/english/Research.htm>, retrieved on Oct. 15, 2004, 3 pages.
Api.Ai, "Android App Review—Speaktoit Assistant", Available at <https://www.youtube.com/watch?v=myE498nyfGw>, Mar. 30, 2011, 3 pages.
Apple Computer, Inc., "Apple—iPod—Technical Specifications, iPod 20GB and 60GB Mac + PC", available at <http://www.apple.com/ipod/color/specs.html>, 2005, 3 pages.
Apple Computer, Inc., "Apple Announces iTunes 2", Press Release, Oct. 2001, 2 pages.
Apple Computer, Inc. "Welcome to Tiger", available at <http://www.maths.dundee.ac.uk/software/Welcome_to_Mac_OS_X_v10.4_Tiger.pdf>, 2005, pp. 1-32.
Apple, "iPhone User's Guide", Available at <http://mesnotices.20minutes.fr/manuel-notice-mode-emploi/APPLE/IPHONE%2D%5FE#>, Retrieved on Mar. 27, 2008, Jun. 2007, 137 pages.
Apple, "VoiceOver", available at <http://www.apple.com/accessibility/voiceover/>, Feb. 2009, 5 pages.
Bellegarda, Jerome R., "Interaction-Driven Speech Input-A Data-Driven Approach to the Capture of both Local and Global Language Constraints", available at <http://old.sig.chi.ora/bulletin/1998.2/bellegarda.html>, 1992, 7 pages.
Bertulucci, Jeff, "Google Adds Voice Search to Chrome Browser", PC World, Jun. 14, 2011, 5 pages.
Best Buy, "When it Comes to Selecting a Projection TV, Toshiba Makes Everything Perfectly Clear", Previews of New Releases, available at <http://www.bestbuy.com/HomeAudioVideo/Specials/ToshibaTVFeatures.asp>, retrieved on Jan. 23, 2003, 5 pages.
Birrell, Andrew, "Personal Jukebox (PJB)", available at <http://birrell.org/andrew/talks/pjb-overview.ppt>, Oct. 13, 2000, 6 pages.
BluePhoneElite: About, available at <http://www.reelintelligence.com/BluePhoneElite>, retrieved on Sep. 25, 2006, 2 pages.
BluePhoneElite: Features, available at <http://www.reelintelligence.com/BluePhoneElite/features.shtml,>, retrieved on Sep. 25, 2006, 2 pages.
Bluetooth PC Headsets, "'Connecting' Your Bluetooth Headset with Your Computer", Enjoy Wireless VoIP Conversations, available at <http://www.bluetoothpcheadsets.com/connect.htm>, retrieved on Apr. 29, 2006, 4 pages.
Bociurkiw, Michael, "Product Guide: Vanessa Matz", available at <http://www.forbes.com/asap/2000/1127/vmartz_print.html>, retrieved on Jan. 23, 2003, 2 pages.
Brain, Marshall, "How MP3 Files Work", available at <http://www.howstuffworks.com>, retrieved on Mar. 19, 2007, 4 pages.
Bussey, et al., "Service Architecture, Prototype Description and Network Implications of a Personalized Information Grazing Service", INFOCOM'90, Ninth Annual Joint Conference of the IEEE Computer and Communication Societies, Available at <http://slrohall.com/oublications/>, Jun. 1990, 8 pages.
Bussler et al., "Web Service Execution Environment (WSMX)", retrieved from Internet on Sep. 17, 2012, available at <http://www.w3.org/Submission/WSMX>, Jun. 3, 2005, 29 pages.
Butler, Travis, "Archos Jukebox 6000 Challenges Nomad Jukebox", available at <http://tidbits.com/article/6521>, Aug. 13, 2001, 5 pages.
Butler, Travis, "Portable MP3: The Nomad Jukebox", available at <http://tidbits.com/article/6261>, Jan. 8, 2001, 4 pages.

(56) References Cited

OTHER PUBLICATIONS

Call Centre, "Word Prediction", The CALL Centre & Scottish Executive Education Dept., 1999, pp. 63-73.
Car Working Group, "Hands-Free Profile 1.5 HFP1.5_SPEC", Bluetooth Doc, available at <www.bluetooth.org>, Nov. 25, 2005, 93 pages.
Chakarova et al., "Digital Still Cameras—Downloading Images to a Computer", Multimedia Reporting and Convergence, available at <http://journalism.berkeley.edu/multimedia/tutorials/stillcams/downloading.html>, retrieved on May 9, 2005, 2 pages.
Chamberlain, Kim, "Quick Start Guide Natural Reader", available online at <http://atrc.colostate.edu/files/quickstarts/Natural_Reader_Quick_Start_Guide.>, Apr. 2008, 5 pages.
Chartier, David, "Using Multi-Network Meebo Chat Service on Your iPhone", available at <http://www.tuaw.com/2007/07/04/using-multi-network-meebo-chat-service-on-your-iphone/>, Jul. 4, 2007, 5 pages.
Cheyer et al., "The Open Agent Architecture: Building Communities of Distributed Software Agents", Artificial Intelligence Center, SRI International, Power Point Presentation, Available online at <http://www.ai.sri.com/-oaa/>, retrieved on Feb. 21, 1998, 25 pages.
Cheyer, Adam, "A Perspective on AI & Agent Technologies for SCM", VerticalNet Presentation, 2001, 22 pages.
Cheyer, Adam, "About Adam Cheyer", available at <http://www.adam.cheyer.com/about.html>, retrieved on Sep. 17, 2012, 2 pages.
Compaq, "Personal Jukebox", available at <http://research.compaq.com/SRC/pjb/>, 2001, 3 pages.
Corr, Paul, "Macintosh Utilities for Special Needs Users", available at <http://homepage.mac.com/corrp/macsupt/columns/specneeds.html>, Feb. 1994 (content updated Sep. 19, 1999), 4 pages.
Corrected Notice of Allowance received for U.S. Appl. No. 15/271,766, dated Dec. 4, 2019, 2 pages.
Corrected Notice of Allowance received for U.S. Appl. No. 15/271,766, dated Oct. 15, 2019, 2 pages.
Corrected Notice of Allowance received for U.S. Appl. No. 15/271,766, dated Sep. 30, 2019, 2 pages.
Creative Technology Ltd., "Creative NOMAD® II: Getting Started—User Guide (On Line Version)", available at <http://ec1.images-amazon.com/media/i3d/01/A/man-migrate/MANUAL000026434.pdf>, Apr. 2000, 46 pages.
Creative Technology Ltd., "Creative NOMAD®: Digital Audio Player: User Guide (On-Line Version)", available at <http://ec1.images-amazon.com/media/i3d/01/A/man-migrate/MANUAL000010757.pdf>, Jun. 1999, 40 pages.
Creative, "Creative NOMAD MuVo TX", available at <http://web.archive.org/web/20041024175952/www.creative.com/products/pfriendly.asp?product=9672>, retrieved on Jun. 6, 2006, 1 page.
Creative, "Creative NOMAD MuVo", available at <http://web.archive.org/web/20041024075901/www.creative.com/products/product.asp?category=213&subcategory=216&product=4983>, retrieved on Jun. 7, 2006, 1 page.
Creative, "Digital MP3 Player", available at <http://web.archive.org/web/20041024074823/www.creative.com/products/product.asp?category=213&subcategory=216&product=4983, 2004, 1 page.
Database WPI Section Ch, Week 8733, Derwent Publications Ltd., London, GB; AN 87-230826 & JP, A, 62 153 326 (Sanwa Kako KK (Sans) Sanwa Kako Co), Jul. 8, 1987, 6 pages.
Database WPI Section Ch, Week 8947, Derwent Publications Ltd., London, GB; AN 89-343299 & JP, A, 1 254 742 (Sekisui Plastics KK), Oct. 11, 1989, 7 pages.
De Herrera, Chris, "Microsoft ActiveSync 3.1", Version 1.02, available at <http://www.cewindows.net/wce/activesync3.1.htm>, Oct. 13, 2000, 8 pages.
Decision to Grant received for Danish Patent Application No. PA201770035, dated Jun. 21,2019, 2 pages.
Del Strother, Jonathan, "Coverflow", available at <http://www.steelskies.com/coverflow>, retrieved on Jun. 15, 2006, 14 pages.
Diamond Multimedia Systems, Inc., "Rio PMP300: User's Guide", available at <http://ec1.images-amazon.com/media/i3d/01/a/man-migrate/MANUAL000022854.pdf>, 1998, 28 pages.
Donovan, R. E., "A New Distance Measure for Costing Spectral Discontinuities in Concatenative Speech Synthesisers", available at <http://citeseerx.ist.osu.edu/viewdoc/summarv?doi=1 0.1.1.21.6398>, 2001, 4 pages.
259 • Dragon Naturally Speaking Version 11 Users Guide, Nuance Communications, Inc., Copyright @2002-2010, 132 pages.
dyslexic.com, "AlphaSmart 3000 with CoWriter SmartApplet: Don Johnston Special Needs", available at <http://www.dyslexic.com/procuts.php?catid-2&pid=465&PHPSESSID=2511b800000f7da>, retrieved on Dec. 6, 2005, 13 pages.
Edwards, John R., "Q&A: Integrated Software with Macros and an Intelligent Assistant", Byte Magazine, vol. 11, No. 1, Jan. 1986, pp. 120-122.
Eluminx, "Illuminated Keyboard", available at <http://www.elumix.com/>, retrieved on Dec. 19, 2002, 1 page.
Engst, Adam C., "SoundJam Keeps on Jammin'", available at <http://db.tidbits.com/getbits.acgi?tbart=05988>, Jun. 19, 2000, 3 pages.
Extended European Search Report received for European Patent Application No. 19150734.2, dated Apr. 26, 2019, 8 pages.
Fanty et al., "A Comparison of DFT, PLP and Cochleagram for Alphabet Recognition", IEEE, Nov. 1991, pp. 326-329.
Final Office Action Received for U.S. Appl. No. 15/271,766, dated Mar. 11, 2019, 17 pages.
Furnas, George W., "The Fisheye Calendar System", Bellcore Technical Memorandum, Nov. 19, 1991, pp. 1-9.
Glass et al., "Multilingual Spoken-Language Understanding in the Mit Voyager System", Available online at <http://groups.csail.mit.edu/sls/publications/1995/speechcomm95-voyager.pdf>, Aug. 1995, 29 pages.
Glossary of Adaptive Technologies: Word Prediction, available at <http://www.utoronto.ca/atrc/reference/techwordpred.html>, retrieved on Dec. 6, 2005, 5 pages.
Gmail, "About Group Chat", available at <http://mail.google.com/support/bin/answer.py?answer=81090>, Nov. 26, 2007, 2 pages.
Goddeau et al., "A Form-Based Dialogue Manager for Spoken Language Applications", Available online at <http://phasedance.com/pdf!icslp96.pdf>, Oct. 1996, 4 pages.
Gruber et al., "An Ontology for Engineering Mathematics", Fourth International Conference on Principles of Knowledge Representation and Reasoning, Available online at <http://www-ksl.stanford.edu/knowledge-sharing/papers/engmath.html>, 1994, pp. 1-22.
Gruber, Tom, "2021: Mass Collaboration and the Really New Economy", TNTY Futures, vol. 1, No. 6, Available online at <http://tomgruber.org/writing/tnty2001.htm>, Aug. 2001, 5 pages.
Gruber, Tom, "Collaborating Around Shared Content on the Www, W3C Workshop on Www and Collaboration", available at <http://www.w3.org/Collaboration/Workshop/Proceedings/P9.html>, Sep. 1995, 1 page.
Gruber, Tom, "Despite Our Best Efforts, Ontologies are not the Problem", AAAI Spring Symposium, Available online at <http://tomgruber.org/writing/aaai-ss08.htm>, Mar. 2008, pp. 1-40.
Gruber, Tom, "Helping Organizations Collaborate, Communicate, and Learn", Presentation to NASA Ames Research, Available online at <http://tomgruber.org/writing/organizational-intelligence-talk.htm>, Mar.-Oct. 2003, 30 pages.
Gruber, Tom, "Intelligence at the Interface: Semantic Technology and the Consumer Internet Experience", Presentation at Semantic Technologies Conference, Available online at <http://tomgruber.org/writing/semtech08.htm>, May 20, 2008, pp. 1-40.
Gruber, Tom, "It Is What It Does: the Pragmatics of Ontology for Knowledge Sharing", Proceedings of the International CIDOC CRM Symposium, Available online at <http://tomgruber.org/writing/cidoc-ontology.htm>, Mar. 26, 2003, 21 pages.
Gruber, Tom, "Ontologies, Web 2.0 and Beyond", Ontology Summit, Available online at <http://tomgruber.org/writing/ontolog-social-web-keynote.htm>, Apr. 2007, 17 pages.
Guay, Matthew, "Location-Driven Productivity with Task Ave", available at <http://iphone.appstorm.net/reviews/productivity/location-driven-productivity-with-task-ave/>, Feb. 19, 2011, 7 pages.
Guim, Mark, "How to Set a Person-Based Reminder with Cortana", available at <http://www.wpcentral.com/how-to-person-based-reminder-cortana>, Apr. 26, 2014, 15 pages.

(56) References Cited

OTHER PUBLICATIONS

Guzzoni et al., "Active, A platform for Building Intelligent Software", Computational Intelligence, available at <http://www.informatik.uni-trier.del-ley/pers/hd/g/Guzzoni:Didier>, 2006, 5 pages.
Hardwar, Devindra, "Driving App Waze Builds its own Sin for Hands-Free Voice Control", Available online at <http://venturebeat.com/2012/02/09/driving-app-waze-builds-its-own-siri-for-hands-free-voice-control/>, retrieved on Feb. 9, 2012, 4 pages.
Hear voice from Google translate, Available on URL: https://www.youtube.com/watch?v=18AvMhFqD28, Jan. 28, 2011, 1 page.
Hendrickson, Bruce, "Latent Semantic Analysis and Fiedler Retrieval", Linear Algebra and its Applications, vol. 421, 2007, pp. 345-355.
Hendrix et al., "The Intelligent Assistant: Technical Considerations Involved in Designing Q&A's Natural-Language Interface", Byte Magazine, Issue 14, Dec. 1987, 1 page.
Henrich et al., "Language Identification for the Automatic Grapheme-To-Phoneme Conversion of Foreign Words in a German Text-To-Speech System", Proceedings of the European Conference on Speech Communication and Technology, vol. 2, Sep. 1989, pp. 2220-2223.
IBM, "Why Buy: ThinkPad", available at <http://www.pc.ibm.com/us/thinkpad/easeofuse.html>, retrieved on Dec. 19, 2002, 2 pages.
IChat AV, "Video Conferencing for the Rest of Us", Apple—Mac OS X—iChat AV, available at <http://www.apple.com/macosx/features/ichat/>, retrieved on Apr. 13, 2006, 3 pages.
id3.org, "id3v2.4.0-Frames", available at <http://id3.org/id3v2.4.0-frames?action=print>, retrieved on Jan. 22, 2015, 41 pages.
IEEE 1394 (Redirected from Firewire, Wikipedia, The Free Encyclopedia, available at <http://www.wikipedia.org/wiki/Firewire>, retrieved on Jun. 8, 2003, 2 pages.
Intention to Grant received for Danish Patent Application No. PA201770032, dated Mar. 18, 2019, 2 pages.
Intention to Grant received for Danish Patent Application No. PA201770035, dated Apr. 26, 2019, 2 pages.
Interactive Voice, available at <http://www.helloivee.com/company/>, retrieved on Feb. 10, 2014, 2 pages.
Intraspect Software, "The Intraspect Knowledge Management Solution: Technical Overview", available at <http://tomgruber.org/writing/intraspect-whitepaper-1998.pdf>, 1998, 18 pages.
Invitation to Pay Additional Fee Received for PCT Patent Application No. PCT/US2016/059953, dated Dec. 29, 2016, 2pages.
Iowegian International, "FIR Filter Properties, DSPGuru, Digital Signal Processing Central", available at <http://www.dspguru.com/dsp/faq/fir/properties> retrieved on Jul. 28, 2010, 6 pages.
Iphone Hacks, "Native iPhone MMS Application Released", available at <http://www.iphonehacks.com/2007/12/iphone-mms-app.html>, retrieved on Dec. 25, 2007, 5 pages.
Iphonechat, "iChat for iPhone in JavaScript", available at <http://www.publictivity.com/iPhoneChat/>, retrieved on Dec. 25, 2007, 2 pages.
Jaybird, "Everything Wrong with AIM: Because We've All Thought About It", available at <http://www.psychonoble.com/archives/articles/82.html>, May 24, 2006, 3 pages.
Kahn et al., "CoABS Grid Scalability Experiments", Autonomous Agents and Multi-Systems, vol. 7, 2003, pp. 171-178.
Karp, P. D., "A Generic Knowledge-Base Access Protocol", Available online at <http://lecture.cs.buu.ac.th/-f50353/Document/gfp.pdf>, May 12, 1994, 66 pages.
Katz et al., "REXTOR: A System for Generating Relations from Natural Language", Proceedings of the ACL Workshop on Natural Language Processing and Information Retrieval (NLP&IR), Oct. 2000, 11 pages.
Kazmucha, Allyson, "How to Send Map Locations Using iMessage", iMore.com, Available at <http://www.imore.com/how-use-imessage-share-your-location-your-iphone>, Aug. 2, 2012, 6 pages.
Kickstarter, "Ivee Sleek: Wi-Fi Voice-Activated Assistant", available at <https://www.kickstarter.com/projectst/ivee/ivee-sleek-wi-fi-voice-activated-assistant>, retrieved on Feb. 10, 2014, 13 pages.
Kline et al., "UnWndows 1.0: X Windows Tools for Low Vision Users", ACM SIGCAPH Computers and the Physically Handicapped, No. 49, Mar. 1994, pp. 1-5.
Knownav, "Knowledge Navigator", YouTube Video available at <http://www.youtube.com/watch?v=QRH8eimU_20>, Apr. 29, 2008, 1 page.
Kroon et al., "Pitch Predictors with High Temporal Resolution", IEEE, vol. 2, pp. 661-664.
Larks, "Intelligent Software Agents", available at <http://www.cs.cmu.edu/~softagents/larks.html> retrieved on Mar. 15, 2013, 2 pages.
Lee et al., "System Description of Golden Mandarin (I) Voice Input for Unlimited Chinese Characters", International Conference on Computer Processing of Chinese & Oriental Languages, vol. 5, No. 3 & 4, Nov. 1991, 16 pages.
Lewis, Cameron, "Task Ave for iPhone Review", Mac Life, Available at <http://www.maclife.com/article/reviews/task_ave_iphone_review>, Mar. 3, 2011, 5 pages.
Lewis, Peter, "Two New Ways to Buy Your Bits", CNN Money, available at <http://money.cnn.com/2003/12/30/commentary/ontechnology/download/>, Dec. 31, 2003, 4 pages.
Lieberman et al., "Out of Context: Computer Systems that Adapt to, and Learn from, Context", IBM Systems Journal, vol. 39, No. 3 & 4, 2000, pp. 617-632.
Lin et al., "A Distributed Architecture for Cooperative Spoken Dialogue Agents with Coherent Dialogue State and History", Available on line at <http://citeseerxist.psu.edu/viewdoc/summary?doi=10.1.1.42.272>, 1999, 4 pages.
Macsimum News, "Apple Files Patent for an Audio Interface for the iPod", available at <http://www.macsimumnews.com/index.php/archive/apple_files_patent_for_an_audio_interface_for_the_ipod>, retrieved on Jul. 13, 2006, 8 pages.
MACTECH, "KeyStrokes 3.5 for Mac OS X Boosts Word Prediction", available at <http://www.mactech.com/news/?p=1007129>, retrieved on Jan. 7, 2008, 3 pages.
Martin et al., "The Open Agent Architecture: A Framework for Building Distributed Software Systems", Applied Artificial Intelligence: An International Journal, vol. 13, No. 1-2, available at <http://adam.cheyer.com/papers/oaa.pdf> >, retrieved from internet on Jan.-Mar. 1999.
Matsui et al., "Speaker Adaptation of Tied-Mixture-Based Phoneme Models for Text-Prompted Speaker Recognition", 1994 IEEE International Conference on Acoustics, Speech and Signal Processing, Apr. 19-22, 1994, pp. 1-125-1-128.
Meet Ivee, Your Wi-Fi Voice Activated Assistant, available at <http://www.helloivee.com/>, retrieved on Feb. 10, 2014, 8 pages.
Mel Scale, Wikipedia the Free Encyclopedia, Last modified on Oct. 13, 2009 and retrieved on Jul. 28, 2010, available at <http://en.wikipedia.org/wiki/Mel_scale>, 2 pages.
Menta, Richard, "1200 Song MP3 Portable is a Milestone Player", available at <http://www.mp3newswire.net/stories/personaljuke.html>, Jan. 11, 2000, 4 pages.
Meyrowitz et al., "Bruwin: An Adaptable Design Strategy for Window Manager/Virtual Terminal Systems", Department of Computer Science, Brown University, 1981, pp. 180-189.
Microsoft Press, "Microsoft Windows User's Guide for the Windows Graphical Environment", version 3.0, 1985-1990, pp. 33-41 & 70-74.
Microsoft, "Turn on and Use Magnifier", available at <http://www.microsoft.com/windowsxp/using/accessibility/magnifierturnon.mspx>, retrieved on Jun. 6, 2009.
Miller, Chance, "Google Keyboard Updated with New Personalized Suggestions Feature", available at <http://9to5google.com/2014/03/19/google-keyboard-updated-with-new-personalized-suggestions-feature/>, Mar. 19, 2014, 4 pages.
Milstead et al., "Metadata: Cataloging by Any Other Name", available at <http://www.iicm.tugraz.at/thesis/cguetl_diss/literatur/Kapitel06/References/Milstead_et_al._1999/metadata.html>, Jan. 1999, 18 pages.
Milward et al., "D2.2: Dynamic Multimodal Interface Reconfiguration, Talk and Look: Tools for Ambient Linguistic Knowledge", available at <http://www.ihmc.us/users/nblaylock!Pubs/Files/talk d2.2.pdf>, Aug. 8, 2006, 69 pages.

(56) References Cited

OTHER PUBLICATIONS

Miniman, Jared, "Applian Software's Replay Radio and Player v1.02", pocketnow.com—Review, available at <http://www.pocketnow.com/reviews/replay/replay.htm>, Jul. 31, 2001, 16 pages.
Minimum Phase, Wikipedia the free Encyclopedia, Last modified on Jan. 12, 2010 and retrieved on Jul. 28, 2010, available at <http://en.wikipedia.org/wiki/Minimum_phase>, 8 pages.
Mobile Speech Solutions, Mobile Accessibility, SVOX AG Product Information Sheet, available at <http://www.svox.com/site/bra840604/con782768/mob965831936.aSQ?osLang=1> , Sep. 27, 2012, 1 page.
Mobile Tech News, "T9 Text Input Software Updated", available at <http://www.mobiletechnews.com/info/2004/11/23/122155.html>, Nov. 23, 2004, 4 pages.
Moore et al., "Combining Linguistic and Statistical Knowledge Sources in Natural-Language Processing for ATIS", SRI International, Artificial Intelligence Center, 1995, 4 pages.
825. Moore et al., "The Information Warfare Advisor: An Architecture for Interacting with Intelligent Agents Across the Web", Proceedings of Americas Conference on Information Systems (AMCIS), Dec. 31, 1998, pp. 186-188.
Morton, Philip, "Checking If an Element Is Hidden", StackOverflow, Available at <http://stackoverflow.com/questions/178325/checking-if-an-element-is-hidden>, Oct. 7, 2008, 12 pages.
838. Mountford et al., "Talking and Listening to Computers", The Art of Human-Computer Interface Design, Apple Computer, Inc., Addison-Wesley Publishing Company, Inc., 1990, 17 pages.
Musicmatch, "Musicmatch and Xing Technology Introduce Musicmatch Jukebox", Press Releases, available at <http://www.musicmatch.com/info/company/press/releases/?year=1998&release=2>, May 18, 1998, 2 pages.
Muthusamy et al., "Speaker-Independent Vowel Recognition: Spectograms versus Cochleagrams", IEEE, Apr. 1990, pp. 533-536.
My Cool Aids, "What's New", available at <http://www.mycoolaids.com/>, 2012, 1 page.
Myers, Brad A., "Shortcutter for Palm", available at <http://www.cs.cmu.edu/~pebbles/v5/shortcutter/palm/index.html>, retrieved on Jun. 18, 2014, 10 pages.
N200 Hands-Free Bluetooth Car Kit, available at <www.wirelessground.com>, retrieved on Mar. 19, 2007, 3 pages.
NCIP Staff, "Magnification Technology", available at <http://www2.edc.org/ncip/library/vi/magnifi.htm>, 1994, 6 pages.
NCIP, "NCIP Library: Word Prediction Collection", available at <http://www2.edc.org/ncip/library/wp/toc.htm>, 1998, 4 pages.
NCIP, "What is Word Prediction?", available at <http://www2.edc.org/NCIP/library/wp/what_is.htm>, 1998, 2 pages.
NDTV, "Sony SmartWatch 2 Launched in India for Rs. 14,990", available at <http://gadgets.ndtv.com/others/news/sony-smartwatch-2-launched-in-india-for-rs-14990-420319>, Sep. 18, 2013, 4 pages.
Ng, Simon, "Google's Task List Now Comes to Iphone", SimonBlog, Available at <http://www.simonblog.com/2009/02/04/googles-task-list-now-comes-to-iphone/>, Feb. 4, 2009, 33 pages.
Non-Final Office Action received for U.S. Appl. No. 15/271,766, dated Oct. 1, 2018, 16 pages.
Non-Final Office Action received for U.S. Appl. No. 16/024,447, dated Jul. 3, 2019, 50 pages.
Notenboom, Leo A., "Can I Retrieve Old MSN Messenger Conversations?", available at <http://ask-leo.com/can_i_retrieve_old_msn_messenger_conversations.html>, Mar. 11, 2004, 23 pages.
Notice of Allowance received for U.S. Appl. No. 15/271,766, dated Jul. 31, 2019, 19 pages.
Office Action received for Danish Patent Application No. PA201770035, dated Jan. 8, 2019, 4 pages.
Office Action received for Japanese Patent Application No. 2018-535277, dated Mar. 12, 2019, 7 pages.
Office Action received for Japanese Patent Application No. 2018-535277, dated Nov. 19, 2018, 10 pages.
Office Action received for Japanese Patent Application No. 2019-121991, dated Aug. 30, 2019, 4 pages.
Office Action received for Korean Patent Application No. 10-2019-7004448, dated Sep. 19, 2019, 12 pages.
Office Action received for Korean Patent Application No. 10-2018-7023111, dated Jan. 2, 2019, 11 pages.
Oregon Scientific, "512MB Waterproof MP3 Player with FM Radio & Built-in Pedometer", available at <http://www2.oregonscientific.com/shop/product.asp?cid=4&scid=11&pid=581>, retrieved on Jul. 31, 2006, 2 pages.
Osxdaily, "Get a List of Siri Commands Directly from Siri", Available at <http://osxdaily.com/2013/02/05/list-siri-commands/>, Feb. 5, 2013, 15 pages.
Padilla, Alfredo, "Palm Treo 750 Cell Phone Review—Messaging", available at <http://www.wirelessinfo.com/content/palm-Treo-750-Cell-Phone-Review/Messaging.htm>, Mar. 17, 2007, 6 pages.
Panasonic, "Toughbook 28: Powerful, Rugged and Wireless", Panasonic: Toughbook Models, available at <http://www.panasonic.com/computer/notebook/html/01a_s8.htm>, retrieved on Dec. 19, 2002, 3 pages.
Papadimitriou et al., "Latent Semantic Indexing: A Probabilistic Analysis", Available online at <http://citeseerx.ist.psu.edu/messaqes/downloadsexceeded.html>, Nov. 14, 1997, 21 pages.
Patent Abstracts of Japan, vol. 014, No. 273 (E-0940) Jun. 13, 1990 (Jun. 13, 1990) -& JP 02 086057 A (Japan Storage Battery Co Ltd), Mar. 27, 1990 (Mar. 27, 1990), 3 pages.
Pathak et al., "Privacy-preserving Speech Processing: Cryptographic and String-matching Frameworks Show Promise", In: IEEE signal processing magazine, retrieved from <http://www.merl.com/publications/docs/TR2013-063.pdf>, Feb. 13, 2013, 16 pages.
PhatNoise, Voice Index on Tap, Kenwood Music Keg, available at <http://www.phatnoise.com/kenwood/kenwoodssamail.html>, retrieved on Jul. 13, 2006, 1 page.
Poly-Optical Products, Inc., "Poly-Optical Fiber Optic Membrane Switch Backlighting", available at <http://www.poly-optical.com/membrane_switches.html>, retrieved on Dec. 19, 2002, 3 pages.
Powell, Josh, "Now You See Me . . . Show/Hide Performance", available at http://www.learningjquery.com/2010/05/now-you-see-me-showhide-performance, May 4, 2010, 3 pages.
Pulman et al., "Clare: A Combined Language and Reasoning Engine", Proceedings of JFIT Conference, available at <http://www.cam.sri.com/tr/crc042/paper.ps.Z>, 1993, 8 pages.
Rabiner et al., "Fundamental of Speech Recognition" AT&T, Published by Prentice-Hall, Inc., ISBN: 0-13-285826-6, 1993, 17 pages.
Rayner et al., "Adapting the Core Language Engine to French and Spanish", Cornell University Library, available at <http:l/arxiv.org/abs/cmp-lg/9605015>, May 10, 1996, 9 pages.
Rayner et al., "Spoken Language Translation with Mid-90's Technology: A Case Study", Eurospeech, ISCA, Available online at <http://citeseerx.ist.psu.edu/viewdoc/summary?doi=10.1.1.54.8608>, 1993, 4 pages.
Reininger et al., "Speech and Speaker Independent Codebook Design in VQ Coding Schemes", (Proceedings of the IEEE International Acoustics, Speech and Signal Processing Conference, Mar. 1985), as reprinted in Vector Quantization (IEEE Press, 1990), 1990, pp. 271-273.
Rice et al., "Monthly Program: Nov. 14, 1995", The San Francisco Bay Area Chapter of ACM SIGCHI, available at <http://www.baychi.org/calendar/19951114>, Nov. 14, 1995, 2 pages.
Ricker, Thomas, "Apple Patents Audio User Interface", Engadget, available at <http://www.engadget.com/2006/05/04/apple-patents-audio-user-interface/>, May 4, 2006, 6 pages.
Rioport, "Rio 500: Getting Started Guide", available at <http://ec1.images-amazon.com/media/i3d/01/A/man-migrate/MANUAL000023453.pdf>, 1999, 2 pages.
Roseberry, Catherine, "How to Pair a Bluetooth Headset & Cell Phone", available at <http://mobileoffice.about.com/od/usingyourphone/ht/blueheadset_p.htm>, retrieved on Apr. 29, 2006, 2 pages.
Sarawagi, Sunita, "CRF Package Page", available at <http://crf.sourceforge.net/>, retrieved on Apr. 6, 2011, 2 pages.
Sato, H., "A Data Model, Knowledge Base and Natural Language Processing for Sharing a Large Statistical Database", Statistical and Scientific Database Management, Lecture Notes in Computer Science, vol. 339, 1989, 20 pp.
Schultz, Tanja, "Speaker Characteristics", In: Speaker Classification I, retrieved from <http://ccc.inaoep.mx/~villasen/bib/Speaker%20Characteristics.pdf>, 2007, pp. 47-74.

(56) References Cited

OTHER PUBLICATIONS

Shimazu et al., "CAPIT: Natural Language Interface Design Tool with Keyword Analyzer and Case-Based Parser", NEG Research & Development, vol. 33, No. 4, Oct. 1992, 11 pages.
Simonite, Tom, "One Easy Way to Make Sin Smarter", Technology Review, Oct. 18, 2011, 2 pages.
Sony Eiicsson Corporate, "Sony Ericsson to introduce Auto pairing. TM. to Improve Bluetooth.TM. Connectivity Between Headsets and Phones", Press Release, available at <http://www.sonyericsson.com/spg.jsp?cc=global&lc=en&ver=4001&template=pc3_1_ 1&z . . . >, Sep. 28, 2005, 2 pages.
Speaker Recognition, Wkipedia, the Free Enclyclopedia, Nov. 2, 2010, 4 pages.
Spiller, Karen, "Low-Decibel Earbuds Keep Noise at a Reasonable Level", available at <http://www.nashuatelegraph.com/apps/pbcs.d11/article?Date=20060813&Cate . . . >, Aug. 13, 2006, 3 pages.
SRI, "SRI Speech: Products: Software Development Kits: EduSpeak", available at <http://web.archive.org/web/20090828084033/http://www.speechatsri.com/products/eduspeak>shtml, retrieved on Jun. 20, 2013, 2 pages.
Stealth Computer Corporation, "Peripherals for Industrial Keyboards & Pointing Devices", available at <http://www.stealthcomputer.com/peripherals_oem.htm>, retrieved on Dec. 19, 2002, 6 pages.
Steinberg, Gene, "Sonicblue Rio Car (10 GB, Reviewed: 6 GB)", available at <http://electronics.cnet.com/electronics/0-6342420-1304-4098389.html>, Dec. 12, 2000, 2 pages.
Stent et al., "Geo-Centric Language Models for Local Business Voice Search", AT&T Labs— Research, 2009, pp. 389-396.
1087. Stuker et al., "Cross-System Adaptation and Combination for Continuous Speech Recognition: The Influence of Phoneme Set and Acoustic Front-End", Influence of Phoneme Set and Acoustic Front-End, Interspeech, Sep. 17-21, 2006, pp. 521-524.
Sullivan, Danny, "How Google Instant's Autocomplete Suggestions Work", available at <http://searchengineland.com/how-google-instant-autocomplete-suggestions-work-62592>, Apr. 6, 2011, 12 pages.
T3 Magazine, "Creative MuVo TX 256MB", available at <http://www.t3.co.uk/reviews/entertainment/mp3_player/creative_muvo_tx_256mb>, Aug. 17, 2004, 1 page.
TAOS, "TAOS, Inc. Announces Industry's First Ambient Light Sensor to Convert Light Intensity to Digital Signals", News Release, available at <http://www.taosinc.com/presssrelease_090902.htm>, Sep. 16, 2002, 3 pages.
Tello, Ernest R., "Natural-Language Systems", Mastering AI Tools and Techniques, Howard W. Sams & Company, 1988, pp. 25-64.
TextnDrive, "Text'nDrive App Demo-Listen and Reply to your Messages by Voice while Driving!", YouTube Video available at <http://www.youtube.com/watch?v=WaGfzoHsAMw>, Apr. 27, 2010, 1 page.
TG3 Electronics, Inc., "BL82 Series Backlit Keyboards", available at <http://www.tg3electronics.com/products/backlit/backlit.htm>, retrieved on Dec. 19, 2002, 2 pages.
Top 10 Best Practices for Voice User Interface Design available at <http://www.developer.com/voice/article.php/1567051/Top-10-Best-Practices-for-Voice-UserInterface-Design.htm>, Nov. 1, 2002, 4 pages.
Uslan et al., "A Review of Two Screen Magnification Programs for Windows 95: Magnum 95 and LP-Windows", Journal of Visual Impairment & Blindness, Sep.-Oct. 1997, pp. 9-13.
Veiga, Alex, "AT&T Wireless Launching Music Service", available at <http://bizyahoo.com/ap/041005/at_t_mobile_music_5.html?printer=1>, Oct. 5, 2004, 2 pages.
Vlingo Incar, "Distracted Driving Solution with Vlingo InCar", YouTube Video, Available online at <http://www.youtube.com/watch?v=Vqs8XfXxgz4>, Oct. 2010, 2 pages.
Voiceassist, "Send Text, Listen to and Send E-Mail by Voice", YouTube Video, Available online at <http://www.youtube.com/watch?v=0tEU61nHHA4>, Jul. 30, 2009, 1 page.
VoiceontheGo, "Voice on the Go (BlackBerry)", YouTube Video, available online at <http://www.youtube.com/watch?v=pJqpWgQS98w>, Jul. 27, 2009, 1 page.
W3C Working Draft, "Speech Synthesis Markup Language Specification for the Speech Interface Framework", available at <http://www.w3org./TR/speech-synthesis>, retrieved on Dec. 14, 2000, 42 pages.
What is Fuzzy Logic?, available at <http://www.cs.cmu.edu>, retrieved on Apr. 15, 1993, 5 pages.
Wikipedia, "Acoustic Model", available at <http://en.wikipedia.org/wiki/AcousticModel>, retrieved on Sep. 14, 2011, 2 pages.
Wikipedia, "Language Model", available at <http://en.wikipedia.org/wiki/Language_model>, retrieved on Sep. 14, 2011, 3 pages.
Wikipedia, "Speech Recognition", available at <http://en.wikipedia.org/wiki/Speech_recognition>, retrieved on Sep. 14, 2011, 10 pages.
Wilson, Mark, "New iPod Shuffle Moves Buttons to Headphones, Adds Text to Speech", available at <http://gizmodo.com/5167946/new-ipod-shuffle-moves-buttons-to-headphones-adds-text-to-speech>, Mar. 11, 2009, 13 pages.
Wirelessinfo, "SMS/MMS Ease of Use (8.0)", available at <http://www.wirelessinfo.com/content/palm-Treo-750-Cell-Phone-Review/Messaging.htm>, Mar. 2007, 3 pages.
Yiourgalis et al., "Text-to-Speech system for Greek", ICASSP 91, vol. 1, 14-17 May 1991, pp. 525-528.
Young et al, "The HTK Book", Version 3.4, Dec. 2006, 368 pages.
Zainab, "Google Input Tools Shows Onscreen Keyboard in Multiple Languages [Chrome]", available at <http://www.addictivetips.com/internet-tips/google-input-tools-shows-multiple-language-onscreen-keyboards-chrome/>, Jan. 3, 2012, 3 pages.
Zelig, "A Review of the Palm Treo 750v", available at <http://www.mtekk.com.au/Articles/tabid/54/articleType/ArticleView/articleId/769/A-Review-of-the-Palm-Treo-750v.aspx>, Feb. 5, 2007, 3 pages.
Applicant Initiated Interview Summary received for U.S. Appl. No. 16/024,447, dated Oct. 2, 2019, 4 pages.
Applicant-Initiated Interview Summary received for U.S. Appl. No. 16/402,922, dated Apr. 28, 2020, 3 pages.
Final Office Action received for U.S. Appl. No. 16/024,447, dated Oct. 11, 2019, 59 pages.
Non-Final Office Action received for U.S. Appl. No. 16/402,922, dated Oct. 18, 2019, 20 pages.
Notice of Acceptance received for Australian Patent Application No. 2019213416, dated Nov. 7, 2019, 3 pages.
Notice of Allowance received for Japanese Patent Application No. 2019-121991, dated Dec. 13, 2019, 4 pages (1 page of English Translation and 3 pages of Official Copy).
Notice of Allowance received for U.S. Appl. No. 16/024,447, dated Apr. 22, 2020, 18 pages.
Office Action received for Korean Patent Application No. 10-2018-7023111, dated Dec. 12, 2019, 6 pages (3 pages of English Translation and 3 pages of Official Copy).
Office Action received for Korean Patent Application No. 10-2018-7023111, dated Sep. 25, 2019, 6 pages (3 pages of English Translation and 3 pages of Official Copy).
Office Action received for Korean Patent Application No. 10-2019-7004448, dated May 22, 2020, 9 pages (4 pages of English Translation and 5 pages of Official Copy).
Office Action received for Australian Patent Application No. 2020201030, dated Aug. 25, 2020, 4 pages.
Summons to Attend Oral Proceedings received for European Patent Application No. 16904830.3, mailed on Sep. 3, 2020, 10 pages.
Notice of Allowance received for Korean Patent Application No. 10-2019-7004448, dated Sep. 28, 2020, 3 pages (1 page of English Translation and 2 pages of Official Copy).
Corrected Notice of Allowance received for U.S. Appl. No. 16/402,922, dated Sep. 17, 2020, 2 pages.
Corrected Notice of Allowance received for U.S. Appl. No. 16/402,922, dated Sep. 28, 2020, 2 pages.
Summons to Attend Oral Proceedings received for European Patent Application No. 19157463.1, mailed on Sep. 14, 2020, 10 pages.
Corrected Notice of Allowance received for U.S. Appl. No. 16/402,922, dated Oct. 27, 2020, 2 pages.
Office Action received for Chinese Patent Application No. 201680079283.0, dated Oct. 9, 2020, 22 pages (11 pages of English Translation and 11 pages of Official Copy).

(56) References Cited

OTHER PUBLICATIONS

Brief Communication Regarding Oral Proceedings received for European Patent Application No. 19150734.2, mailed on Nov. 17, 2020, 2 pages.
Office Action received for Australian Patent Application No. 2020201030, dated Nov. 11, 2020, 4 pages.
Result of Consultation received for European Patent Application No. 19150734.2, dated Nov. 16, 2020, 3 pages.
AAAAPLAY, "Sony Media Remote for iOS and Android", Online available at: <https://www.youtube.com/watch?v=W8QoeQhlGok>, Feb. 4, 2012, 3 pages.
"Alexa, Turn Up the Heat!, Smartthings Samsung [online]", Online available at:—<https://web.archive.org/web/20160329142041/https://blog.smartthings.com/news/smart thingsupdates/alexa-turn-up-the-heat/>, Mar. 3, 2016, 3 pages.
Anania Peter, "Amazon Echo with Home Automation (Smartthings)", Online available at:—<https://www.youtube.com/watch?v=LMW6aXmsWNE>, Dec. 20, 2015, 1 page.
Android Authority, "How to use Tasker: A Beginner's Guide", Online available at:—<https://youtube.com/watch?v= rDpdS_YWzFc>, May 1, 2013, 1 page.
Asakura et al., "What LG thinks; How the TV should be in the Living Room", HiVi, vol. 31, No. 7, Stereo Sound Publishing, Inc., Jun. 17, 2013, pp. 68-71 (Official Copy Only). {See Communication Under Rule 37 CFR § 1.98(a) (3)}.
"Ask Alexa—Things That Are Smart Wiki", Online available at:—<http://thingsthataresmart.wiki/index.php?title=Ask_Alexa&oldid=4283>, Jun. 8, 2016, pp. 1-31.
Ashbrook, Daniel L., "Enabling Mobile Microinteractions", May 2010, 186 pages.
Ashingtondctech & Gaming, "SwipeStatusBar—Reveal the Status Bar in a Fullscreen App", Online Available at: <https://www.youtube.com/watch?v=wA_tT9lAreQ>, Jul. 1, 2013, 3 pages.
Automate Your Life, "How to Setup Google Home Routines—A Google Home Routines Walkthrough", Online Available at: <https://www.youtube.com/watch?v=pXokZHP9kZg>, Aug. 12, 2018, 1 page.
Bell, Jason, "Machine Learning Hands-On for Developers and Technical Professionals", Wiley, 2014, 82 pages.
Bellegarda, Jeromer, "Chapter 1: Spoken Language Understanding for Natural Interaction: The Siri Experience", Natural Interaction with Robots, Knowbots and Smartphones, 2014, pp. 3-14.
Bellegarda, Jeromer, "Spoken Language Understanding for Natural Interaction: The Siri Experience", Slideshow retrieved from : <https://www.uni-ulm.de/fileadmin/website_uni_ulm/iui.iwsds2012/files/Bellegarda.pdf>, International Workshop on Spoken Dialog Systems (IWSDS), May 2012, pp. 1-43.
beointegration.com, "BeoLink Gateway—Programming Example", Online Available at: <https:/ /www.youtube.com/watch?v=TXDaJFm5UH4>, Mar. 4, 2015, 3 pages.
Burgess, Brian, "Amazon Echo Tip: Enable the Wake Up Sound", Online available at:—<https://www.groovypost.com/howto/amazon-echo-tip-enable-wake-up-sound/>, Jun. 30, 2015, 4 pages.
Cambria et al., "Jumping NLP curves: A Review of Natural Language Processing Research.", IEEE Computational Intelligence magazine, 2014, vol. 9, May 2014, pp. 48-57.
Chang et al., "Monaural Multi-Talker Speech Recognition with Attention Mechanism and Gated Convolutional Networks", Interspeech 2018, Sep. 2-6, 2018, pp. 1586-1590.
Chen, Yl, "Multimedia Siri Finds and Plays Whatever You Ask for", PSFK Report, Feb. 9, 2012, pp. 1-9.
Conneau et al., "Supervised Learning of Universal Sentence Representations from Natural Language Inference Data", Proceedings of the 2017 Conference on Empirical Methods in Natural Language Processing, Copenhagen, Denmark, Sep. 7-11, 2017, pp. 670-680.
Coulouris et al., "Distributed Systems: Concepts and Design (Fifth Edition)" Addison-Wesley, 2012, 391 pages.
Czech Lucas, "A System for Recognizing Natural Spelling of English Words", Diploma Thesis, Karlsruhe Institute of Technology, May 7, 2014, 107 pages.
Deedeevuu, "Amazon Echo Alarm Feature", Online available at:—<https://www.youtube.com/watch?v=fdjU8eRLk7c>, Feb. 16, 2015, 1 page.
Delcroix et al., "Context Adaptive Deep Neural Networks for Fast Acoustic Model Adaptation", ICASSP, 2015, pp. 4535-4539.
Delcroix et al., "Context Adaptive Neural Network for Rapid Adaptation of Deep CNN Based Acoustic Models", Interspeech 2016, Sep. 8-12, 2016, pp. 1573-1577.
Derrick, Amanda, "How to Set Up Google Home for Multiple Users", Lifewire, Online available at:—<https://www.lifewire.com/set-up-google-home-multiple-users-4685691>, Jun. 8, 2020, 9 pages.
Detroitborg, "Apple Remote App (iPhone & iPod Touch): Tutorial and Demo", Online Available at:—<https://www.youtube.com/watch?v=M_jzeEevKgl>, Oct. 13, 2010, 4 pages.
Dihelson, "How Can I Use Voice or Phrases as Triggers to Macrodroid?", Macrodroid Forums, Online Available at:—<https://www.tapatalk.comigroups/macrodroid/how-can-i-use-voice-or-phrases-as-triggers-to-macr-t4845.html>, May 9, 2018, 5 pages.
"DIRECTV™ Voice", Now Part of the DIRECTTV Mobile App for Phones, Sep. 18, 2013, 5 pages.
Earthling1984, "Samsung Galaxy Smart Stay Feature Explained", Online available at:—<https://www.youtube.com/watch?v=RpjBNtSjupl>, May 29, 2013, 1 page.
Eder et al., "At the Lower End of Language—Exploring the Vulgar and Obscene Side of German", Proceedings of the Third Workshop on Abusive Language Online, Florence, Italy, Aug. 1, 2019, pp. 119-128.
Filipowicz, Luke, "How to use the QuickType keyboard in iOS 8", Online available at:—<https://www.imore.com/comment/568232>, Oct. 11, 2014, pp. 1-17.
Gadget Hacks, "Tasker Too Complicated? Give MacroDroid a Try [How-To]", Online available at: <https://www.youtube.com/watch?v=8YL9cWCykKc>, May 27, 2016, 1 page.
"Galaxy S7: How to Adjust Screen Timeout & Lock Screen Timeout", Online available at:—<https://www.youtube.com/watch?v=n6e1WKUS2ww>, Jun. 9, 2016, 1 page.
Gasic et al., "Effective Handling of Dialogue State in the Hidden Information State POMDP-based Dialogue Manager", ACM Transactions on Speech and Language Processing, May 2011, pp. 1-25.
Ghauth et al., "Text Censoring System for Filtering Malicious Content Using Approximate String Matching and Bayesian Filtering", Proc. 4th INNS Symposia Series on Computational Intelligence in Information Systems, Bandar Seri Begawan, Brunei, 2015, pp. 149-158.
Google Developers,"Voice search in your app", Online available at:—<https://www.youtube.com/watch?v=PS1FbB5qWEI>, Nov. 12, 2014, 1 page.
Gupta et al., "I-vector-based Speaker Adaptation of Deep Neural Networks for French Broadcast Audio Transcription", ICASSP, 2014, 2014, pp. 6334-6338.
Gupta, Naresh, "Inside Bluetooth Low Energy", Artech House, 2013, 274 pages.
Hershey et al., "Deep Clustering: Discriminative Embeddings for Segmentation and Separation", Proc. ICASSP, Mar. 2016, 6 pages.
"Hey Google: How to Create a Shopping List with Your Google Assistant", Online available at:—<https://www.youtube.com/watch?v=w9NCsElax1Y>, May 25, 2018, 1 page.
"How to Enable Google Assistant on Galaxy S7 and Other Android Phones (No Root)", Online available at:—<https://www.youtube.com/watch?v=HeklQbWyksE>, Mar. 20, 2017, 1 page.
"How to Use Ok Google Assistant Even Phone is Locked", Online available at:—<https://www.youtube.com/watch?v=9B_gP4j_SP8>, Mar. 12, 2018, 1 page.
Hutsko et al., "iPhone All-in-One for Dummies", 3rd Edition, 2013, 98 pages.
Ikeda, Masaru, "beGLOBAL Seoul 2015 Startup Battle: Talkey", YouTube Publisher, Online Available at:—<https://www.youtube.com/watch?v=4Wkp7sAAldg>, May 14, 2015, 1 page.
INews and Tech,"How to Use the QuickType Keyboard in IOS 8", Online available at:—<http://www.inewsandtech.com/how-to-use-the-quicktype-keyboard-in-ios-8/>, Sep. 17, 2014, 6 pages.
Intention to Grant received for European Patent Application No. 19150734.2, dated Dec. 1, 2020, 8 pages.

(56) References Cited

OTHER PUBLICATIONS

Internet Services and Social Net, "How to Search for Similar Websites", Online availabe at:—<https://www.youtube.com/watch?v=nLf2uirpt5s>, see from 0:17 to 1:06, Jul. 4, 2013, 1 page.
"iPhone 6 Smart Guide Full Version for SoftBank", Gijutsu-Hyohron Co., Ltd., vol. 1, Dec. 1, 2014, 4 pages (Official Copy Only). {See communication under Rule 37 CFR § 1.98(a) (3)}.
Isik et al., "Single-Channel Multi-Speaker Separation using Deep Clustering", Interspeech 2016, Sep. 8-12, 2016, pp. 545-549.
Jonsson et al., "Proximity-based Reminders Using Bluetooth", 2014 IEEE International Conference on Pervasive Computing and Communications Demonstrations, 2014, pp. 151-153.
Karn, Ujjwal, "An Intuitive Explanation of Convolutional Neural Networks", The Data Science Blog, Aug. 11, 2016, 23 pages.
Kastrenakes, Jacob, "Siri's creators will unveil their new AI bot on Monday", The Verge, Online available at:—<https://web.archive.org/web/20160505090418/https://www.theverge.com/2016/5/4/11593564/viv-labs-unveiling-monday-new-ai-from-siri-creators>, May 4, 2016, 3 pages.
King et al., "Robust Speech Recognition Via Anchor Word Representations", Interspeech 2017, Aug. 20-24, 2017, pp. 2471-2475.
Lee, Sungjin, "Structured Discriminative Model for Dialog State Tracking", Proceedings of the SIGDIAL 2013 Conference, Aug. 22-24, 2013, pp. 442-451.
"Link Your Voice to Your Devices with Voice Match, Google Assistant Help", Online available at:—<https://support.google.com/assistant/answer/9071681?co=GENIE.Platform%3DAndroid&hl=en>, Retrieved on Jul. 1, 2020, 2 pages.
Liou et al., "Autoencoder for Words", Neurocomputing, vol. 139, Sep. 2014, pp. 84-96.
Liu et al., "Accurate Endpointing with Expected Pause Duration", Sep. 6-10, 2015, pp. 2912-2916.
Loukides et al., "What Is the Internet of Things?", O'Reilly Media, Inc., Online Available at: <https://www.oreilly.com/library/view/what-is-the/9781491975633/>, 2015, 31 pages.
Luo et al., "Speaker-Independent Speech Separation With Deep Attractor Network", IEEE/ACM Transactions on Audio, Speech, and Language Processing, vol. 26, No. 4, Apr. 2018, pp. 787-796.
Majerus Wesley, "Cell Phone Accessibility for Your Blind Child", Online available at:—<https://web.archive.org/web/20100210001100/https://nfb.org/images/nfb/publications/fr/fr28/3/fr280314.htm>, 2010, pp. 1-5.
Malcangi Mario, "Text-driven Avatars Based on Artificial Neural Networks and Fuzzy Logic", International Journal of Computers, vol. 4, No. 2, Dec. 31, 2010, pp. 61-69.
Marketing Land,"Amazon Echo: Play music", Online Available at:—<https://www.youtube.com/watch?v=A7V5NPbsX14>, Apr. 27, 2015, 3 pages.
Mhatre et al., "Donna Interactive Chat-bot acting as a Personal Assistant", International Journal of Computer Applications (0975-8887), vol. 140, No. 10, Apr. 2016, 6 pages.
Mikolov et al., "Linguistic Regularities in Continuous Space Word Representations", Proceedings of NAACL-HLT, Jun. 9-14, 2013, pp. 746-751.
Modern Techies,"Braina-Artificial Personal Assistant for PC(like Cortana,Siri)!!!!", Online available at: <https://www.youtube.com/watch?v=_Coo2P8iIqQ>, Feb. 24, 2017, 3 pages.
Morrison Jonathan, "iPhone 5 Siri Demo", Online Available at:—<https://www.youtube.com/watch?v=_wHWwG5lhWc>, Sep. 21, 2012, 3 pages.
Nakamura et al., "Realization of a Browser to Filter Spoilers Dynamically", vol. No. 67, 2010, 8 pages (Official Copy Only). {See communication under Rule 37 CFR § 1.98(a) (3)}.
Nakamura et al., "Study of Information Clouding Methods to Prevent Spoilers of Sports Match", Proceedings of the International Working Conference on Advanced Visual Interfaces (AVI' 12), ISBN: 978-1-4503-1287-5, May 2012, pp. 661-664.
Nakamura et al., "Study of Methods to Diminish Spoilers of Sports Match: Potential of a Novel Concept "Information Clouding"", vol. 54, No. 4, ISSN: 1882-7764. Online available at: <https://ipsj.ixsq.nii.ac.jp/ej/index.php?active_action=repository_view_main_item_detail&page_id=13&block_id=8&item_id=91589&item_no=1>, Apr. 2013, pp. 1402-1412 (Official Copy Only). {See communication under Rule 37 CFR § 1.98(a) (3)}.
Nakamura Satoshi, "Antispoiler : An Web Browser to Filter Spoiler", vol. 2010-HCL-139 No. 17, Online available at:—<https://ipsj.ixsq.nii.ac.jp/ej/index.php?active_action=repository_view_main_item_detail&page_id=13&block_id=8&item_id=70067&item_no=1>, Jul. 31, 2010, 8 pages (Official Copy Only). {See communication under Rule 37 CFR § 1.98(a) (3)}.
Nakazawa et al., "Detection and Labeling of Significant Scenes from TV program based on Twitter Analysis", Proceedings of the 3rd Forum on Data Engineering and Information Management (deim 2011 proceedings), IEICE Data Engineering Technical Group, Feb. 28, 2011, 11 pages (Official Copy Only). {See communication under Rule 37 CFR § 1.98(a) (3)}.
Nozawa et al., "iPhone 4S Perfect Manual", vol. 1, First Edition, Nov. 11, 2011, 4 pages (Official Copy Only). {See communication under Rule 37 CFR § 1.98(a) (3)}.
Pak, Gamerz, "Braina: Artificially Intelligent Assistant Software for Windows PC in (urdu / hindhi)", Online available at: <https://www.youtube.com/watch?v=JH_rMjw8lqc>, Jul. 24, 2018, 3 pages.
Patra et al., "A Kernel-Based Approach for Biomedical Named Entity Recognition", Scientific World Journal, vol. 2013, 2013, pp. 1-7.
PC Mag, "How to Voice Train Your Google Home Smart Speaker", Online available at: <https://in.pcmag.com/google-home/126520/how-to-voice-train-your-google-home-smart-speaker>, Oct. 25, 2018, 12 pages.
Pennington et al., "GloVe: Global Vectors for Word Representation", Proceedings of the Conference on Empirical Methods Natural Language Processing (EMNLP), Doha, Qatar, Oct. 25-29, 2014, pp. 1532-1543.
Perlow, Jason, "Alexa Loop Mode with Playlist for Sleep Noise", Online Available at: <https://www.youtube.com/watch?v=nSkSuXziJSg>, Apr. 11, 2016, 3 pages.
"Phoenix Solutions, Inc. v. West Interactive Corp.", Document 40, Declaration of Christopher Schmandt Regarding the MIT Galaxy System, Jul. 2, 2010, 162 pages.
pocketables.com,"AutoRemote example profile", Online available at: https://www.youtube.com/watch?v=kC_zhUnNZj8, Jun. 25, 2013, 1 page.
Qian et al., "Single-channel Multi-talker Speech Recognition With Permutation Invariant Training", Speech Communication, Issue 104, 2018, pp. 1-11.
"Quick Type Keyboard on iOS 8 Makes Typing Easier", Online available at:—<https://www.youtube.com/watch?v=0CldLR4fhVU>, Jun. 3, 2014, 3 pages.
Rasch, Katharina, "Smart Assistants for Smart Homes", Doctoral Thesis in Electronic and Computer Systems, 2013, 150 pages.
Ritchie, Rene, "QuickType keyboard in iOS 8: Explained", Online Available at:—<https://www.imore.com/quicktype-keyboards-ios-8-explained>, Jun. 21, 2014, pp. 1-19.
Routines, "SmartThings Support", Online available at:—<https://web.archive.org/web/20151207165701/https://support.smartthings.com/hc/en-us/articles/205380034-Routines>, 2015, 3 pages.
Rowland et al., "Designing Connected Products: UX for the Consumer Internet of Things", O'Reilly, May 2015, 452 pages.
Samsung Support, "Create a Quick Command in Bixby to Launch Custom Settings by at Your Command", Online Available at:—<https://www.facebook.corn/samsungsupport/videos/10154746303151213>, Nov. 13, 2017, 1 page.
Santos et al., "Fighting Offensive Language on Social Media with Unsupervised Text Style Transfer", Proceedings of the 56th Annual Meeting of the Association for Computational Linguistics (vol. 2: Short Papers), May 20, 2018, 6 pages.
Seehafer Brent, "Activate Google Assistant on Galaxy S7 with Screen off", Online available at:—<https://productforums.google.com/forum/#!topic/websearch/lp3qlGBHLVI>, Mar. 8, 2017, 4 pages.
Selfridge et al., "Interact: Tightly-coupling Multimodal Dialog with an Interactive Virtual Assistant", International Conference on Multimodal Interaction, ACM, Nov. 9, 2015, pp. 381-382.

(56) References Cited

OTHER PUBLICATIONS

Senior et al., "Improving DNN Speaker Independence With I-Vector Inputs", ICASSP, 2014, pp. 225-229.
Seroter et al., "SOA Patterns with BizTalk Server 2013 and Microsoft Azure", Packt Publishing, Jun. 2015, 454 pages.
Settle et al., "End-to-End Multi-Speaker Speech Recognition", Proc. ICASSP, Apr. 2018, 6 pages.
Shen et al., "Style Transfer from Non-Parallel Text by Cross-Alignment", 31st Conference on Neural Information Processing Systems (NIPS 2017), 2017, 12 pages.
Siou, Serge, "How to Control Apple TV 3rd Generation Using Remote app", Online available at: <https://www.youtube.com/watch?v=PhyKftZ0S9M>, May 12, 2014, 3 pages.
"Skilled at Playing my iPhone 5", Beijing Hope Electronic Press, Jan. 2013, 6 pages (Official Copy Only). {See communication under Rule 37 CFR § 1.98(a) (3)}.
"SmartThings +Amazon Echo", Smartthings Samsung [online], Online available at:—<https://web.archive.org/web/20160509231428/https://blog.smartthings.com/featured/alexa-turn-on-my-smartthings/>, Aug. 21, 2015, 3 pages.
Smith, Jake, "Amazon Alexa Calling: How to Set it up and Use it on Your Echo", iGeneration, May 30, 2017, 5 pages.
Spivack, Nova, "Sneak Preview of Siri—Part Two—Technical Foundations—Interview with Tom Gruber, CTO of Siri I Twine", Online Available at:—<https://web.archive.org/web/20100114234454/http://www.twine.com/item/12vhy39k4-22m/interview-with-tom-gruber-of-siri>, Jan. 14, 2010, 5 pages.
Sundermeyer et al., "From Feedforward to Recurrent LSTM Neural Networks for Language Modeling.", IEEE Transactions to Audio, Speech, and Language Processing, vol. 23, No. 3, Mar. 2015, pp. 517-529.
Sundermeyer et al., "LSTM Neural Networks for Language Modeling", INTERSPEECH 2012, Sep. 9-13, 2012, pp. 194-197.
Tan et al., "Knowledge Transfer in Permutation Invariant Training for Single-channel Multi-talker Speech Recognition", ICASSP 2018, 2018, pp. 5714-5718.
Tanaka Tatsuo, "Next Generation IT Channel Strategy Through "Experience Technology"", Intellectual Resource Creation, Japan, Nomura Research Institute Ltd. vol. 19, No. 1, Dec. 20, 2010, 17 pages. (Official Copy Only) {See communication under Rule 37 CFR § 1.98(a) (3)}.
Vaswani et al., "Attention Is All You Need", 31st Conference on Neural Information Processing Systems (NIPS 2017), 2017, pp. 1-11.
Villemure et al., "The Dragon Drive Innovation Showcase: Advancing the State-of-the-art in Automotive Assistants", 2018, 7 pages.
Vodafone Deutschland, "Samsung Galaxy S3 Tastatur Spracheingabe", Online available at—<https://www.youtube.com/watch?v=6kOd6Gr8uFE>, Aug. 22, 2012, 1 page.
Wang et al., "End-to-end Anchored Speech Recognition", Proc. ICASSP2019, May 12-17, 2019, 5 pages.
Weng et al., "Deep Neural Networks for Single-Channel Multi-Talker Speech Recognition", IEEE/ACM Transactions on Audio, Speech, and Language Processing, vol. 23, No. 10, Oct. 2015, pp. 1670-1679.
Wikipedia, "Home Automation", Online Available at:—<https://en.wikipedia.org/w/index.php?title=Home_automation&oldid=686569068>, Oct. 19, 2015, 9 pages.
Wikipedia, "Siri", Online Available at:—<https://en.wikipedia.org/w/index.php?title=Siri&oldid=689697795>, Nov. 8, 2015, 13 Pages.
Wikipedia, "Virtual Assistant", Wikipedia, Online Available at: <https://en.wikipedia.org/w/index.php?title=Virtual_assistant&oldid=679330666>, Sep. 3, 2015, 4 pages.
X.AI, "How it Works", Online available at:—<https://web.archive.org/web/20160531201426/https://x.ai/how-it-works/>, May 31, 2016, 6 pages.
Xu et al., "Policy Optimization of Dialogue Management in Spoken Dialogue System for Out-of-Domain Utterances", 2016 International Conference on Asian Language Processing (IALP), IEEE, Nov. 21, 2016, pp. 10-13.
Yan et al., "A Scalable Approach to Using DNN-derived Features in GMM-HMM Based Acoustic Modeling for LVCSR", 14th Annual Conference of the International Speech Communication Association, InterSpeech 2013, Aug. 2013, pp. 104-108.
Yang Astor, "Control Android TV via Mobile Phone App RKRemoteControl", Online Available at : <https://www.youtube.com/watch?v=zpmUeOX_xro>, Mar. 31, 2015, 4 pages.
Yates MichaelC., "How Can I Exit Google Assistant After I'm Finished with it", Online available at:—<https://productforums.google.com/forum/#!msg/phone-by-google/faECnR2RJwA/gKNtOkQgAQAJ>, Jan. 11, 2016, 2 pages.
Ye et al., "iPhone 4S Native Secret", Jun. 30, 2012, 1 page (Official Copy Only). {See communication under Rule 37 CFR § 1.98(a) (3)}.
Yeh Jui-Feng, "Speech Act Identification Using Semantic Dependency Graphs With Probabilistic Context-free Grammars", ACM Transactions on Asian and Low-Resource Language Information Processing, vol. 15, No. 1, Dec. 2015, pp. 5.1-5.28.
Young et al., "The Hidden Information State Model: A Practical Framework for POMDP-Based Spoken Dialogue Management", Computer Speech & Language, vol. 24, Issue 2, Apr. 2010, pp. 150-174.
Yousef, Zulfikara., "Braina (A.I) Artificial Intelligence Virtual Personal Assistant", Online available at:—<https://www.youtube.com/watch?v=2h6xpB8bPSA>, Feb. 7, 2017, 3 pages.
Yu et al., "Permutation Invariant Training of Deep Models for Speaker-Independent Multi-talker Speech Separation", Proc. ICASSP, 2017, 5 pages.
Yu et al., "Recognizing Multi-talker Speech with Permutation Invariant Training", Interspeech 2017, Aug. 20-24, 2017, pp. 2456-2460.
Zangerle et al., "Recommending #-Tags in Twitter", proceedings of the Workshop on Semantic Adaptive Socail Web, 2011, pp. 1-12.
Zhan et al., "Play with Android Phones", Feb. 29, 2012, 1 page (Official Copy Only). {See Communication Under Rule 37 CFR § 1.98(a) (3)}.
Zmolikova et al., "Speaker-Aware Neural Network Based Beamformer for Speaker Extraction in Speech Mixtures", Interspeech 2017, Aug. 20-24, 2017, pp. 2655-2659.
Brief Communication Regarding Oral Proceedings received for European Patent Application No. 19157463.1, dated Mar. 8, 2021, 2 pages.
Decision to Refuse received for European Patent Application No. 16904830.3, dated Mar. 24, 2021, 20 pages.
Notice of Allowance received for Chinese Patent Application No. 201910010561.2, dated Feb. 25, 2021, 2 pages (1 page of English Translation and 1 page of Official Copy).
Office Action received for Australian Patent Application No. 2020201030, dated Mar. 9, 2021, 4 pages.
Result of Consultation received for European Patent Application No. 19157463.1, dated Mar. 5, 2021, 7 pages.

* cited by examiner
‡ imported from a related application

INTELLIGENT DIGITAL ASSISTANT IN A MULTI-TASKING ENVIRONMENT

CROSS-REFERENCE TO RELATED APPLICATIONS

This application is a continuation of U.S. patent application Ser. No. 15/271,766, filed Sep. 21, 2016, entitled “INTELLIGENT DIGITAL ASSISTANT IN A MULTI-TASKING ENVIRONMENT,” which claims priority to U.S. Provisional Patent Application Ser. No. 62/348,728, entitled “INTELLIGENT DIGITAL ASSISTANT IN A MULTI-TASKING ENVIRONMENT,” filed on Jun. 10, 2016. The content of both applications are hereby incorporated by reference in their entirety for all purposes.

FIELD

The present disclosure relates generally to a digital assistant and, more specifically, to a digital assistant that interacts with a user to perform a task in a multi-tasking environment.

BACKGROUND

Digital assistants are increasing popular. In a desktop or tablet environment, a user frequently multi-tasks including searching files or information, managing files or folders, playing movies or songs, editing documents, adjusting system configurations, sending emails, etc. It is often cumbersome and inconvenient for the user to manually perform multiple tasks in parallel and to frequently switch between tasks. It is thus desirable for a digital assistant to have the ability to assist the user to perform some of the tasks in a multi-tasking environment based on a user's voice input.

BRIEF SUMMARY

Some existing techniques for assisting the user to perform a task in a multi-tasking environment may include, for example, dictation. Typically, a user may be required to manually perform many other tasks in a multi-tasking environment. As an example, a user may have been working on a presentation yesterday on his or her desktop computer and may wish to continue to work on the presentation. The user is typically required to manually locate the presentation on his or her desktop computer, open the presentation, and continue the editing of the presentation.

As another example, a user may have been booking a flight on his or her smartphone when the user is away from his desktop computer. The user may wish to continue booking the flight when the desktop computer is available. In existing technologies, the user needs to launch a web browser and start over on the flight booking process at the user's desktop computer. In other words, the prior flight booking progress that the user made at the smartphone may not be continued at the user's desktop computer.

As another example, a user may be editing a document on his or her desktop computer and wish to change a system configuration such as changing the brightness level of the screen, turning on Bluetooth connections, or the like. In existing technologies, the user may need to stop editing the document, find and launch the brightness configuration application, and manually change the settings. In a multi-tasking environment, some existing technologies are incapable of performing tasks as described in the above examples based on a user's speech input. Providing a voice-enabled digital assistant in a multi-tasking environment is thus desired and advantageous.

Systems and processes for operating a digital assistant are provided. In accordance with one or more examples, a method includes, at a user device with one or more processors and memory, receiving a first speech input from a user. The method further includes identifying context information associated with the user device and determining a user intent based on the first speech input and the context information. The method further includes determining whether the user intent is to perform a task using a searching process or an object managing process. The searching process is configured to search data stored internally or externally to the user device, and the object managing process is configured to manage objects associated with the user device. The method further includes, in accordance with a determination that the user intent is to perform the task using the searching process, performing the task using the searching process. The method further includes, in accordance with the determination that the user intent is to perform the task using the object managing process, performing the task using the object managing process.

In accordance with one or more examples, a method includes, at a user device with one or more processors and memory, receiving a speech input from a user to perform a task. The method further includes identifying context information associated with the user device and determining a user intent based on the speech input and context information associated with the user device. The method further includes, in accordance with user intent, determining whether the task is to be performed at the user device or at a first electronic device communicatively connected to the user device. The method further includes, in accordance with a determination that the task is to be performed at the user device and content for performing the task is located remotely, receiving the content for performing the task. The method further includes, in accordance with a determination that the task is to be performed at the first electronic device and the content for performing the task is located remotely to the first electronic device, providing the content for performing the task to the first electronic device.

In accordance with one or more examples, a method includes, at a user device with one or more processors and memory, receiving a speech input from a user to manage one or more system configurations of the user device. The user device is configured to concurrently provide a plurality of user interfaces. The method further includes identifying context information associated with the user device and determining a user intent based on the speech input and context information. The method further includes determining whether the user intent indicates an informational request or a request for performing a task. The method further includes, in accordance with a determination that the user intent indicates an informational request, providing a spoken response to the informational request. The method further includes, in accordance with a determination that the user intent indicates a request for performing a task, instantiating a process associated with the user device to perform the task.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

Figure 1:
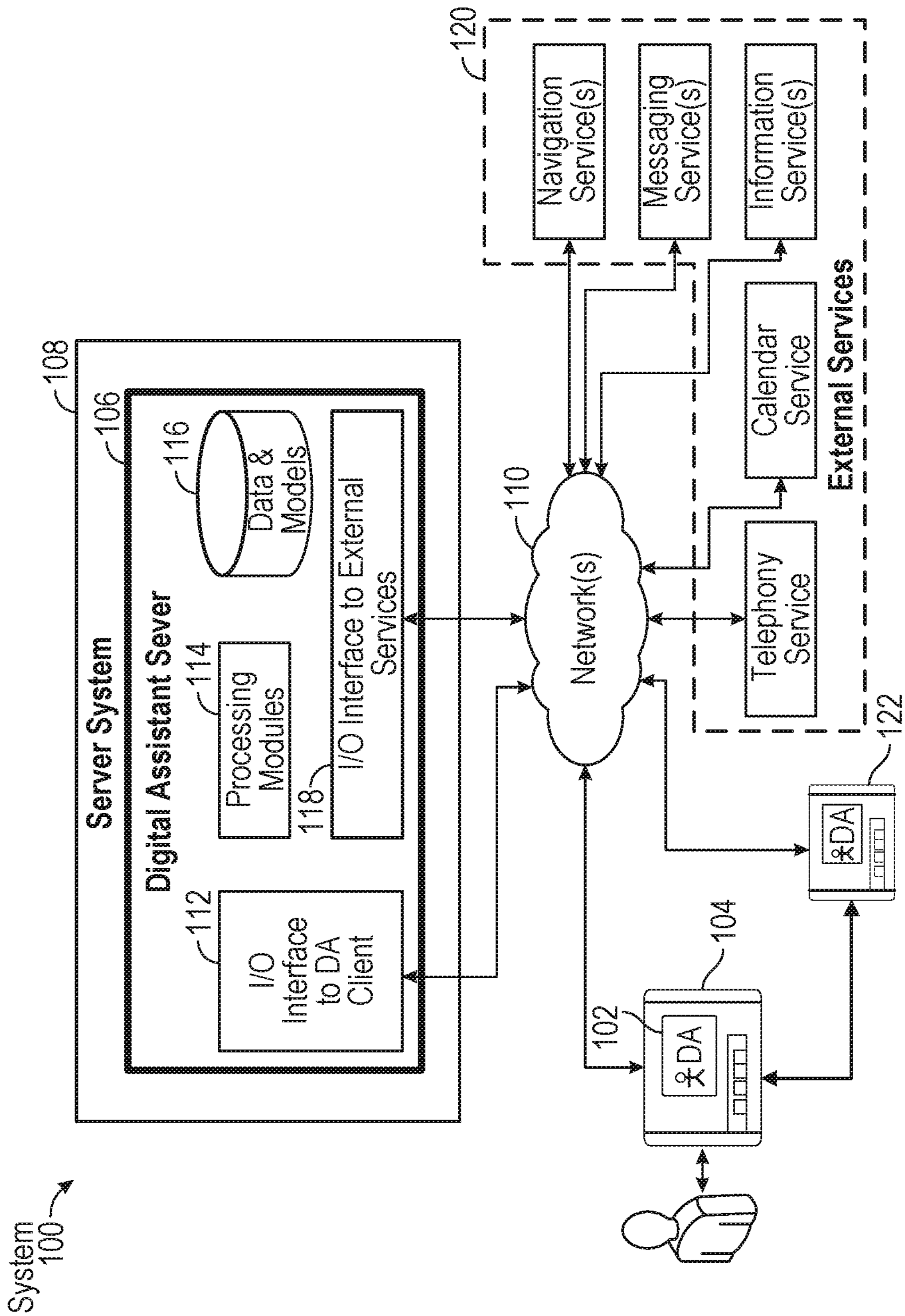
FIG. 1 is a block diagram illustrating a system and environment for implementing a digital assistant according to various examples.

In the following description of the disclosure and embodiments, reference is made to the accompanying drawings, in which it is shown by way of illustration, of specific embodiments that can be practiced. It is to be understood that other embodiments and examples can be practiced and changes can be made without departing from the scope of the disclosure.

Techniques for providing a digital assistant in a multitasking environment are desirable. As described herein, techniques for providing a digital assistant in a multi-tasking environment are desired for various purposes such as reducing the cumbersomeness of searching objects or information, enabling efficient object management, maintaining continuity between tasks performed at the user device and at another electronic device, and reducing the user's manual effort in adjusting system configurations. Such techniques are advantageous by allowing the user to operate a digital assistant to perform various tasks using speech inputs in a multi-tasking environment. Further, such techniques alleviate the cumbersomeness or inconvenience associated with performing various tasks in a multi-tasking environment. Furthermore, by allowing the user to perform tasks using speech, they are able to keep both hands on the keyboard or mouse while performing tasking that would require a context switch—effectively, allowing the digital assistant to perform tasks as if a "third-hand" of the user. As will be appreciated, by allowing the user to perform tasks using speech it allows the user to more efficiently complete tasks that may require multiple interactions with multiple applications. For example, searching for images and sending them to an individual in an email may require opening a search interface, entering search terms, selecting one or more results, opening am email for composition, copying or moving the resulting files to the open email, addressing the email and sending it. Such a task can be completed more efficiently by voice with a command such as "find pictures from X date and send them to my wife". Similar requests for moving files, searching for information on the internet, composing messages can all be made more efficient using voice, while simultaneously allowing the user to perform other tasks using their hands.

Although the following description uses terms "first," "second," etc. to describe various elements, these elements should not be limited by the terms. These terms are only used to distinguish one element from another. For example, a first storage could be termed a second storage, and, similarly, a second storage could be termed a first storage, without departing from the scope of the various described examples. The first storage and the second storage can both be storages and, in some cases, can be separate and different storages.

The terminology used in the description of the various described examples herein is for the purpose of describing particular examples only and is not intended to be limiting. As used in the description of the various described examples and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

1. System and Environment

FIG. 1 illustrates a block diagram of system 100 according to various examples. In some examples, system 100 can implement a digital assistant. The terms "digital assistant," "virtual assistant," "intelligent automated assistant," or "automatic digital assistant" can refer to any information processing system that interprets natural language input in spoken and/or textual form to infer user intent, and performs actions based on the inferred user intent. For example, to act on an inferred user intent, the system can perform one or more of the following: identifying a task flow with steps and parameters designed to accomplish the inferred user intent, inputting specific requirements from the inferred user intent into the task flow; executing the task flow by invoking programs, methods, services, APIs, or the like; and generating output responses to the user in an audible (e.g., speech) and/or visual form.

Specifically, a digital assistant can be capable of accepting a user request at least partially in the form of a natural language command, request, statement, narrative, and/or inquiry. Typically, the user request can seek either an informational answer or performance of a task by the digital assistant. A satisfactory response to the user request can be a provision of the requested informational answer, a performance of the requested task, or a combination of the two. For example, a user can ask the digital assistant a question, such as "Where am I right now?" Based on the user's current location, the digital assistant can answer, "You are in Central Park near the west gate." The user can also request the performance of a task, for example, "Please invite my friends to my girlfriend's birthday party next week." In response, the digital assistant can acknowledge the request by saying "Yes, right away," and then send a suitable calendar invite on behalf of the user to each of the user's friends listed in the user's electronic address book. During performance of a requested task, the digital assistant can sometimes interact with the user in a continuous dialogue involving multiple exchanges of information over an extended period of time. There are numerous other ways of interacting with a digital assistant to request information or performance of various tasks. In addition to providing verbal responses and taking programmed actions, the digital assistant can also provide responses in other visual or audio forms, e.g., as text, alerts, music, videos, animations, etc.

As shown in FIG. 1, in some examples, a digital assistant can be implemented according to a client-server model. The digital assistant can include client-side portion 102 (hereafter "DA client 102") executed on user device 104 and server-side portion 106 (hereafter "DA server 106") executed on server system 108. DA client 102 can communicate with DA server 106 through one or more networks 110. DA client 102 can provide client-side functionalities such as user-facing input and output processing and communication with DA server 106. DA server 106 can provide server-side functionalities for any number of DA clients 102 each residing on a respective user device 104.

In some examples, DA server 106 can include client-facing I/O interface 112, one or more processing modules 114, data and models 116, and I/O interface to external services 118. The client-facing I/O interface 112 can facilitate the client-facing input and output processing for DA server 106. One or more processing modules 114 can utilize data and models 116 to process speech input and determine the user's intent based on natural language input. Further, one or more processing modules 114 perform task execution based on inferred user intent. In some examples, DA server 106 can communicate with external services 120 through network(s) 110 for task completion or information acquisition. I/O interface to external services 118 can facilitate such communications.

User device 104 can be any suitable electronic device. For example, user devices can be a portable multifunctional device (e.g., device 200, described below with reference to FIG. 2A), a multifunctional device (e.g., device 400, described below with reference to FIG. 4), or a personal electronic device (e.g., device 600, described below with reference to FIG. 6A-B). A portable multifunctional device can be, for example, a mobile telephone that also contains other functions, such as PDA and/or music player functions. Specific examples of portable multifunction devices can include the iPhone®, iPod Touch®, and iPad® devices from Apple Inc. of Cupertino, Calif. Other examples of portable multifunction devices can include, without limitation, laptop or tablet computers. Further, in some examples, user device 104 can be a non-portable multifunctional device. In particular, user device 104 can be a desktop computer, a game console, a television, or a television set-top box. In some examples, user device 104 can operate in a multi-tasking environment. A multi-tasking environment allows a user to operate device 104 to perform multiple tasks in parallel. For example, a multi-tasking environment may be a desktop or laptop environment, in which device 104 may perform one task in response to the user input received from a physical user-interface device and, in parallel, perform another task in response to the user's voice input. In some examples, user device 104 can include a touch-sensitive surface (e.g., touch screen displays and/or touchpads). Further, user device 104 can optionally include one or more other physical user-interface devices, such as a physical keyboard, a mouse, and/or a joystick. Various examples of electronic devices, such as multifunctional devices, are described below in greater detail.

Examples of communication network(s) 110 can include local area networks (LAN) and wide area networks (WAN), e.g., the Internet. Communication network(s) 110 can be implemented using any known network protocol, including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 can be implemented on one or more standalone data processing apparatus or a distributed network of computers. In some examples, server system 108 can also employ various virtual devices and/or services of third-party service providers (e.g., third-party cloud service providers) to provide the underlying computing resources and/or infrastructure resources of server system 108.

In some examples, user device 104 can communicate with DA server 106 via second user device 122. Second user device 122 can be similar or identical to user device 104. For example, second user device 122 can be similar to devices 200, 400, or 600 described below with reference to FIGS. 2A, 4, and 6A-B. User device 104 can be configured to communicatively couple to second user device 122 via a direct communication connection, such as Bluetooth, NFC, BTLE, or the like, or via a wired or wireless network, such as a local Wi-Fi network. In some examples, second user device 122 can be configured to act as a proxy between user device 104 and DA server 106. For example, DA client 102 of user device 104 can be configured to transmit information (e.g., a user request received at user device 104) to DA server 106 via second user device 122. DA server 106 can process the information and return relevant data (e.g., data content responsive to the user request) to user device 104 via second user device 122.

In some examples, user device 104 can be configured to communicate abbreviated requests for data to second user device 122 to reduce the amount of information transmitted from user device 104. Second user device 122 can be configured to determine supplemental information to add to the abbreviated request to generate a complete request to transmit to DA server 106. This system architecture can advantageously allow user device 104 having limited communication capabilities and/or limited battery power (e.g., a watch or a similar compact electronic device) to access services provided by DA server 106 by using second user device 122, having greater communication capabilities and/or battery power (e.g., a mobile phone, laptop computer, tablet computer, or the like), as a proxy to DA server 106. While only two user devices 104 and 122 are shown in FIG. 1, it should be appreciated that system 100 can include any number and type of user devices configured in this proxy configuration to communicate with DA server system 106.

Although the digital assistant shown in FIG. 1 can include both a client-side portion (e.g., DA client 102) and a server-side portion (e.g., DA server 106), in some examples, the functions of a digital assistant can be implemented as a standalone application installed on a user device. In addition, the divisions of functionalities between the client and server portions of the digital assistant can vary in different implementations. For instance, in some examples, the DA client can be a thin-client that provides only user-facing input and output processing functions, and delegates all other functionalities of the digital assistant to a backend server.

2. Electronic Devices

Figure 2A:
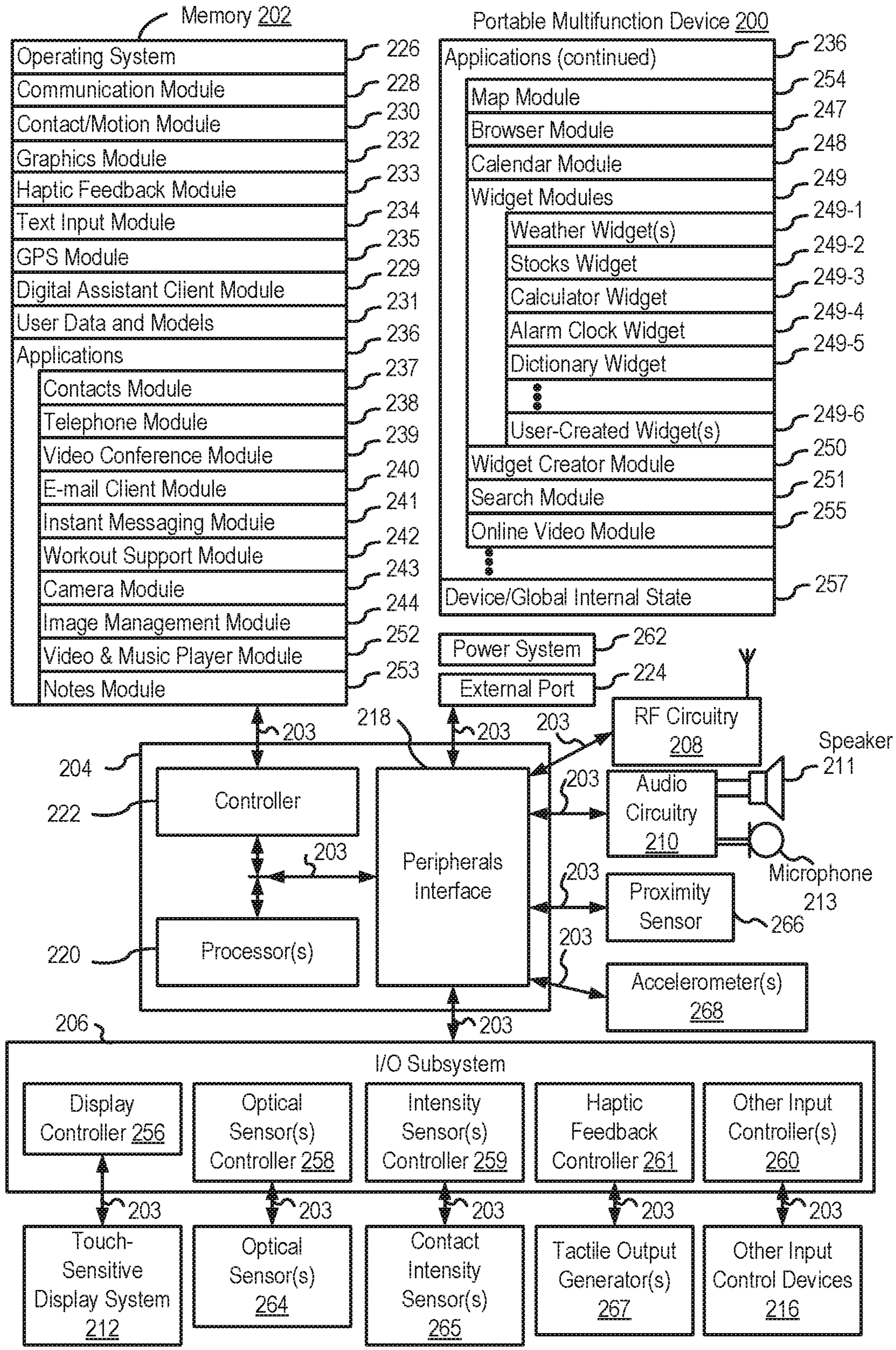
FIG. 2A is a block diagram illustrating a portable multifunction device implementing the client-side portion of a digital assistant in accordance with some embodiments.

Attention is now directed toward embodiments of electronic devices for implementing the client-side portion of a digital assistant. FIG. 2A is a block diagram illustrating portable multifunction device 200 with touch-sensitive display system 212 in accordance with some embodiments. Touch-sensitive display 212 is sometimes called a "touch screen" for convenience and is sometimes known as or called a "touch-sensitive display system." Device 200 includes memory 202 (which optionally includes one or more computer-readable storage mediums), memory controller 222, one or more processing units (CPUs) 220, peripherals interface 218, RF circuitry 208, audio circuitry 210, speaker 211, microphone 213, input/output (I/O) subsystem 206, other input control devices 216, and external port 224. Device 200 optionally includes one or more optical sensors 264. Device 200 optionally includes one or more contact intensity sensors 265 for detecting intensity of contacts on device 200 (e.g., a touch-sensitive surface such as touch-sensitive display system 212 of device 200). Device 200 optionally includes one or more tactile output generators 267 for generating tactile outputs on device 200 (e.g., generating tactile outputs on a touch-sensitive surface such as touch-sensitive display system 212 of device 200 or touchpad 455 of device 400). These components optionally communicate over one or more communication buses or signal lines 203.

As used in the specification and claims, the term "intensity" of a contact on a touch-sensitive surface refers to the force or pressure (force per unit area) of a contact (e.g., a finger contact) on the touch-sensitive surface or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 200 is only one example of a portable multifunction device, and that device 200 optionally has more or fewer components than shown, optionally combines two or more components, or optionally has a different configuration or arrangement of the components. The various components shown in FIG. 2A are implemented in hardware, software, or a combination of both hardware and software, including one or more signal processing and/or application-specific integrated circuits.

Memory 202 may include one or more computer-readable storage mediums. The computer-readable storage mediums may be tangible and non-transitory. Memory 202 may include high-speed random access memory and may also include non-volatile memory, such as one or more magnetic disk storage devices, flash memory devices, or other non-volatile solid-state memory devices. Memory controller 222 may control access to memory 202 by other components of device 200.

In some examples, a non-transitory computer-readable storage medium of memory 202 can be used to store instructions (e.g., for performing aspects of process 1200, described below) for use by or in connection with an instruction execution system, apparatus, or device, such as a computer-based system, processor-containing system, or other system that can fetch the instructions from the instruction execution system, apparatus, or device and execute the instructions. In other examples, the instructions (e.g., for performing aspects of process 1200, described below) can be stored on a non-transitory computer-readable storage medium (not shown) of the server system 108 or can be divided between the non-transitory computer-readable storage medium of memory 202 and the non-transitory computer-readable storage medium of server system 108. In the context of this document, a "non-transitory computer-readable storage medium" can be any medium that can contain or store the program for use by or in connection with the instruction execution system, apparatus, or device.

Peripherals interface 218 can be used to couple input and output peripherals of the device to CPU 220 and memory 202. The one or more processors 220 run or execute various software programs and/or sets of instructions stored in memory 202 to perform various functions for device 200 and to process data. In some embodiments, peripherals interface 218, CPU 220, and memory controller 222 may be implemented on a single chip, such as chip 204. In some other embodiments, they may be implemented on separate chips.

RF (radio frequency) circuitry 208 receives and sends RF signals, also called electromagnetic signals. RF circuitry 208 converts electrical signals to/from electromagnetic signals and communicates with communications networks and other communications devices via the electromagnetic signals. RF circuitry 208 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 208 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 208 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 210, speaker 211, and microphone 213 provide an audio interface between a user and device 200. Audio circuitry 210 receives audio data from peripherals interface 218, converts the audio data to an electrical signal, and transmits the electrical signal to speaker 211. Speaker 211 converts the electrical signal to human-audible sound waves. Audio circuitry 210 also receives electrical signals converted by microphone 213 from sound waves. Audio circuitry 210 converts the electrical signal to audio data and transmits the audio data to peripherals interface 218 for processing. Audio data may be retrieved from and/or transmitted to memory 202 and/or RF circuitry 208 by peripherals interface 218. In some embodiments, audio circuitry 210 also includes a headset jack (e.g., 312, FIG. 3). The headset jack provides an interface between audio circuitry 210 and removable audio input/output peripherals, such as output-only headphones or a headset with both output (e.g., a headphone for one or both ears) and input (e.g., a microphone).

I/O subsystem 206 couples input/output peripherals on device 200, such as touch screen 212 and other input control devices 216, to peripherals interface 218. I/O subsystem 206 optionally includes display controller 256, optical sensor controller 258, intensity sensor controller 259, haptic feedback controller 261, and one or more input controllers 260 for other input or control devices. The one or more input controllers 260 receive/send electrical signals from/to other input control devices 216. The other input control devices 216 optionally include physical buttons (e.g., push buttons, rocker buttons, etc.), dials, slider switches, joysticks, click wheels, and so forth. In some alternate embodiments, input controller(s) 260 are, optionally, coupled to any (or none) of the following: a keyboard, an infrared port, a USB port, and a pointer device such as a mouse. The one or more buttons (e.g., 308, FIG. 3) optionally include an up/down button for volume control of speaker 211 and/or microphone 213. The one or more buttons optionally include a push button (e.g., 306, FIG. 3).

A quick press of the push button may disengage a lock of touch screen 212 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 306) may turn power to device 200 on or off. The user may be able to customize a functionality of one or more of the buttons. Touch screen 212 is used to implement virtual or soft buttons and one or more soft keyboards.

Touch-sensitive display 212 provides an input interface and an output interface between the device and a user. Display controller 256 receives and/or sends electrical signals from/to touch screen 212. Touch screen 212 displays visual output to the user. The visual output may include graphics, text, icons, video, and any combination thereof (collectively termed "graphics"). In some embodiments, some or all of the visual output may correspond to user interface objects.

Touch screen 212 has a touch-sensitive surface, sensor, or set of sensors that accept input from the user based on haptic and/or tactile contact. Touch screen 212 and display controller 256 (along with any associated modules and/or sets of instructions in memory 202) detect contact (and any movement or breaking of the contact) on touch screen 212 and convert the detected contact into interaction with user interface objects (e.g., one or more soft keys, icons, web pages, or images) that are displayed on touch screen 212. In an exemplary embodiment, a point of contact between touch screen 212 and the user corresponds to a finger of the user.

Touch screen 212 may use LCD (liquid crystal display) technology, LPD (light-emitting polymer display) technology, or LED (light-emitting diode) technology, although other display technologies may be used in other embodiments. Touch screen 212 and display controller 256 may detect contact and any movement or breaking thereof using any of a plurality of touch-sensing technologies now known or later developed, including but not limited to capacitive, resistive, infrared, and surface acoustic wave technologies, as well as other proximity sensor arrays or other elements for determining one or more points of contact with touch screen 212. In an exemplary embodiment, projected mutual capacitance sensing technology is used, such as that found in the iPhone® and iPod Touch® from Apple Inc. of Cupertino, Calif.

A touch-sensitive display in some embodiments of touch screen 212 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 212 displays visual output from device 200, whereas touch-sensitive touchpads do not provide visual output.

A touch-sensitive display in some embodiments of touch screen 212 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 212 may have a video resolution in excess of 100 dpi. In some embodiments, the touch screen has a video resolution of approximately 160 dpi. The user may make contact with touch screen 212 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 200 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 212 or an extension of the touch-sensitive surface formed by the touch screen.

Device 200 also includes power system 262 for powering the various components. Power system 262 may include a power management system, one or more power sources (e.g., battery or alternating current (AC)), a recharging system, a power failure detection circuit, a power converter or inverter, a power status indicator (e.g., a light-emitting diode) and any other components associated with the generation, management, and distribution of power in portable devices.

Device 200 may also include one or more optical sensors 264. FIG. 2A shows an optical sensor coupled to optical sensor controller 258 in I/O subsystem 206. Optical sensor 264 may include charge-coupled device (CCD) or complementary metal-oxide semiconductor (CMOS) phototransistors. Optical sensor 264 receives light from the environment, projected through one or more lenses, and converts the light to data representing an image. In conjunction with imaging module 243 (also called a camera module), optical sensor 264 may capture still images or video. In some embodiments, an optical sensor is located on the back of device 200, opposite touch screen display 212 on the front of the device so that the touch screen display may be used as a viewfinder for still and/or video image acquisition. In some embodiments, an optical sensor is located on the front of the device, so that the user's image may be obtained for video conferencing while the user views the other video conference participants on the touch screen display. In some embodiments, the position of optical sensor 264 can be changed by the user (e.g., by rotating the lens and the sensor in the device housing) so that a single optical sensor 264 may be used along with the touch screen display for both video conferencing and still and/or video image acquisition.

Device 200 optionally also includes one or more contact intensity sensors 265. FIG. 2A shows a contact intensity sensor coupled to intensity sensor controller 259 in I/O subsystem 206. Contact intensity sensor 265 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 265 receives contact intensity information (e.g., pressure information or a proxy for pressure information) from the environment. In some embodiments, at least one contact intensity sensor is collocated with, or proximate to, a touch-sensitive surface (e.g., touch-sensitive display system 212). In some embodiments, at least one contact intensity sensor is located on the back of device 200, opposite touch screen display 212, which is located on the front of device 200.

Device 200 may also include one or more proximity sensors 266. FIG. 2A shows proximity sensor 266 coupled to peripherals interface 218. Alternately, proximity sensor 266 may be coupled to input controller 260 in I/O subsystem 206. Proximity sensor 266 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 212 when the multifunction device is placed near the user's ear (e.g., when the user is making a phone call).

Device 200 optionally also includes one or more tactile output generators 267. FIG. 2A shows a tactile output generator coupled to haptic feedback controller 261 in I/O subsystem 206. Tactile output generator 267 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 265 receives tactile feedback generation instructions from haptic feedback module 233 and generates tactile outputs on device 200 that are capable of being sensed by a user of device 200. In some embodiments, at least one tactile output generator is collocated with, or proximate to, a touch-sensitive surface (e.g., touch-sensitive display system 212) and, optionally, generates a tactile output by moving the touch-sensitive surface vertically (e.g., in/out of a surface of device 200) or laterally (e.g., back and forth in the same plane as a surface of device 200). In some embodiments, at least one tactile output generator sensor is located on the back of device 200, opposite touch screen display 212, which is located on the front of device 200.

Device 200 may also include one or more accelerometers 268. FIG. 2A shows accelerometer 268 coupled to peripherals interface 218. Alternately, accelerometer 268 may be coupled to an input controller 260 in I/O subsystem 206. Accelerometer 268 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 200 optionally includes, in addition to accelerometer(s) 268, a magnetometer (not shown) and a GPS (or GLONASS or other global navigation system) receiver (not shown) for obtaining information concerning the location and orientation (e.g., portrait or landscape) of device 200.

Figure 4:
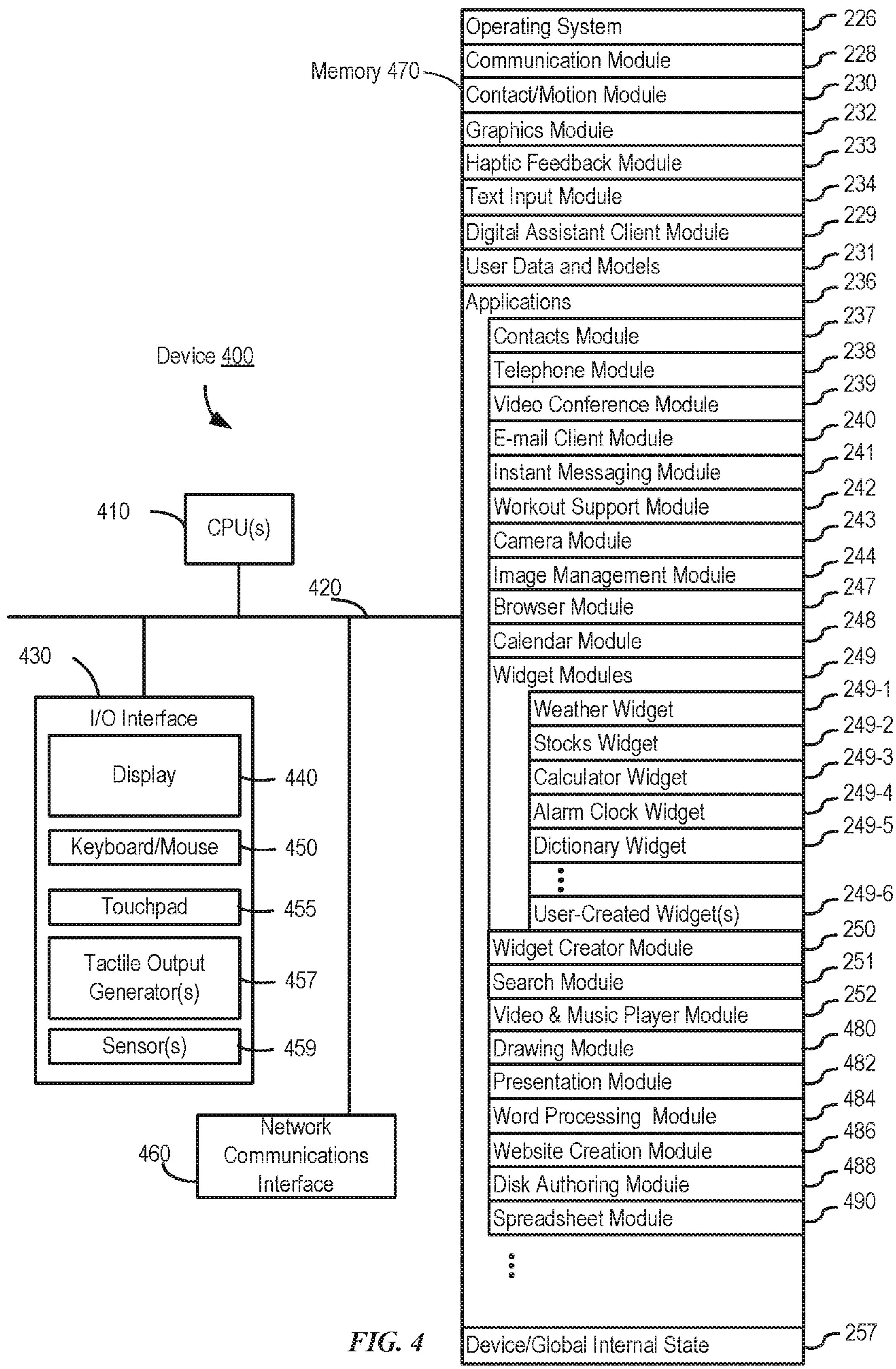
FIG. 4 is a block diagram of an exemplary multifunction device with a display and a touch-sensitive surface according to various examples.

In some embodiments, the software components stored in memory 202 include operating system 226, communication module (or set of instructions) 228, contact/motion module (or set of instructions) 230, graphics module (or set of instructions) 232, text input module (or set of instructions) 234, Global Positioning System (GPS) module (or set of instructions) 235, Digital Assistant Client Module 229, and applications (or sets of instructions) 236. Further, memory 202 can store data and models, such as user data and models 231. Furthermore, in some embodiments, memory 202 (FIG. 2A) or 470 (FIG. 4) stores device/global internal state 257, as shown in FIGS. 2A and 4. Device/global internal state 257 includes one or more of: active application state, indicating which applications, if any, are currently active; display state, indicating what applications, views, or other information occupy various regions of touch screen display 212; sensor state, including information obtained from the device's various sensors and input control devices 216; and location information concerning the device's location and/or attitude.

Operating system 226 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 228 facilitates communication with other devices over one or more external ports 224 and also includes various software components for handling data received by RF circuitry 208 and/or external port 224. External port 224 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 230 optionally detects contact with touch screen 212 (in conjunction with display controller 256) and other touch-sensitive devices (e.g., a touchpad or physical click wheel). Contact/motion module 230 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 230 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 230 and display controller 256 detect contact on a touchpad.

In some embodiments, contact/motion module 230 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 200). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 230 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 232 includes various known software components for rendering and displaying graphics on touch screen 212 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 232 stores data representing graphics to be used. Each graphic is, optionally, assigned a corresponding code. Graphics module 232 receives, from applications etc., one or more codes specifying graphics to be displayed along with, if necessary, coordinate data and other graphic property data and then generates screen image data to output to display controller 256.

Haptic feedback module 233 includes various software components for generating instructions used by tactile output generator(s) 267 to produce tactile outputs at one or more locations on device 200 in response to user interactions with device 200.

Text input module 234, which may be a component of graphics module 232, provides soft keyboards for entering text in various applications (e.g., contacts 237, email 240, IM 241, browser 247, and any other application that needs text input).

GPS module 235 determines the location of the device and provides this information for use in various applications (e.g., to telephone 238 for use in location-based dialing; to camera 243 as picture/video metadata; and to applications that provide location-based services such as weather widgets, local yellow page widgets, and map/navigation widgets).

Digital assistant client module 229 can include various client-side digital assistant instructions to provide the client-side functionalities of the digital assistant. For example, digital assistant client module 229 can be capable of accepting voice input (e.g., speech input), text input, touch input, and/or gestural input through various user interfaces (e.g., microphone 213, accelerometer(s) 268, touch-sensitive display system 212, optical sensor(s) 264, other input control devices 216, etc.) of portable multifunction device 200. Digital assistant client module 229 can also be capable of providing output in audio (e.g., speech output), visual, and/or tactile forms through various output interfaces (e.g., speaker 211, touch-sensitive display system 212, tactile output generator(s) 267, etc.) of portable multifunction device 200. For example, output can be provided as voice, sound, alerts, text messages, menus, graphics, videos, animations, vibrations, and/or combinations of two or more of the above. During operation, digital assistant client module 229 can communicate with DA server 106 using RF circuitry 208.

User data and models 231 can include various data associated with the user (e.g., user-specific vocabulary data, user preference data, user-specified name pronunciations, data from the user's electronic address book, to-do lists, shopping lists, etc.) to provide the client-side functionalities of the digital assistant. Further, user data and models 231 can includes various models (e.g., speech recognition models, statistical language models, natural language processing models, ontology, task flow models, service models, etc.) for processing user input and determining user intent.

In some examples, digital assistant client module 229 can utilize the various sensors, subsystems, and peripheral devices of portable multifunction device 200 to gather additional information from the surrounding environment of the portable multifunction device 200 to establish a context associated with a user, the current user interaction, and/or the current user input. In some examples, digital assistant client module 229 can provide the contextual information or a subset thereof with the user input to DA server 106 to help infer the user's intent. In some examples, the digital assistant can also use the contextual information to determine how to prepare and deliver outputs to the user. Contextual information can be referred to as context data.

In some examples, the contextual information that accompanies the user input can include sensor information, e.g., lighting, ambient noise, ambient temperature, images or videos of the surrounding environment, etc. In some examples, the contextual information can also include the physical state of the device, e.g., device orientation, device location, device temperature, power level, speed, acceleration, motion patterns, cellular signals strength, etc. In some examples, information related to the software state of DA server 106, e.g., running processes, installed programs, past and present network activities, background services, error logs, resources usage, etc., and of portable multifunction device 200 can be provided to DA server 106 as contextual information associated with a user input.

In some examples, the digital assistant client module 229 can selectively provide information (e.g., user data 231) stored on the portable multifunction device 200 in response to requests from DA server 106. In some examples, digital assistant client module 229 can also elicit additional input from the user via a natural language dialogue or other user interfaces upon request by DA server 106. Digital assistant client module 229 can pass the additional input to DA server 106 to help DA server 106 in intent deduction and/or fulfillment of the user's intent expressed in the user request.

A more detailed description of a digital assistant is described below with reference to FIGS. 7A-C. It should be recognized that digital assistant client module 229 can include any number of the sub-modules of digital assistant module 726 described below.

Applications 236 may include the following modules (or sets of instructions), or a subset or superset thereof:

- Contacts module 237 (sometimes called an address book or contact list);
- Video conference module 239;
- Email client module 240;
- Instant messaging (IM) module 241;
- Workout support module 242;
- Camera module 243 for still and/or video images;
- Image management module 244;
- Video player module;
- Music player module;
- Browser module 247;
- Calendar module 248;
- Widget modules 249, which may include one or more of: weather widget 249-1, stocks widget 249-2, calculator widget 249-3, alarm clock widget 249-4, dictionary widget 249-5, and other widgets obtained by the user, as well as user-created widgets 249-6;
- Widget creator module 250 for making user-created widgets 249-6;
- Search module 251;
- Video and music player module 252, which merges video player module and music player module;
- Notes module 253;
- Map module 254; and/or
- Online video module 255.

Examples of other applications 236 that may be stored in memory 202 include other word processing applications, other image editing applications, drawing applications, presentation applications, JAVA-enabled applications, encryption, digital rights management, voice recognition, and voice replication.

In conjunction with touch screen 212, display controller 256, contact/motion module 230, graphics module 232, and text input module 234, contacts module 237 may be used to manage an address book or contact list (e.g., stored in application internal state 292 of contacts module 237 in memory 202 or memory 470), including: adding name(s) to the address book; deleting name(s) from the address book; associating telephone number(s), email address(es), physical address(es) or other information with a name; associating an image with a name; categorizing and sorting names; providing telephone numbers or email addresses to initiate and/or facilitate communications by telephone 238, video conference module 239, email 240, or IM 241; and so forth.

In conjunction with RF circuitry 208, audio circuitry 210, speaker 211, microphone 213, touch screen 212, display controller 256, contact/motion module 230, graphics module 232, and text input module 234, telephone module 238 may be used to enter a sequence of characters corresponding to a telephone number, access one or more telephone numbers in contacts module 237, modify a telephone number that has been entered, dial a respective telephone number, conduct a conversation, and disconnect or hang up when the conversation is completed. As noted above, the wireless communication may use any of a plurality of communications standards, protocols, and technologies.

In conjunction with RF circuitry 208, audio circuitry 210, speaker 211, microphone 213, touch screen 212, display controller 256, optical sensor 264, optical sensor controller 258, contact/motion module 230, graphics module 232, text input module 234, contacts module 237, and telephone module 238, video conference module 239 includes executable instructions to initiate, conduct, and terminate a video conference between a user and one or more other participants in accordance with user instructions.

In conjunction with RF circuitry 208, touch screen 212, display controller 256, contact/motion module 230, graphics module 232, and text input module 234, email client module 240 includes executable instructions to create, send, receive, and manage email in response to user instructions. In conjunction with image management module 244, email client module 240 makes it very easy to create and send emails with still or video images taken with camera module 243.

In conjunction with RF circuitry 208, touch screen 212, display controller 256, contact/motion module 230, graphics module 232, and text input module 234, instant messaging module 241 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages may include graphics, photos, audio files, video files, and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 208, touch screen 212, display controller 256, contact/motion module 230, graphics module 232, text input module 234, GPS module 235, map module 254, and music player module, workout support module 242 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 212, display controller 256, optical sensor(s) 264, optical sensor controller 258, contact/motion module 230, graphics module 232, and image management module 244, camera module 243 includes executable instructions to capture still images or video (including a video stream) and store them into memory 202, modify characteristics of a still image or video, or delete a still image or video from memory 202.

In conjunction with touch screen 212, display controller 256, contact/motion module 230, graphics module 232, text input module 234, and camera module 243, image management module 244 includes executable instructions to arrange, modify (e.g., edit), or otherwise manipulate, label, delete, present (e.g., in a digital slide show or album), and store still and/or video images.

In conjunction with RF circuitry 208, touch screen 212, display controller 256, contact/motion module 230, graphics module 232, and text input module 234, browser module 247 includes executable instructions to browse the Internet in accordance with user instructions, including searching, linking to, receiving, and displaying web pages or portions thereof, as well as attachments and other files linked to web pages.

In conjunction with RF circuitry 208, touch screen 212, display controller 256, contact/motion module 230, graphics module 232, text input module 234, email client module 240, and browser module 247, calendar module 248 includes executable instructions to create, display, modify, and store calendars and data associated with calendars (e.g., calendar entries, to-do lists, etc.) in accordance with user instructions.

In conjunction with RF circuitry 208, touch screen 212, display controller 256, contact/motion module 230, graphics module 232, text input module 234, and browser module 247, widget modules 249 are mini-applications that may be downloaded and used by a user (e.g., weather widget 249-1, stocks widget 249-2, calculator widget 249-3, alarm clock widget 249-4, and dictionary widget 249-5) or created by the user (e.g., user-created widget 249-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 208, touch screen 212, display controller 256, contact/motion module 230, graphics module 232, text input module 234, and browser module 247, the widget creator module 250 may be used by a user to create widgets (e.g., turning a user-specified portion of a web page into a widget).

In conjunction with touch screen 212, display controller 256, contact/motion module 230, graphics module 232, and text input module 234, search module 251 includes executable instructions to search for text, music, sound, image, video, and/or other files in memory 202 that match one or more search criteria (e.g., one or more user-specified search terms) in accordance with user instructions.

In conjunction with touch screen 212, display controller 256, contact/motion module 230, graphics module 232, audio circuitry 210, speaker 211, RF circuitry 208, and browser module 247, video and music player module 252 includes executable instructions that allow the user to download and play back recorded music and other sound files stored in one or more file formats, such as MP3 or AAC files, and executable instructions to display, present, or otherwise play back videos (e.g., on touch screen 212 or on an external, connected display via external port 224). In some embodiments, device 200 optionally includes the functionality of an MP3 player, such as an iPod (trademark of Apple Inc.).

In conjunction with touch screen 212, display controller 256, contact/motion module 230, graphics module 232, and text input module 234, notes module 253 includes executable instructions to create and manage notes, to-do lists, and the like in accordance with user instructions.

In conjunction with RF circuitry 208, touch screen 212, display controller 256, contact/motion module 230, graphics module 232, text input module 234, GPS module 235, and browser module 247, map module 254 may be used to receive, display, modify, and store maps and data associated with maps (e.g., driving directions, data on stores and other points of interest at or near a particular location, and other location-based data) in accordance with user instructions.

In conjunction with touch screen 212, display controller 256, contact/motion module 230, graphics module 232, audio circuitry 210, speaker 211, RF circuitry 208, text input module 234, email client module 240, and browser module 247, online video module 255 includes instructions that allow the user to access, browse, receive (e.g., by streaming and/or download), play back (e.g., on the touch screen or on an external, connected display via external port 224), send an email with a link to a particular online video, and otherwise manage online videos in one or more file formats, such as H.264. In some embodiments, instant messaging module 241, rather than email client module 240, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules may be combined or otherwise rearranged in various embodiments. For example, video player module may be combined with music player module into a single module (e.g., video and music player module 252, FIG. 2A). In some embodiments, memory 202 may store a subset of the modules and data structures identified above. Furthermore, memory 202 may store additional modules and data structures not described above.

In some embodiments, device 200 is a device where operation of a predefined set of functions on the device is performed exclusively through a touch screen and/or a touchpad. By using a touch screen and/or a touchpad as the primary input control device for operation of device 200, the number of physical input control devices (such as push buttons, dials, and the like) on device 200 may be reduced.

The predefined set of functions that are performed exclusively through a touch screen and/or a touchpad optionally include navigation between user interfaces. In some embodiments, the touchpad, when touched by the user, navigates device 200 to a main, home, or root menu from any user interface that is displayed on device 200. In such embodiments, a "menu button" is implemented using a touchpad. In some other embodiments, the menu button is a physical push button or other physical input control device instead of a touchpad.

Figure 2B:
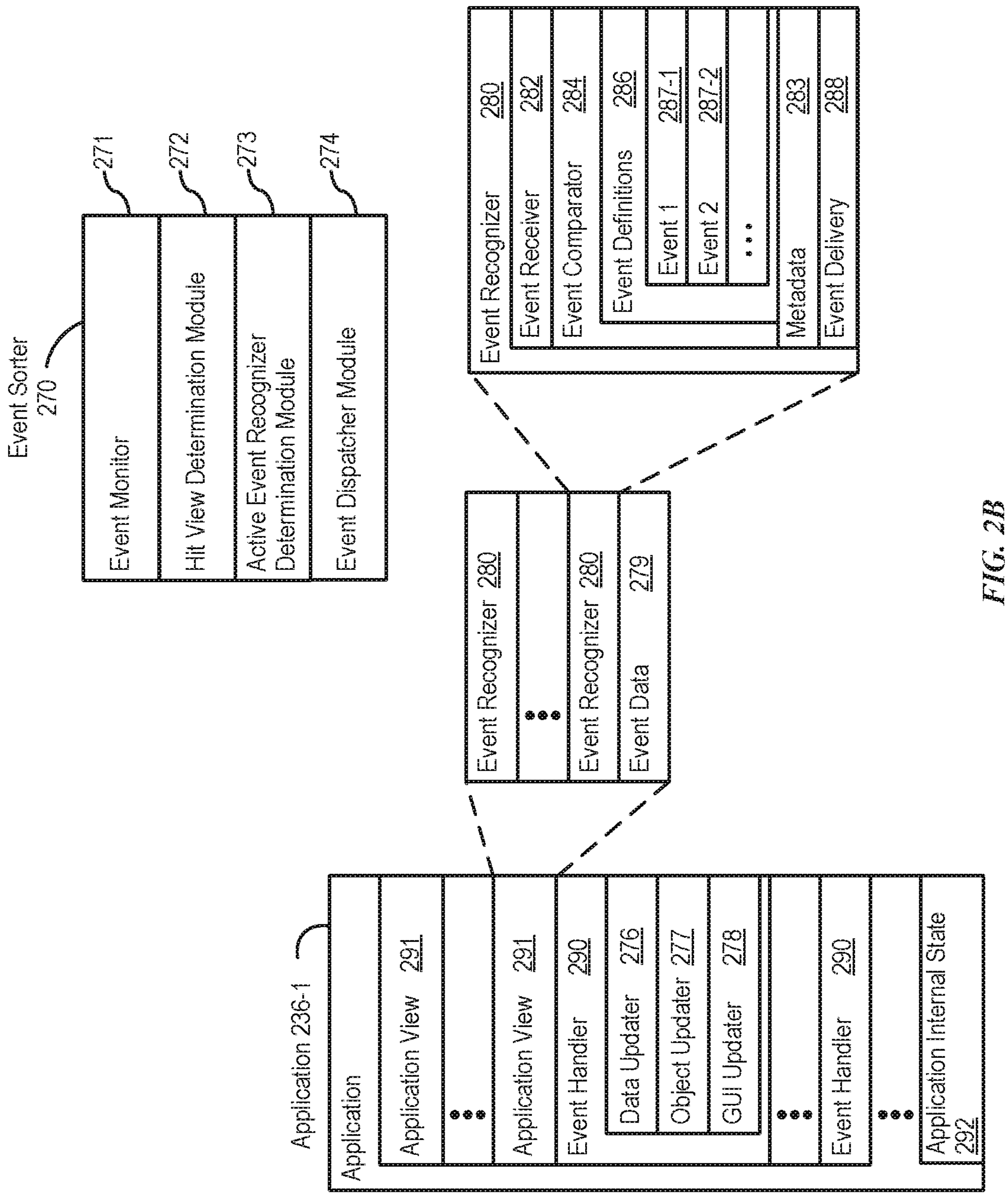
FIG. 2B is a block diagram illustrating exemplary components for event handling according to various examples.

FIG. 2B is a block diagram illustrating exemplary components for event handling in accordance with some embodiments. In some embodiments, memory 202 (FIG. 2A) or 470 (FIG. 4) includes event sorter 270 (e.g., in operating system 226) and a respective application 236-1 (e.g., any of the aforementioned applications 237-251, 255, 480-490).

Event sorter 270 receives event information and determines the application 236-1 and application view 291 of application 236-1 to which to deliver the event information. Event sorter 270 includes event monitor 271 and event dispatcher module 274. In some embodiments, application 236-1 includes application internal state 292, which indicates the current application view(s) displayed on touch-sensitive display 212 when the application is active or executing. In some embodiments, device/global internal state 257 is used by event sorter 270 to determine which application(s) is (are) currently active, and application internal state 292 is used by event sorter 270 to determine application views 291 to which to deliver event information.

In some embodiments, application internal state 292 includes additional information, such as one or more of: resume information to be used when application 236-1 resumes execution, user interface state information that indicates information being displayed or that is ready for display by application 236-1, a state queue for enabling the user to go back to a prior state or view of application 236-1, and a redo/undo queue of previous actions taken by the user.

Event monitor 271 receives event information from peripherals interface 218. Event information includes information about a sub-event (e.g., a user touch on touch-sensitive display 212, as part of a multi-touch gesture). Peripherals interface 218 transmits information it receives from I/O subsystem 206 or a sensor, such as proximity sensor 266, accelerometer(s) 268, and/or microphone 213 (through audio circuitry 210). Information that peripherals interface 218 receives from I/O subsystem 206 includes information from touch-sensitive display 212 or a touch-sensitive surface.

In some embodiments, event monitor 271 sends requests to the peripherals interface 218 at predetermined intervals. In response, peripherals interface 218 transmits event information. In other embodiments, peripherals interface 218 transmits event information only when there is a significant event (e.g., receiving an input above a predetermined noise threshold and/or for more than a predetermined duration).

In some embodiments, event sorter 270 also includes a hit view determination module 272 and/or an active event recognizer determination module 273.

Hit view determination module 272 provides software procedures for determining where a sub-event has taken place within one or more views when touch-sensitive display 212 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 272 receives information related to sub events of a touch-based gesture. When an application has multiple views organized in a hierarchy, hit view determination module 272 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 272, the hit view typically receives all sub-events related to the same touch or input source for which it was identified as the hit view.

Active event recognizer determination module 273 determines which view or views within a view hierarchy should receive a particular sequence of sub-events. In some embodiments, active event recognizer determination module 273 determines that only the hit view should receive a particular sequence of sub-events. In other embodiments, active event recognizer determination module 273 determines that all views that include the physical location of a sub-event are actively involved views and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 274 dispatches the event information to an event recognizer (e.g., event recognizer 280). In embodiments including active event recognizer determination module 273, event dispatcher module 274 delivers the event information to an event recognizer determined by active event recognizer determination module 273. In some embodiments, event dispatcher module 274 stores in an event queue the event information, which is retrieved by a respective event receiver 282.

In some embodiments, operating system 226 includes event sorter 270. Alternatively, application 236-1 includes event sorter 270. In yet other embodiments, event sorter 270 is a stand-alone module or a part of another module stored in memory 202, such as contact/motion module 230.

In some embodiments, application 236-1 includes a plurality of event handlers 290 and one or more application views 291, each of which includes instructions for handling touch events that occur within a respective view of the application's user interface. Each application view 291 of the application 236-1 includes one or more event recognizers 280. Typically, a respective application view 291 includes a plurality of event recognizers 280. In other embodiments, one or more of event recognizers 280 are part of a separate module, such as a user interface kit (not shown) or a higher level object from which application 236-1 inherits methods and other properties. In some embodiments, a respective event handler 290 includes one or more of: data updater 276, object updater 277, GUI updater 278, and/or event data 279 received from event sorter 270. Event handler 290 may utilize or call data updater 276, object updater 277, or GUI updater 278 to update the application internal state 292. Alternatively, one or more of the application views 291 include one or more respective event handlers 290. Also, in some embodiments, one or more of data updater 276, object updater 277, and GUI updater 278 are included in a respective application view 291.

A respective event recognizer 280 receives event information (e.g., event data 279) from event sorter 270 and identifies an event from the event information. Event recognizer 280 includes event receiver 282 and event comparator 284. In some embodiments, event recognizer 280 also includes at least a subset of: metadata 283 and event delivery instructions 288 (which may include sub-event delivery instructions).

Event receiver 282 receives event information from event sorter 270. The event information includes information about a sub-event, for example, a touch or a touch movement. Depending on the sub-event, the event information also includes additional information, such as location of the sub-event. When the sub-event concerns motion of a touch, the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 284 compares the event information to predefined event or sub-event definitions and, based on the comparison, determines an event or sub event, or determines or updates the state of an event or sub-event. In some embodiments, event comparator 284 includes event definitions 286. Event definitions 286 contain definitions of events (e.g., predefined sequences of sub-events), for example, event 1 (287-1), event 2 (287-2), and others. In some embodiments, sub-events in an event (287) include, for example, touch begin, touch end, touch movement, touch cancellation, and multiple touching. In one example, the definition for event 1 (287-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (287-2) is a dragging on a displayed object. The dragging, for example, comprises a touch (or contact) on the displayed object for a predetermined phase, a movement of the touch across touch-sensitive display 212, and liftoff of the touch (touch end). In some embodiments, the event also includes information for one or more associated event handlers 290.

In some embodiments, event definition 287 includes a definition of an event for a respective user-interface object. In some embodiments, event comparator 284 performs a hit test to determine which user-interface object is associated with a sub-event. For example, in an application view in which three user-interface objects are displayed on touch-sensitive display 212, when a touch is detected on touch-sensitive display 212, event comparator 284 performs a hit test to determine which of the three user-interface objects is associated with the touch (sub-event). If each displayed object is associated with a respective event handler 290, the event comparator uses the result of the hit test to determine which event handler 290 should be activated. For example, event comparator 284 selects an event handler associated with the sub-event and the object triggering the hit test.

In some embodiments, the definition for a respective event (287) also includes delayed actions that delay delivery of the event information until after it has been determined whether the sequence of sub-events does or does not correspond to the event recognizer's event type.

When a respective event recognizer 280 determines that the series of sub-events do not match any of the events in event definitions 286, the respective event recognizer 280 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 280 includes metadata 283 with configurable properties, flags, and/or lists that indicate how the event delivery system should perform sub-event delivery to actively involved event recognizers. In some embodiments, metadata 283 includes configurable properties, flags, and/or lists that indicate how event recognizers may interact, or are enabled to interact, with one another. In some embodiments, metadata 283 includes configurable properties, flags, and/or lists that indicate whether sub-events are delivered to varying levels in the view or programmatic hierarchy.

In some embodiments, a respective event recognizer 280 activates event handler 290 associated with an event when one or more particular sub-events of an event are recognized. In some embodiments, a respective event recognizer 280 delivers event information associated with the event to event handler 290. Activating an event handler 290 is distinct from sending (and deferred sending) sub-events to a respective hit view. In some embodiments, event recognizer 280 throws a flag associated with the recognized event, and event handler 290 associated with the flag catches the flag and performs a predefined process.

In some embodiments, event delivery instructions 288 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 276 creates and updates data used in application 236-1. For example, data updater 276 updates the telephone number used in contacts module 237, or stores a video file used in video player module. In some embodiments, object updater 277 creates and updates objects used in application 236-1. For example, object updater 277 creates a new user-interface object or updates the position of a user-interface object. GUI updater 278 updates the GUI. For example, GUI updater 278 prepares display information and sends it to graphics module 232 for display on a touch-sensitive display.

In some embodiments, event handler(s) 290 includes or has access to data updater 276, object updater 277, and GUI updater 278. In some embodiments, data updater 276, object updater 277, and GUI updater 278 are included in a single module of a respective application 236-1 or application view 291. In other embodiments, they are included in two or more software modules.

It shall be understood that the foregoing discussion regarding event handling of user touches on touch-sensitive displays also applies to other forms of user inputs to operate multifunction devices 200 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 3:
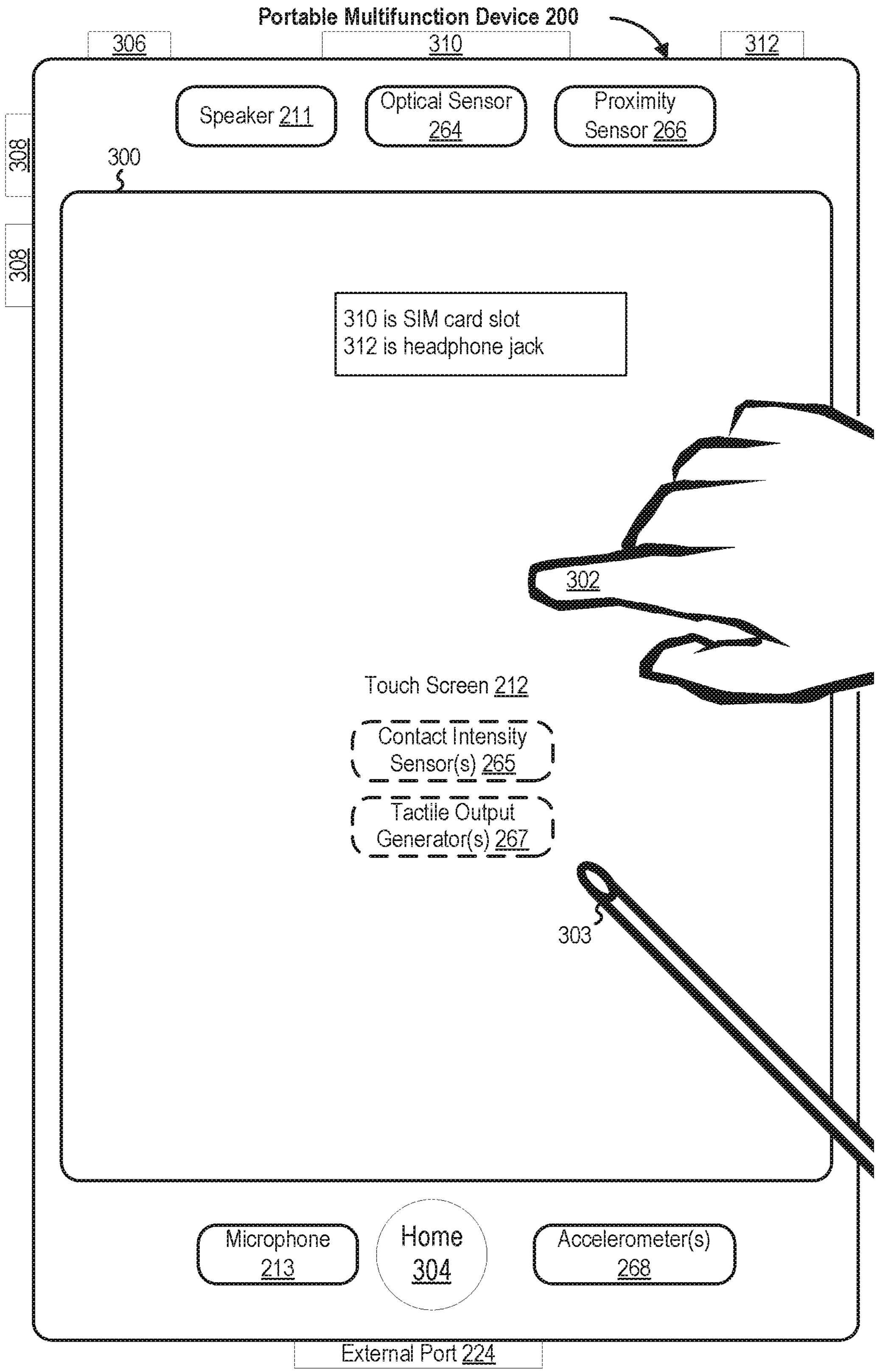
FIG. 3 illustrates a portable multifunction device implementing the client-side portion of a digital assistant according to various examples.

FIG. 3 illustrates a portable multifunction device 200 having a touch screen 212 in accordance with some embodiments. The touch screen optionally displays one or more graphics within user interface (UI) 300. In this embodiment, as well as others described below, a user is enabled to select one or more of the graphics by making a gesture on the graphics, for example, with one or more fingers 302 (not drawn to scale in the figure) or one or more styluses 303 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward, and/or downward), and/or a rolling of a finger (from right to left, left to right, upward, and/or downward) that has made contact with device 200. In some implementations or circumstances, inadvertent contact with a graphic does not select the graphic. For example, a swipe gesture that sweeps over an application icon optionally does not select the corresponding application when the gesture corresponding to selection is a tap.

Device 200 may also include one or more physical buttons, such as "home" or menu button 304. As described previously, menu button 304 may be used to navigate to any application 236 in a set of applications that may be executed on device 200. Alternatively, in some embodiments, the menu button is implemented as a soft key in a GUI displayed on touch screen 212.

In one embodiment, device 200 includes touch screen 212, menu button 304, push button 306 for powering the device on/off and locking the device, volume adjustment button(s) 308, subscriber identity module (SIM) card slot 310, headset jack 312, and docking/charging external port 224. Push button 306 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 200 also accepts verbal input for activation or deactivation of some functions through microphone 213. Device 200 also, optionally, includes one or more contact intensity sensors 265 for detecting intensity of contacts on touch screen 212 and/or one or more tactile output generators 267 for generating tactile outputs for a user of device 200.

FIG. 4 is a block diagram of an exemplary multifunction device with a display and a touch-sensitive surface in accordance with some embodiments. Device 400 need not be portable. In some embodiments, device 400 is a laptop computer, a desktop computer, a tablet computer, a multimedia player device, a navigation device, an educational device (such as a child's learning toy), a gaming system, or a control device (e.g., a home or industrial controller). Device 400 typically includes one or more processing units (CPUs) 410, one or more network or other communications interfaces 460, memory 470, and one or more communication buses 420 for interconnecting these components. Communication buses 420 optionally include circuitry (sometimes called a chipset) that interconnects and controls communications between system components. Device 400 includes input/output (I/O) interface 430 comprising display 440, which is typically a touch screen display. I/O interface 430 also optionally includes a keyboard and/or mouse (or other pointing device) 450 and touchpad 455, tactile output generator 457 for generating tactile outputs on device 400 (e.g., similar to tactile output generator(s) 267 described above with reference to FIG. 2A), sensors 459 (e.g., optical, acceleration, proximity, touch-sensitive, and/or contact intensity sensors similar to contact intensity sensor(s) 265 described above with reference to FIG. 2A). Memory 470 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 470 optionally includes one or more storage devices remotely located from CPU(s) 410. In some embodiments, memory 470 stores programs, modules, and data structures analogous to the programs, modules, and data structures stored in memory 202 of portable multifunction device 200 (FIG. 2A), or a subset thereof. Furthermore, memory 470 optionally stores additional programs, modules, and data structures not present in memory 202 of portable multifunction device 200. For example, memory 470 of device 400 optionally stores drawing module 480, presentation module 482, word processing module 484, website creation module 486, disk authoring module 488, and/or spreadsheet module 490, while memory 202 of portable multifunction device 200 (FIG. 2A) optionally does not store these modules.

Each of the above-identified elements in FIG. 4 may be stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules may be combined or otherwise rearranged in various embodiments. In some embodiments, memory 470 may store a subset of the modules and data structures identified above. Furthermore, memory 470 may store additional modules and data structures not described above.

Attention is now directed towards embodiments of user interfaces that may be implemented on, for example, portable multifunction device 200.

Figure 5A:
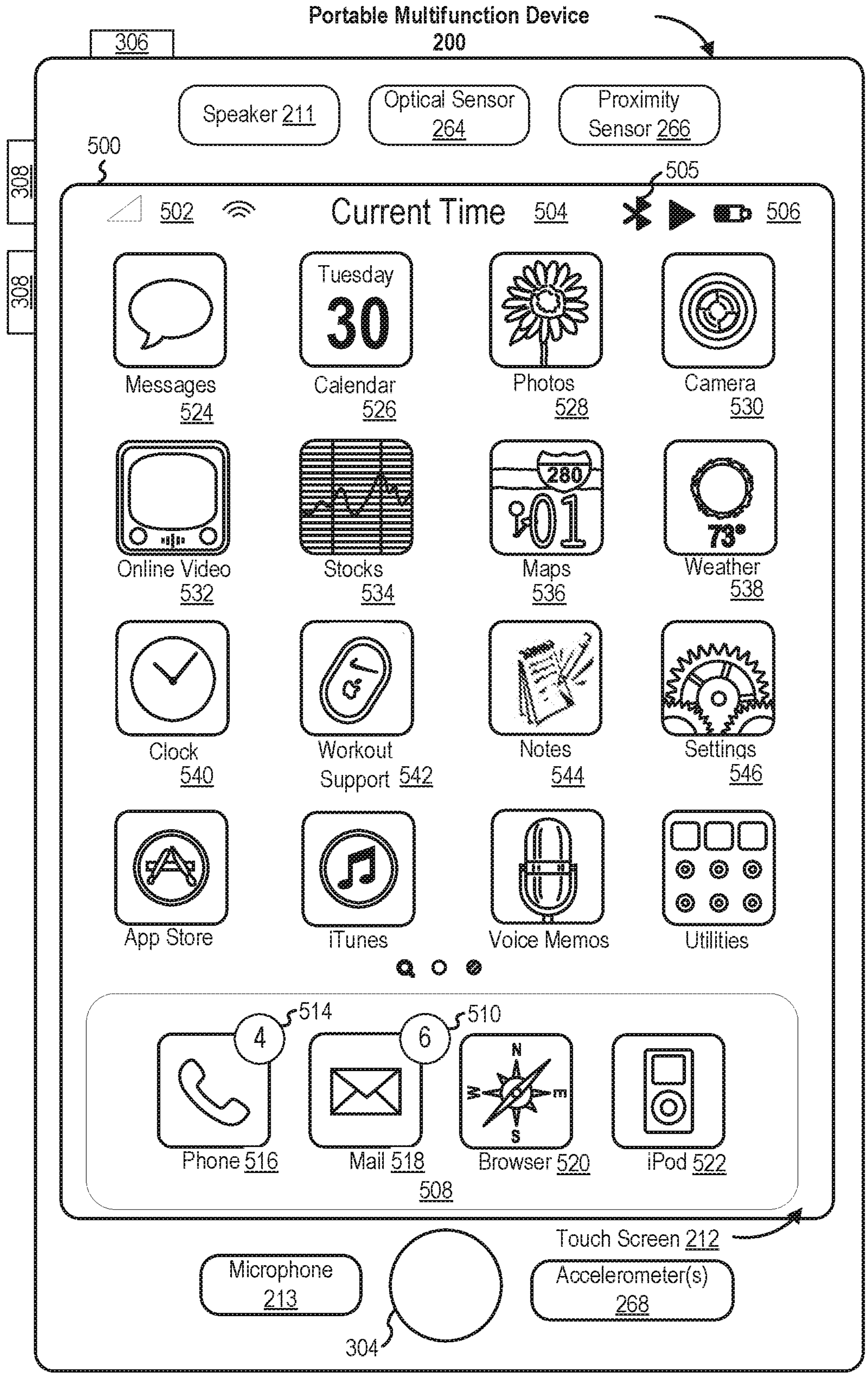
FIG. 5A illustrates an exemplary user interface for a menu of applications on a portable multifunction device according to various examples.

FIG. 5A illustrates an exemplary user interface for a menu of applications on portable multifunction device 200 in accordance with some embodiments. Similar user interfaces may be implemented on device 400. In some embodiments, user interface 500 includes the following elements, or a subset or superset thereof:

Signal strength indicator(s) 502 for wireless communication(s), such as cellular and Wi-Fi signals;

Time 504;

Bluetooth indicator 505;

Battery status indicator 506;

Tray 508 with icons for frequently used applications, such as:

Icon 516 for telephone module 238, labeled "Phone," which optionally includes an indicator 514 of the number of missed calls or voicemail messages;

Icon 518 for email client module 240, labeled "Mail," which optionally includes an indicator 510 of the number of unread emails;

Icon 520 for browser module 247, labeled "Browser;" and

Icon 522 for video and music player module 252, also referred to as iPod (trademark of Apple Inc.) module 252, labeled "iPod;" and Icons for other applications, such as:

Icon 524 for IM module 241, labeled "Messages;"

Icon 526 for calendar module 248, labeled "Calendar;"

Icon 528 for image management module 244, labeled "Photos;"

Icon 530 for camera module 243, labeled "Camera;"

Icon 532 for online video module 255, labeled "Online Video;"

Icon 534 for stocks widget 249-2, labeled "Stocks;"

Icon 536 for map module 254, labeled "Maps;"

Icon 538 for weather widget 249-1, labeled "Weather;"

Icon 540 for alarm clock widget 249-4, labeled "Clock;"

Icon 542 for workout support module 242, labeled "Workout Support;"

Icon 544 for notes module 253, labeled "Notes;" and

Icon 546 for a settings application or module, labeled "Settings," which provides access to settings for device 200 and its various applications 236.

It should be noted that the icon labels illustrated in FIG. 5A are merely exemplary. For example, icon 522 for video and music player module 252 may optionally be labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 5B:
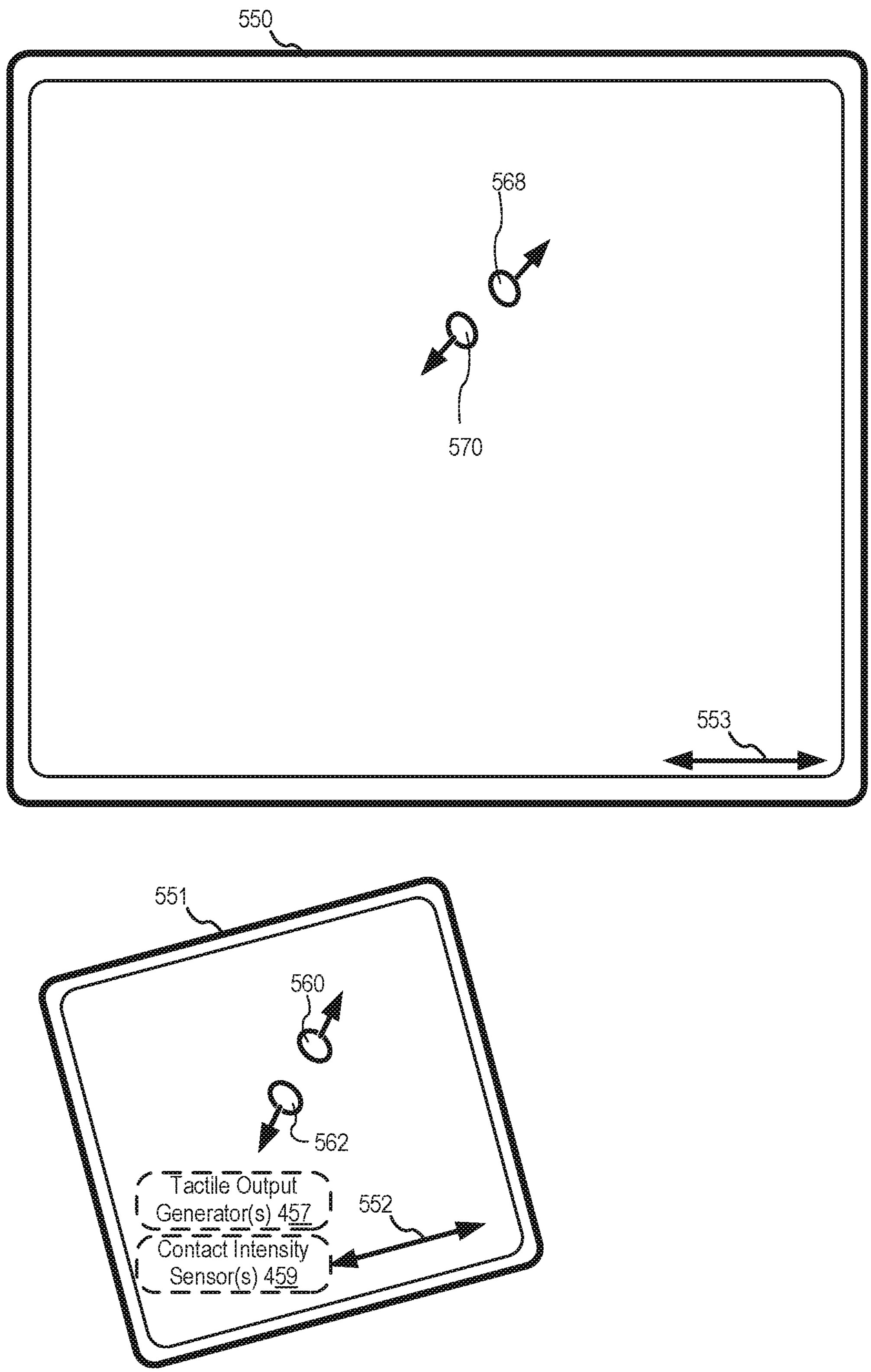
FIG. 5B illustrates an exemplary user interface for a multifunction device with a touch-sensitive surface that is separate from the display according to various examples.

FIG. 5B illustrates an exemplary user interface on a device (e.g., device 400, FIG. 4) with a touch-sensitive surface 551 (e.g., a tablet or touchpad 455, FIG. 4) that is separate from the display 550 (e.g., touch screen display 212). Device 400 also, optionally, includes one or more contact intensity sensors (e.g., one or more of sensors 457) for detecting intensity of contacts on touch-sensitive surface 551 and/or one or more tactile output generators 459 for generating tactile outputs for a user of device 400.

Although some of the examples which follow will be given with reference to inputs on touch screen display 212 (where the touch-sensitive surface and the display are combined), in some embodiments, the device detects inputs on a touch-sensitive surface that is separate from the display, as shown in FIG. 5B. In some embodiments, the touch-sensitive surface (e.g., 551 in FIG. 5B) has a primary axis (e.g., 552 in FIG. 5B) that corresponds to a primary axis (e.g., 553 in FIG. 5B) on the display (e.g., 550). In accordance with these embodiments, the device detects contacts (e.g., 560 and 562 in FIG. 5B) with the touch-sensitive surface 551 at locations that correspond to respective locations on the display (e.g., in FIG. 5B, 560 corresponds to 568 and 562 corresponds to 570). In this way, user inputs (e.g., contacts 560 and 562, and movements thereof) detected by the device on the touch-sensitive surface (e.g., 551 in FIG. 5B) are used by the device to manipulate the user interface on the display (e.g., 550 in FIG. 5B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, and/or finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 6A:
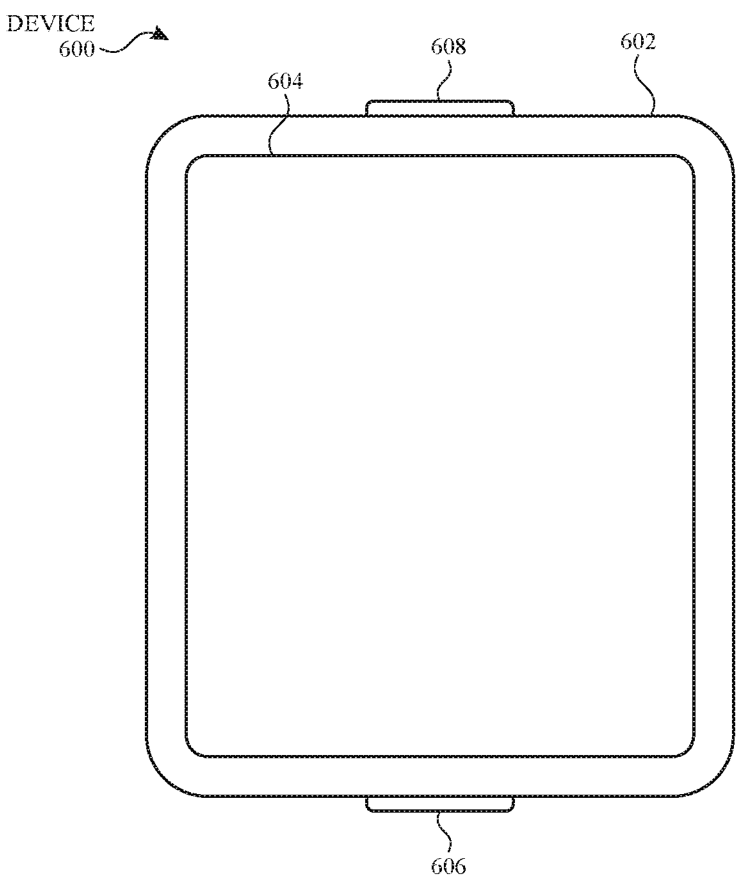
FIG. 6A illustrates a personal electronic device according to various examples.

FIG. 6A illustrates exemplary personal electronic device 600. Device 600 includes body 602. In some embodiments, device 600 can include some or all of the features described with respect to devices 200 and 400 (e.g., FIGS. 2A-4B). In some embodiments, device 600 has touch-sensitive display screen 604, hereafter touch screen 604. Alternatively, or in addition to touch screen 604, device 600 has a display and a touch-sensitive surface. As with devices 200 and 400, in some embodiments, touch screen 604 (or the touch-sensitive surface) may have one or more intensity sensors for detecting intensity of contacts (e.g., touches) being applied. The one or more intensity sensors of touch screen 604 (or the touch-sensitive surface) can provide output data that represents the intensity of touches. The user interface of device 600 can respond to touches based on their intensity, meaning that touches of different intensities can invoke different user interface operations on device 600.

Techniques for detecting and processing touch intensity may be found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 600 has one or more input mechanisms 606 and 608. Input mechanisms 606 and 608, if included, can be physical. Examples of physical input mechanisms include push buttons and rotatable mechanisms. In some embodiments, device 600 has one or more attachment mechanisms. Such attachment mechanisms, if included, can permit attachment of device 600 with, for example, hats, eyewear, earrings, necklaces, shirts, jackets, bracelets, watch straps, chains, trousers, belts, shoes, purses, backpacks, and so forth. These attachment mechanisms may permit device 600 to be worn by a user.

Figure 6B:
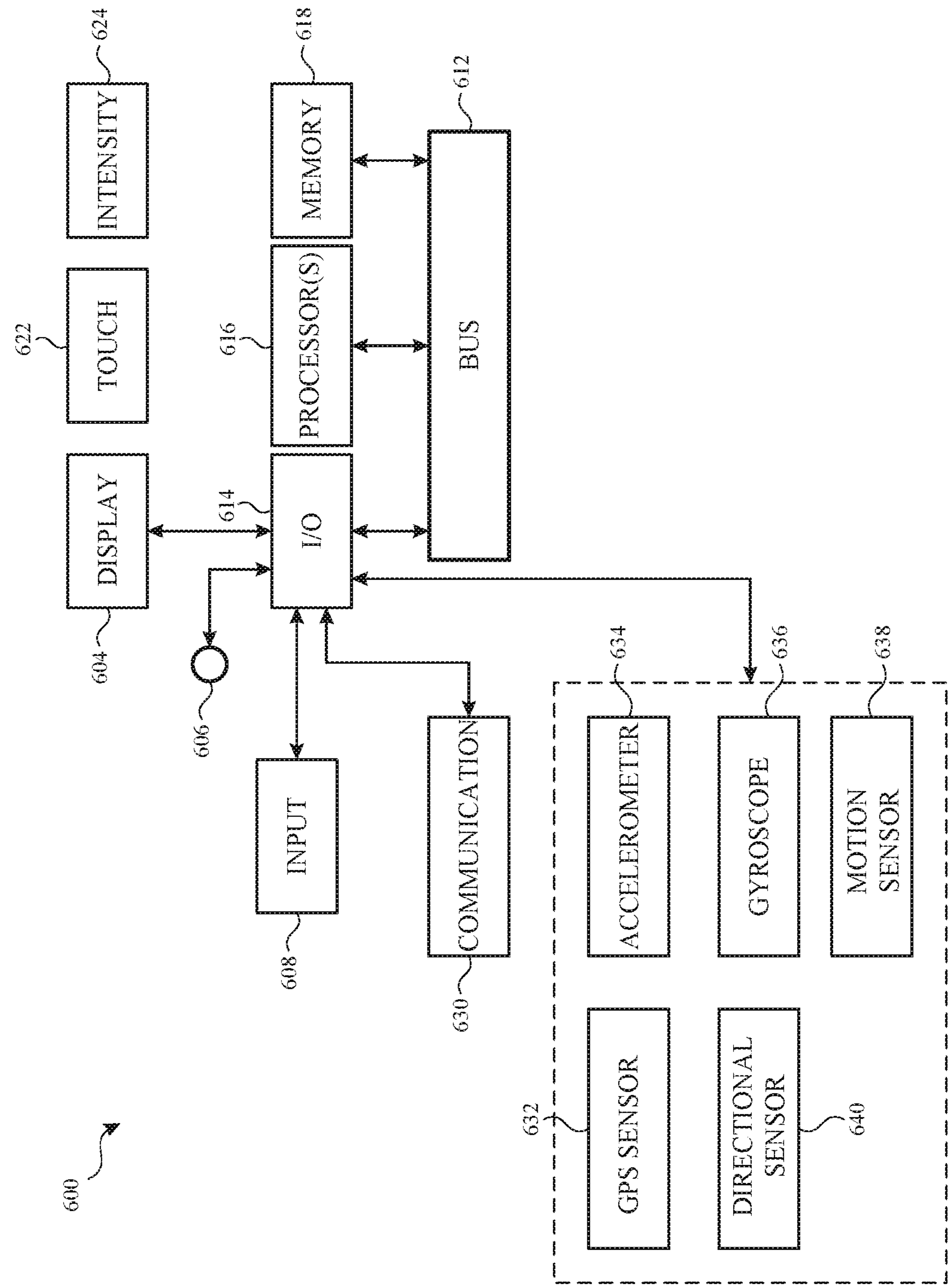
FIG. 6B is a block diagram illustrating a personal electronic device according to various examples.

FIG. 6B depicts exemplary personal electronic device 600. In some embodiments, device 600 can include some or all of the components described with respect to FIGS. 2A, 2B, and 4. Device 600 has bus 612 that operatively couples I/O section 614 with one or more computer processors 616 and memory 618. I/O section 614 can be connected to display 604, which can have touch-sensitive component 622 and, optionally, touch-intensity sensitive component 624. In addition, I/O section 614 can be connected with communication unit 630 for receiving application and operating system data using Wi-Fi, Bluetooth, near field communication (NFC), cellular, and/or other wireless communication techniques. Device 600 can include input mechanisms 606 and/or 608. Input mechanism 606 may be a rotatable input device or a depressible and rotatable input device, for example. Input mechanism 608 may be a button, in some examples.

Input mechanism 608 may be a microphone, in some examples. Personal electronic device 600 can include various sensors, such as GPS sensor 632, accelerometer 634, directional sensor 640 (e.g., compass), gyroscope 636, motion sensor 638, and/or a combination thereof, all of which can be operatively connected to I/O section 614.

Memory 618 of personal electronic device 600 can be a non-transitory computer-readable storage medium, for storing computer-executable instructions, which, when executed by one or more computer processors 616, for example, can cause the computer processors to perform the techniques described below, including process 1200 (FIGS. 12A-D). The computer-executable instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. Personal electronic device 600 is not limited to the components and configuration of FIG. 6B, but can include other or additional components in multiple configurations.

As used here, the term "affordance" refers to a user-interactive graphical user interface object that may be displayed on the display screen of devices 200, 400, and/or 600 (FIGS. 2, 4, and 6). For example, an image (e.g., icon), a button, and text (e.g., link) may each constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 455 in FIG. 4 or touch-sensitive surface 551 in FIG. 5B) while the cursor is over a particular user interface element (e.g., a button, window, slider or other user interface element), the particular user interface element is adjusted in accordance with the detected input. In some implementations that include a touch screen display (e.g., touch-sensitive display system 212 in FIG. 2A or touch screen 212 in FIG. 5A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location, at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface may be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs, sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

3. Digital Assistant System

Figure 7A:
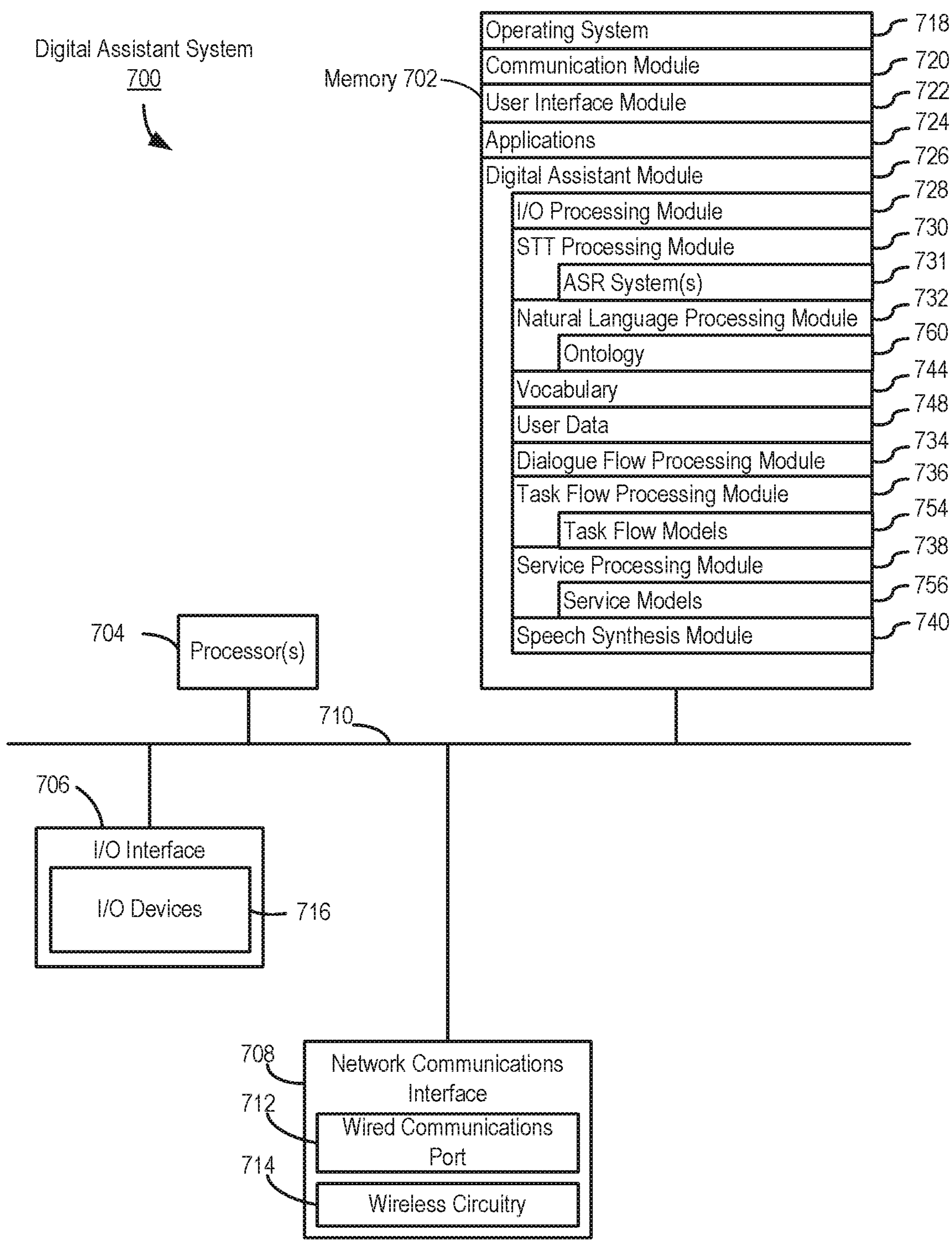
FIG. 7A is a block diagram illustrating a digital assistant system or a server portion thereof according to various examples.

FIG. 7A illustrates a block diagram of digital assistant system 700 in accordance with various examples. In some examples, digital assistant system 700 can be implemented on a standalone computer system. In some examples, digital assistant system 700 can be distributed across multiple computers. In some examples, some of the modules and functions of the digital assistant can be divided into a server portion and a client portion, where the client portion resides on one or more user devices (e.g., devices 104, 122, 200, 400, or 600) and communicates with the server portion (e.g., server system 108) through one or more networks, e.g., as shown in FIG. 1. In some examples, digital assistant system 700 can be an implementation of server system 108 (and/or DA server 106) shown in FIG. 1. It should be noted that digital assistant system 700 is only one example of a digital assistant system, and that digital assistant system 700 can have more or fewer components than shown, may combine two or more components, or may have a different configuration or arrangement of the components. The various components shown in FIG. 7A can be implemented in hardware, software instructions for execution by one or more processors, firmware, including one or more signal processing and/or application specific integrated circuits, or a combination thereof.

Digital assistant system 700 can include memory 702, one or more processors 704, input/output (I/O) interface 706, and network communications interface 708. These components can communicate with one another over one or more communication buses or signal lines 710.

In some examples, memory 702 can include a non-transitory computer-readable medium, such as high-speed random access memory and/or a non-volatile computer-readable storage medium (e.g., one or more magnetic disk storage devices, flash memory devices, or other non-volatile solid-state memory devices).

In some examples, I/O interface 706 can couple input/output devices 716 of digital assistant system 700, such as displays, keyboards, touch screens, and microphones, to user interface module 722. I/O interface 706, in conjunction with user interface module 722, can receive user inputs (e.g., voice input, keyboard inputs, touch inputs, etc.) and process them accordingly. In some examples, e.g., when the digital assistant is implemented on a standalone user device, digital assistant system 700 can include any of the components and I/O communication interfaces described with respect to devices 200, 400, or 600 in FIGS. 2A, 4, 6A-B, respectively. In some examples, digital assistant system 700 can represent the server portion of a digital assistant implementation, and can interact with the user through a client-side portion residing on a user device (e.g., devices 104, 200, 400, or 600).

In some examples, the network communications interface 708 can include wired communication port(s) 712 and/or wireless transmission and reception circuitry 714. The wired communication port(s) 712 can receive and send communication signals via one or more wired interfaces, e.g., Ethernet, Universal Serial Bus (USB), FIREWIRE, etc. The wireless circuitry 714 can receive and send RF signals and/or optical signals from/to communications networks and other communications devices. The wireless communications can use any of a plurality of communications standards, protocols, and technologies, such as GSM, EDGE, CDMA, TDMA, Bluetooth, Wi-Fi, VoIP, Wi-MAX, or any other suitable communication protocol. Network communications interface 708 can enable communication between digital assistant system 700 with networks, such as the Internet, an intranet, and/or a wireless network, such as a cellular telephone network, a wireless local area network (LAN), and/or a metropolitan area network (MAN), and other devices.

In some examples, memory 702, or the computer-readable storage media of memory 702, can store programs, modules, instructions, and data structures including all or a subset of: operating system 718, communications module 720, user interface module 722, one or more applications 724, and digital assistant module 726. In particular, memory 702, or the computer-readable storage media of memory 702, can store instructions for performing process 1200, described below. One or more processors 704 can execute these programs, modules, and instructions, and read/write from/to the data structures.

Operating system 718 (e.g., Darwin, RTXC, LINUX, UNIX, iOS, OS X, WINDOWS, or an embedded operating system such as VxWorks) can include various software components and/or drivers for controlling and managing general system tasks (e.g., memory management, storage device control, power management, etc.) and facilitates communications between various hardware, firmware, and software components.

Communications module 720 can facilitate communications between digital assistant system 700 with other devices over network communications interface 708. For example, communications module 720 can communicate with RF circuitry 208 of electronic devices such as devices 200, 400, and 600 shown in FIGS. 2A, 4, 6A-B, respectively. Communications module 720 can also include various components for handling data received by wireless circuitry 714 and/or wired communications port 712.

User interface module 722 can receive commands and/or inputs from a user via I/O interface 706 (e.g., from a keyboard, touch screen, pointing device, controller, and/or microphone), and generate user interface objects on a display. User interface module 722 can also prepare and deliver outputs (e.g., speech, sound, animation, text, icons, vibrations, haptic feedback, light, etc.) to the user via the I/O interface 706 (e.g., through displays, audio channels, speakers, touch-pads, etc.).

Applications 724 can include programs and/or modules that are configured to be executed by one or more processors 704. For example, if the digital assistant system is implemented on a standalone user device, applications 724 can include user applications, such as games, a calendar application, a navigation application, or an email application. If digital assistant system 700 is implemented on a server, applications 724 can include resource management applications, diagnostic applications, or scheduling applications, for example.

Memory 702 can also store digital assistant module 726 (or the server portion of a digital assistant). In some examples, digital assistant module 726 can include the following sub-modules, or a subset or superset thereof: input/output processing module 728, speech-to-text (STT) processing module 730, natural language processing module 732, dialogue flow processing module 734, task flow processing module 736, service processing module 738, and speech synthesis module 740. Each of these modules can have access to one or more of the following systems or data and models of the digital assistant module 726, or a subset or superset thereof: ontology 760, vocabulary index 744, user data 748, task flow models 754, service models 756, and ASR systems 731.

In some examples, using the processing modules, data, and models implemented in digital assistant module 726, the digital assistant can perform at least some of the following: converting speech input into text; identifying a user's intent expressed in a natural language input received from the user; actively eliciting and obtaining information needed to fully infer the user's intent (e.g., by disambiguating words, games, intentions, etc.); determining the task flow for fulfilling the inferred intent; and executing the task flow to fulfill the inferred intent.

Figure 7B:
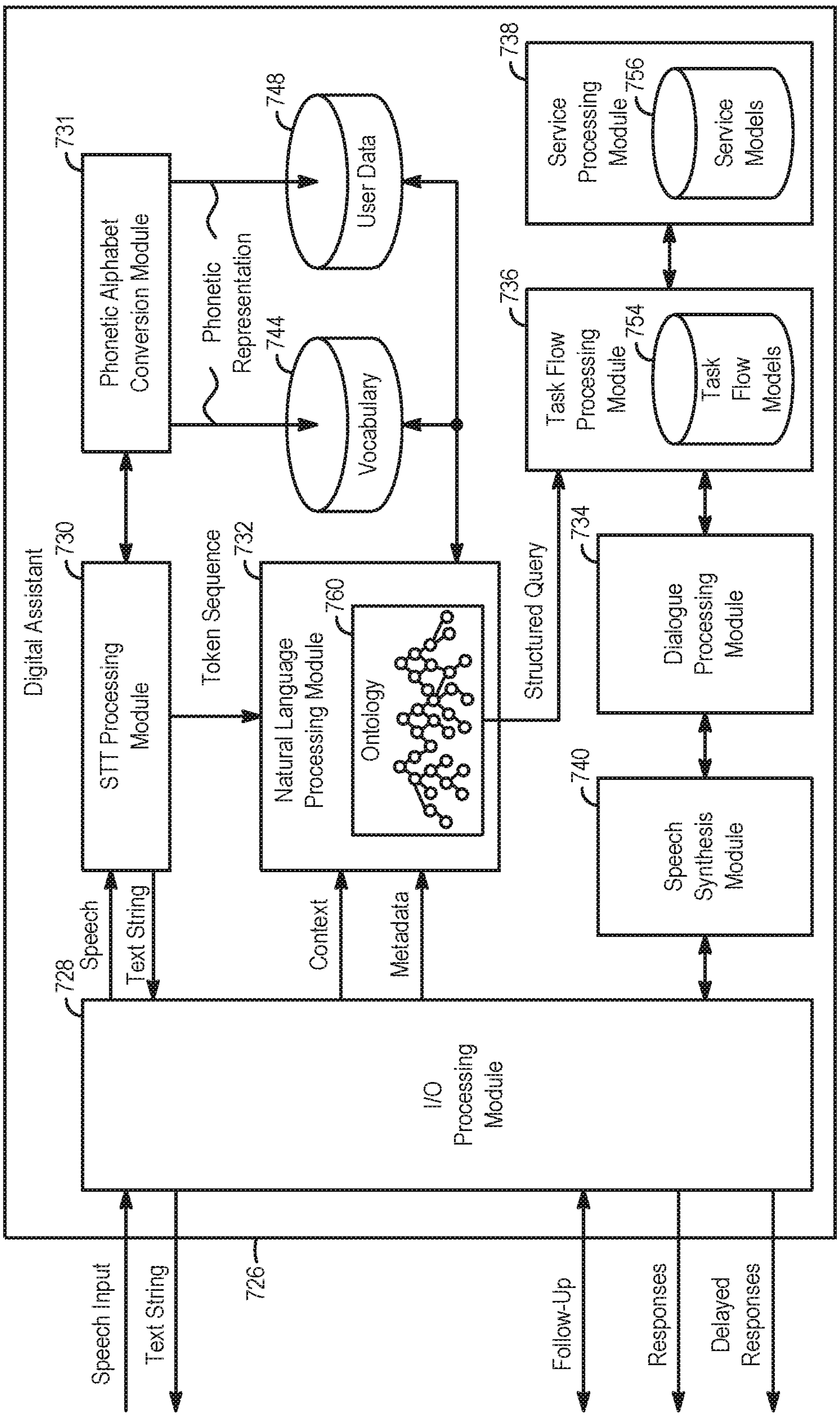
FIG. 7B illustrates the functions of the digital assistant shown in FIG. 7A according to various examples.

In some examples, as shown in FIG. 7B, I/O processing module 728 can interact with the user through I/O devices 716 in FIG. 7A or with a user device (e.g., devices 104, 200, 400, or 600) through network communications interface 708 in FIG. 7A to obtain user input (e.g., a speech input) and to provide responses (e.g., as speech outputs) to the user input. I/O processing module 728 can optionally obtain contextual information associated with the user input from the user device, along with or shortly after the receipt of the user input. The contextual information can include user-specific data, vocabulary, and/or preferences relevant to the user input. In some examples, the contextual information also includes software and hardware states of the user device at the time the user request is received, and/or information related to the surrounding environment of the user at the time that the user request was received. In some examples, I/O processing module 728 can also send follow-up questions to, and receive answers from, the user regarding the user request. When a user request is received by I/O processing module 728 and the user request can include speech input, I/O processing module 728 can forward the speech input to STT processing module 730 (or a speech recognizer) for speech-to-text conversions.

STT processing module 730 can include one or more ASR systems. The one or more ASR systems can process the speech input that is received through I/O processing module 728 to produce a recognition result. Each ASR system can include a front-end speech pre-processor. The front-end speech pre-processor can extract representative features from the speech input. For example, the front-end speech pre-processor can perform a Fourier transform on the speech input to extract spectral features that characterize the speech input as a sequence of representative multi-dimensional vectors. Further, each ASR system can include one or more speech recognition models (e.g., acoustic models and/or language models) and can implement one or more speech recognition engines. Examples of speech recognition models can include Hidden Markov Models, Gaussian-Mixture Models, Deep Neural Network Models, n-gram language models, and other statistical models. Examples of speech recognition engines can include the dynamic time warping based engines and weighted finite-state transducers (WFST) based engines. The one or more speech recognition models and the one or more speech recognition engines can be used to process the extracted representative features of the front-end speech pre-processor to produce intermediate recognitions results (e.g., phonemes, phonemic strings, and sub-words), and ultimately, text recognition results (e.g., words, word strings, or sequence of tokens). In some examples, the speech input can be processed at least partially by a third-party service or on the user's device (e.g., device 104, 200, 400, or 600) to produce the recognition result. Once STT processing module 730 produces recognition results containing a text string (e.g., words, or sequence of words, or sequence of tokens), the recognition result can be passed to natural language processing module 732 for intent deduction.

More details on the speech-to-text processing are described in U.S. Utility application Ser. No. 13/236,942 for "Consolidating Speech Recognition Results," filed on Sep. 20, 2011, the entire disclosure of which is incorporated herein by reference.

In some examples, STT processing module 730 can include and/or access a vocabulary of recognizable words via phonetic alphabet conversion module 731. Each vocabulary word can be associated with one or more candidate pronunciations of the word represented in a speech recognition phonetic alphabet. In particular, the vocabulary of recognizable words can include a word that is associated with a plurality of candidate pronunciations. For example, the vocabulary may include the word "tomato" that is associated with the candidate pronunciations of /təˈmeɪroʊ/ and /təˈmɑtoʊ/. Further, vocabulary words can be associated with custom candidate pronunciations that are based on previous speech inputs from the user. Such custom candidate pronunciations can be stored in STT processing module 730 and can be associated with a particular user via the user's profile on the device. In some examples, the candidate pronunciations for words can be determined based on the spelling of the word and one or more linguistic and/or phonetic rules. In some examples, the candidate pronunciations can be manually generated, e.g., based on known canonical pronunciations.

In some examples, the candidate pronunciations can be ranked based on the commonness of the candidate pronunciation. For example, the candidate pronunciation /təˈmeɪroʊ/ can be ranked higher than /təˈmɑtoʊ/, because the former is a more commonly used pronunciation (e.g., among all users, for users in a particular geographical region, or for any other appropriate subset of users). In some examples, candidate pronunciations can be ranked based on whether the candidate pronunciation is a custom candidate pronunciation associated with the user. For example, custom candidate pronunciations can be ranked higher than canonical candidate pronunciations. This can be useful for recognizing proper nouns having a unique pronunciation that deviates from canonical pronunciation. In some examples, candidate pronunciations can be associated with one or more speech characteristics, such as geographic origin, nationality, or ethnicity. For example, the candidate pronunciation /təˈmeɪroʊ/ can be associated with the United States, whereas the candidate pronunciation /təˈmɑtoʊ/ can be associated with Great Britain. Further, the rank of the candidate pronunciation can be based on one or more characteristics (e.g., geographic origin, nationality, ethnicity, etc.) of the user stored in the user's profile on the device. For example, it can be determined from the user's profile that the user is associated with the United States. Based on the user being associated with the United States, the candidate pronunciation /təˈmeɪroʊ/ (associated with the United States) can be ranked higher than the candidate pronunciation /təˈmɑtoʊ/ (associated with Great Britain). In some examples, one of the ranked candidate pronunciations can be selected as a predicted pronunciation (e.g., the most likely pronunciation).

When a speech input is received, STT processing module 730 can be used to determine the phonemes corresponding to the speech input (e.g., using an acoustic model), and then attempt to determine words that match the phonemes (e.g., using a language model). For example, if STT processing module 730 can first identify the sequence of phonemes /təˈmeɪroʊ/ corresponding to a portion of the speech input, it can then determine, based on vocabulary index 744, that this sequence corresponds to the word "tomato."

In some examples, STT processing module 730 can use approximate matching techniques to determine words in a voice input. Thus, for example, the STT processing module 730 can determine that the sequence of phonemes /təˈmeɪroʊ/ corresponds to the word "tomato," even if that particular sequence of phonemes is not one of the candidate sequence of phonemes for that word.

Natural language processing module 732 ("natural language processor") of the digital assistant can take the sequence of words or tokens ("token sequence") generated by STT processing module 730 and attempt to associate the token sequence with one or more "actionable intents" recognized by the digital assistant. An "actionable intent" can represent a task that can be performed by the digital assistant and can have an associated task flow implemented in task flow models 754. The associated task flow can be a series of programmed actions and steps that the digital assistant takes in order to perform the task. The scope of a digital assistant's capabilities can be dependent on the number and variety of task flows that have been implemented and stored in task flow models 754 or, in other words, on the number and variety of "actionable intents" that the digital assistant recognizes. The effectiveness of the digital assistant, however, can also be dependent on the assistant's ability to infer the correct "actionable intent(s)" from the user request expressed in natural language.

In some examples, in addition to the sequence of words or tokens obtained from STT processing module 730, natural language processing module 732 can also receive contextual information associated with the user request, e.g., from I/O processing module 728. The natural language processing module 732 can optionally use the contextual information to clarify, supplement, and/or further define the information contained in the token sequence received from STT processing module 730. The contextual information can include, for example, user preferences, hardware and/or software states of the user device, sensor information collected before, during, or shortly after the user request, prior interactions (e.g., dialogue) between the digital assistant and the user, and the like. As described herein, contextual information can be dynamic, and can change with time, location, content of the dialogue, and other factors.

In some examples, the natural language processing can be based on, e.g., ontology 760. Ontology 760 can be a hierarchical structure containing many nodes, each node representing either an "actionable intent" or a "property" relevant to one or more of the "actionable intents" or other "properties." As noted above, an "actionable intent" can represent a task that the digital assistant is capable of performing, i.e., it is "actionable" or can be acted on. A "property" can represent a parameter associated with an actionable intent or a sub-aspect of another property. A linkage between an actionable intent node and a property node in ontology 760 can define how a parameter represented by the property node pertains to the task represented by the actionable intent node.

In some examples, ontology 760 can be made up of actionable intent nodes and property nodes. Within ontology 760, each actionable intent node can be linked to one or more property nodes either directly or through one or more intermediate property nodes. Similarly, each property node can be linked to one or more actionable intent nodes either directly or through one or more intermediate property nodes. For example, as shown in FIG. 7C, ontology 760 can include a "restaurant reservation" node (i.e., an actionable intent node). Property nodes "restaurant," "date/time" (for the reservation), and "party size" can each be directly linked to the actionable intent node (i.e., the "restaurant reservation" node).

Figure 7C:
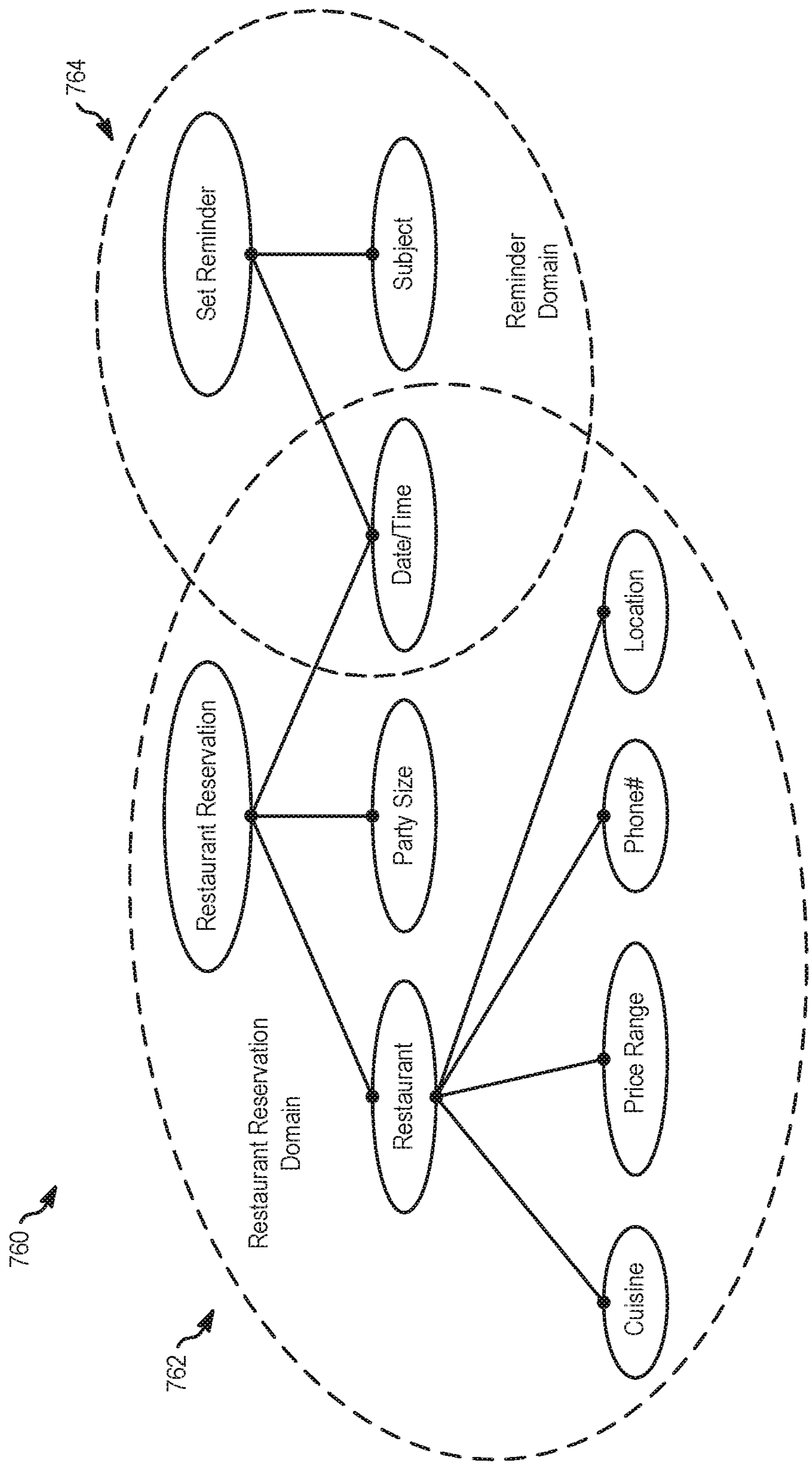
FIG. 7C illustrates a portion of an ontology according to various examples.

In addition, property nodes "cuisine," "price range," "phone number," and "location" can be sub-nodes of the property node "restaurant," and can each be linked to the "restaurant reservation" node (i.e., the actionable intent node) through the intermediate property node "restaurant." For another example, as shown in FIG. 7C, ontology 760 can also include a "set reminder" node (i.e., another actionable intent node). Property nodes "date/time" (for setting the reminder) and "subject" (for the reminder) can each be linked to the "set reminder" node. Since the property "date/time" can be relevant to both the task of making a restaurant reservation and the task of setting a reminder, the property node "date/time" can be linked to both the "restaurant reservation" node and the "set reminder" node in ontology 760.

An actionable intent node, along with its linked concept nodes, can be described as a "domain." In the present discussion, each domain can be associated with a respective actionable intent and refers to the group of nodes (and the relationships there between) associated with the particular actionable intent. For example, ontology 760 shown in FIG. 7C can include an example of restaurant reservation domain 762 and an example of reminder domain 764 within ontology 760. The restaurant reservation domain includes the actionable intent node "restaurant reservation," property nodes "restaurant," "date/time," and "party size," and sub-property nodes "cuisine," "price range," "phone number," and "location." Reminder domain 764 can include the actionable intent node "set reminder," and property nodes "subject" and "date/time." In some examples, ontology 760 can be made up of many domains. Each domain can share one or more property nodes with one or more other domains. For example, the "date/time" property node can be associated with many different domains (e.g., a scheduling domain, a travel reservation domain, a movie ticket domain, etc.), in addition to restaurant reservation domain 762 and reminder domain 764.

While FIG. 7C illustrates two example domains within ontology 760, other domains can include, for example, "find a movie," "initiate a phone call," "find directions," "schedule a meeting," "send a message," and "provide an answer to a question," "read a list," "providing navigation instructions," "provide instructions for a task," and so on. A "send a message" domain can be associated with a "send a message" actionable intent node, and may further include property nodes such as "recipient(s)," "message type," and "message body." The property node "recipient" can be further defined, for example, by the sub-property nodes such as "recipient name" and "message address."

In some examples, ontology 760 can include all the domains (and hence actionable intents) that the digital assistant is capable of understanding and acting upon. In some examples, ontology 760 can be modified, such as by adding or removing entire domains or nodes, or by modifying relationships between the nodes within the ontology 760.

In some examples, nodes associated with multiple related actionable intents can be clustered under a "super domain" in ontology 760. For example, a "travel" super-domain can include a cluster of property nodes and actionable intent nodes related to travel. The actionable intent nodes related to travel can include "airline reservation," "hotel reservation," "car rental," "get directions," "find points of interest," and so on. The actionable intent nodes under the same super domain (e.g., the "travel" super domain) can have many property nodes in common. For example, the actionable intent nodes for "airline reservation," "hotel reservation," "car rental," "get directions," and "find points of interest" can share one or more of the property nodes "start location," "destination," "departure date/time," "arrival date/time," and "party size."

In some examples, each node in ontology 760 can be associated with a set of words and/or phrases that are relevant to the property or actionable intent represented by the node. The respective set of words and/or phrases associated with each node can be the so-called "vocabulary" associated with the node. The respective set of words and/or phrases associated with each node can be stored in vocabulary index 744 in association with the property or actionable intent represented by the node. For example, returning to FIG. 7B, the vocabulary associated with the node for the property of "restaurant" can include words such as "food," "drinks," "cuisine," "hungry," "eat," "pizza," "fast food," "meal," and so on. For another example, the vocabulary associated with the node for the actionable intent of "initiate a phone call" can include words and phrases such as "call," "phone," "dial," "ring," "call this number," "make a call to," and so on. The vocabulary index 744 can optionally include words and phrases in different languages.

Natural language processing module 732 can receive the token sequence (e.g., a text string) from STT processing module 730, and determine what nodes are implicated by the words in the token sequence. In some examples, if a word or phrase in the token sequence is found to be associated with one or more nodes in ontology 760 (via vocabulary index 744), the word or phrase can "trigger" or "activate" those nodes. Based on the quantity and/or relative importance of the activated nodes, natural language processing module 732 can select one of the actionable intents as the task that the user intended the digital assistant to perform. In some examples, the domain that has the most "triggered" nodes can be selected. In some examples, the domain having the highest confidence value (e.g., based on the relative importance of its various triggered nodes) can be selected. In some examples, the domain can be selected based on a combination of the number and the importance of the triggered nodes. In some examples, additional factors are considered in selecting the node as well, such as whether the digital assistant has previously correctly interpreted a similar request from a user.

User data 748 can include user-specific information, such as user-specific vocabulary, user preferences, user address, user's default and secondary languages, user's contact list, and other short-term or long-term information for each user. In some examples, natural language processing module 732 can use the user-specific information to supplement the information contained in the user input to further define the user intent. For example, for a user request "invite my friends to my birthday party," natural language processing module 732 can be able to access user data 748 to determine who the "friends" are and when and where the "birthday party" would be held, rather than requiring the user to provide such information explicitly in his/her request.

Other details of searching an ontology based on a token string is described in U.S. Utility application Ser. No. 12/341,743 for "Method and Apparatus for Searching Using An Active Ontology," filed Dec. 22, 2008, the entire disclosure of which is incorporated herein by reference.

In some examples, once natural language processing module 732 identifies an actionable intent (or domain) based on the user request, natural language processing module 732 can generate a structured query to represent the identified actionable intent. In some examples, the structured query can include parameters for one or more nodes within the domain for the actionable intent, and at least some of the parameters are populated with the specific information and requirements specified in the user request. For example, the user may say "Make me a dinner reservation at a sushi place at 7." In this case, natural language processing module 732 can be able to correctly identify the actionable intent to be "restaurant reservation" based on the user input. According to the ontology, a structured query for a "restaurant reservation" domain may include parameters such as {Cuisine}, {Time}, {Date}, {Party Size}, and the like. In some examples, based on the speech input and the text derived from the speech input using STT processing module 730, natural language processing module 732 can generate a partial structured query for the restaurant reservation domain, where the partial structured query includes the parameters {Cuisine="Sushi"} and {Time="7 pm"}. However, in this example, the user's speech input contains insufficient information to complete the structured query associated with the domain. Therefore, other necessary parameters such as {Party Size} and {Date} may not be specified in the structured query based on the information currently available. In some examples, natural language processing module 732 can populate some parameters of the structured query with received contextual information. For example, in some examples, if the user requested a sushi restaurant "near me," natural language processing module 732 can populate a {location} parameter in the structured query with GPS coordinates from the user device.

In some examples, natural language processing module 732 can pass the generated structured query (including any completed parameters) to task flow processing module 736 ("task flow processor"). Task flow processing module 736 can be configured to receive the structured query from natural language processing module 732, complete the structured query, if necessary, and perform the actions required to "complete" the user's ultimate request. In some examples, the various procedures necessary to complete these tasks can be provided in task flow models 754. In some examples, task flow models 754 can include procedures for obtaining additional information from the user and task flows for performing actions associated with the actionable intent.

As described above, in order to complete a structured query, task flow processing module 736 may need to initiate additional dialogue with the user in order to obtain additional information, and/or disambiguate potentially ambiguous speech inputs. When such interactions are necessary, task flow processing module 736 can invoke dialogue flow processing module 734 to engage in a dialogue with the user. In some examples, dialogue flow processing module 734 can determine how (and/or when) to ask the user for the additional information and receive and processes the user responses. The questions can be provided to and answers can be received from the users through I/O processing module 728. In some examples, dialogue flow processing module 734 can present dialogue output to the user via audio and/or visual output, and receive input from the user via spoken or physical (e.g., clicking) responses. Continuing with the example above, when task flow processing module 736 invokes dialogue flow processing module 734 to determine the "party size" and "date" information for the structured query associated with the domain "restaurant reservation," dialogue flow processing module 734 can generate questions such as "For how many people?" and "On which day?" to pass to the user. Once answers are received from the user, dialogue flow processing module 734 can then populate the structured query with the missing information or pass the information to task flow processing module 736 to complete the missing information from the structured query.

Once task flow processing module 736 has completed the structured query for an actionable intent, task flow processing module 736 can proceed to perform the ultimate task associated with the actionable intent. Accordingly, task flow processing module 736 can execute the steps and instructions in the task flow model according to the specific parameters contained in the structured query. For example, the task flow model for the actionable intent of "restaurant reservation" can include steps and instructions for contacting a restaurant and actually requesting a reservation for a particular party size at a particular time. For example, using a structured query such as: {restaurant reservation, restaurant=ABC Café, date=Mar. 12, 2012, time=7 pm, party size=5}, task flow processing module 736 can perform the steps of: (1) logging onto a server of the ABC Café or a restaurant reservation system such as OPENTABLE®; (2) entering the date, time, and party size information in a form on the website; (3) submitting the form; and (4) making a calendar entry for the reservation in the user's calendar.

In some examples, task flow processing module 736 can employ the assistance of service processing module 738 ("service processing module") to complete a task requested in the user input or to provide an informational answer requested in the user input. For example, service processing module 738 can act on behalf of task flow processing module 736 to make a phone call, set a calendar entry, invoke a map search, invoke or interact with other user applications installed on the user device, and invoke or interact with third-party services (e.g., a restaurant reservation portal, a social networking website, a banking portal, etc.). In some examples, the protocols and application programming interfaces (API) required by each service can be specified by a respective service model among service models 756. Service processing module 738 can access the appropriate service model for a service and generate requests for the service in accordance with the protocols and APIs required by the service according to the service model.

For example, if a restaurant has enabled an online reservation service, the restaurant can submit a service model specifying the necessary parameters for making a reservation and the APIs for communicating the values of the necessary parameter to the online reservation service. When requested by task flow processing module 736, service processing module 738 can establish a network connection with the online reservation service using the web address stored in the service model and send the necessary parameters of the reservation (e.g., time, date, party size) to the online reservation interface in a format according to the API of the online reservation service.

In some examples, natural language processing module 732, dialogue flow processing module 734, and task flow processing module 736 can be used collectively and iteratively to infer and define the user's intent, obtain information to further clarify and refine the user intent, and finally generate a response (i.e., an output to the user, or the completion of a task) to fulfill the user's intent. The generated response can be a dialogue response to the speech input that at least partially fulfills the user's intent. Further, in some examples, the generated response can be output as a speech output. In these examples, the generated response can be sent to speech synthesis module 740 (e.g., speech synthesizer) where it can be processed to synthesize the dialogue response in speech form. In yet other examples, the generated response can be data content relevant to satisfying a user request in the speech input.

Speech synthesis module 740 can be configured to synthesize speech outputs for presentation to the user. Speech synthesis module 740 synthesizes speech outputs based on text provided by the digital assistant. For example, the generated dialogue response can be in the form of a text string. Speech synthesis module 740 can convert the text string to an audible speech output. Speech synthesis module 740 can use any appropriate speech synthesis technique in order to generate speech outputs from text, including, but not limited to, concatenative synthesis, unit selection synthesis, diphone synthesis, domain-specific synthesis, formant synthesis, articulatory synthesis, hidden Markov model (HMM) based synthesis, and sinewave synthesis. In some examples, speech synthesis module 740 can be configured to synthesize individual words based on phonemic strings corresponding to the words. For example, a phonemic string can be associated with a word in the generated dialogue response. The phonemic string can be stored in metadata associated with the word. Speech synthesis model 740 can be configured to directly process the phonemic string in the metadata to synthesize the word in speech form.

In some examples, instead of (or in addition to) using speech synthesis module 740, speech synthesis can be performed on a remote device (e.g., the server system 108), and the synthesized speech can be sent to the user device for output to the user. For example, this can occur in some implementations where outputs for a digital assistant are generated at a server system. And because server systems generally have more processing power or resources than a user device, it can be possible to obtain higher quality speech outputs than would be practical with client-side synthesis.

Additional details on digital assistants can be found in the U.S. Utility application Ser. No. 12/987,982, entitled "Intelligent Automated Assistant," filed Jan. 10, 2011, and U.S. Utility application Ser. No. 13/251,088, entitled "Generating and Processing Task Items That Represent Tasks to Perform," filed Sep. 30, 2011, the entire disclosures of which are incorporated herein by reference.

4. Exemplary Functions of a Digital Assistant—Intelligent Search and Object Management FIGS. 8A-8F, 9A-9H, 10A-10B, 11A-11D, 12A-12D, and 13A-13C illustrate functionalities of performing a task using a search process or an object managing process by a digital assistant. In some examples, the digital assistant system (e.g., digital assistant system 700) is implemented by a user device according to various examples. In some examples, the user device, a server (e.g., server 108), or a combination thereof, may implement a digital assistant system (e.g., digital assistant system 700). The user device can be implemented using, for example, device 104, 200, or 400. In some examples, the user device is a laptop computer, a desktop computer, or a tablet computer. The user device can operate in a multi-tasking environment, such as a desktop environment.

With references to FIGS. 8A-8F, 9A-9H, 10A-10B, 11A-11D, 12A-12D, and 13A-13C, in some examples, a user device provides various user interfaces (e.g., user interfaces 810, 910, 1010, 1110, 1210, and 1310). The user device displays the various user interfaces on a display (e.g., touch-sensitive display system 212, display 440) associated with the user device. The various user interfaces provide one or more affordances representing different processes (e.g., affordances 820, 920, 1020, 1120, 1220, and 1320 representing searching processes; and affordances 830, 930, 1030, 1130, 1230, and 1330 representing object managing processes). The one or more processes can be instantiated directly or indirectly by the user. For example, a user instantiates the one or more processes by selecting the affordances using an input device such as a keyboard, a mouse, a joystick, a finger, or the like. A user can also instantiate the one or more processes using a speech input, as described in more detail below. Instantiating a process includes invoking the process if the process is not already executing. If at least one instance of the process is executing, instantiating a process includes executing an existing instance of the process or generating a new instance of the process. For example, instantiating an object managing process includes invoking the object managing process, using an existing object managing process, or generate a new instance of the object managing process.

As shown in FIGS. 8A-8F, 9A-9H, 10A-10B, 11A-11D, 12A-12D, and 13A-13C, the user device displays, on a user interface (e.g., user interface 810, 910, 1010, 1110, 1210, and 1310) an affordance (e.g., affordance 840, 940, 1040, 1140, 1240, and 1340) to instantiate a digital assistant service. The affordance can be, for example, a microphone icon representing the digital assistant. The affordance can be displayed at any location on the user interfaces. For example, the affordance can be displayed on the dock (e.g., dock 808, 908, 1008, 1108, 1208, and 1308) at the bottom of the user interfaces, on the menu bar (e.g. menu bar 806, 906, 1006, 1106, 1206, and 1306) at the top of the user interfaces, in a notification center at the right side of the user interfaces, or the like. The affordance can also be displayed dynamically on the user interface. For example, the user device displays the affordance near an application user interface (e.g., an application window) such that the digital assistant service can be conveniently instantiated.

In some examples, the digital assistant is instantiated in response to receiving a pre-determined phrase. For example, the digital assistant is invoked in response to receiving a phrase such as "Hey, Assistant," "Wake up, Assistant," "Listen up, Assistant," "OK, Assistant," or the like. In some examples, the digital assistant is instantiated in response to receiving a selection of the affordance. For example, a user selects affordance 840, 940, 1040, 1140, 1240, and/or 1340 using an input device such as a mouse, a stylus, a finger, or the like. Providing a digital assistant on a user device consumes computing resources (e.g., power, network bandwidth, memory, and processor cycles). In some examples, the digital assistant is suspended or shut down until a user invokes it. In some examples, the digital assistant is active for various periods of time. For example, the digital assistant can be active and monitoring the user's speech input during the time that various user interfaces are displayed, that the user device is turned on, that the user device is hibernating or sleeping, that the user is logged off, or a combination thereof.

With reference to FIGS. 8A-8F, 9A-9H, 10A-10B, 11A-11D, 12A-12D, and 13A-13C, a digital assistant receives one or more speech inputs, such as speech inputs 852, 854, 855, 856, 952, 954, 1052, 1054, 1152, 1252, or 1352, from a user. The user provides various speech inputs for the purpose of, for example, performing a task using a searching process or an object managing process. In some examples, the digital assistant receives speech inputs directly from the user at the user device or indirectly through another electronic device that is communicatively connected to the user device. The digital assistant receives speech inputs directly from the user via, for example, a microphone (e.g., microphone 213) of the user device. The user device includes a device that is configured to operate in a multi-tasking environment, such as a laptop computer, a desktop computer, a tablet, a server, or the like. The digital assistant can also receive speech inputs indirectly through one or more electronic devices such as a headset, a smartphone, a tablet, or the like. For instance, the user may speak to a headset (not shown). The headset receives the speech input from the user and transmits the speech input or a representation of it to the digital assistant of the user device via, for example, a Bluetooth connection between the headset and the user device.

With reference to FIGS. 8A-8F, 9A-9H, 10A-10B, 11A-11D, 12A-12D, and 13A-13C, in some embodiments, the digital assistant (e.g., represented by affordance 840, 940, 1040, 1140, 1240, and 1340) identifies context information associated with the user device. The context information includes, for example, user-specific data, metadata associated with one or more objects, sensor data, and user device configuration data. An object can be a target or a component of a process (e.g., an object managing process) associated with performing a task or a graphical element currently displayed on screen, and the object or graphical element may have or may not currently have focus (e.g., be currently selected). For example, an object can include a file (e.g., a photo, a document), a folder, a communication (e.g., an email, a message, a notification, or a voicemail), a contact, a calendar, an application, an online resource, or the like. In some examples, the user-specific data includes log information, user preferences, the history of user's interaction with the user device, or the like. Log information indicates recent objects (e.g., a presentation file) used in a process. In some examples, metadata associated with one or more objects includes the title of the object, the time information of the object, the author of the object, the summary of the object, or the like. In some examples, the sensor data includes various data collected by a sensor associated with the user device. For example, the sensor data includes location data indicating the physical location of the user device. In some examples, the user device configuration data includes the current device configurations. For example, the device configurations indicate that the user device is communicatively connected to one or more electronic devices such as a smartphone, a tablet, or the like. As described in more detail below, the user device can perform one or more processes using the context information.

With reference to FIGS. 8A-8F, 9A-9H, 10A-10B, 11A-11D, 12A-12D, and 13A-13C, in response to receiving a speech input, the digital assistant determines a user intent based on the speech input. As described above, in some examples, the digital assistant processes a speech input via an I/O processing module (e.g., I/O processing module 728 as shown in FIG. 7B), an STT processing module (e.g., STT processing module 730 as shown in FIG. 7B), and a natural language processing module (e.g., natural language processing module 732 as shown in FIG. 7B). The I/O processing module forwards the speech input to an STT processing module (or a speech recognizer) for speech-to-text conversions. The speech-to-text conversion generates text based on the speech input. As described above, the STT processing module generates a sequence of words or tokens ("token sequence") and provides the token sequence to the natural language processing module. The natural language processing module performs natural language processing of the text and determines the user intent based on a result of the natural language processing. For example, the natural language processing module may attempt to associate the token sequence with one or more actionable intents recognized by the digital assistant. As described, once the natural language processing module identifies an actionable intent based on the user input, it generates a structured query to represent the identified actionable intent. The structured query includes one or more parameters associated with the actionable intent. The one or more parameters are used to facilitate the performance of a task based on the actionable intent.

In some embodiments, the digital assistant further determines whether the user intent is to perform a task using a searching process or an object managing process. The searching process is configured to search data stored internally or externally to the user device. The object managing process is configured to manage objects associated with the user device. Various examples of determination of the user intent are provided below in more detail with respect to FIGS. 8A-8F, 9A-9H, 10A-10B, 11A-11D, 12A-12D, and 13A-13C.

Figure 8A:
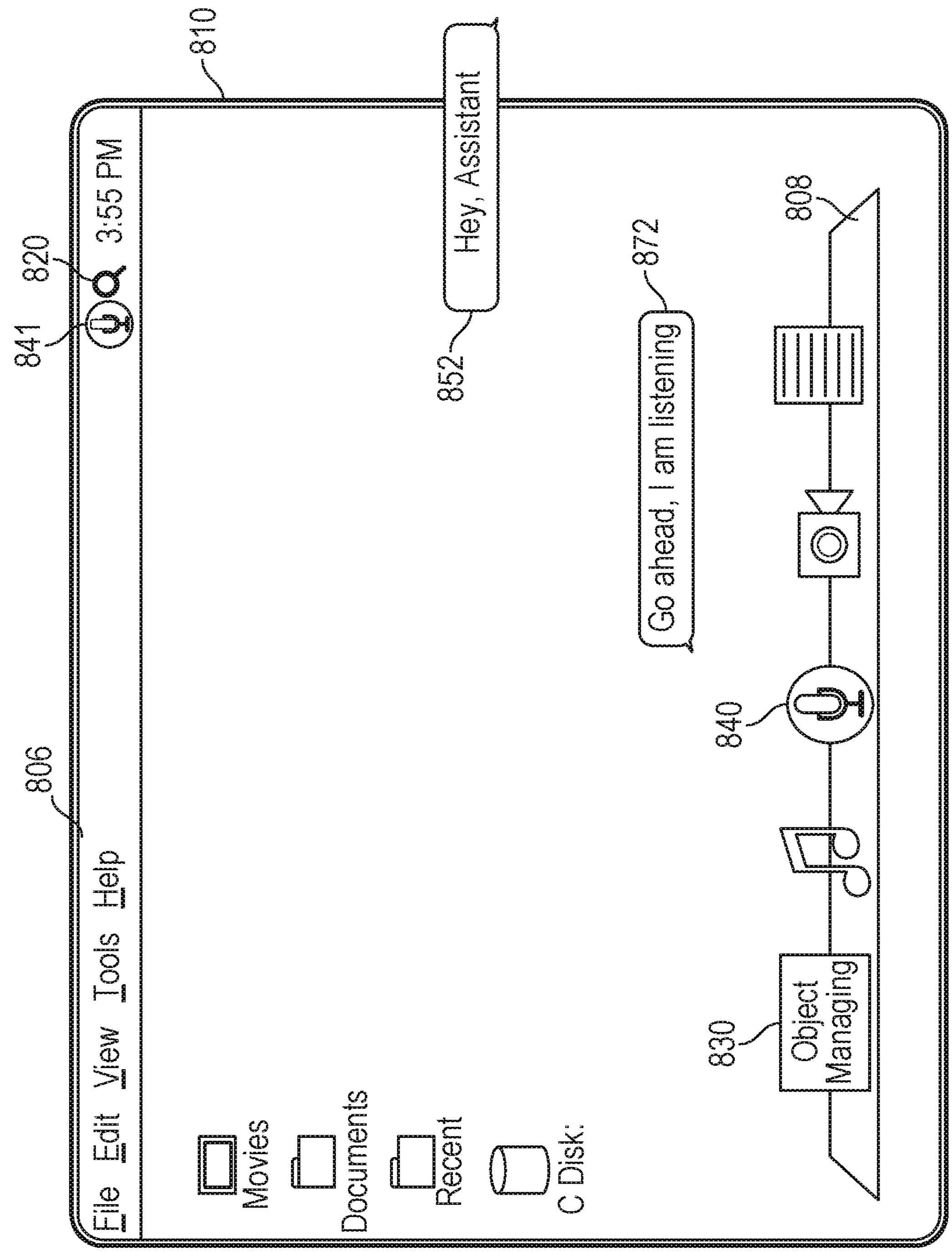
FIGS. 8A-8F illustrate functionalities of performing a task using a search process or an object managing process by a digital assistant according to various examples.

With reference to FIG. 8A, in some examples, a user device receives a speech input 852 from a user to instantiate the digital assistant. Speech input 852 includes, for example, "Hey, Assistant." In response to the speech input, the user device instantiates the digital assistant represented by affordance 840 or 841 such that the digital assistant is actively monitoring subsequent speech inputs. In some examples, the digital assistant provides a spoken output 872 indicating that it is instantiated. For example, spoken output 872 includes "Go ahead, I am listening." In some examples, the user device receives a selection of affordance 840 or affordance 841 from the user to instantiate the digital assistant. The selection of affordance is performed by using an input device such as a mouse, a stylus, a finger, or the like.

Figure 8B:
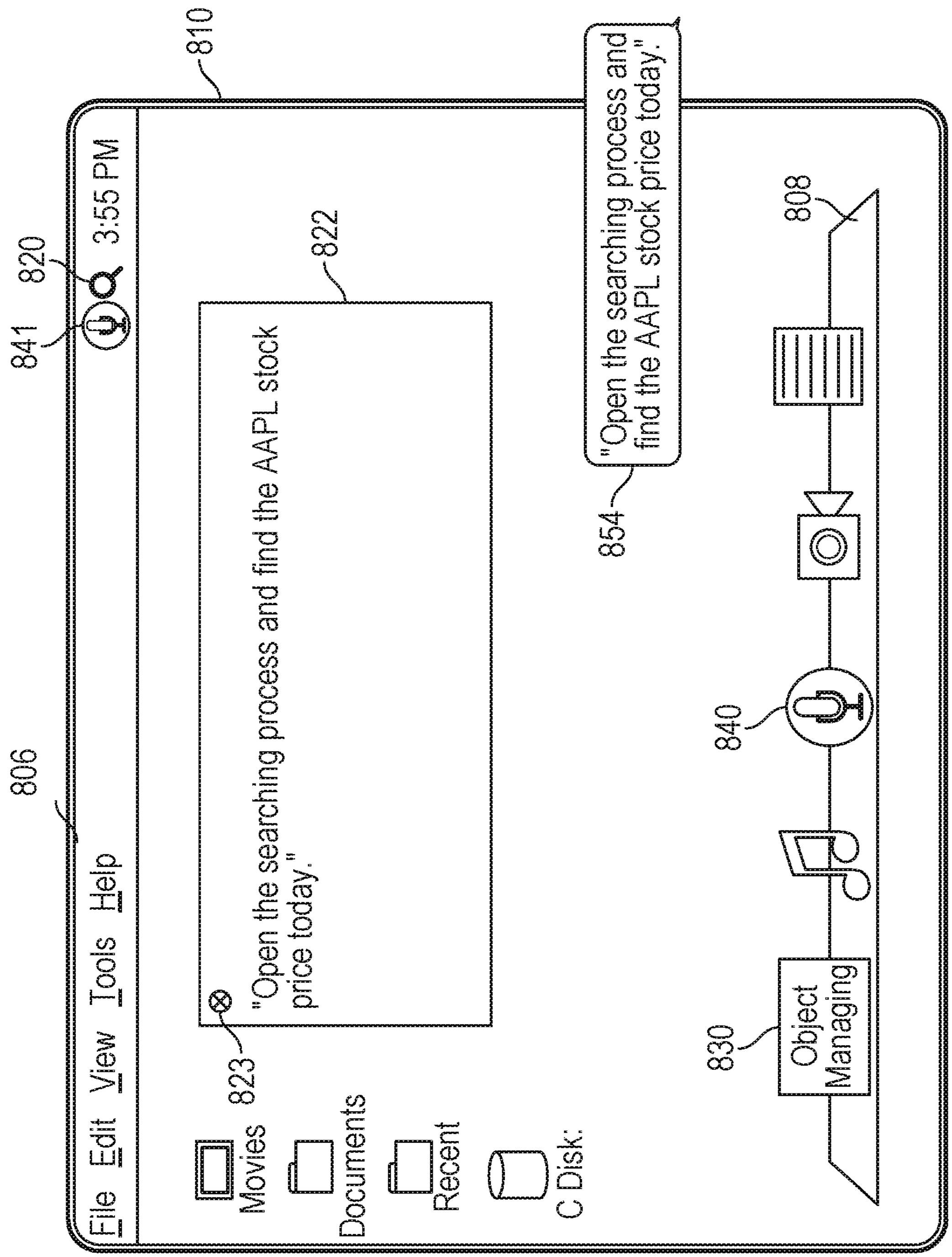

With reference to FIG. 8B, in some examples, the digital assistant receives a speech input 854. Speech input 854 includes, for example, "Open the searching process and find the AAPL stock price today," or simply "show me the AAPL stock price today." Based on speech input 854, the digital assistant determines the user intent. For example, to determine the user intent, the digital assistant determines that the actionable intent is obtaining online information and that one or more parameters associated with this actionable intent include "AAPL stock price," and "today."

As described, in some examples, the digital assistant further determines whether the user intent is to perform a task using a searching process or an object managing process. In some embodiments, to make the determination, the digital assistant determines whether the speech input includes one or more keywords representing the searching process or the object managing process. For example, the digital assistant determines that speech input 854 includes keywords or a phrase such as "open the searching process," indicating the user intent is to use the searching process to perform the task. As a result, the digital assistant determines that the user intent is to perform a task using the searching process.

As shown in FIG. 8B, in accordance with a determination the user intent is to perform the task using the searching process, the digital assistant performs the task using the searching process. As described, the natural language processing module of the digital assistant generates a structured query based on the user intent and passes the generated structured query to a task flow processing module (e.g., task flow processing module 736). The task flow processing module receives the structured query from the natural language processing module, completes the structured query, if necessary, and performs the actions required to "complete" the user's ultimate request. Performing the task using the searching process includes, for example, searching at least one object. In some embodiments, at least one object includes a folder, a file (e.g., a photo, an audio, a video), a communication (e.g., an email, a message, a notification, a voicemail), a contact, a calendar, an application (e.g., Keynote, Number, iTunes, Safari), an online informational source (e.g., Google, Yahoo, Bloomberg), or a combination thereof. In some examples, searching an object is based on metadata associated with the object. For example, the searching of a file or folder can use metadata such as a tag, a date, a time, an author, a title, a type of the file, a size, a page count, and/or a file location associated with the folder or file. In some examples, the file or folder is stored internally or externally to the user device. For example, the file or folder can be stored on the hard disk of the user device or stored on a cloud server. In some examples, searching a communication is based on metadata associated with the communication. For example, the searching of an email uses metadata such as the sender of the email, the receiver of the email, the sent/receive dates of the email, or the like.

As illustrated in FIG. 8B, in accordance with the determination that the user intent is to obtain the AAPL stock price using the searching process, the digital assistant performs the searching. For example, the digital assistant instantiates a searching process, represented by affordance 820, and causes the searching process to search today's AAPL stock price. In some examples, the digital assistant further causes the searching process to display a user interface 822 (e.g., a snippet or a window) providing text corresponding to speech input 854 (e.g., "Open the searching process and find the AAPL stock price today").

Figure 8C:
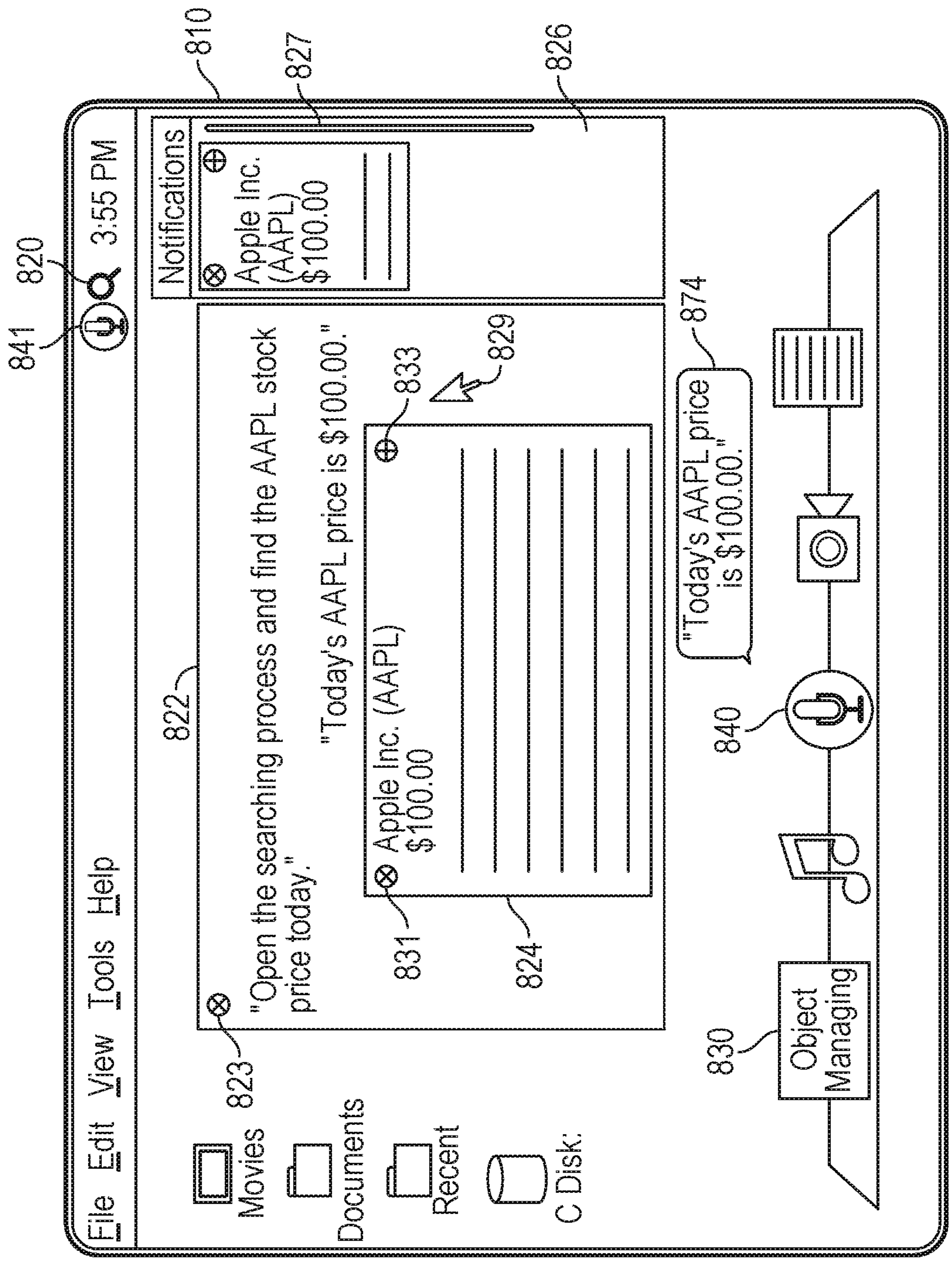

With reference to FIG. 8C, in some embodiments, the digital assistant provides a response based on a result of performing the task using the searching process. As illustrated in FIG. 8C, as a result of searching the AAPL stock price, the digital assistant displays a user interface 824 (e.g., a snippet or a window) providing the result of performing the task using the searching process. In some embodiments, user interface 824 is located within user interface 822 as a separate user interface. In some embodiments, user interfaces 824 and 822 are integrated together as a single user interface. On user interface 824, the search result of the stock price of AAPL is displayed. In some embodiments, user interface 824 further provides affordances 831 and 833. Affordance 831 enables closing of user interface 824. For example, if the digital assistant receives a user's selection of affordance 831, user interface 824 disappears or closes from the display of the user device. Affordance 833 enables moving or sharing of the search result displayed on user interface 824. For example, if the digital assistant receives the user's selection of affordance 833, it instantiates a process (e.g., the object managing process) to move or share user interface 824 (or the search result thereof) with a notification application. As shown in FIG. 8C, the digital assistant displays a user interface 826 that is associated with the notification application to provide the search result of AAPL stock price. In some embodiments, user interface 826 displays an affordance 827. Affordance 827 enables scrolling within user interface 826 such that the user can view the entire content (e.g., multiple notifications) within user interface 826 and/or indicates that relative position of the document with respect to its entire length and/or width. In some embodiments, user interface 826 displays results and/or dialog history (e.g., search results obtained from a current and/or past searching process) stored by the digital assistant. Further, in some examples, results of the performance the task are dynamically updated over time. For example, the AAPL stock price can be dynamically updated over time and displayed on user interface 826.

In some embodiments, the digital assistant also provides a spoken output corresponding to the search result. For example, the digital assistant (e.g., represented by affordance 840) provides a spoken output 874 including "Today's AAPL price is $100.00." In some examples, user interface 822 includes text corresponding to spoken output 874.

Figure 8D:
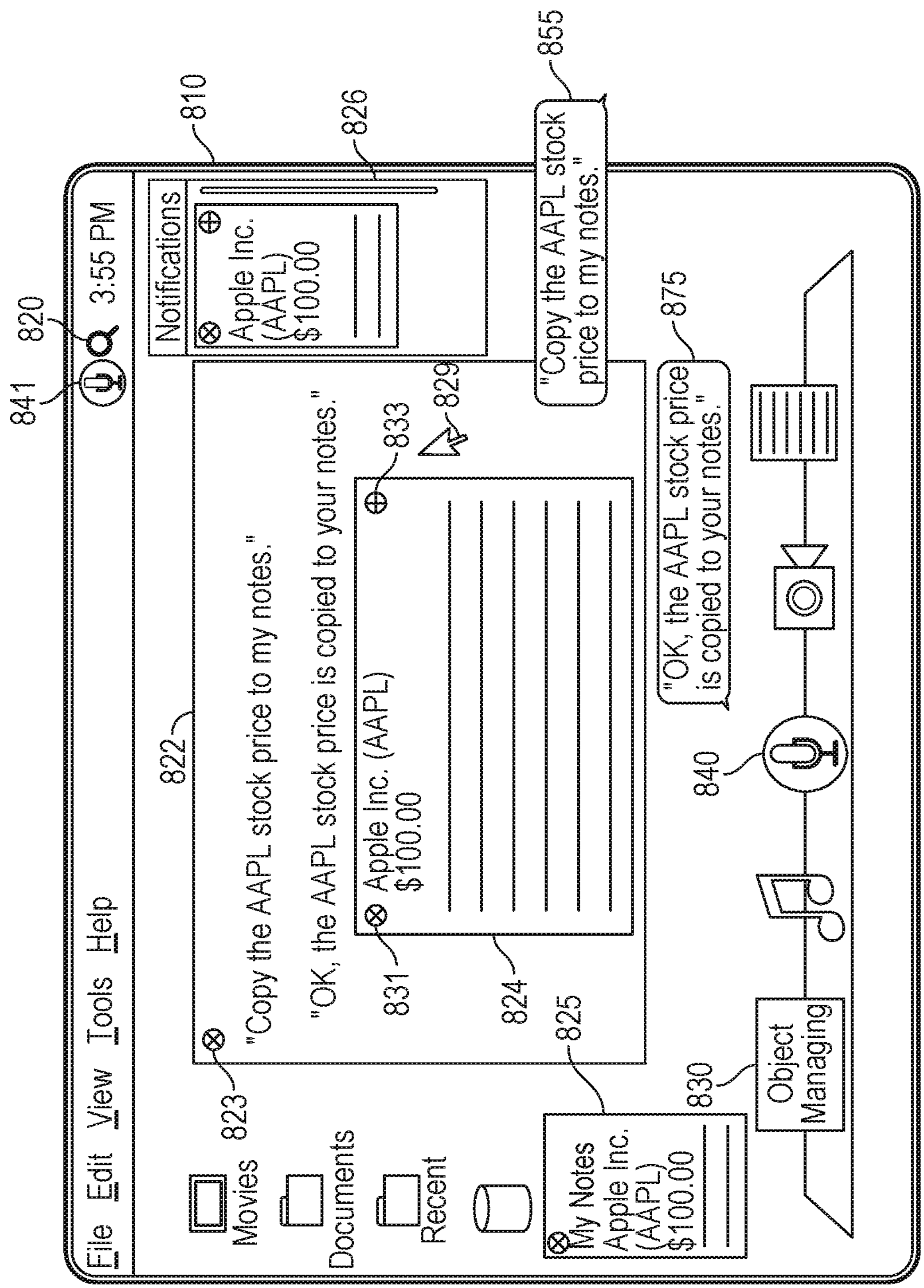

With reference to FIG. 8D, in some examples, the digital assistant instantiates a process (e.g., the object managing process) to move or share the search result displayed on user interface 824 in response to a subsequent speech input. For example, the digital assistant receives a speech input 855 such as "Copy the AAPL stock price to my notes." In response, the digital assistant instantiates a process to move or copy the search result (e.g., the AAPL stock price) to the user's note. As shown in FIG. 8D, in some examples, the digital assistant further displays a user interface 825 providing the copied or moved search result in user's note. In some examples, the digital assistant further provides a spoken output 875 such as "OK, the AAPL stock price is copied to your notes." In some examples, user interface 822 includes text corresponding to spoken output 875.

Figure 8E:
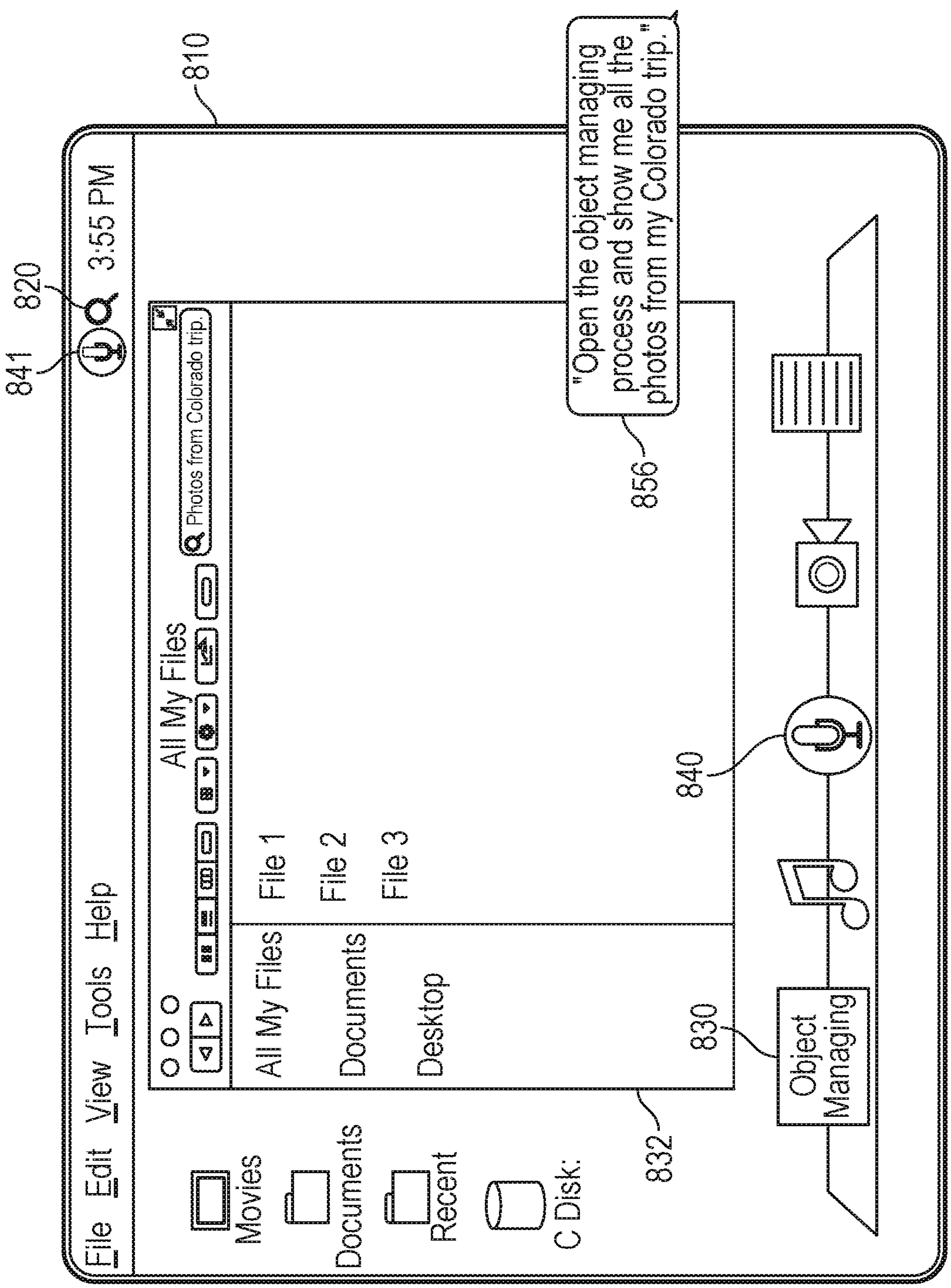

With reference to FIG. 8E, in some examples, the digital assistant determines that the user intent is to perform a task using the object managing process and performs the task using an object managing process. For example, the digital assistant receives a speech input 856 such as "Open the object managing process and show me all the photos from my Colorado trip," or simply "Show me all the photos from my Colorado trip." Based on speech input 856 and context information, the digital assistant determines the user intent. For example, the digital assistant determines that the actionable intent is to display photos and determines one or more parameters such as "all," and "Colorado trip." The digital assistant further determines which photos correspond to the user's Colorado trip using context information. As described, context information includes user-specific data, metadata of one or more objects, sensor data, and/or device configuration data. As an example, metadata associated with one or more files (e.g., file 1, file 2, and file 3 displayed in user interface 832) indicates that the file names includes the word "Colorado" or a city name of Colorado (e.g., "Denver"). The metadata may also indicate that a folder name includes the word "Colorado" or a city name of Colorado (e.g., "Denver"). As another example, sensor data (e.g., GPS data) indicates that the user was travelling within Colorado during a certain period of time. As a result, any photos the user took during that particular period of time are photos taken during the user's Colorado trip. As well, photos themselves may include geotagged metadata that associates the photo with the location at which it was taken. Based on the context information, the digital assistant determines that the user intent is to, for example, display photos stored in a folder having a folder name "Colorado trip," or display photos taken during the period of time that the user was travelling within Colorado.

As described, in some examples, the digital assistant determines whether the user intent is to perform a task using a searching process or an object managing process. To make such determination, the digital assistant determines whether the speech input includes one or more keywords representing the searching process or the object managing process. For example, the digital assistant determines that speech input 856 includes keywords or a phrase such as "open the object managing process," indicating that the user intent is to use the object managing process to perform the task.

In accordance with a determination the user intent is to perform the task using the object managing process, the digital assistant performs the task using the object managing process. For example, the digital assistant searches at least one object using the object managing process. In some examples, at least one object includes at least one of a folder or a file. A file can include at least one of a photo, an audio (e.g., a song), or a video (e.g., a movie). In some examples, searching a file or a folder is based on metadata associated with the folder or file. For example, the searching of a file or folder uses metadata such as a tag, a date, a time, an author, a title, a type of the file, a size, a page count, and/or a file location associated with the folder or file. In some examples, the file or folder can be stored internally or externally to the user device. For example, the file or folder can be stored on the hard disk of the user device or stored on a cloud server.

As illustrated in FIG. 8E, in accordance with the determination that the user intent is, for example, to display photos stored in a folder having a folder name "Colorado trip," or display photos taken during the period of time that the user was travelling within Colorado, the digital assistant performs the task using the object managing process. For example, the digital assistant instantiates an object managing process represented by affordance 830 and causes the object managing process to search for photos from the user's Colorado trip. In some examples, the digital assistant also causes the object managing process to display a snippet or a window (not shown) providing text of the user's speech input 856.

Figure 8F:
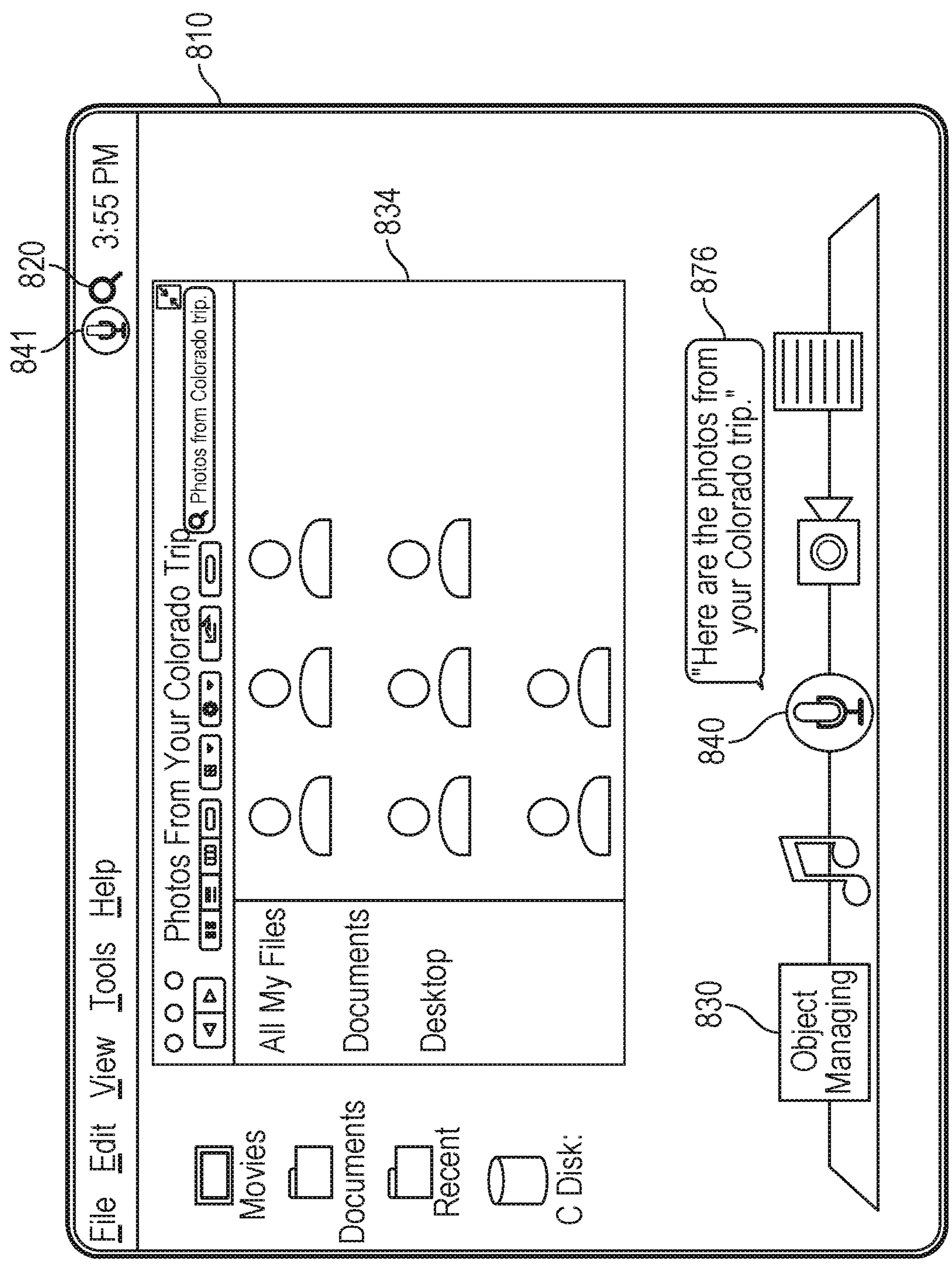

With reference to FIG. 8F, in some embodiments, the digital assistant further provides a response based on a result of performing the task using the object managing process. As illustrated in FIG. 8F, as a result of searching the photos of the user's Colorado trip, the digital assistant displays a user interface 834 (e.g., a snippet or a window) providing the result of performing the task using the obj ect managing process. For example, on user interface 834, a preview of the photos is displayed. In some examples, the digital assistant instantiates a process (e.g., the object managing process) to perform additional tasks on the photos, such as inserting the photos to a document or attaching the photos to email. As described in more detail below, the digital assistant can instantiate a process to perform the additional tasks in response to a user's additional speech input. As well, the digital assistant can perform multiple tasks in response to a single speech input, such as "send the photos from my Colorado trip to my Mom by email." The digital assistant can also instantiate a process to perform such additional tasks in response to the user's input using an input device (e.g., a mouse input to select of one or more affordances or perform a drag-and-drop operation). In some embodiments, the digital assistant further provides a spoken output corresponding to the result. For example, the digital assistant provides a spoken output 876 including "Here are the photos from your Colorado trip."

Figure 9A:
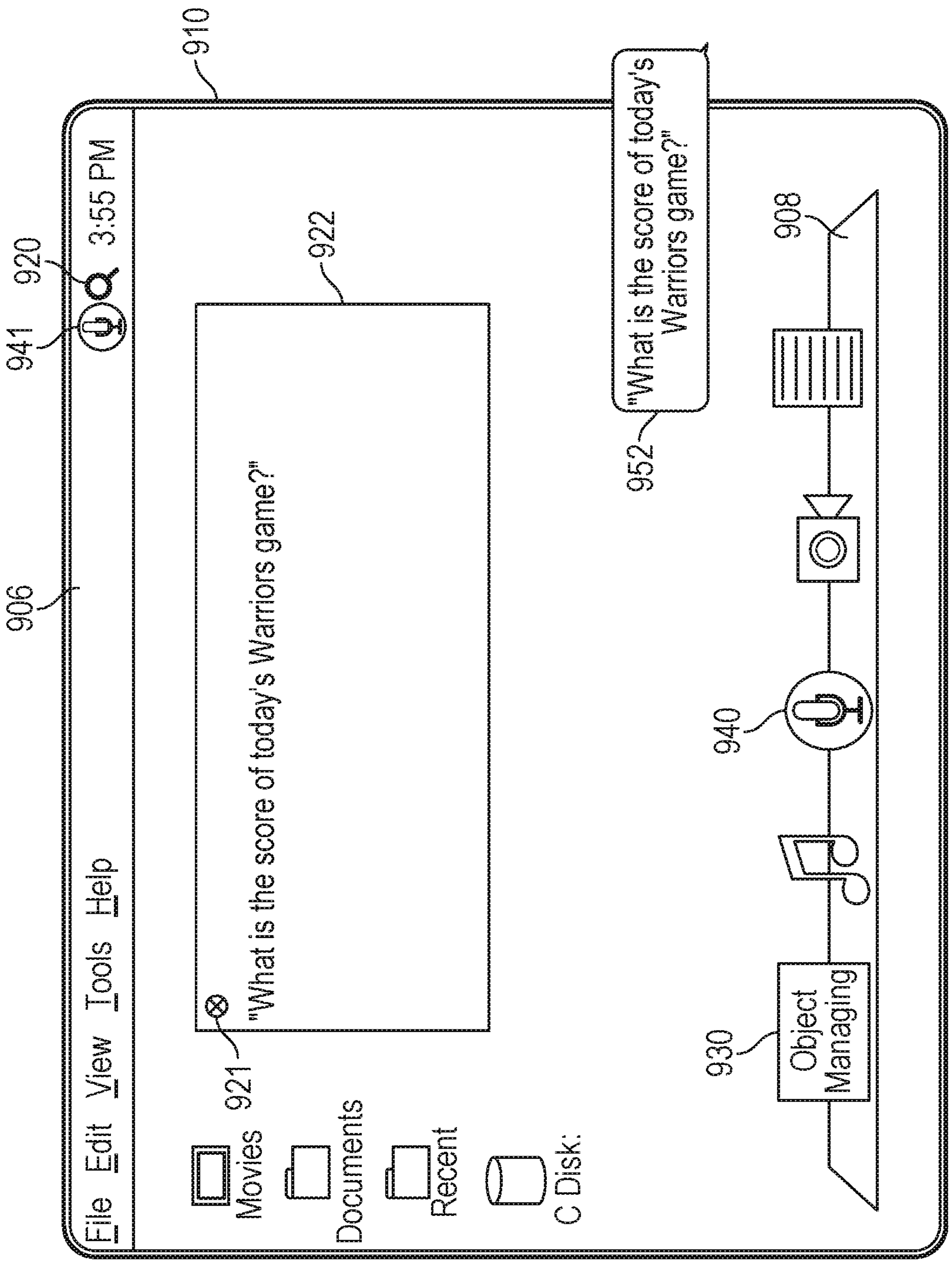
FIGS. 9A-9H illustrate functionalities of performing a task using a search process by a digital assistant according to various examples.

With reference to FIG. 9A, in some examples, user's speech input may not include one or more keywords indicating whether the user intent is to use the searching process or the object managing process. For example, the user provides a speech input 952 such as "What is the score of today's Warriors game?" Speech input 952 does not include keywords indicating "the searching process" or the "object managing process." As a result, the keywords may not be available for the digital assistant to determine whether the user intent is to perform the task using the searching process or the object managing process.

In some embodiments, to determine whether the user intent is to perform the task using the searching process or the object managing process, the digital assistant determines whether the task is associated with searching based on the speech input. In some examples, a task that is associated with searching can be performed by either the searching process or the object managing process. For example, both the searching process and the object managing process can search a folder and a file. In some examples, the searching process can further search a variety of objects including online information sources (e.g., websites), communications (e.g., emails), contacts, calendars, or the like. In some examples, the object managing process may not be configured to search certain objects such as online information sources.

In accordance with a determination that the task is associated with searching, the digital assistant further determines whether performing the task requires the searching process. As described, if a task is associated with searching, either the searching process or the object managing process can be used to perform the task. However, the object managing process may not be configured to search certain objects. As a result, to determine whether the user intent is to use the searching process or the object managing process, the digital assistant further determines whether the task requires the searching process. For example, as illustrated in FIG. 9A, based on speech input 952, the digital assistant determines that the user intent is, for example, to obtain the score of today's Warriors game. According to the user intent, the digital assistant further determines that performing the task requires searching online information sources and therefore is associated with searching. The digital assistant further determines whether performing the task requires the searching process. As described, in some examples, the searching process is configured to search online information sources such as websites, while the object managing process may not be configured to search such online information sources. As a result, the digital assistant determines that searching online information sources (e.g., searching Warriors' website to obtain the score) requires the searching process.

Figure 9B:
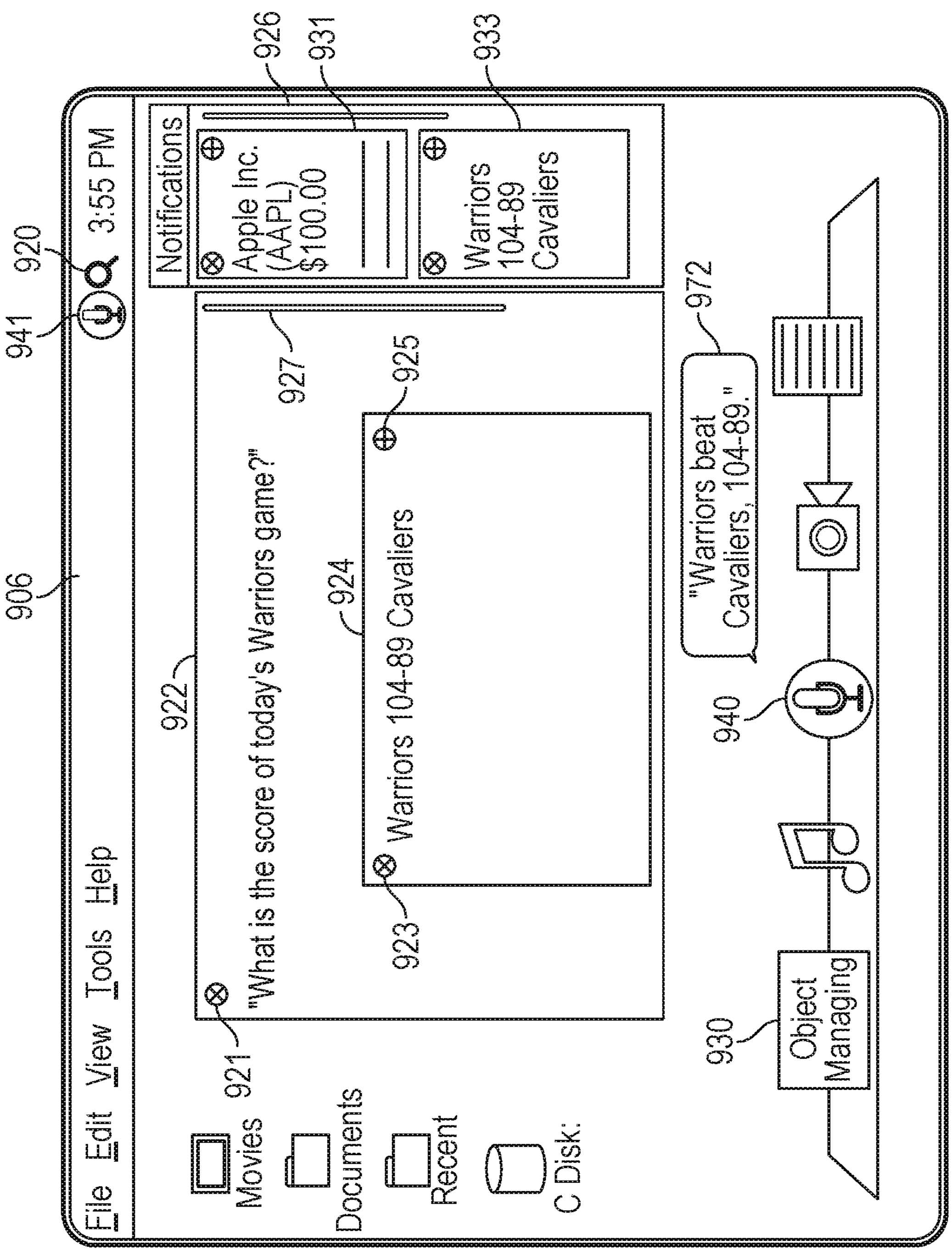

With reference to FIG. 9B, in some embodiments, in accordance with a determination that performing the task requires the searching process, the digital assistant performs the task using the searching process. For example, in accordance with the determination that searching the score of today's Warriors game requires the searching process, the digital assistant instantiates a searching process represented by affordance 920, and causes the searching process to search score of today's Warriors game. In some examples, the digital assistant further causes the searching process to display a user interface 922 (e.g., a snippet or a window) providing text of user speech input 952 (e.g., "What is the score of today's Warriors game?"). User interface 922 includes one or more affordances 921 and 927. Similar to described above, affordance 921 (e.g., a close button) enables closing of user interface 922 and affordance 927 (e.g., a scrolling bar) enables scrolling within user interface 922 such that the user can view the entire content within user interface 922.

With reference to FIG. 9B, in some examples, based on the search results, the digital assistant further provides one or more responses. As illustrated in FIG. 9B, as a result of searching the score of today's Warriors game, the digital assistant displays a user interface 924 (e.g., a snippet or a window) providing the result of performing the task using the searching process. In some embodiments, user interface 924 is located within user interface 922 as a separate user interface. In some embodiments, user interfaces 924 and 922 are integrated together as a single user interface. In some examples, the digital assistant displays the user interface 924 providing the current search results (e.g., the Warriors game score) together with another user interface (e.g., user interface 824 shown on FIG. 8C) providing prior search results (e.g., the AAPL stock price). In some embodiments, the digital assistant only displays user interface 924 providing the current search results and does not display another user interface providing prior search results. As illustrated in FIG. 9B, the digital assistant only displays user interface 924 to provide the current search results (e.g., the Warriors game score). In some examples, affordance 927 (e.g., a scrolling bar) enables scrolling within user interface 922 such that the user can view the prior search results. Further, in some examples, prior search results dynamically update or refresh, e.g., such that stock prices, sports score, weather forecast, etc., update over time.

As illustrated in FIG. 9B, on user interface 924, the search result of the score of today's Warriors game is displayed (e.g., Warriors 104-89 Cavaliers). In some embodiments, user interface 924 further provides affordances 923 and 925. Affordance 923 enables closing of user interface 924. For example, if the digital assistant receives a user's selection of affordance 923, user interface 924 disappears or closes from the display of the user device. Affordance 925 enables moving or sharing of the search result displayed on user interface 924. For example, if the digital assistant receives the user's selection of affordance 925, it moves or shares user interface 924 (or the search result thereof) with a notification application. As shown in FIG. 9B, the digital assistant displays user interface 926 that is associated with the notification application to provide the search result of Warriors game score. As described, results of the performance the task are dynamically updated over time. For example, the Warriors game score can be dynamically updated over time while the game is ongoing and displayed on user interface 924 (e.g., the snippet or window) and/or on user interface 926 (e.g., the notification application user interface). In some embodiments, the digital assistant further provides a spoken output corresponding to the search result. For example, the digital assistant represented by affordance 940 or 941 provides a spoken output 972 such as "Warriors beats Cavaliers, 104-89." In some examples, user interface 922 (e.g., a snippet or a window) provides text corresponding to spoken output 972.

Figure 9C:
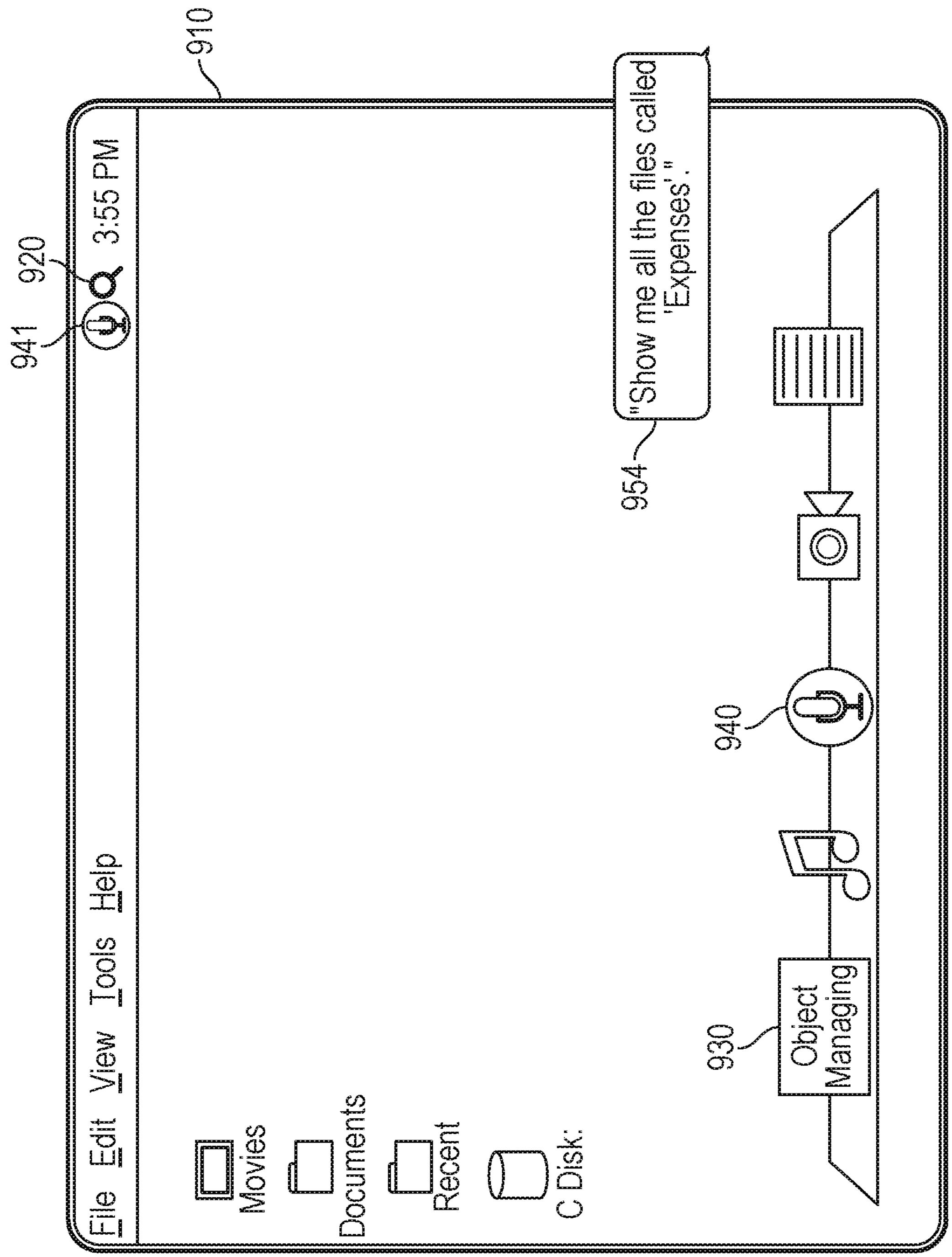

As described above, in some embodiments, the digital assistant determines whether the task is associated with searching, and in accordance with such a determination, the digital assistant determines whether performing the task requires the searching process. With reference to FIG. 9C, in some embodiments, the digital assistant determines that performing the task does not require the searching process. For example, as illustrated in FIG. 9C, the digital assistant receives a speech input 954 such as "Show me all the files called Expenses." Based on speech input 954 and context information, the digital assistant determines that user intent is to display all the files having the word "Expenses" (or a portion, a variation, a paraphrase thereof) contained in their file names, the metadata, the content of the files, or the like. According to the user intent, the digital assistant determines that the task to be performed includes searching all the files associated with the word "Expenses." As a result, the digital assistant determines that performing the task is associated with searching. As described above, in some examples, the searching process and the object managing process can both perform searching of files. As a result, the digital assistant determines that performing the task of searching all the files associated with the word "Expenses" does not require the searching process.

Figure 9D:
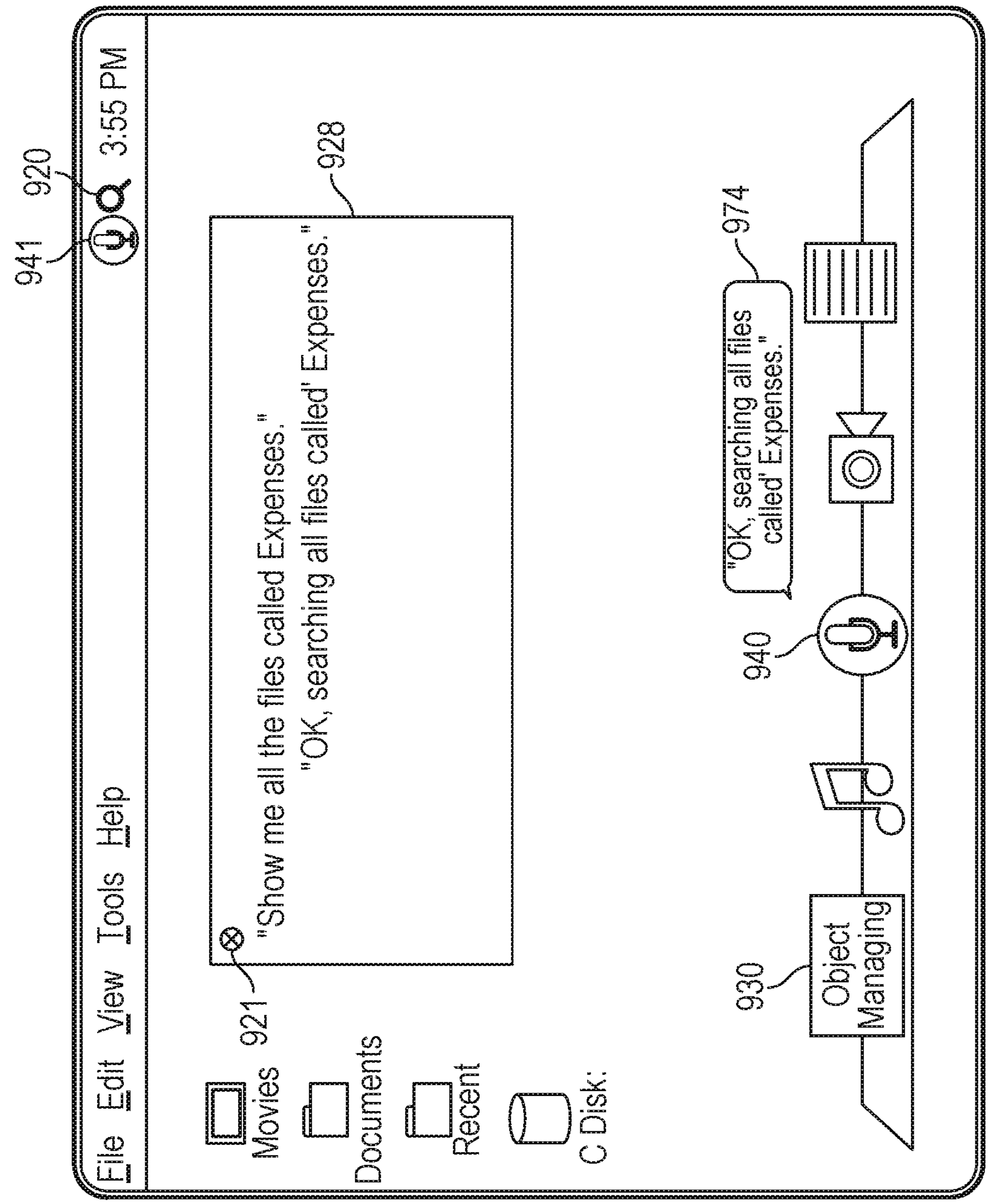

With reference to FIG. 9D, in some examples, in accordance with a determination that performing the task does not require the searching process, the digital assistant determines, based on a pre-determined configuration, whether the task is to be performed using the searching process or the object managing process. For example, if both the searching process and the object managing process can perform the task, a pre-determined configuration may indicate that the task is to be performed using the searching process. The pre-determined configuration can be generated and updated using context information such as user preferences or user-specific data. For example, the digital assistant determines that historically, for a particular user, the searching process was selected more frequently than the object managing process for file searching. As a result, the digital assistant generates or updates the pre-determined configuration to indicate that the searching process is the default process for searching files. In some examples, the digital assistant generates or updates the pre-determined configuration to indicate that the object managing process is the default process.

As illustrated in FIG. 9D, based on a pre-determined configuration, the digital assistant determines that the task of searching all the files associated with the word "Expense" is to be performed using the searching process. As a result, the digital assistant performs the searching of all the files associated with the word "Expenses" using the searching process. For example, the digital assistant instantiates a searching process represented by affordance 920 displayed on user interface 910, and causes the searching process to search all files associated with the word "Expenses." In some examples, the digital assistant further provides a spoken output 974, informing the user that the task is being performed. Spoken output 974 includes, for example, "OK, searching all files called 'Expenses'." In some examples, the digital assistant further causes the searching process to display a user interface 928 (e.g., a snippet or a window) providing text corresponding to speech input 954 and spoken output 974.

Figure 9E:
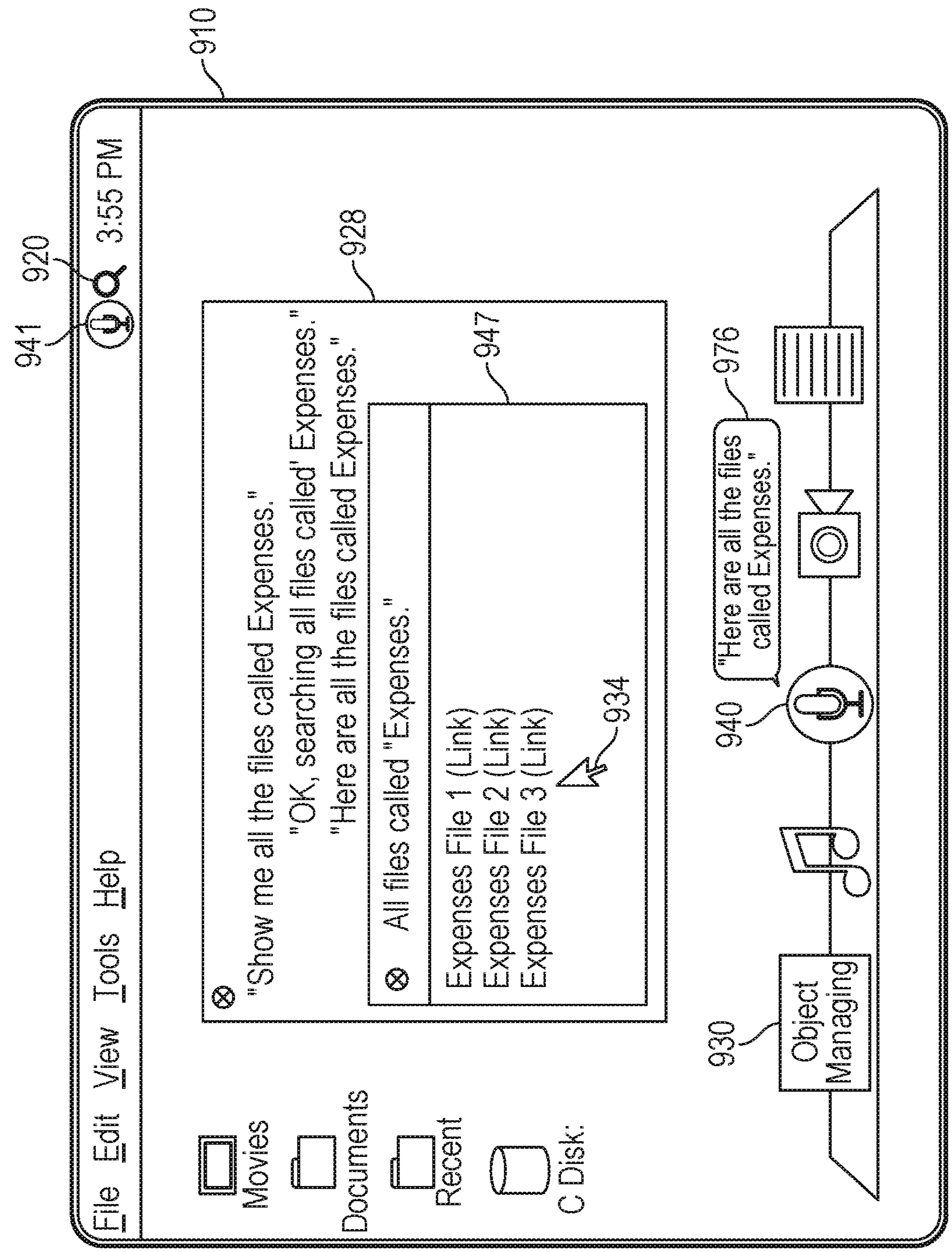

With reference to FIG. 9E, in some embodiments, the digital assistant further provides one or more responses based on a result of performing the task using the searching process. As illustrated in FIG. 9E, as a result of searching all files associated with the word "Expenses," the digital assistant displays a user interface 947 (e.g., a snippet or a window) providing the search results. In some embodiments, user interface 947 is located within user interface 928 as a separate user interface. In some embodiments, user interfaces 947 and 928 are integrated together as a single user interface. On user interface 947, a list of files that are associated with the word "Expenses" are displayed. In some embodiments, the digital assistant further provides a spoken output corresponding to the search result. For example, the digital assistant represented by affordance 940 or 941 provides a spoken output 976 such as "Here are all the files called Expenses." In some examples, the digital assistant further provides, on user interface 928, text corresponding to spoken output 976.

In some embodiments, the digital assistant provides one or more links associated with the result of performing the task using the searching process. A link enables instantiating a process (e.g., opening a file, invoking an object managing process) using the search result. As illustrated in FIG. 9E, on user interface 947, the list of files (e.g., Expenses File 1, Expenses File 2, Expenses File 3) represented by their file names can be associated with links. As an example, a link is displayed on the side of each file name. As another example, the file names is displayed in a particular color (e.g., blue) indicating that the file names are associated with links. In some examples, the file names associated with links are displayed in the same color as other items displayed on user interface 947.

Figure 9F:
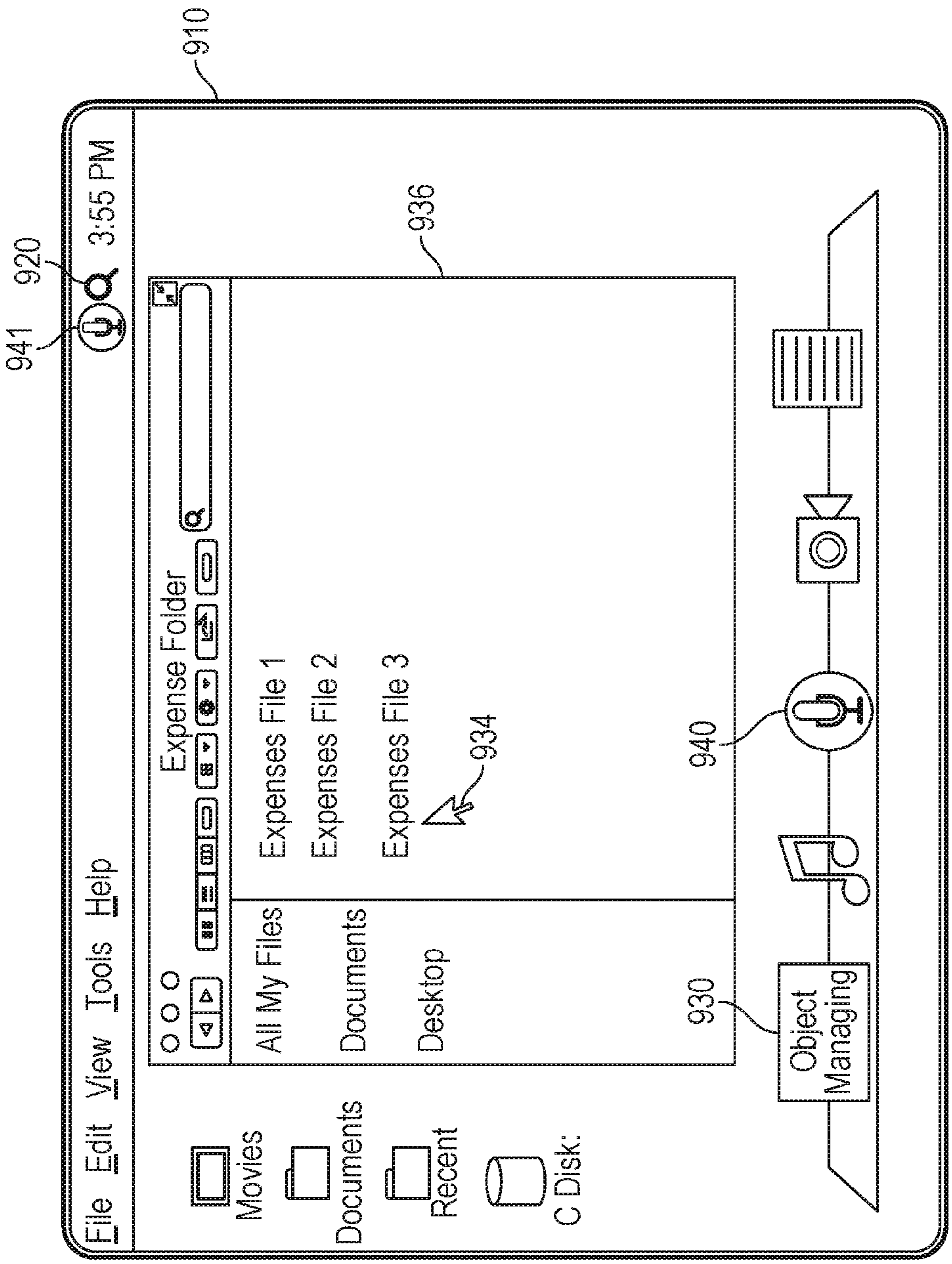

As described, a link enables instantiating a process using the search result. Instantiating a process includes invoking the process if the process is not already running. If at least one instance of the process is running, instantiating a process includes executing an existing instance of the process or generating a new instance of the process. For example, instantiating an object managing process includes invoking the object managing process, using an existing object managing process, or generating a new instance of the object managing process. As illustrated in FIGS. 9E and 9F, a link displayed on user interface 947 enables managing an object (e.g., a file) associated with the link. For example, user interface 947 receives a user selection of a link (e.g., a selection by a cursor 934) associated with a file (e.g., "Expenses file 3"). In response, the digital assistant instantiates an object managing process represented by affordance 930 to enable managing of the file. As shown in FIG. 9F, the digital assistant displays a user interface 936 (e.g., a snippet or a window) providing the folder containing the file associated with the link (e.g., "Expenses file 3"). Using user interface 936, the digital assistant instantiates the object managing process to perform one or more additional tasks (e.g., copying, editing, viewing, moving, compressing, or the like) with respect to the files.

With reference back to FIG. 9E, in some examples, a link displayed on user interface 947 enables direct viewing and/or editing of the object. For example, the digital assistant, via user interface 947, receives a selection of a link (e.g., a selection by a cursor 934) associated with a file (e.g., "Expenses file 3"). In response, the digital assistant instantiates a process (e.g., a document viewing/editing process) to view and/or edit the file. In some examples, the digital assistant instantiates the process to view and/or edit the file without instantiating an object managing process. For example, the digital assistant directly instantiates a Number process or an Excel process to view and/or edit of the Expense file 3.

Figure 9G:
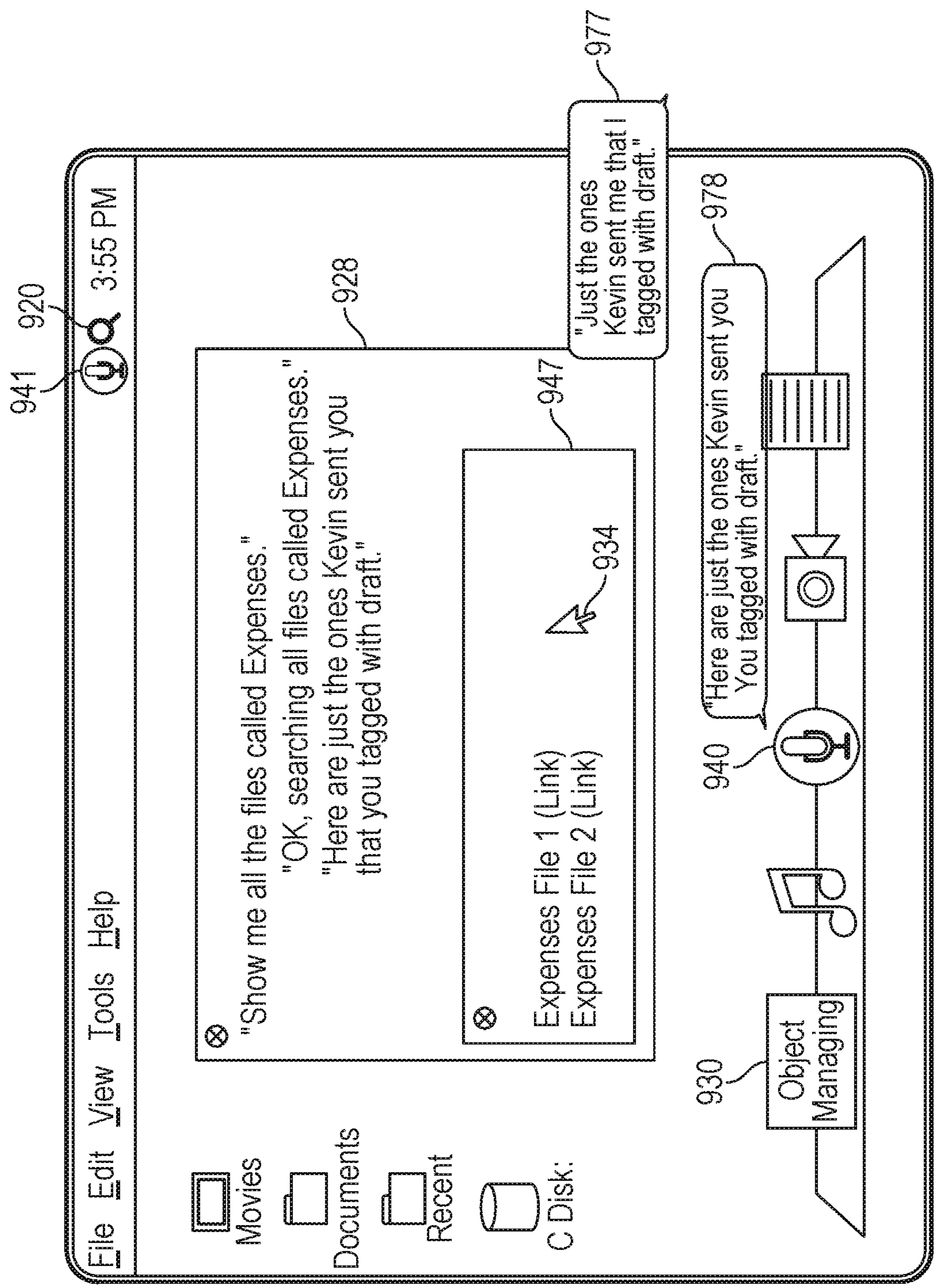

With reference to FIGS. 9E and 9G, in some examples, the digital assistant instantiates a process (e.g., the searching process) to refine the search results. As illustrated in FIGS. 9E and 9G, the user may desire to refine the search result displayed on user interface 947. For example, the user may desire to select one or more files from the search results. In some examples, the digital assistant receives, from the user, a speech input 977 such as "Just the ones Kevin sent me that I tagged with draft." Based on speech input 977 and context information, the digital assistant determines that the user intent is to display only the Expenses files that were sent from Kevin and that are associated with draft tags. Based on the user intent, the digital assistant instantiates a process (e.g., the searching process) to refine the search results. For example, as shown in FIG. 9G, based on the search result, the digital assistant determines that Expenses File 1 and Expense file 2 were sent from Kevin to the user and were tagged. As a result, the digital assistant continues to display these two files on user interface 947 and remove the Expense file 3 from user interface 947. In some examples, the digital assistant provides a spoken output 978 such as "Here are just the ones Kevin sent you that you tagged with draft." The digital assistant may further provide text corresponding to spoken output 978 on user interface 928.

Figure 9H:
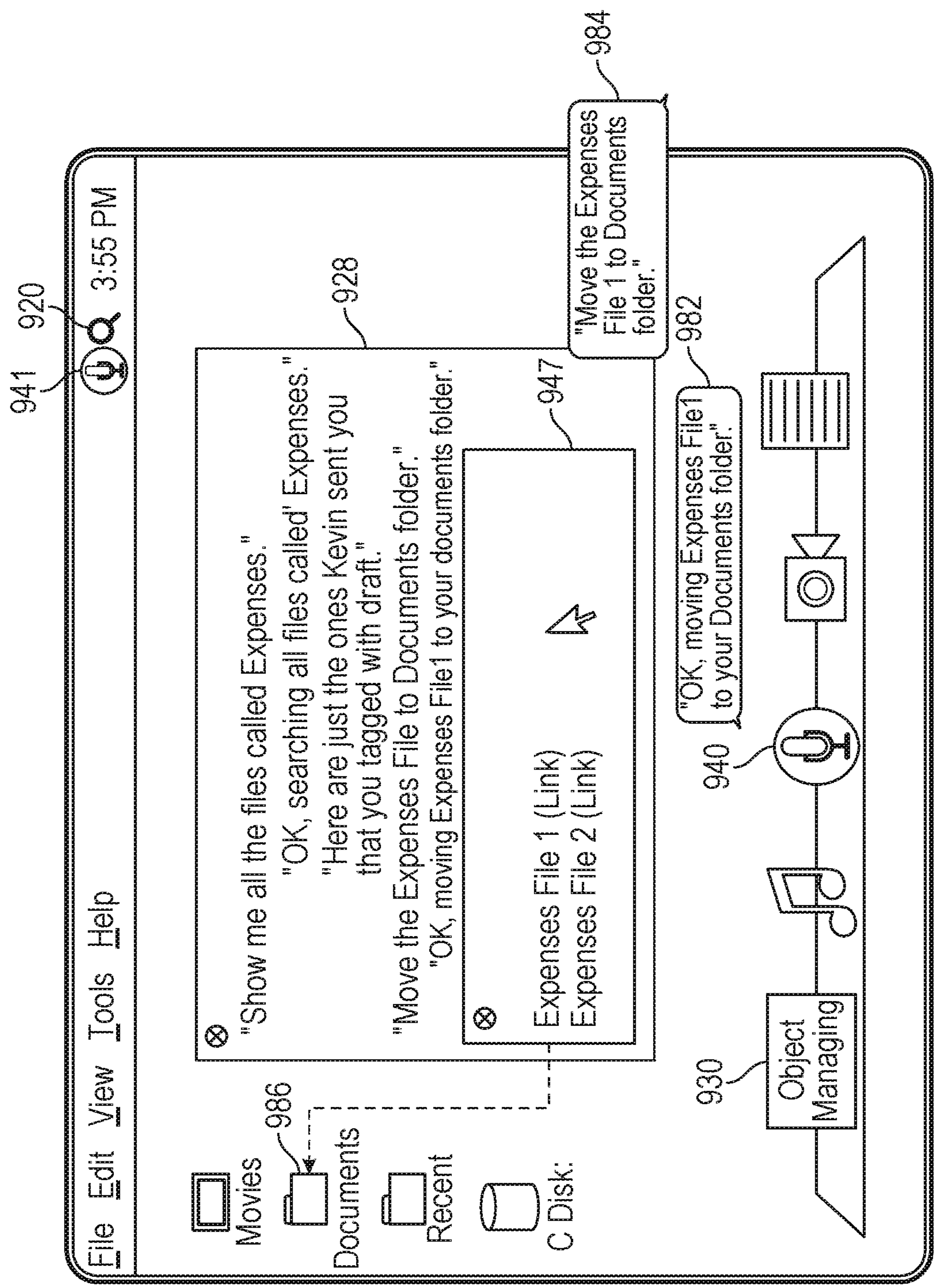

With reference to FIG. 9H, in some examples, the digital assistant instantiates a process (e.g., an object managing process) to perform an object managing task (e.g., coping, moving, sharing, etc.). For example, as shown in FIG. 9H, the digital assistant receives, from the user, a speech input 984 such as "Move the Expenses file 1 to Documents folder." Based on speech input 984 and context information, the digital assistant determines that the user intent is to copy or move Expense file 1 from its current folder to Document folder. In accordance with the user intent, the digital assistant instantiates a process (e.g., the object managing process) to copy or move Expense file 1 from its current folder to Document folder. In some examples, the digital assistant provides a spoken output 982 such as "Ok, moving Expenses File 1 to your Documents folder." In some examples, the digital assistant furthers provide text corresponding to spoken output 982 on user interface 928.

Figure 10A:
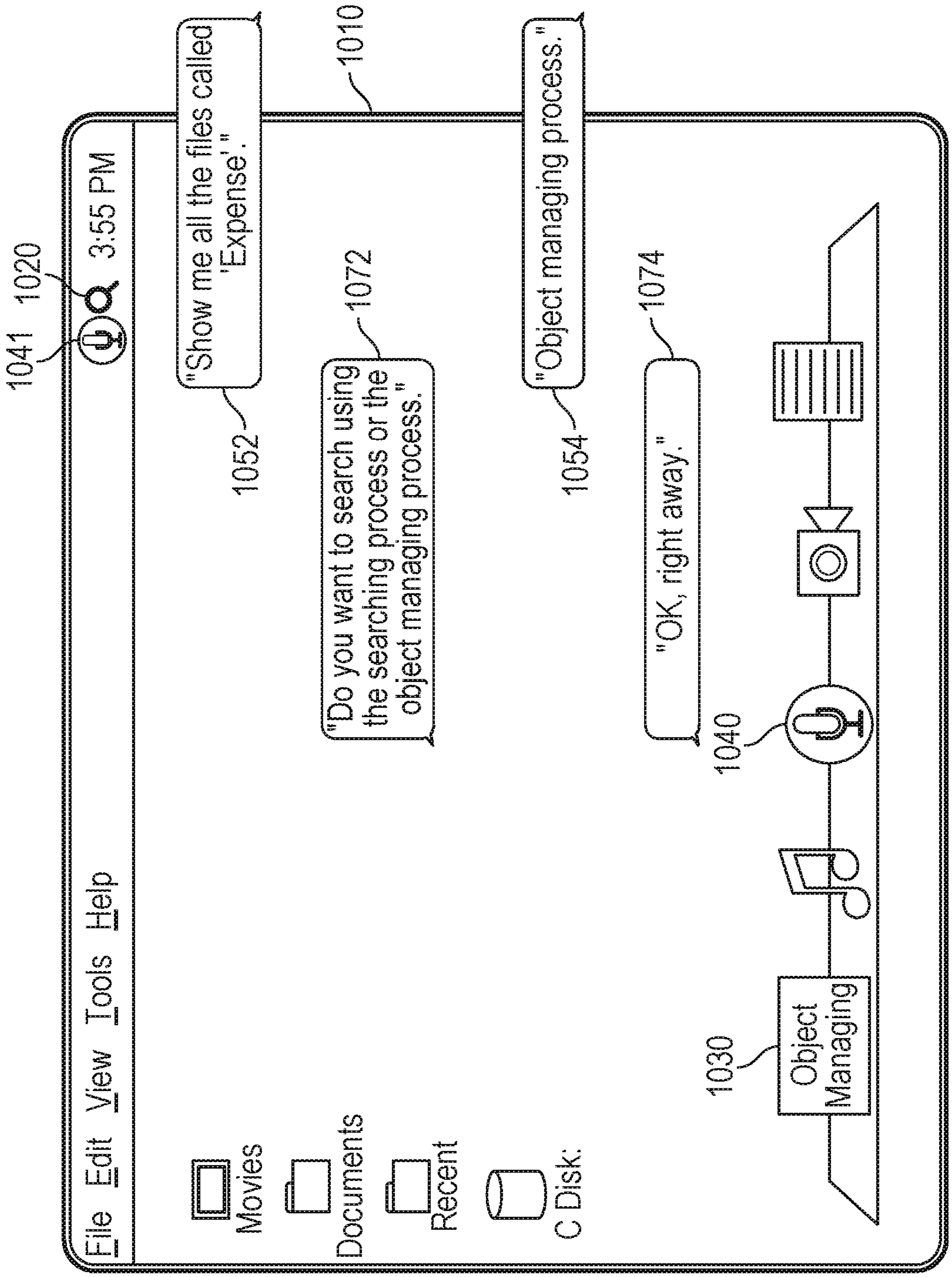
FIGS. 10A-10B illustrate functionalities of performing a task using an object managing process by a digital assistant according to various examples.
Figure 10B:
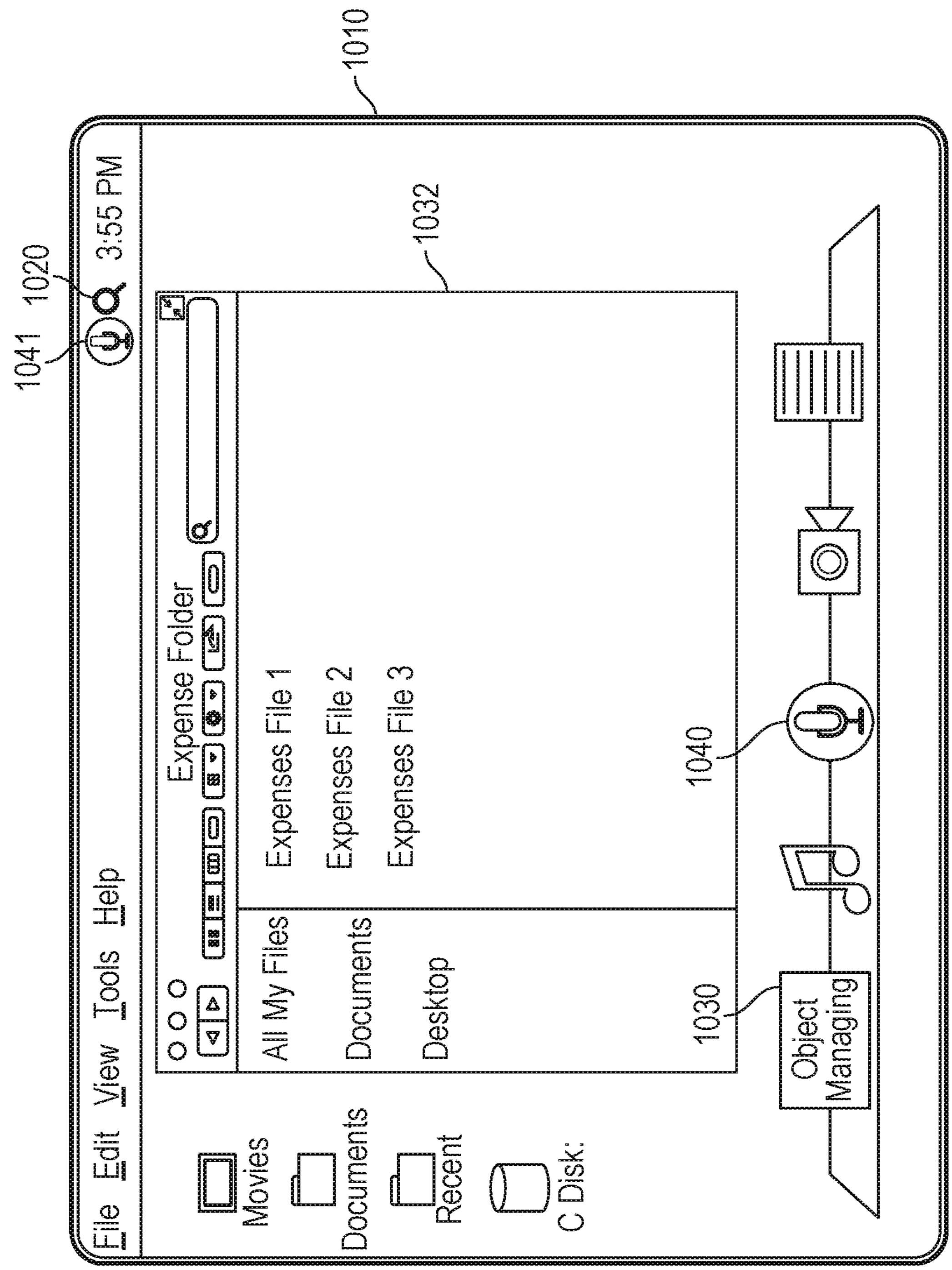

As described, in some examples, a user's speech input may not include keywords indicating whether the user intent is to perform the task using the search process or the object managing process. With reference to FIG. 10A-10B, in some embodiments, the digital assistant determines that performing the task does not require the searching process. In accordance with the determination, the digital assistant provides a spoken output requesting the user to select the searching process or the object managing process. For example, as shown in FIG. 10A, the digital assistant receives, from the user, a speech input 1052 such as "Show me all the files called 'Expenses.'" Based on speech input 1052 and context information, the digital assistant determines that the user intent is to display all the files associated with the word "Expense." In accordance with the user intent, the digital assistant further determines that the task can be performed by either the searching process or the object managing process, and therefore does not require the search process. In some examples, the digital assistant provides a spoken output 1072 such as "Do you want to search using the searching process or the object managing process?" In some examples, the digital assistant receives, from the user, a speech input 1054 such as "Object managing process." Speech input 1054 thus indicates that the user intent is to perform the task using the object managing process. According to the selection, for example, the digital assistant instantiates an object managing process represented by affordance 1030 to search all the files associated with the word "Expenses." As shown in FIG. 10B, similar to those described above, as a result of the searching, the digital assistant displays a user interface 1032 (e.g., a snippet or a window) providing a folder containing the files associated with the word "Expenses". Similar to those described above, using user interface 1032, the digital assistant instantiates the object managing process to perform additional one or more tasks (e.g., copying, editing, viewing, moving, compressing, or the like) with respect to the files.

Figure 11A:
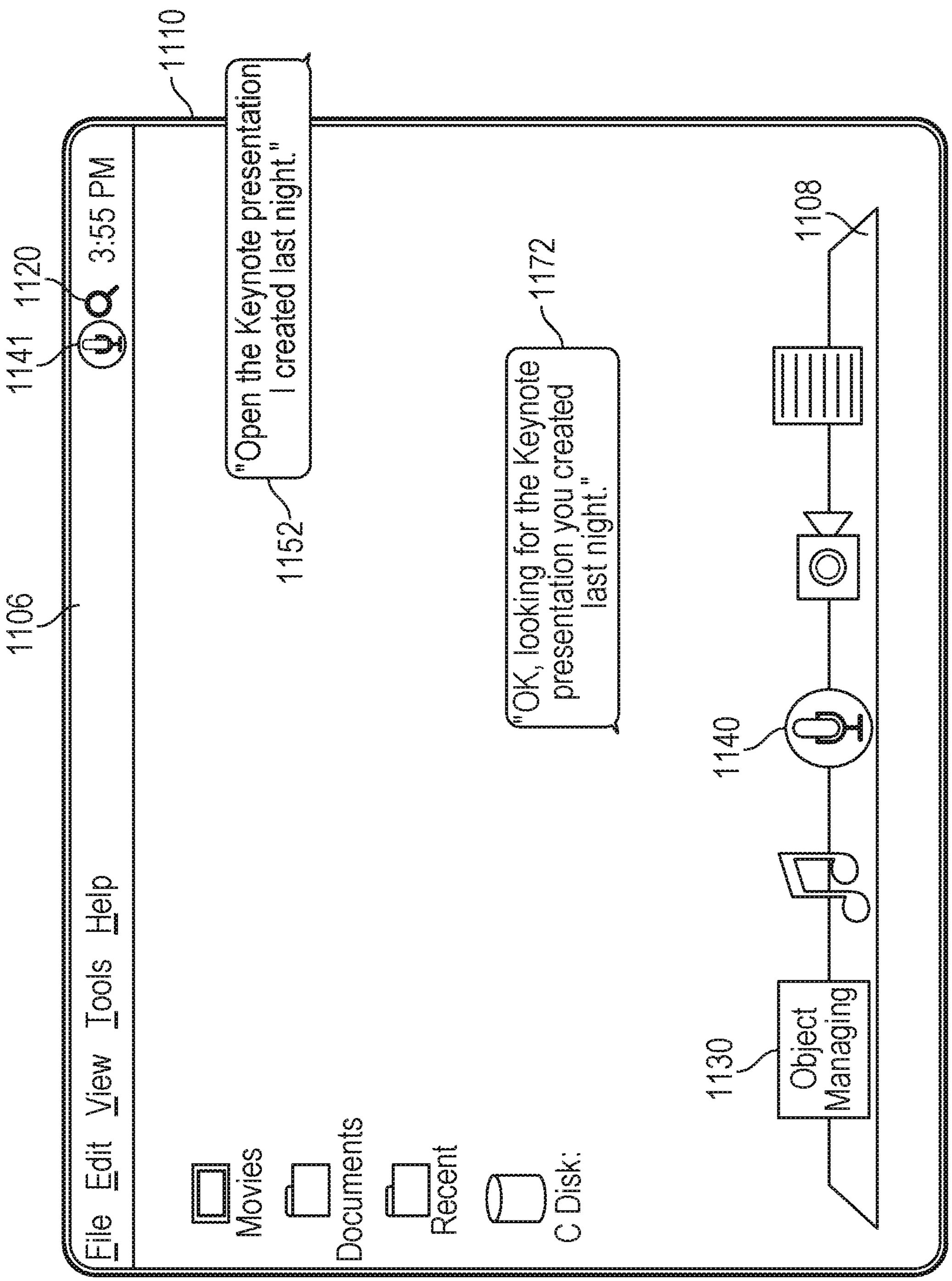
FIGS. 11A-11D illustrate functionalities of performing a task using a search process by a digital assistant according to various examples.
Figure 11B:
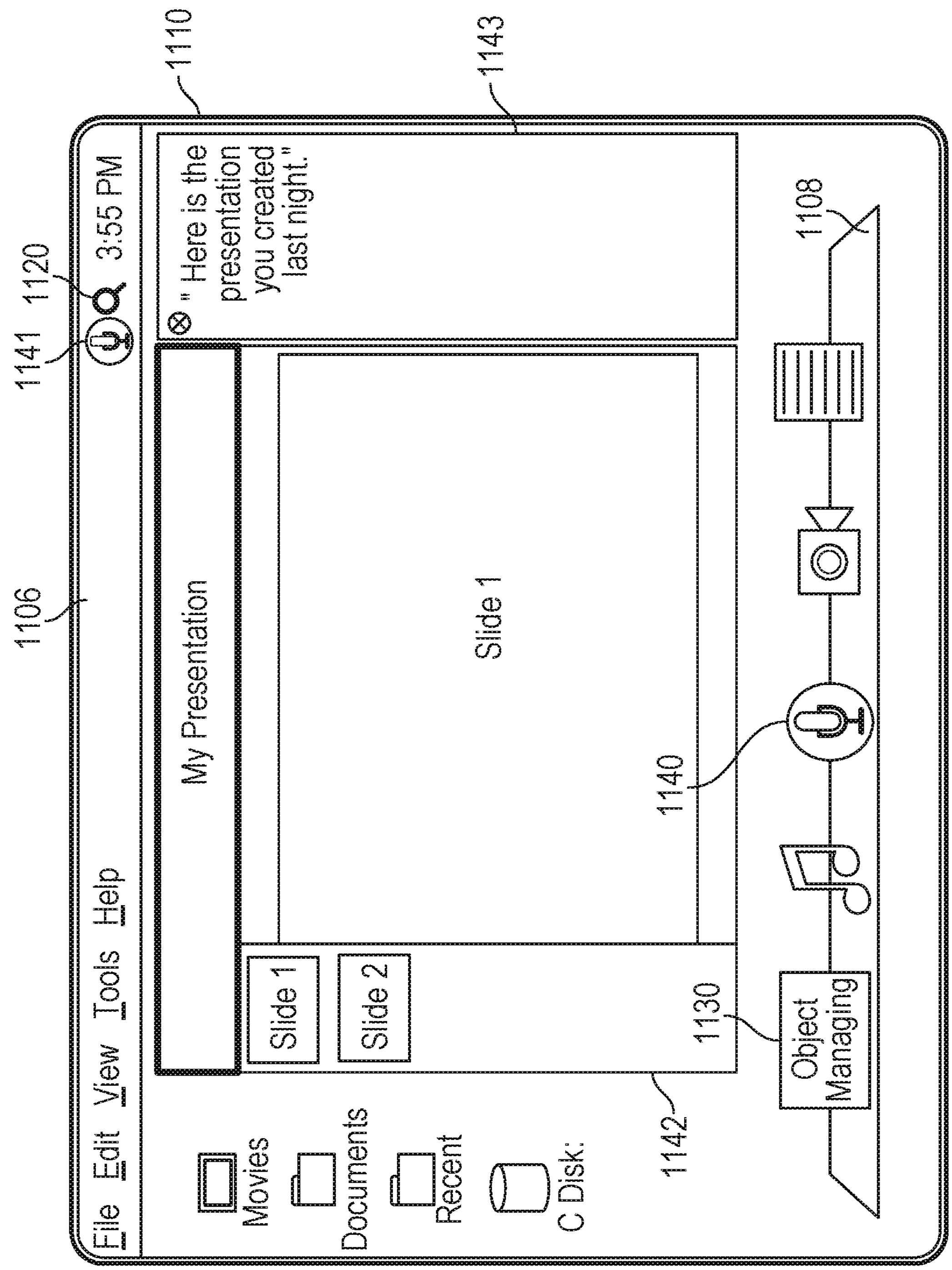

With reference to FIGS. 11A and 11B, in some embodiments, the digital assistant identifies context information and determines the user intent based on the context information and the user's speech input. As illustrated in FIG. 11A, the digital assistant represented by affordance 1140 or 1141 receives a speech input 1152 such as "Open the Keynote presentation I created last night." In response to receiving speech input 1152, the digital assistant identifies context information such as the history of the user's interaction with the user device, the metadata associated with files that the user recently worked on, or the like. For example, the digital assistant identifies the metadata such as the date, the time, and the type of files the user worked on yesterday from 6 p.m.-2 a.m. Based on the identified context information and speech input 1152, the digital assistant determines that the user intent includes searching a Keynote presentation file associated with metadata indicating that the file was edited approximately 6 p.m.-12 a.m yesterday; and instantiating a process (e.g., a Keynote process) to open the presentation file.

In some examples, the context information includes application names or identifications (IDs). For example, a user's speech input provides "Open the Keynote presentation," "find my Pages document," or "find my HotNewApp documents." The context information includes the application names (e.g., Keynote, Pages, HotNewApp) or application IDs. In some examples, the context information is dynamically updated or synchronized. For example, the context information is updated in real time after the user installs a new application named HotNewApp. In some examples, the digital assistant identifies the dynamically updated context information and determines the user intent. For example, the digital assistant identifies the application names Keynote, Pages, HotNewApp or their IDs and determines the user intent according to the application names/IDs and speech inputs.

In accordance with the user intent, the digital assistant further determines whether the user intent is to perform the task using the searching process or the object managing process. As described, the digital assistant makes such determination based on one or more keywords included in the speech input, based on whether the task requires the searching process, based on a pre-determined configuration, and/or based on the user's selection. As illustrated in FIG. 11A, speech input 1152 does not include keywords that indicate whether the user intent is to use the searching process or the object managing process. As a result, the digital assistant determines, for example, based on a pre-determined configuration that the user intent is to use the object managing process. In accordance with the determination, the digital assistant instantiate an object managing process to search a Keynote presentation file associated with metadata that indicates the file was edited approximately 6 p.m.-12 a.m yesterday. In some embodiments, the digital assistant further provides a spoken output 1172 such as "OK, looking for the Keynote presentation you created last night."

In some embodiments, context information is used in performing the task. For example, application names and/or IDs can be used to form a query for searching the application and/or objects (e.g., files) associated with the application names/IDs. In some examples, a server (e.g., server 108) forms a query using the application names (e.g., Keynote, Pages, HotNewApp) and/or IDs and sends the query to the digital assistant of a user device. Based on the query, the digital assistant instantiates a searching process or an object managing process to search one or more applications and/or objects. In some examples, the digital assistant only searches the objects (e.g., files) that correspond to the application name/ID. For example, if a query includes an application name "Pages," the digital assistant only searches Pages files and does not search other files (e.g., Word files) that can be opened by a Pages application. In some examples, the digital assistant searches all objects that is associated with the application name/ID in the query.

Figure 11C:
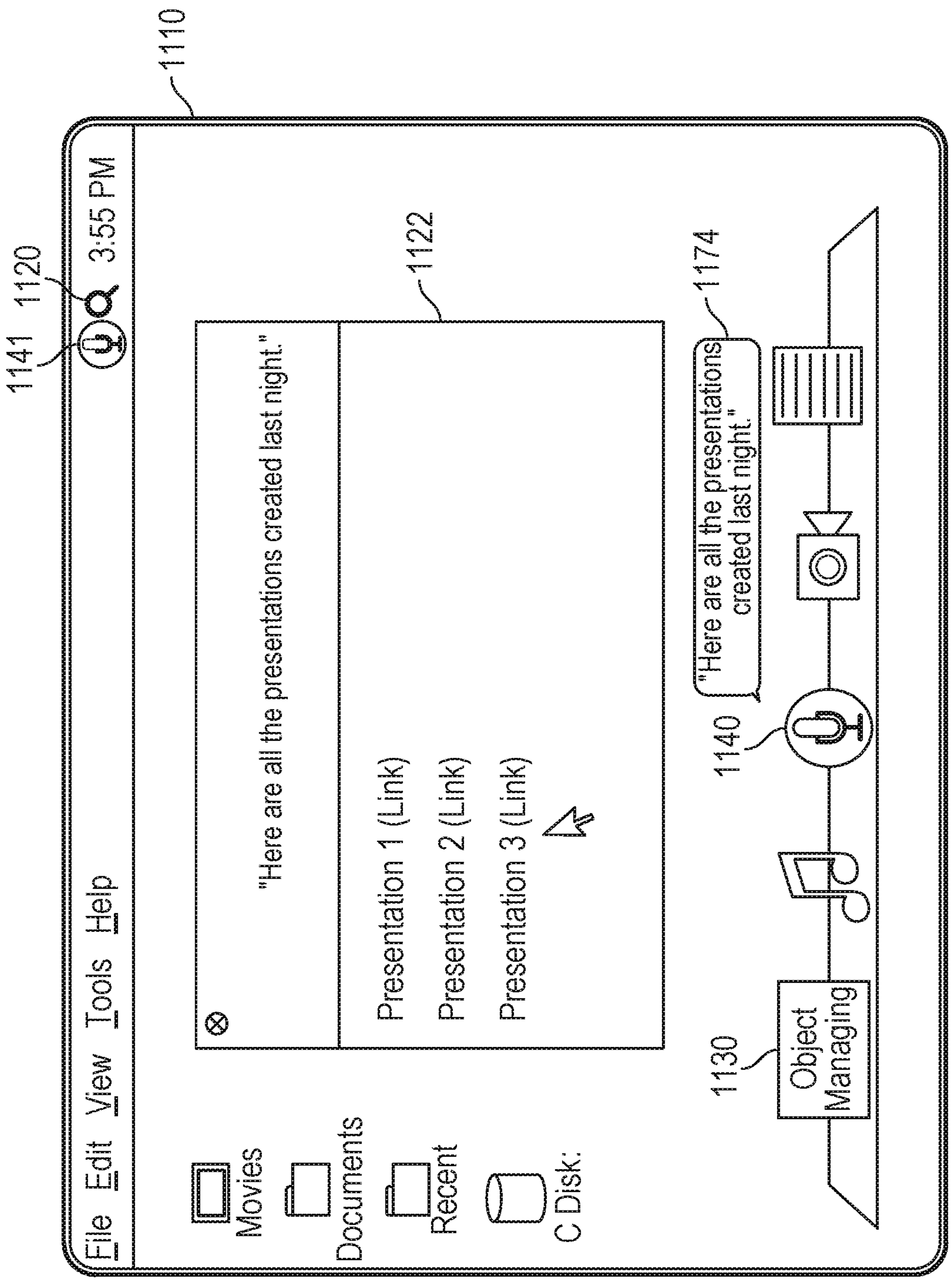

With references to FIGS. 11B and 11C, in some embodiments, the digital assistant provides one or more responses in accordance with a confidence level associated with the results of performing the task. Inaccuracies may exist or arise during the determination of the user intent, the determination of whether the user intent is to perform the task using the searching process or the object managing process, and/or the performance of the task. In some examples, the digital assistant determines a confidence level representing the accuracy of determining the user intent based on the speech input and context information, the accuracy of determining whether the user intent is to perform the task using the searching process or the object managing process, the accuracy of performing the task using the searching process or the object managing process, or a combination thereof.

Continuing the above example illustrated in FIG. 11A, based on speech input 1152 such as "Open the Keynote presentation I created last night," the digital assistant instantiates an object managing process to perform a search of a Keynote presentation file associated with metadata that indicates the file was edited approximately 6 p.m-12 a.m yesterday. The search result may include a single file that fully matches the search criteria. That is, the single file is a presentation file that was edited approximately 6 p.m-12 a.m yesterday. Accordingly, the digital assistant determines that the accuracy of the search is high and thus determines that the confidence level is high. As another example, the search result may include a plurality of files that partially match the search criteria. For instance, no file is a presentation file that was edited approximately 6 p.m-12 a.m yesterday, or multiple files are presentation files that were edited approximately 6 p.m-12 a.m yesterday. Accordingly, the digital assistant determines that the accuracy of the search is medium or low and thus determines that the confidence level is medium or low.

As illustrated in FIGS. 11B and 11C, the digital assistant provides a response in accordance with the determination of the confidence level. In some examples, the digital assistant determines whether the confidence level is greater than or equal to a threshold confidence level. In accordance with a determination that the confidence level is greater than or equal to the threshold confidence level, the digital assistant provides a first response. In accordance with a determination that the confidence level is less than a threshold confidence level, the digital assistant provides a second response. In some examples, the second response is different from the first response. As shown in FIG. 11B, if the digital assistant determines that the confidence level is greater than or equal to a threshold confidence level, the digital assistant instantiates a process (e.g., a Keynote process represented by user interface 1142) to enable the viewing and editing of the file. In some examples, the digital assistant provides a spoken output such as "Here is the presentation you created last night," and displays the text of the spoken output in a user interface 1143. As shown in FIG. 11C, if the digital assistant determines that the confidence level is less than a threshold confidence level, the digital assistant displays a user interface 1122 (e.g., a snippet or a window) providing a list of candidate files. Each of the candidate files may partially satisfy the search criteria. In some embodiments, the confidence level can be pre-determined and/or dynamically updated based on user preferences, historical accuracy rates, or the like. In some examples, the digital assistant further provides a spoken output 1174 such as "Here are all the presentations created last night," and displays the text corresponding to spoken output 1174 on user interface 1122.

Figure 11D:
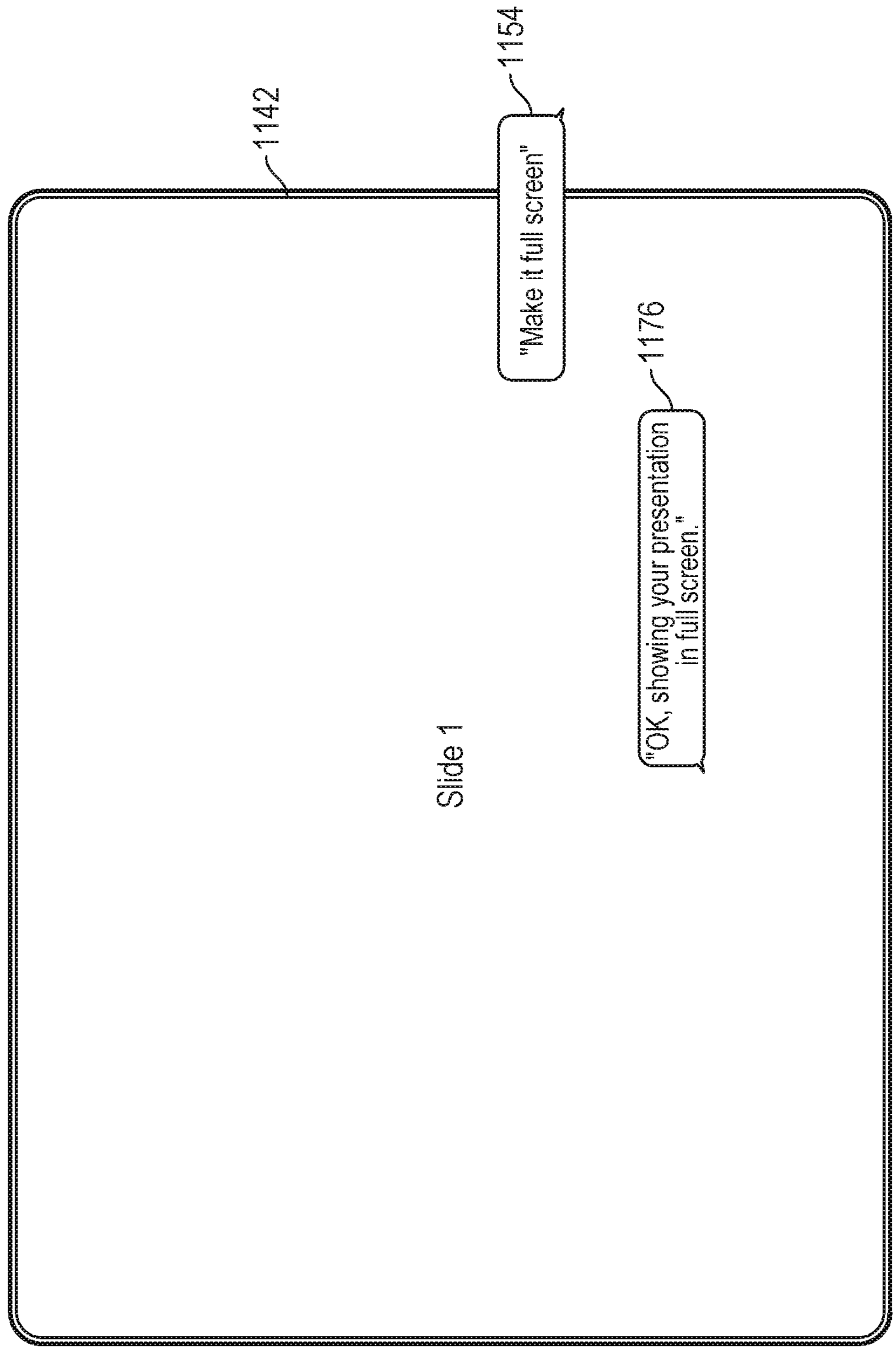

With reference to FIG. 11D, in some embodiments, the digital assistant instantiates a process (e.g., the Keynote presentation process) to perform additional tasks. Continuing with the above example, as shown in FIGS. 11B and 11D, the user may desire to display the presentation file in a full screen mode. The digital assistant receives, from the user, a speech input 1154 such as "Make it full screen." Based on speech input 1154 and context information, the digital assistant determines that the user intent is to display the presentation file in a full screen mode. In accordance with the user intent, the digital assistant causes the Keynote presentation process to display the slides in a full-screen mode. In some examples, the digital assistant provides a spoken output 1176 such as "OK, showing your presentation in full screen."

Figure 12A:
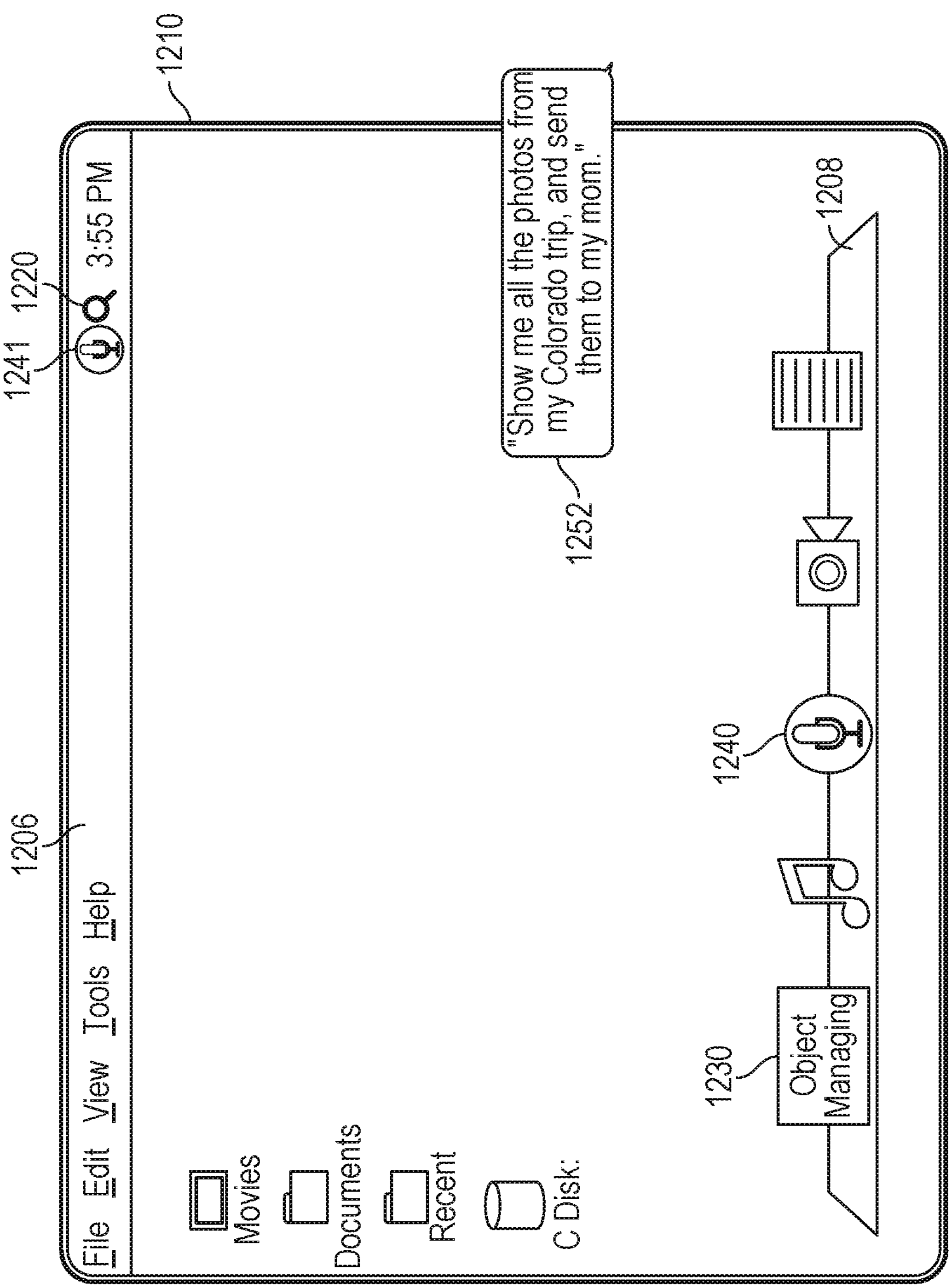
FIGS. 12A-12D illustrate functionalities of performing a task using a search process or an object managing process by a digital assistant according to various examples.
Figure 12B:
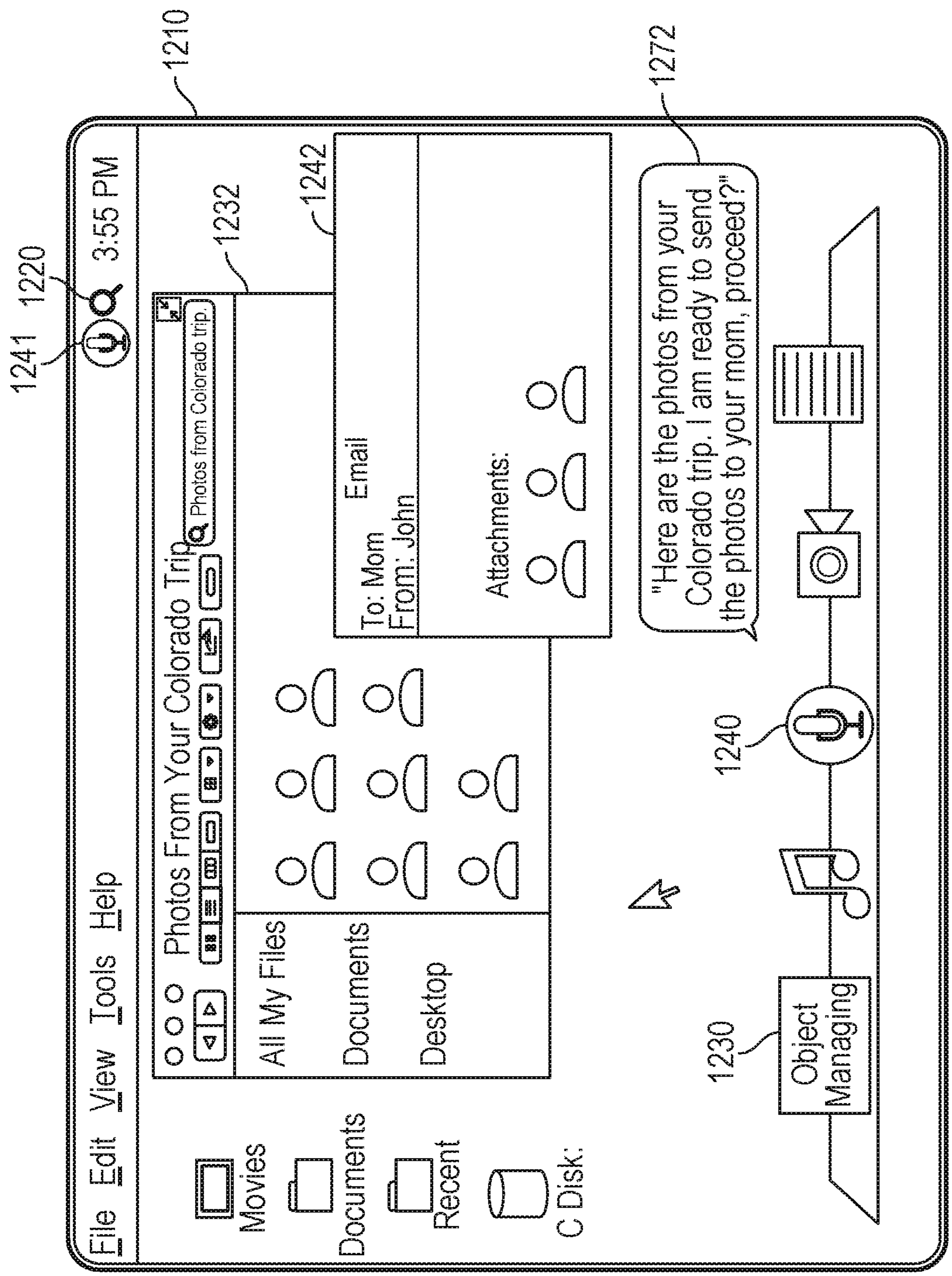
Figure 12C:
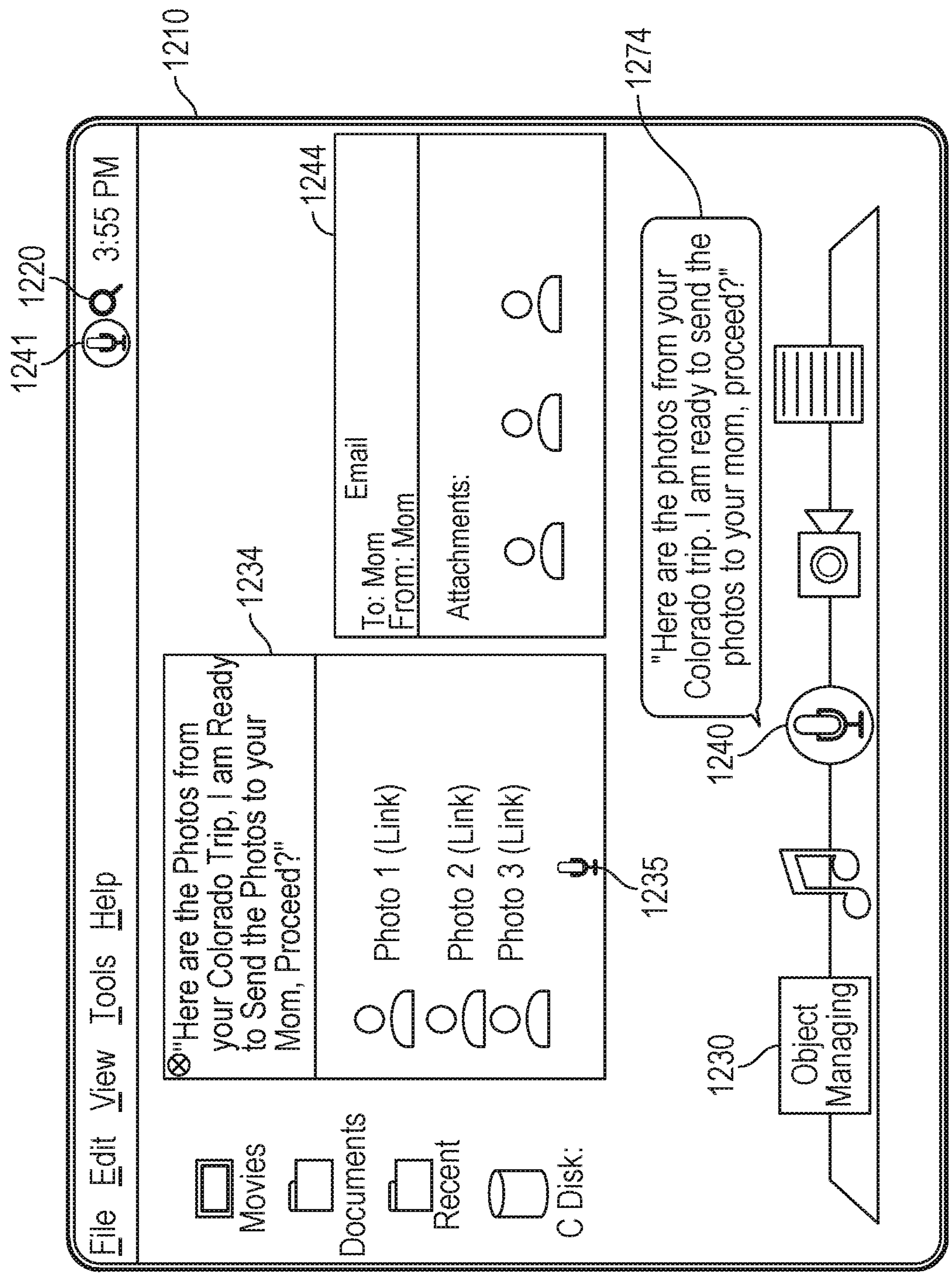

With reference to FIGS. 12A-12C, in some embodiments, the digital assistant determines, based on a single speech input or an utterance, that the user intent is to perform a plurality of tasks. In accordance with the user intent, the digital assistant further instantiates one or more processes to perform the plurality of tasks. For example, as shown in FIG. 12A, the digital assistant represented by affordance 1240 or 1241 receives a single speech input 1252 such as "Show me all the photos from my Colorado trip, and send them to my mom." Based on speech input 1252 and context information, the digital assistant determines that the user intent is to perform a first task and a second task. Similar to those described above, the first task is to display photos stored in a folder having a folder name "Colorado trip," or display photos taken during the period of time that the user is travelling within Colorado. With respect to the second task, the context information may indicate that a particular email address stored in the user's contacts is tagged as the user's mom. Accordingly, the second task is to send an email containing the photos associated with the Colorado trip to the particular email address.

In some examples, the digital assistant determines, with respect to each task, whether the user intent is to perform the task using the searching process or the object managing process. As an example, the digital assistant determines that the first task is associated with searching and the user intent is to perform the first task using the object managing process. As illustrated in FIG. 12B, in accordance with a determination the user intent is to perform the first task using the object managing process, the digital assistant instantiates the object managing process to search photos associated with the user's Colorado trip. In some examples, the digital assistant displays a user interface 1232 (e.g., a snippet or a window) providing a folder including the search result (e.g., photos 1, 2, and 3). As another example, the digital assistant determines that the first task is associated with searching and the user intent is to perform the first task using the searching process. As illustrated in FIG. 12C, in accordance with a determination the user intent is to perform the first task using the searching process, the digital assistant instantiates the searching process to search photos associated with the user's Colorado trip. In some examples, the digital assistant displays a user interface 1234 (e.g., a snippet or a window) providing photos and/or links associated with the search result (e.g., photos 1, 2, and 3).

As another example, the digital assistant determines that the second task (e.g., sending an email containing the photos associated with the Colorado trip to the particular email address) is not associated with searching or associated with managing an object. In accordance with the determination, the digital assistant determines whether the task can be performed using a process that is available to the user device. For example, the digital assistant determines that the second task can be performed using an email process at the user device. In accordance with the determination, the digital assistant instantiates the process to perform the second task. As illustrated in FIGS. 12B and 12C, the digital assistant instantiates the email process and displays user interfaces 1242 and 1244 associated with the email process. The email process attaches the photos associated with the user's Colorado trip to email messages. As shown in FIGS. 12B and 12C, in some embodiments, the digital assistant further provides spoken outputs 1272 and 1274 such as "Here are the photos from your Colorado trip. I am ready to send the photos to your mom, proceed?" In some examples, the digital assistant displays text corresponding to spoken output 1274 on user interface 1244. In response to spoken outputs 1272 and 1274, the user provides a speech input such as "OK." Upon receiving the speech input from the user, the digital assistant causes the email process to send out the email messages.

Techniques for performing a plurality of tasks based on multiple commands contained within a single speech input or an utterance may be found, for example, in related applications: U.S. patent application Ser. No. 14/724,623, titled "MULTI-COMMAND SINGLE UTTERANCE INPUT METHOD," filed May 28, 2015, which claims the benefit of priority of U.S. Provisional Patent Application No. 62/005,556, entitled "MULTI-COMMAND SINGLE UTTERANCE INPUT METHOD," filed on May 30, 2014; and U.S. Provisional Patent Application No. 62/129,851, entitled "MULTI-COMMAND SINGLE UTTERANCE INPUT METHOD," filed on Mar. 8, 2015. Each of these applications is hereby incorporated by reference in their entirety.

Figure 12D:
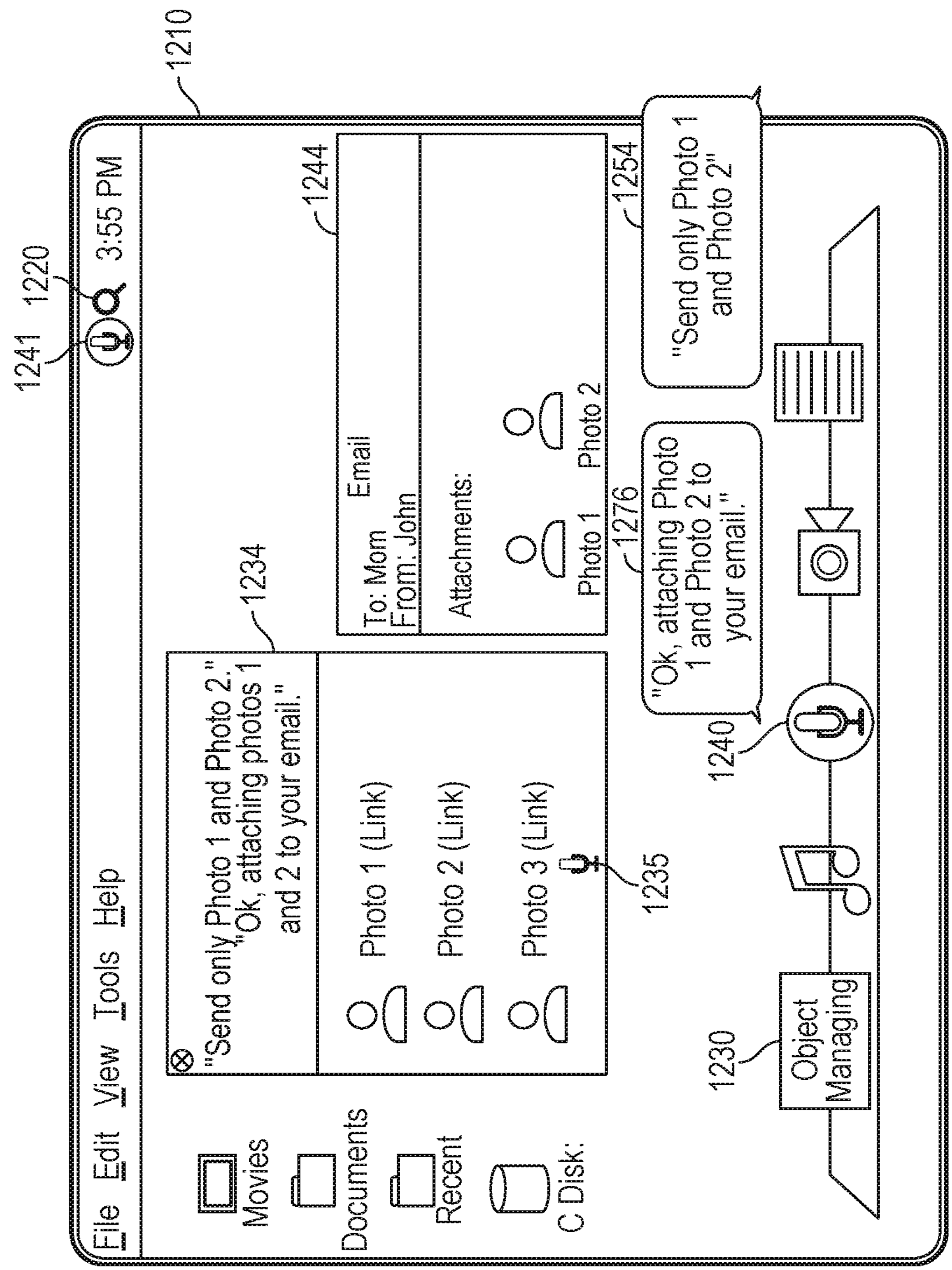

As illustrated in FIGS. 12C and 12D, in some examples, the digital assistant causes a process to perform additional tasks based on the user's additional speech inputs. For example, in view of the search result displayed in user interface 1234, the user may desire to send some, but not all, of the photos. The user provides a speech input 1254 such as "Send only Photo 1 and Photo 2." In some examples, the digital assistant receives speech input 1254 after the user selects affordance 1235 (e.g., a microphone icon displayed on user interface 1234). The digital assistant determines, based on speech input 1254 and context information, that the user intent is to send an email attaching only Photo 1 and Photo 2. In accordance with the user intent, the digital assistant causes the email process to remove Photo 3 from the email message. In some examples, the digital assistant provides a spoken output 1276, such as "OK, attaching Photo 1 and Photo 2 to your email," and displays the text corresponding to spoken output 1276 on user interface 1234.

Figure 13A:
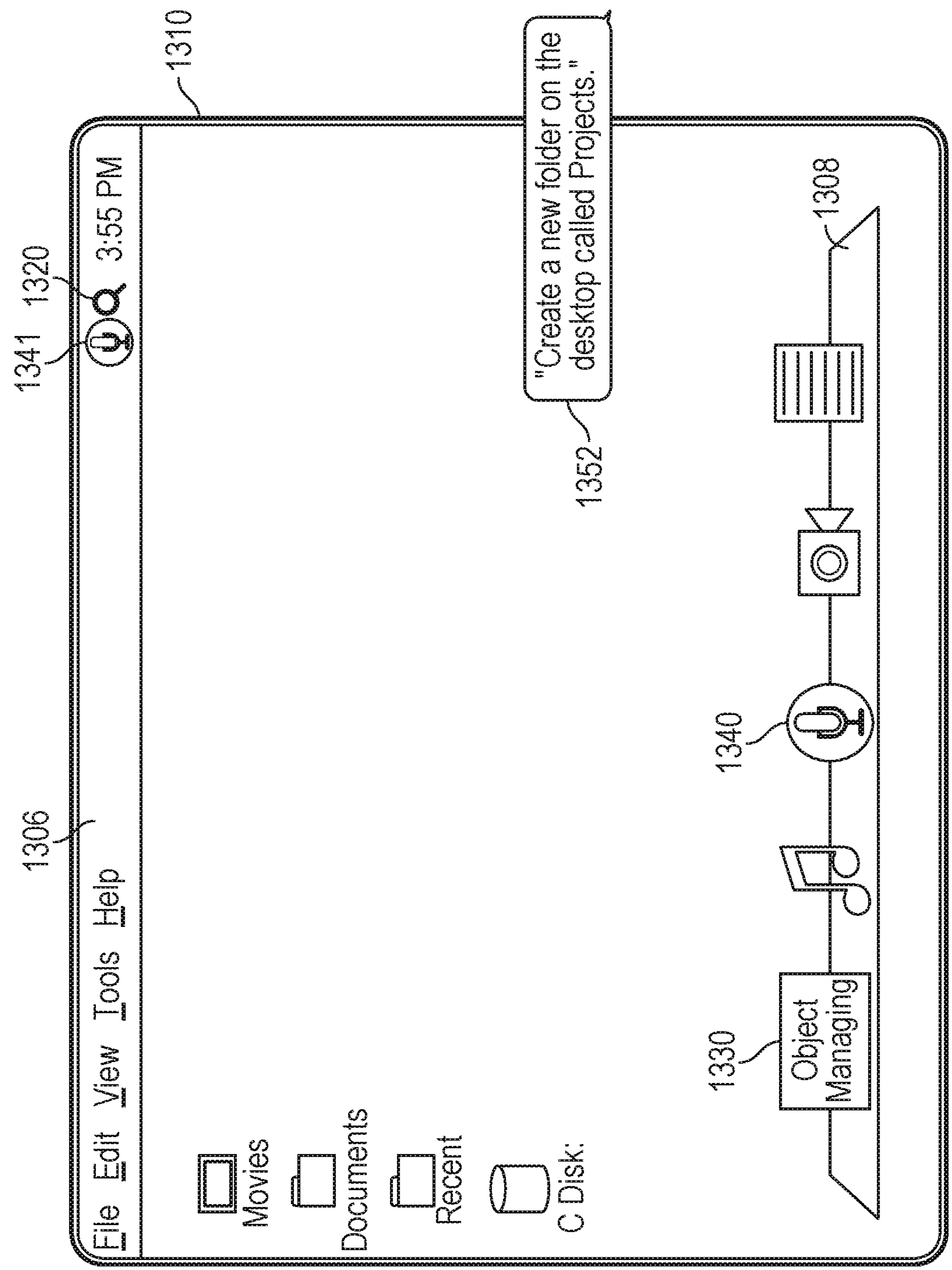
FIGS. 13A-13C illustrate functionalities of performing a task using an object managing process by a digital assistant according to various examples.

With reference to FIG. 13A, in some embodiments, in accordance with a determination that the task is not associated with searching, the digital assistant determines whether the task is associated with managing at least one object. As illustrated in FIG. 13A, for example, the digital assistant receives a speech input 1352 such as "Create a new folder on the desktop called Projects." Based on speech input 1352 and context information, the digital assistant determines that the user intent is to generate a new folder at the desktop with a folder name "Projects." The digital assistant further determines that the user intent is not associated with searching, and instead is associated with managing an object (e.g., a folder). Accordingly, the digital assistant determines that the user intent is to perform a task using the object managing process.

In some examples, in accordance with the determination that the user intent is to perform the task using the object managing process, the digital assistant performs the task using the object managing process. Performing the task using the object managing process can include, for example, creating at least one object (e.g., creating a folder or a file), storing at least one object (e.g., storing a folder, a file, or a communication), and compressing at least one object (e.g., compressing folders and files). Performing the task using the object managing process can further include, for example, copying or moving at least one object from a first physical or virtual storage to a second physical or virtual storage. For instance, the digital assistant instantiates an object managing process to cut and paste a file from the user device to a flash drive or a cloud drive.

Performing the task using the object managing process can further include, for example, deleting at least one object stored in a physical or virtual storage (e.g., deleting a folder or a file) and/or recovering at least one object stored at a physical or virtual storage (e.g., recovering a deleted folder or a deleted file). Performing the task using the object managing process can further include, for example, marking at least one object. In some examples, marking of an object can be visible or invisible. For example, the digital assistant can cause the object managing process to generate a "like" sign for a social media post, to tag an email, to mark a file, or the like. The marking may be visible by displaying, for example, a flag, a sign, or the like. The marking may also be performed with respect to the metadata of the object such that a storage (e.g., a memory) content of the metadata is varied. The metadata may or may not be visible.

Performing the task using the object managing process can further include, for example, backing up at least one object according to a predetermined time period for backing up or upon the user's request. For example, the digital assistant can cause the object managing process to instantiate a backup program (e.g., time machine program) to backup folders and files. The backup can be performed automatically according to a pre-determined schedule (e.g., once a day, a week, a month, or the like) or according to a user request.

Performing the task using the object managing process can further include, for example, sharing at least one object among one or more electronic devices communicatively connected to the user device. For example, the digital assistant can cause the object managing process to share a photo stored on the user device with another electronic device (e.g., the user's smartphone or tablet).

Figure 13B:
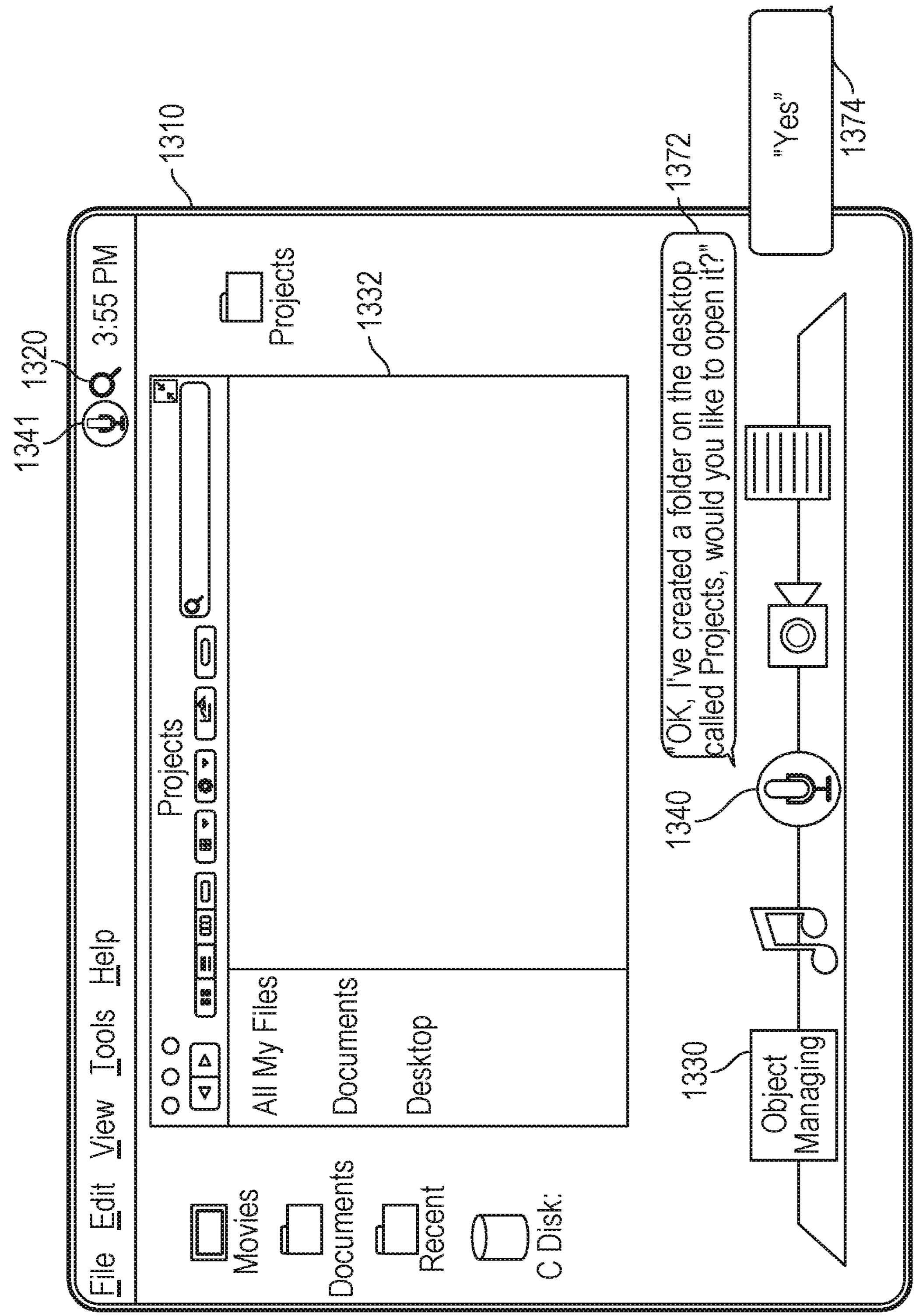

As illustrated in FIG. 13B, in accordance with the determination that the user intent is to perform the task using the object managing process, the digital assistant performs the task using the object managing process. For example, the digital assistant instantiates an object managing process to generate a folder named "Projects" on the desktop of user interface 1310. In some examples, the digital assistant can cause the object managing process to further open the folder either automatically or in response to an additional user input. For example, the digital assistant provides a spoken output 1372 such as "OK, I've created a folder on the desktop called Projects, would you like to open it?" The user provides a speech input 1374 such as "Yes." In response to the user's speech input 1374, the digital assistant causes the object managing process to open the Projects folder and display a user interface 1332 corresponding to the Projects folder.

Figure 13C:
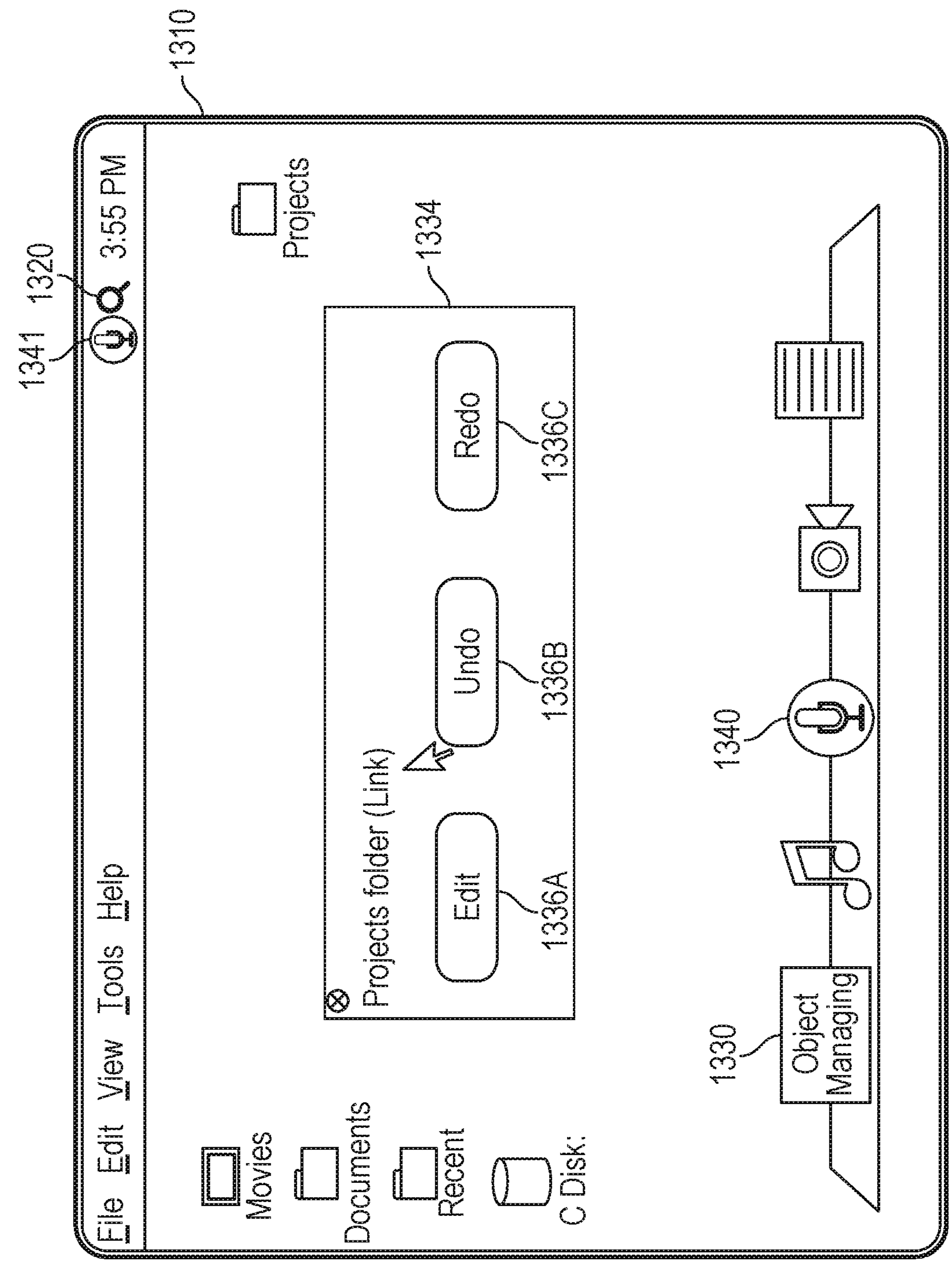

With reference to FIG. 13C, in some embodiments, the digital assistant provides one or more affordances that enable the user to manipulate the result of performing the task using the searching process or the object managing process. The one or more affordances include, for example, an edit button, a cancel button, a redo button, an undo button, or the like. For example, as shown in FIG. 13C, after generating the folder named "Projects" on the desktop, the digital assistant provides a user interface 1334, which displays an edit button 1336A, an undo button 1336B, and a redo button 1336C. In some examples, the edit button 1336A enables the user to edit one or more aspects of the object (e.g., edit the name of the Projects folder); the undo button 1336B enables the user to reverse the last task performed by the object managing process (e.g., delete the Projects folder); and the redo button 1336C enables the user to repeat the last task performed by the object managing process (e.g., creating another folder using the object managing process). It is appreciated that the digital assistant can provide any desired affordances to enable the user to perform any manipulation of the result of performing a task using the searching process or the object managing process.

As described, the digital assistant can determine whether the user intent is to perform a task using a searching process or an object managing process. In some examples, the digital assistant determines that the user intent is not associated with the searching process or the object managing process. For example, the user provides a speech input such as "start dictation." The digital assistant determines that the task of dictation is not associated with searching. In some examples, in accordance with a determination that the task is not associated with searching, the digital assistant further determines whether the task is associated with managing at least one object. For example, the digital assistant determines that the task of dictation is also not associated with managing an object, such as copying, moving, or deleting a file, a folder, or an email. In some examples, in accordance with a determination that the task is not associated with managing an object, the digital assistant determines whether the task can be performed using a process available to the user device. For example, the digital assistant determines that the task of dictation can be performed using a dictation process that is available to the user device. In some examples, the digital assistant initiates a dialog with the user with respect to performing the task using a process available to the user device. For example, the digital assistant provides a spoken output such as "OK, starting dictation." or "Would you like to dictate in this presentation you are working now?" After providing the spoken output, the digital assistant receives a response from the user, for example, confirming that the user intent is to dictate in the presentation the user is currently working on.

5. Exemplary Functions of a Digital Assistant—Continuity

FIGS. 14A-14D, 15A-15D, 16A-16C, and 17A-17E illustrate functionalities of performing a task at a user device or a first electronic device using remotely located content by a digital assistant. In some examples, the digital assistant system (e.g., digital assistant system 700) is implemented by a user device (e.g., devices 1400, 1500, 1600, and 1700) according to various examples. In some examples, the user device, a server (e.g., server 108), or a combination thereof, may implement a digital assistant system (e.g., digital assistant system 700). The user device can be implemented using, for example, device 104, 200, or 400. In some examples, the user device can be a laptop computer, a desktop computer, or a tablet computer. The user device operates in a multitasking environment, such as a desktop environment.

With references to FIGS. 14A-14D, 15A-15D, 16A-16C, and 17A-17E, in some examples, a user device (e.g., devices 1400, 1500, 1600, and 1700) provides various user interfaces (e.g., user interfaces 1410, 1510, 1610, and 1710). Similar to those described above, the user device displays the various user interfaces on a display, and the various user interfaces enable the user to instantiate one or more processes (e.g., a movie process, a photo process, a web-browsing process).

As shown in FIGS. 14A-14D, 15A-15D, 16A-16C, and 17A-17E, similar to those described above, the user device (e.g., devices 1400, 1500, 1600, and 1700) displays, on a user interface (e.g., user interfaces 1410, 1510, 1610, and 1710) an affordance (e.g., affordance 1440, 1540, 1640, and 1740) to instantiate a digital assistant service. Similar to those described above, in some examples, the digital assistant is instantiated in response to receiving a pre-determined phrase. In some examples, the digital assistant is instantiated in response to receiving a selection of the affordance.

With reference to FIGS. 14A-14D, 15A-15D, 16A-16C, and 17A-17E, in some embodiments, a digital assistant receives one or more speech inputs, such as speech inputs 1452, 1454, 1456, 1458, 1552, 1554, 1556, 1652, 1654, 1656, 1752, and 1756 from a user. The user may provide various speech inputs for the purpose of, for example, performing a task at the user device (e.g., devices 1400, 1500, 1600, and 1700) or at a first electronic device (e.g., electronic devices 1420, 1520, 1530, 1522, 1532, 1620, 1622, 1630, 1720, and 1730) using remotely located content. Similar to those described above, in some examples, the digital assistant can receive speech inputs directly from the user at the user device or indirectly through another electronic device that is communicatively connected to the user device.

With reference to FIGS. 14A-14D, 15A-15D, 16A-16C, and 17A-17E, in some embodiments, the digital assistant identifies context information associated with the user device. The context information includes, for example, user-specific data, sensor data, and user device configuration data. In some examples, the user-specific data includes log information indicating user preferences, the history of user's interaction with the user device (e.g., devices 1400, 1500, 1600, and 1700), and/or electronic devices communicative connected to the user device, or the like. For example, user-specific data indicates that the user recently took a self-portrait photo using an electronic device 1420 (e.g., a smartphone); that the user recently accessed a podcast, webcast, movie, song, audio book, or the like. In some examples, the sensor data includes various data collected by a sensor associated with the user device or other electronic devices. For example, the sensor data includes GPS location data indicating the physical location of the user device or electronic devices communicatively connected to the user device at any time point or during any time period. For example, the sensor data indicates that a photo stored in electronic device 1420 was taken at Hawaii. In some examples, the user device configuration data includes the current or historical device configurations. For example, the user device configuration data indicates that the user device is currently communicatively connected to some electronic devices but disconnected from other electronic devices. The electronic devices includes, for example, a smartphone, a set-top box, a tablet, or the like. As described in more detail below, the context information can be used in determining a user intent and/or in performing one or more tasks.

With reference to FIGS. 14A-14D, 15A-15D, 16A-16C, and 17A-17E, similar to those described above, in response to receiving a speech input, the digital assistant determines a user intent based on the speech input. The digital assistant determines the user intent based on a result of natural language processing. For example, the digital assistant identifies an actionable intent based on the user input, and generates a structured query to represent the identified actionable intent. The structured query includes one or more parameters associated with the actionable intent. The one or more parameters can be used to facilitate the performance of a task based on the actionable intent. For example, based on a speech input such as "show the selfie I just took," the digital assistant determines that the actionable intent is to display a photo, and the parameters include a self-portrait that the user recently took during the past few days. In some embodiments, the digital assistant further determines the user intent based on the speech input and context information. For example, the context information indicates that the user device is communicatively connected to the user's phone using a Bluetooth connection and indicates that a self-portrait photo was added to the user's phone two days ago. As a result, the digital assistant determines that the user intent is to display a photo that is a self-portrait that was added to the user's phone two days ago. Determining the user intent based on speech input and context information is described in more detail below in various examples.

In some embodiments, in accordance with user intent, the digital assistant further determines whether the task is to be performed at the user device or at a first electronic device communicatively connected to the user device. Various examples of the determination are provided below in more detail with respect to FIGS. 14A-14D, 15A-15D, 16A-16C, and 17A-17E.

Figure 14A:
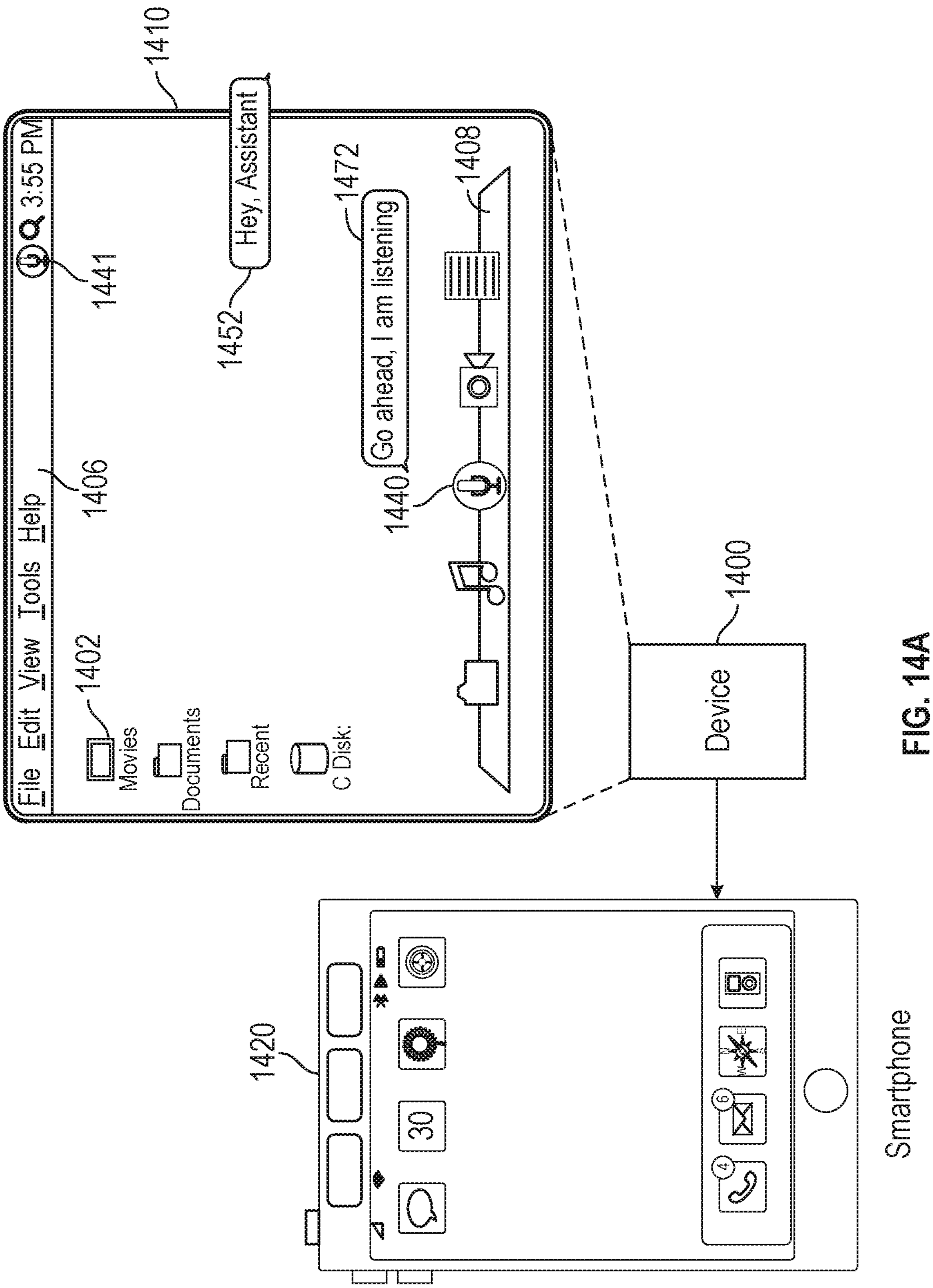
FIGS. 14A-14D illustrate functionalities of performing a task at a user device using remotely located content by a digital assistant according to various examples.

With reference to FIG. 14A, in some examples, user device 1400 receives a speech input 1452 from a user to invoke the digital assistant. As shown in FIG. 14A, in some examples, the digital assistant is represented by affordances 1440 or 1441 displayed on user interface 1410. Speech input 1452 includes, for example, "Hey, Assistant." In response to speech input 1452, user device 1400 invokes the digital assistant such that the digital assistant actively monitors subsequent speech inputs. In some examples, the digital assistant provides a spoken output 1472 indicating that it is invoked. For example, spoken output 1472 includes "Go ahead, I am listening." As shown in FIG. 14A, in some examples, user device 1400 is communicatively connected to one or more electronic devices such as electronic device 1420. Electronic device 1420 can communicate with user device 1400 using wired or wireless networks. For example, electronic device 1420 communicates with user device 1400 using Bluetooth connections such that voice and data (e.g., audio and video files) can be exchanged between the two devices.

Figure 14B:
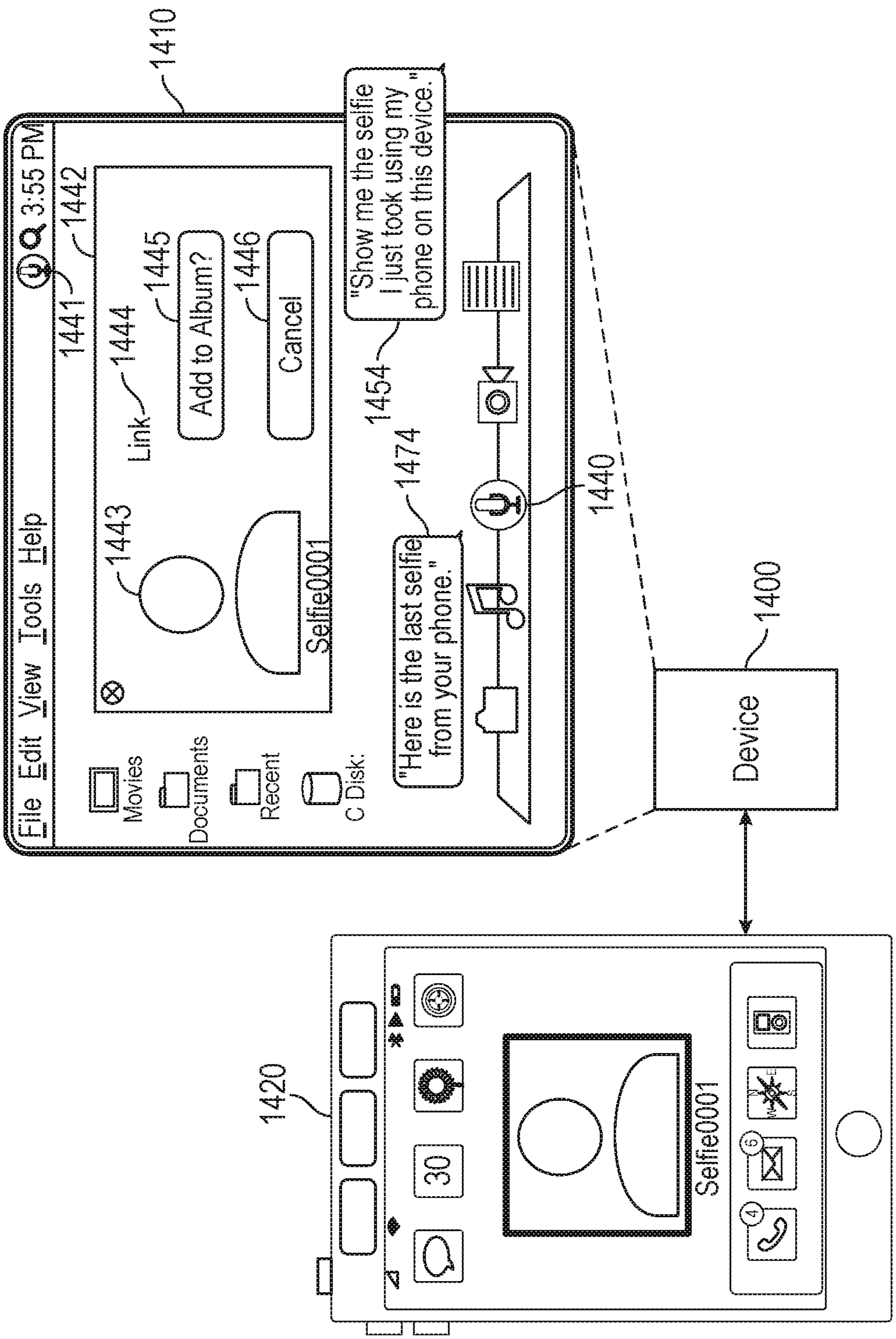

With reference to FIG. 14B, in some examples, the digital assistant receives a speech input 1454 such as "Show me the selfie I just took using my phone on this device." Based on speech input 1454 and/or context information, the digital assistant determines the user intent. For example, as shown in FIG. 14B, context information indicates that the user device 1400 is communicatively connected to electronic device 1420 using wired or wireless networks (e.g., a Bluetooth connection, a Wi-Fi connection, or the like). Context information also indicates that the user recently took a self-portrait, which is stored in electronic device 1420 with a name "selfie0001." As a result, the digital assistant determines that the user intent is to display the photo named selfie0001 stored in electronic device 1420. Alternatively, the photo may have been tagged with photo recognition software as containing the user's face and be identified accordingly.

As described, in accordance with the user intent, the digital assistant further determines whether the task is to be performed at the user device or at a first electronic device communicatively connected to the user device. In some embodiments, determining whether the task is to be performed at the user device or at the first electronic device is based on one or more keywords included in the speech input. For example, the digital assistant determines that speech input 1454 includes keywords or a phrase such as "on this device," indicating the task is to be performed on user device 1400. As a result, the digital assistant determines that displaying the photo named selfie0001 stored in electronic device 1420 is to be performed at user device 1400. User device 1400 and electronic device 1420 are different devices. For example, user device 1400 can be a laptop computer, and electronic device 1420 can be a phone.

In some embodiments, the digital assistant further determines whether the content associated with the performance of the task is located remotely. Content is located remotely if at or near the time the digital assistant determines which device is to perform the task, at least a portion of the content for performing the task is not stored in the device that is determined to perform the task. For example, as shown in FIG. 14B, at or near the time the digital assistant of user device 1400 determines that the user intent is to display the photo named selfie0001 at user device 1400, the photo named selfie0001 is not stored at user device 1400 and instead is stored at electronic device 1420 (e.g., a smartphone). Accordingly, the digital assistant determines that the photo is located remotely to user device 1400.

As illustrated in FIG. 14B, in some embodiments, in accordance with a determination that the task is to be performed at the user device and content for performing the task is located remotely, the digital assistant of the user device receives the content for performing the task. In some examples, the digital assistant of the user device 1400 receives at least a portion of the content stored in the electronic device 1420. For example, to display the photo named selfie0001, the digital assistant of user device 1400 sends a request to electronic device 1420 to obtain the photo named selfie0001. Electronic device 1420 receives the request and, in response, transmits the photo named selfie0001 to user device 1400. The digital assistant of user device 1400 then receives the photo named selfie0001.

As illustrated in FIG. 14B, in some embodiments, after receiving the remotely located content, the digital assistant provides a response at the user device. In some examples, providing a response includes performing the task using the received content. For example, the digital assistant of user device 1400 displays a user interface 1442 (e.g., a snippet or a window) providing a view 1443 of the photo named selfie0001. View 1443 can be a preview (e.g., a thumbnail), an icon, or a full view of the photo named selfie0001.

In some examples, providing a response includes providing a link that is associated with the task to be performed at the user device. A link enables instantiating of a process. As described, instantiating a process includes invoking the process if the process is not already running. If at least one instance of the process is running, instantiating a process includes executing an existing instance of the process or generating a new instance of the process. As shown in FIG. 14B, user interface 1442 may provide a link 1444 associated with view 1443 of the photo named selfie0001. Link 1444 enables, for example, instantiating a photo process to view a full representation of the photo or edit the photo. As an example, link 1444 is displayed on the side of view 1443. As another example, view 1443 can itself include or incorporate link 1444 such that a selection of view 1443 instantiates a photo process.

In some embodiments, providing a response includes providing one or more affordances that enable the user to further manipulate the results of the performance of the task. As shown in FIG. 14B, in some examples, the digital assistant provides affordances 1445 and 1446 on user interface 1442 (e.g., a snippet or a window). Affordance 1445 can include a button for adding a photo to an album, and affordance 1446 can include a button for canceling view 1443 of the photo. The user may select one or both of affordances 1445 and 1446. In response to the selection of affordance 1445, for example, a photo process adds the photo associated with view 1443 to an album. In response to the selection of affordance 1446, for example, a photo process removes view 1443 from user interface 1442.

In some embodiments, providing a response includes providing a spoken output according to the task to be performed at the user device. As illustrated in FIG. 14B, the digital assistant represented by affordances 1440 or 1441 provides a spoken output 1474 such as "Here is the last selfie from your phone."

Figure 14C:
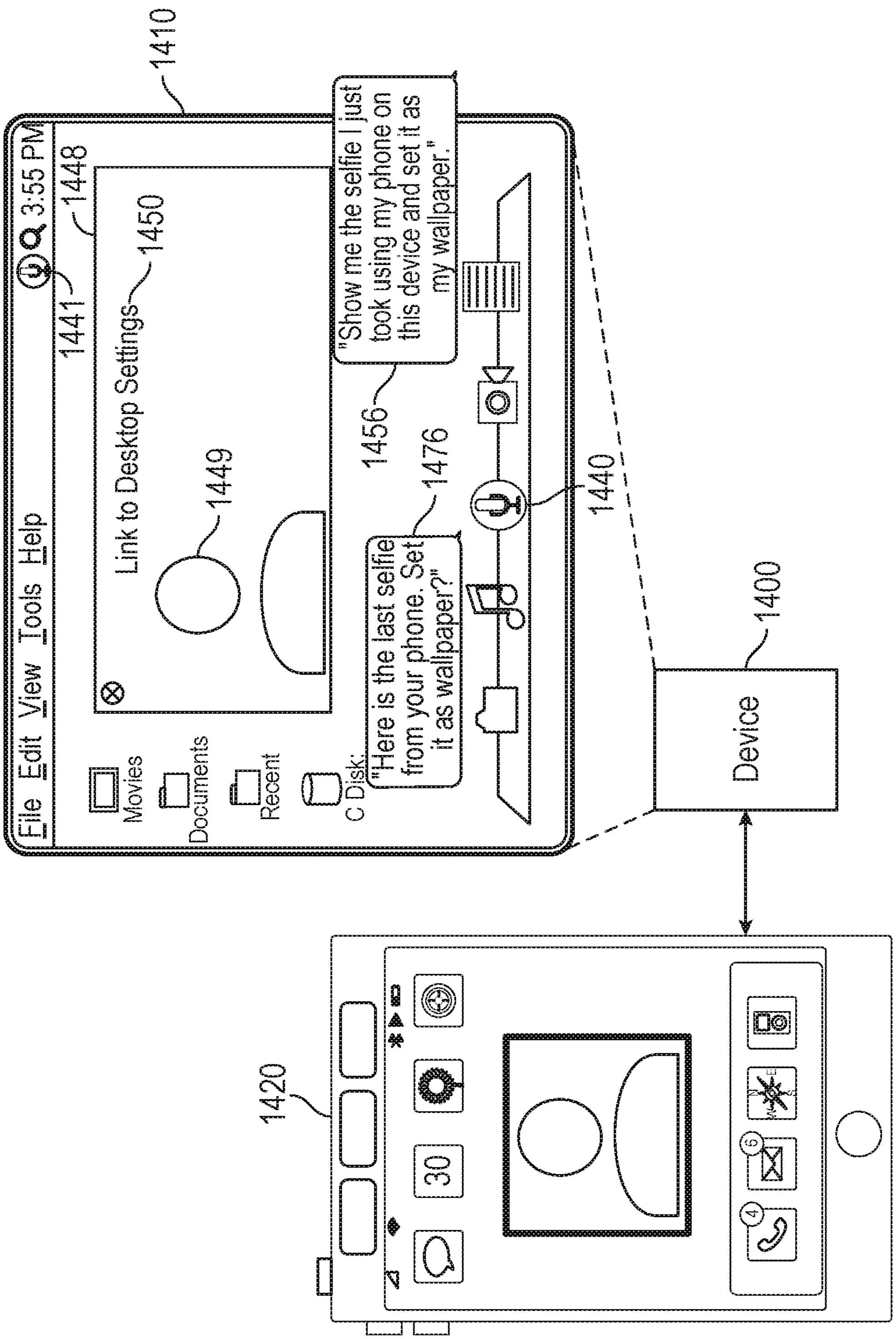

With reference to FIG. 14C, in some examples, based on a single speech input/utterance and context information, the digital assistant determines that the user intent is to perform a plurality of tasks. As shown in FIG. 14C, the digital assistant receives a speech input 1456 such as "Show me the selfie I just took using my phone on this device and set it as my wallpaper." Based on speech input 1456 and context information, the digital assistant determines that the user intent is to perform a first task of displaying the photo named selfie0001 stored at electronic device 1420 and performs a second task of setting the photo named selfie0001 as the wallpaper. Thus, based on a single speech input 1456, the digital assistant determines that the user intent is to perform multiple tasks.

In some embodiments, the digital assistant determines whether the plurality of tasks is to be performed at the user device or at an electronic device communicatively connected to the user device. For example, using the keywords "this device" included in speech input 1456, the digital assistant determines that the plurality of tasks is to be performed at user device 1400. Similar to those described above, the digital assistant further determines whether the content for performing at least one task is located remotely. For example, the digital assistant determines that the content for performing at least the first task (e.g., displaying the photo named selfie0001) is located remotely. In some embodiments, in accordance with a determination that the plurality of tasks is to be performed at the user device and content for performing at least one task is located remotely, the digital assistant requests the content from another electronic device (e.g., electronic device 1420), receives the content for performing the tasks, and provides a response at the user device.

In some embodiments, providing a response includes performing the plurality of tasks. For example, as illustrated in FIG. 14C, providing a response includes performing the first task of displaying a view 1449 of the photo named selfie0001, and performing the second task of setting the photo named selfie0001 as the wallpaper. In some examples, the digital assistant automatically configures the wallpaper to be the photo named selfi0001 using a desktop settings configuration process. In some examples, the digital assistant provides a link to desktop settings 1450, enabling the user to manually configure the wallpaper using the photo named selfie0001. For example, the user may select the link to desktop settings 1450 by using an input device such as a mouse, a stylus, or a finger. Upon receiving the selection of the link to desktop setting 1450, the digital assistant initiates the desktop setting configuration process that enables the user to select the photo named selfie0001 and set it as the wallpaper of user device 1400.

As illustrated in FIG. 14C, in some examples, the digital assistant initiates a dialog with the user and facilitates the configuration of the wallpaper in response to receiving a speech input from the user. For example, the digital assistant provides a spoken output 1476 such as "Here is the last selfie from your phone. Set is as wallpaper?" The user provides a speech input such as "OK." Upon receiving the speech input, the digital assistant instantiates the desktop settings configuration process to configure the wallpaper as the photo named selfie0001.

Figure 14D:
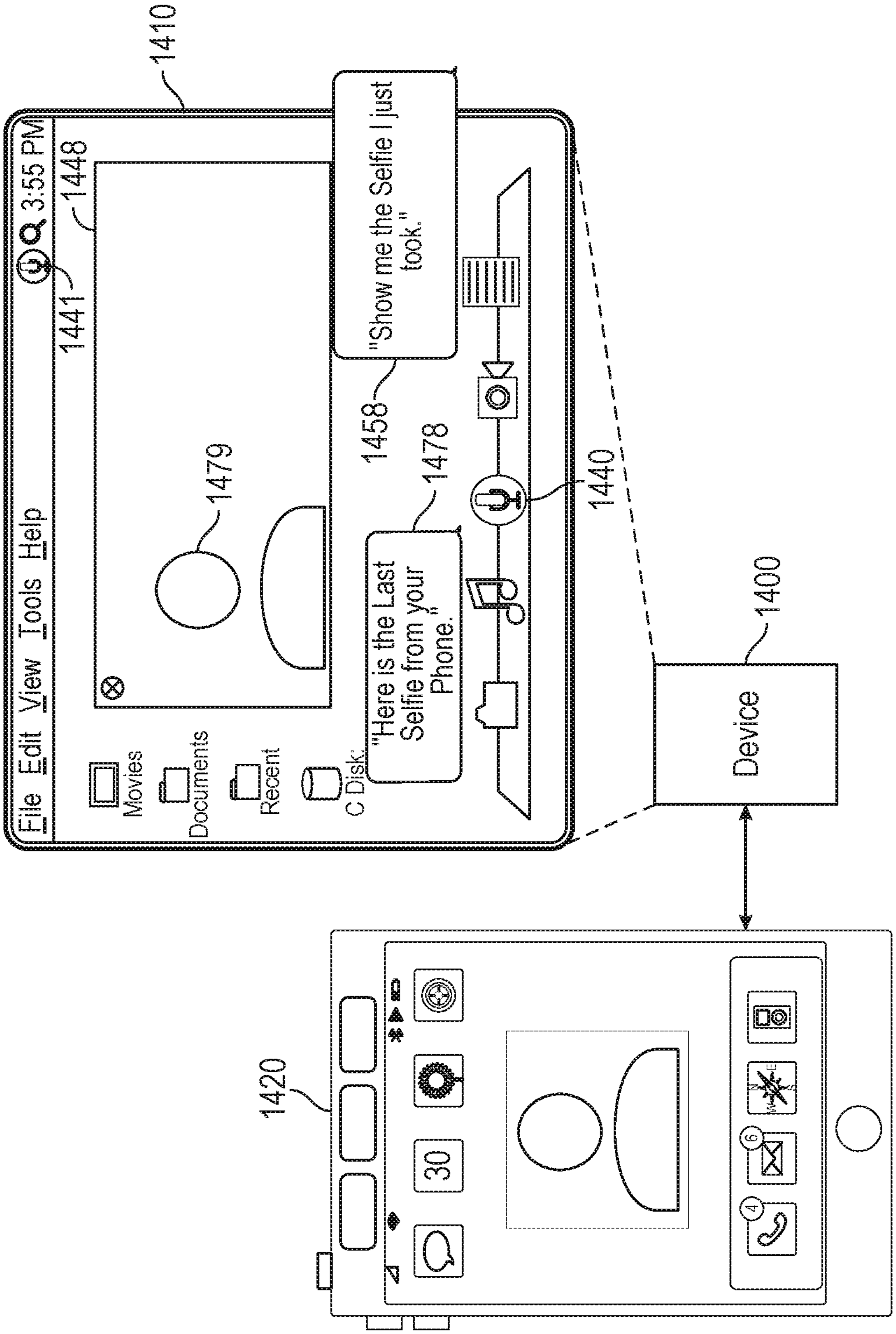

As described, in some examples, the digital assistant determines the user intent based on the speech input and context information. With reference to FIG. 14D, in some examples, the speech input may not include information sufficient to determine the user intent. For example, the speech input may not indicate the location of the content for performing the task. As shown in FIG. 14D, the digital assistant receives a speech input 1458 such as "Show me the selfie I just took." Speech input 1458 does not include one or more keywords indicating which photo is to be displayed or the location of the selfie to be displayed. As a result, the user intent may not be determined based solely on speech input 1458. In some examples, the digital assistant determines the user intent based on speech input 1458 and context information. For example, based on context information, the digital assistant determines that user device 1400 is communicatively connected to electronic device 1420. In some examples, the digital assistant instantiates a searching process to search for photos that the user recently took at user device 1400 and electronic device 1420. Based on the search result, the digital assistant determines that a photo named selfie0001 is stored in electronic device 1420. Accordingly, the digital assistant determines that the user intent is to display the photo named selfie0001 located at electronic device 1420. In some examples, if the user intent cannot be determined based on the speech input and context information, the digital assistant initiates a dialog with the user to further clarify or disambiguate the user intent.

As illustrated in FIG. 14D, in some examples, the speech input may not include one or more keywords indicating whether a task is to be performed at the user device or at an electronic device communicatively connected to the user device. For example, speech input 1458 does not indicate whether the task of displaying the selfie is to be performed at user device 1400 or at electronic device 1420. In some examples, the digital assistant determines whether a task is to be performed at the user device or at an electronic device based on context information. As an example, the context information indicates that the digital assistant receives speech input 1458 at user device 1400, not at electronic device 1420. As a result, the digital assistant determines that the task of displaying the selfie is to be performed at user device 1400. As another example, context information indicates that a photo is to be displayed on electronic device 1420 according to user preferences. As a result, the digital assistant determines that the task of displaying the selfie is to be performed at electronic device 1420. It is appreciated that the digital assistant can determine whether a task is to be performed at the user device or at an electronic device based on any context information.

Figure 15A:
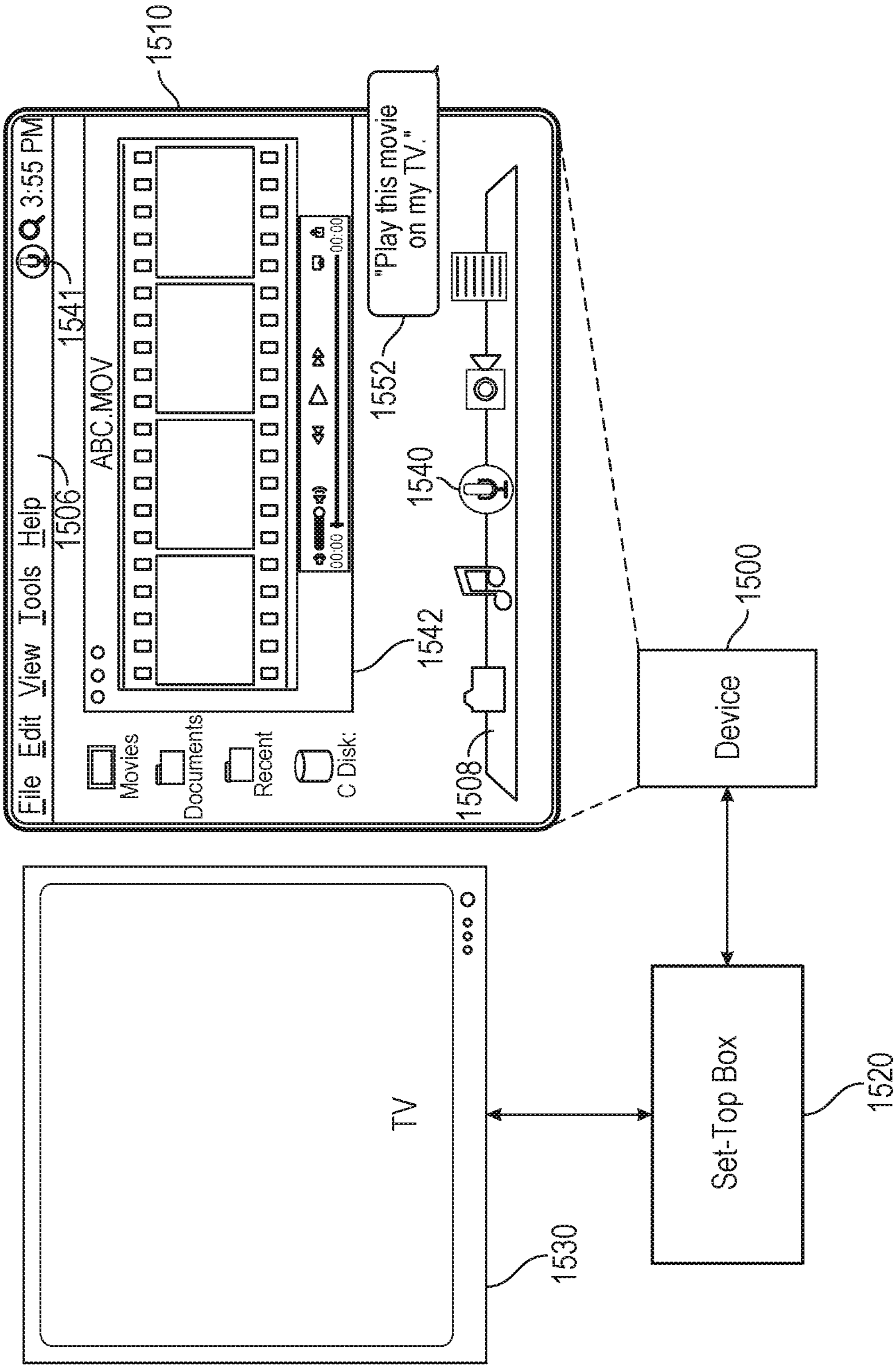
FIGS. 15A-15D illustrate functionalities of performing a task at a first electronic device using remotely located content by a digital assistant according to various examples.

With reference to FIG. 15A, in some embodiments, a digital assistant determines that the task is to be performed at an electronic device (e.g., electronic device 1520 and/or 1530) communicatively connected to the user device (e.g., user device 1500) and determine that the content is located remotely to the electronic device. As shown in FIG. 15A, in some examples, the digital assistant receives a speech input 1552 such as "Play this movie on my TV." As described, the digital assistant can determine the user intent based on speech input 1552 and context information. For example, context information indicates that user interface 1542 is displaying a movie named ABC.mov. As a result, the digital assistant determines that the user intent is to play the movie named ABC.mov.

In accordance with the user intent, the digital assistant furthers determine whether the task is to be performed at the user device or at a first electronic device communicatively connected to the user device. In some embodiments, determining whether the task is to be performed at the user device or at the first electronic device is based on one or more keywords included in the speech input. For example, speech input 1552 includes the words or phrase "on my TV." In some examples, context information indicates that user device 1500 is connected to a set-top box 1520 and/or a TV 1530 using, for example, a wired connection, a Bluetooth connection, or a Wi-Fi connection. As a result, the digital assistant determines that the task of playing the movie named ABC.mov is to be performed on set-top box 1520 and/or TV 1530.

In some embodiments, the digital assistant further determines whether the content associated with the performance of the task is located remotely. As described, content is located remotely if at or near the time the digital assistant determines which device is to perform the task, at least a portion of the content for performing the task is not stored in the device that is determined to perform the task. For example, as shown in FIG. 15A, at or near the time the digital assistant of user device 1500 determines that movie ABC.mov is to be played at set-top box 1520 and/or TV1530, at least a portion of the movie ABC.mov is stored at user device 1500 (e.g., a laptop computer) and/or a server (not shown) and is not stored at set-top box 1520 and/or TV 1530. Accordingly, the digital assistant determines that the movie ABC.mov is located remotely to set-top box 1520 and/or TV 1530.

Figure 15B:
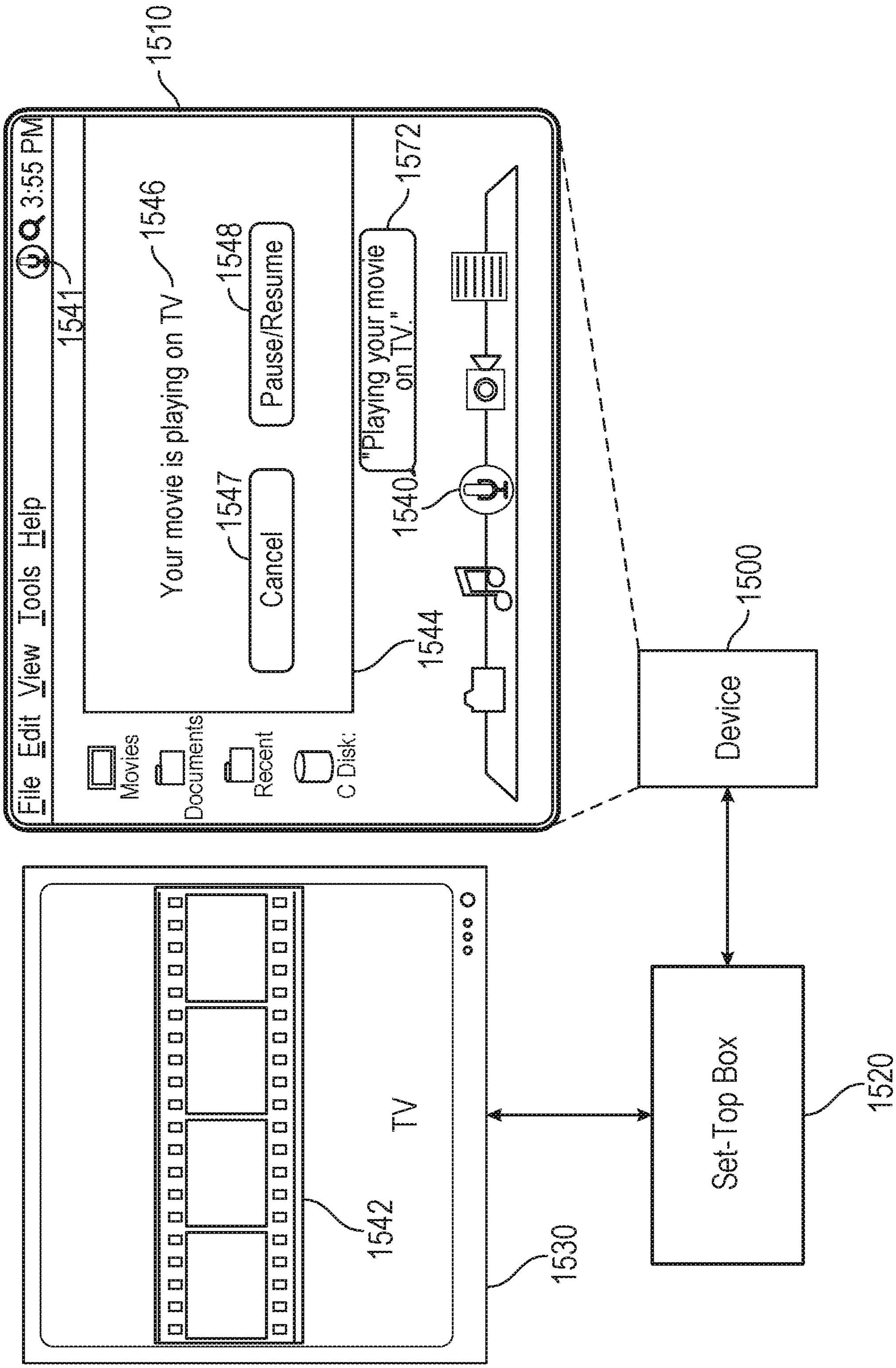

With reference to FIG. 15B, in accordance with a determination that the task is to be performed at the first electronic device (e.g., set-top box 1520 and/or TV 1530) and the content for performing the task is located remotely to the first electronic device, the digital assistant of the user device provides the content to the first electronic device to perform the task. For example, to play the movie ABC.mov on set-top box 1520 and/or TV 1530, the digital assistant of user device 1500 transmits at least a portion of the movie ABC.mov to set-top box 1520 and/or TV 1530.

In some examples, instead of providing the content from the user device, the digital assistant of the user device causes at least a portion of the content to be provided from another electronic device (e.g., a server) to the first electronic device to perform the task. For example, the movie ABC.mov is stored in a server (not shown) and not at user device 1500. As a result, the digital assistant of user device 1500 causes at least a portion of the movie named ABC.mov to be transmitted from the server to set-top box 1520 and/or TV 1530. In some examples, the content for performing the task is provided to set-top box 1520, which then transmits the content to TV 1530. In some examples, the content for performing the task is provided to TV 1530 directly.

As illustrated in FIG. 15B, in some examples, after the content is provided to the first electronic device (e.g., set-top box 1520 and/or TV 1530), the digital assistant of user device 1500 provides a response at user device 1500. In some examples, providing the response includes causing the task to be performed at set-top box 1520 and/or TV 1530 using the content. For example, the digital assistant of user device 1500 sends a request to set-top box 1520 and/or TV 1530 to initiate a multimedia process to play the movie ABC.mov. In response to the request, set-top box 1520 and/or TV 1530 initiates the multimedia process to play the movie ABC.mov.

In some examples, the task to be performed at the first electronic device (e.g., set-top box 1520 and/or TV 1530) is a continuation of a task performed remotely to the first electronic device. For example, as illustrated in FIGS. 15A and 15B, the digital assistant of user device 1500 has caused a multimedia process of user device 1500 to play a portion of the movie ABC.mov at user device 1500. In accordance with the determination that the user intent is to play the movie ABC.mov at the first electronic device (e.g., set-top box 1520 and/or TV 1530), the digital assistant of user device 1500 causes the first electronic device to continue playing the rest of the movie ABC.mov rather than start playing from the beginning. As a result, the digital assistant of user device 1500 enables the user to continuously watch the movie.

As illustrated in FIG. 15B, in some embodiments, providing a response includes providing one or more affordances that enable the user to further manipulate the results of the performance of the task. As shown in FIG. 15B, in some examples, the digital assistant provides affordances 1547 and 1548 on a user interface 1544 (e.g., a snippet or a window). Affordance 1547 can be a button for cancelling the playing of movie ABC.mov on the first electronic device (e.g., set-top box 1520 and/or TV 1530). Affordance 1548 can be a button to pause or resume the playing of movie ABC.mov that is playing on the first electronic device. The user may select affordance 1547 or 1548 using an input device such as a mouse, a stylus, or a finger. Upon receiving a selection of affordance 1547, for example, the digital assistant causes the playing of movie ABC.mov on the first electronic device to stop. In some examples, after the playing on the first electronic device stops, the digital assistant also causes the playing of movie ABC.mov on user device 1500 to resume. Upon receiving a selection of affordance 1548, for example, the digital assistant causes the playing of movie ABC.mov on the first electronic device to pause or resume.

In some embodiments, providing a response includes providing a spoken output according to the task to be performed at the first electronic device. As illustrated in FIG. 15B, the digital assistant represented by affordance 1540 or 1541 provides a spoken output 1572 such as "Playing your movie on TV."

Figure 15C:
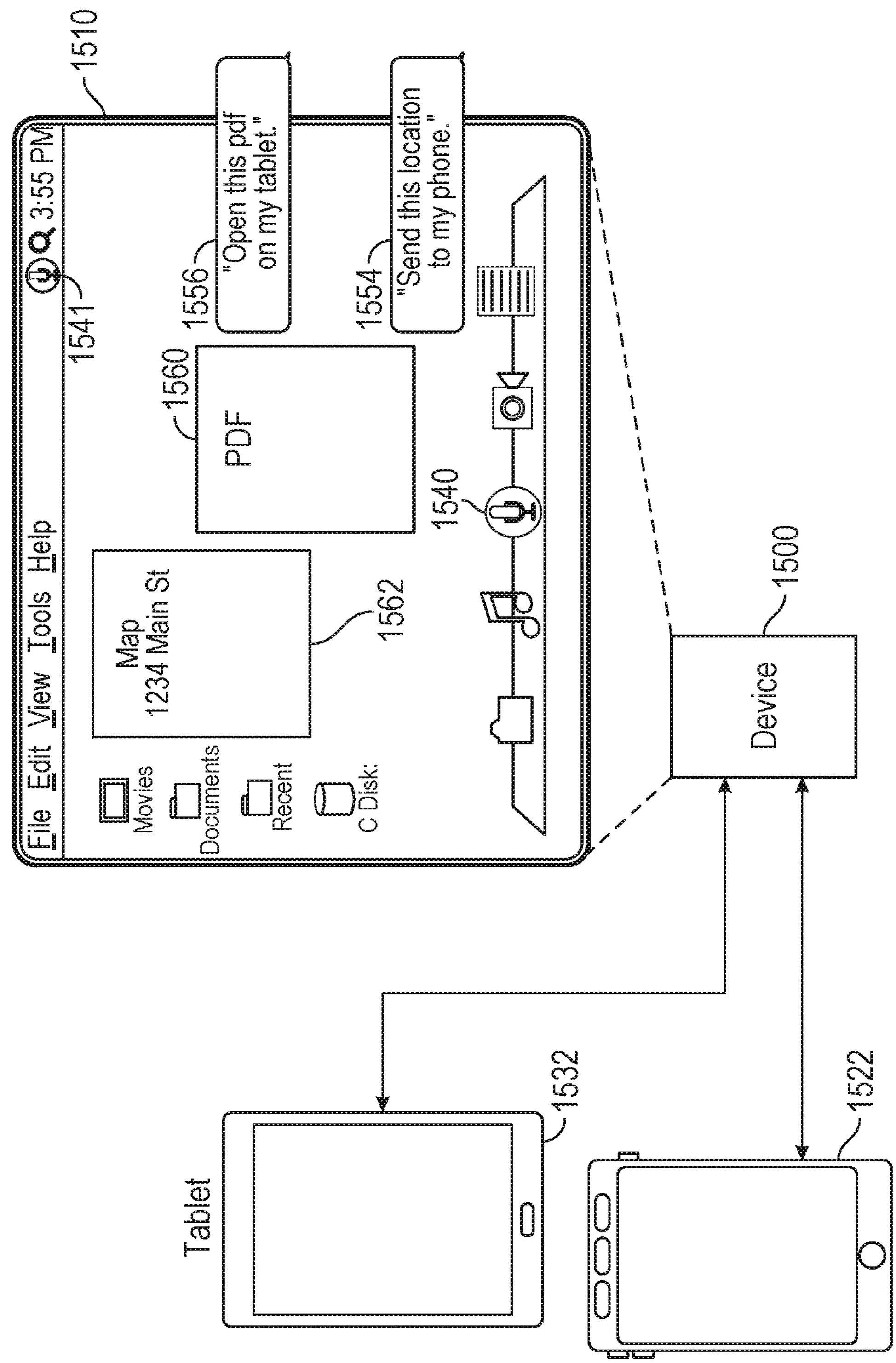

As described, in accordance with a determination that the task is to be performed at a first electronic device and the content for performing the task is located remotely to the first electronic device, the digital assistant provides the content for performing the task to the first electronic device. With reference to FIG. 15C, the content for performing the task can include, for example, a document (e.g., document 1560) or location information. For instance, the digital assistant of user device 1500 receives a speech input 1556 such as "Open this pdf on my tablet." The digital assistant determines that the user intent is to perform a task of displaying document 1560 and determines that the task is to be performed at a tablet 1532 that is communicatively connected to user device 1500. As a result, the digital assistant provides document 1560 to tablet 1532 to be displayed. As another example, the digital assistant of user device 1500 receives a speech input 1554 such as "Send this location to my phone." The digital assistant determines that the user intent is to perform a task of navigation using the location information and determines that the task is to be performed at phone 1522 (e.g., a smartphone) that is communicatively connected to user device 1500. As a result, the digital assistant provides location information (e.g., 1234 Main St.) to phone 1522 to perform the task of navigation.

Figure 15D:
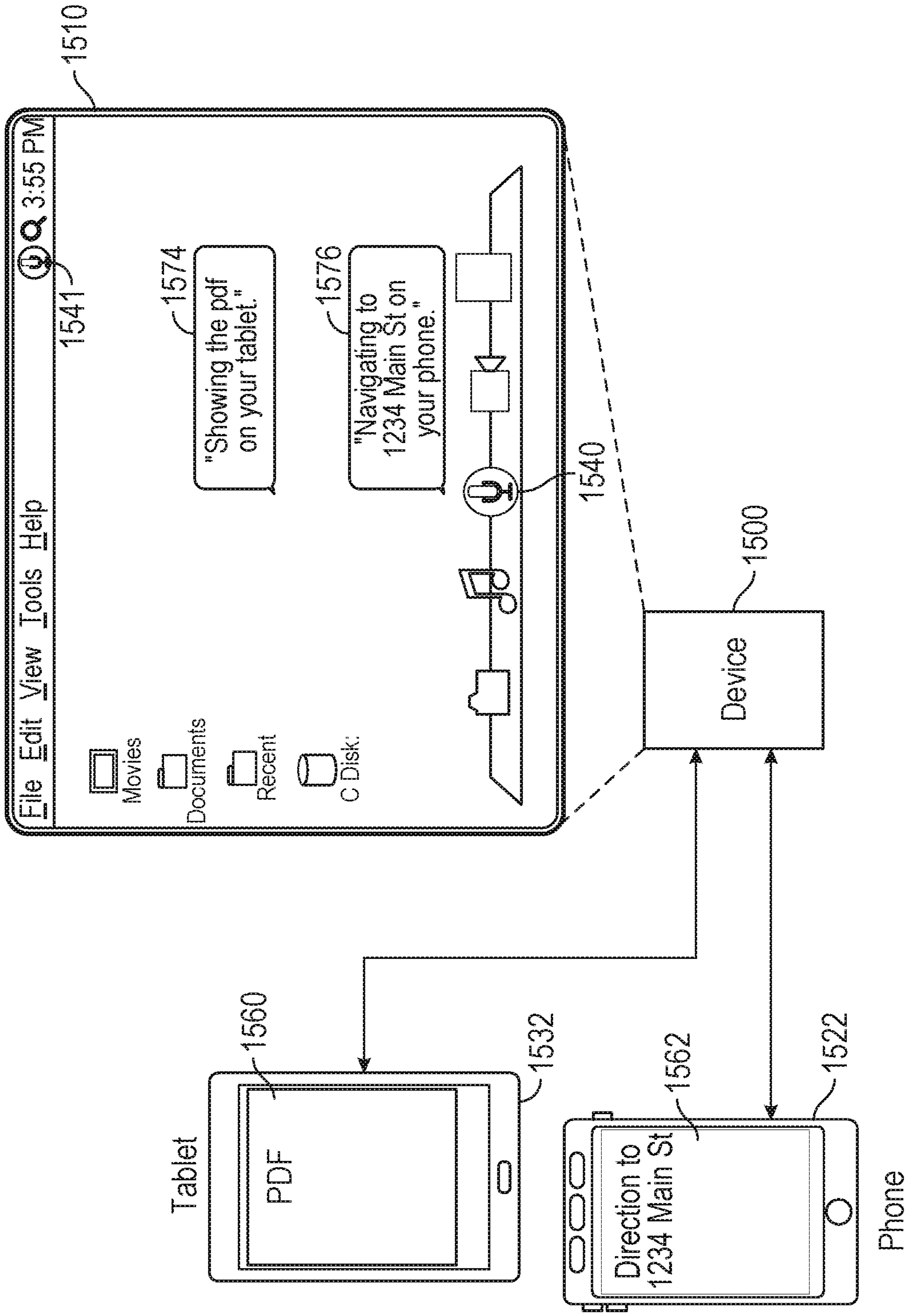

As described, in some examples, after providing the content for performing the task to the first electronic device, the digital assistant provides a response at the user device. In some embodiments, providing the response includes causing the task to be performed at the first electronic device. For example, as shown in FIG. 15D, the digital assistant of user device 1500 transmits a request to phone 1522 to perform the task of navigating to the location 1234 Main St. The digital assistant of user device 1500 further transmits a request to tablet 1532 to perform the task of displaying document 1560. In some examples, providing the response at the user device includes providing a spoken output according to the task to be performed at the first electronic device. As illustrated in FIG. 15D, the digital assistant provides a spoken output 1574 such as "Showing the pdf on your tablet" and a spoken output 1576 such as "navigating to 1234 Main St on your phone."

Figure 16A:
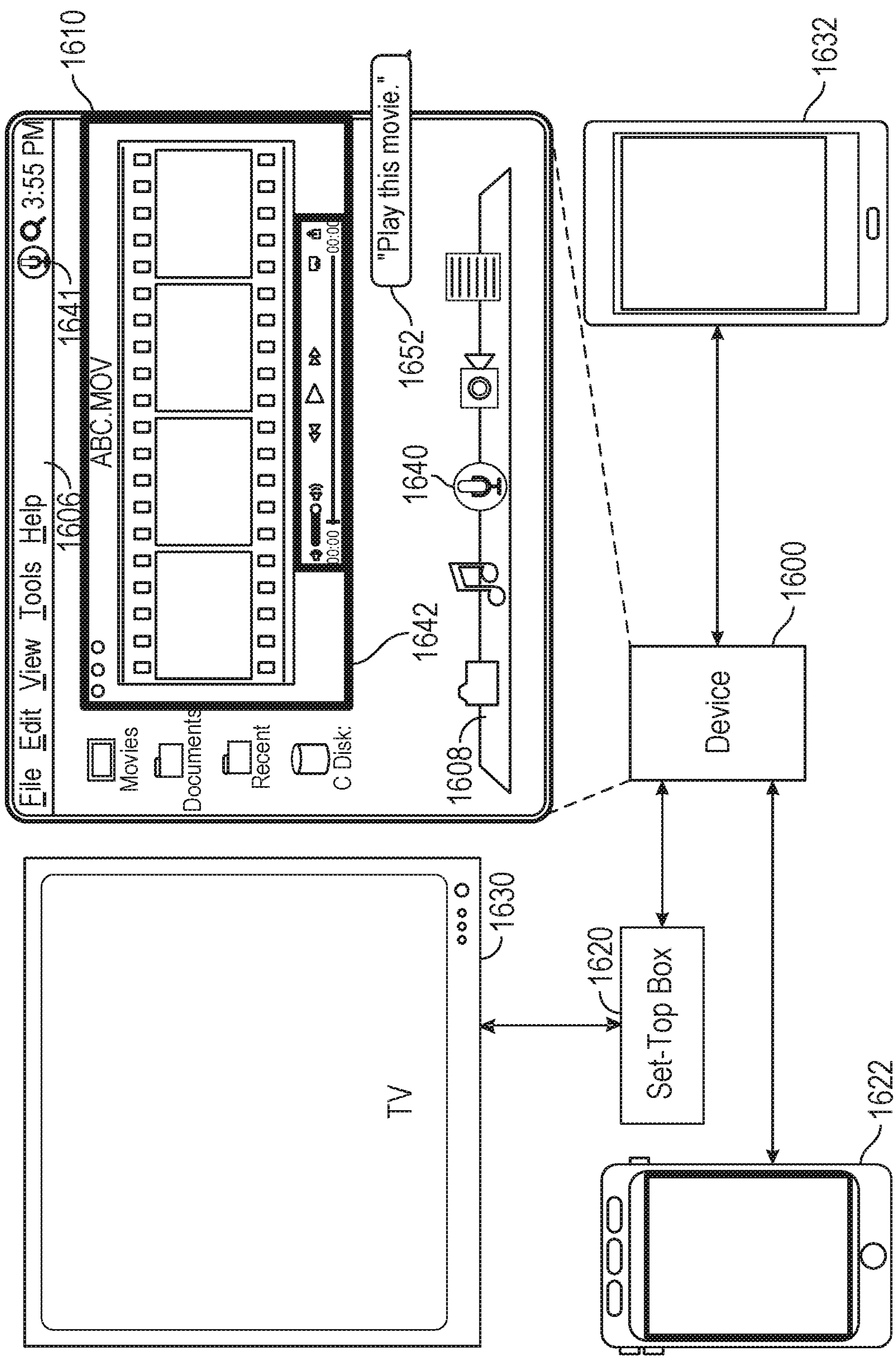
FIGS. 16A-16C illustrate functionalities of performing a task at a first electronic device using remotely located content by a digital assistant according to various examples.

As described, in some examples, the speech input may not include one or more keywords indicating whether a task is to be performed at the user device or at a first electronic device communicatively connected to the user device. With reference to FIG. 16A, for example, the digital assistant receives a speech input 1652 such as "Play this movie." Speech input 1652 does not indicate whether the task of playing the movie is to be performed at user device 1600 or at a first electronic device (e.g., set-top box 1620 and/or TV 1630, phone 1622, or tablet 1632).

In some embodiments, to determine whether the task is to be performed at the user device or at a first electronic device, the digital assistant of the user device determines whether performing the task at the user device satisfies performance criteria. Performance criteria facilitate evaluating the performance of the task. For example, as illustrated in FIG. 16A, the digital assistant determines that the user intent is to perform the tasking of playing the movie ABC.mov. Performance criteria for playing a movie include, for example, the quality criteria of playing a movie (e.g., 480p, 720p, 1080p), the smoothness criteria of playing the movie (e.g., no delay or waiting), the screen size criteria (e.g., a minimum screen size of 48 inches), the sound effect criteria (e.g., stereo sounds, number of speakers), or the like. The performance criteria can be pre-configured and/or dynamically updated. In some examples, the performance criteria are determined based on context information such as user-specific data (e.g., user preferences), device configuration data (e.g., screen resolution and size of the electronic devices), or the like.

In some examples, the digital assistant of user device 1600 determines that performing the task at the user device satisfies the performance criteria. For example, as illustrated in FIG. 16A, user device 1600 may have a screen resolution, a screen size, and sound effect that satisfy the performance criteria of playing the movie ABC.mov, which may be a low-resolution online video. In accordance with a determination that performing the task at user device 1600 satisfies the performance criteria, the digital assistant determines that the task is to be performed at user device 1600.

Figure 16B:
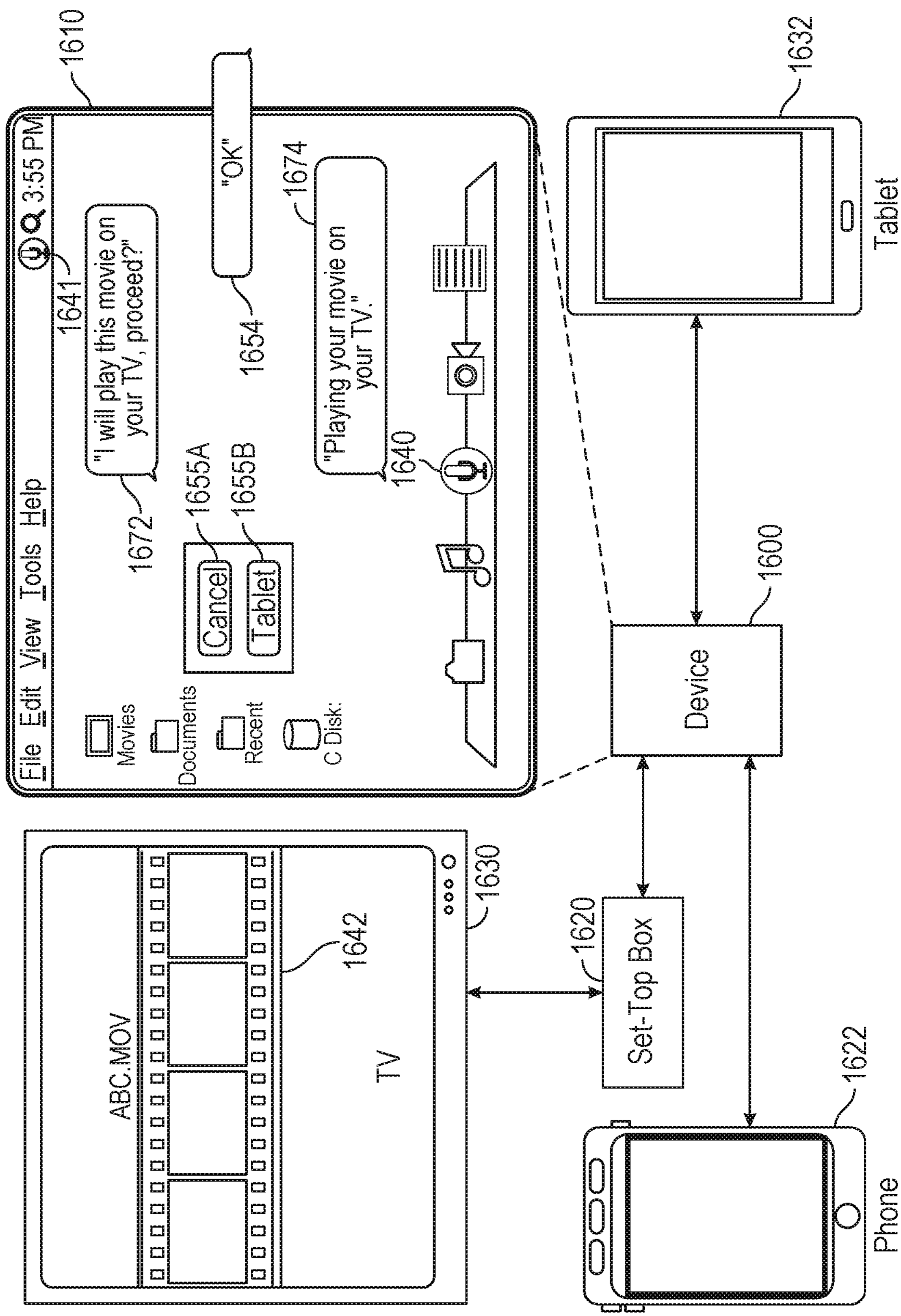

In some examples, the digital assistant of user device 1600 determines that performing the task at the user device does not satisfy the performance criteria. For example, user device 1600 may not have the screen size, the resolution, and/or the sound effect to satisfy the performance criteria of playing the movie ABC.mov, which may be a high-resolution Blu-ray video. In some examples, in accordance with a determination that performing the task at the user device does not satisfy the performance criteria, the digital assistant of user device 1600 determines whether performing the task at the first electronic device satisfies the performance criteria. As illustrated in FIG. 16B, the digital assistant of user device 1600 determines that performing the task of playing the movie ABC.mov at set-top box 1620 and/or TV 1630 satisfies the performance criteria. For example, set-top box 1620 and/or TV 1630 may have a screen size of 52 inches, may have a 1080p resolution, and may have eight speakers connected. As a result, the digital assistant determines that the task is to be performed at set-top box 1620 and/or TV 1630.

In some examples, the digital assistant of user device 1600 determines that performing the task at the first electronic device does not satisfy the performance criteria. In accordance with the determination, the digital assistant determines whether performing the task at the second electronic device satisfies the performance criteria. For example, as illustrated in FIG. 16B, TV 1630 may have a screen resolution (e.g., 720p) that does not satisfy the performance criteria (e.g., 1080p). As a result, the digital assistant determines whether any one of phone 1622 (e.g., a smartphone) or tablet 1632 satisfies the performance criteria.

In some examples, the digital assistant determines which device provides the optimum performance of the task. For example, as illustrated in FIG. 16B, the digital assistant evaluates or estimates the performance of the task of playing movie ABC.mov on each of user device 1600, set-top box 1620 and TV 1630, phone 1622, and tablet 1632. Based on the evaluation or estimation, the digital assistant determines whether performing the task at one device (e.g., user device 1600) is better than at another device (e.g., phone 1622) and determines a device for optimum performance.

As described, in some examples, in accordance with the determination of a device for performing the task, the digital assistant provides a response at user device 1600. In some embodiments, providing a response includes providing a spoken output according to the task to be performed at the device. As illustrated in FIG. 16B, the digital assistant represented by affordances 1640 or 1641 provides a spoken output 1672 such as "I will play this movie on your TV, proceed?" In some examples, the digital assistant receives a speech input 1654 such as "OK" from the user. In response, the digital assistant causes the movie ABC.mov to be played at, for example, set-top box 1620 and TV 1630 and provides a spoken output 1674 such as "Playing your movie on your TV."

In some examples, providing a response includes providing one or more affordances that enable the user to select another electronic device for performance of the task. As illustrated in FIG. 16B, for example, the digital assistant provides affordances 1655A-B (e.g., a cancel button and a tablet button). Affordance 1655A enables the user to cancel playing the movie ABC.mov at set-top box 1620 and TV 1630. Affordance 1655B enables the user to select tablet 1632 to continue playing the movie ABC.mov.

Figure 16C:
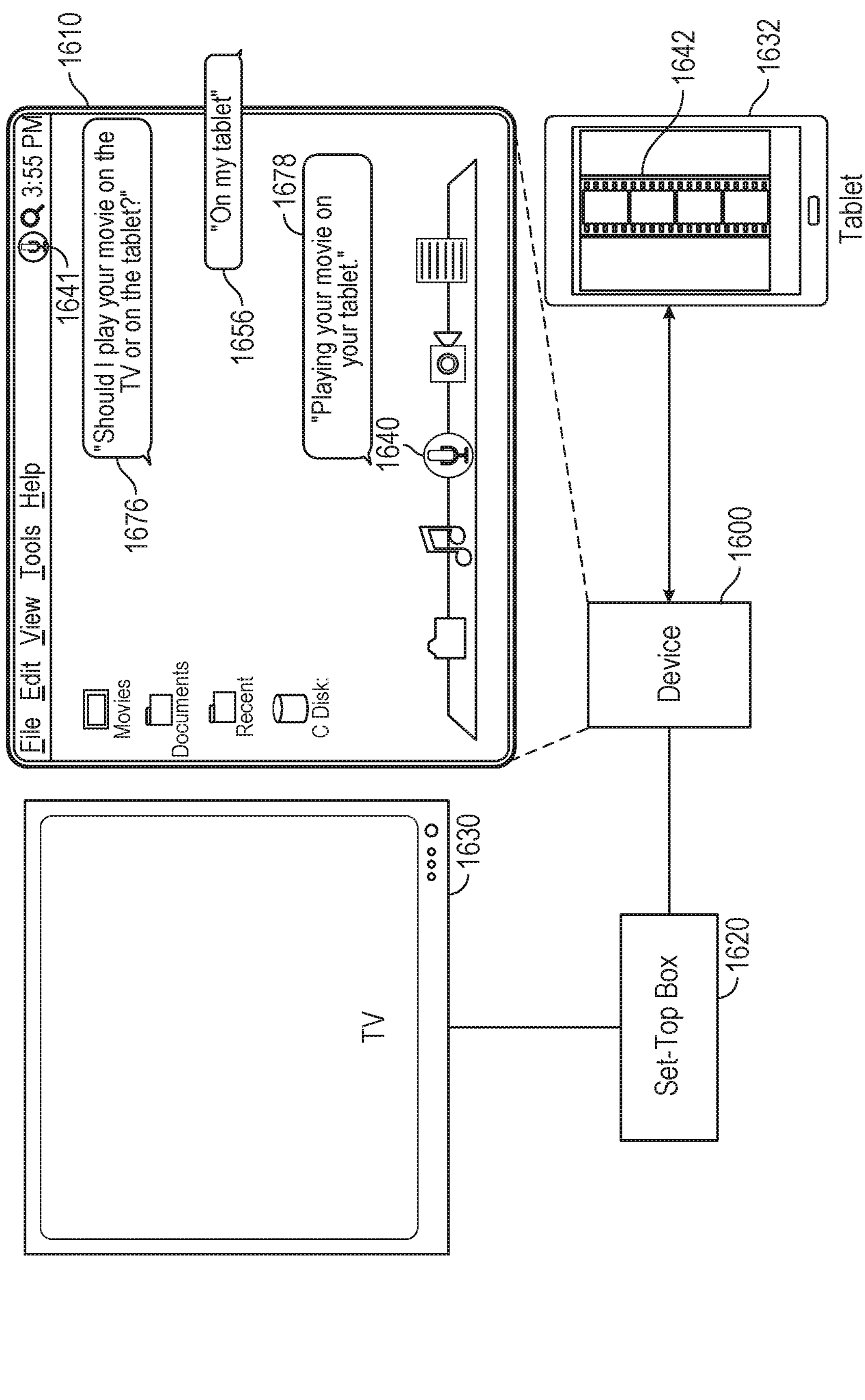

With reference to FIG. 16C, in some embodiments, to determine a device for performing a task, the digital assistant of user device 1600 initiates a dialog with the user. For example, the digital assistant provides a spoken output 1676 such as "Should I play your movie on the TV or on the tablet?" The user provides a speech input 1656 such as "On my tablet." Upon receiving speech input 1656, the digital assistant determines that the task of playing the movie is to be performed at tablet 1632, which is communicatively connected to user device 1600. In some examples, the digital assistant further provides a spoken output 1678 such as "Playing your movie on your tablet."

Figure 17A:
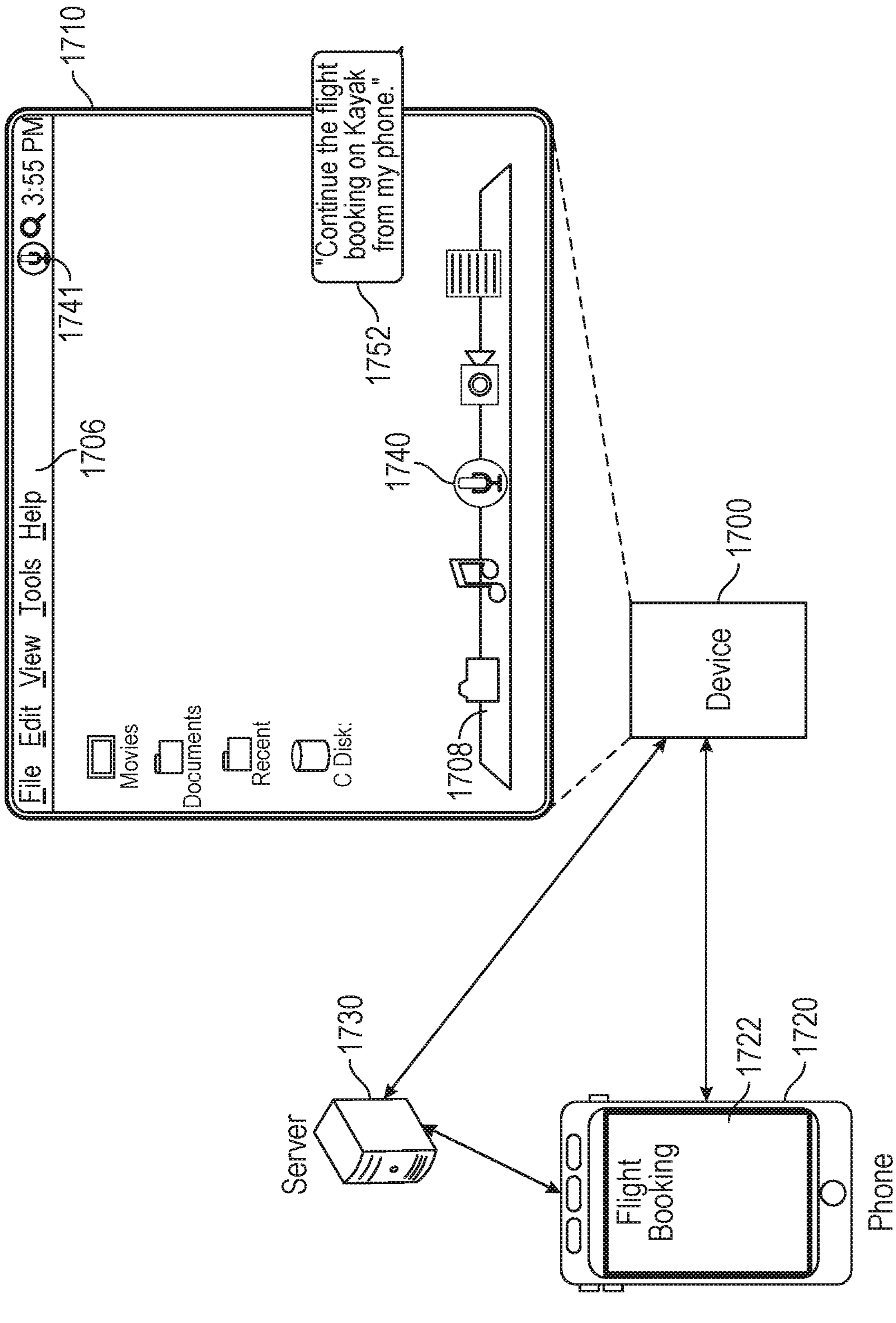
FIGS. 17A-17E illustrate functionalities of performing a task at a user device using remotely located content by a digital assistant according to various examples.

With reference to FIG. 17A, in some embodiments, a digital assistant of a user device 1700 continues to perform a task that was partially performed remotely at a first electronic device. In some embodiments, the digital assistant of a user device continues to perform the task using content received from a third electronic device. As illustrated in FIG. 17A, in some examples, phone 1720 may have been performing a task of flight booking using content from a third electronic device such as a server 1730. For example, the user may have been using phone 1720 to book flights from Kayak.com. As a result, phone 1720 receives content transmitted from server 1730 that is associated with Kayak.com. In some examples, the user may be interrupted while booking his or her flight on phone 1720 and may desire to continue the flight booking using user device 1700. In some examples, the user may desire to continue the flight booking simply because using user device 1700 is more convenient. Accordingly, the user may provide a speech input 1752 such as "Continue the flight booking on Kayak from my phone."

Figure 17B:
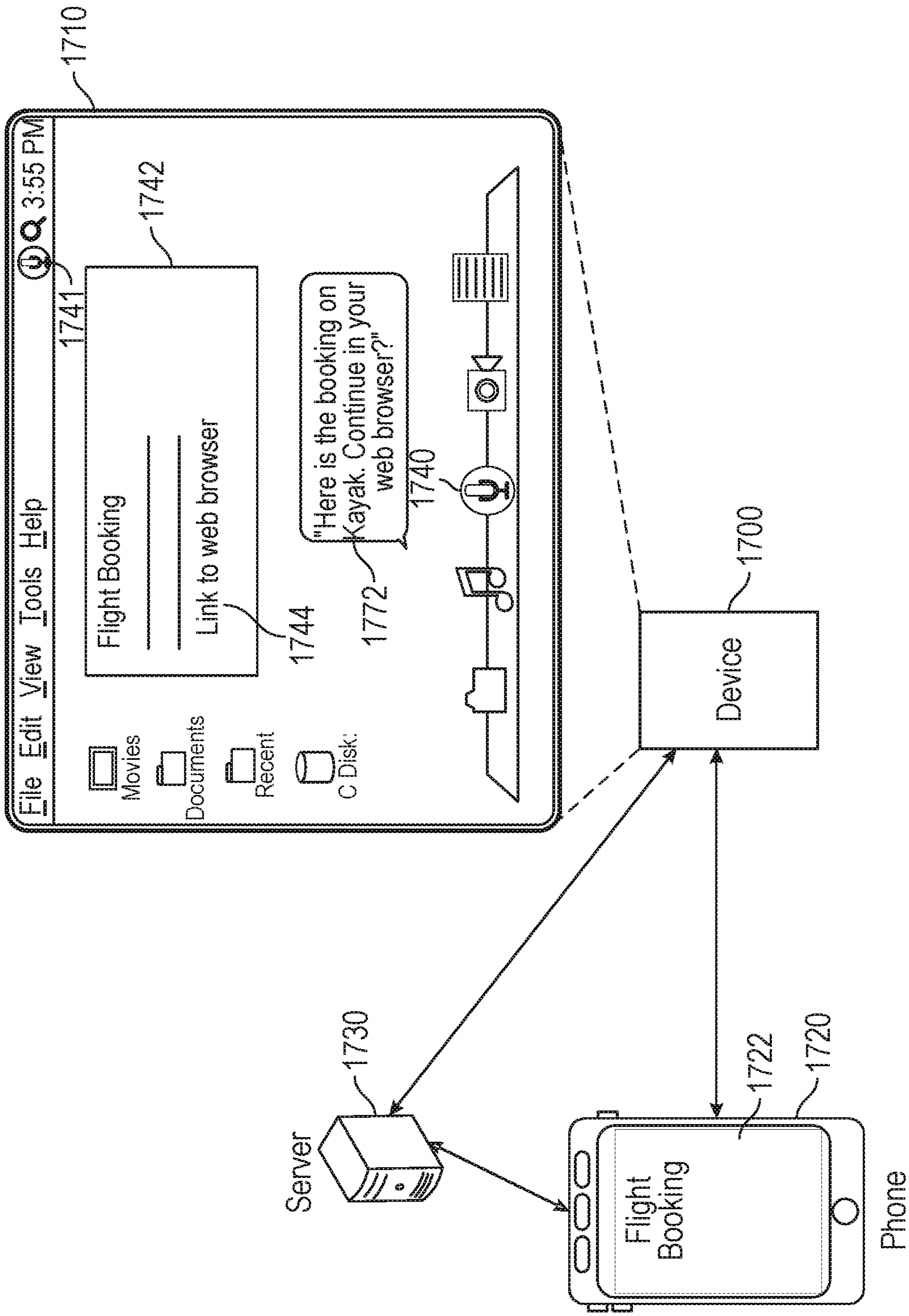

With reference to FIG. 17B, upon receiving speech input 1752, the digital assistant determines the user intent is to perform a task of flight booking. In some examples, the digital assistant further determines that the task is to be performed at user device 1700 based on context information. For example, the digital assistant determines that speech input 1752 is received at user device 1700 and therefore determines that the task is to be performed at user device 1700. In some examples, the digital assistant further uses context information such as user preferences (e.g., user device 1700 is used frequently in the past for flight booking) to determine that the task is to be performed at user device 1700.

As shown in FIG. 17B, in accordance with the determination that the task is to be performed at the user device 1700, and the content for performing the task is located remotely, the digital assistant receives the content for performing the task. In some examples, the digital assistant receives the at least a portion of the content from phone 1720 (e.g., a smartphone) and/or at least a portion of the content from server 1730. For example, the digital assistant receives data representing the status of flight booking from phone 1720 such that user device 1700 can continue the flight booking. In some examples, the data representing the status of flight booking is stored at server 1730, such as a server associated with Kayak.com. The digital assistant thus receives data from server 1730 for continuing the flight booking.

As illustrated in FIG. 17B, after receiving the content from phone 1720 and/or server 1730, the digital assistant provides a response at user device 1700. In some examples, providing the response includes continuing to perform the task of flight booking that was partially performed remotely at phone 1720. For example, the digital assistant displays a user interface 1742 enabling the user to continue booking the flight on Kayak.com. In some examples, providing the response includes providing a link associated with the task to be performed at user device 1700. For example, the digital assistant displays a user interface 1742 (e.g., a snippet or a window) providing the current status of flight booking (e.g., showing available flights). User interface 1742 also provides a link 1744 (e.g., a link to a web browser) for continuing performing the task of flight booking. In some embodiments, the digital assistant also provides a spoken output 1772 such as "Here is the booking on Kayak. Continue in your web browser?"

Figure 17C:
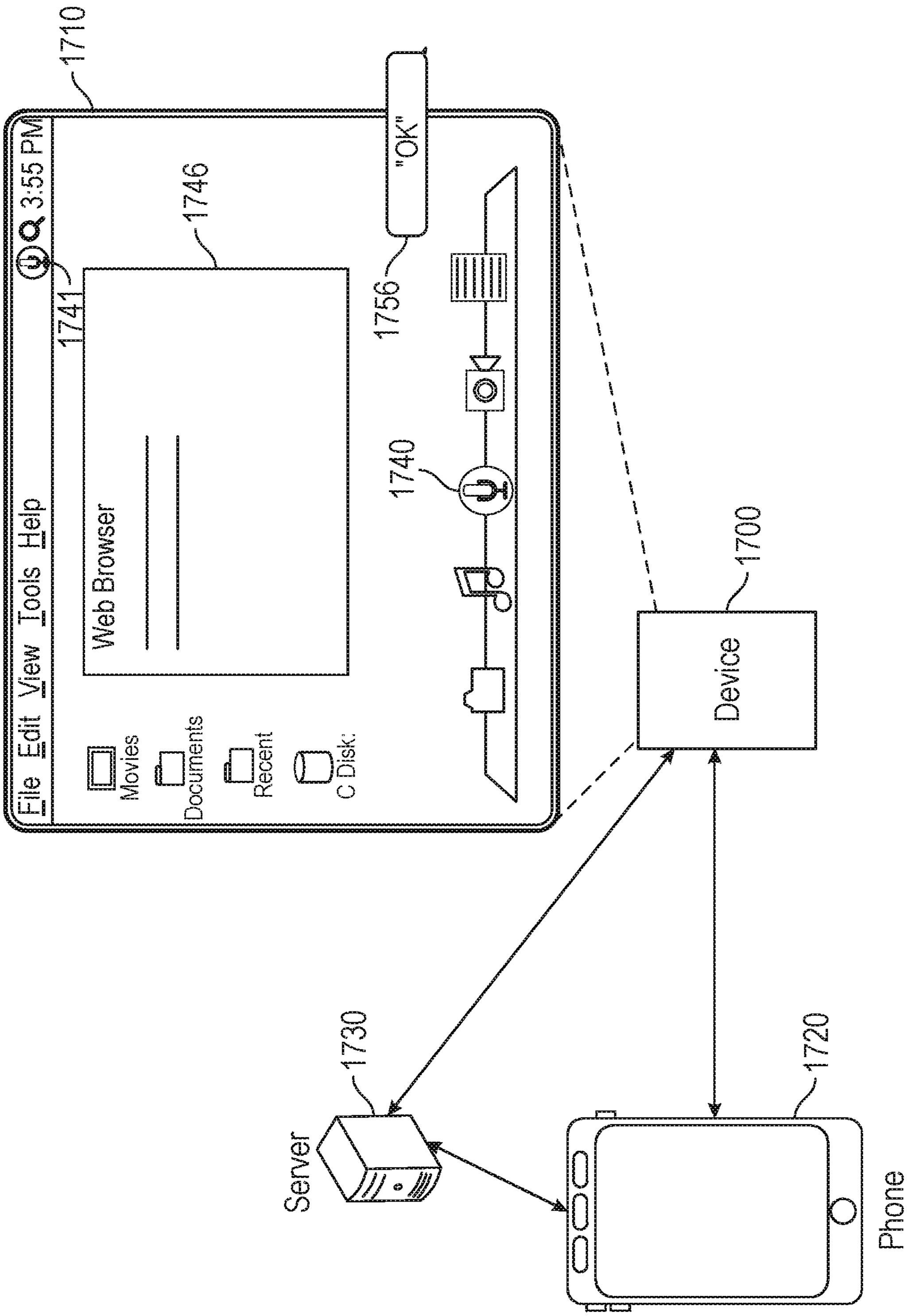

As shown in FIGS. 17B and 17C, for example, if the user selects link 1744, the digital assistant instantiates a web browsing process and displays a user interface 1746 (e.g., a snippet or a window) for continuing the flight booking task. In some examples, in response to spoken output 1772, the user provides a speech input 1756 such as "OK" confirming that the user desires to continue flight book using a web browser of user device 1700. Upon receiving speech input 1756, the digital assistant instantiates a web browsing process and displays user interface 1746 (e.g., a snippet or a window) for continuing the flight booking task.

Figure 17D:
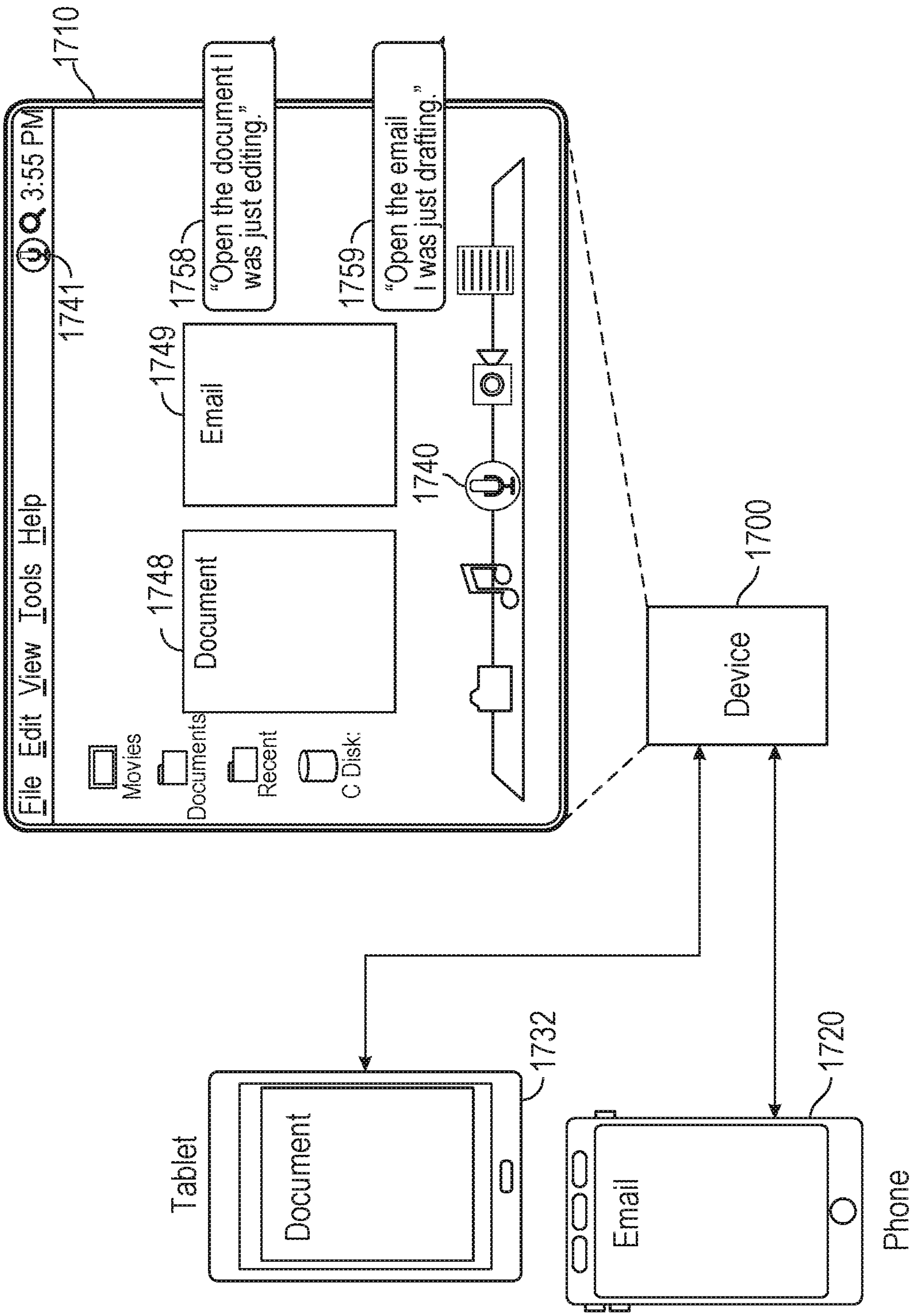

With reference to FIG. 17D, in some embodiments, a digital assistant of a user device 1700 continues to perform a task that was partially performed remotely at a first electronic device. In some embodiments, the digital assistant of the user device continues to perform the task using content received from the first electronic device, rather than a third electronic device such as a server. As illustrated in FIG. 17D, in some examples, the first electronic device (e.g., phone 1720 or tablet 1732) may have been performing a task. For example, the user may have been using phone 1720 to compose an email or using tablet 1732 to edit a document such as a photo. In some examples, the user is interrupted while using phone 1720 or tablet 1732, and/or desires to continue the performance of the task using user device 1700. In some examples, the user may desire to continue the performance of the task simply because using user device 1700 is more convenient (e.g., a larger screen). Accordingly, the user may provide a speech input 1758 such as "Open the document I was just editing" or speech input 1759 such as "Open the email I was just drafting."

With reference to FIG. 17D, upon receiving speech input 1758 or 1759, the digital assistant determines the user intent is to perform a task of editing a document or composing an email. Similar to those described above, in some examples, the digital assistant further determines that the task is to be performed at user device 1700 based on context information, and determines that the content for performing the task is located remotely. Similar to described above, in some examples, the digital assistant determines, based on context information (e.g., user-specific data), that the content is located remotely at the first electronic device (e.g., at phone 1720 or tablet 1732), rather than at a server. As shown in FIG. 17D, in accordance with the determination that the task is to be performed at the user device 1700 and the content for performing the task is located remotely, the digital assistant receives the content for performing the task. In some examples, the digital assistant receives the at least a portion of the content from phone 1720 (e.g., a smartphone) and/or at least a portion of the content from tablet 1730. After receiving the content from phone 1720 and/or tablet 1732, the digital assistant provides a response at user device 1700, such as displaying a user interface 1748 for the user to continue editing the document and/or displaying a user interface 1749 for the user to continue composing the email.

It is appreciated that the digital assistant of user device 1700 can also cause a first electronic device to continue performing a task that was partially performed remotely at the user device 1700. For example, the user may be composing an email on user device 1700 and may need to leave. The user provides a speech input such as "Open the email I was drafting on my phone." Based on the speech input, the digital assistant determines the user intent is to continue performing the task on phone 1720 and the content is located remotely at the user device 1700. In some examples, the digital assistant provides the content for performing the task to the first electronic device and causes the first electronic device to continue performing the task, similar to those described above.

Figure 17E:
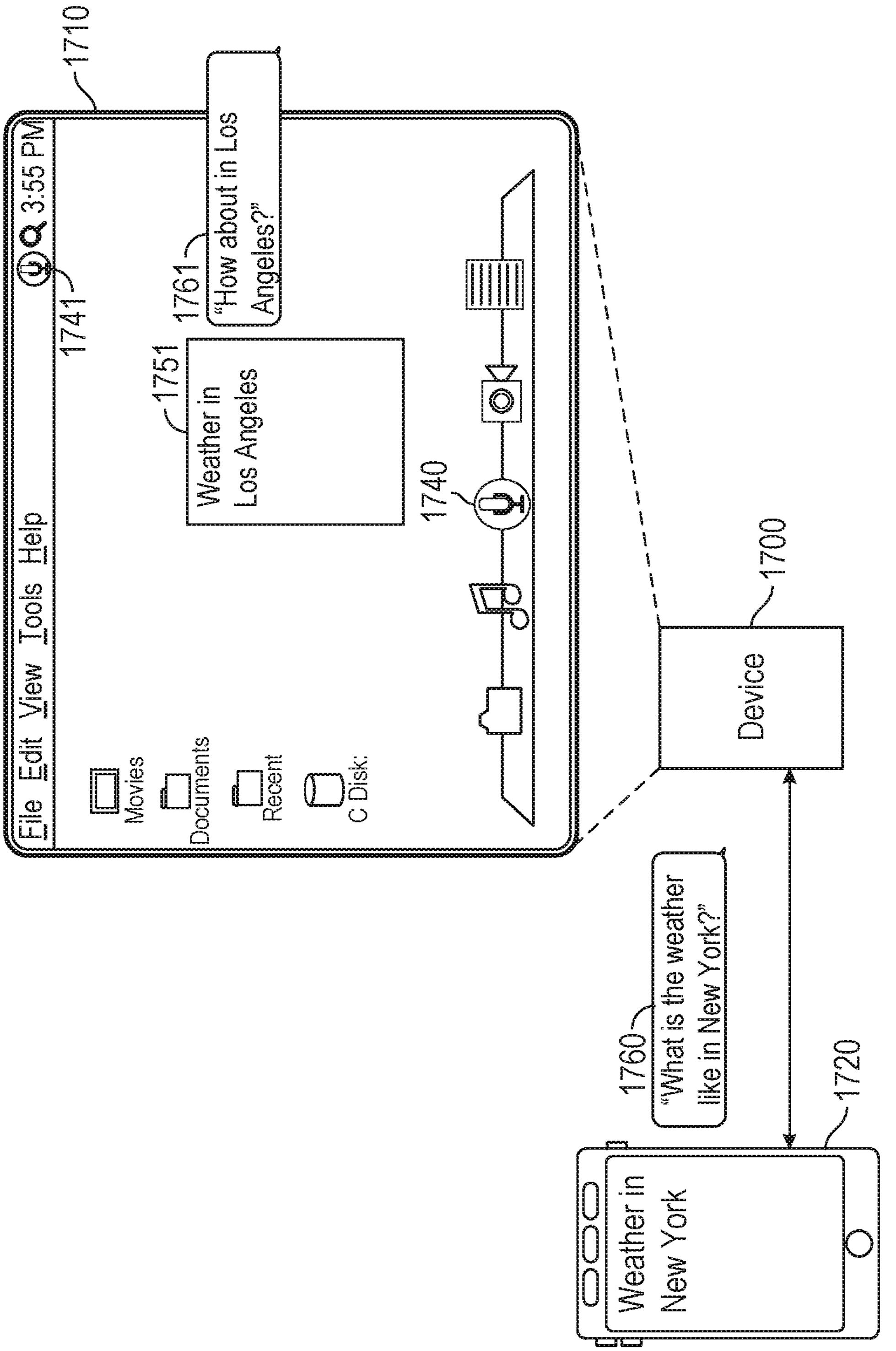

With reference to FIG. 17E, in some embodiments, continuing to performing a task is based on context information that is shared or synchronized among a plurality of devices including, for example, user device 1700 and first electronic device (e.g., phone 1720). As described, in some examples, the digital assistant determines a user intent based on the speech input and context information. The context information can be stored locally or remotely. For example, as shown in FIG. 17E, the user provides a speech input 1760 such as "What is the weather like in New York?" to phone 1720. A digital assistant of phone 1720 determines the user intent, performs the task to obtain the weather information in New York, and displays the weather information of New York on a user interface of phone 1720. The user subsequently provides a speech input 1761 such as "How about in Los Angeles?" to user device 1700. In some examples, the digital assistant of user device 1700 determines the user intent using context information stored at and/or shared by phone 1720, either directly or through a server. The context information includes, for example, historical user data associated with phone 1720, conversational state, system state, etc. Both the historical user data and conversational state indicate that user was inquiring about weather information. Accordingly, the digital assistant of user device 1700 determines that the user intent is to obtain the weather information in Los Angeles. Based on the user intent, the digital assistant of user device 1700 receives the weather information from, for example, a server, and provides a user interface 1751 displaying the weather information on user device 1710.

6. Exemplary Functions of a Digital Assistant—Voice-enabled System Configuration Management FIGS. 18A-18F and 19A-19D illustrate functionalities of providing system configuration information or performing a task in response to a user request by a digital assistant. In some examples, the digital assistant system (e.g., digital assistant system 700) can be implemented by a user device according to various examples. In some examples, the user device, a server (e.g., server 108), or a combination thereof, may implement a digital assistant system (e.g., digital assistant system 700). The user device is implemented using, for example, device 104, 200, or 400. In some examples, the user device is a laptop computer, a desktop computer, or a tablet computer. The user device operates in a multi-tasking environment, such as a desktop environment.

With references to FIGS. 18A-18F and 19A-19D, in some examples, a user device provides various user interfaces (e.g., user interfaces1810 and 1910). Similar to those described above, the user device displays the various user interfaces on a display and the various user interfaces enable the user to instantiate one or more processes (e.g., system configuration processes).

As shown in FIGS. 18A-18F and 19A-19D, similar to those described above, the user device displays, on a user interface (e.g., user interfaces 1810 and 1910), an affordance (e.g., affordance 1840 and 1940) to facilitate the instantiation of a digital assistant service.

Similar to those described above, in some examples, the digital assistant is instantiated in response to receiving a pre-determined phrase. In some examples, the digital assistant is instantiated in response to receiving a selection of the affordance.

With reference to FIGS. 18A-18F and 19A-19D, in some embodiments, a digital assistant receives one or more speech inputs, such as speech inputs 1852, 1854, 1856, 1858, 1860, 1862, 1952, 1954, 1956, and 1958 from a user. The user provides various speech inputs for the purpose of managing one or more system configurations of the user device. The system configurations can include audio configurations, date and time configurations, dictation configuration, display configurations, input device configurations, notification configurations, printing configurations, security configurations, backup configurations, application configurations, user interface configurations, or the like. To manage audio configurations, a speech input may include "Mute my microphone," "Turn the volume all the up," "Turn the volume up 10%," or the like. To manage date and time configurations, a speech input may include "What is my time zone?", "Change my time zone to Cupertino Time," "Add a clock for London time zone," or the like. To manage dictation configurations, a speech input may include "Turn on dictation," "Turn off dictation," "Dictation in Chinese," "Enable advanced commands," or the like. To manage display configurations, a speech input may include "Make my screen brighter," "Increase the contrast my 20%," "Extend my screen to a second monitor," "Mirror my display," or the like. To manage input device configurations, a speech input may include "Connect my Bluetooth keyboard," "Make my mouse pointer bigger," or the like. To manage network configurations, a speech input may include "Turn Wi-Fi on," "Turn Wi-Fi off," "Which Wi-Fi network am I connected to?", "Am I connected to my phone?", or the like. To manage notification configuration, a speech input may include "Turn on Do not Disturb," "Stop showing me these notifications," "Show only new emails," "No alert for text message," or the like. To manage printing configurations, a speech input may include "Does my printer have enough ink?", "Is my printer connected?", or the like. To manage security configurations, a speech input may include "Change password for John's account," "Turn on firewall," "Disable cookie," or the like. To manage backup configurations, a speech input may include "Run backup now," "Set backup interval to once a month," "Recover the July 4 backup of last year," or the like. To manage application configurations, a speech input may include "Change my default web browser to Safari," "Automatically log in to Messages application each time I sign in," or the like. To manage user interface configurations, a speech input may include "Change my desktop wallpapers," "Hide the dock," "Add Evernote to the Dock," or the like. Various examples of using speech inputs to manage system configurations are described below in more details.

Similar to those described above, in some examples, the digital assistant receives speech inputs directly from the user at the user device or indirectly through another electronic device that is communicatively connected to the user device.

With reference to FIGS. 18A-18F and 19A-19D, in some embodiments, the digital assistant identifies context information associated with the user device. The context information includes, for example, user-specific data, sensor data, and user device configuration data. In some examples, the user-specific data includes log information indicating user preferences, the history of user's interaction with the user device, or the like. For example, user-specific data indicates the last time the user's system was backed up; and that the user's preferences of a particular Wi-Fi network when several Wi-Fi networks are available or the like. In some examples, the sensor data includes various data collected by a sensor. For example, the sensor data indicates a printer ink level collected by a printer ink level sensor. In some examples, the user device configuration data includes the current and historical device configurations. For example, the user device configuration data indicates that the user device is currently communicatively connected to one or more electronic devices using Bluetooth connections. The electronic devices may include, for example, a smartphone, a set-top box, a tablet, or the like. As described in more detail below, the user device can determine user intent and/or perform one or more processes using the context information.

With reference to FIGS. 18A-18F and 19A-19D, similar to those described above, in response to receiving a speech input, the digital assistant determines a user intent based on the speech input. The digital assistant determines the user intent based on a result of natural language processing. For example, the digital assistant identifies an actionable intent based on the user input, and generates a structured query to represent the identified actionable intent. The structured query includes one or more parameters associated with the actionable intent. The one or more parameters can be used to facilitate the performance of a task based on the actionable intent. For example, based on a speech input such as "Turn the volume up by 10%," the digital assistant determines that the actionable intent is to adjust the system volume, and the parameters include setting the volume to be 10% higher than the current volume level. In some embodiments, the digital assistant also determines the user intent based on the speech input and context information. For example, the context information may indicate that the current volume of the user device is at 50%. As a result, upon receiving the speech input such as "Turn the volume up by 10%," the digital assistant determines that the user intent is to increase the volume level to 60%. Determining the user intent based on speech input and context information is described in more detail below in various examples.

In some embodiments, the digital assistant further determines whether the user intent indicates an informational request or a request for performing a task. Various examples of the determination are provided below in more detail with respect to FIGS. 18A-18F and 19A-19D.

Figure 18A:
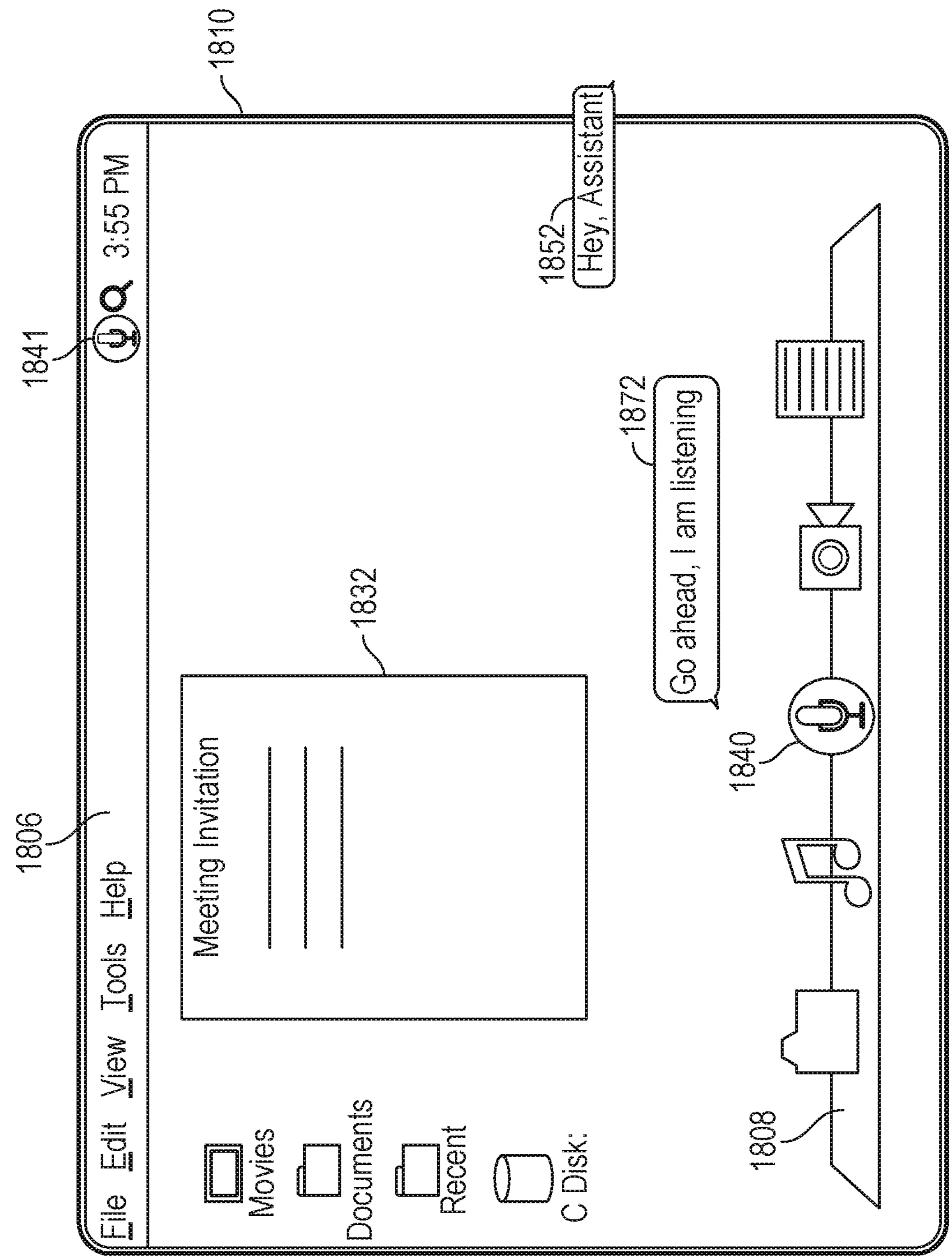
FIGS. 18A-18F illustrate functionalities of providing system configuration information in response to an informational request of the user by a digital assistant according to various examples.

With reference to FIG. 18A, in some examples, the user device displays a user interface 1832 associated with performing a task. For example, the task includes composing a meeting invitation. In composing the meeting invitation, the user may desire to know the time zone of the user device so that the meeting invitation can be properly composed. In some examples, the user provides a speech input 1852 to invoke the digital assistant represented by affordance 1840 or 1841. Speech input 1852 includes, for example, "Hey, Assistant." The user device receives the speech input 1852 and, in response, invokes the digital assistant such that the digital assistant actively monitors subsequent speech inputs. In some examples, the digital assistant provides a spoken output 1872 indicating that it is invoked. For example, spoken output 1872 includes "Go ahead, I am listening."

Figure 18B:
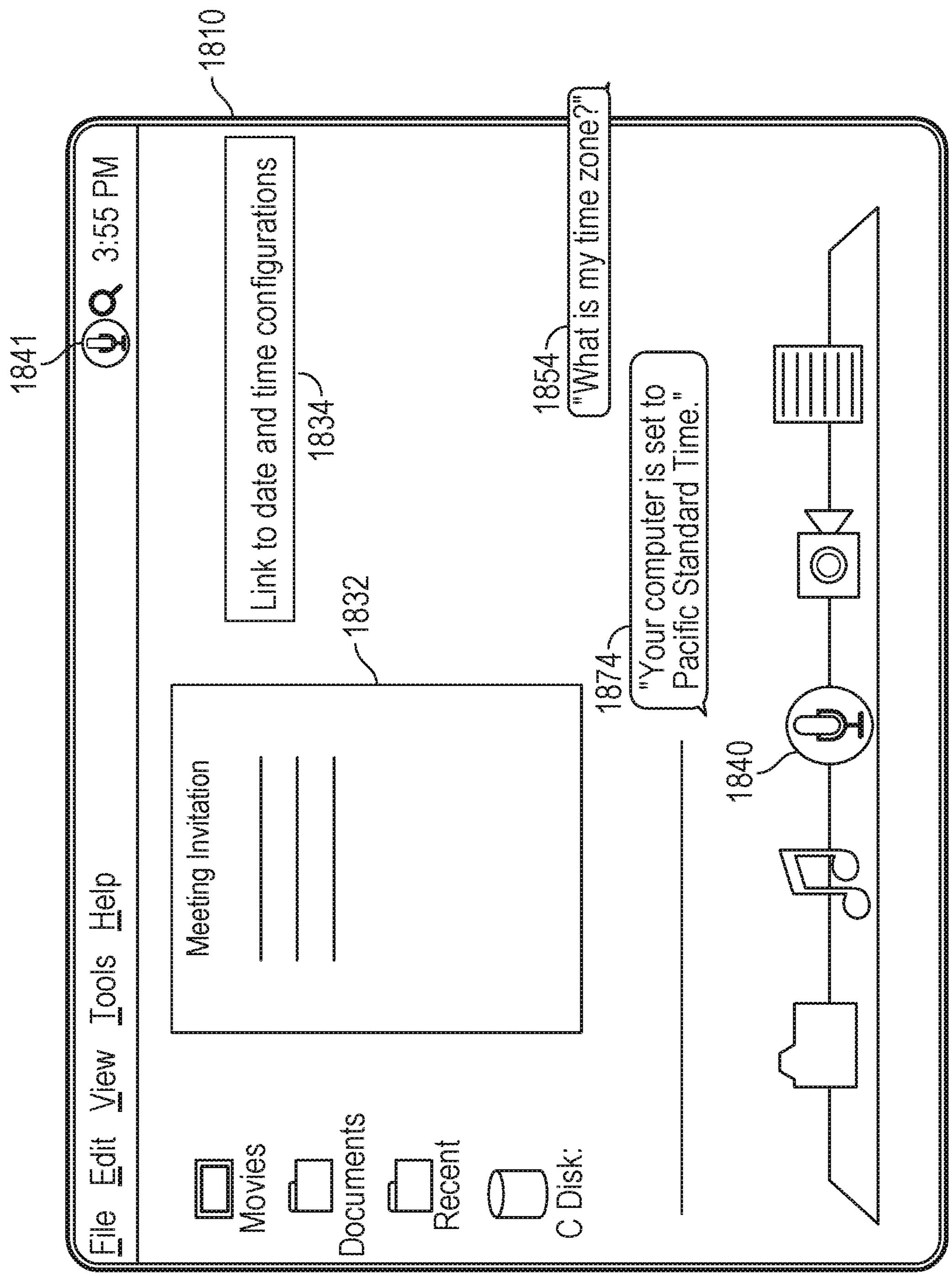

With reference to FIG. 18B, in some examples, the user provides a speech input 1854 such as "What is my time zone?" The digital assistant determines that the user intent is to obtain the time zone of the user device. The digital assistant further determines whether the user intent indicates an informational request or a request for performing a task. In some examples, determining whether the user intent indicates an informational request or a request for performing a task includes determining whether the user intent is to vary a system configuration. For example, based on the determination that the user intent is to obtain the time zone of the user device, the digital assistant determines that no system configuration is to be varied. As a result, the digital assistant determines that the user intent indicates an informational request.

In some embodiments, in accordance with a determination that the user intent indicates an informational request, the digital assistant provides a spoken response to the informational request. In some examples, the digital assistant obtains status of one or more system configurations according to the informational request, and provides the spoken response according to the status of one or more system configurations. As shown in FIG. 18B, the digital assistant determines that the user intent is to obtain the time zone of the user device, and this user intent indicates an informational request. Accordingly, the digital assistant obtains the time zone status from the time and date configuration of the user device. The time zone status indicates, for example, the user device is set to the Pacific time zone. Based on the time zone status, the digital assistant provides a spoken output 1874 such as "Your computer is set to Pacific Standard Time." In some examples, the digital assistant further provides a link associated with the informational request. As illustrated in FIG. 18B, the digital assistant provides a link 1834, enabling the user to further manage the data and time configurations. In some examples, the user uses an input device (e.g., a mouse) to select link 1834. Upon receiving the user's selection of link 1834, the digital assistant instantiates a date and time configuration process and displays an associated date and time configuration user interface. The user can thus use the date and time configuration user interface to further manage the date and time configurations.

Figure 18C:
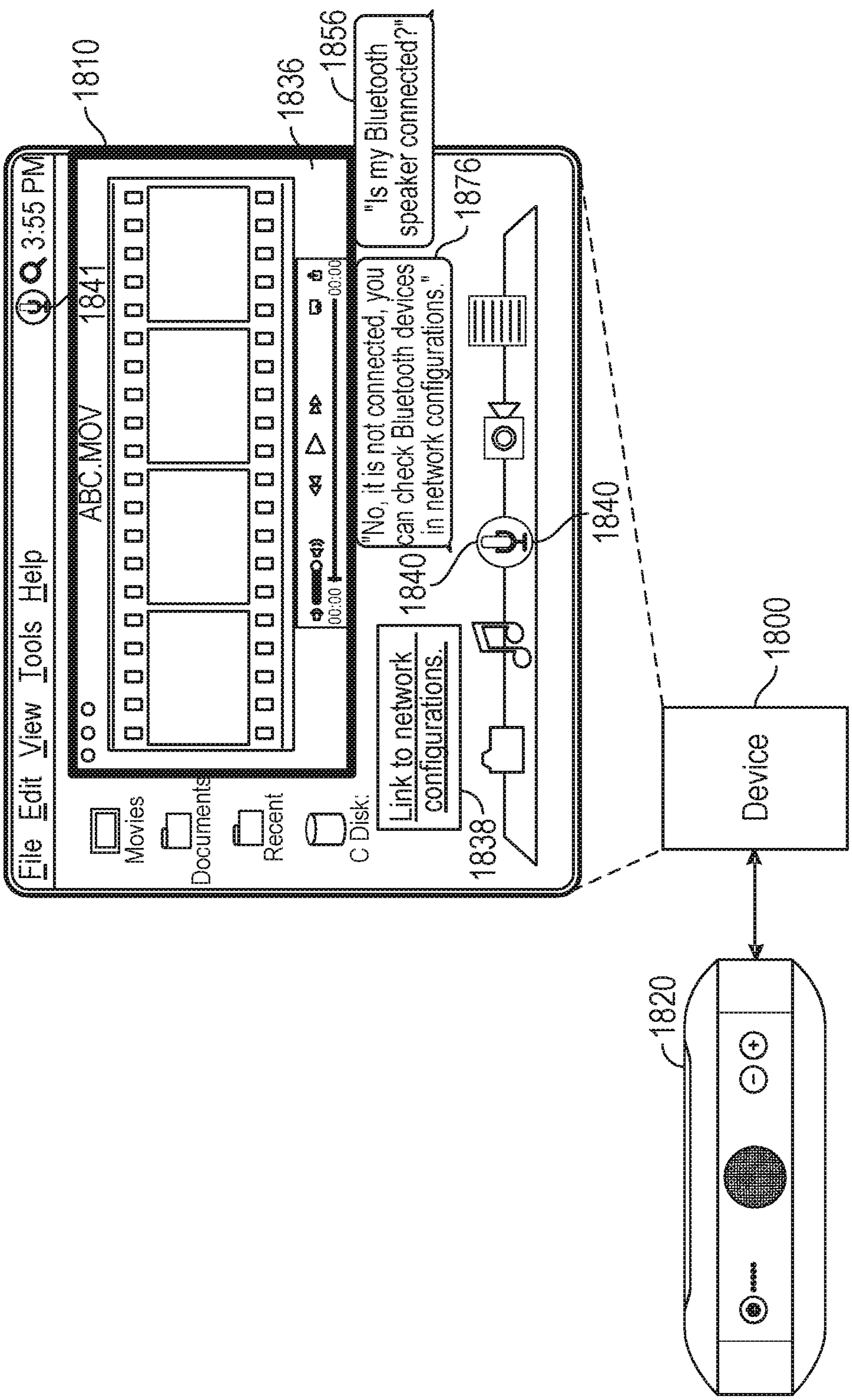

With reference to FIG. 18C, in some examples, the user device displays a user interface 1836 associated with performing a task. For example, the task includes playing a video (e.g., ABC.mov). To enhance the experience of watching the video, the user may desire to use a speaker and may want to know whether a Bluetooth speaker is connected. In some examples, the user provides a speech input 1856 such as "Is my Bluetooth speaker connected?" The digital assistant determines that the user intent is to obtain the connection status of the Bluetooth speaker 1820. The digital assistant further determines that obtaining the connection status of the Bluetooth speaker 1820 does not vary any system configuration and therefore is an informational request.

In some embodiments, in accordance with a determination that the user intent indicates an informational request, the digital assistant obtains status of system configurations according to the informational request, and provides the spoken response according to the status of the system configurations. As shown in FIG. 18C, the digital assistant obtains the connection status from the network configuration of the user device. The connection status indicates, for example, user device 1800 is not connected to a Bluetooth speaker 1820. Based on the connection status, the digital assistant provides a spoken output 1876 such as "No, it is not connected, you can check Bluetooth devices in the network configurations." In some examples, the digital assistant further provides a link associated with the informational request. As illustrated in FIG. 18C, the digital assistant provides a link 1838, enabling the user to further manage the network configurations. In some examples, the user uses an input device (e.g., a mouse) to select link 1838. Upon receiving the user's selection of link 1838, the digital assistant instantiates a network configuration process and displays an associated network configuration user interface. The user can thus use the network configuration user interface to further manage the network configurations.

Figure 18D:
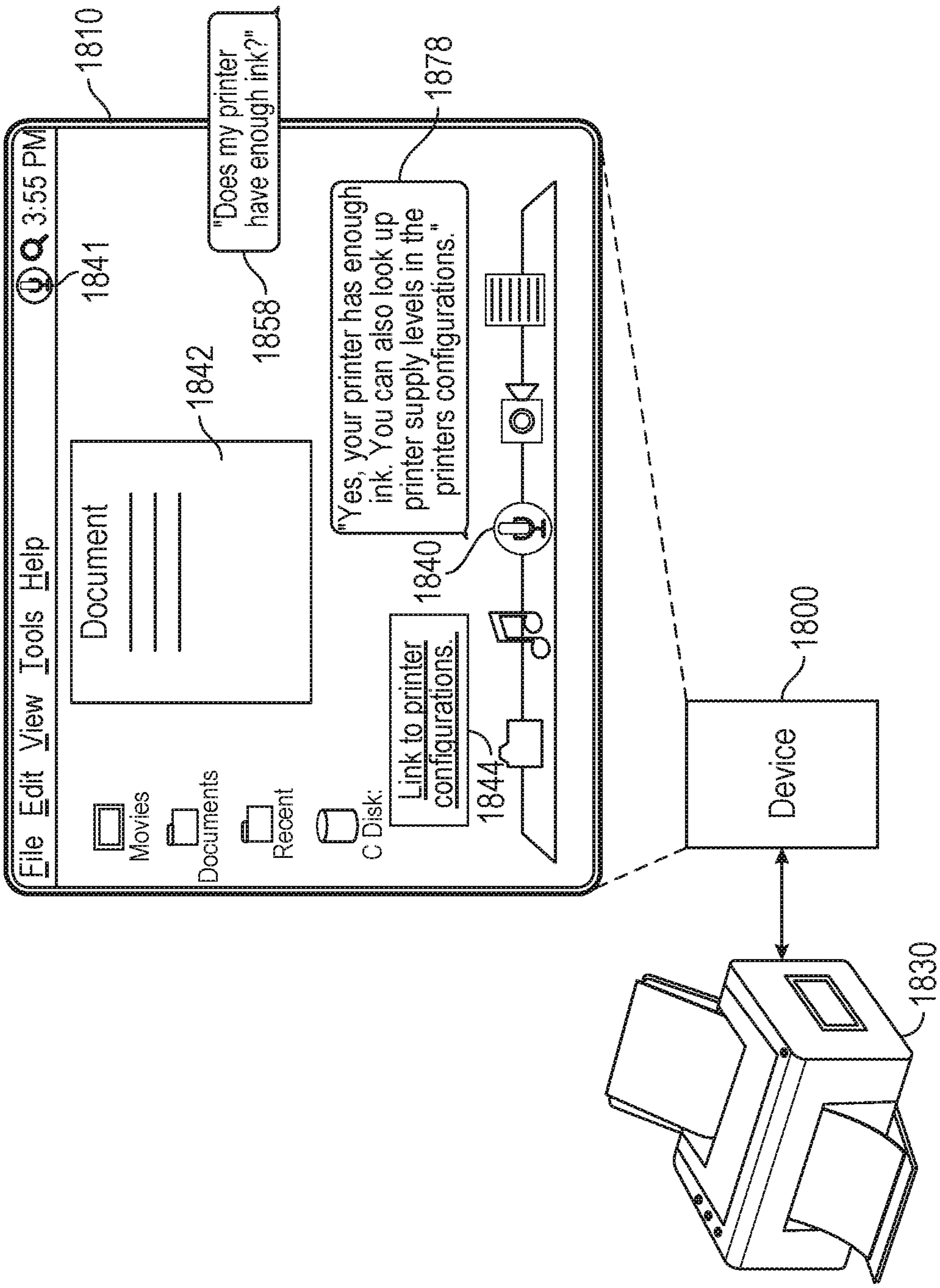

With reference to FIG. 18D, in some examples, the user device displays a user interface 1842 associated with performing a task. For example, the task includes viewing and/or editing a document. The user may desire to print out the document and may want to know whether a printer 1830 has enough ink for the printing job. In some examples, the user provides a speech input 1858 such as "Does my printer have enough ink?" The digital assistant determines that the user intent is to obtain printer ink level status of the printer. The digital assistant further determines that the obtaining the printer level status does not vary any system configuration and therefore is an informational request.

In some embodiments, in accordance with a determination that the user intent indicates an informational request, the digital assistant obtains status of system configurations according to the informational request, and provides the spoken response according to the status of the system configurations. As shown in FIG. 18D, the digital assistant obtains the printer ink level status from the printing configuration of the user device. The printer ink level status indicates, for example, the printer ink level of printer 1830 is at 50%. Based on the connection status, the digital assistant provides a spoken output 1878 such as "Yes, your printer has enough ink. You can also look up printer supply levels in the printer configurations." In some examples, the digital assistant further provides a link associated with the informational request. As illustrated in FIG. 18D, the digital assistant provides a link 1844, enabling the user to further manage the printer configurations. In some examples, the user uses an input device (e.g., a mouse) to select link 1844. Upon receiving the user's selection of the link, the digital assistant instantiates a printer configuration process and displays an associated printer configuration user interface. The user can thus use the printer configuration user interface to further manage the printer configurations.

Figure 18E:
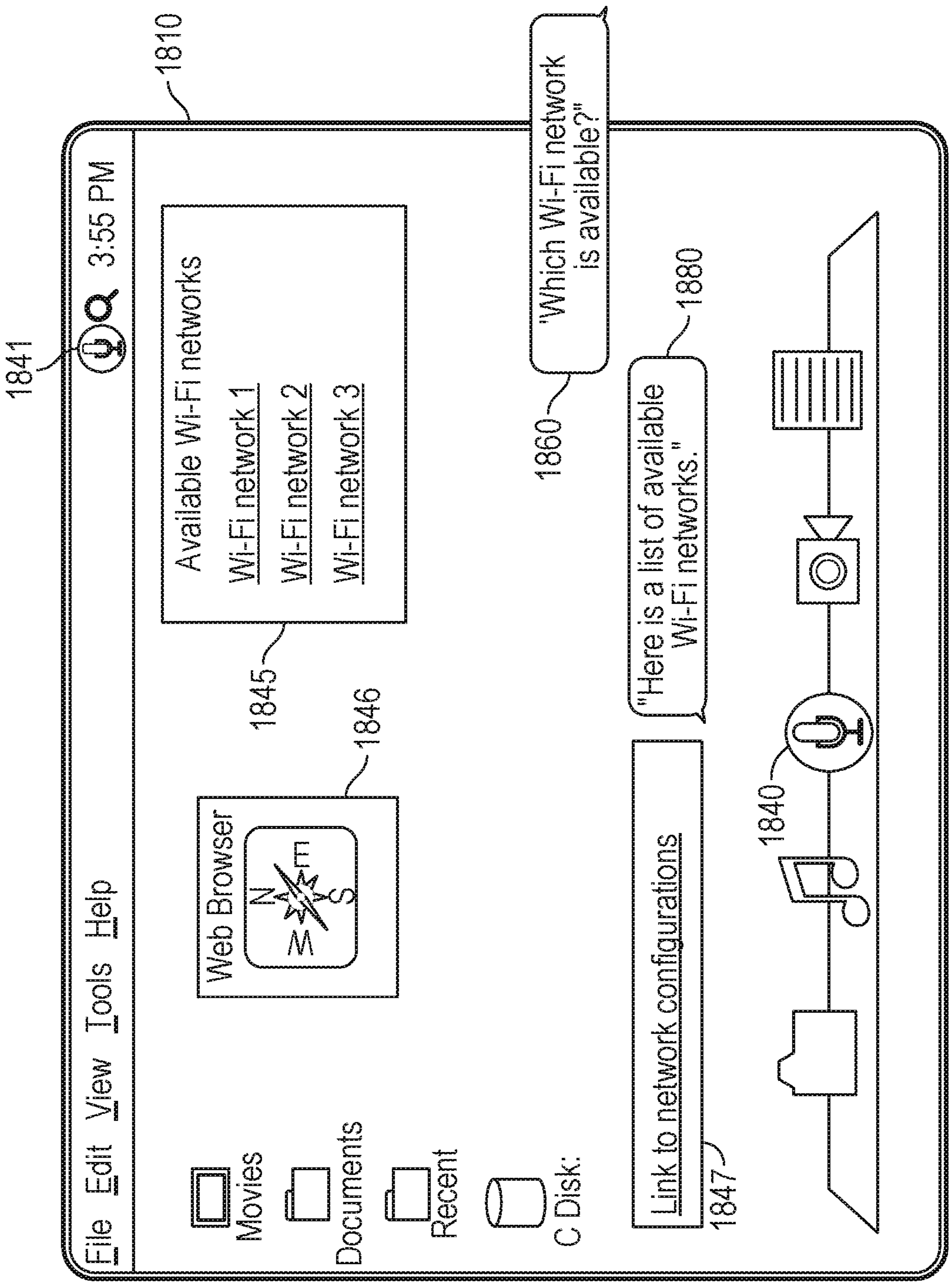

With reference to FIG. 18E, in some examples, the user device displays a user interface 1846 associated with performing a task. For example, the task includes browsing Internet using a web browser (e.g., Safari). To browse the Internet, the user may desire to know available Wi-Fi networks and select one Wi-Fi network to connect. In some examples, the user provides a speech input 1860 such as "Which Wi-Fi networks are available?" The digital assistant determines that the user intent is to obtain a list of available Wi-Fi networks. The digital assistant further determines that obtaining the list of available Wi-Fi networks does not vary any system configuration and therefore is an informational request.

In some embodiments, in accordance with a determination that the user intent indicates an informational request, the digital assistant obtains status of system configurations according to the informational request, and provides the spoken response according to the status of the system configurations. As shown in FIG. 18E, the digital assistant obtains status of currently available Wi-Fi networks from the network configuration of the user device. The status of currently available Wi-Fi networks indicates, for example, Wi-Fi network 1, Wi-Fi network 2, and Wi-Fi network 3 are available. In some examples, the status further indicates the signal strength of each of the Wi-Fi networks. The digital assistant displays a user interface 1845 providing information according to the status. For example, user interface 1845 provides the list of available Wi-Fi networks. The digital assistant also provides a spoken output 1880 such as "Here is a list of available Wi-Fi networks." In some examples, the digital assistant further provides a link associated with the informational request. As illustrated in FIG. 18E, the digital assistant provides a link 1847, enabling the user to further manage the network configurations. In some examples, the user uses an input device (e.g., a mouse) to select link 1847. Upon receiving the user's selection of the link 1847, the digital assistant instantiates a network configuration process and displays an associated network configuration user interface. The user can thus use the network configuration user interface to further manage the configurations.

Figure 18F:
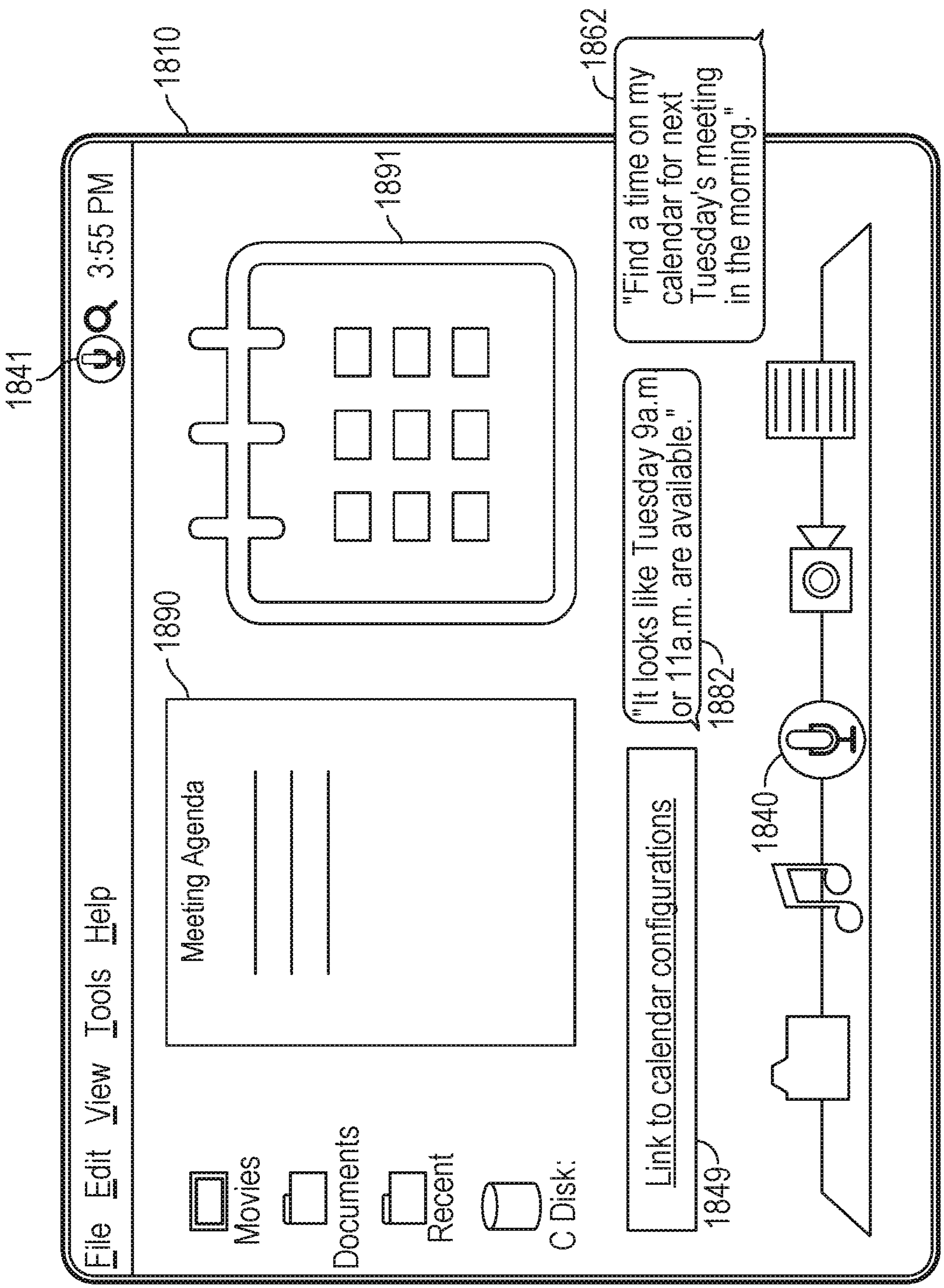

With reference to FIG. 18F, in some examples, the user device displays a user interface 1890 associated with performing a task. For example, the task includes preparing a meeting agenda. In preparing a meeting agenda, the user may desire to find a date and time for the meeting. In some examples, the user provides a speech input 1862 such as "Find a time on my calendar for next Tuesday's meeting in the morning." The digital assistant determines that the user intent is to find an available time slot on the user's calendar on Tuesday morning. The digital assistant further determines that finding a time slot does not vary any system configuration and therefore is an informational request.

In some embodiments, in accordance with a determination that the user intent indicates an informational request, the digital assistant obtains status of system configurations according to the informational request, and provides the spoken response according to the status of the system configurations. As shown in FIG. 18F, the digital assistant obtains status of user's calendar from calendar configurations. The status of user's calendar indicates, for example, 9 a.m. or 11 a.m. on Tuesday is still available. The digital assistant displays a user interface 1891 providing information according to the status. For example, user interface 1891 provides the user's calendar in the proximity of the date and time the user requested. In some examples, the digital assistant also provides a spoken output 1882 such as "It looks like Tuesday 9 a.m. or 11 a.m is available." In some examples, the digital assistant further provides a link associated with the informational request. As illustrated in FIG. 18F, the digital assistant provides a link 1849, enabling the user to further manage the calendar configurations. In some examples, the user uses an input device (e.g., a mouse) to select link 1849. Upon receiving the user's selection of link 1849, the digital assistant instantiates a calendar configuration process and displays an associated calendar configuration user interface. The user can thus use the calendar configuration user interface to further manage the configurations.

Figure 19A:
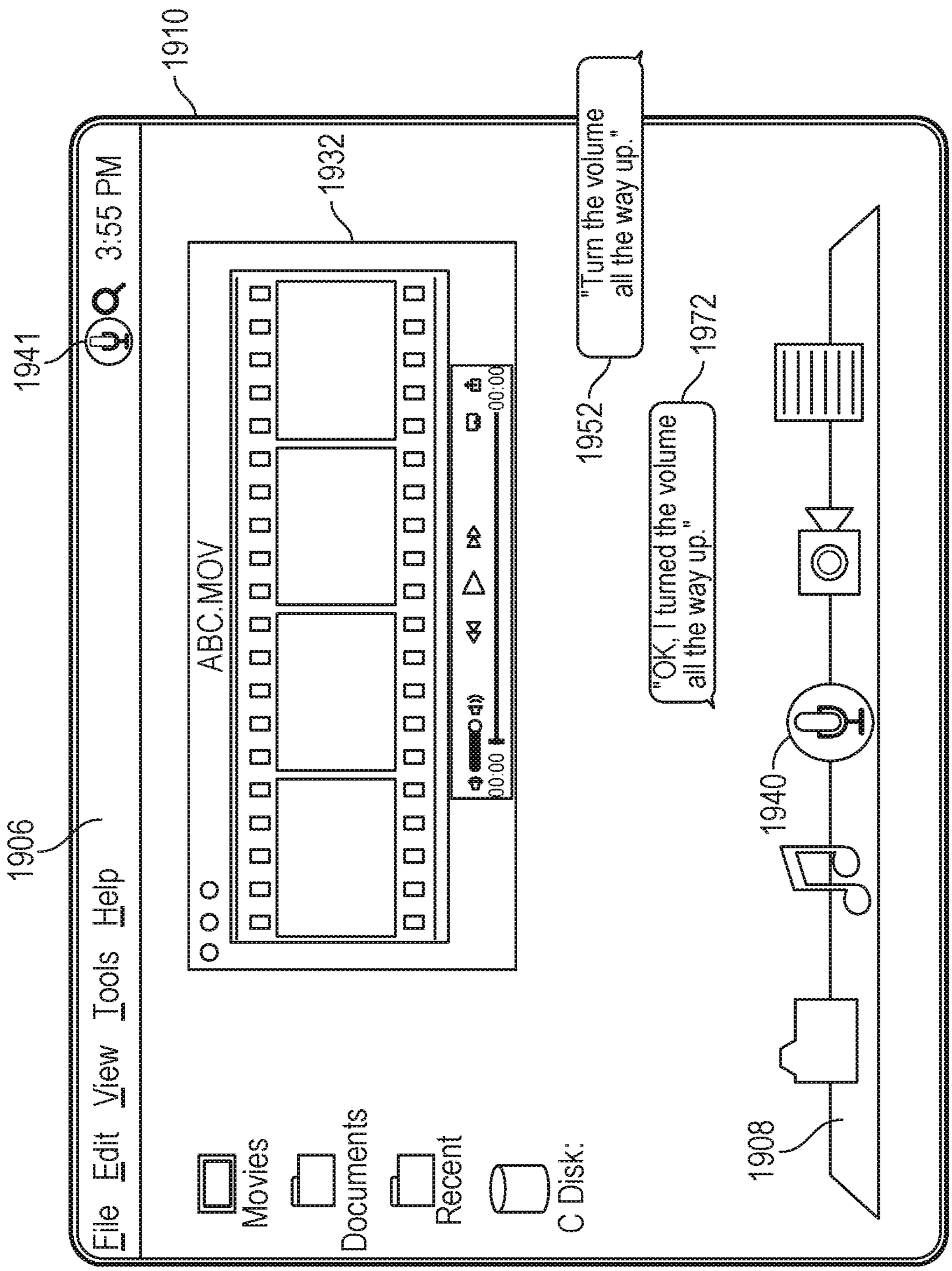
FIGS. 19A-19D illustrate functionalities of performing a task in response to a user request by a digital assistant according to various examples.

With reference to FIG. 19A, the user device displays a user interface 1932 associated with performing a task. For example, the task includes playing a video (e.g., ABC.mov). While the video is playing, the user may desire to turn up the volume. In some examples, the user provides a speech input 1952 such as "Turn the volume all the way up." The digital assistant determines that the user intent is to increase the volume to its maximum level. The digital assistant further determines whether the user intent indicates an informational request or a request for performing a task. For example, based on the determination that the user intent is to increase the volume of the user device, the digital assistant determines that an audio configuration is to be varied, and therefore the user intent indicates a request for performing a task.

In some embodiments, in accordance with a determination that the user intent indicates a request for performing a task, the digital assistant instantiates a process associated with the user device to perform the task. Instantiating a process includes invoking the process if the process is not already running. If at least one instance of the process is running, instantiating a process includes executing an existing instance of the process or generating a new instance of the process. For example, instantiating an audio configuration process includes invoking the audio configuration process, using an existing audio configuration process, or generating a new instance of the audio configuration process. In some examples, instantiating a process includes performing the task using the process. For example, as illustrated in FIG. 19A, in accordance with the user intent to increase the volume to its maximum level, the digital assistant instantiates an audio configuration process to set the volume to its maximum level. In some examples, the digital assistant further provides a spoken output 1972 such as "OK, I turned the volume all the way up."

Figure 19B:
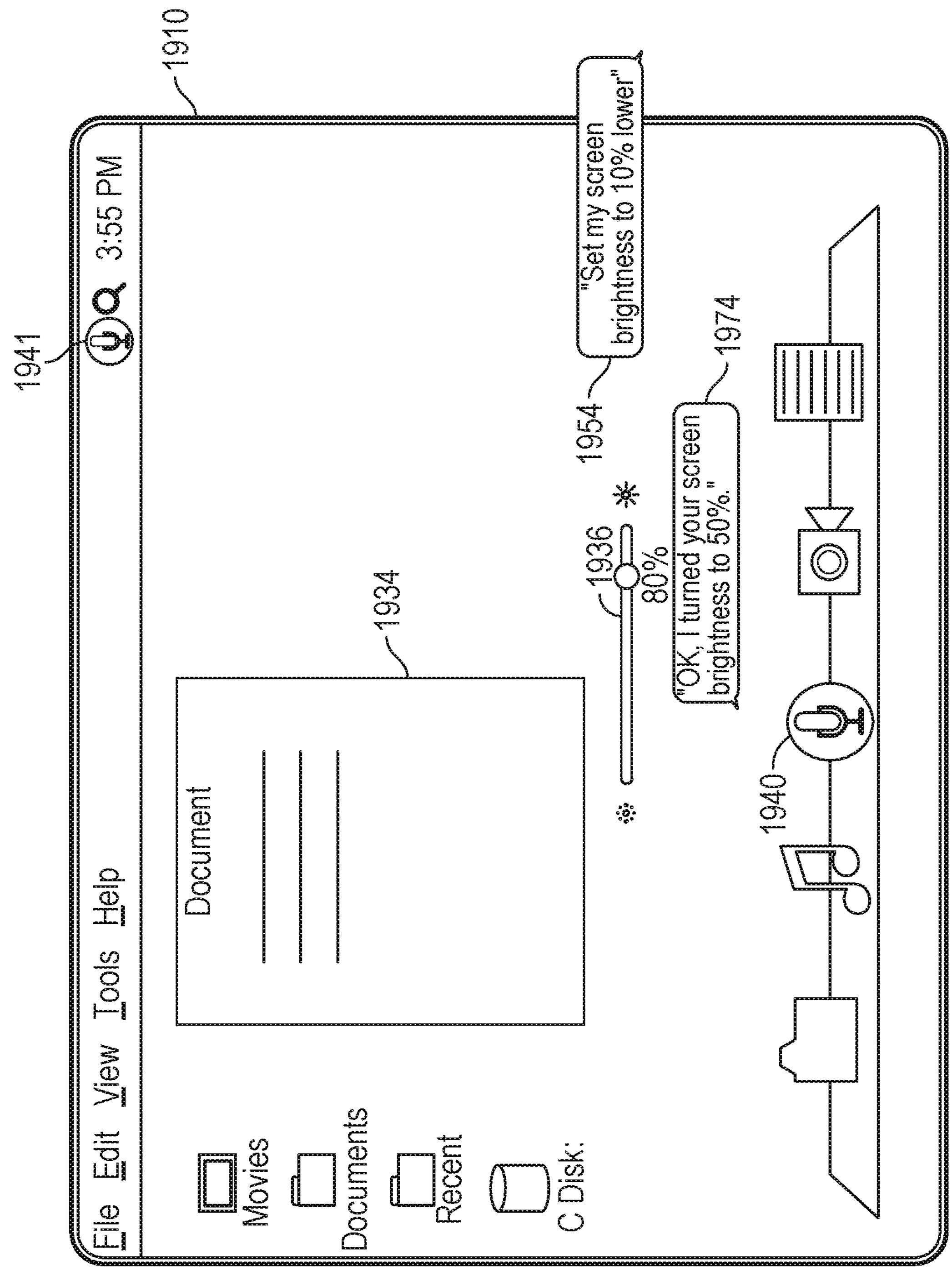

With reference to FIG. 19B, the user device displays a user interface 1934 associated with performing a task. For example, the task includes viewing or editing a document. The user may desire to lower the screen brightness for eye protection. In some examples, the user provides a speech input 1954 such as "Set my screen brightness to 10% lower." The digital assistant determines the user intent based on speech input 1954 and context information. For example, context information indicates that the current brightness configuration is at 90%. As a result, the digital assistant determines that the user intent is to reduce the brightness level from 90% to 80%. The digital assistant further determines whether the user intent indicates an informational request or a request for performing a task. For example, based on the determination that the user intent is to change the screen brightness to 80%, the digital assistant determines that a display configuration is to be varied, and therefore the user intent indicates a request for performing a task.

In some embodiments, in accordance with a determination that the user intent indicates a request for performing a task, the digital assistant instantiates a process to perform the task. For example, as illustrated in FIG. 19B, in accordance with the user intent to change the brightness level, the digital assistant instantiates a display configuration process to reduce the brightness level to 80%. In some examples, the digital assistant further provides a spoken output 1974 such as "OK, I turned your screen brightness to 80%." In some examples, as illustrated in FIG. 19B, the digital assistant provides an affordance 1936 enabling the user to manipulate a result of performing the task. For example, affordance 1936 can be a sliding bar allowing the user to further change the brightness level.

Figure 19C:
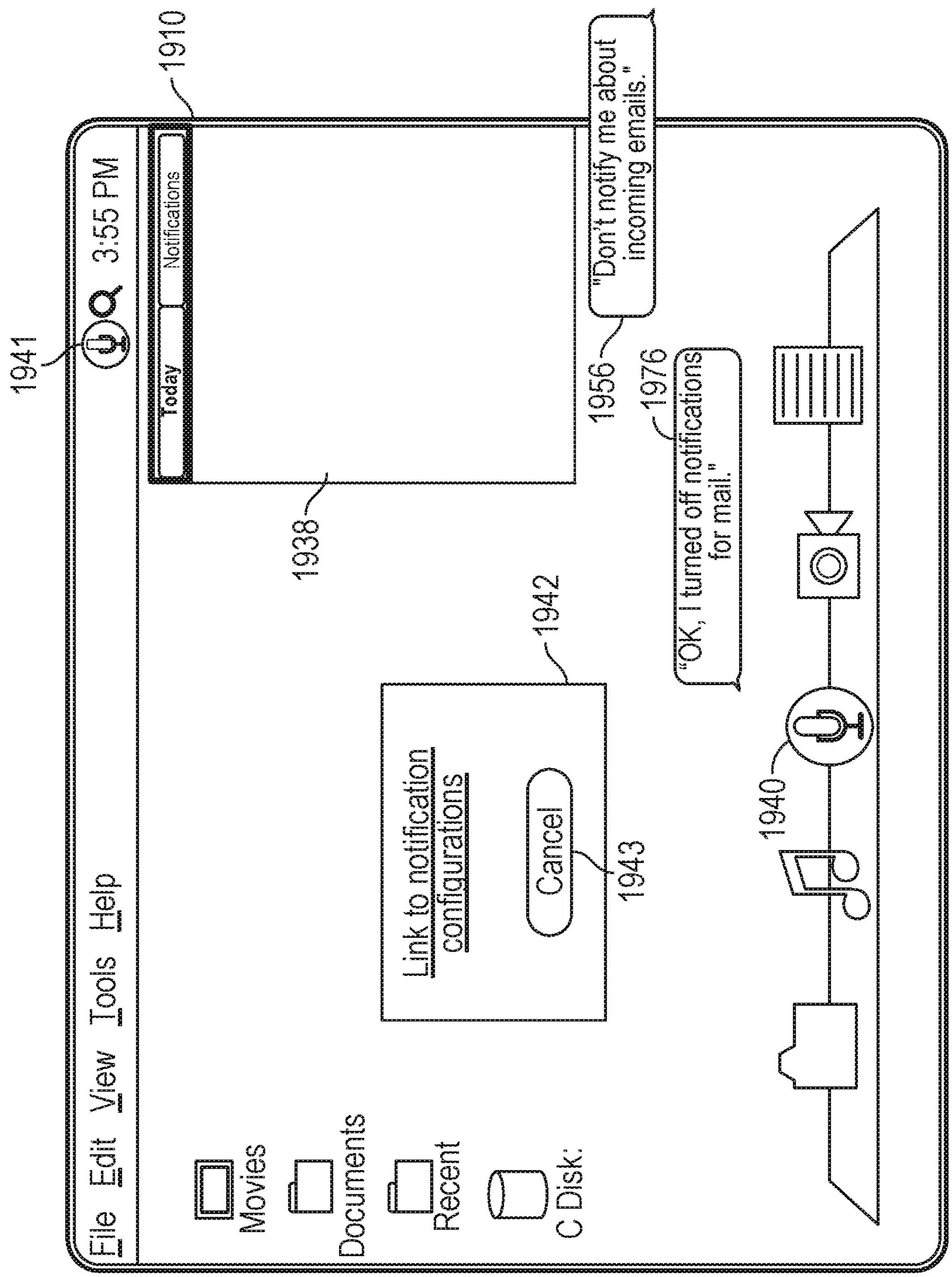

With reference to FIG. 19C, the user device displays a user interface 1938 associated with performing a task. For example, the task includes providing one or more notifications. A notification can include an alert of an email, a message, a reminder, or the like. In some examples, notifications are provided in user interface 1938. A notification can be displayed or provided to the user in real time or shortly after it is available at the user device. For example, a notification appears on user interface 1938 and/or user interface 1910 shorted after the user device receives it. Sometimes, the user may be performing an important task (e.g., editing a document) and may not want to be disturbed by the notifications. In some examples, the user provides a speech input 1956 such as "Don't notify me about incoming emails." The digital assistant determines that the user intent is to turn off the alert of emails. Based on the determination that the user intent is to turn off the alert of incoming emails, the digital assistant determines that a notification configuration is to be varied, and therefore the user intent indicates a request for performing a task.

In some embodiments, in accordance with a determination that the user intent indicates a request for performing a task, the digital assistant instantiates a process to perform the task. For example, as illustrated in FIG. 19C, in accordance with the user intent, the digital assistant instantiates a notification configuration process to turn off the alert of emails. In some examples, the digital assistant further provides a spoken output 1976 such as "OK, I turned off notifications for mail." In some examples, as illustrated in FIG. 19C, the digital assistant provides a user interface 1942 (e.g., a snippet or a window) enabling the user to manipulate a result of performing the task. For example, user interface 1942 provides an affordance 1943 (e.g., a cancel button). If the user desires to continue receiving notification of emails, for example, the user can select affordance 1943 to turn the notifications of emails back on. In some examples, the user can also provide another speech input, such as "Notify me of incoming emails" to turn on the notification of emails.

Figure 19D:
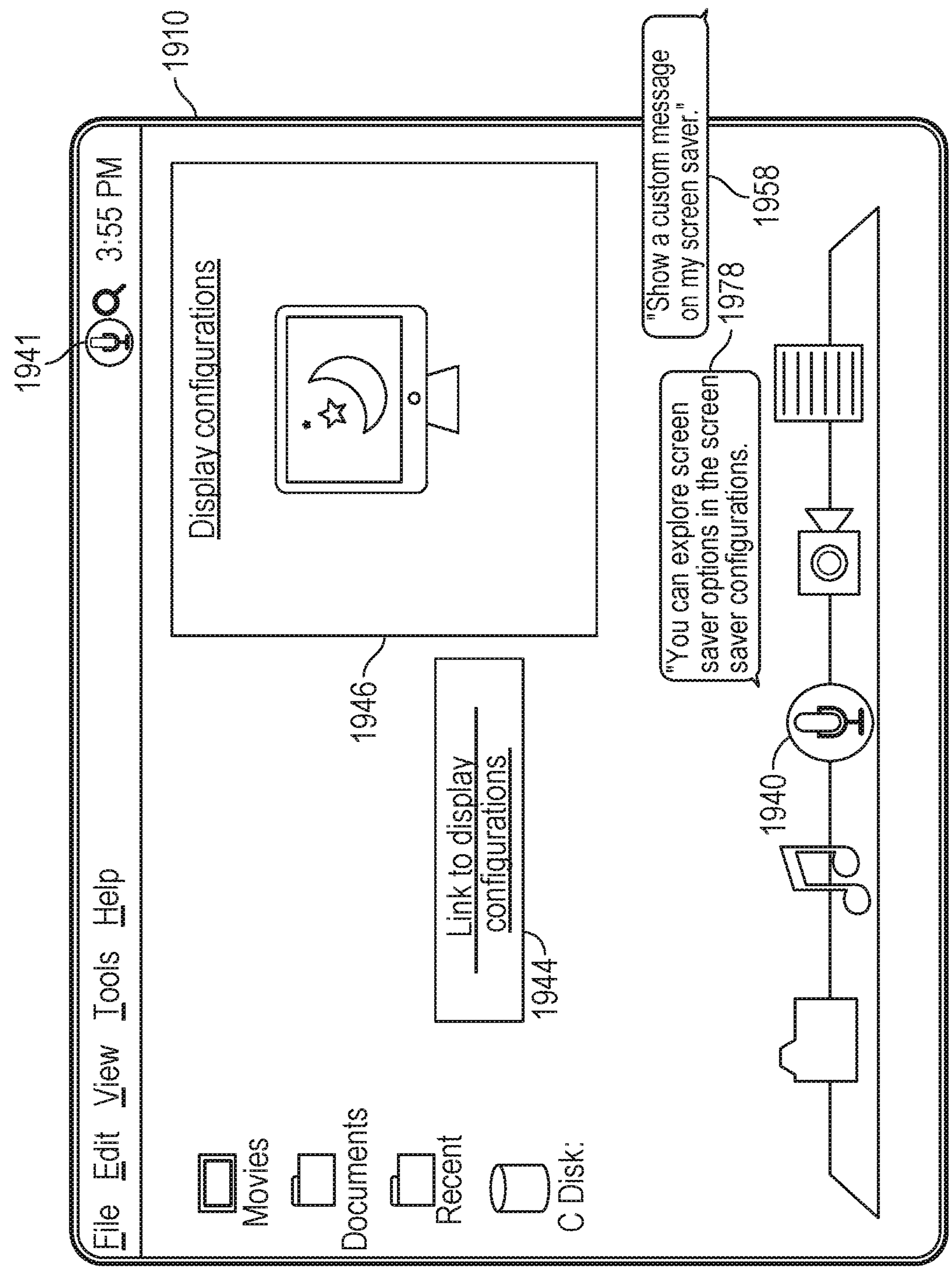

With reference to FIG. 19D, in some embodiments, the digital assistant may not be able to complete a task based on user's speech input and can thus provide a user interface to enable the user to perform the task. As shown in FIG. 19D, in some examples, the user provides a speech input 1958 such as "Show a custom message on my screen saver." The digital assistant determines that the user intent is to change the screen saver settings to show a custom message. The digital assistant further determines that the user intent is to vary a display configuration, and therefore the user intent indicates a request for performing a task.

In some embodiments, in accordance with a determination that the user intent indicates a request for performing a task, the digital assistant instantiates a process associated with the user device to perform the task. In some examples, if the digital assistant cannot complete the task based on the user intent, it provides a user interface enabling the user to perform the task. For example, based on speech input 1958, the digital assistant may not be able to determine the content of the custom message that is to be shown on the screen saver and therefore cannot complete the task of displaying the custom message. As illustrated in FIG. 19D, in some examples, the digital assistant instantiates a display configuration process and provides a user interface 1946 (e.g., a snippet or a window) to enable the user to manually change the screen saver settings. As another example, the digital assistant provides a link 1944 (e.g., a link to the display configurations) enabling the user to perform the task. The user selects link 1944 by using an input device such as a mouse, a finger, or a stylus. Upon receiving the user's selection, the digital assistant instantiates a display configuration process and displays user interface 1946 to enable the user to change the screen saver settings. In some examples, the digital assistant further provides a spoken output 1978 such as "You can explore screen saver options in the screen saver configurations."

7. Process for Operating a Digital Assistant—Intelligent Search and Object Management.

FIGS. 20A-20G illustrate a flow diagram of an exemplary process 2000 for operating a digital assistant in accordance with some embodiments. Process 2000 may be performed using one or more devices 104, 108, 200, 400, or 600 (FIG. 1, 2A, 4, or 6A-B). Operations in process 2000 are, optionally, combined or split, and/or the order of some operations is, optionally, changed.

Figure 20A:
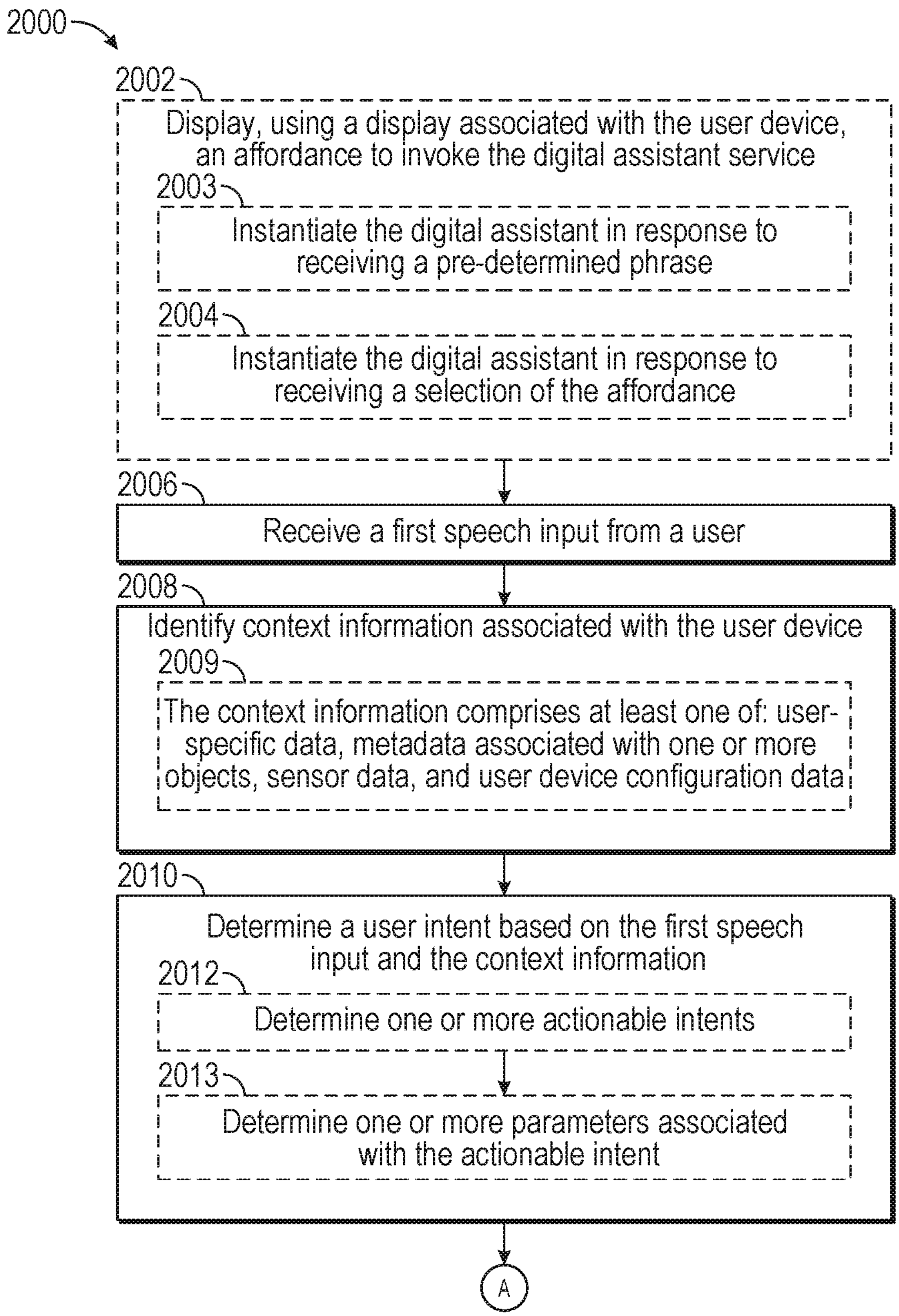
FIGS. 20A-20G illustrate a flow diagram of an exemplary process for operating a digital assistant according to various examples.

With reference to FIG. 20A, at block 2002, prior to receiving a first speech input, an affordance to invoke a digital assistant service is displayed on a display associated with a user device. At block 2003, the digital assistant is invoked in response to receiving a pre-determined phrase. At block 2004, the digital assistant is invoked in response to receiving a selection of the affordance.

At block 2006, a first speech input is received from a user. At block 2008, context information associated with the user device is identified. At block 2009, the context information includes at least one of: user-specific data, metadata associated with one or more objects, sensor data, and user device configuration data.

At block 2010, a user intent is determined based on the first speech input and the context information. At block 2012, to determine the user intent, one or more actionable intents are determined. At block 2013, one or more parameters associated with the actionable intent are determined.

Figure 20B:
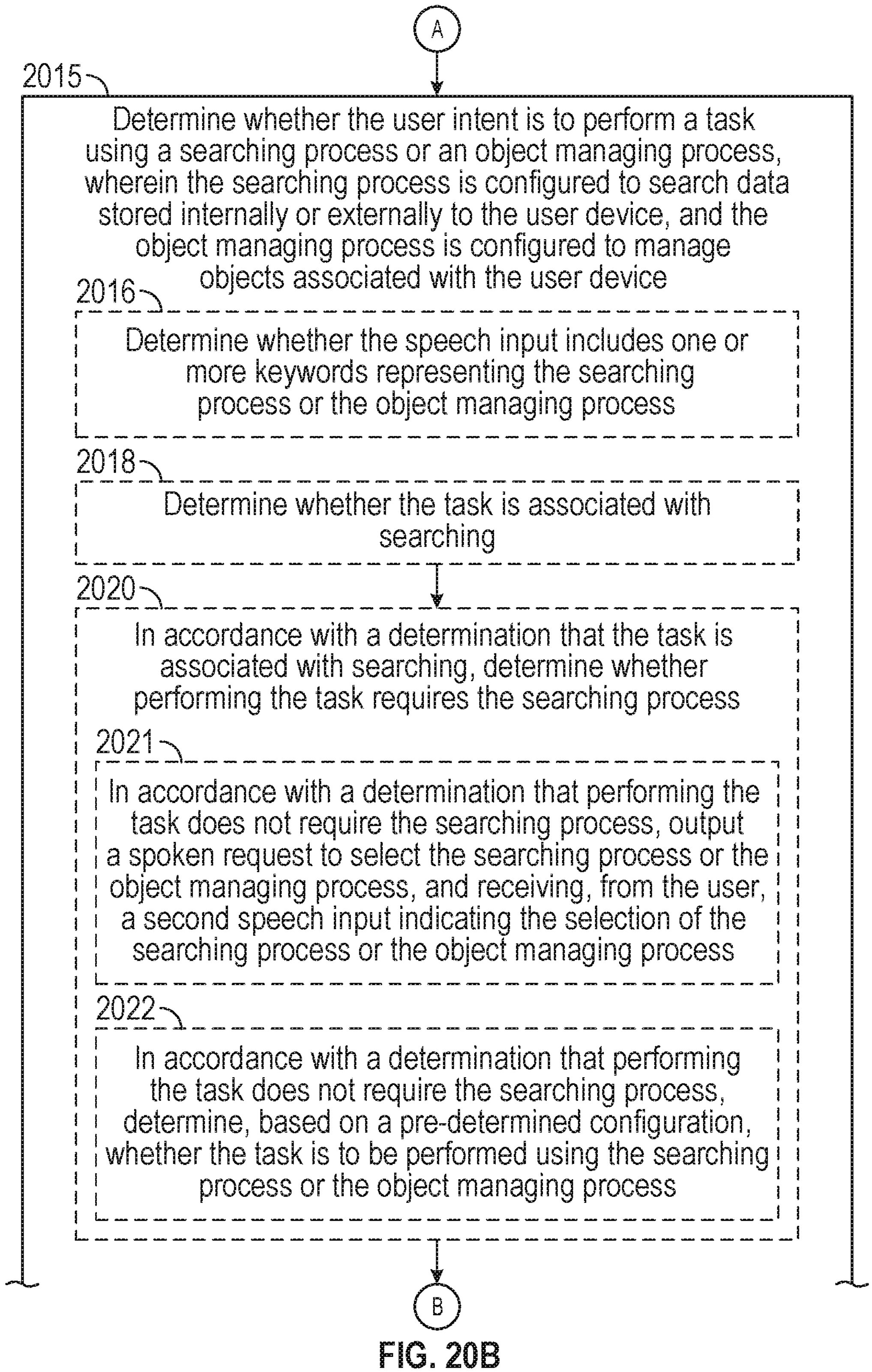

With reference to FIG. 20B, at block 2015, it is determined whether the user intent is to perform a task using a searching process or an object managing process. The searching process is configured to search data stored internally or externally to the user device, and the object managing process is configured to manage objects associated with the user device. At block 2016, it is determined whether the speech input includes one or more keywords representing the searching process or the object managing process. At block 2018, it is determined whether the task is associated with searching. At block 2020, in accordance with a determination that the task is associated with searching, it is determined whether performing the task requires the searching process. At block 2021, in accordance with a determination that performing the task does not require the searching process, a spoken request to select the searching process or the object managing process is outputted, and a second speech input is received from the user. The second speech input indicates the selection of the searching process or the object managing process.

At block 2022, in accordance with a determination that performing the task does not require the searching process, it is determined, based on a pre-determined configuration, whether the task is to be performed using the searching process or the object managing process.

Figure 20C:
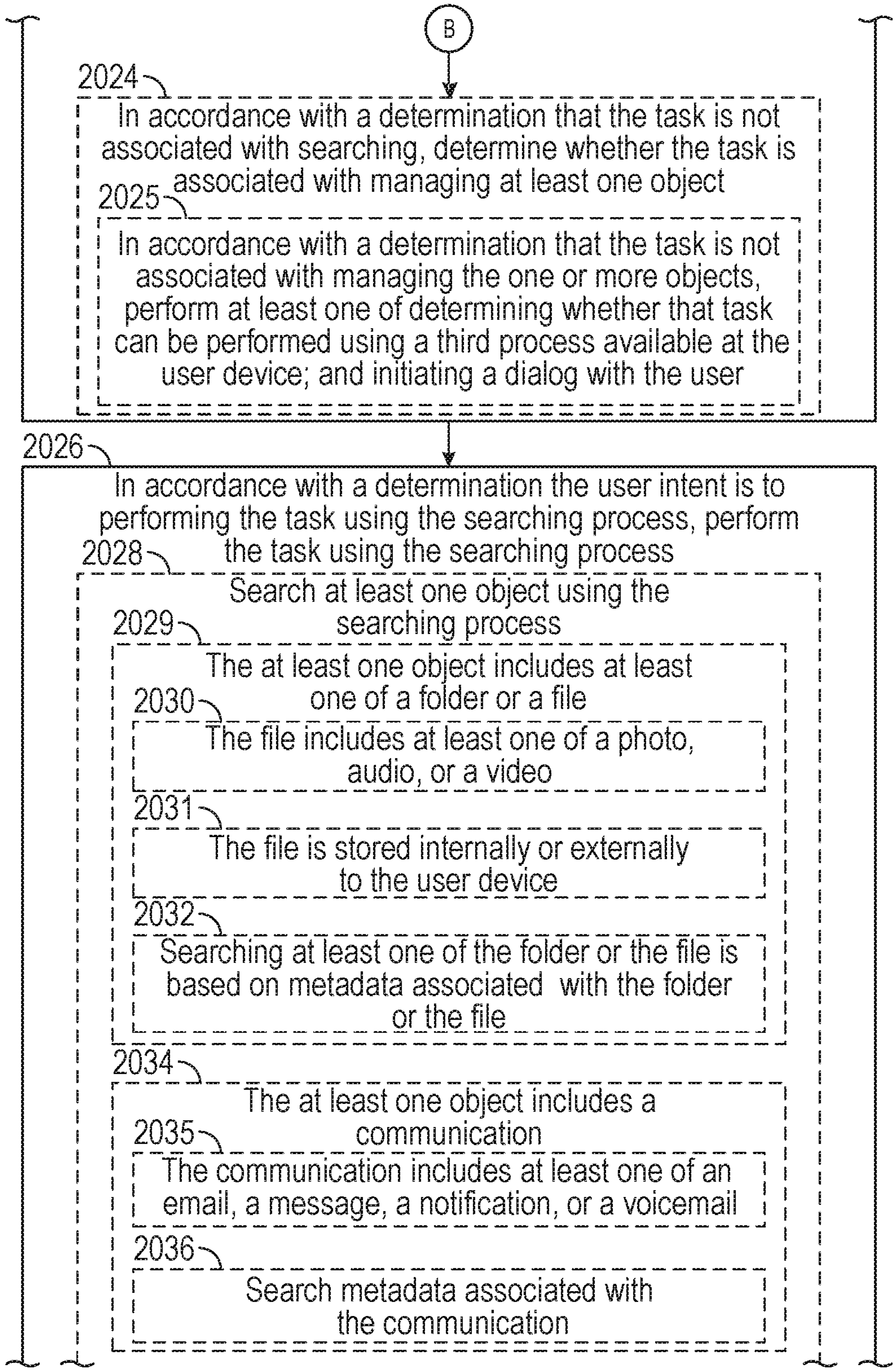

With reference to FIG. 20C, at block 2024, in accordance with a determination that the task is not associated with searching, it is determined whether the task is associated with managing at least one object. At block 2025, in accordance with a determination that the task is not associated with managing the at least one object, at least one of the following is performed: determining whether that task can be performed using a fourth process available to the user device and initiating a dialog with the user.

At block 2026, in accordance with a determination the user intent is to perform the task using the searching process, the task is performed using the searching process. At block 2028, at least one object is searched using the searching process. At block 2029, the at least one object includes at least one of a folder or a file. At block 2030, the file includes at least one of a photo, audio, or a video. At block 2031, the file is stored internally or externally to the user device. At block 2032, searching at least one of the folder or the file is based on metadata associated with the folder or the file. At block 2034, the at least one object includes a communication. At block 2035, the communication includes at least one of an email, a message, a notification, or a voicemail. At block 2036, metadata associated with the communication is searched.

Figure 20D:
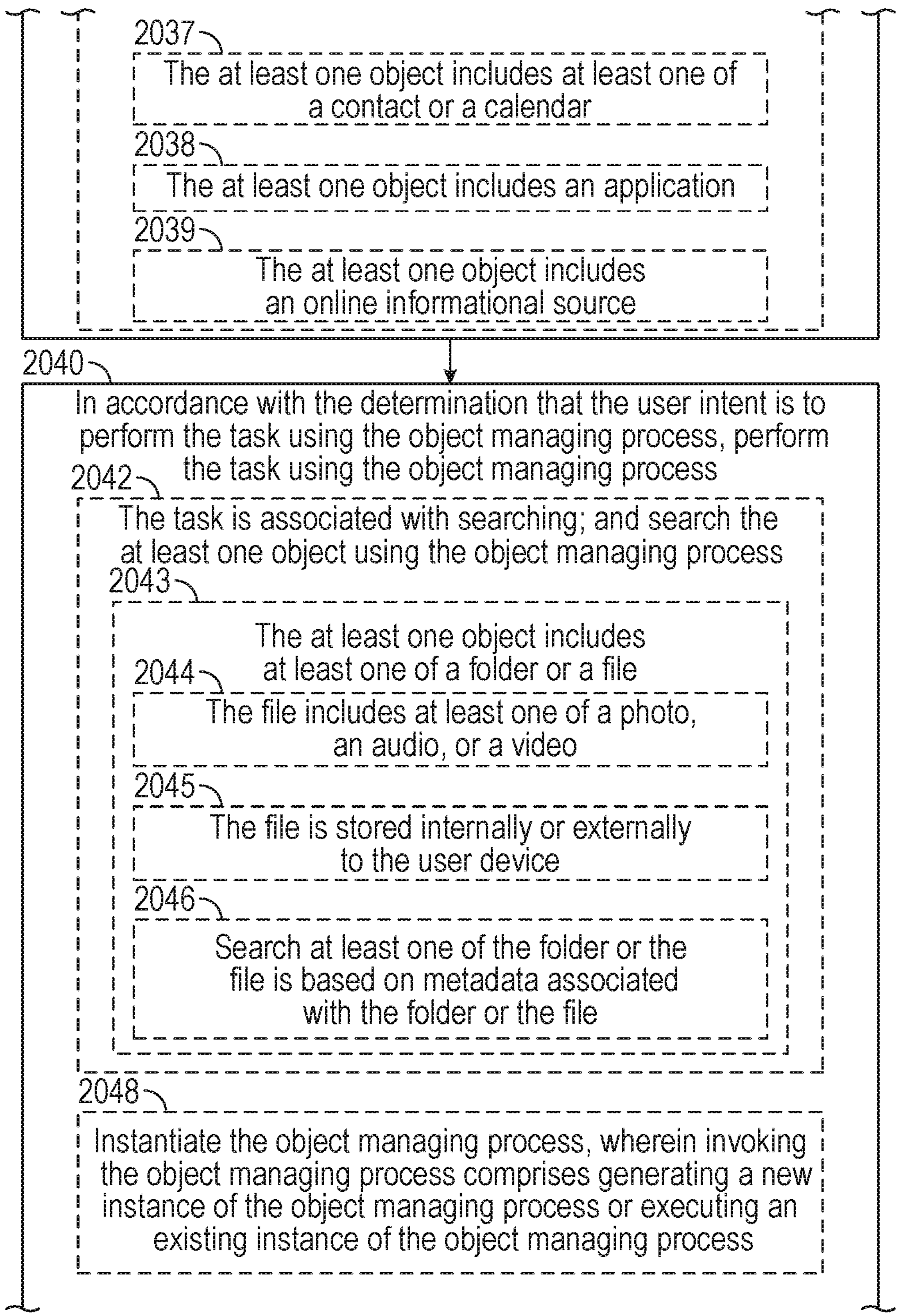

With reference to FIG. 20D, at block 2037, the at least one object includes at least one of a contact or a calendar. At block 2038, the at least one object includes an application. At block 2039, the at least one object includes an online informational source.

At block 2040, in accordance with the determination that the user intent is to perform the task using the object managing process, the task is performed using the object managing process. At block 2042, the task is associated with searching, and the at least one object is searched using the object managing process. At block 2043, the at least one object includes at least one of a folder or a file. At block 2044, the file includes at least one of a photo, an audio, or a video. At block 2045, the file is stored internally or externally to the user device. At block 2046, searching at least one of the folder or the file is based on metadata associated with the folder or the file.

At block 2048, the object managing process is instantiated. Instantiating the object managing process includes invoking the object managing process, generating a new instance of the object managing process, or executing an existing instance of the object managing process.

Figure 20E:
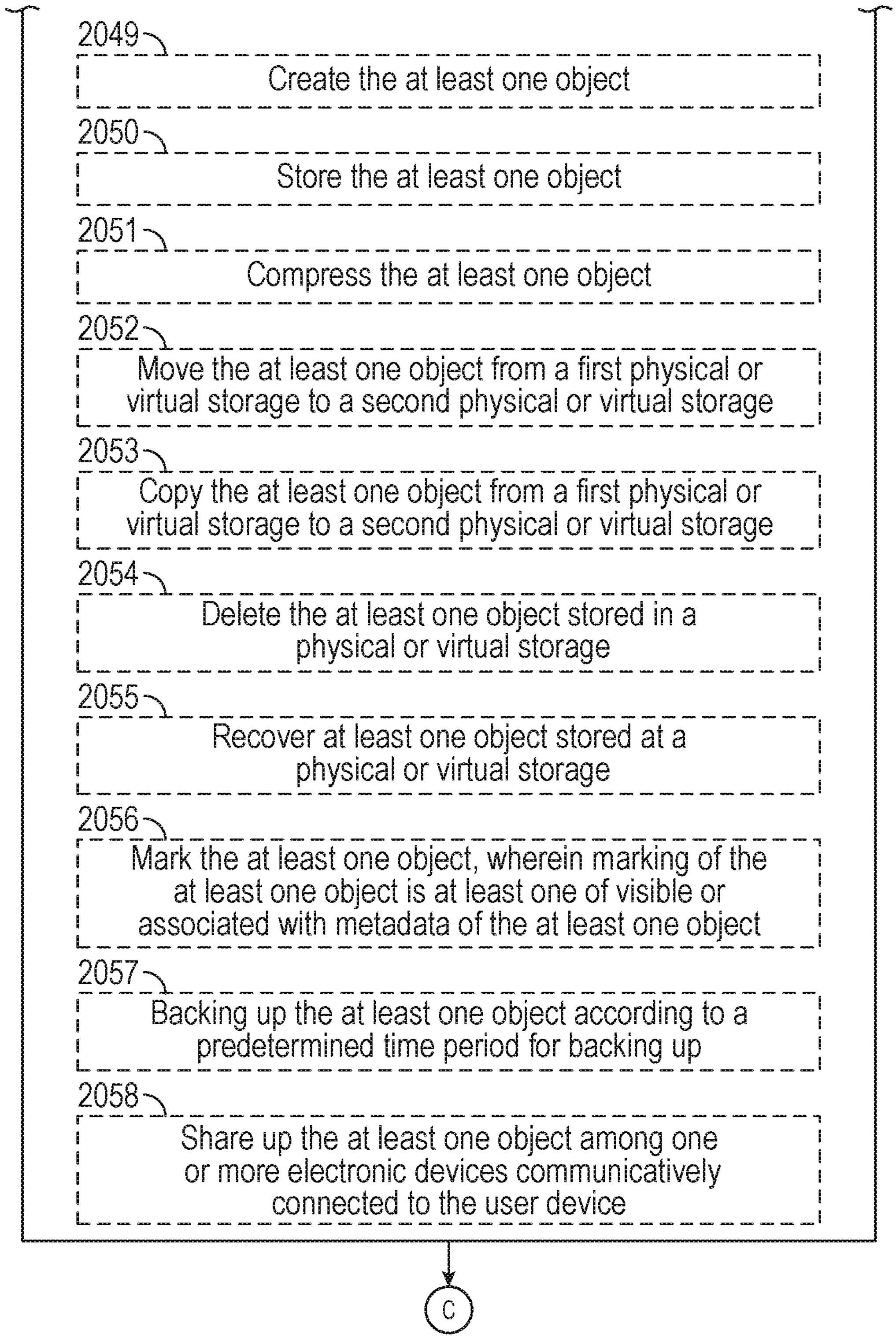

With reference to FIG. 20E, at block 2049, the at least one object is created. At block 2050, the at least one object is stored. At block 2051, the at least one object is compressed. At block 2052, the at least one object is moved from a first physical or virtual storage to a second physical or virtual storage. At block 2053, the at least one object is copied from a first physical or virtual storage to a second physical or virtual storage. At block 2054, the at least one object stored in a physical or virtual storage is deleted. At block 2055, the at least one object stored at a physical or virtual storage is recovered. At block 2056, the at least one object is marked. Marking of the at least one object is at least one of visible or associated with metadata of the at least one object. At block 2057, the at least one object is backup according to a predetermined time period for backing up. At block 2058, the at least one object is shared among one or more electronic devices communicatively connected to the user device.

Figure 20F:
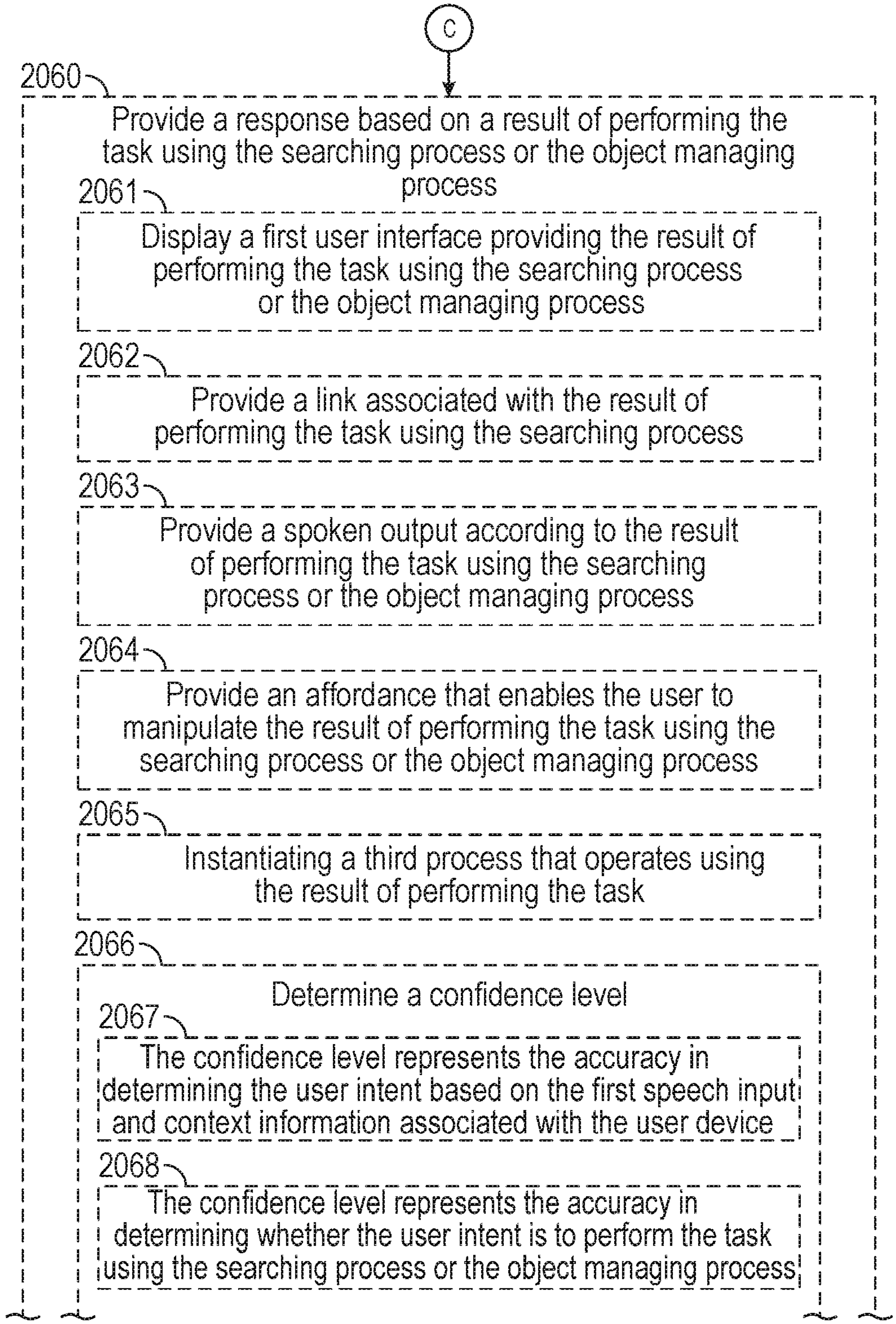

With reference to FIG. 20F, at block 2060, a response is provided based on a result of performing the task using the searching process or the object managing process. At block 2061, a first user interface is displayed providing the result of performing the task using the searching process or the object managing process. At block 2062, a link associated with the result of performing the task using the searching process is displayed. At block 2063, a spoken output is provided according to the result of performing the task using the searching process or the object managing process.

At block 2064, it is provided an affordance that enables the user to manipulate the result of performing the task using the searching process or the object managing process. At block 2065, it is instantiated a third process that operates using the result of performing the task.

With reference to FIG. 20F, at block 2066, a confidence level is determined. At block 2067, the confidence level represents the accuracy in determining the user intent based on the first speech input and context information associated with the user device. At block 2068, the confidence level represents the accuracy in determining whether the user intent is to perform the task using the searching process or the object managing process.

Figure 20G:
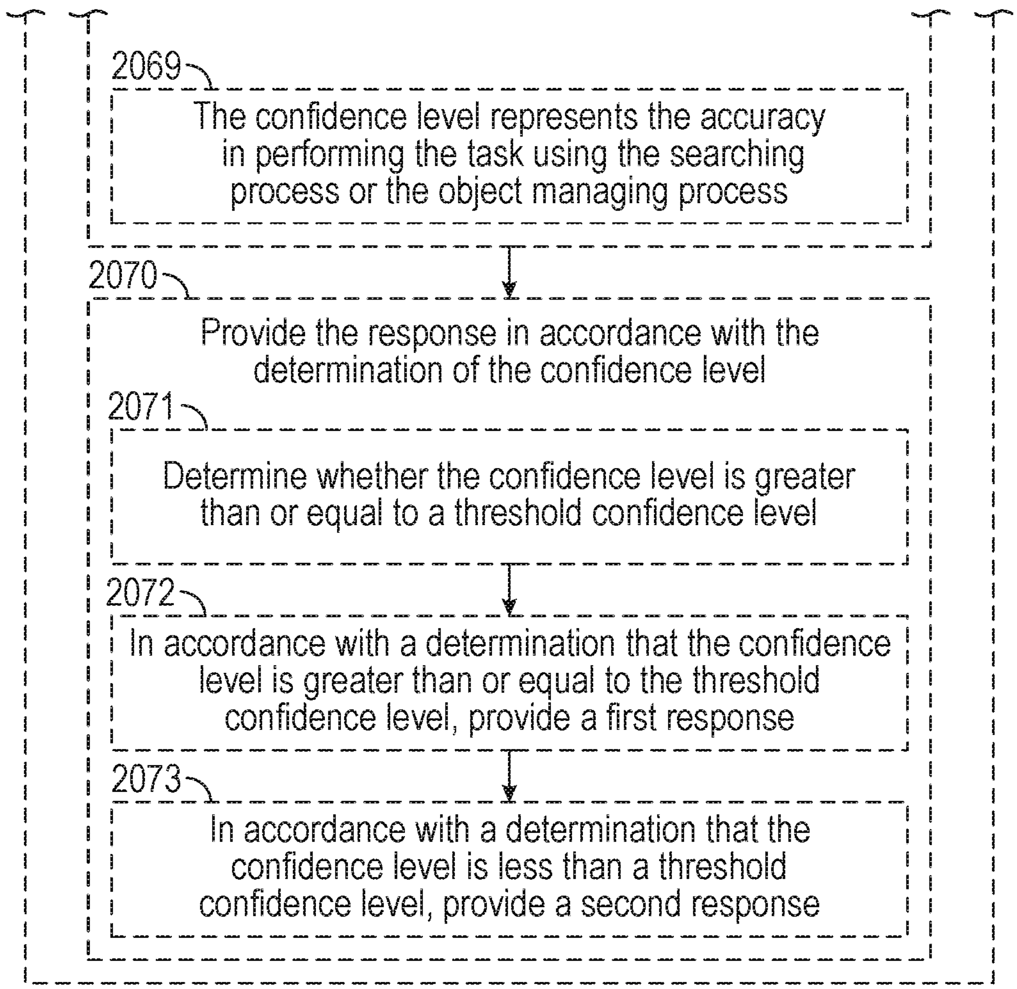

With reference to FIG. 20G, at block 2069, the confidence level represents the accuracy in performing the task using the searching process or the object managing process.

At block 2070, the response is provided in accordance with the determination of the confidence level. At block 2071, it is determined whether the confidence level is greater than or equal to a threshold confidence level. At block 2072, in accordance with a determination that the confidence level is greater than or equal to the threshold confidence level, a first response is provided. At block 2073, in accordance with a determination that the confidence level is less than a threshold confidence level, a second response is provided.

8. Process for Operating a Digital Assistant—Continuity.

FIGS. 21A-21E illustrate a flow diagram of an exemplary process 2100 for operating a digital assistant in accordance with some embodiments. Process 2100 may be performed using one or more devices 104, 108, 200, 400, 600, 1400, 1500, 1600, or 1700 (FIGS. 1, 2A, 4, 6A-6B, 14A-14D, 15A-15D, 16A-16C, and 17A-17E). Operations in process 2100 are, optionally, combined or split and/or the order of some operations is, optionally, changed.

Figure 21A:
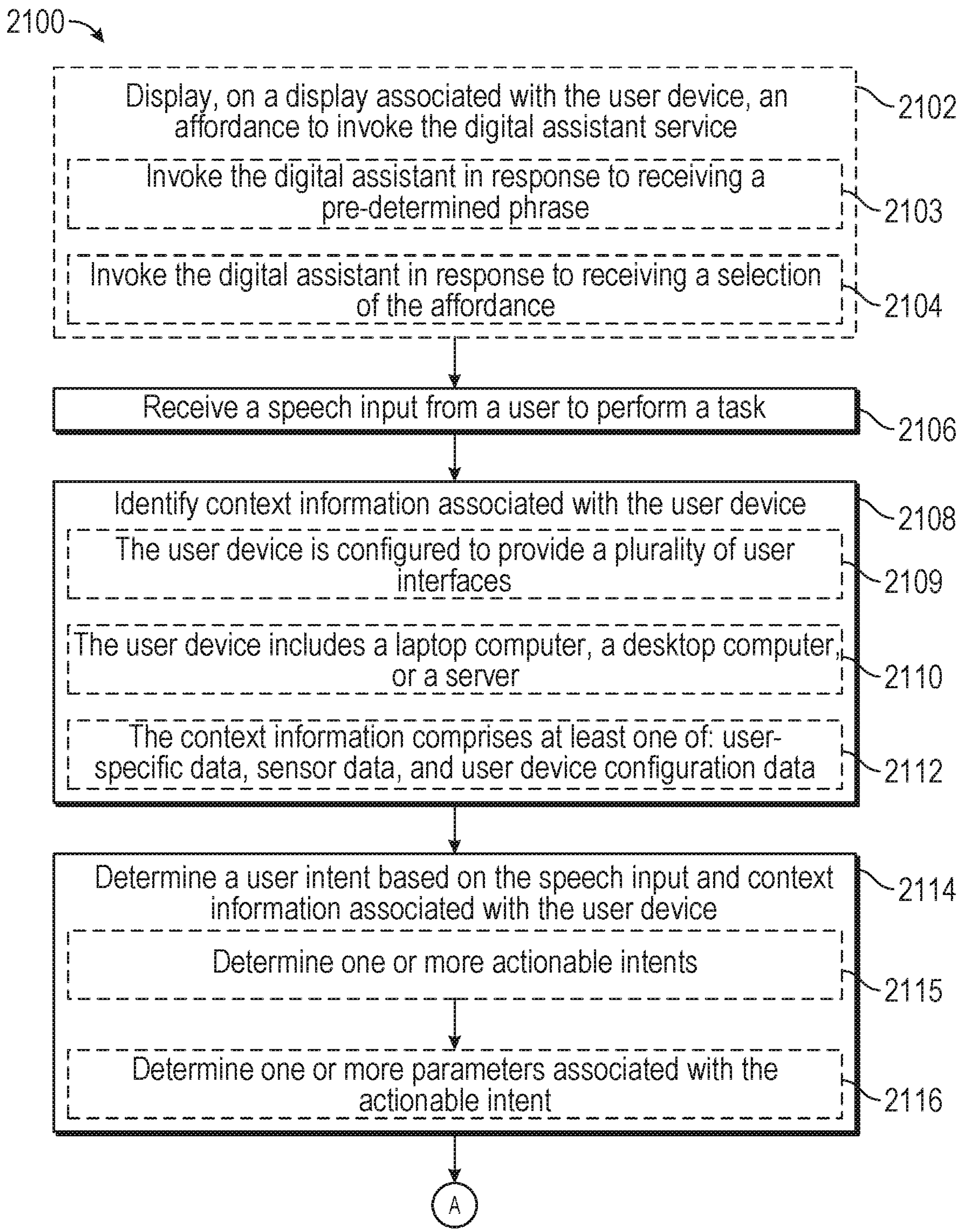
FIGS. 21A-21E illustrate a flow diagram of an exemplary process for operating a digital assistant according to various examples.

With reference to FIG. 21A, at block 2102, prior to receiving a first speech input, an affordance to invoke a digital assistant service is displayed on a display associated with a user device. At block 2103, the digital assistant is invoked in response to receiving a pre-determined phrase. At block 2104, the digital assistant is invoked in response to receiving a selection of the affordance.

At block 2106, a first speech input is received from a user to perform a task. At block 2108, context information associated with the user device is identified. At block 2109, the user device is configured to provide a plurality of user interfaces. At block 2110, the user device includes a laptop computer, a desktop computer, or a server. At block 2112, the context information includes at least one of: user-specific data, metadata associated with one or more objects, sensor data, and user device configuration data.

At block 2114, a user intent is determined based on the speech input and the context information. At block 2115, to determine the user intent, one or more actionable intents are determined. At block 2116, one or more parameters associated with the actionable intent are determined.

Figure 21B:
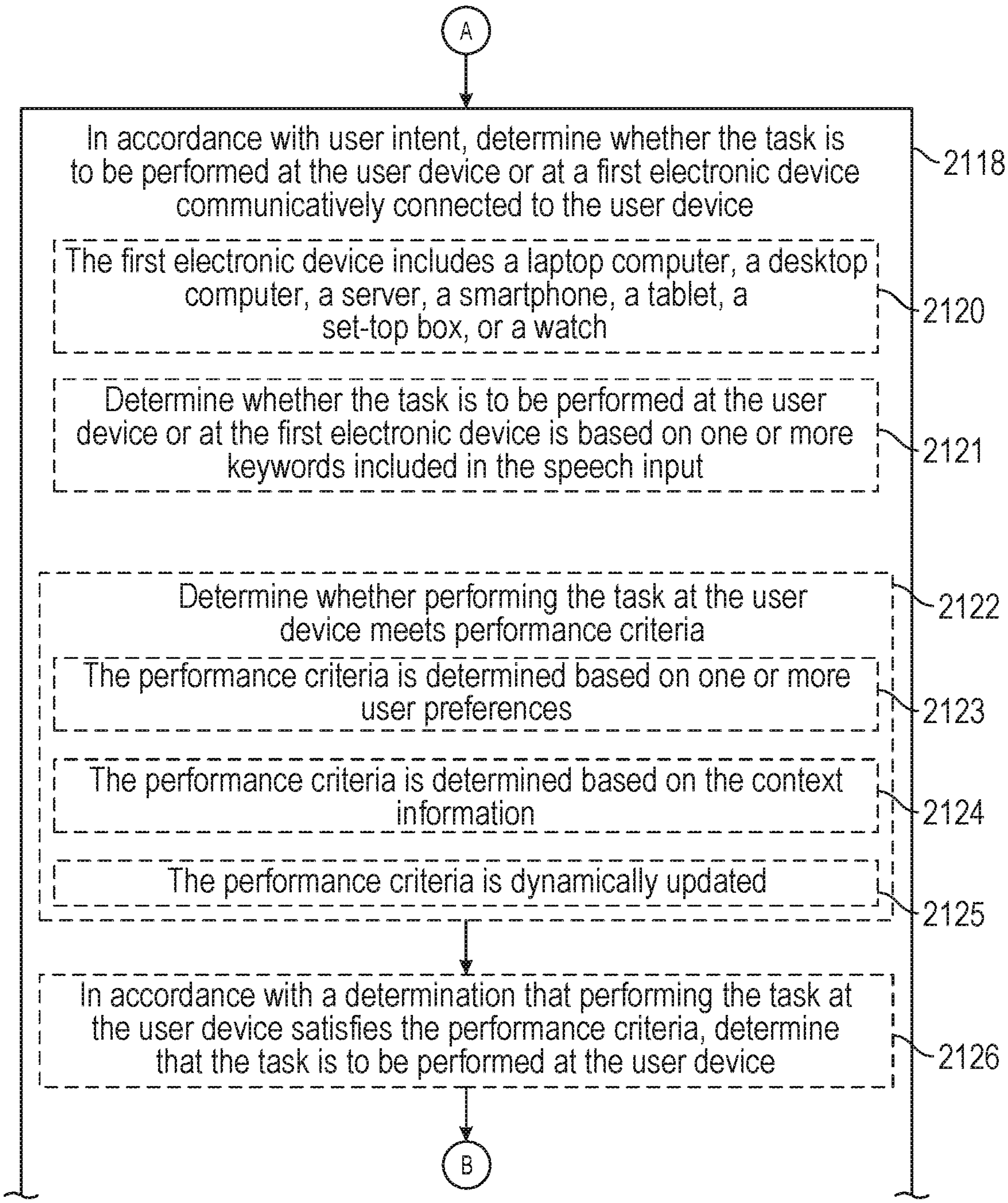

With reference to FIG. 21B, at block 2118, in accordance with user intent, it is determined whether the task is to be performed at the user device or at a first electronic device communicatively connected to the user device. At block 2120, the first electronic device includes a laptop computer, a desktop computer, a server, a smartphone, a tablet, a set-top box, or a watch. At block 2121, determining whether the task is to be performed at the user device or at the first electronic device is based on one or more keywords included in the speech input. At block 2122, it is determined whether performing the task at the user device satisfies performance criteria. At block 2123, the performance criteria are determined based on one or more user preferences. At block 2124, the performance criteria are determined based on the device configuration data. At block 2125, the performance criteria are dynamically updated. At block 2126, in accordance with a determination that performing the task at the user device satisfies the performance criteria, it is determined that the task is to be performed at the user device.

Figure 21C:
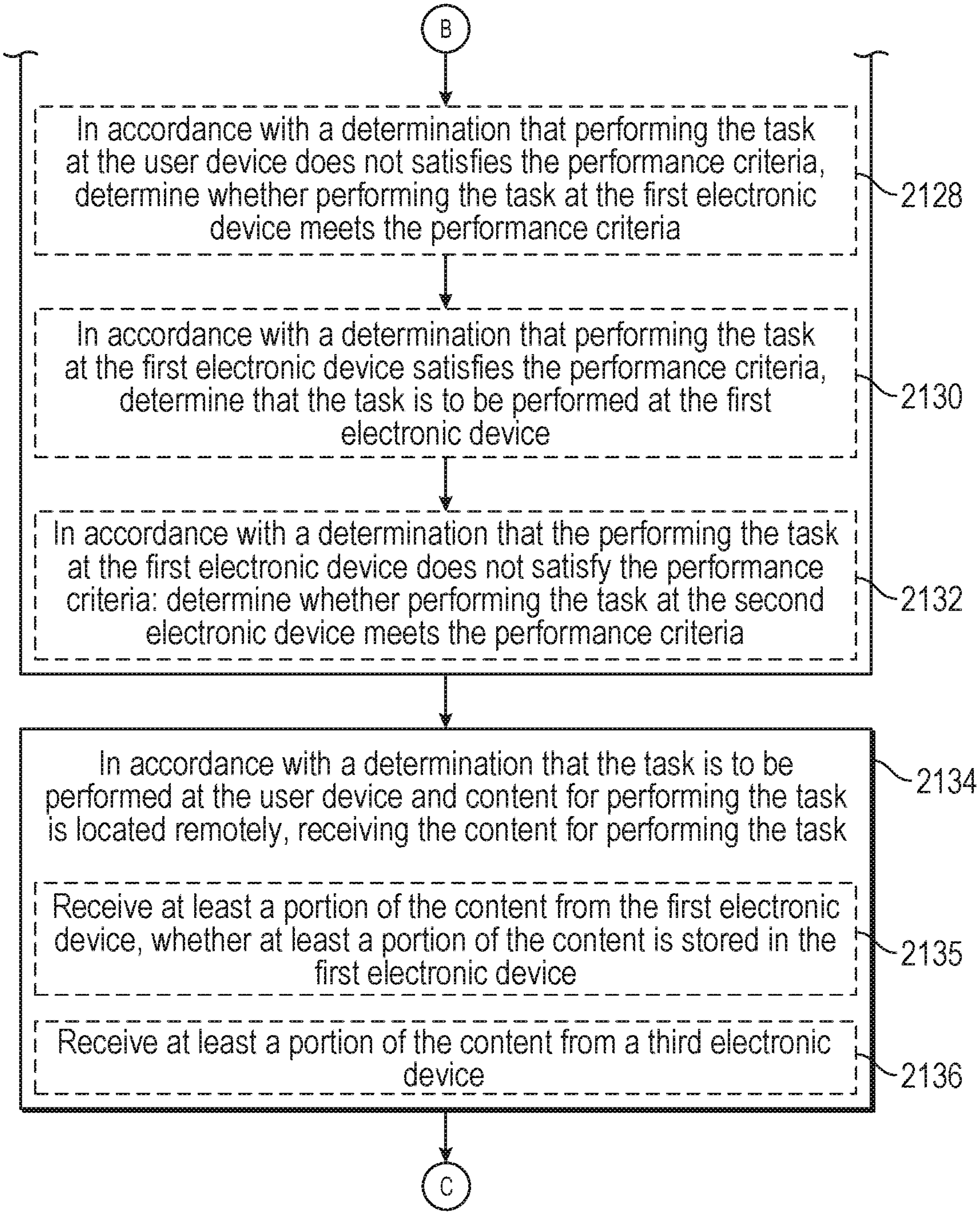

With reference to FIG. 21C, at block 2128, in accordance with a determination that performing the task at the user device does not satisfy the performance criteria, it is determined whether performing the task at the first electronic device satisfies the performance criteria. At block 2130, in accordance with a determination that performing the task at the first electronic device satisfies the performance criteria, it is determined that the task is to be performed at the first electronic device. At block 2132, in accordance with a determination that performing the task at the first electronic device does not meet the performance criteria, it is determined whether performing the task at the second electronic device satisfies the performance criteria.

At block 2134, in accordance with a determination that the task is to be performed at the user device and content for performing the task is located remotely, the content for performing the task is received. At block 2135, at least a portion of the content is received from the first electronic device. At least a portion of the content is stored in the first electronic device. At block 2136, at least a portion of the content is received from a third electronic device.

Figure 21D:
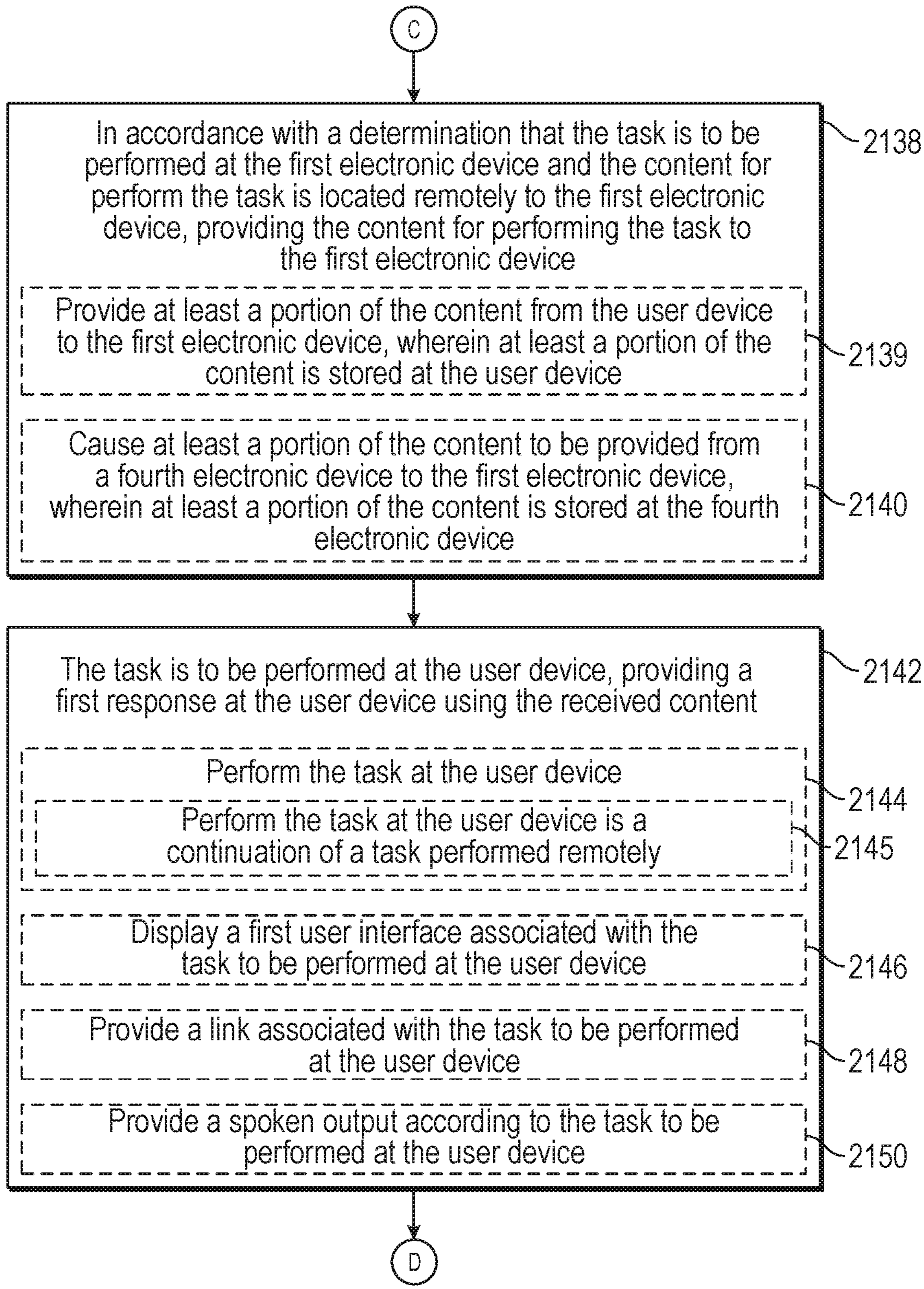

With reference to FIG. 21D, at block 2138, in accordance with a determination that the task is to be performed at the first electronic device and the content for performing the task is located remotely to the first electronic device, the content for performing the task is provided to the first electronic device. At block 2139, at least a portion of the content is provided from the user device to the first electronic device. At least a portion of the content is stored at the user device. At block 2140, at least a portion of the content is caused to be provided from a fourth electronic device to the first electronic device. At least a portion of the content is stored at the fourth electronic device.

At block 2142, the task is to be performed at the user device. A first response is provided at the user device using the received content. At block 2144, the task is performed at the user device. At block 2145, performing the task at the user device is a continuation of a task partially performed remotely to the user device. At block 2146, a first user interface is displayed associated with the task to be performed at the user device. At block 2148, a link associated with the task is to be performed at the user device. At block 2150, a spoken output is provided according to the task to be performed at the user device.

Figure 21E:
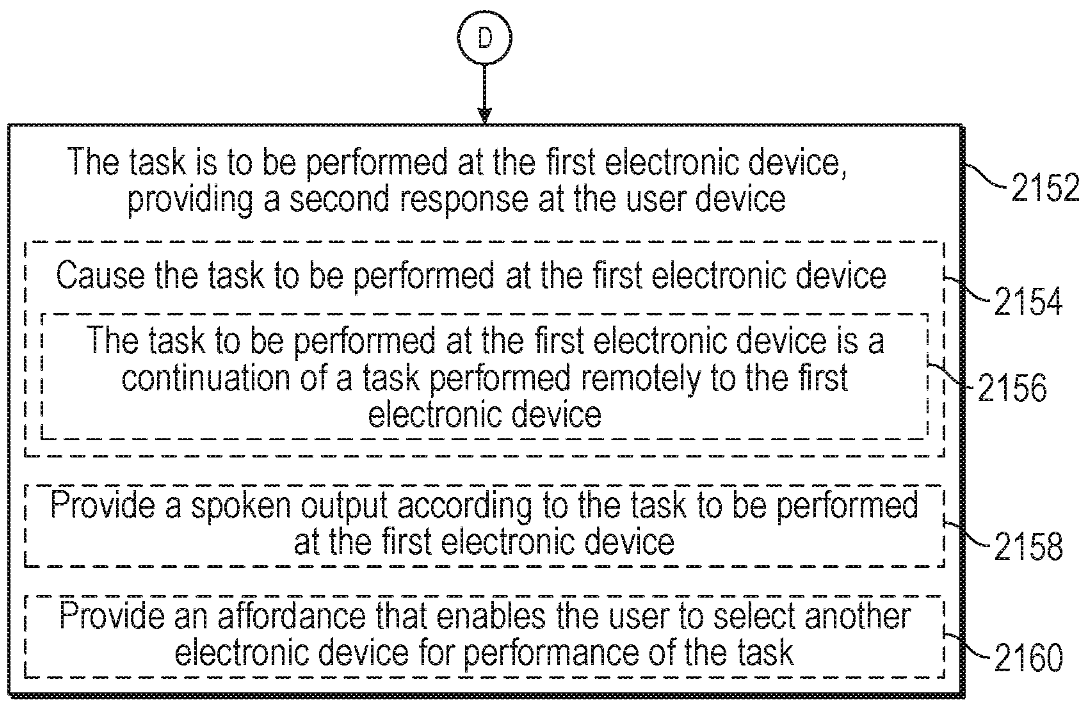

With reference to FIG. 21E, at block 2152, the task is to be performed at the first electronic device, and a second response is provided at the user device. At block 2154, the task is to be performed at the first electronic device. At block 2156, the task to be performed at the first electronic device is a continuation of a task performed remotely to the first electronic device. At block 2158, a spoken output is provided according to the task to be performed at the first electronic device. At block 2160, a spoken output is provided according to the task to be performed at the first electronic device.

9. Process for Operating a Digital Assistant—System Configuration Management.

FIGS. 22A-22D illustrate a flow diagram of an exemplary process 2200 for operating a digital assistant in accordance with some embodiments. Process 2200 may be performed using one or more devices 104, 108, 200, 400, 600, or 1800 (FIGS. 1, 2A, 4, 6A-6B, and 18C-18D). Operations in process 2200 are, optionally, combined or split, and/or the order of some operations is, optionally, changed.

Figure 22A:
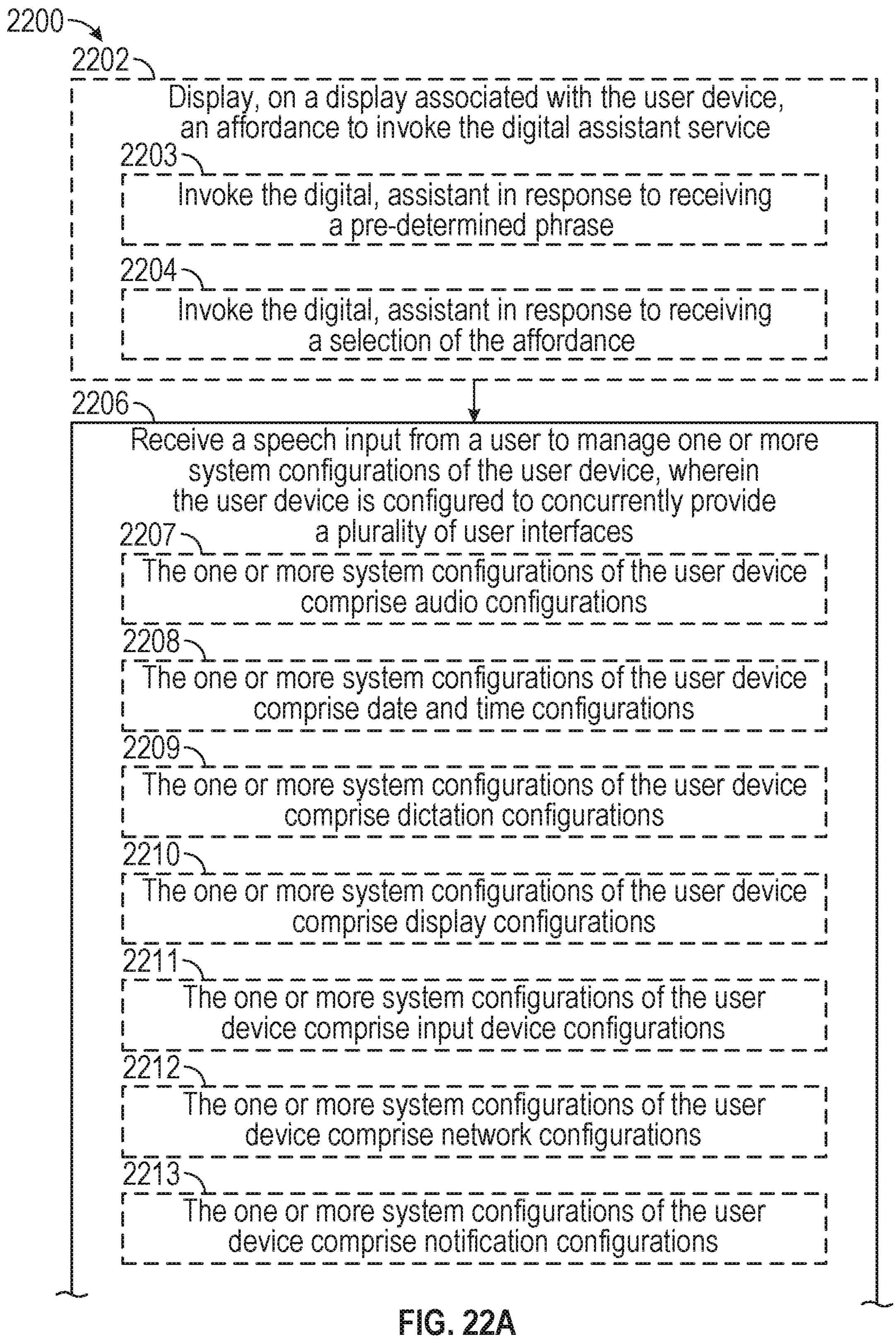
FIGS. 22A-22D illustrate a flow diagram of an exemplary process for operating a digital assistant according to various examples.

With reference to FIG. 22A, at block 2202, prior to receiving a speech input, an affordance to invoke a digital assistant service is displayed on a display associated with a user device. At block 2203, the digital assistant is invoked in response to receiving a pre-determined phrase. At block 2204, the digital assistant is invoked in response to receiving a selection of the affordance.

At block 2206, a speech input is received from a user to manage one or more system configurations of the user device. The user device is configured to concurrently provide a plurality of user interfaces. At block 2207, the one or more system configurations of the user device comprise audio configurations. At block 2208, the one or more system configurations of the user device comprise date and time configurations. At block 2209, the one or more system configurations of the user device comprise dictation configurations. At block 2210, the one or more system configurations of the user device comprise display configurations.

At block 2211, the one or more system configurations of the user device comprise input device configurations. At block 2212, the one or more system configurations of the user device comprise network configurations. At block 2213, the one or more system configurations of the user device comprise notification configurations.

Figure 22B:
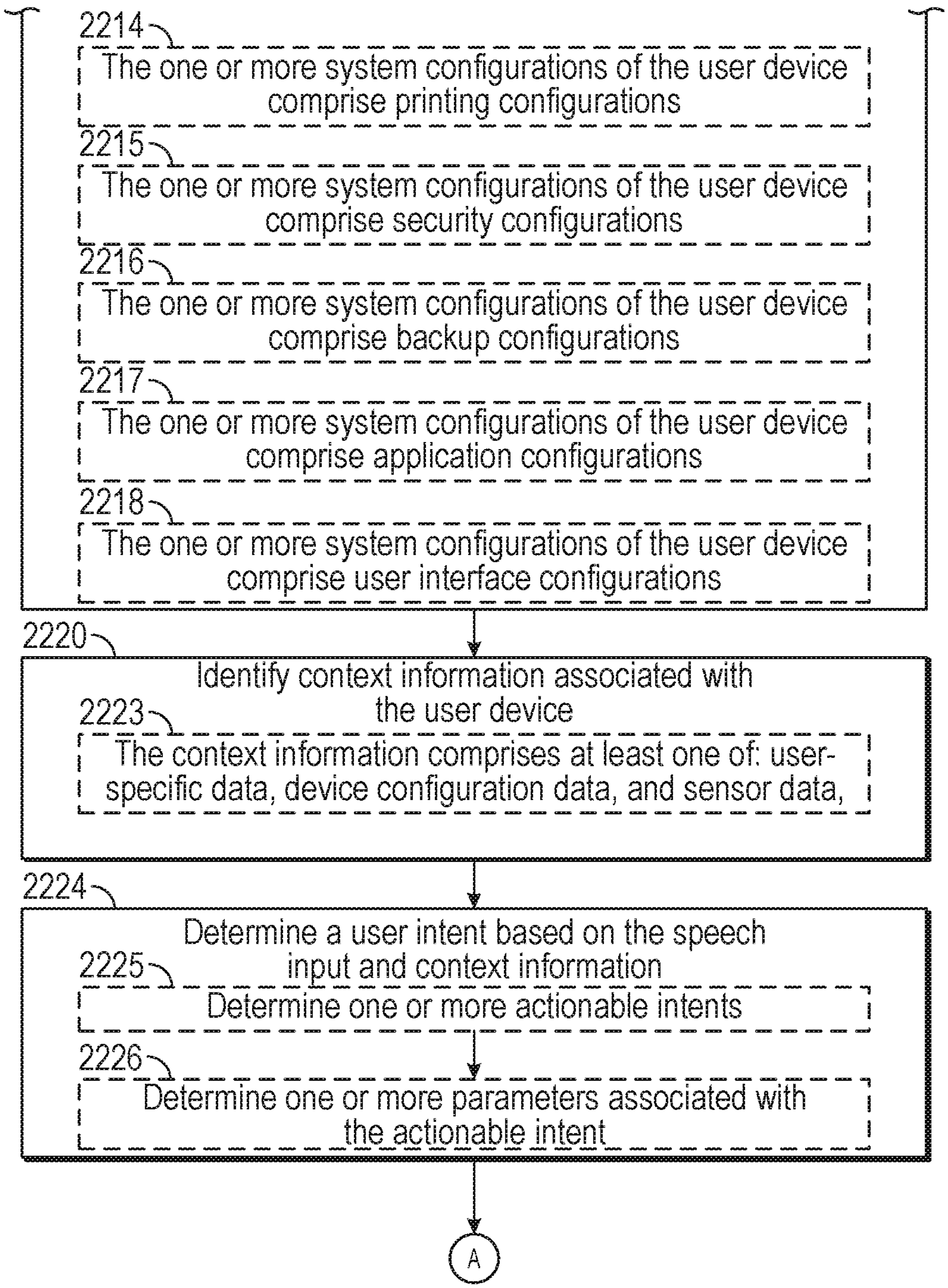

With reference to FIG. 22B, at block 2214, the one or more system configurations of the user device comprise printer configurations. At block 2215, the one or more system configurations of the user device comprise security configurations. At block 2216, the one or more system configurations of the user device comprise backup configurations. At block 2217, the one or more system configurations of the user device comprise application configurations. At block 2218, the one or more system configurations of the user device comprise user interface configurations.

At block 2220, context information associated with the user device is identified. At block 2223, the context information comprises at least one of: user-specific data, device configuration data, and sensor data. At block 2224, the user intent is determined based on the speech input and the context information. At block 2225, one or more actionable intents are determined. At block 2226, one or more parameters associated with the actionable intent are determined.

Figure 22C:
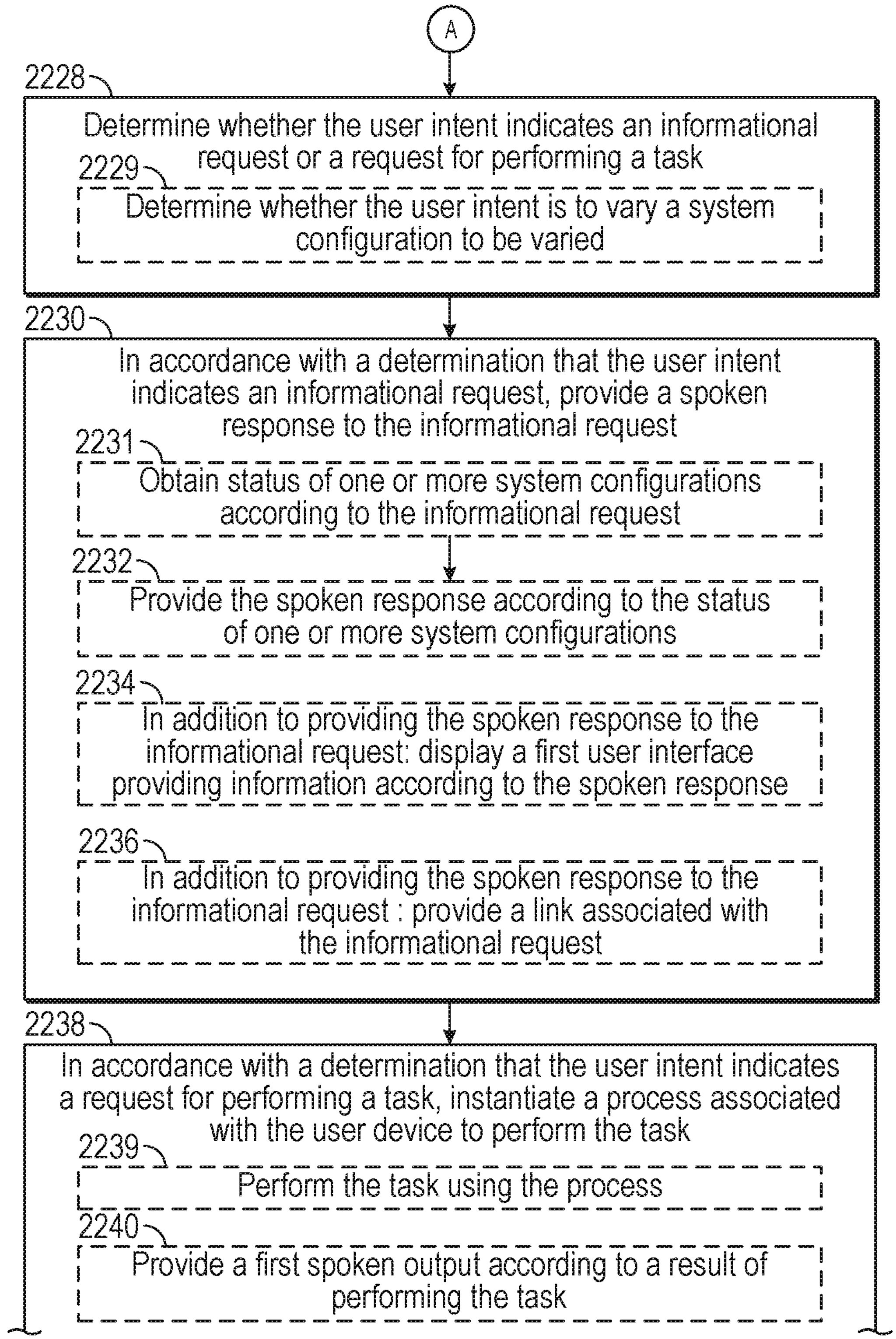

With reference to FIG. 22C, at block 2228, it is determined whether the user intent indicates an informational request or a request for performing a task. At block 2229, it is determined whether the user intent is to vary a system configuration.

At block 2230, in accordance with a determination that the user intent indicates an informational request, a spoken response is provided to the informational request. At block 2231, status of one or more system configurations is obtained according to the informational request. At block 2232, the spoken response is provided according to the status of one or more system configurations.

At block 2234, in addition to providing the spoken response to the informational request, a first user interface is displayed to provide information according to the status of the one or more system configurations. At block 2236, in addition to providing the spoken response to the informational request, a link associated with the informational request is provided.

At block 2238, in accordance with a determination that the user intent indicates a request for performing a task, a process associated with the user device is instantiated to perform the task. At block 2239, the task is performed using the process. At block 2240, a first spoken output is provided according to a result of performing the task.

Figure 22D:
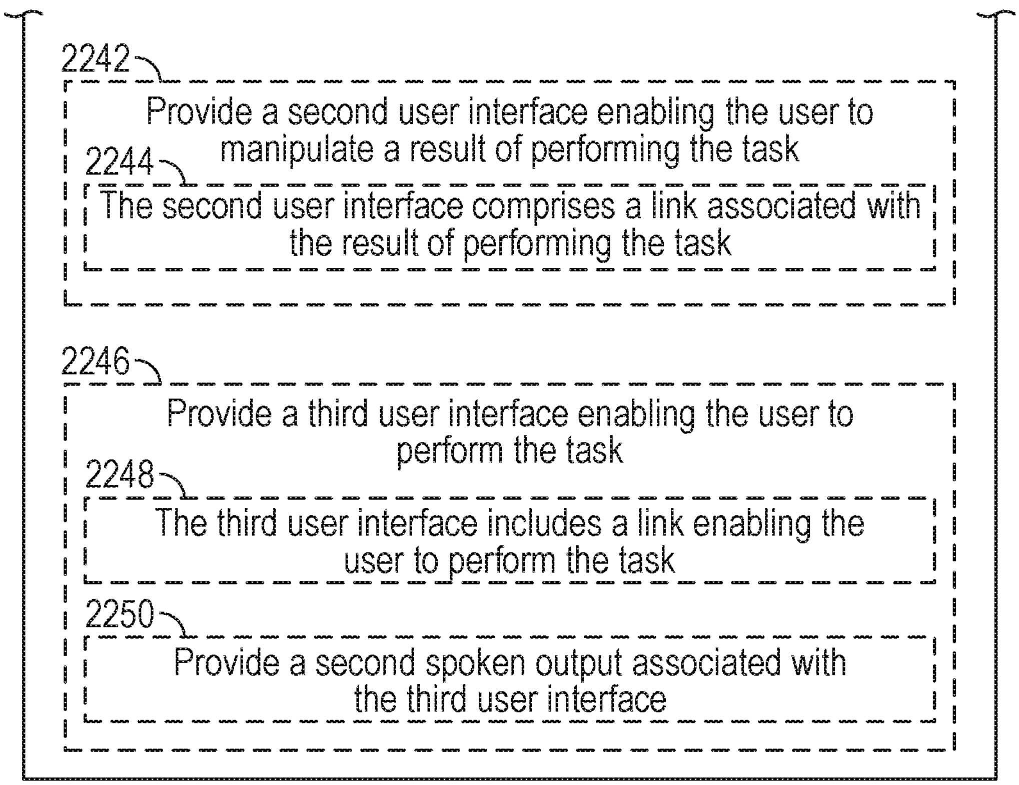

With reference to FIG. 22D, at block 2242, a second user interface is provided to enable the user to manipulate a result of performing the task. At block 2244, the second user interface comprises a link associated with the result of performing the task.

At block 2246, a third user interface is provided to enable the user to perform the task. At block 2248, the third user interface includes a link enabling the user to perform the task. At block 2250, a second spoken output associated with the third user interface is provided.

10. Electronic Device—Intelligent Search and Object Management

Figure 23:
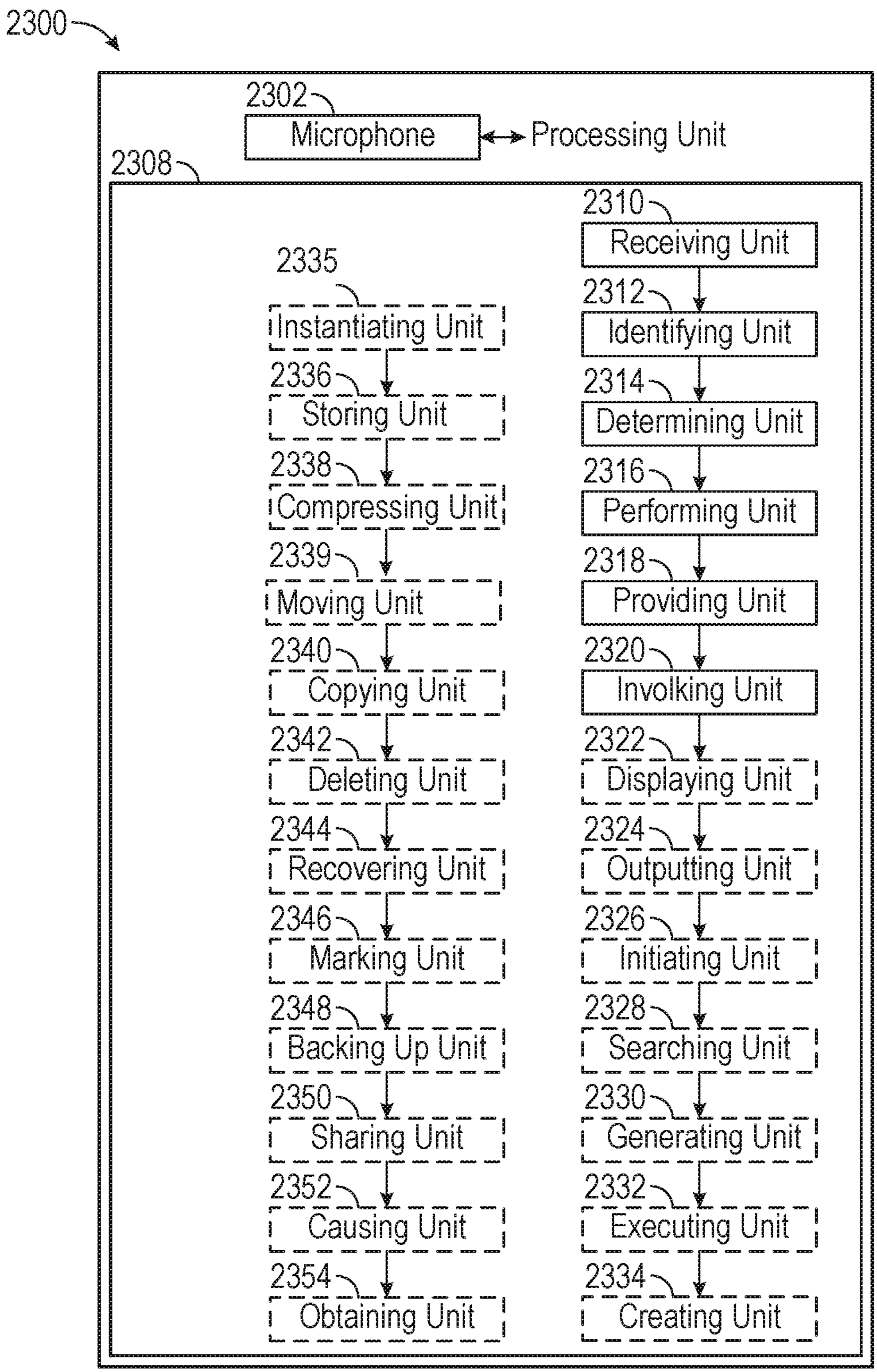
FIG. 23 illustrates a block diagram of an electronic device according to various examples.

FIG. 23 shows a functional block diagram of electronic device 2300 configured in accordance with the principles of the various described examples, including those described with reference to FIGS. 8A-8F, 9A-9H, 10A-10B, 11A-11F, 12A-12D, 13A-13C, 14A-14D, 15A-15D, 16A-16C, 17A-17E, 18A-18F, and 19A-19D. The functional blocks of the device can be optionally implemented by hardware, software, or a combination of hardware and software to carry out the principles of the various described examples. It is understood by persons of skill in the art that the functional blocks described in FIG. 23 can be optionally combined or separated into sub-blocks to implement the principles of the various described examples. Therefore, the description herein optionally supports any possible combination, separation, or further definition of the functional blocks described herein.

As shown in FIG. 23, electronic device 2300 can include a microphone 2302 and processing unit 2308. In some examples, processing unit 2308 includes a receiving unit 2310, a an identifying unit 2312, a determining unit 2314, a performing unit 2316, a providing unit 2318, an instantiating unit 2320, a displaying unit 2322, an outputting unit 2324, an initiating unit 2326, a searching unit 2328, a generating unit 2330, an executing unit 2332, a creating unit 2334, an instantiating unit 2335, a storing unit 2336, a compressing unit 2338, a copying unit 2340, a deleting unit 2342, a recovering unit 2344, a marking unit 2346, a backing up unit 2348, a sharing unit 2350, a causing unit 2352, and an obtaining unit 2354.

In some examples, the processing unit 2308 is configured to receive (e.g., with the receiving unit 2310) a first speech input from a user; identify (e.g., with the identifying unit 2312) context information associated with the user device; and determine (e.g., with the determining unit 2314) a user intent based on the first speech input and the context information.

In some examples, the processing unit 2308 is configured to determine (e.g., with the determining unit 2314) whether the user intent is to perform a task using a searching process or an object managing process. The searching process is configured to search data stored internally or externally to the user device, and the object managing process is configured to manage objects associated with the user device.

In some examples, in accordance with a determination the user intent is to perform the task using the searching process, the processing unit 2308 is configured to perform (e.g., with the performing unit 2316) the task using the searching process. In some examples, in accordance with the determination that the user intent is to perform the task using the object managing process, the processing unit 2308 is configured to perform (e.g., with the performing unit 2316) the task using the object managing process.

In some examples, prior to receiving the first speech input, the processing unit 2308 is configured to display (e.g., with the displaying unit 2322), on a display associated with the user device, an affordance to invoke the digital assistant service.

In some examples, the processing unit 2308 is configured to invoke (e.g., with the invoking unit 2320) the digital assistant in response to receiving a pre-determined phrase.

In some examples, the processing unit 2308 is configured to invoke (e.g., with the invoking unit 2320) the digital assistant in response to receiving a selection of the affordance.

In some examples, the processing unit 2308 is configured to determine (e.g., with the determining unit 2314) one or more actionable intents; and determine (e.g., with determining unit 2314) one or more parameters associated with the actionable intent.

In some examples, the context information comprises at least one of: user-specific data, metadata associated with one or more objects, sensor data, and user device configuration data.

In some examples, the processing unit 2308 is configured to determine (e.g., with the determining unit 2314) whether the speech input includes one or more keywords representing the searching process or the object managing process.

In some examples, the processing unit 2308 is configured to determine (e.g., with the determining unit 2314) whether the task is associated with searching. In accordance with a determination that the task is associated with searching, the processing unit 2308 is configured to determine (e.g., with the determining unit 2314) whether performing the task requires the searching process; and in accordance with a determination that the task is not associated with searching, determine (e.g., with the determining unit 2314) whether the task is associated with managing at least one object.

In some examples, the task is associated with searching, and in accordance with a determination that performing the task does not require the searching process, the processing unit 2308 is configured to output (e.g., with the outputting unit 2324) a spoken request to select the searching process or the object managing process and receive (e.g., with the receiving unit 2310), from the user, a second speech input indicating the selection of the searching process or the object managing process.

In some examples, the task is associated with searching, and in accordance with a determination that performing the task does not require the searching process, the processing unit 2308 is configured to determine (e.g., with the determining unit 2314), based on a pre-determined configuration, whether the task is to be performed using the searching process or the object managing process.

In some examples, the task is not associated with searching, and in accordance with a determination that the task is not associated with managing the at least one object, the processing unit 2308 is configured to perform (e.g., with the performing unit 2316) at least one of: determining (e.g., with the determining unit 2314) whether that task can be performed using a fourth process available to the user device; and initiating (e.g., with the initiating unit 2326) dialog with the user.

In some examples, the processing unit 2308 is configured to search (e.g., with the searching unit 2328) at least one object using the searching process.

In some examples, the at least one object includes at least one of a folder or a file. The file includes at least one of a photo, audio, or a video. The file is stored internally or externally to the user device.

In some examples, searching at least one of the folder or the file is based on metadata associated with the folder or the file.

In some examples, the at least one object includes a communication. The communication includes at least one of an email, a message, a notification, or a voicemail.

In some examples, the processing unit 2308 is configured to search (e.g., with the searching unit 2328) metadata associated with the communication.

In some examples, the at least one object includes at least one of a contact or a calendar.

In some examples, the at least one object includes an application.

In some examples, the at least one object includes an online informational source.

In some examples, the task is associated with searching, and the processing unit 2308 is configured to search (e.g., with the searching unit 2328) the at least one object using the object managing process.

In some examples, the at least one object includes at least one of a folder or a file. The file includes at least one of a photo, an audio, or a video. The file is stored internally or externally to the user device.

In some examples, searching at least one of the folder or the file is based on metadata associated with the folder or the file.

In some examples, the processing unit 2308 is configured to instantiate (e.g., with the instantiating unit 2335) the object managing process. Instantiating of the object managing process includes invoking the object managing process, generating a new instance of the object managing process, or executing an existing instance of the object managing process.

In some examples, the processing unit 2308 is configured to create (e.g., with the creating unit 2334) the at least one object.

In some examples, the processing unit 2308 is configured to store (e.g., with the storing unit 2336) the at least one object.

In some examples, the processing unit 2308 is configured to compress (e.g., with the compressing unit 2338) the at least one object.

In some examples, the processing unit 2308 is configured to move (e.g., with the moving unit 2339) the at least one object from a first physical or virtual storage to a second physical or virtual storage.

In some examples, the processing unit 2308 is configured to copy (e.g., with the copying unit 2340) the at least one object from a first physical or virtual storage to a second physical or virtual storage.

In some examples, the processing unit 2308 is configured to delete (e.g., with the deleting unit 2342) the at least one object stored in a physical or virtual storage.

In some examples, the processing unit 2308 is configured to recover (e.g., with the recovering unit 2344) at least one object stored at a physical or virtual storage.

In some examples, the processing unit 2308 is configured to mark (e.g., with the marking unit 2346) the at least one object. Marking of the at least one object is at least one of visible or associated with metadata of the at least one object.

In some examples, the processing unit 2308 is configured to back up (e.g., with the backing up unit 2348) the at least one object according to a predetermined time period for backing up.

In some examples, the processing unit 2308 is configured to share (e.g., with the sharing unit 2350) the at least one object among one or more electronic devices communicatively connected to the user device.

In some examples, the processing unit 2308 is configured to provide (e.g., with the providing unit 2318) a response based on a result of performing the task using the searching process or the object managing process.

In some examples, the processing unit 2308 is configured to display (e.g., with the displaying unit 2322) a first user interface providing the result of performing the task using the searching process or the object managing process.

In some examples, the processing unit 2308 is configured to provide (e.g., with the providing unit 2318) a link associated with the result of performing the task using the searching process.

In some examples, the processing unit 2308 is configured to provide (e.g., with the providing unit 2318) a spoken output according to the result of performing the task using the searching process or the object managing process.

In some examples, the processing unit 2308 is configured to provide (e.g., with the providing unit 2318) an affordance that enables the user to manipulate the result of performing the task using the searching process or the object managing process.

In some examples, the processing unit 2308 is configured to instantiate (e.g., with the instantiating unit 2335) a third process that operates using the result of performing the task.

In some examples, the processing unit 2308 is configured to determine (e.g., with the determining unit 2314) a confidence level; and provide (e.g., with providing unit 2318) the response in accordance with the determination of the confidence level.

In some examples, the confidence level represents the accuracy in determining the user intent based on the first speech input and context information associated with the user device.

In some examples, the confidence level represents the accuracy in determining whether the user intent is to perform the task using the searching process or the object managing process.

In some examples, the confidence level represents the accuracy in performing the task using the searching process or the object managing process.

In some examples, the processing unit 2308 is configured to determine (e.g., with the determining unit 2314) whether the confidence level is greater than or equal to a threshold confidence level. In accordance with a determination that the confidence level is greater than or equal to the threshold confidence level, the processing unit 2308 is configured to provide (e.g., with the providing unit 2318) a first response; and in accordance with a determination that the confidence level is less than a threshold confidence level, the processing unit 2308 is configured to provide (e.g., with the providing unit 2318) a second response.

11. Electronic Device—Continuity

In some examples, the processing unit 2308 is configured to receive (e.g., with the receiving unit 2310) a speech input from a user to perform a task; identify (e.g., with the identifying unit 2312) context information associated with the user device; and determine (e.g., with the determining unit 2314) a user intent based on the speech input and context information associated with the user device.

In some examples, the processing unit 2308 is configured to, in accordance with user intent, determine (e.g., with the determining unit 2314) whether the task is to be performed at the user device or at a first electronic device communicatively connected to the user device.

In some examples, in accordance with a determination that the task is to be performed at the user device and content for performing the task is located remotely, the processing unit 2308 is configured to receive (e.g., with the receiving unit 2310) the content for performing the task.

In some examples, in accordance with a determination that the task is to be performed at the first electronic device and the content for performing the task is located remotely to the first electronic device, the processing unit 2308 is configured to provide (e.g., with the providing unit 2318) the content for performing the task to the first electronic device.

In some examples, the user device is configured to provide a plurality of user interfaces.

In some examples, the user device includes a laptop computer, a desktop computer, or a server.

In some examples, the first electronic device includes a laptop computer, a desktop computer, a server, a smartphone, a tablet, a set-top box, or a watch.

In some examples, the processing unit 2308 is configured to, prior to receiving the speech input, display (e.g., with the displaying unit 2322), on a display of the user device, an affordance to invoke the digital assistant.

In some examples, the processing unit 2308 is configured to invoke (e.g., with the invoking unit 2320) the digital assistant in response to receiving a pre-determined phrase.

In some examples, the processing unit 2308 is configured to invoke (e.g., with the invoking unit 2320) the digital assistant in response to receiving a selection of the affordance.

In some examples, the processing unit 2308 is configured to determine (e.g., with the determining unit 2314) one or more actionable intents; and determine (e.g., with the determining unit 2314) one or more parameters associated with the actionable intent.

In some examples, the context information comprises at least one of: user-specific data, sensor data, and user device configuration data.

In some examples, determining whether the task is to be performed at the user device or at the first electronic device is based on one or more keywords included in the speech input.

In some examples, the processing unit 2308 is configured to determine (e.g., with determining unit 2314) whether performing the task at the user device satisfies performance criteria.

In some examples, in accordance with a determination that performing the task at the user device satisfies the performance criteria, the processing unit 2308 is configured to determine (e.g., with the determining unit 2314) that the task is to be performed at the user device.

In some examples, in accordance with a determination that performing the task at the user device does not satisfy the performance criteria, the processing unit 2308 is configured to determine (e.g., with the determining unit 2314) whether performing the task at the first electronic device satisfies the performance criteria.

In some examples, in accordance with a determination that performing the task at the first electronic device satisfies the performance criteria, the processing unit 2308 is configured to determine (e.g., with the determining 2314) that the task is to be performed at the first electronic device.

In some examples, in accordance with a determination that the performing the task at the first electronic device does not meet the performance criteria, the processing unit 2308 is configured to determine (e.g., with the determining unit 2314) whether performing the task at the second electronic device satisfies the performance criteria.

In some examples, the performance criteria are determined based on one or more user preferences.

In some examples, the performance criteria are determined based on the device configuration data.

In some examples, the performance criteria are dynamically updated.

In some examples, in accordance with a determination that the task is to be performed at the user device and content for performing the task is located remotely, the processing unit 2308 is configured to receive (e.g., with the receiving unit 2310) at least a portion of the content from the first electronic device, wherein at least a portion of the content is stored in the first electronic device.

In some examples, in accordance with a determination that the task is to be performed at the user device and content for performing the task is located remotely, the processing unit 2308 is configured to receive (e.g., with the receiving unit 2310) at least a portion of the content from a third electronic device.

In some examples, in accordance with a determination that the task is to be performed at the first electronic device and the content for performing the task is located remotely to the first electronic device, the processing unit 2308 is configured to provide (e.g., with the providing unit 2318) at least a portion of the content from the user device to the first electronic device, wherein at least a portion of the content is stored at the user device.

In some examples, in accordance with a determination that the task is to be performed at the first electronic device and the content for performing the task is located remotely to the first electronic device, the processing unit 2308 is configured to cause (e.g., with the causing unit 2352) at least a portion of the content to be provided from a fourth electronic device to the first electronic device. At least a portion of the content is stored at the fourth electronic device.

In some examples, the task is to be performed at the user device, and processing unit 2308 is configured to provide (e.g., with the providing unit 2318) a first response at the user device using the received content.

In some examples, the processing unit 2308 is configured to perform (e.g., with the performing unit 2316) the task at the user device.

In some examples, performing the task at the user device is a continuation of a task partially performed remotely to the user device.

In some examples, the processing unit 2308 is configured to display (e.g., with the displaying unit 2322) a first user interface associated with the task to be performed at the user device.

In some examples, the processing unit 2308 is configured to provide (e.g., with the providing unit 2318) a link associated with the task to be performed at the user device.

In some examples, the processing unit 2308 is configured to provide (e.g., with the providing unit 2318) a spoken output according to the task to be performed at the user device.

In some examples, the task is to be performed at the first electronic device, and the processing unit 2308 is configured to provide (e.g., with the providing unit 2318) a second response at the user device.

In some examples, the processing unit 2308 is configured to cause (e.g., with the causing unit 2352) the task to be performed at the first electronic device.

In some examples, the task to be performed at the first electronic device is a continuation of a task performed remotely to the first electronic device.

In some examples, the processing unit 2308 is configured to provide (e.g., with the providing unit 2318) a spoken output according to the task to be performed at the first electronic device.

In some examples, the processing unit 2308 is configured to provide (e.g., with the providing unit 2318) an affordance that enables the user to select another electronic device for performance of the task.

12. Electronic Device—System Configuration Management

In some examples, the processing unit 2308 is configured to receive (e.g., with the receiving unit 2310) a speech input from a user to manage one or more system configurations of the user device. The user device is configured to concurrently provide a plurality of user interfaces.

In some examples, the processing unit 2308 is configured to identify (e.g., with the identifying unit 2312) context information associated with the user device; and determine (e.g., with the determining unit 2314) a user intent based on the speech input and context information.

In some examples, the processing unit 2308 is configured to determine (e.g., with the determining unit 2314) whether the user intent indicates an informational request or a request for performing a task.

In some examples, in accordance with a determination that the user intent indicates an informational request, the processing unit 2308 is configured to provide (e.g., with the providing unit 2318) a spoken response to the informational request.

In some examples, in accordance with a determination that the user intent indicates a request for performing a task, the processing unit 2308 is configured to instantiate (e.g., with the instantiating unit 2335) a process associated with the user device to perform the task.

In some examples, the processing unit 2308 is configured to, prior to receiving the speech input, display (e.g., with the displaying unit 2322) on a display of the user device, an affordance to invoke the digital assistant.

In some examples, the processing unit 2308 is configured to invoke (e.g., with the invoking unit 2320) the digital assistant service in response to receiving a pre-determined phrase.

In some examples, the processing unit 2308 is configured to invoke (e.g., with the invoking unit 2320) the digital assistant service in response to receiving a selection of the affordance.

In some examples, the one or more system configurations of the user device comprise audio configurations.

In some examples, the one or more system configurations of the user device comprise date and time configurations.

In some examples, the one or more system configurations of the user device comprise dictation configurations.

In some examples, the one or more system configurations of the user device comprise display configurations.

In some examples, the one or more system configurations of the user device comprise input device configurations.

In some examples, the one or more system configurations of the user device comprise network configurations.

In some examples, the one or more system configurations of the user device comprise notification configurations.

In some examples, the one or more system configurations of the user device comprise printer configurations.

In some examples, the one or more system configurations of the user device comprise security configurations.

In some examples, the one or more system configurations of the user device comprise backup configurations.

In some examples, the one or more system configurations of the user device comprise application configurations.

In some examples, the one or more system configurations of the user device comprise user interface configurations.

In some examples, the processing unit 2308 is configured to determine (e.g., with the determining unit 2314) one or more actionable intents; and determine (e.g., with the determining unit 2314) one or more parameters associated with the actionable intent.

In some examples, the context information comprises at least one of: user-specific data, device configuration data, and sensor data.

In some examples, the processing unit 2308 is configured to determine (e.g., with the determining unit 2314) whether the user intent is to vary a system configuration.

In some examples, the processing unit 2308 is configured to obtain (e.g., with the obtaining unit 2354) status of one or more system configurations according to the informational request; and provide (e.g., with the providing unit 2318) the spoken response according to the status of one or more system configurations.

In some examples, in accordance with a determination that the user intent indicates an informational request, the processing unit 2308 is configured to, in addition to providing the spoken response to the informational request, display (e.g., with the displaying unit 2322) a first user interface providing information according to the status of the one or more system configurations.

In some examples, in accordance with a determination that the user intent indicates an informational request, the processing unit 2308 is configured to, in addition to providing the spoken response to the informational request, provide (e.g., with the providing unit 2318) a link associated with the informational request.

In some examples, in accordance with a determination that the user intent indicates a request for performing a task, the processing unit 2308 is configured to perform (e.g., with the performing unit 2316) the task using the process.

In some examples, the processing unit 2308 is configured to provide (e.g., with the providing unit 2318) a first spoken output according to a result of performing the task.

In some examples, the processing unit 2308 is configured to provide (e.g., with the providing unit 2318) a second user interface enabling the user to manipulate a result of performing the task.

In some examples, the second user interface comprises a link associated with the result of performing the task.

In some examples, in accordance with a determination that the user intent indicates a request for performing a task, the processing unit 2308 is configured to provide (e.g., with the providing unit 2318) a third user interface enabling the user to perform the task.

In some examples, the third user interface includes a link enabling the user to perform the task.

In some examples, the processing unit 2308 is configured to provide (e.g., with the providing unit 2318) a second spoken output associated with the third user interface.

The operation described above with respect to FIG. 23 is, optionally, implemented by components depicted in FIG. 1, 2A, 4, 6A-B, or 7A-7B. For example, receiving operation 2310, identifying operation 2312, determining operation 2314, performing operation 2316, and providing operation 2318 are optionally implemented by processor(s) 220. It would be clear to a person of ordinary skill in the art how other processes can be implemented based on the components depicted in FIG. 1, 2A, 4, 6A-B, or 7A-7B.

It is understood by persons of skill in the art that the functional blocks described in FIG. 12 are, optionally, combined or separated into sub-blocks to implement the principles of the various described embodiments. Therefore, the description herein optionally supports any possible combination or separation or further definition of the functional blocks described herein. For example, processing unit 2308 can have an associated "controller" unit that is operatively coupled with processing unit 2308 to enable operation. This controller unit is not separately illustrated in FIG. 23 but is understood to be within the grasp of one of ordinary skill in the art who is designing a device having a processing unit 2308, such as device 2300. As another example, one or more units, such as the receiving unit 2310, may be hardware units outside of processing unit 2308 in some embodiments. The description herein thus optionally supports combination, separation, and/or further definition of the functional blocks described herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. A non-transitory computer-readable storage medium storing one or more programs, the one or more programs comprising instructions, which when executed by one or more processors of a first electronic device, cause the first electronic device to:

provide a media output;

while providing the media output:

receive a speech input requesting to continue providing the media output at a second electronic device different from the first electronic device;

determine, based on the speech input, whether to continue providing the media output at the second electronic device; and in accordance with a determination to continue providing the media output at the second electronic device:

cause the second electronic device to continue providing the media output by resuming the media output based on where the media output was previously stopped at the first electronic device.

2. The non-transitory computer-readable storage medium of claim 1, wherein causing the second electronic device to continue providing the media output by resuming the media output based on where the media output was previously stopped at the first electronic device further comprises:

determining a point in the media output when the speech input was received; and causing the second electronic device to continue providing the media output at the point in the media output when the speech input was received.

3. The non-transitory computer-readable storage medium of claim 1, wherein the one or more programs further comprise instructions, which when executed by one or more processors of the first electronic device, cause the first electronic device to:

cease the media output at the first electronic device.

4. The non-transitory computer-readable storage medium of claim 1, wherein the one or more programs further comprise instructions, which when executed by one or more processors of the first electronic device, cause the first electronic device to:

in accordance with the determination to continue providing the media output at the second electronic device:

cause the second electronic device provide a spoken output indicating the media output.

5. The non-transitory computer-readable storage medium of claim 1, wherein the one or more programs further comprise instructions, which when executed by one or more processors of the first electronic device, cause the first electronic device to:

provide content to be provided as the media output to the second electronic device, prior to causing the second electronic device to continue providing the media output.

6. The non-transitory computer-readable storage medium of claim 1, wherein determining, based on the speech input, whether to provide the media output at the second electronic device further comprises:

determining whether providing the media output at the second electronic device satisfies performance criteria.

7. The non-transitory computer-readable storage medium of claim 6, wherein the performance criteria is determined based on context information.

8. The non-transitory computer-readable storage medium of claim 6, wherein the one or more programs further comprise instructions, which when executed by one or more processors of the first electronic device, cause the first electronic device to:

in accordance with a determination that providing the media output at the second electronic device does not satisfy performance criteria:

continue to provide the media output.

9. The non-transitory computer-readable storage medium of claim 1, wherein the one or more programs further comprise instructions, which when executed by one or more processors of the first electronic device, cause the first electronic device to:

in accordance with the determination to continue providing the media output at the second electronic device:

provide an output requesting whether a third electronic device should continue providing the media output.

10. The non-transitory computer-readable storage medium of claim 9 wherein the one or more programs further comprise instructions, which when executed by one or more processors of the first electronic device, cause the first electronic device to:

receive an input confirming that the third electronic device should continue providing the media output from a user; and in response to receiving the input confirming that the third electronic device should provide the media output from the user, cause the third electronic device to continue providing the media output.

11. The non-transitory computer-readable storage medium of claim 1, wherein the one or more programs further comprise instructions, which when executed by one or more processors of the first electronic device, cause the first electronic device to:

in accordance with the determination to continue providing the media output at the second electronic device:

request confirmation to continue providing the media output at the second electronic device.

12. The non-transitory computer-readable storage medium of claim 11, wherein the request for confirmation is provided as a spoken output.

13. A first electronic device comprising:

one or more processors;

a memory; and one or more programs, wherein the one or more programs are stored in the memory and configured to be executed by the one or more processors, the one or more programs including instructions for:

providing a media output;

while providing the media output:

receiving a speech input requesting to continue providing the media output at a second electronic device different from the first electronic device;

determining, based on the speech input, whether to continue providing the media output at the second electronic device; and in accordance with a determination to continue providing the media output at the second electronic device:

causing the second electronic device to continue providing the media output by resuming the media output based on where the media output was previously stopped at the first electronic device.

14. The first electronic device of claim 13, wherein causing the second electronic device to continue providing the media output by resuming the media output based on where the media output was previously stopped at the first electronic device further comprises:

determining a point in the media output when the speech input was received; and causing the second electronic device to continue providing the media output at the point in the media output when the speech input was received.

15. The first electronic device of claim 13, wherein the one or more programs further include instructions for:

ceasing the media output at the first electronic device.

16. The first electronic device of claim 13, wherein the one or more programs further include instructions for:

in accordance with the determination to continue providing the media output at the second electronic device:

causing the second electronic device provide a spoken output indicating the media output.

17. The first electronic device of claim 13, wherein the one or more programs further include instructions for:

providing content to be provided as the media output to the second electronic device, prior to causing the second electronic device to continue providing the media output.

18. The first electronic device of claim 13, wherein the one or more programs further include instructions for:

determining whether providing the media output at the second electronic device satisfies performance criteria.

19. The first electronic device of claim 18, wherein the performance criteria is determined based on context information.

20. The first electronic device of claim 18, wherein the one or more programs further include instructions for:

in accordance with a determination that providing the media output at the second electronic device does not satisfy performance criteria:

continuing to provide the media output.

21. The first electronic device of claim 13, wherein the one or more programs further include instructions for:

in accordance with the determination to continue providing the media output at the second electronic device:

providing an output requesting whether a third electronic device should continue providing the media output.

22. The first electronic device of claim 21, wherein the one or more programs further include instructions for:

receiving an input confirming that the third electronic device should continue providing the media output from the user; and in response to receiving the input confirming that the third electronic device should provide the media output from the user, causing the third electronic device to continue providing the media output.

23. The first electronic device of claim 13, wherein the one or more programs further include instructions for:

in accordance with the determination to continue providing the media output at the second electronic device:

requesting confirmation to continue providing the media output at the second electronic device.

24. The first electronic device of claim 23, wherein the request for confirmation is provided as a spoken output.

25. A method comprising:

at a first electronic device with one or more processors and memory:

providing a media output;

while providing the media output:

receiving a speech input requesting to continue providing the media output at a second electronic device different from the first electronic device;

determining, based on the speech input, whether to continue providing the media output at the second electronic device; and in accordance with a determination to continue providing the media output at the second electronic device:

causing the second electronic device to continue providing the media output by resuming the media output based on where the media output was previously stopped at the first electronic device.

26. The method of claim 25, further comprising:

determining a point in the media output when the speech input was received; and causing the second electronic device to continue providing the media output at the point in the media output when the speech input was received.

27. The method of claim 25, further comprising:

ceasing the media output at the first electronic device.

28. The method of claim 25, further comprising:

in accordance with the determination to continue providing the media output at the second electronic device:

causing the second electronic device provide a spoken output indicating the media output.

29. The method of claim 25, further comprising:

providing content to be provided as the media output to the second electronic device, prior to causing the second electronic device to continue providing the media output.

30. The method of claim 25, further comprising:

determining whether providing the media output at the second electronic device satisfies performance criteria.

31. The method of claim 30, wherein the performance criteria is determined based on context information.

32. The method of claim 30, further comprising:

in accordance with a determination that providing the media output at the second electronic device does not satisfy performance criteria:

continuing to provide the media output.

33. The method of claim 25, further comprising:

in accordance with the determination to continue providing the media output at the second electronic device:

providing an output requesting whether a third electronic device should continue providing the media output.

34. The method of claim 33, further comprising:

receiving an input confirming that the third electronic device should continue providing the media output from the user; and in response to receiving the input confirming that the third electronic device should provide the media output from the user, causing the third electronic device to continue providing the media output.

35. The method of claim 25, further comprising:

in accordance with the determination to continue providing the media output at the second electronic device:

requesting confirmation to continue providing the media output at the second electronic device.

36. The method of claim 35, wherein the request for confirmation is provided as a spoken output.

* * * * *